US012443324B2

(12) United States Patent
Hauenstein et al.

(10) Patent No.: US 12,443,324 B2
(45) Date of Patent: Oct. 14, 2025

(54) SYSTEMS, METHODS, AND GRAPHICAL USER INTERFACES FOR INTERACTING WITH AUGMENTED AND VIRTUAL REALITY ENVIRONMENTS

(71) Applicant: Apple Inc., Cupertino, CA (US)

(72) Inventors: Mark K. Hauenstein, San Francisco, CA (US); Joseph A. Malia, Isle of Wight (GB); Julian K. Missig, Burlingame, CA (US); Matthaeus Krenn, Sunnyvale, CA (US); Jeffrey T. Bernstein, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/140,557

(22) Filed: Apr. 27, 2023

(65) Prior Publication Data

US 2023/0305674 A1 Sep. 28, 2023

Related U.S. Application Data

(63) Continuation of application No. 17/488,191, filed on Sep. 28, 2021, now Pat. No. 11,740,755, which is a
(Continued)

(51) Int. Cl.
*G06F 3/04815* (2022.01)
*G06F 3/01* (2006.01)
(Continued)

(52) U.S. Cl.
CPC .......... *G06F 3/04815* (2013.01); *G06F 3/011* (2013.01); *G06F 3/012* (2013.01);
(Continued)

(58) Field of Classification Search
CPC ...... G06F 3/04815; G06F 3/011; G06F 3/012; G06F 3/017; G06F 3/04845;
(Continued)

(56) References Cited

U.S. PATENT DOCUMENTS

| | | | |
|---|---|---|---|
| 6,426,745 | B1 | 7/2002 | Isaacs et al. |
| RE37,812 | E | 8/2002 | Ishikura et al. |

(Continued)

FOREIGN PATENT DOCUMENTS

| | | | |
|---|---|---|---|
| CN | 104081317 | A | 10/2014 |
| CN | 104486430 | A | 4/2015 |

(Continued)

OTHER PUBLICATIONS

Notice of Allowance, dated Apr. 18, 2023, received in Korean Patent Application No. 2022-7007567, which corresponds with U.S. Appl. No. 17/488,191, 2 pages.

(Continued)

*Primary Examiner* — Jennifer N Welch
*Assistant Examiner* — Amy P Hoang
(74) *Attorney, Agent, or Firm* — Morgan, Lewis & Bockius LLP

(57) ABSTRACT

A computer system displays, in a first viewing mode, a simulated environment that is oriented relative to a physical environment of the computer system. In response to detecting a first change in attitude, the computer system changes an appearance of a first virtual user interface object so as to maintain a fixed spatial relationship between the first virtual user interface object and the physical environment. The computing system detects a gesture. In response to detecting a second change in attitude, in accordance with a determination that the gesture met mode change criteria, the computer system transitions from displaying the simulated environment in the first viewing mode to displaying the simulated environment in a second viewing mode. Displaying the virtual model in the simulated environment in the second viewing mode includes forgoing changing the appearance of the first virtual user interface object to maintain the fixed spatial relationship.

31 Claims, 217 Drawing Sheets

Related U.S. Application Data continuation of application No. 16/116,276, filed on Aug. 29, 2018, now Pat. No. 11,163,417.

(60) Provisional application No. 62/564,984, filed on Sep. 28, 2017, provisional application No. 62/553,063, filed on Aug. 31, 2017.

(51) Int. Cl.

| | |
|---|---|
| ***G06F 3/0484*** | (2022.01) |
| ***G06F 3/04845*** | (2022.01) |
| ***G06F 3/04883*** | (2022.01) |
| ***G06T 19/00*** | (2011.01) |

(52) U.S. Cl.
CPC .............. *G06F 3/014* (2013.01); *G06F 3/017* (2013.01); *G06F 3/0484* (2013.01); *G06F 3/04845* (2013.01); *G06F 3/04883* (2013.01); *G06T 19/006* (2013.01)

(58) Field of Classification Search
CPC ....... G06F 3/04883; G06F 2203/04806; G06F 3/0488; G06T 19/006; G02B 27/017; G02B 27/01
See application file for complete search history.

(56) References Cited

U.S. PATENT DOCUMENTS

| | | | | |
|---|---|---|---|---|
| 6,448,964 | B1 | 9/2002 | Isaacs et al. | |
| 8,836,645 | B2 | 9/2014 | Hoover | |
| 9,244,562 | B1 | 1/2016 | Rosenberg et al. | |
| 9,383,895 | B1 | 7/2016 | Vinayak et al. | |
| 9,386,230 | B1 | 7/2016 | Duran et al. | |
| 9,392,212 | B1 | 7/2016 | Ross | |
| 9,646,418 | B1 | 5/2017 | Lotto | |
| 9,720,934 | B1 | 8/2017 | Dube et al. | |
| 9,861,446 | B2 | 1/2018 | Lang | |
| 2002/0044152 | A1 | 4/2002 | Abbott, III et al. | |
| 2008/0071559 | A1 | 3/2008 | Arrasvuori | |
| 2008/0094417 | A1 | 4/2008 | Cohen | |
| 2009/0047996 | A1 | 2/2009 | Lee | |
| 2009/0243916 | A1 | 10/2009 | Beeri et al. | |
| 2010/0235765 | A1 | 9/2010 | Worthington | |
| 2011/0041098 | A1 | 2/2011 | Kajiya et al. | |
| 2011/0157306 | A1* | 6/2011 | Lin | G06T 19/006 348/E13.001 |
| 2011/0296352 | A1 | 12/2011 | Lobb | |
| 2012/0249416 | A1 | 10/2012 | Maciocci et al. | |
| 2012/0249741 | A1 | 10/2012 | Maciocci et al. | |
| 2012/0250940 | A1 | 10/2012 | Kasahara | |
| 2013/0044141 | A1 | 2/2013 | Markiewicz et al. | |
| 2013/0127825 | A1 | 5/2013 | Joshi | |
| 2013/0141434 | A1 | 6/2013 | Sugden et al. | |
| 2013/0178257 | A1 | 7/2013 | Langseth | |
| 2013/0179108 | A1 | 7/2013 | Joseph et al. | |
| 2013/0234926 | A1 | 9/2013 | Rauber | |
| 2013/0257856 | A1 | 10/2013 | Hickman et al. | |
| 2013/0321395 | A1 | 12/2013 | Chen et al. | |
| 2013/0335405 | A1 | 12/2013 | Scavezze et al. | |
| 2014/0047340 | A1 | 2/2014 | Ravi et al. | |
| 2014/0104274 | A1 | 4/2014 | Hilliges et al. | |
| 2014/0104316 | A1 | 4/2014 | Sharma et al. | |
| 2014/0129988 | A1 | 5/2014 | Liang et al. | |
| 2014/0129990 | A1 | 5/2014 | Xin et al. | |
| 2014/0132629 | A1 | 5/2014 | Pandey et al. | |
| 2014/0176750 | A1 | 6/2014 | Payjak et al. | |
| 2014/0247280 | A1 | 9/2014 | Nicholas et al. | |
| 2014/0267410 | A1 | 9/2014 | Fein et al. | |
| 2014/0282162 | A1 | 9/2014 | Fein et al. | |
| 2014/0282220 | A1 | 9/2014 | Wantland et al. | |
| 2014/0285522 | A1 | 9/2014 | Kim et al. | |
| 2014/0306993 | A1 | 10/2014 | Poulos et al. | |
| 2014/0365882 | A1 | 12/2014 | Lemay | |
| 2015/0009130 | A1 | 1/2015 | Motta et al. | |
| 2015/0135115 | A1 | 5/2015 | Feng et al. | |
| 2015/0302664 | A1 | 10/2015 | Miller | |
| 2015/0316985 | A1 | 11/2015 | Levesque et al. | |
| 2015/0331576 | A1 | 11/2015 | Piya et al. | |
| 2015/0331970 | A1 | 11/2015 | Jovanovic | |
| 2015/0363966 | A1 | 12/2015 | Well et al. | |
| 2015/0375128 | A1 | 12/2015 | Villar et al. | |
| 2015/0378433 | A1 | 12/2015 | Savastinuk et al. | |
| 2016/0065827 | A1 | 3/2016 | Dye et al. | |
| 2016/0080732 | A1 | 3/2016 | Pedley et al. | |
| 2016/0092080 | A1 | 3/2016 | Swanson et al. | |
| 2016/0148433 | A1 | 5/2016 | Petrovaskaya et al. | |
| 2016/0155273 | A1 | 6/2016 | Lyren | |
| 2016/0170624 | A1 | 6/2016 | Zambetti et al. | |
| 2016/0189426 | A1 | 6/2016 | Thomas et al. | |
| 2016/0329006 | A1 | 11/2016 | Weber et al. | |
| 2016/0334879 | A1 | 11/2016 | Hirano et al. | |
| 2016/0350595 | A1 | 12/2016 | Solomin et al. | |
| 2016/0364758 | A1 | 12/2016 | Achhra et al. | |
| 2016/0370956 | A1 | 12/2016 | Penha et al. | |
| 2016/0371398 | A1 | 12/2016 | Sugiura | |
| 2017/0018120 | A1 | 1/2017 | Li et al. | |
| 2017/0038837 | A1 | 2/2017 | Faaborg et al. | |
| 2017/0083089 | A1 | 3/2017 | Mullins | |
| 2017/0115488 | A1* | 4/2017 | Ambrus | G02B 27/0172 |
| 2017/0173262 | A1 | 6/2017 | Veltz | |
| 2017/0178364 | A1 | 6/2017 | Needham | |
| 2017/0206712 | A1 | 7/2017 | Petrovskaya et al. | |
| 2017/0270715 | A1 | 9/2017 | Lindsay et al. | |
| 2017/0285738 | A1 | 10/2017 | Khalid | |
| 2017/0294044 | A1* | 10/2017 | Yerli | H04L 67/04 |
| 2017/0300214 | A1 | 10/2017 | Roundtree | |
| 2017/0336941 | A1 | 11/2017 | Gribetz | |
| 2017/0337858 | A1 | 11/2017 | Vartanian et al. | |
| 2018/0033210 | A1 | 2/2018 | Vats | |
| 2018/0039377 | A1 | 2/2018 | Akita et al. | |
| 2018/0045963 | A1* | 2/2018 | Hoover | G02B 27/0172 |
| 2018/0046352 | A1* | 2/2018 | Johnson | G06F 3/04812 |
| 2018/0113597 | A1 | 4/2018 | Guld et al. | |
| 2018/0114372 | A1 | 4/2018 | Nagy et al. | |
| 2018/0143693 | A1 | 5/2018 | Calabrese et al. | |
| 2018/0210628 | A1 | 7/2018 | McPhee et al. | |
| 2018/0286126 | A1 | 10/2018 | Schwarz et al. | |
| 2018/0300952 | A1 | 10/2018 | Evans et al. | |
| 2018/0330544 | A1 | 11/2018 | Corso et al. | |
| 2018/0339223 | A1* | 11/2018 | Haas | A63F 13/211 |
| 2019/0050132 | A1 | 2/2019 | Rawlings et al. | |
| 2019/0065027 | A1 | 2/2019 | Hauenstein et al. | |
| 2019/0228581 | A1 | 7/2019 | Dascola et al. | |
| 2019/0228582 | A1 | 7/2019 | Yerkes et al. | |
| 2019/0228588 | A1 | 7/2019 | Rockel et al. | |
| 2019/0228589 | A1 | 7/2019 | Dascola et al. | |
| 2021/0333979 | A1 | 10/2021 | Rockel et al. | |
| 2022/0019334 | A1 | 1/2022 | Hauenstein et al. | |

FOREIGN PATENT DOCUMENTS

| | | | |
|---|---|---|---|
| CN | 105264480 | A | 1/2016 |
| CN | 105824412 | A | 8/2016 |
| CN | 106575153 | A | 4/2017 |
| CN | 107071392 | A | 8/2017 |
| EP | 2 546 806 | A2 | 7/2012 |
| EP | 2 738 743 | A2 | 6/2014 |
| GB | 2501929 | A | 11/2013 |
| JP | H09-244476 | A | 9/1997 |
| JP | 2001-290864 | A | 10/2001 |
| JP | 2004-021848 | A | 1/2004 |
| JP | 2007-047294 | A | 2/2007 |
| JP | 2011-186536 | A | 9/2011 |
| JP | 2012-089112 | A | 5/2012 |
| JP | 2012-168798 | A | 9/2012 |
| JP | 2012-212345 | A | 11/2012 |
| JP | 2013-164696 | A | 8/2013 |
| JP | 2013-164697 | A | 8/2013 |
| JP | 2013-214944 | A | 10/2013 |
| JP | 2013-242865 | A | 12/2013 |
| JP | 2014-089697 | A | 5/2014 |
| JP | 2014-102819 | A | 6/2014 |
| JP | 2014-115957 | A | 6/2014 |

(56) References Cited

FOREIGN PATENT DOCUMENTS

| | | | |
|---|---|---|---|
| JP | 2015-176450 | A | 10/2015 |
| JP | 2016-521892 | A | 7/2016 |
| JP | 2017-004457 | A | 1/2017 |
| JP | 2017-162451 | A | 9/2017 |
| JP | 2017-535207 | A | 11/2017 |
| KR | 2012-0093369 | A | 8/2012 |
| KR | 2014-0010616 | A | 1/2014 |
| KR | 2016-0019964 | A | 2/2017 |
| WO | WO 2012/076062 | A1 | 6/2012 |
| WO | WO 2013/060085 | A1 | 5/2013 |
| WO | WO 2013/169882 | A2 | 11/2013 |
| WO | WO 2014/124173 | A1 | 8/2014 |
| WO | WO 2014/160651 | A2 | 10/2014 |
| WO | WO 2015/031139 | A1 | 3/2015 |
| WO | WO 2015/192117 | A1 | 12/2015 |
| WO | WO 2016/144975 | A2 | 9/2016 |
| WO | WO 2017/005982 | A1 | 1/2017 |
| WO | WO 2017/139509 | A1 | 8/2017 |
| WO | WO 2017/165705 | A1 | 9/2017 |
| WO | WO 2017/180407 | A1 | 10/2017 |
| WO | WO 2017/199206 | A1 | 11/2017 |
| WO | WO 2017/208637 | A1 | 12/2017 |

OTHER PUBLICATIONS

Ali, "Augmented Reality on the Web, for Everyone", https://www.blog.google/products/google-ar-vr/augmented-reality-web-everyone, Jan. 22, 2018, 8 pages.
BBC Click, "The Augmented Reality Apps for Your Home", https://www.youtube.com/watch?v=aJ251J8nE2U, Nov. 1, 2016, 2 pages.
Billinghurst et al., Hands in Space, Gesture Interaction with Augmented-Reality Interfaces, IEEE computer graphics and applications, Jan. 2014, 1 page.
CVLab Research, "Unity + Vuforia + Gesture Control + Dynamic Light", https://www.youtube.com/watch?v=AJ6Vsx7YGAc, Feb. 1, 2018, 2 pages.
Donselaar, "Unity Realtime Reflections in Augmented Reality", https://www.youtube.com/watch?v=bQ8D7rJkH8A, Mar. 1, 2018, 2 pages.
Erickson, "Microsoft HoloLens Enables Thyssendrupp to Transform the Global elevator Industry", https://blogs.windows.com/devices/2016/09/15/microsoft-hololens-enable-thyssendrupp-to-transform-the-global-elevator-industry, Sep. 15, 2016, 10 pages.
EFTMOnline, "IKEA Place: Genuine Augmented Reality furniture app using Apple ARKit", https://www.youtube.com/watch?v=ZDWR19A1p6s, Aug. 29, 2017, 2 pages.
Feng, "Creating the True Augmented Reality Pokemon Go", https://virtualrealitypop.com/creating-the-true-augmented-reality-pokemon-go-14d79e9f469d, Aug. 8, 2016, 9 pages.
Feng, "Pokemon Go AR Demo", https//vimeo.com/177996571, Aug. 8, 2016, 2 pages.
Fingo, "Application for Matching Furniture in the Interior Using Augmented Reality", https://www.youtube.com/watch?v=WuE9Y8mKnso, Apr. 23, 2014, 2 pages.
Horizon, "Calibration Guide in Horizon Camera for Android", https://www.youtube.com/watch?v=TWG_zB7yE9s, Jan. 20, 2015, 2 pages.
Jardine, "Ikea's AR App Helps You Imagine What Its Furniture Would Look Like in Your Home", http://creativity-online.com/work/ikea-ikea-place/52719, Sep. 19, 2017, 3 pages.
Kalkofen et al., "Explosion Diagrams in Augmented Reality", Graz University of Technology Institute for Computer Graphics and Vision, Lafayette, Louisiana, USA, Mar. 14-15, 2009, 8 pages.
Kutulakos, "Calibration-Free Augmented Reality", IEEE Transactions on Visualization and Computer Graphics 4.1, Jan. 20, 1998, 20 pages.
Microsoft HoloLens, "Microsoft Hololens: Expaning the Spatial Mapping Capabilities of Microsoft HoloLens", https://www.youtube.com/watch?v=iUmTi3_Ynus, Dec. 7, 2016, 2 pages.
Patio Interactive, "Boston Pizza Augmented Reality Menu—Tutorial Demo", https://www.youtube.com/watch?v=f987S_J5Elo, Nov. 1, 2017, 2 pages.
Saqib, "How to Make 2 Fast 2 Furious Nissan Skyline GTR in Real Racing 3", https://www.youtube.com/watch?v=aFSTTTRn6Tw, Jun. 21, 2015, 3 pages.
Sattvarise Technologies Pvt Ltd, "Augmented Reality for Furniture & Interior Designing (Google Tango)", https://www.youtube.com/watch?v=08h3EDiTepU, Jun. 23, 2017, 2 pages.
Tech Insider, "Take the guesswork out of furniture buying with IKEA's new AR app", https://www.youtube.com/watch?v=4jrhw_ZRjV4, Sep. 23, 2017, 3 pages.
YouTube, "Recor Furniture Product Configurator & Wall Planner with Augmented Reality (ENG)", https://www.youtube.com/watch?v=rLCICqR8aA8, Oct. 26, 2016, 3 pages.
Willisau, "Augmented Reality Furniture Tool by ViewAR", https://www.youtube.com/watch?v=ccb9S0a1zoU, Jan. 30, 2017, 2 pages.
Office Action, dated Dec. 11, 2019, received in U.S. Appl. No. 16/116,276, 33 pages.
Final Office Action, dated Jun. 26, 2020, received in U.S. Appl. No. 16/116,276, 36 pages.
Office Action, dated Nov. 4, 2020, received in U.S. Appl. No. 16/116,276, 32 pages.
Final Office Action, dated May 11, 2021, received in U.S. Appl. No. 16/116,276, 33 pages.
Notice of Allowance, dated Aug. 23, 2021, received in U.S. Appl. No. 16/116,276, 38 pages.
Innovation Patent, dated Sep. 12, 2018, received in Australian Patent Application No. 2018101226, which corresponds with U.S. Appl. No. 16/116,276, 1 page.
Office Action, dated Nov. 22, 2018, received in Australian Patent Application No. 2018101226, which corresponds with U.S. Appl. No. 16/116,276, 7 pages.
Office Action, dated Feb. 15, 2019, received in Australian Patent Application No. 2018101226, which corresponds with U.S. Appl. No. 16/116,276, 3 pages.
Certificate of Examination, dated Apr. 26, 2019, received in Australian Patent Application No. 2018101226, which corresponds with U.S. Appl. No. 16/116,276, 4 pages.
Office Action, dated Apr. 19, 2021, received in Australian Patent Application No. 2018324085, which corresponds with U.S. Appl. No. 16/116,276, 3 pages.
Notice of Allowance, dated Aug. 26, 2021, received in Australian Patent Application No. 2018324085, which corresponds with U.S. Appl. No. 16/116,276, 3 pages.
Patent, dated Dec. 23, 2021, received in Australian Patent Application No. 2018324085, which corresponds with U.S. Appl. No. 16/116,276, 3 pages.
Office Action, dated Mar. 9, 2021, received in Chinese Patent Application No. 202010919245.X, which corresponds with U.S. Appl. No. 16/116,276, 5 pages.
Office Action, dated Oct. 15, 2021, received in Chinese Patent Application No. 202010919245.X, which corresponds with U.S. Appl. No. 16/116,276, 2 pages.
Office Action, dated Mar. 7, 2022, received in Chinese Patent Application No. 202010919245.X, which corresponds with U.S. Appl. No. 16/116,276, 2 pages.
Decision on Appeal, dated Jul. 8, 2022, received in Chinese Patent Application No. 202010919245.X, which corresponds with U.S. Appl. No. 16/116,276, 2 pages.
Notice of Allowance, dated Jul. 19, 2022, received in Chinese Patent Application No. 202010919245.X, which corresponds with U.S. Appl. No. 16/116,276, 6 pages.
Patent, dated Oct. 18, 2022, received in Chinese Patent Application No. 202010919245.X, which corresponds with U.S. Appl. No. 16/116,276, 6 pages.
Office Action, dated Nov. 27, 2018, received in Danish Patent Application No. 201870548, which corresponds with U.S. Appl. No. 16/116,276, 8 pages.
Office Action, dated Oct. 16, 2019, received in Danish Patent Application No. 201870548, which corresponds with U.S. Appl. No. 16/116,276, 3 pages.

(56) References Cited

OTHER PUBLICATIONS

Intention to Grant, dated May 29, 2020, received in Danish Patent Application No. 201870548, which corresponds with U.S. Appl. No. 16/116,276, 2 pages.
Decision to Grant, dated Oct. 6, 2020, received in Danish Patent Application No. 201870548, which corresponds with U.S. Appl. No. 16/116,276, 2 pages.
Patent, dated May 6, 2021, received in Danish Patent Application No. 201870548, which corresponds with U.S. Appl. No. 16/116,276, 2 pages.
Office Action, dated Apr. 13, 2021, received in European Patent Application No. 18778642.1, which corresponds with U.S. Appl. No. 16/116,276, 10 pages.
Office Action, dated Nov. 29, 2021, received in Indian Patent Application No. 202017010967, which corresponds with U.S. Appl. No. 16/116,276, 11 pages.
Office Action, dated Feb. 19, 2021, received in Japanese Patent Application No. 2020-509514, which corresponds with U.S. Appl. No. 16/116,276, 2 pages.
Notice of Allowance, dated Aug. 20, 2021, received in Japanese Patent Application No. 2020-509514, which corresponds with U.S. Appl. No. 16/116,276, 2 pages.
Patent, dated Sep. 30, 2021, received in Japanese Patent Application No. 2020-509514, which corresponds with U.S. Appl. No. 16/116,276, 3 pages.
Office Action, dated Apr. 21, 2021, received in Korean Patent Application No. 2020-7004652, which corresponds with U.S. Appl. No. 16/116,276, 7 pages.
Notice of Allowance, dated Dec. 7, 2021, received in Korean Patent Application No. 2020-7004652, which corresponds with U.S. Appl. No. 16/116,276, 2 pages.
Patent, dated Mar. 7, 2022, received in Korean Patent Application No. 2020-7004652, which corresponds with U.S. Appl. No. 16/116,276, 5 pages.
Office Action, dated Feb. 20, 2019, received in U.S. Appl. No. 16/145,035, 26 pages.
Final Office Action, dated Jul. 15, 2019, received in U.S. Appl. No. 16/145,035, 28 pages.
Office Action, dated Dec. 26, 2019, received in U.S. Appl. No. 16/145,035, 31 pages.
Final Office Action, dated Jun. 8, 2020, received in U.S. Appl. No. 16/145,035, 35 pages.
Notice of Allowance, dated Feb. 25, 2021, received in U.S. Appl. No. 16/145,035, 7 pages.
Notice of Allowance, dated Apr. 6, 2021, received in U.S. Appl. No. 16/145,035, 5 pages.
Office Action, dated Sep. 21, 2018, received in Danish Patent Application No. 201870346, which corresponds with U.S. Appl. No. 16/145,035, 12 pages.
Office Action, dated Nov. 29, 2019, received in Danish Patent Application No. 201870346, which corresponds with U.S. Appl. No. 16/145,035, 3 pages.
Office Action, dated Oct. 16, 2020, received in Danish Patent Application No. 201870346, which corresponds with U.S. Appl. No. 16/145,035, 2 pages.
Office Action, dated Feb. 5, 2019, received in U.S. Appl. No. 16/145,039, 26 pages.
Notice of Allowance, dated Apr. 11, 2019, received in U.S. Appl. No. 16/145,039, 8 pages.
Certificate of Grant, dated Feb. 13, 2019, received in Australian Patent Application No. 2019100079, which corresponds with U.S. Appl. No. 16/145,039, 4 pages.
Office Action, dated Apr. 10, 2019, received in Australian Patent Application No. 2019100079, which corresponds with U.S. Appl. No. 16/145,039, 5 pages.
Office action, dated Jun. 29, 2021, received in Australian Patent Application No. 2019212150, which corresponds with U.S. Appl. No. 16/145,039, 2 pages.
Notice of Allowance, dated Dec. 2, 2021, received in Australian Patent Application No. 2019212150, which corresponds with U.S. Appl. No. 16/145,039, 3 pages.
Patent, dated Mar. 31, 2022, received in Australian Patent Application No. 2019212150, which corresponds with U.S. Appl. No. 16/145,039, 3 pages.
Office Action, dated May 25, 2020, received in Chinese Patent Application No. 201911078900.7, which corresponds with U.S. Appl. No. 16/145,039, 5 pages.
Office Action, dated Nov. 25, 2020, received in Chinese Patent Application No. 201911078900.7, which corresponds with U.S. Appl. No. 16/145,039, 1 page.
Office Action, dated Mar. 18, 2021, received in Chinese Patent Application No. 201911078900.7, which corresponds with U.S. Appl. No. 16/145,039, 12 pages.
Office Action, dated Sep. 17, 2018, received in Danish Patent Application No. 201802192, which corresponds with U.S. Appl. No. 16/145,039, 10 pages.
Office Action, dated May 1, 2019, received in Danish Patent Application No. 201802192, which corresponds with U.S. Appl. No. 16/145,039, 7 pages.
Office Action, dated Nov. 20, 2019, received in Danish Patent Application No. 201802192, which corresponds with U.S. Appl. No. 16/145,039, 10 pages.
Office Action, dated Jul. 1, 2020, received in Danish Patent Application No. 201802192, which corresponds with U.S. Appl. No. 16/145,039, 7 pages.
Office Action, dated Jan. 8, 2021, received in Indian Patent Application No. 201814036861, which corresponds with U.S. Appl. No. 16/145,039, 9 pages.
Office Action, dated Nov. 25, 2019, received in Japanese Patent Application No. 2018-183940, which corresponds with U.S. Appl. No. 16/145,039, 8 pages.
Notice of Allowance, dated Jul. 6, 2020, received in Japanese Patent Application No. 2018-183940, which corresponds with U.S. Appl. No. 16/145,039, 5 pages.
Patent, dated Aug. 6, 2020, received in Japanese Patent Application No. 2018-183940, which corresponds with U.S. Appl. No. 16/145,039, 5 pages.
Office Action, dated Sep. 13, 2021, received in Korean Patent Application No. 2020-7024313, which corresponds with U.S. Appl. No. 16/145,039, 6 pages.
Notice of Allowance, dated Feb. 7, 2022, received in Korean Patent Application No. 2020-7024313, which corresponds with U.S. Appl. No. 16/145,039, 2 pages.
Patent, dated May 9, 2022, received in Korean Patent Application No. 2020-7024313, which corresponds with U.S. Appl. No. 16/145,039, 6 pages.
Office Action, dated Feb. 21, 2019, received in U.S. Appl. No. 16/145,045, 27 pages.
Notice of Allowance, dated Jun. 14, 2019, received in U.S. Appl. No. 16/145,045, 5 pages.
Notice of Allowance, dated Sep. 11, 2019, received in U.S. Appl. No. 16/145,045, 5 pages.
Innovation Patent, dated Sep. 25, 2019, received in Australian Patent Application No. 2019101021, which corresponds with U.S. Appl. No. 16/145,052, 9 pages.
Innovation Patent, dated Oct. 31, 2019, received in Australian Patent Application No. 2019101021, which corresponds with U.S. Appl. No. 16/145,052, 4 pages.
Office Action, dated Aug. 31, 2018, received in Danish Patent Application No. 201870348, which corresponds with U.S. Appl. No. 16/145,045, 10 pages.
Office Action, dated Mar. 14, 2019, received in Danish Patent Application No. 201870348, which corresponds with U.S. Appl. No. 16/145,045, 6 pages.
Office Action, dated Nov. 4, 2019, received in Danish Patent Application No. 201870348, which corresponds with U.S. Appl. No. 16/145,045, 2 pages.
Office Action, dated Jun. 30, 2020, received in Danish Patent Application No. 201870348, which corresponds with U.S. Appl. No. 16/145,045, 4 pages.

(56) References Cited

OTHER PUBLICATIONS

Office Action, dated Jan. 25, 2021, received in Danish Patent Application No. 201870348, which corresponds with U.S. Appl. No. 16/145,045, 4 pages.
Office Action, dated Sep. 28, 2021, received in Danish Patent Application No. 201870348, which corresponds with U.S. Appl. No. 16/145,045, 2 pages.
Intent to Grant, dated Oct. 21, 2021, received in Danish Patent Application No. 201870348, which corresponds with U.S. Appl. No. 16/145,045, 2 pages.
Notice of Allowance, dated Jan. 14, 2022, received in Danish Patent Application No. 201870348, which corresponds with U.S. Appl. No. 16/145,045, 3 pages.
Patent, dated May 12, 2022, received in Danish Patent Application No. 201870348, which corresponds with U.S. Appl. No. 16/145,045, 4 pages.
Office Action, dated Mar. 3, 2023, received in Japanese Patent Application No. 2022-036354, which corresponds with U.S. Appl. No. 16/145,045, 6 pages.
Office Action, dated Feb. 8, 2019, received in U.S. Appl. No. 16/145,052, 29 pages.
Notice of Allowance, dated Jun. 11, 2019, received in U.S. Appl. No. 16/145,052, 15 pages.
Notice of Allowance, dated Aug. 6, 2019, received in U.S. Appl. No. 16/145,052, 8 pages.
Innovation Patent, dated Jan. 8, 2020, received in Australian Patent Application No. 2019101597, which corresponds with U.S. Appl. No. 16/145,052, 4 pages.
Innovation Patent, dated Mar. 13, 2020, received in Australian Patent Application No. 2019101597, which corresponds with U.S. Appl. No. 16/145,052, 1 page.
Office Action, dated Jan. 23, 2023, received in Australian Patent Application No. 2022201389, 4 pages.
Office Action, dated Aug. 14, 2018, received in Danish Patent Application No. 201870349, which coresponds with U.S. Appl. No. 16/145,052, 9 pages.
Office Action, dated Mar. 15, 2019, received in Danish Patent Application No. 201870349, which corresponds with U.S. Appl. No. 16/145,052, 5 pages.
Office Action, dated Nov. 4, 2019, received in Danish Patent Application No. 201870349, which corresponds with U.S. Appl. No. 16/145,052, 4 pages.
Office Action, dated Jun. 29, 2020, received in Danish Patent Application No. 201870349, which corresponds with U.S. Appl. No. 16/145,052, 4 pages.
Office Action, dated Jan. 28, 2021, received in Danish Patent Application No. 201870349, which corresponds with U.S. Appl. No. 16/145,052, 5 pages.
Office Action, dated Nov. 29, 2021, received in Indian Patent Application No. 202017036272, which corresponds with U.S. Appl. No. 16/145,052, 7 pages.
Office Action, dated Oct. 11, 2021, received in Japanese Patent No. 2020-540320, which corresponds with U.S. Appl. No. 16/145,052, 2 pages.
Notice of Allowance, dated Feb. 14, 2022, received in Japanese Patent No. 2020-540320, which corresponds with U.S. Appl. No. 16/145,052, 2 pages.
Patent, dated Mar. 11, 2022, received in Japanese Patent No. 2020-540320, which corresponds with U.S. Appl. No. 16/145,052, 3 pages.
Office Action, dated Jan. 13, 2023, received in Korean Patent Application No. 2022-7015606, which corresponds with U.S. Appl. No. 16/145,052, 11 pages.
Office Action, dated Mar. 22, 2023, received in U.S. Appl. No. 17/372,400, 22 pages.
Office Action, dated Dec. 12, 2022, received in U.S. Appl. No. 17/488,191, 21 pages.
Notice of Allowance, dated Mar. 24, 2023, received in U.S. Appl. No. 17/488,191, 5 pages.
Office Action, dated Sep. 15, 2022, received in Australian Patent Application No. 2021240136, which corresponds with U.S. Appl. No. 16/145,052, 2 pages.
Office Action, dated Jan. 5, 2023, received in Japanese Patent Application No. 2021-158281, which corresponds with U.S. Appl. No. 16/145,052, 5 pages.
Office Action, dated Mar. 16, 2022, received in Korean Patent Application No. 2022-7007567, which corresponds with U.S. Appl. No. 17/488,191, 18 pages.
Final Office Action, dated Nov. 1, 2022, received in Korean Patent Application No. 2022-7007567, which corresponds with U.S. Appl. No. 17/488,191, 3 pages.
International Search Report and Written Opinion, dated Jan. 29, 2019, received in International Patent Application No. PCT/US2018/048884, which corresponds with U.S. Appl. No. 16/116,276, 21 pages.
Invitation to Pay Additional Fees, dated May 22, 2019, received in International Patent Application No. PCT/US2019014791, which corresponds with U.S. Appl. No. 16/145,035, 17 pages.
International Search Report and Written Opinion, dated Aug. 14, 2019, received in International Patent Application No. PCT/US2019/014791, which corresponds with U.S. Appl. No. 16/145,035, 26 pages.
International Preliminary Report on Patentability, dated Jul. 28, 2020, received in International Patent Application No. PCT/US2019/014791, which corresponds with U.S. Appl. No. 16/145,035, 17 pages.
Office Action, dated Feb. 24, 2024, received in Chinese Patent Application No. 2018800553010, which corresponds with U.S. Appl. No. 16/116,276, 2 pages.
Intent to Grant, dated Jul. 4, 2023, received in European Patent Application No. 18778642.1, which corresponds with U.S. Appl. No. 16/116,276, 8 pages.
Intent to Grant, dated Dec. 6, 2023, received in European Patent Application No. 18778642.1, which corresponds with U.S. Appl. No. 16/116,276, 3 pages.
Patent, dated Mar. 15, 2024, received in Indian Patent Application No. 202017010967, which corresponds with U.S. Appl. No. 16/116,276, 4 pages.
Office Action, dated Apr. 24, 2024, received in Chinese Patent Application No. 201811165504.3, which corresponds with U.S. Appl. No. 16/145,039, 2 pages.
Office Action, dated Feb. 26, 2024, received in European Patent Application No. 19704930.7, which corresponds with U.S. Appl. No. 16/145,039, 11 pages.
Patent, dated Dec. 5, 2023, received in Japanese Patent Application No. 2022-036354, which corresponds with U.S. Appl. No. 16/145,045,36 pages.
Notice of Allowance, dated Sep. 20, 2023, received in Australian Patent Application No. 2022201389, 5 pages.
Certificate of Grant, dated Jan. 25, 2024, received in Australian Patent Application No. 2022201389, 3 pages.
Office Action, dated Apr. 3, 2024, received in Chinese Patent Application No. 201980010176.6, which corresponds with U.S. Appl. No. 16/145,052, 2 pages.
Patent, dated May 22, 2024, received in Indian Patent Application No. 202017036272, which corresponds with U.S. Appl. No. 16/145,052, 3 pages.
Office Action, dated Nov. 13, 2023, received in Korean Patent Application No. 2022-7015606, which corresponds with U.S. Appl. No. 16/145,052, 5 pages.
Notice of Allowance, dated Apr. 23, 2024, received in Korean Patent Application No. 2022-7015606, which corresponds with U.S. Appl. No. 16/145,052, 3 pages.
Final Office Action, dated Sep. 29, 2023, received in U.S. Appl. No. 17/372,400, 23 pages.
Notice of Allowance, dated Feb. 15, 2024, received in U.S. Appl. No. 17/372,400, 7 pages.
Notice of Allowance, dated Jun. 5, 2024, received in U.S. Appl. No. 17/372,400, 5 pages.
Notice of Allowance, dated Apr. 26, 2023, received in Australian Patent Application No. 2021240136, which corresponds with U.S. Appl. No. 16/145,052, 3 pages.

(56) References Cited

OTHER PUBLICATIONS

Patent, dated Aug. 24, 2023, received in Australian Patent Application No. 2021240136, which corresponds with U.S. Appl. No. 16/145,052, 3 pages.
Notice of Allowance, dated Jul. 3, 2023, received in Japanese Patent Application No. 2021-158281, which corresponds with U.S. Appl. No. 16/145,052, 2 pages.
Patent, dated Aug. 2, 2023, received in Japanese Patent Application No. 2021-158281, which corresponds with U.S. Appl. No. 16/145,052, 3 pages.
Patent, dated May 31, 2023, received in Korean Patent Application No. 2022-7007567, which corresponds with U.S. Appl. No. 17/488,191, 3 pages.
Office Action, dated May 21, 2024, received in Australian Patent Application No. 2023203200, which corresponds with U.S. Appl. No. 18/140,557, 3 pages.
Office Action, dated Jun. 24, 2024, received in Japanese Patent Application No. 2023-124668, which corresponds with U.S. Appl. No. 18/140,557, 5 pages.
Notice of Allowance, dated Oct. 19, 2023, received in Korean Patent Application No. 2023-7018429, which corresponds with U.S. Appl. No. 18/140,557, 2 pages.
Patent, dated Nov. 22, 2023, received in Korean Patent Application No. 2023-7018429, which corresponds with U.S. Appl. No. 18/140,557, 5 pages.
Extended European Search Report, dated Jun. 11, 2024, received in European Patent Application No. 24158812.8, 10 pages.
Notice of Allowance, dated Sep. 29, 2024, received in Chinese Patent Application No. 201911078900.7, which corresponds with U.S. Appl. No. 16/145,039, 3 pages.
Notice of Allowance, dated Mar. 6, 2025, received in Chinese Patent Application No. 201980010176.6, which corresponds with U.S. Appl. No. 16/145,052, 2 pages.
Office action, dated Mar. 26, 2025, received in Indian Patent Application No. 2022-18018979 (which corresponds with U.S. Appl. No. 16/145,052, 14 pages.
Patent, dated Jan. 24, 2025, received in 2023-7017055, which corresponds with U.S. Appl. No. 17/549,804, 4 pages.
Grant Certificate, dated Apr. 17, 2025, received in Australian Patent Application No. 2023203200, which corresponds with U.S. Appl. No. 18/140,557, 3 pages.
Notice of Allowance, dated Oct. 28, 2024, received in Japanese Patent Application No. 2023-124668, which corresponds with U.S. Appl. No. 18/140,557, 2 pages.
Patent, dated Nov. 12, 2024, received in Japanese Patent Application No. 2023-124668, which corresponds with U.S. Appl. No. 18/140,557, 5 pages.
Patent, dated Jan. 23, 2025, received in Japanese Patent Application No. 2023-204027, which corresponds with U.S. Appl. No. 18/631,905, 5 pages.

* cited by examiner

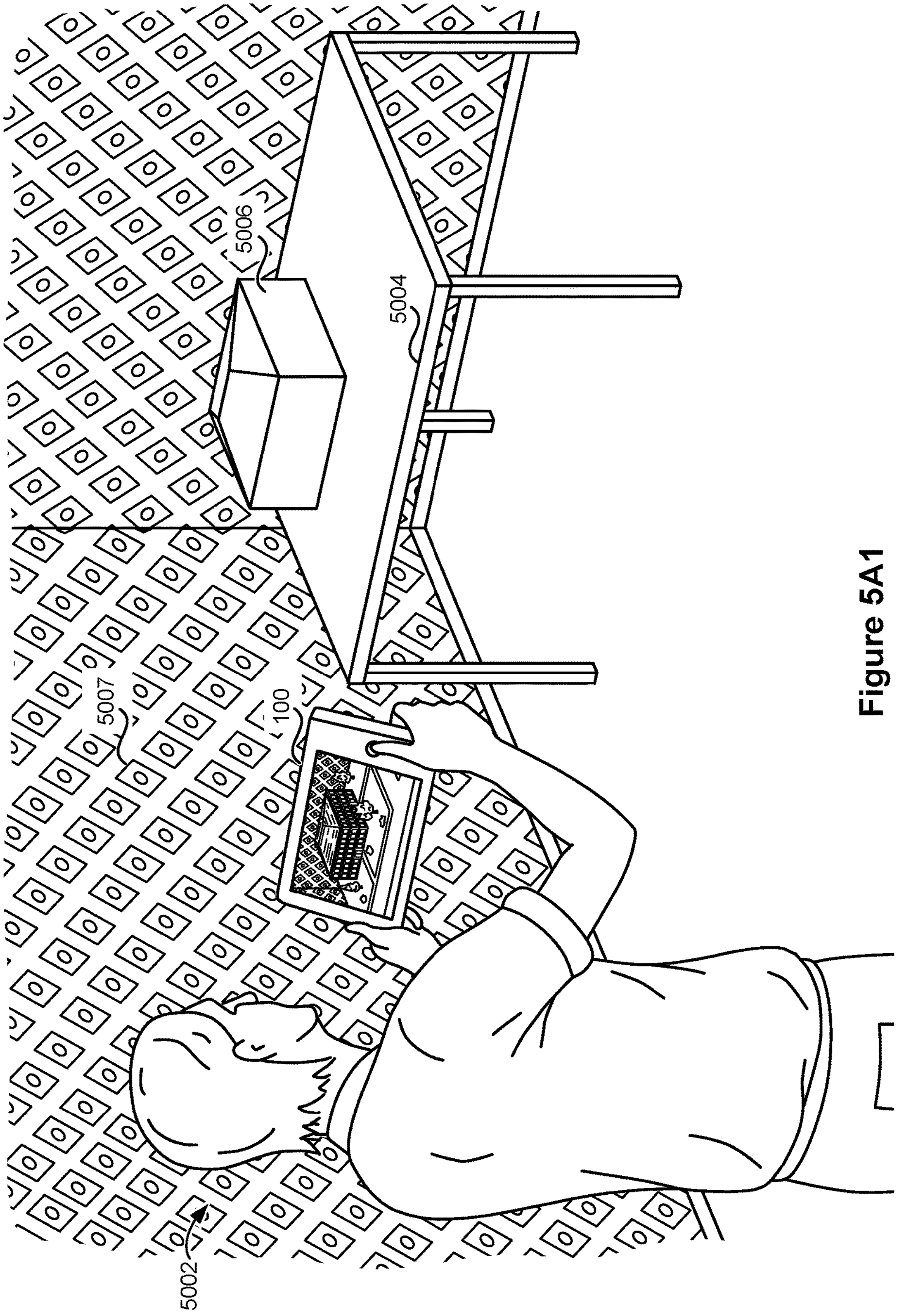
Figure 5A1

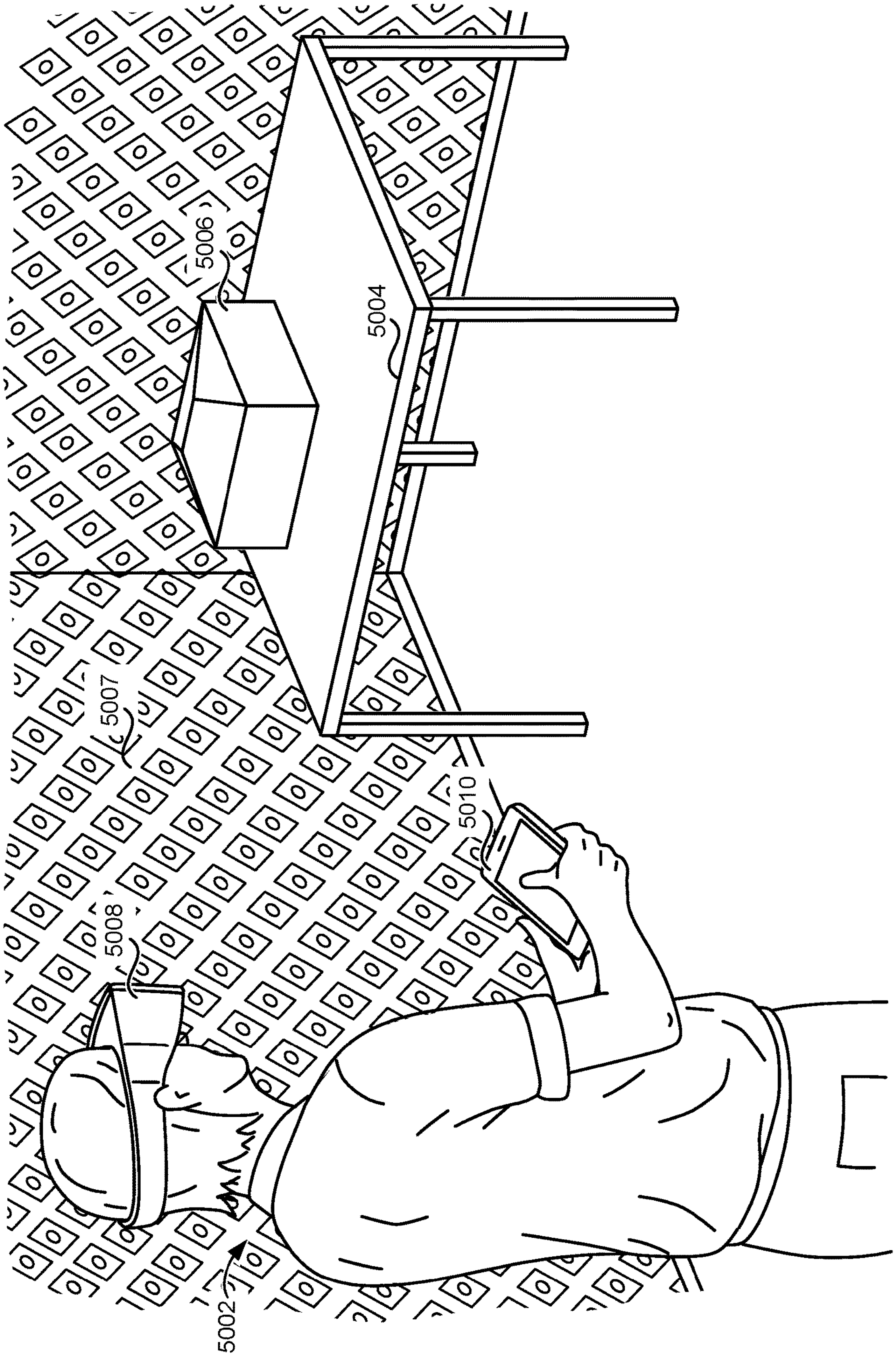
Figure 5A2

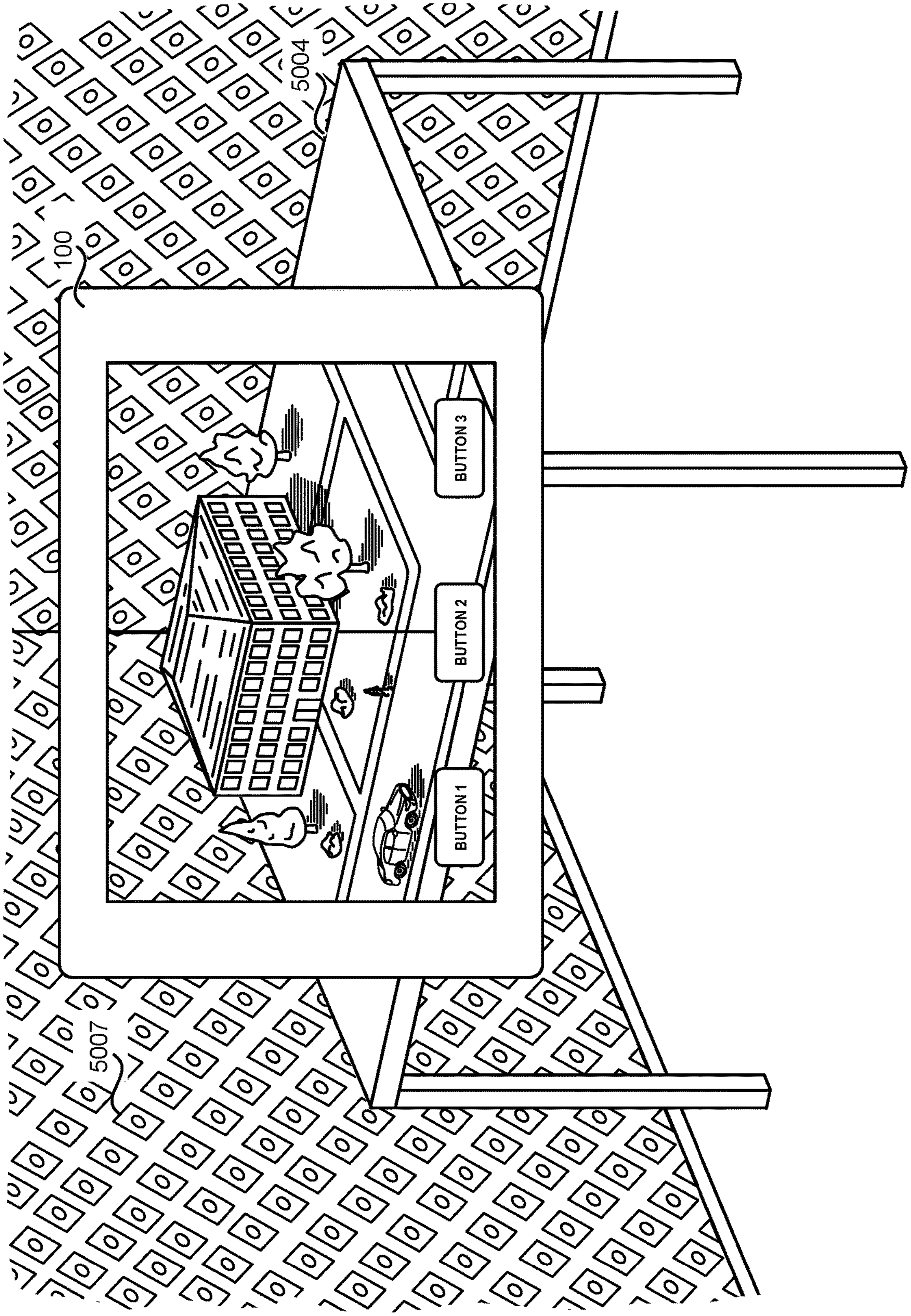
Figure 5A3

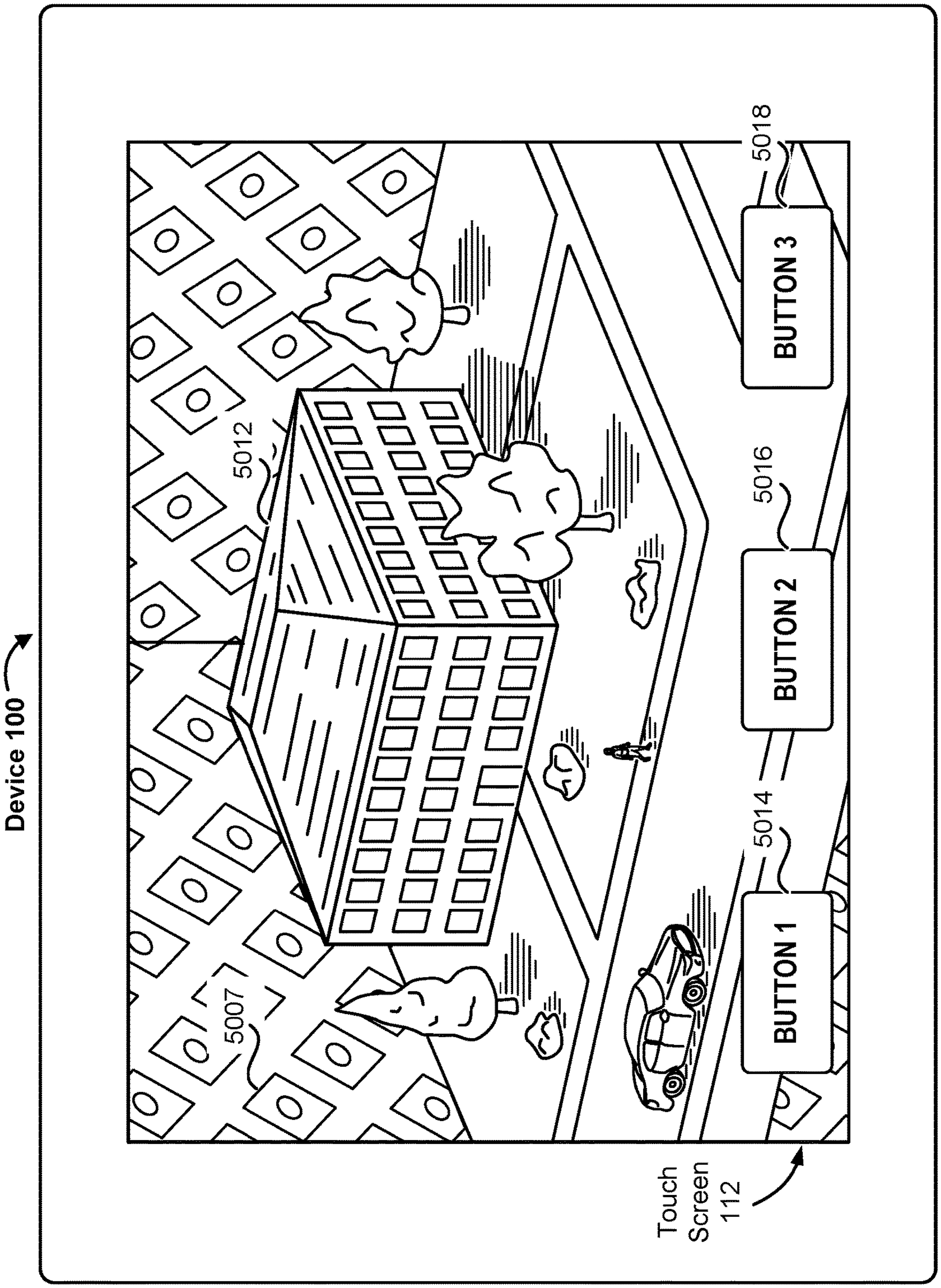
Figure 5A4

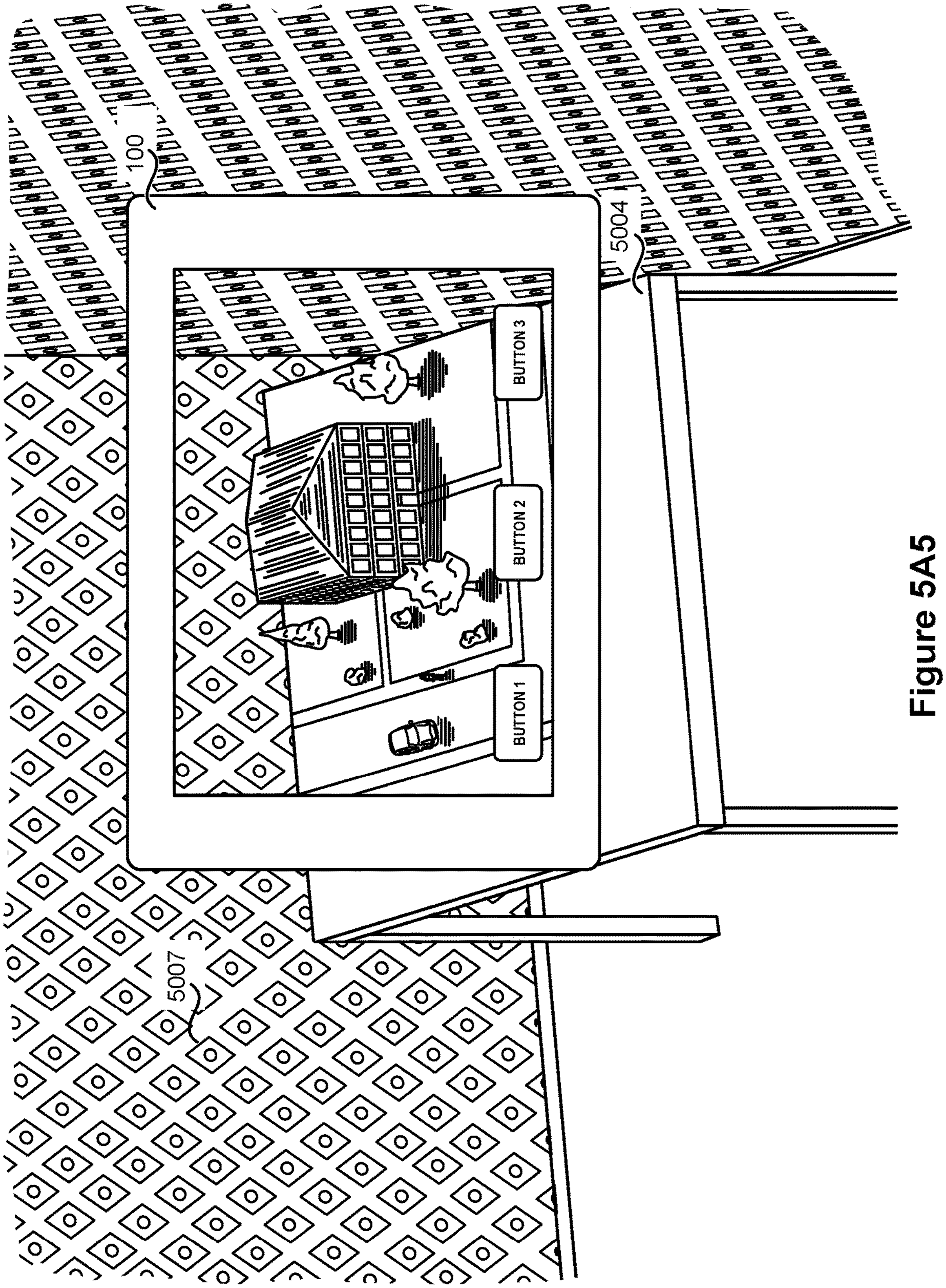
Figure 5A5

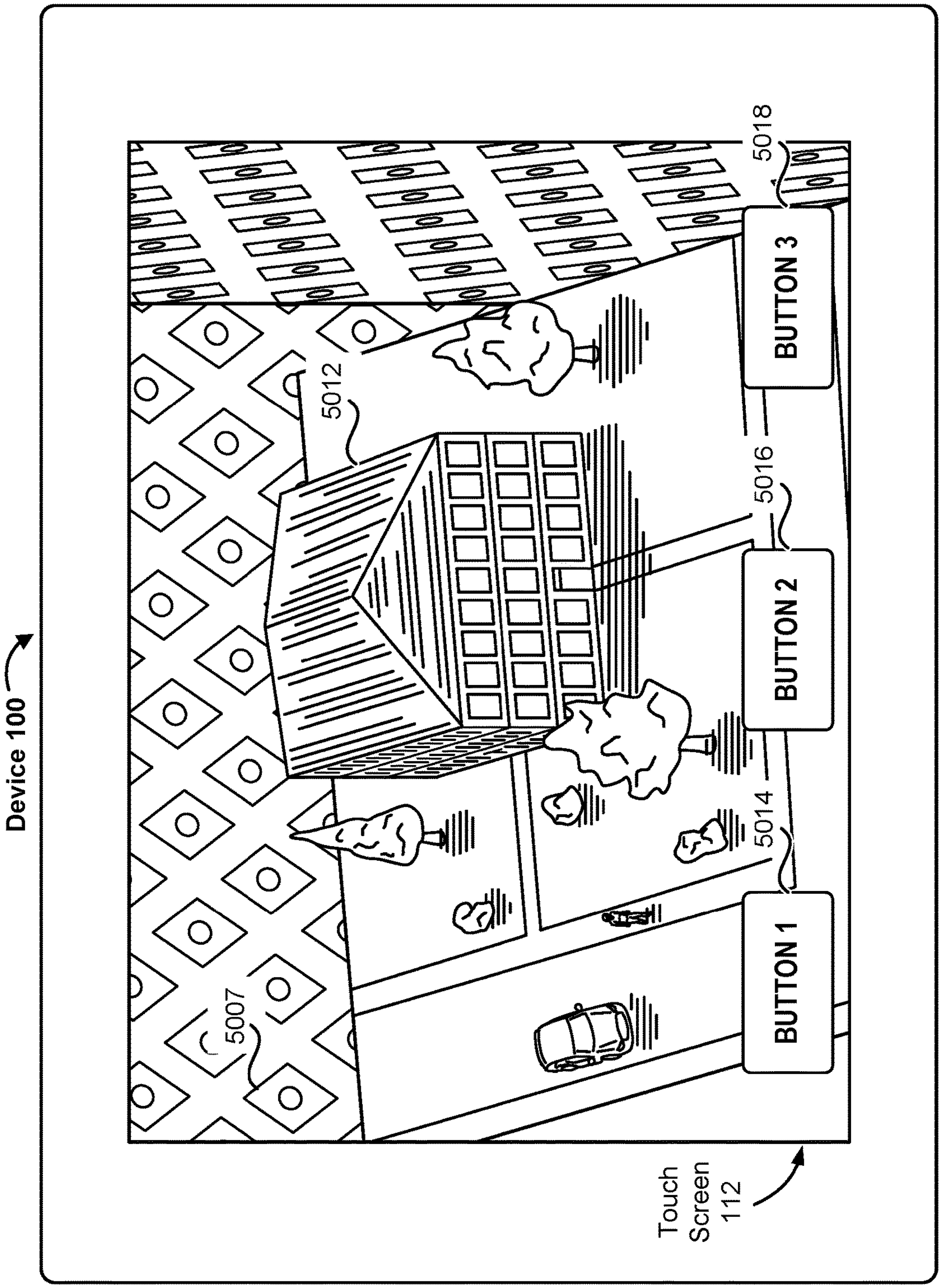
Figure 5A6

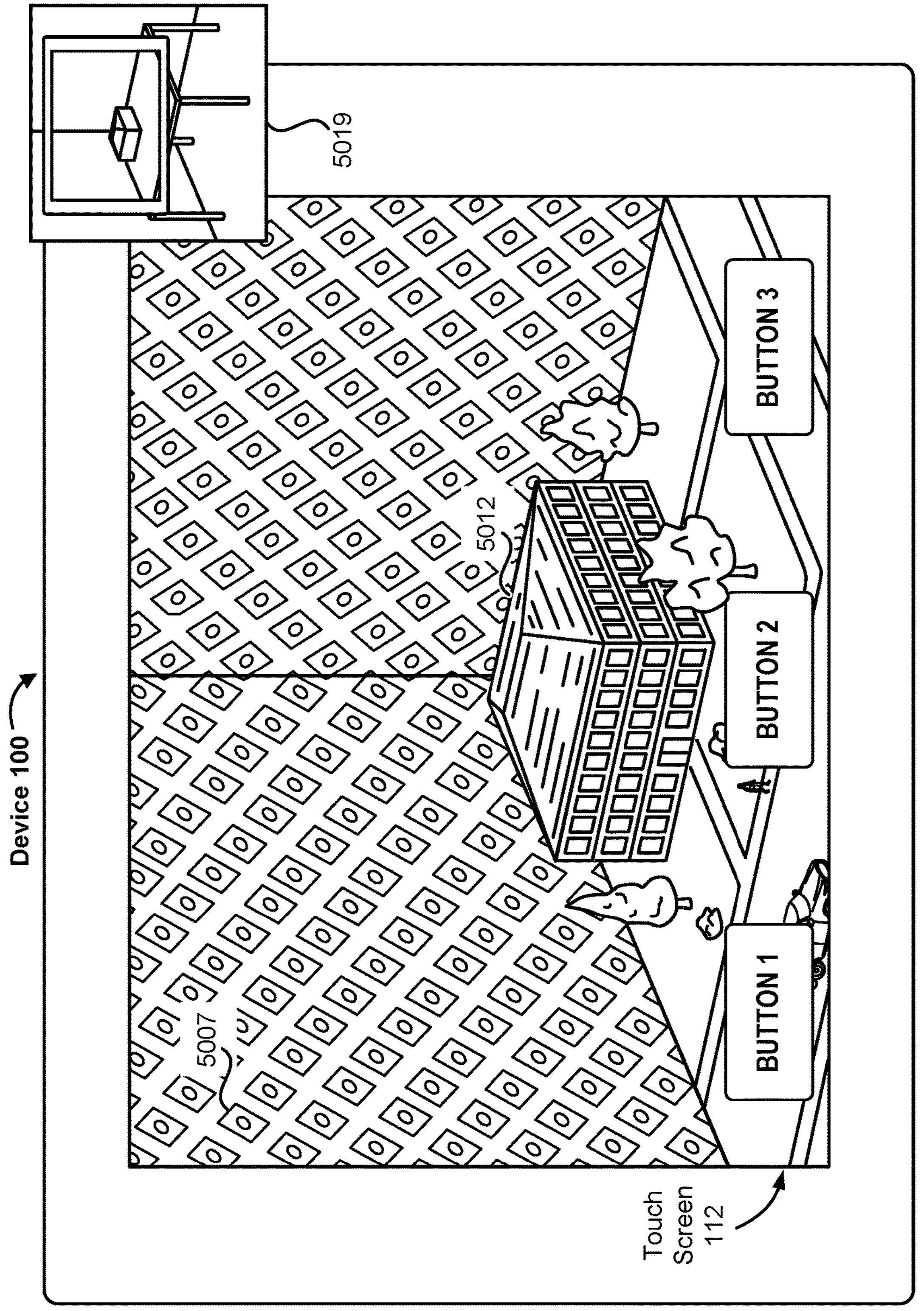
Figure 5A7

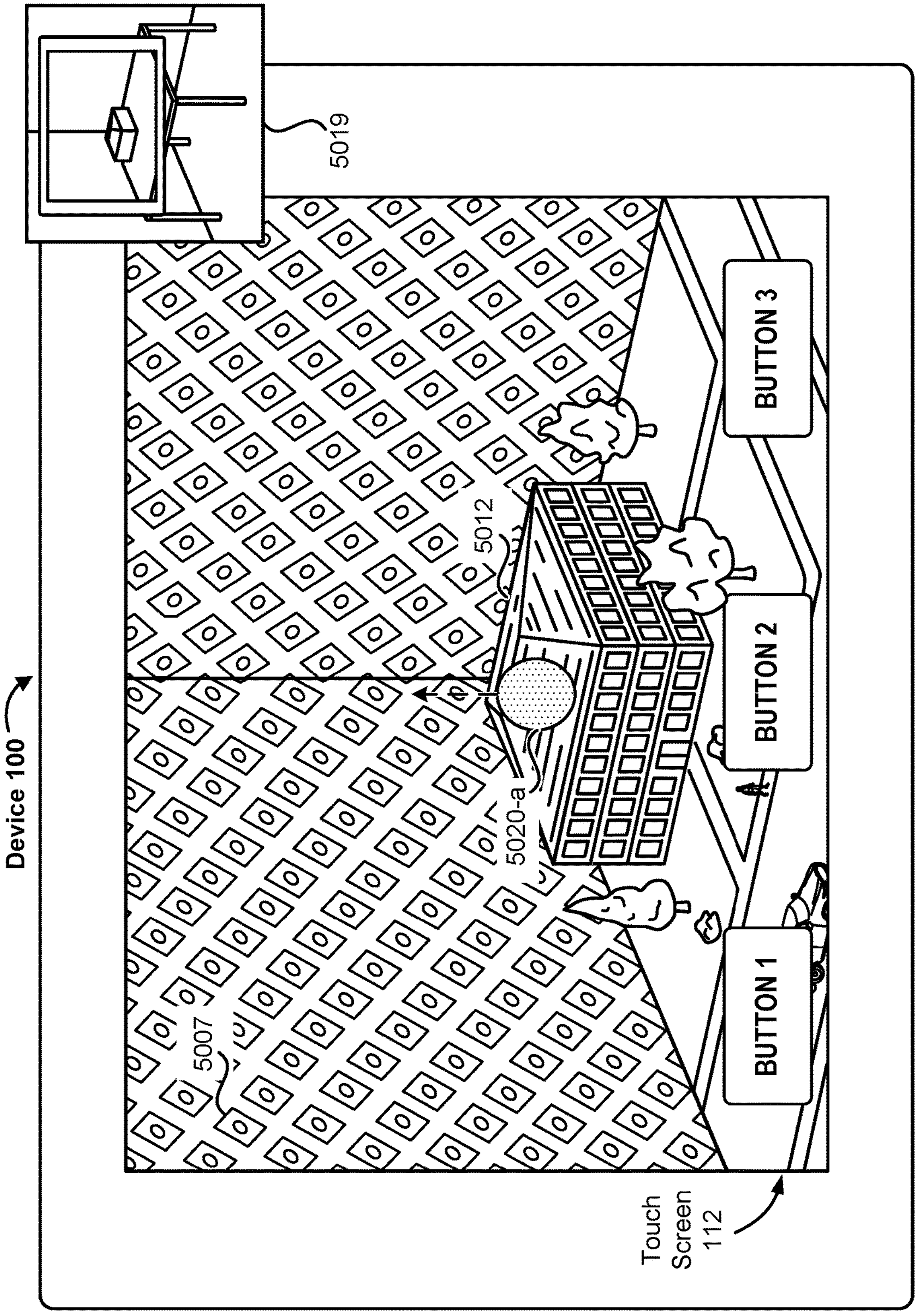
Figure 5A8

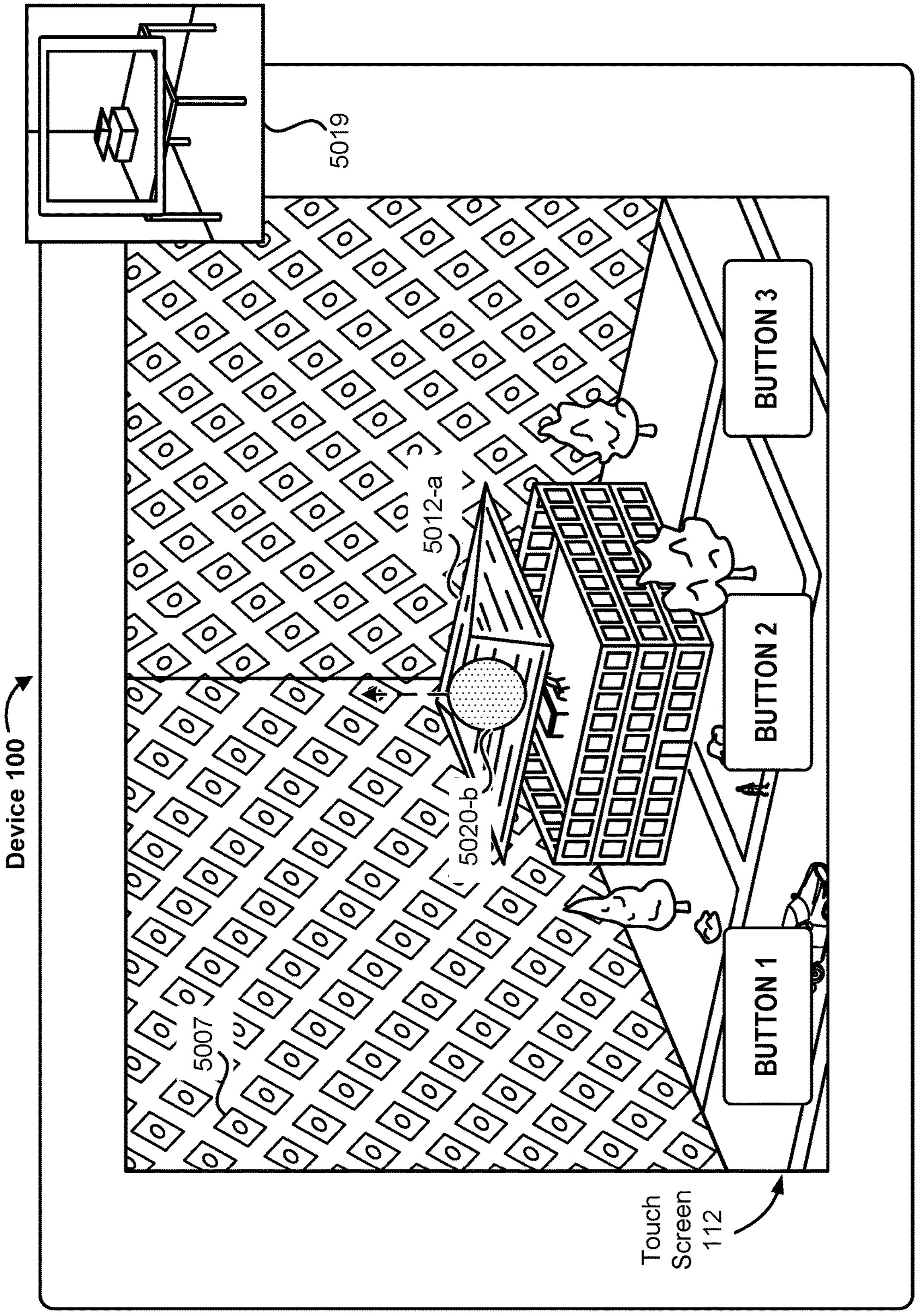
Figure 5A9

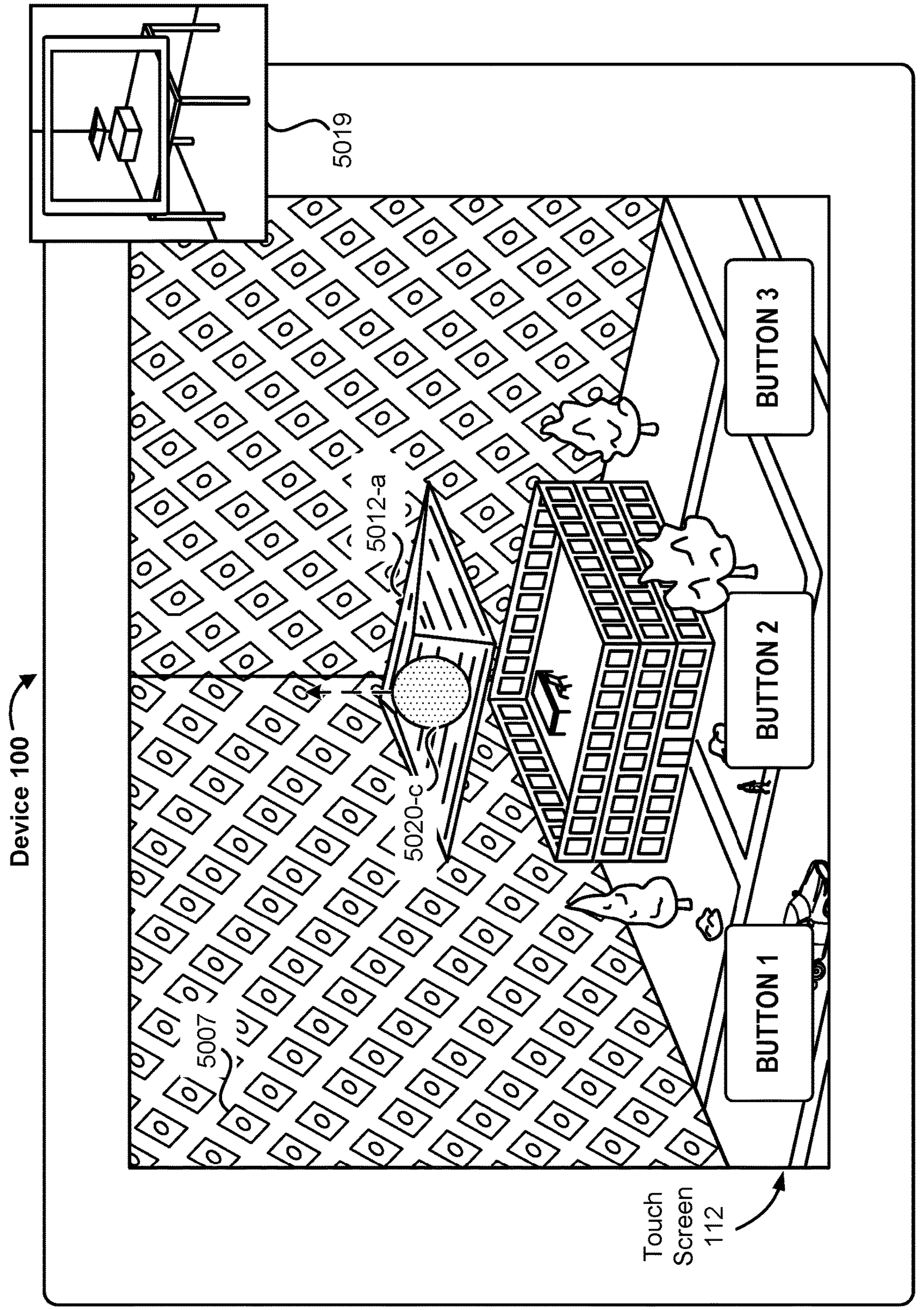
Figure 5A10

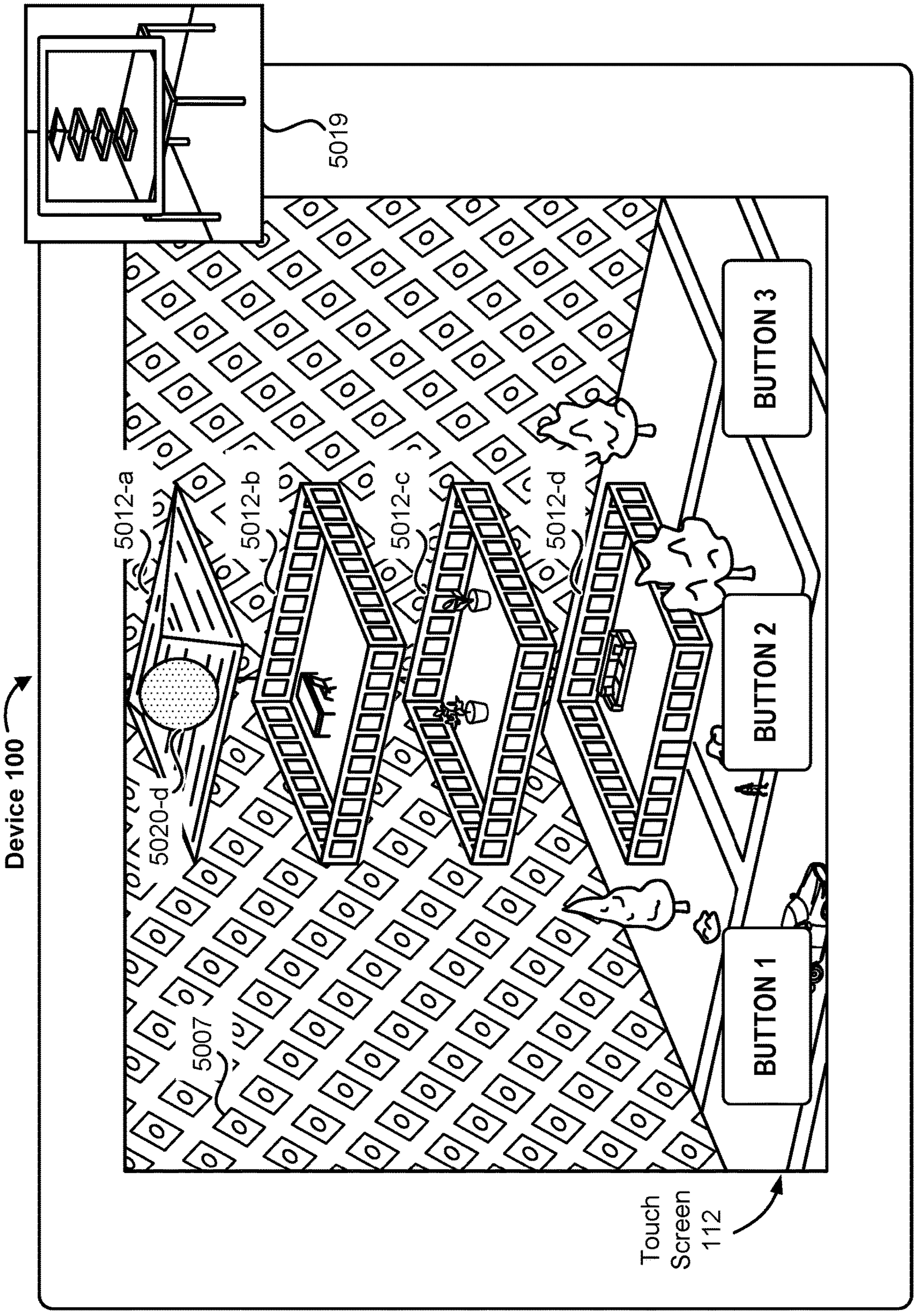
Figure 5A11

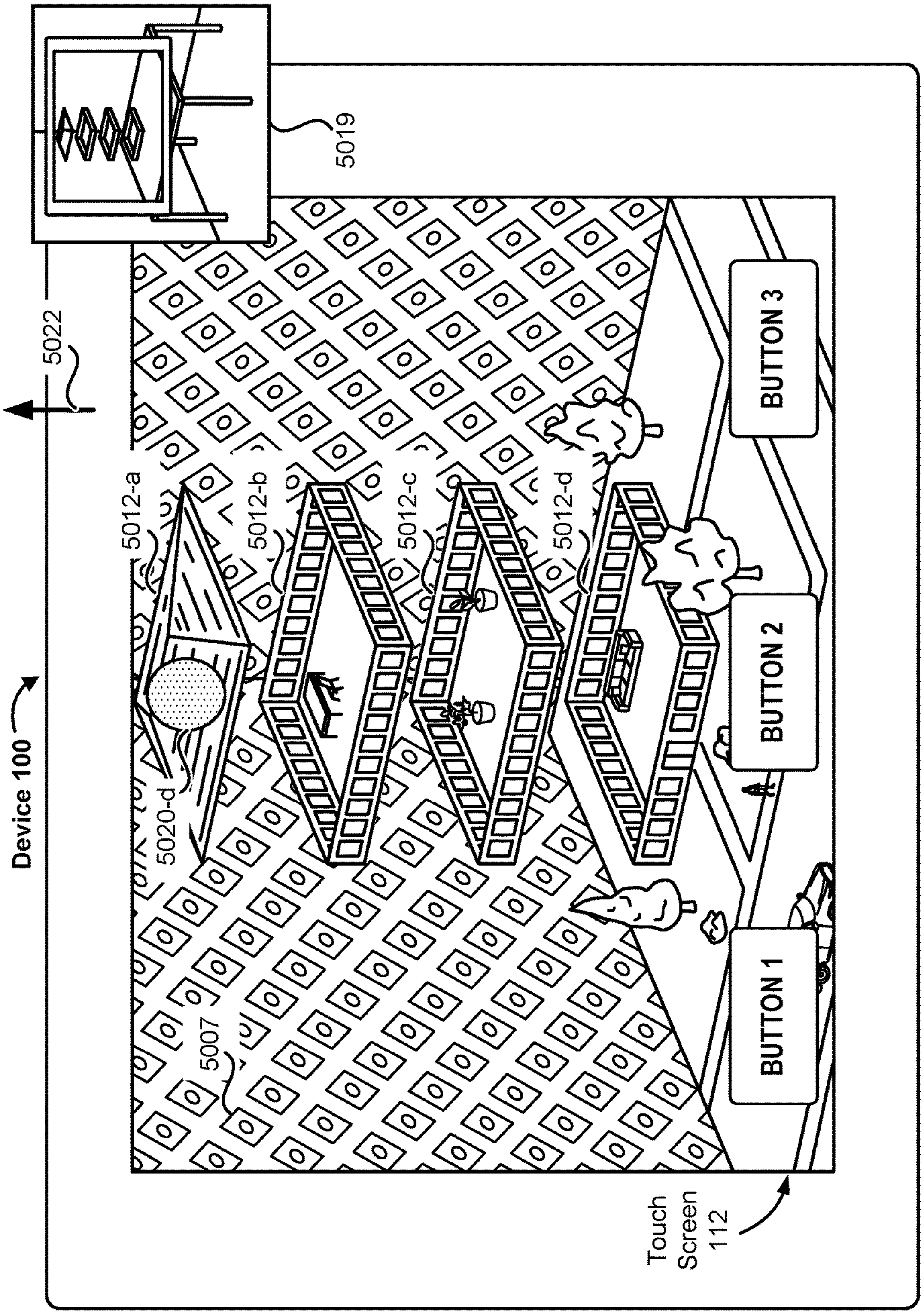
Figure 5A12

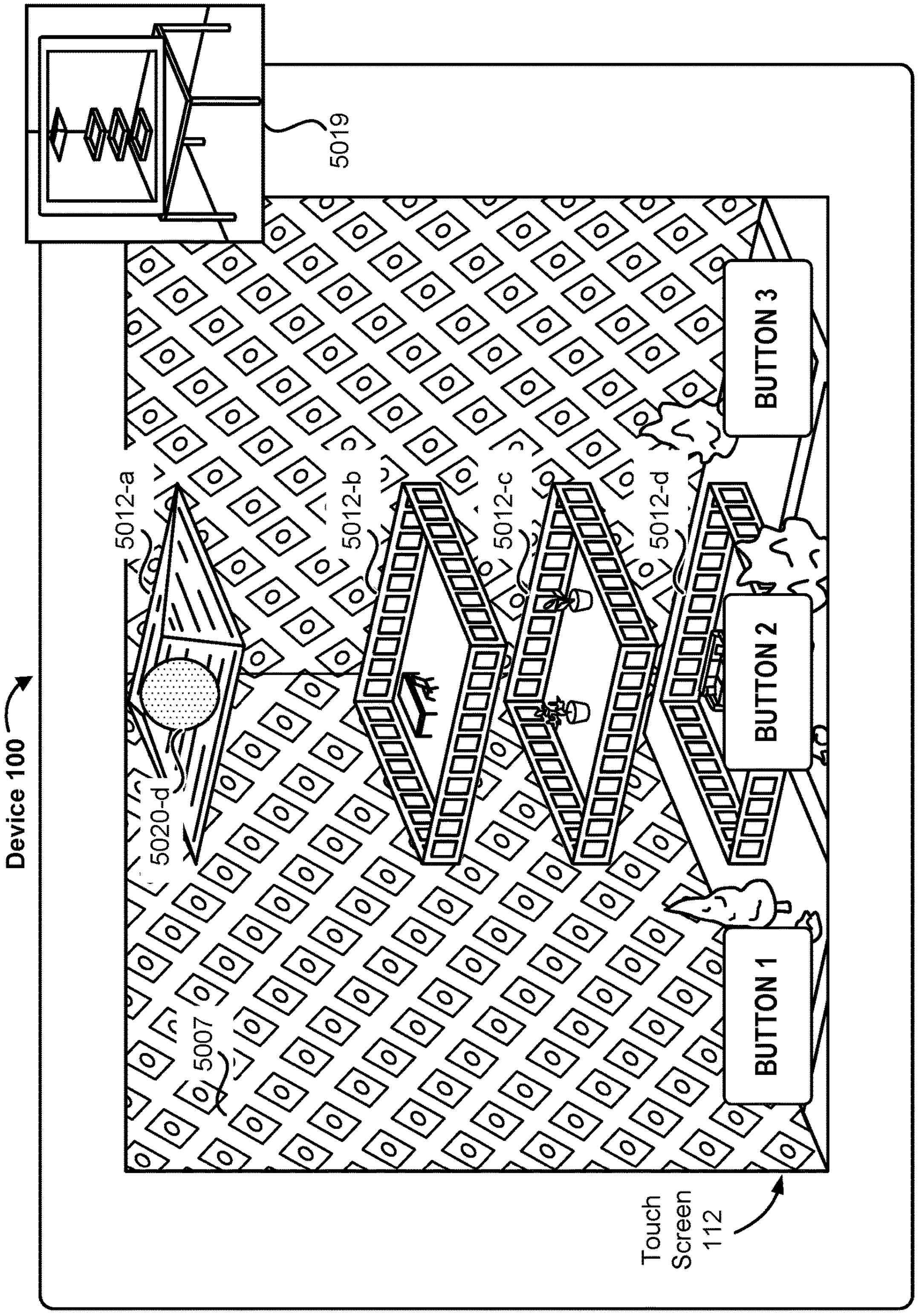
Figure 5A13

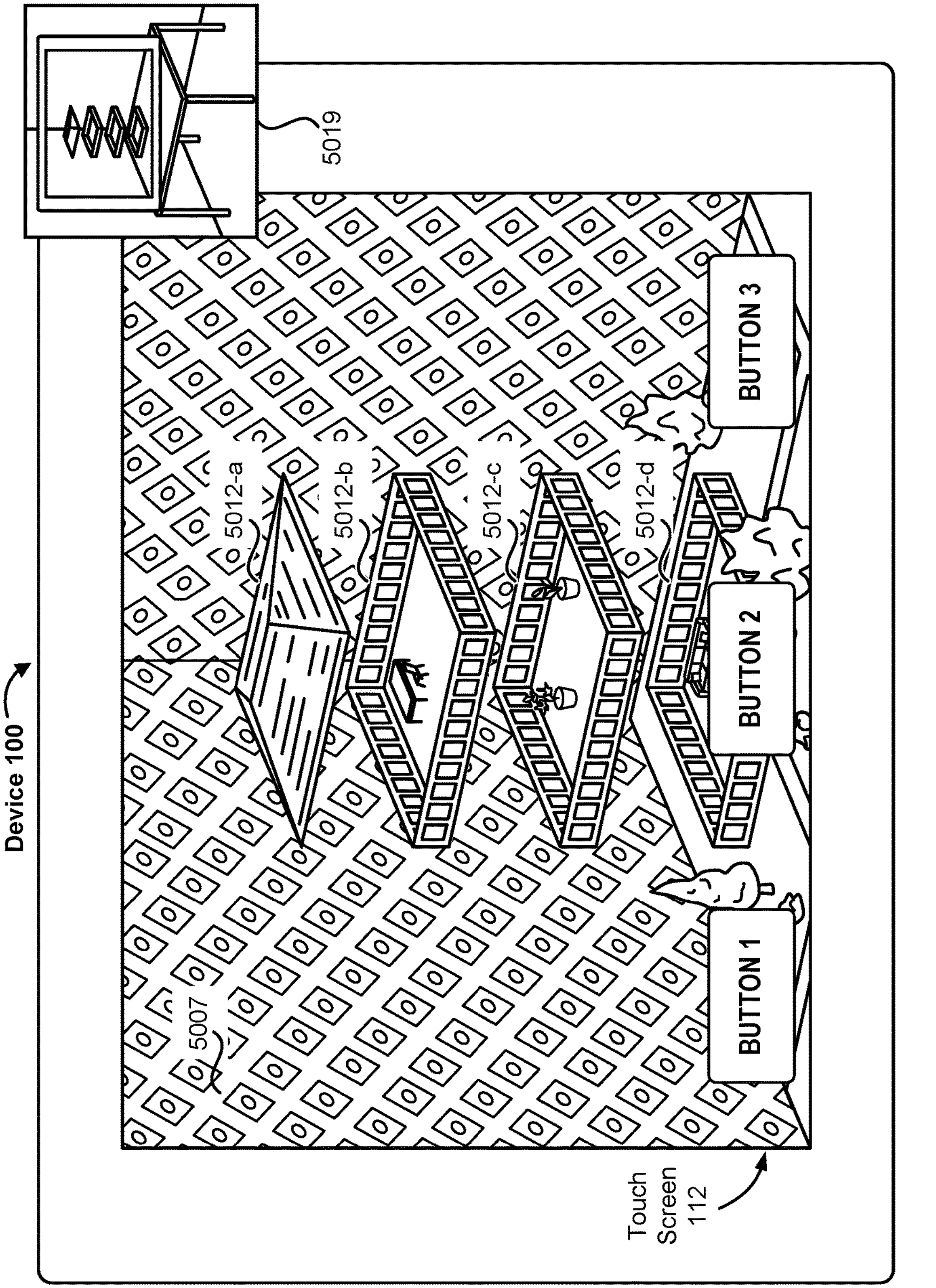
Figure 5A14

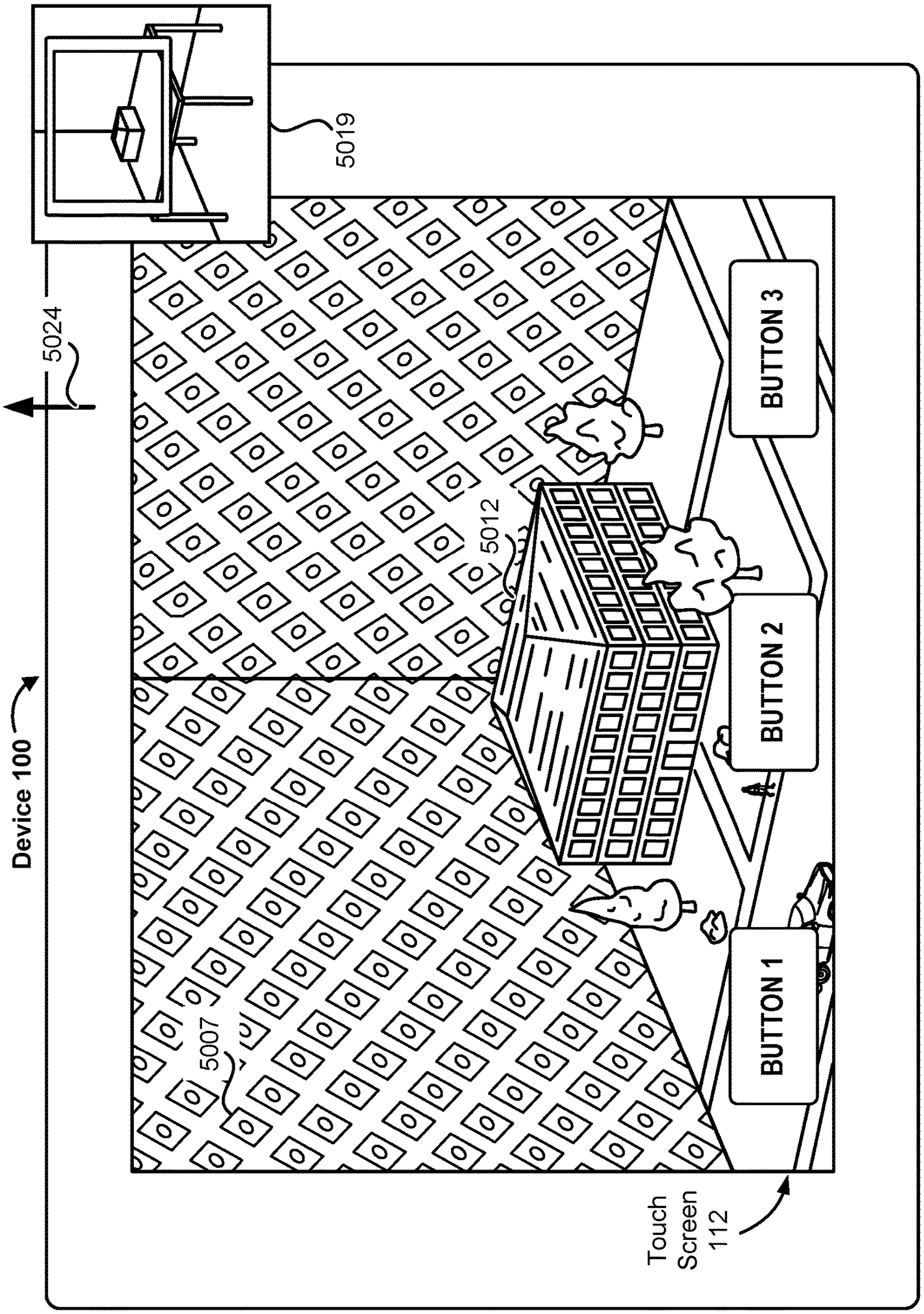
Figure 5A15

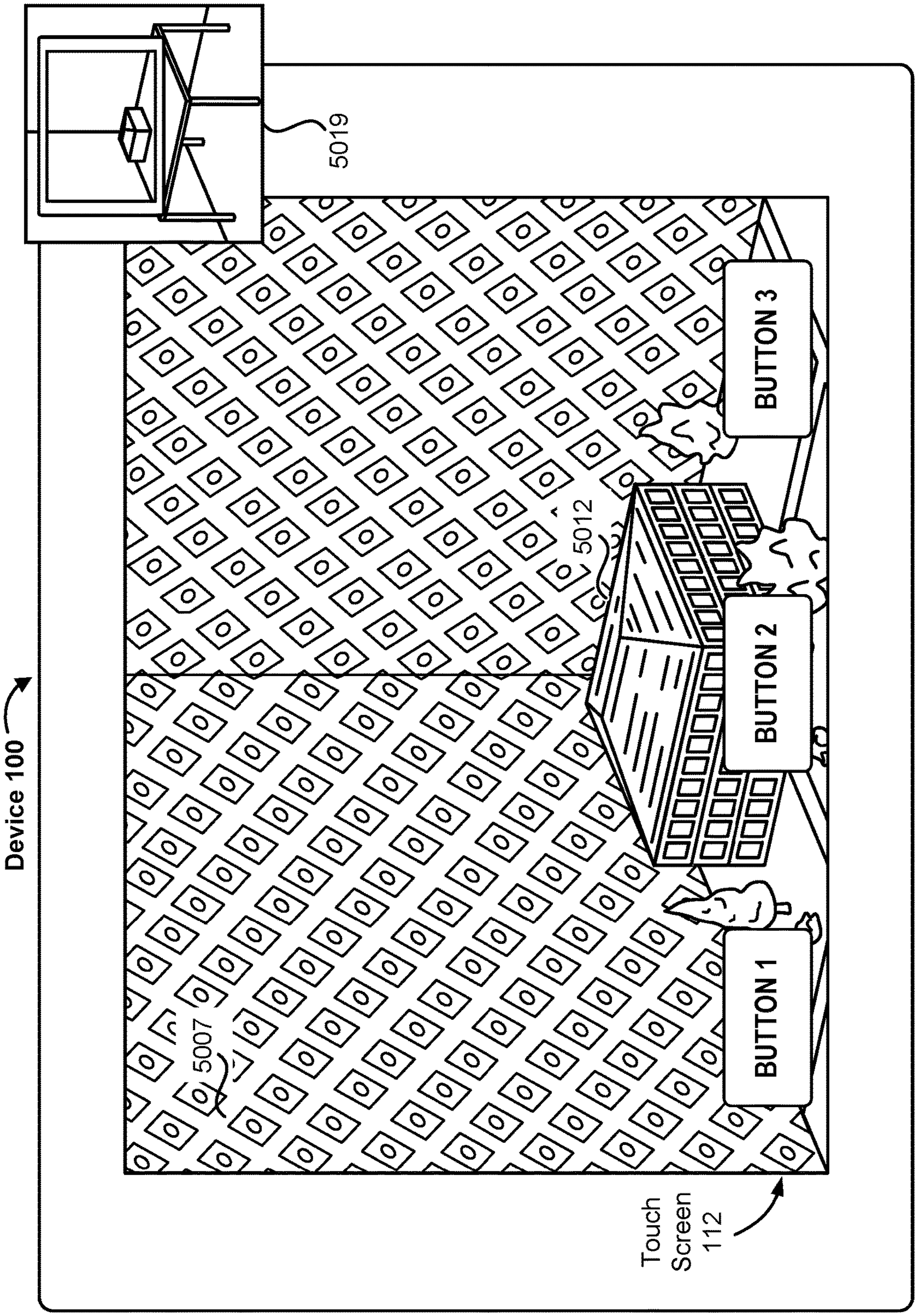
Figure 5A16

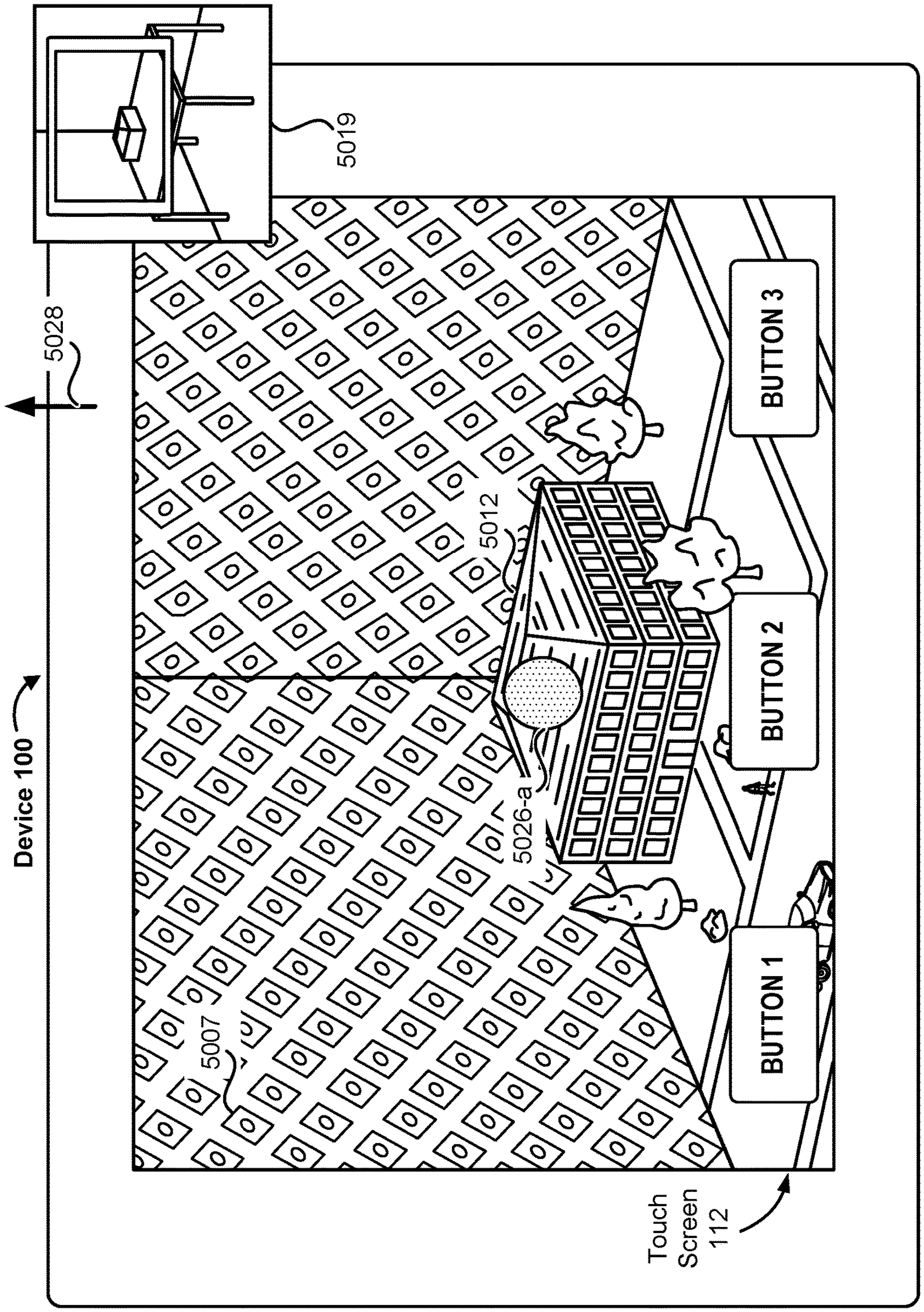
Figure 5A17

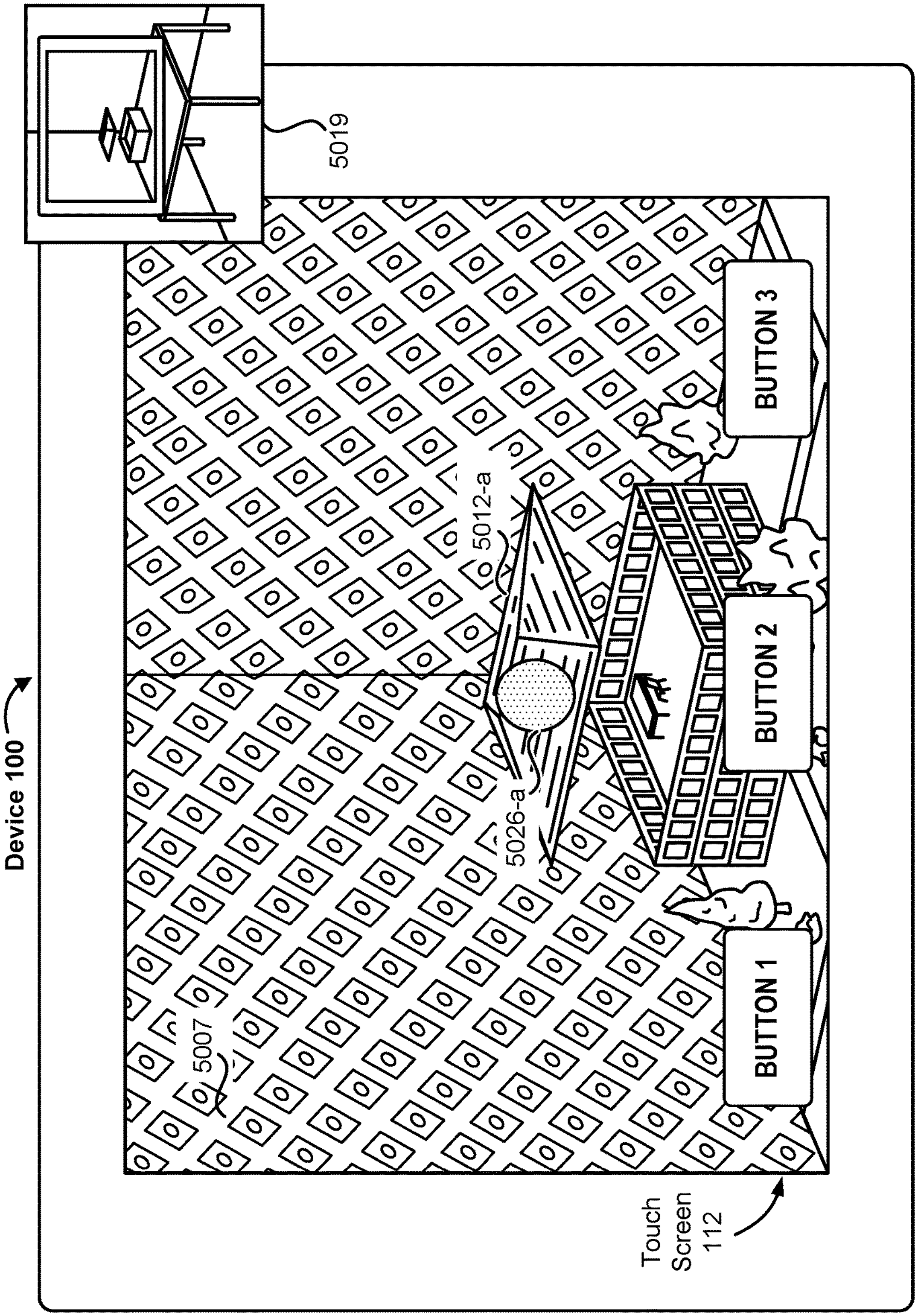
Figure 5A18

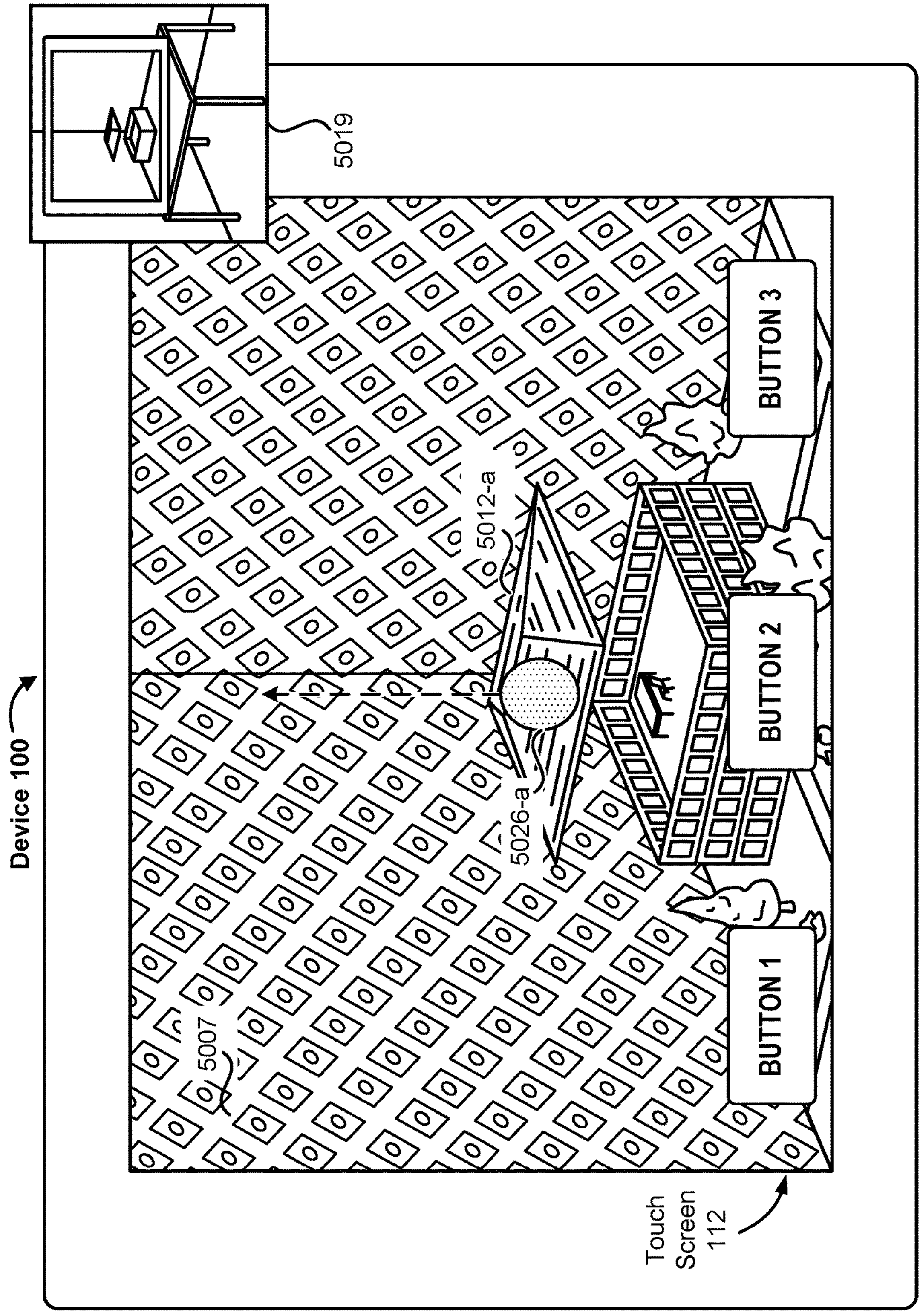
Figure 5A19

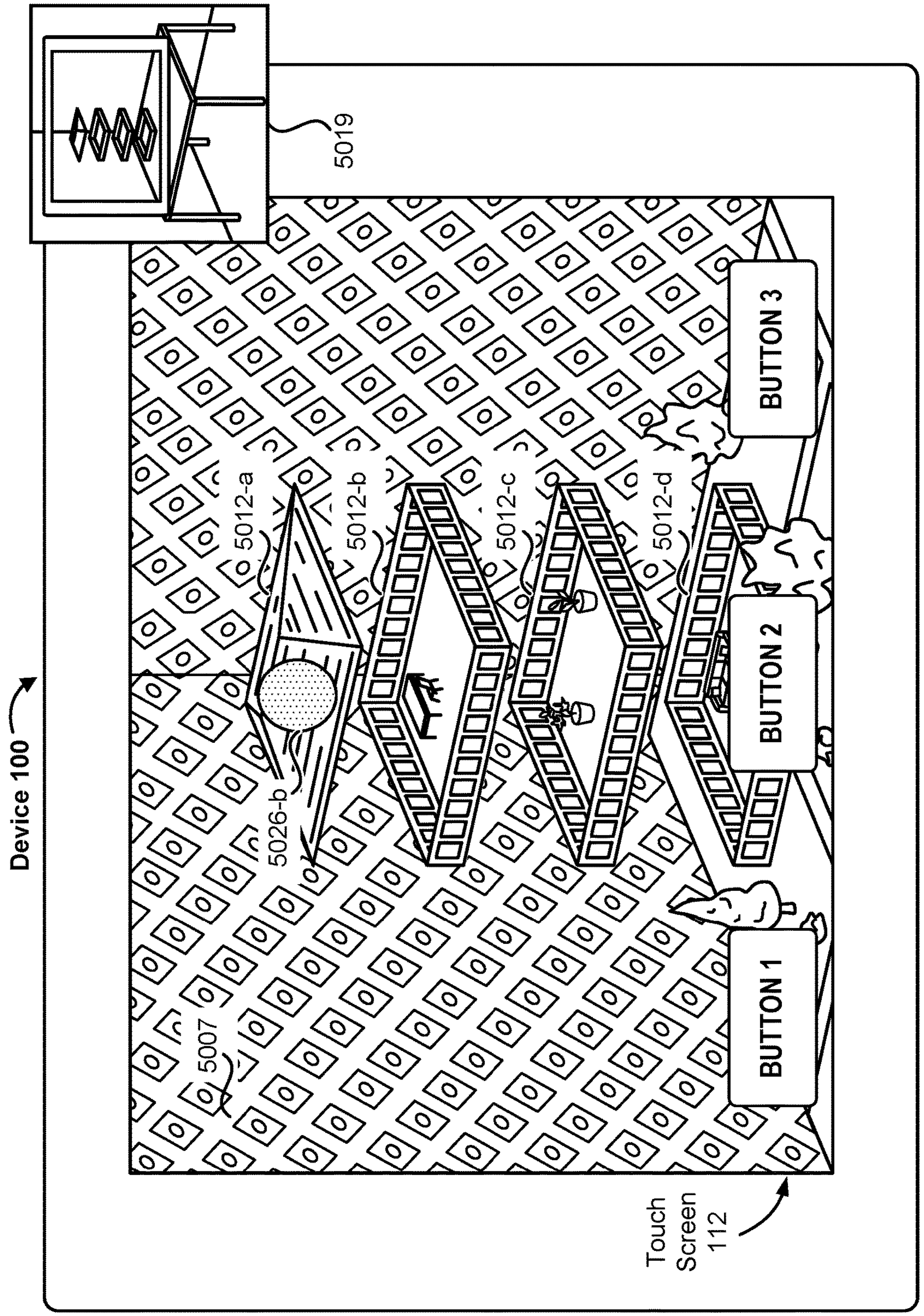
Figure 5A20

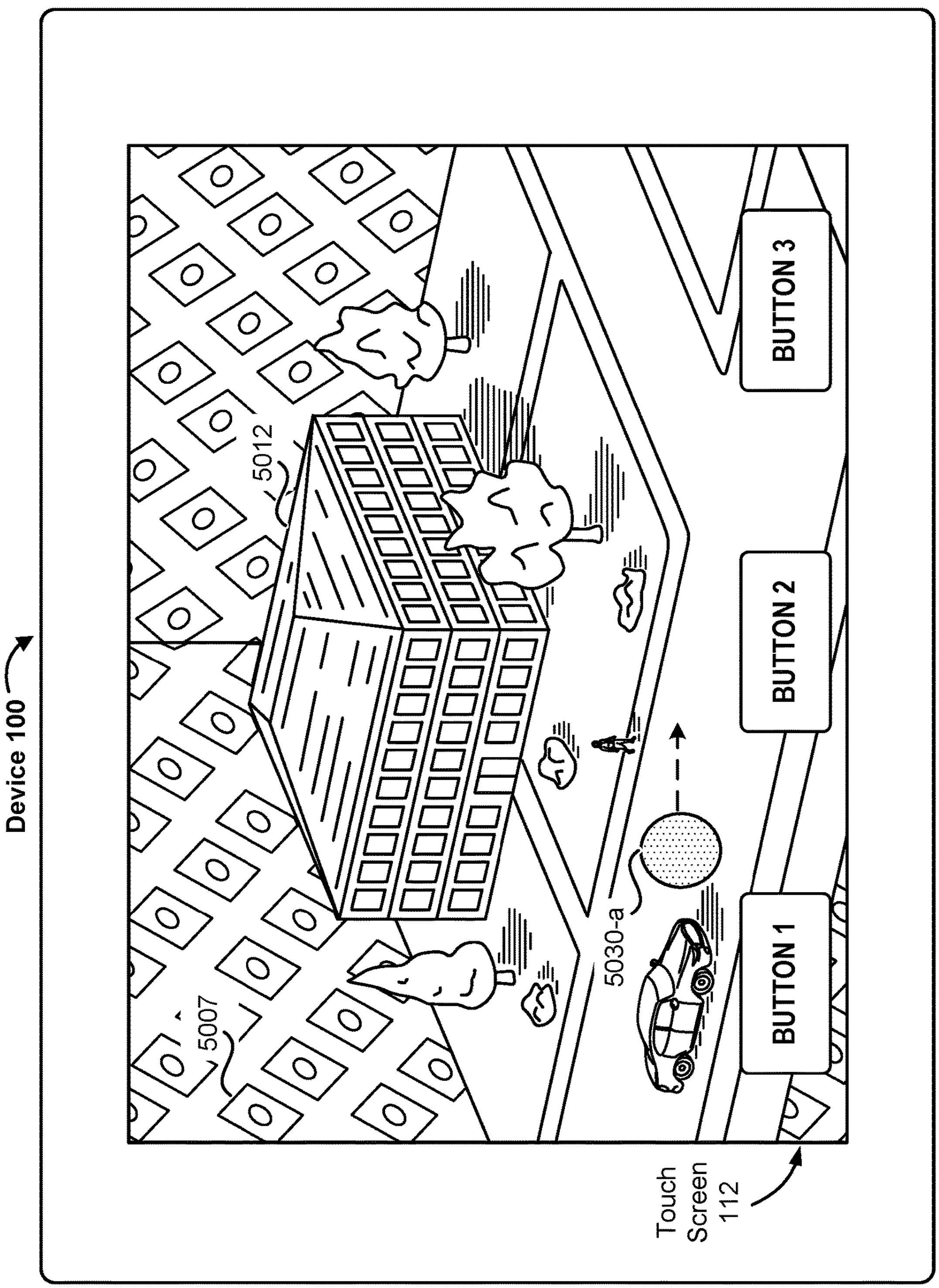
Figure 5A21

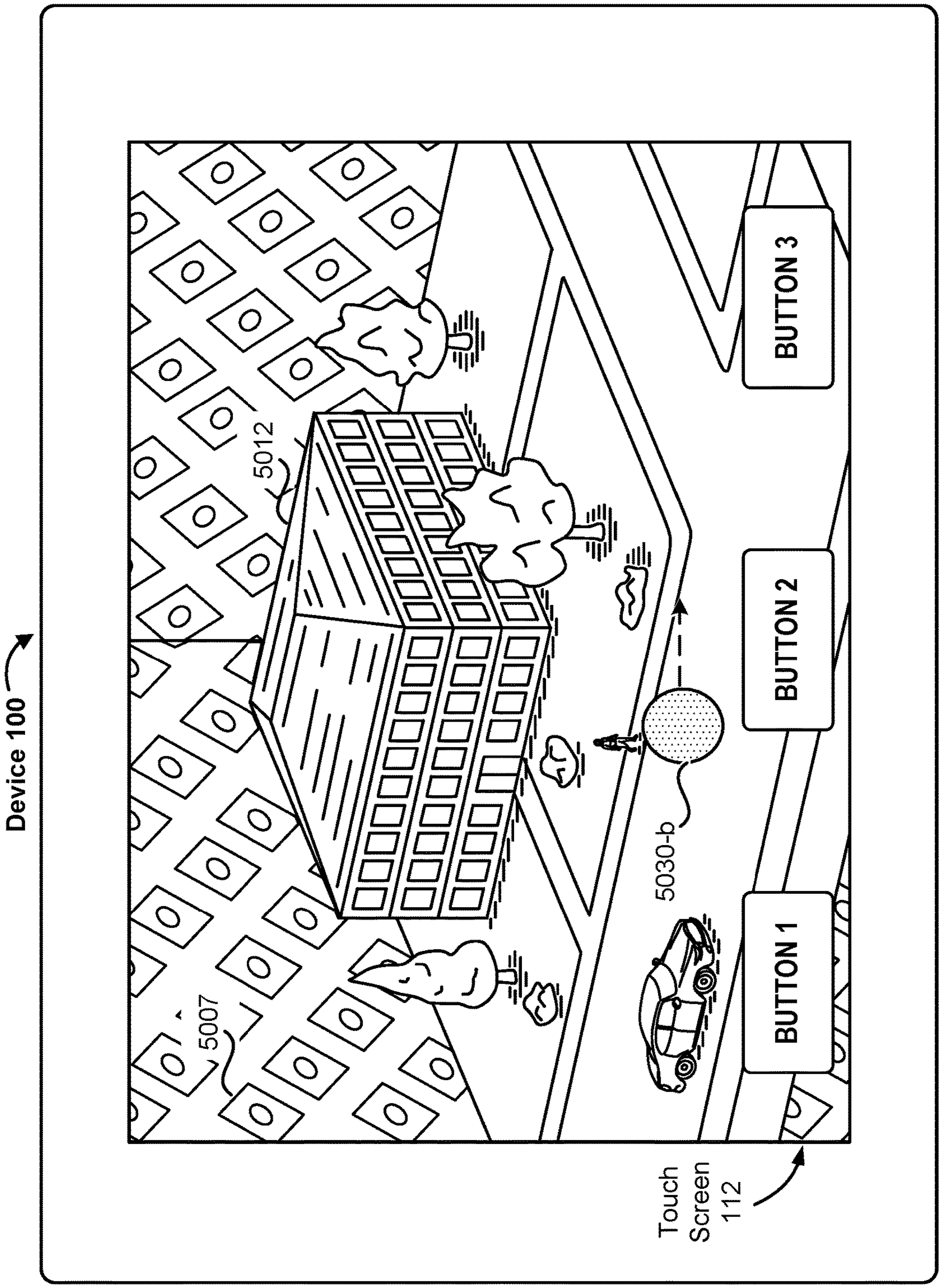
Figure 5A22

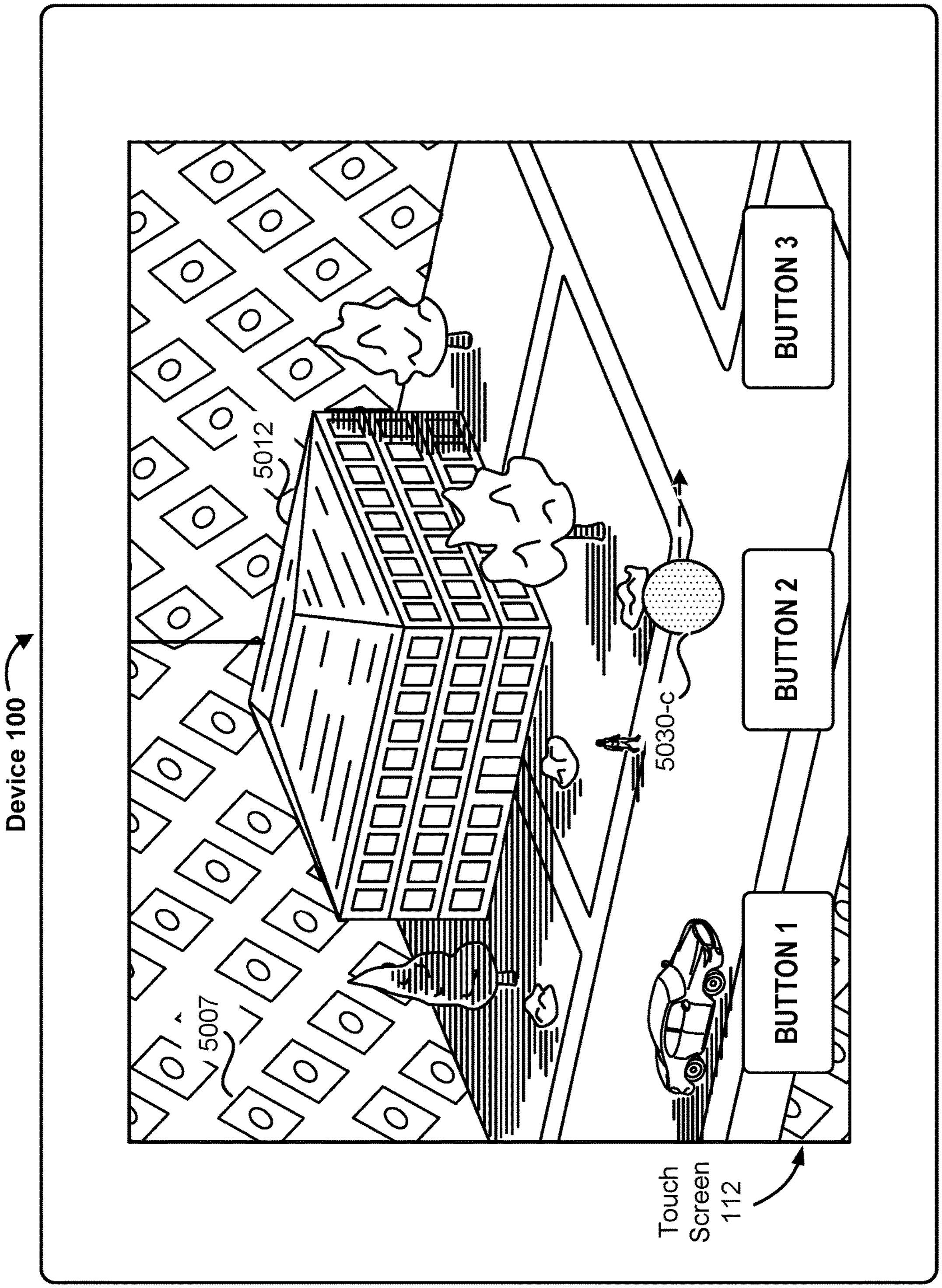
Figure 5A23

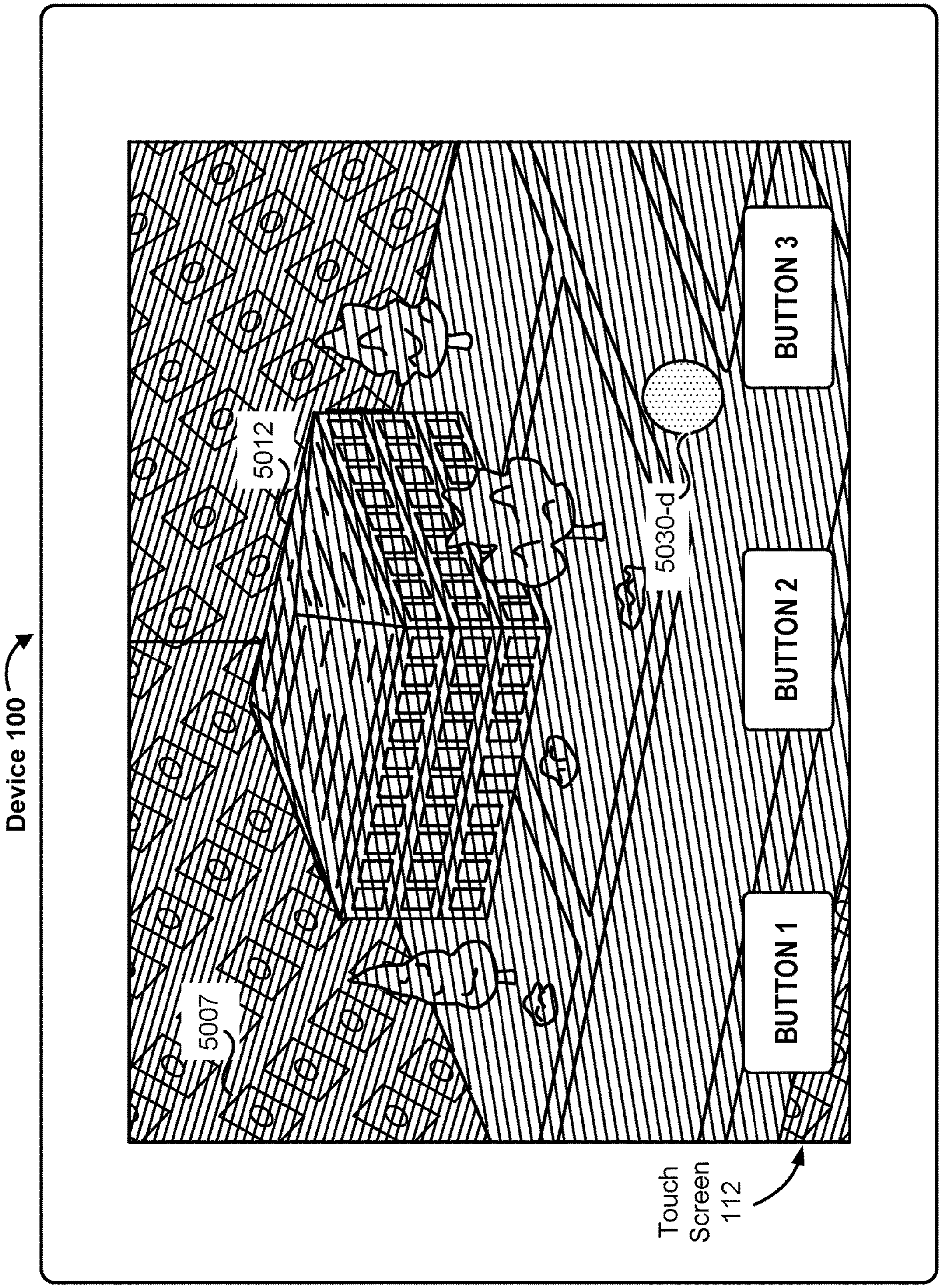
Figure 5A24

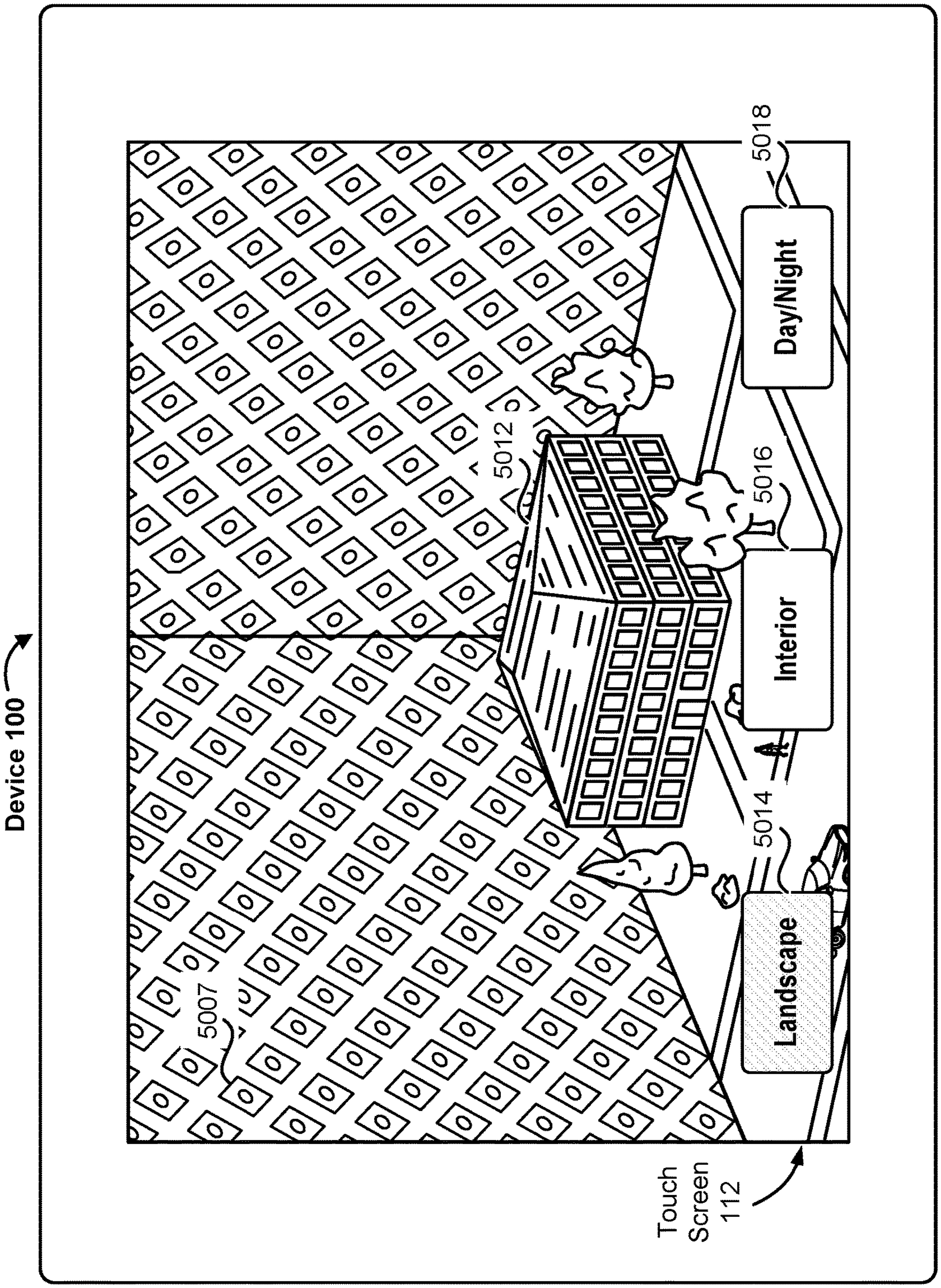
Figure 5A25

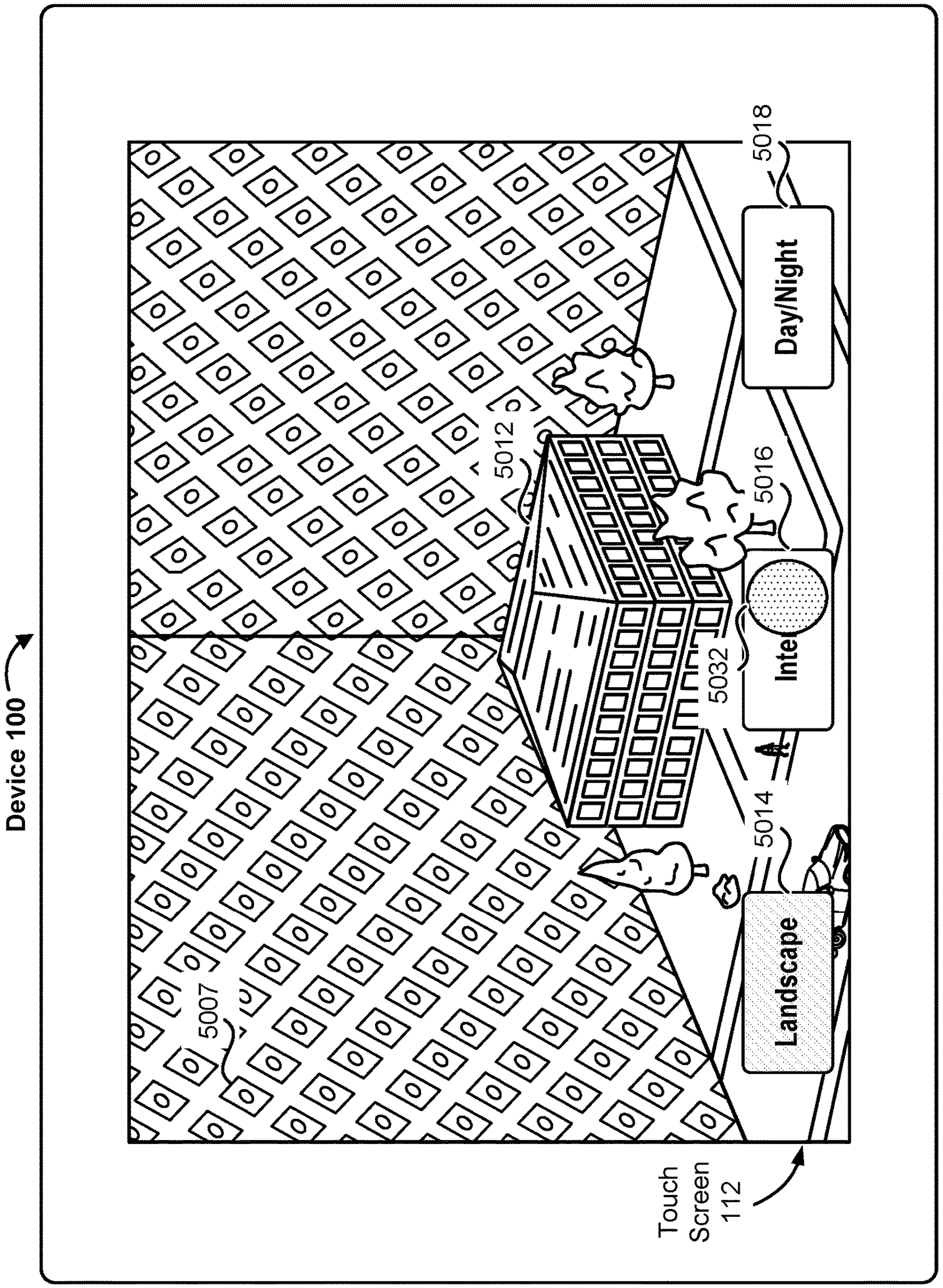
Figure 5A26

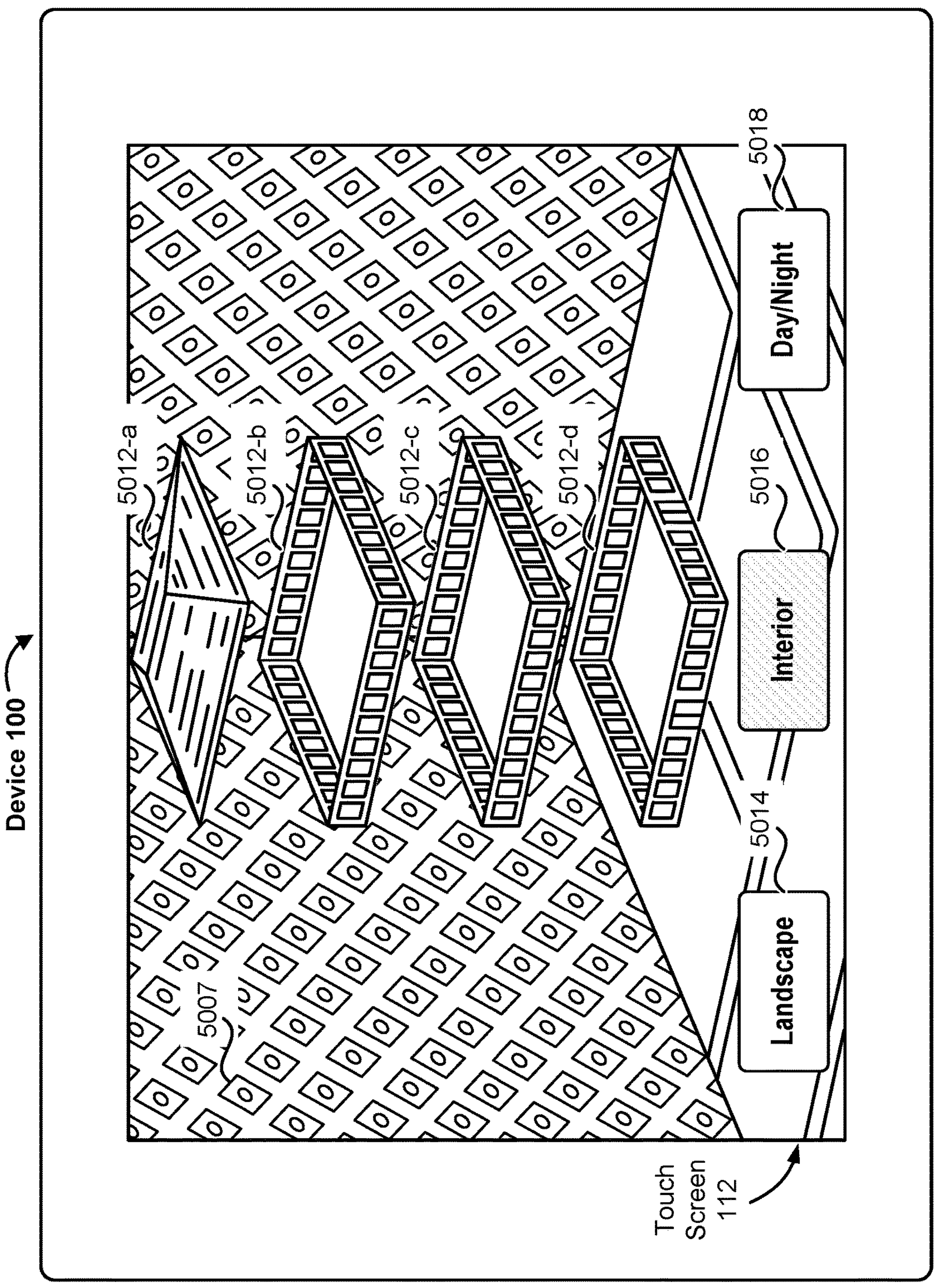
Figure 5A27

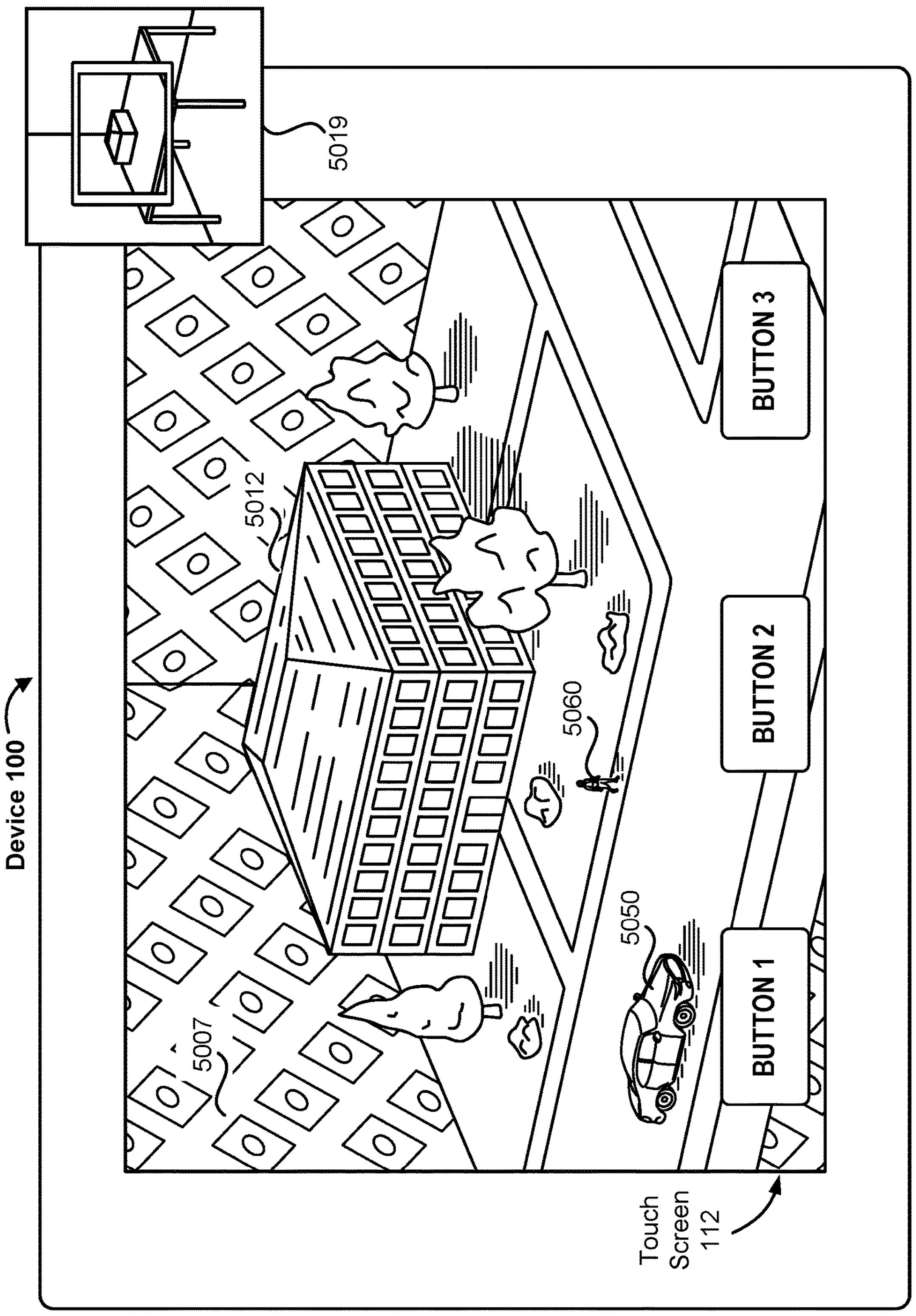
Figure 5A28

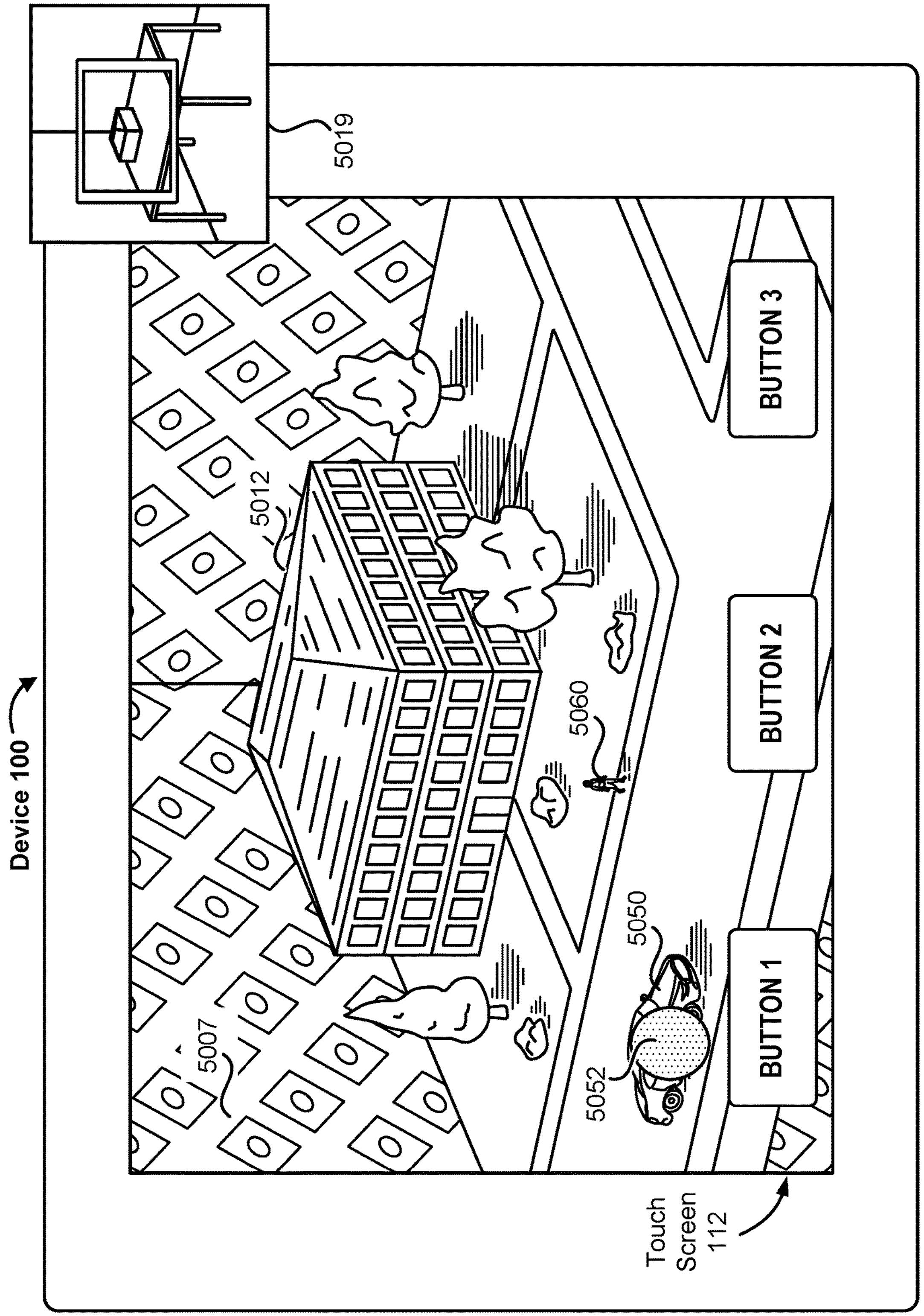
Figure 5A29

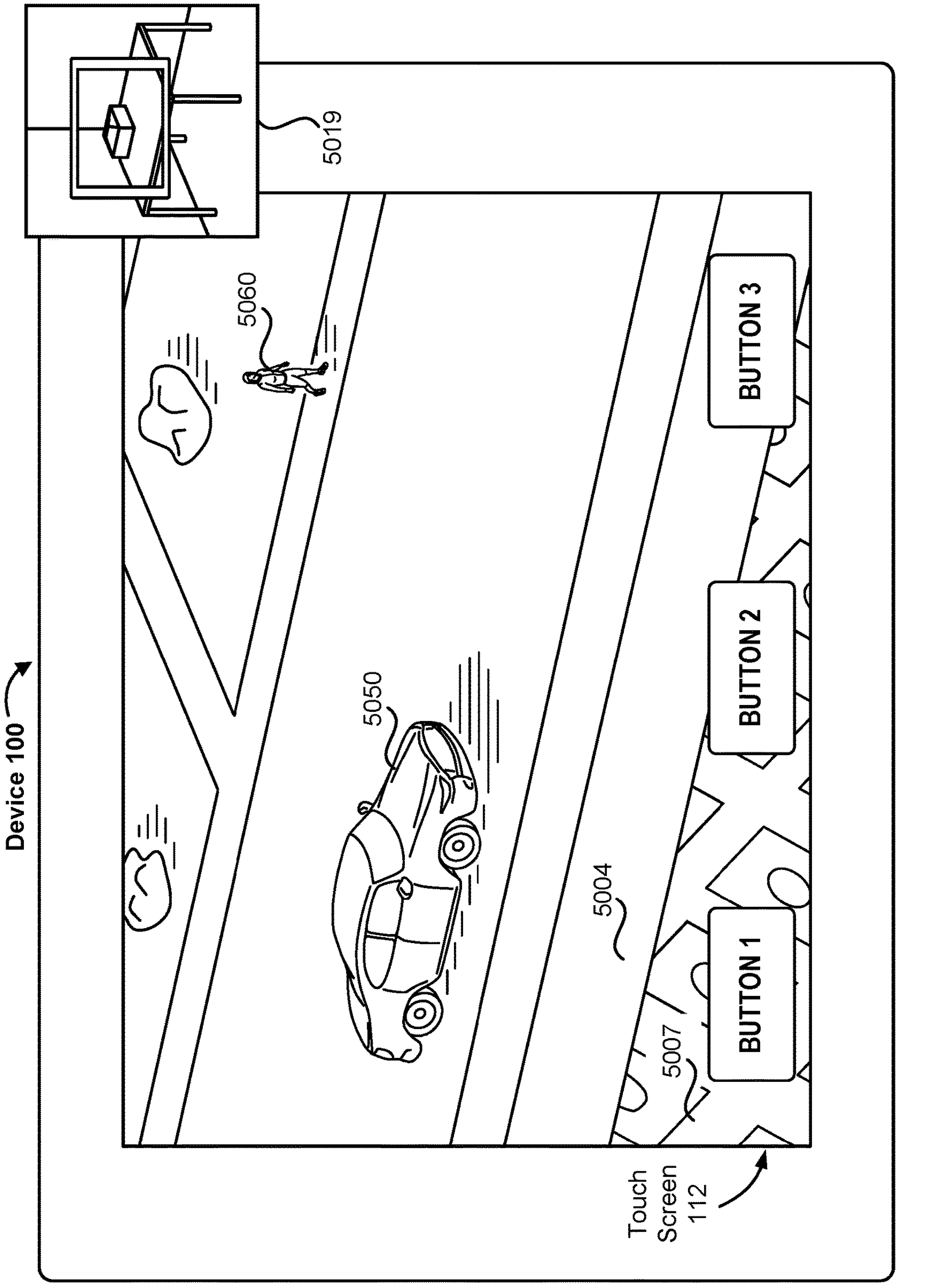
Figure 5A30

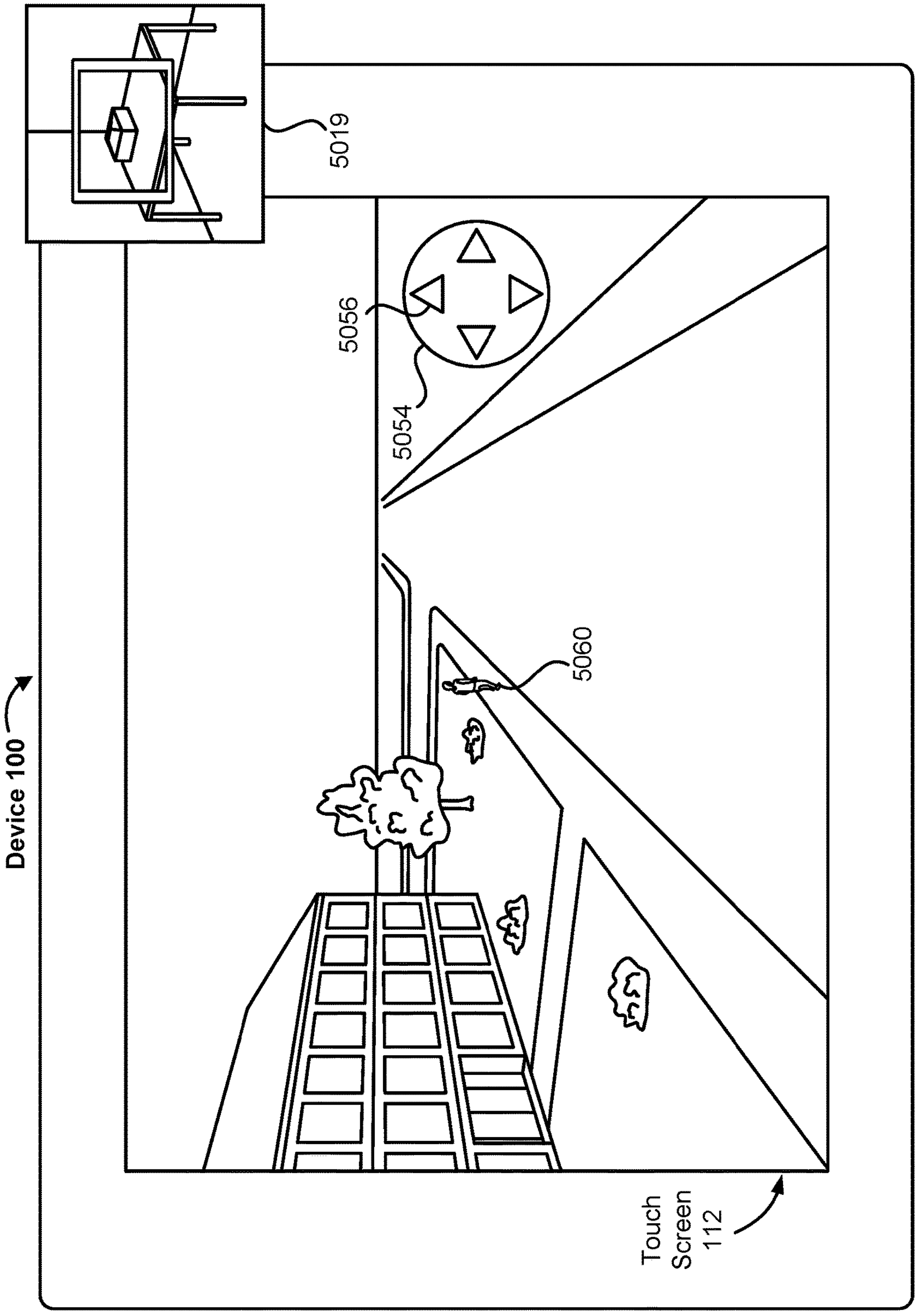
Figure 5A31

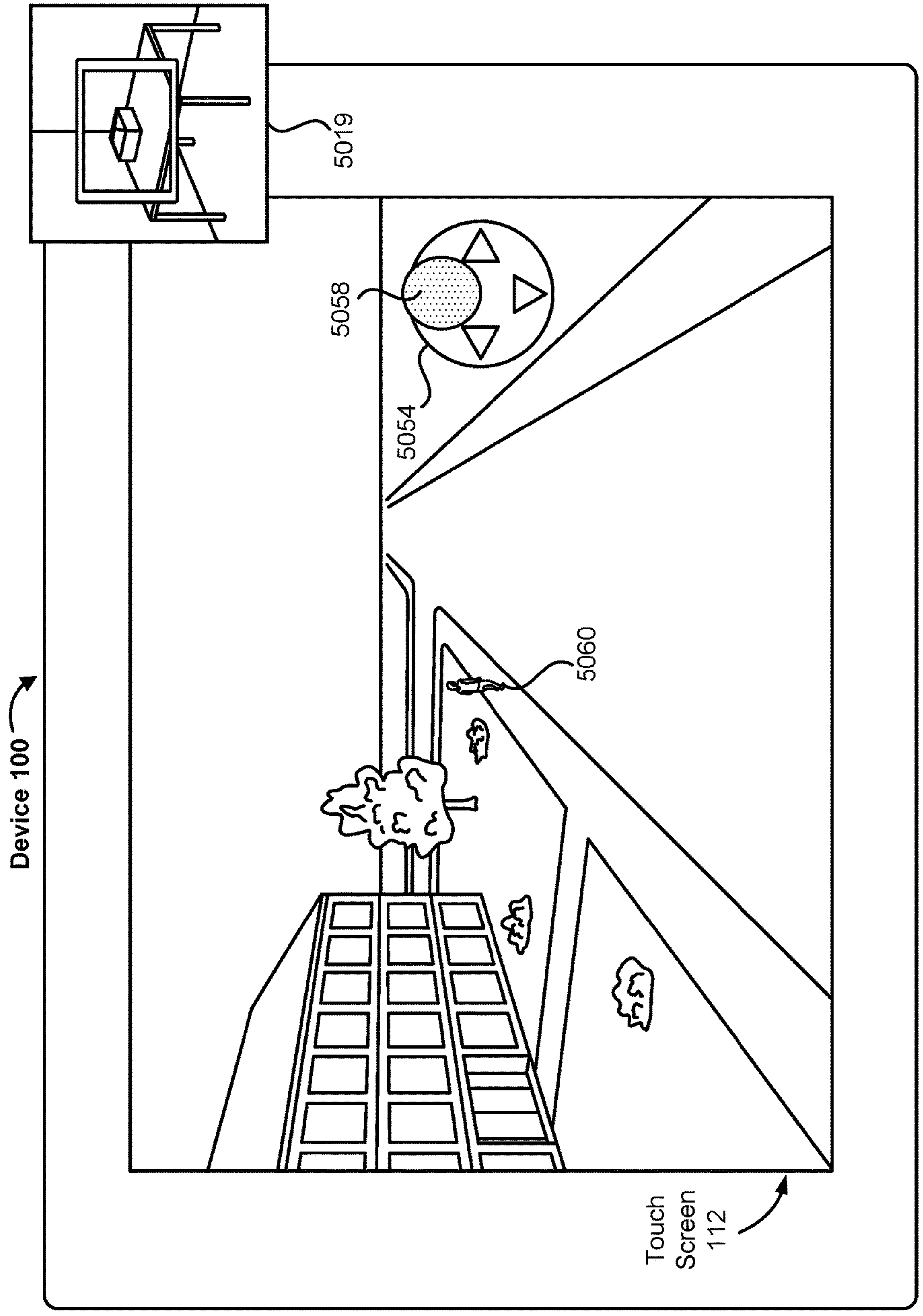
Figure 5A32

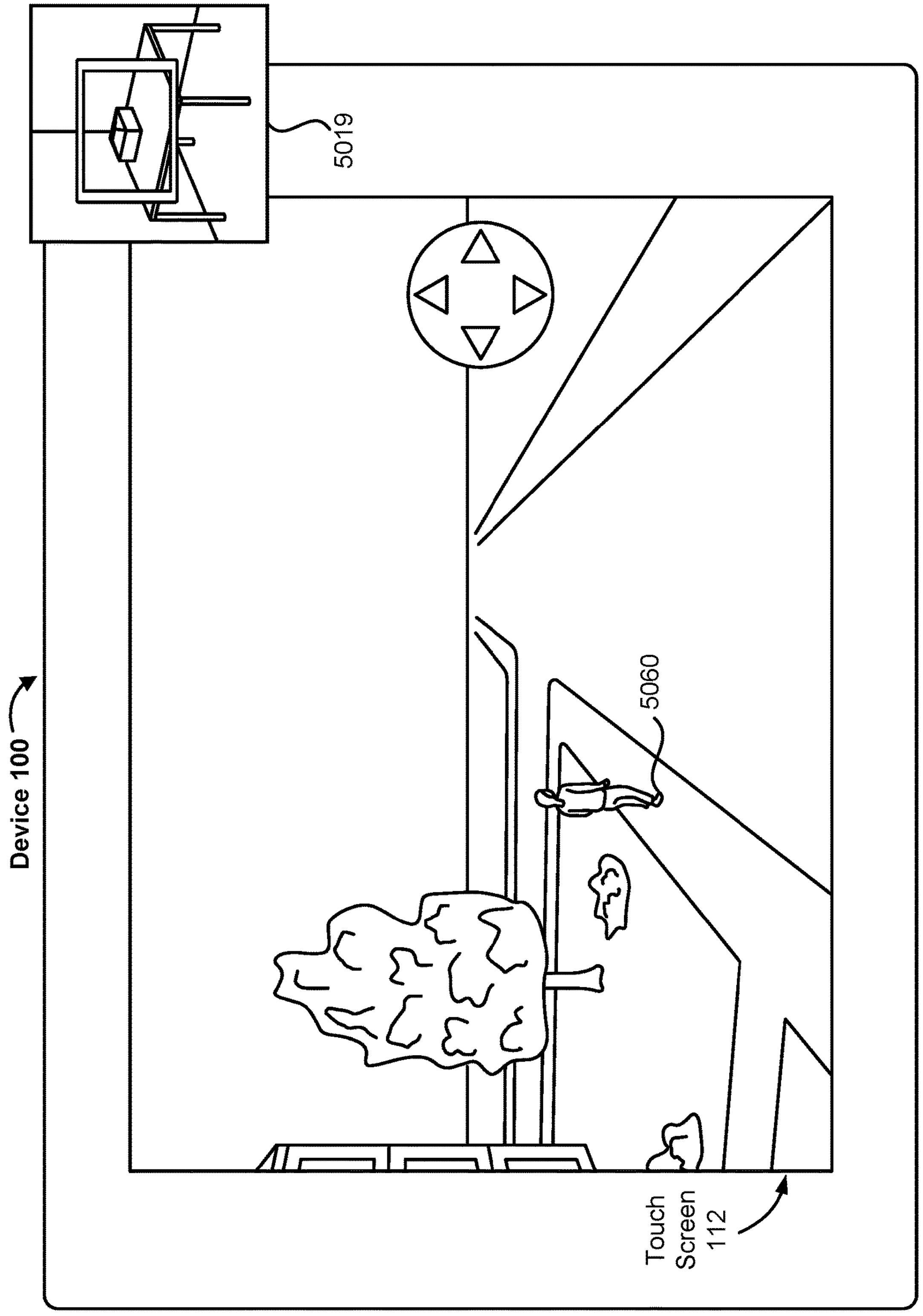
Figure 5A33

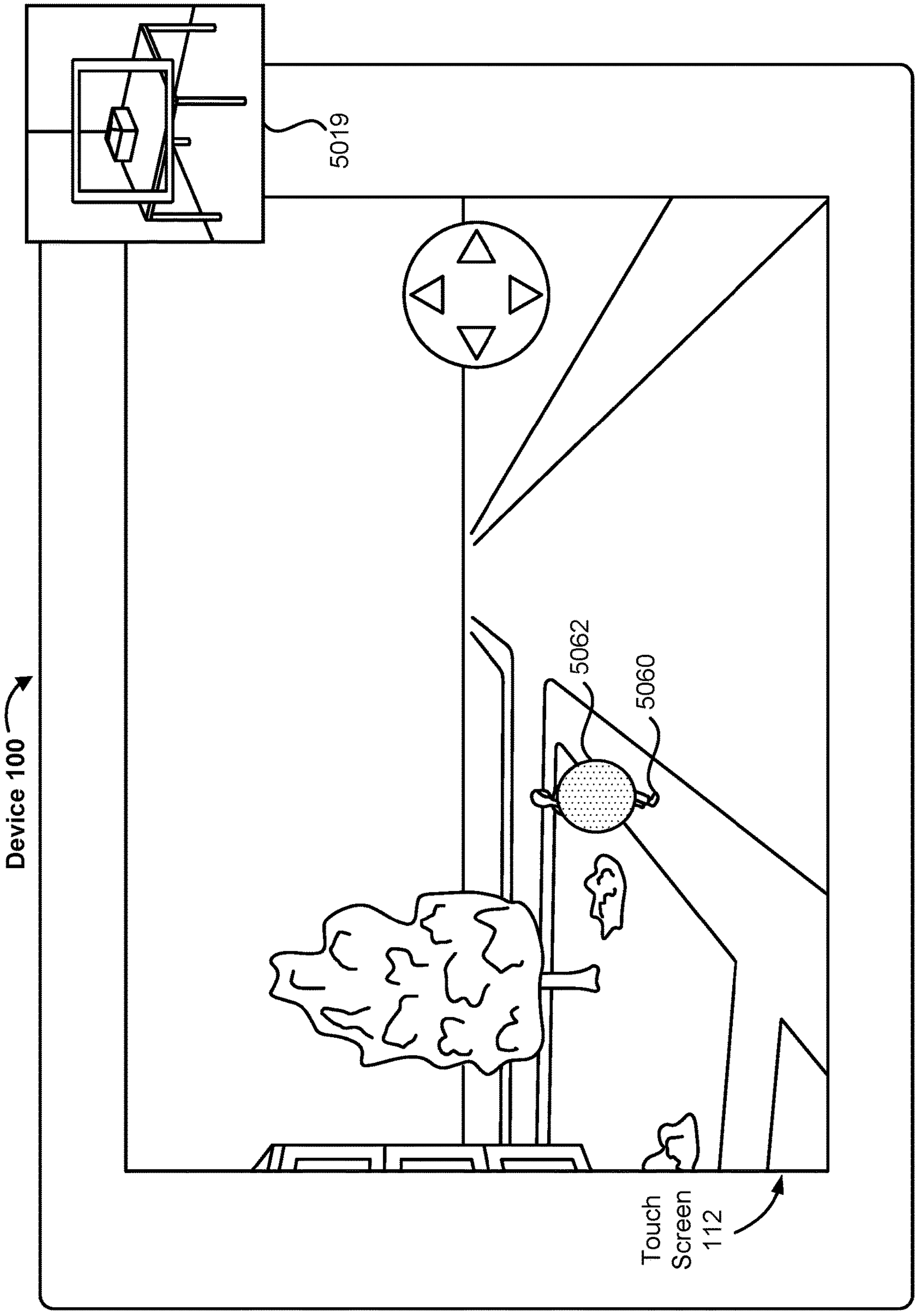
Figure 5A34

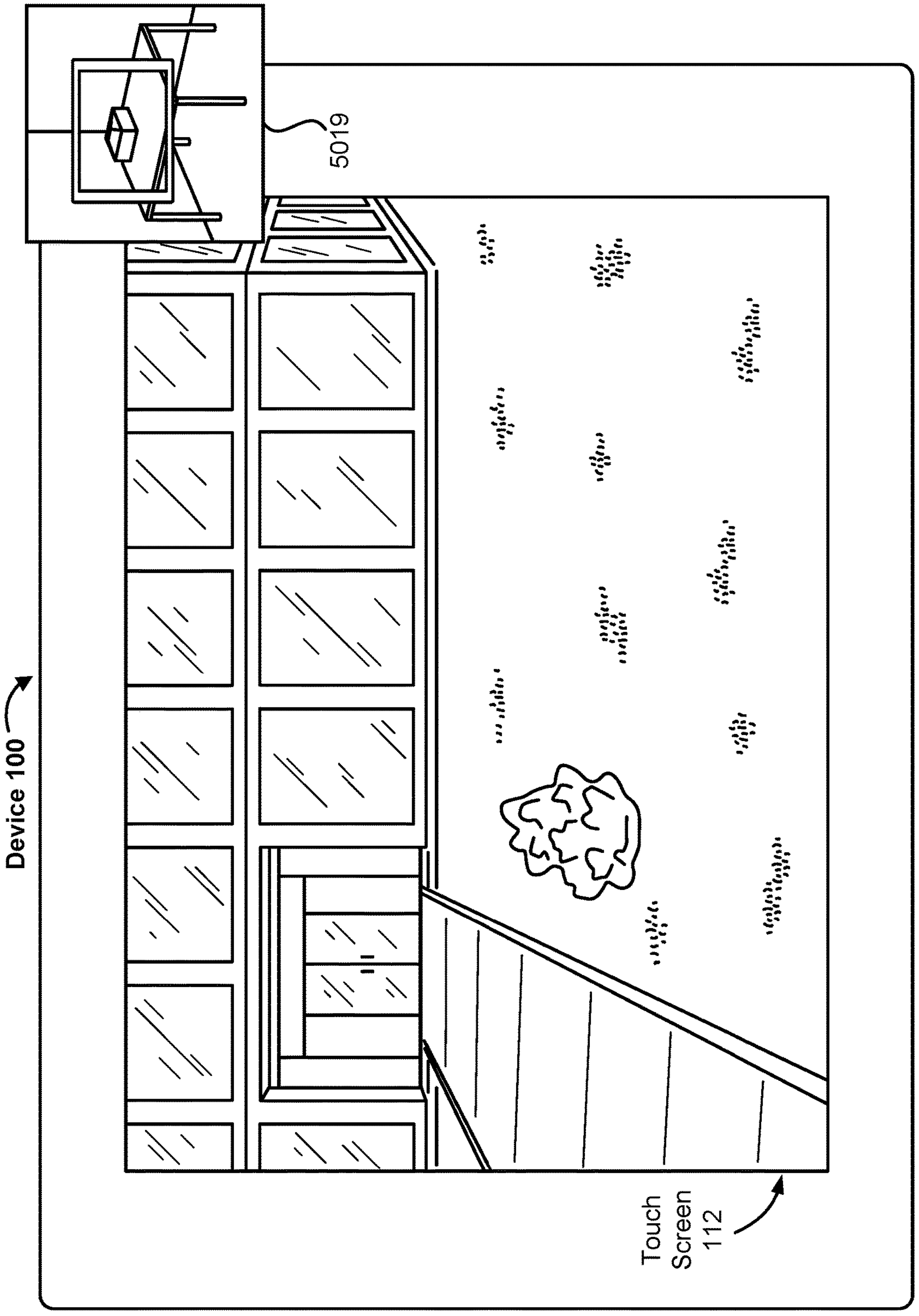
Figure 5A35

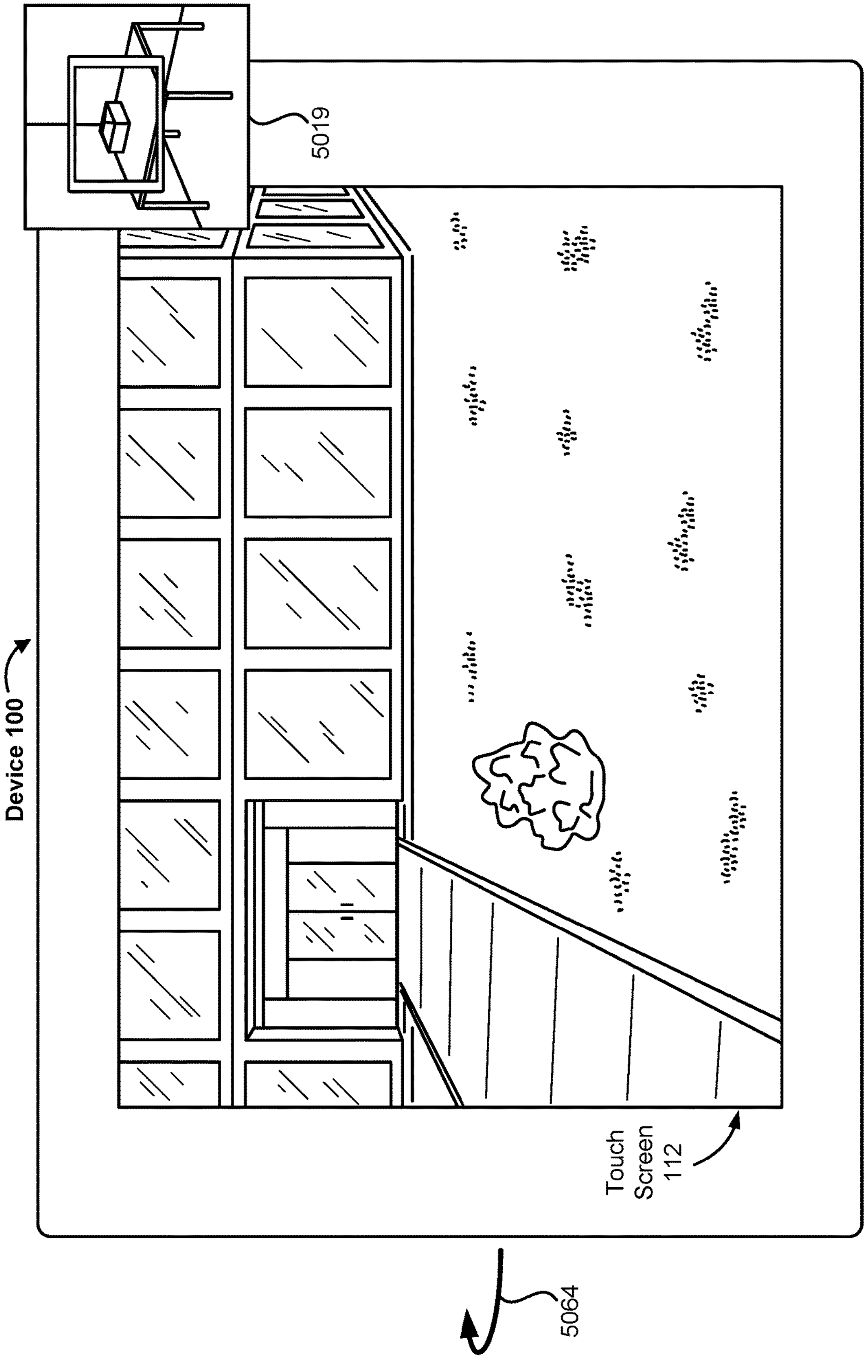
Figure 5A36

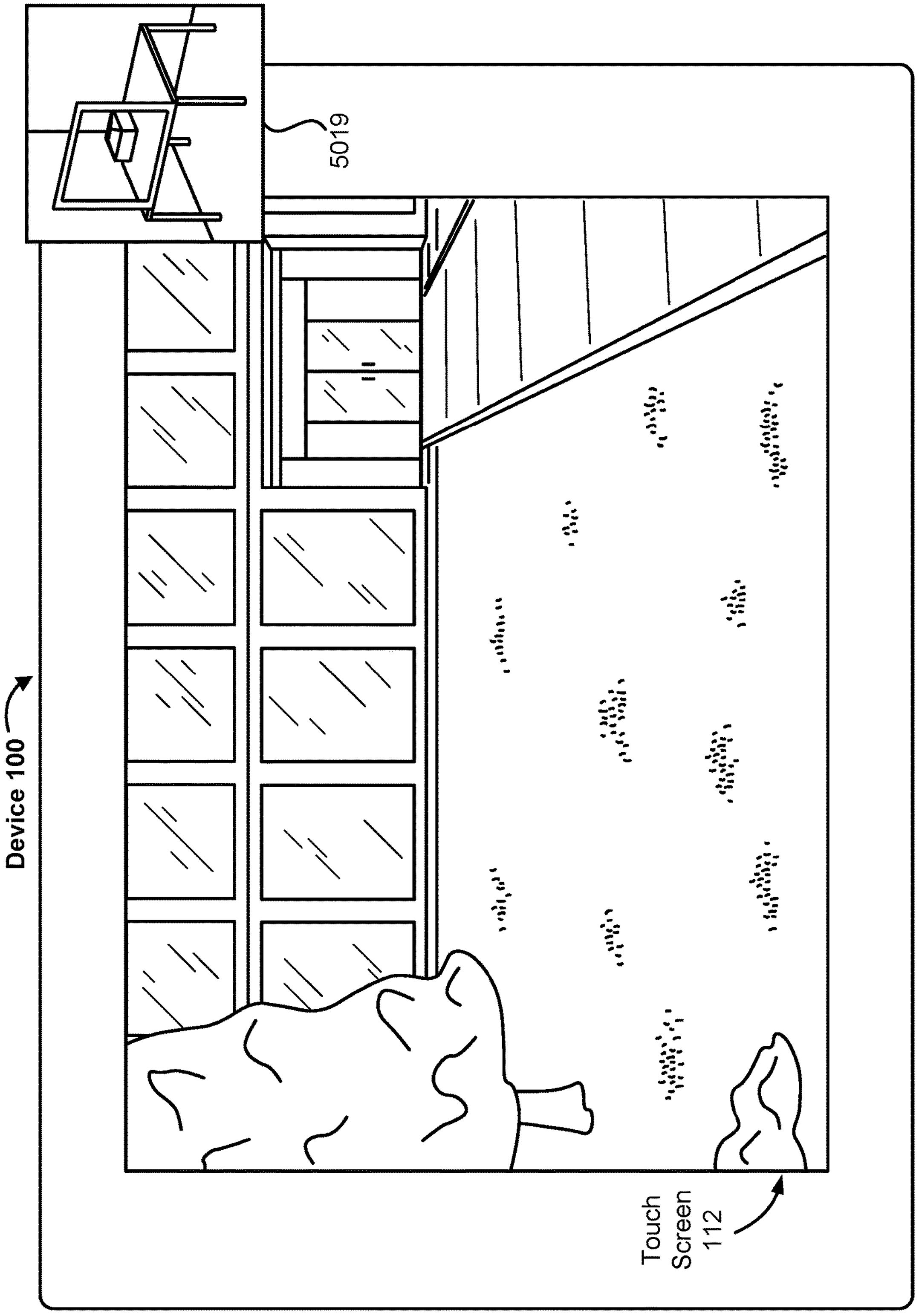
Figure 5A37

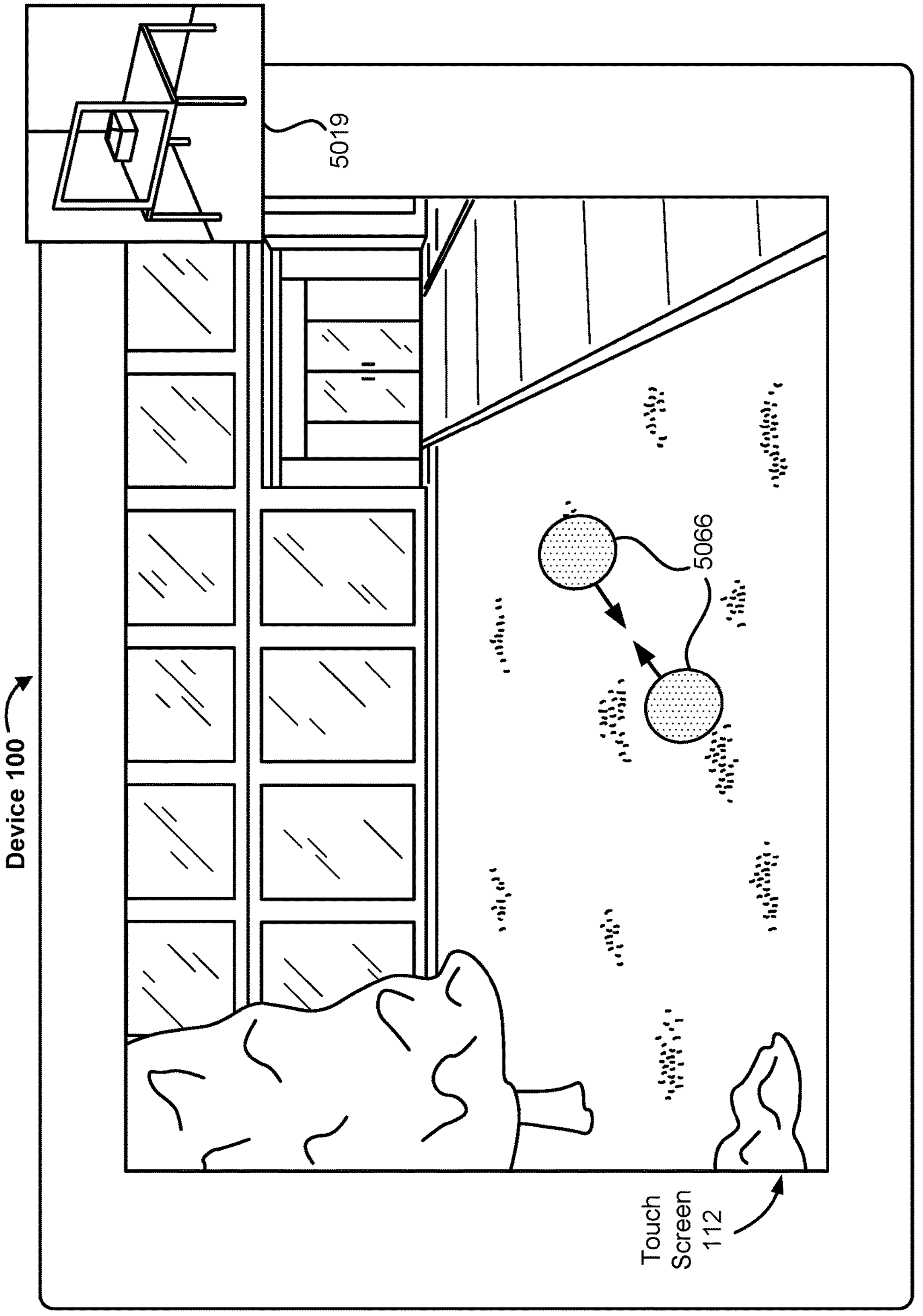
Figure 5A38

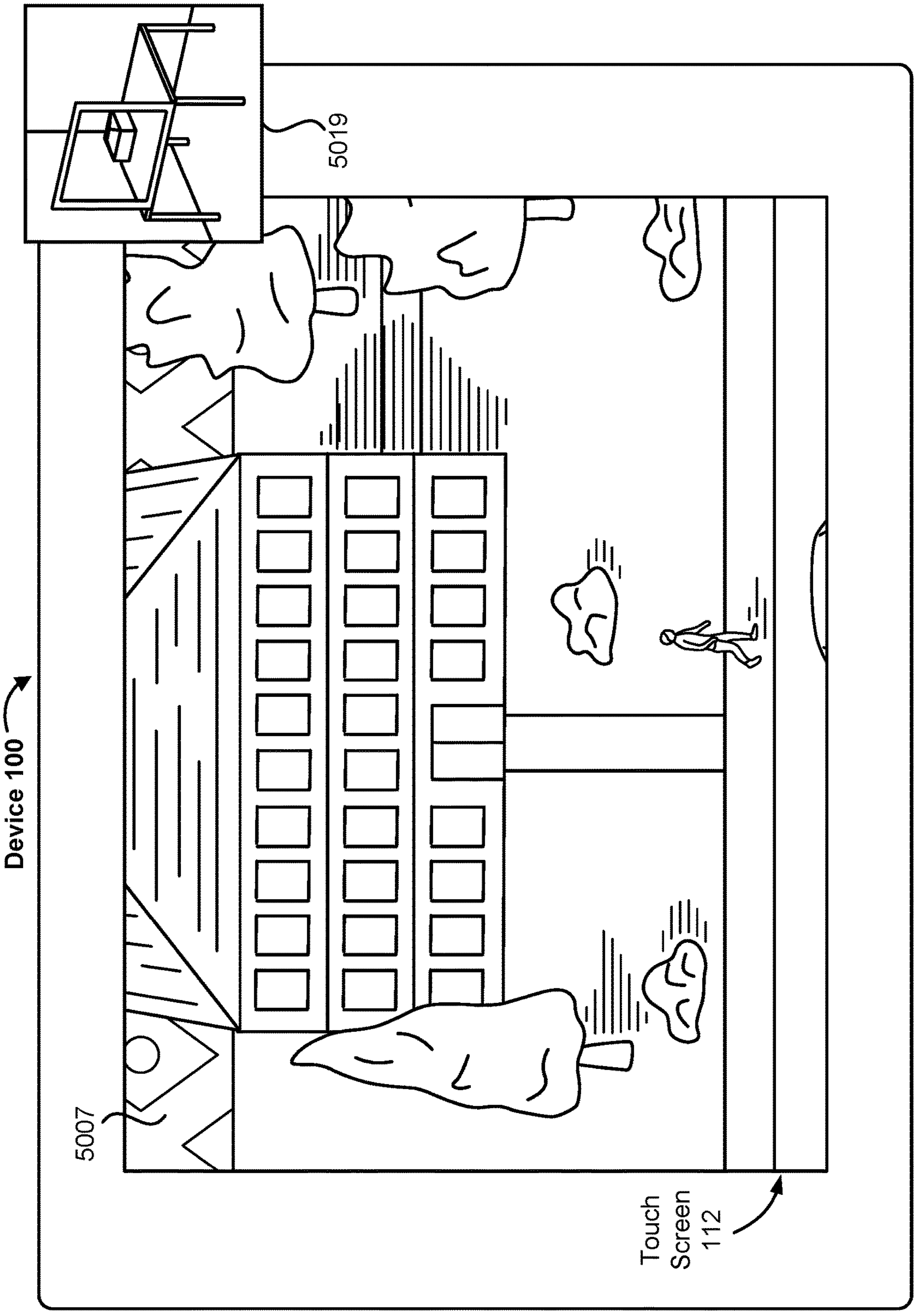
Figure 5A39

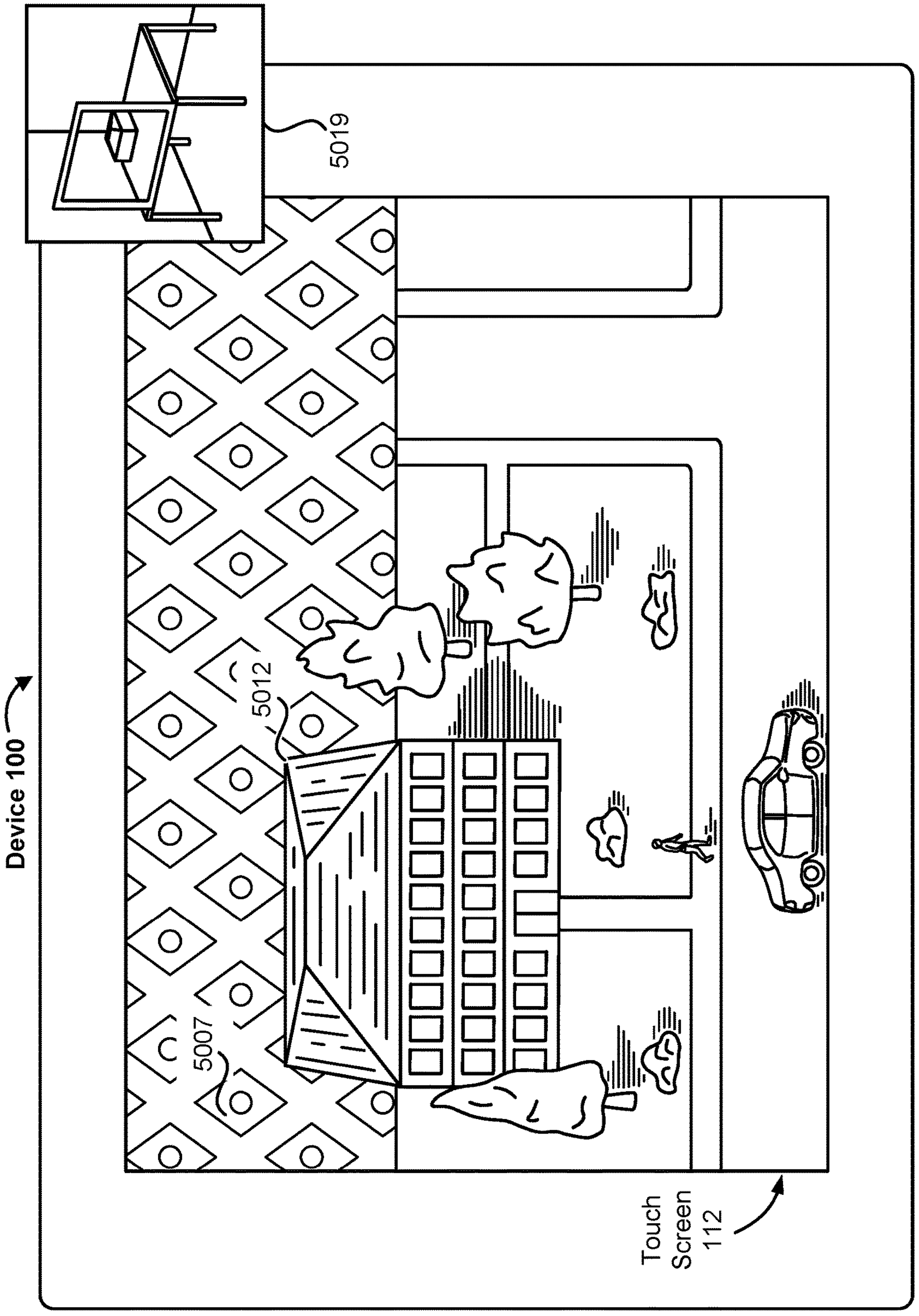
Figure 5A40

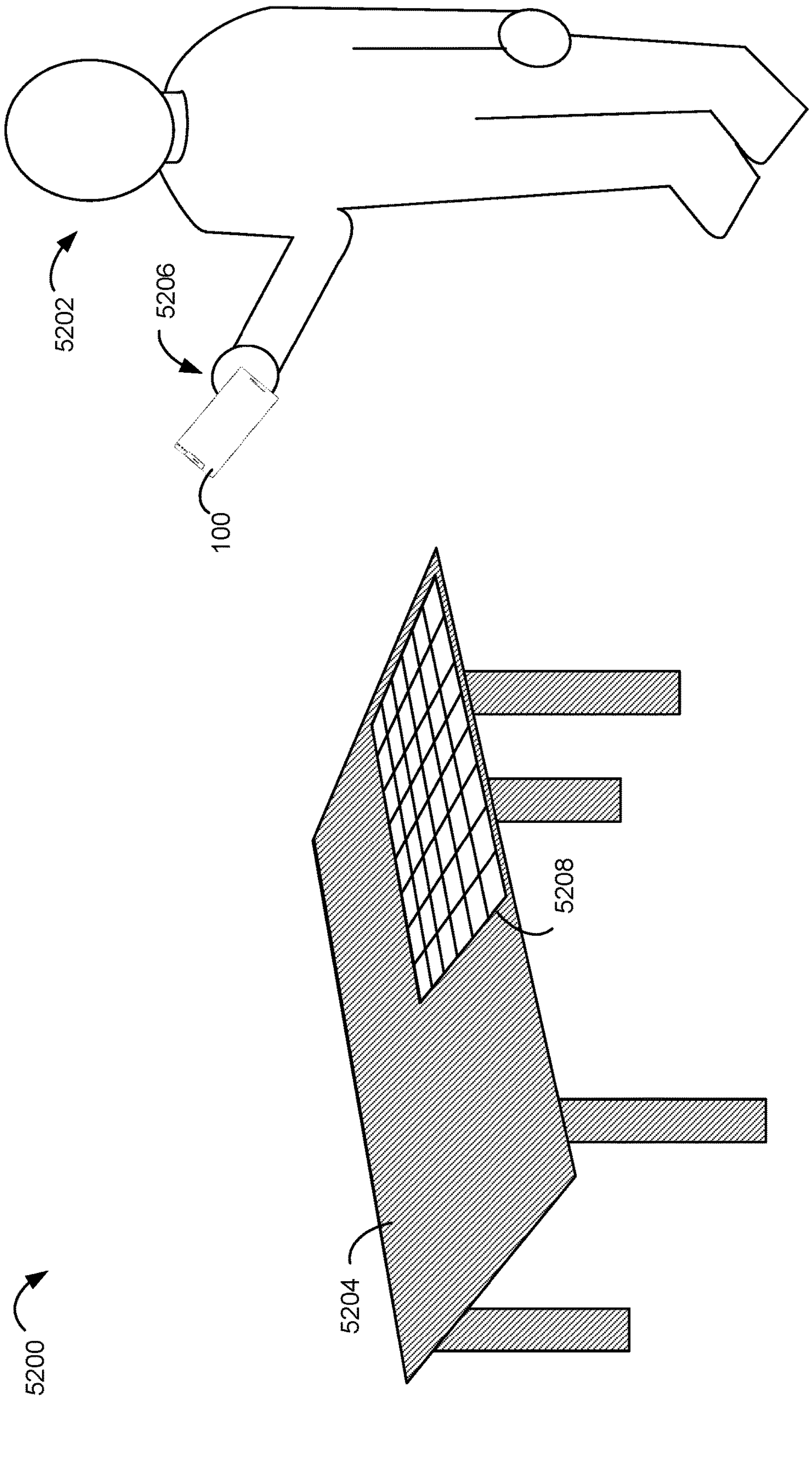
Figure 5B1

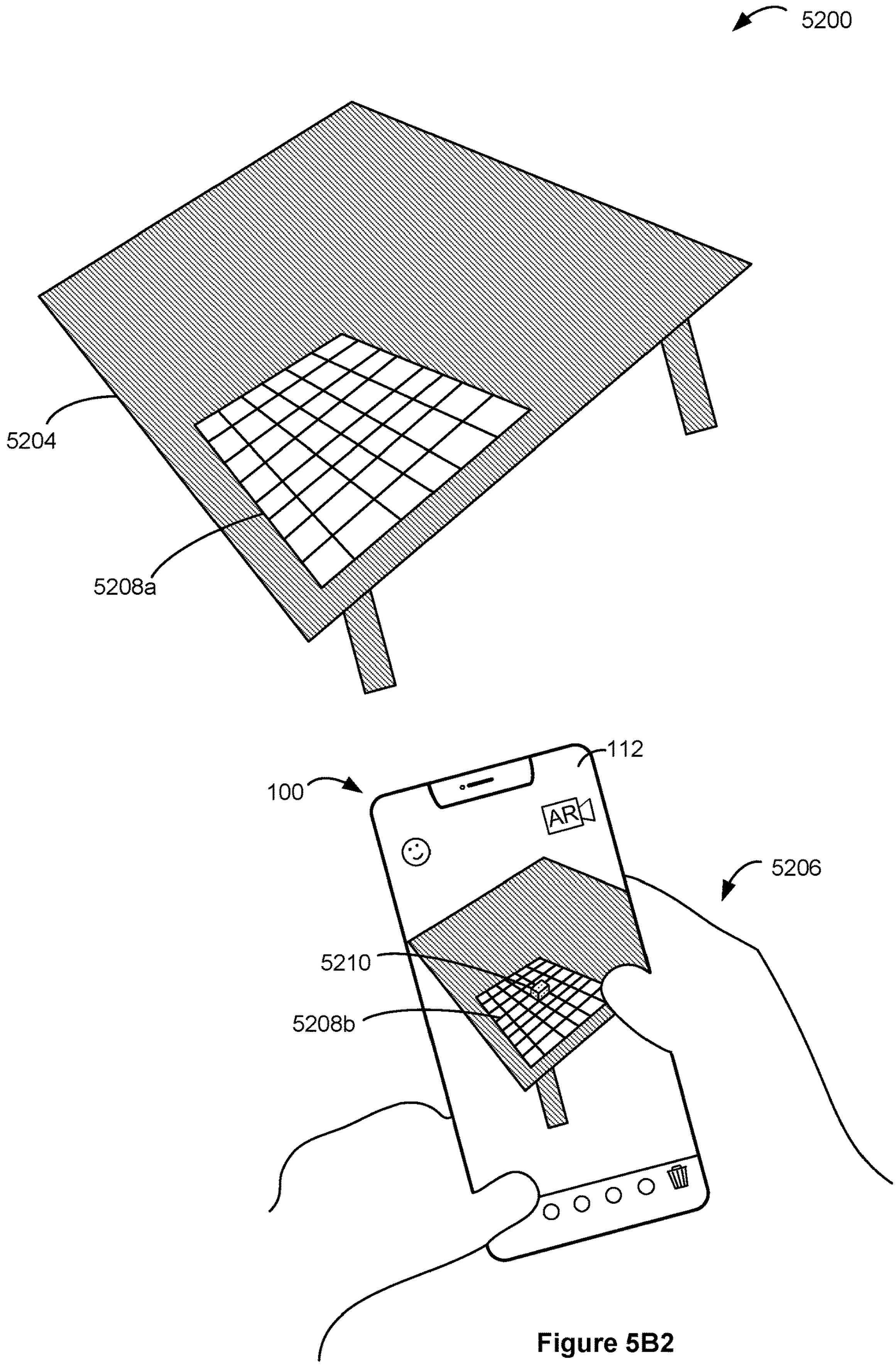
Figure 5B2

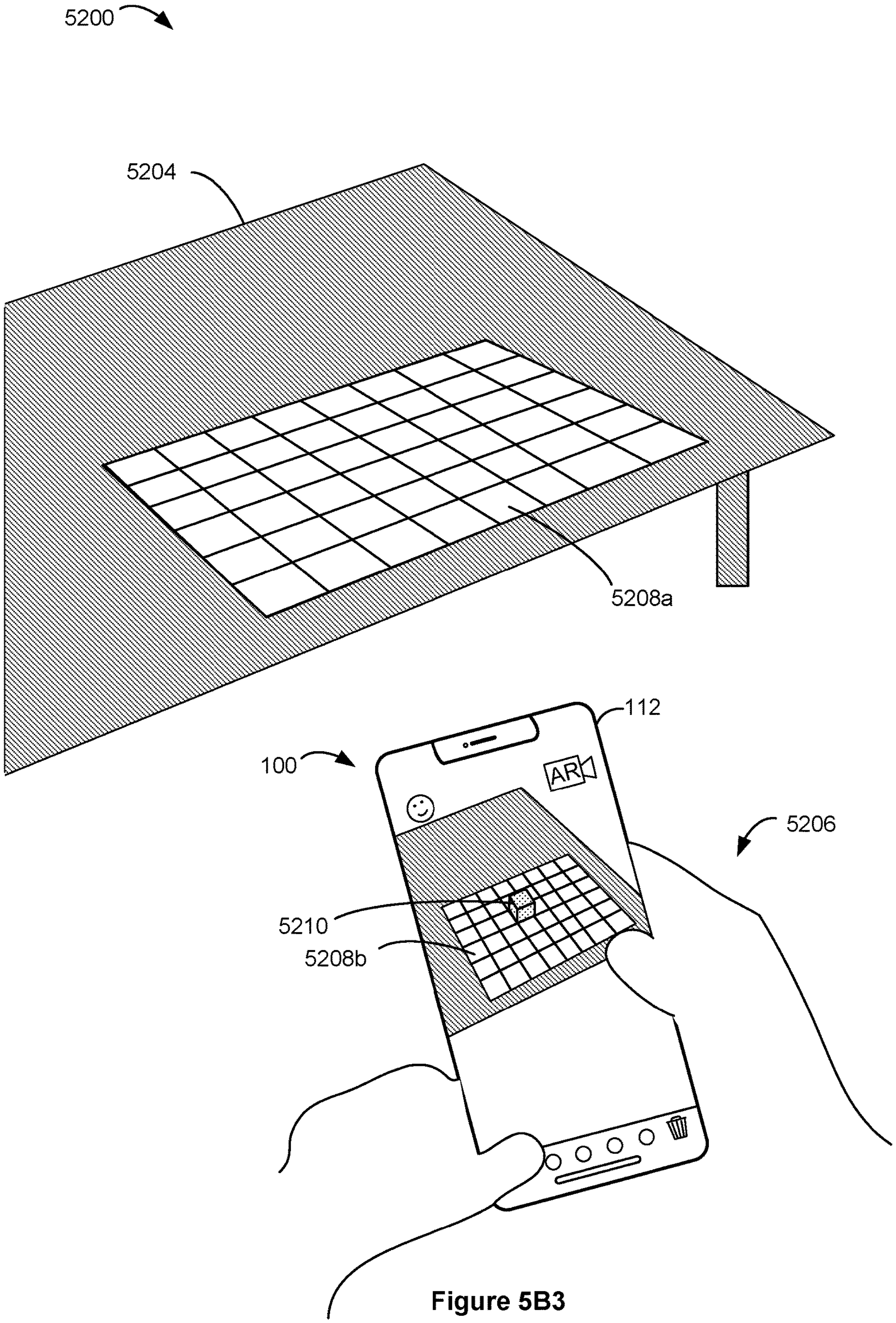
Figure 5B3

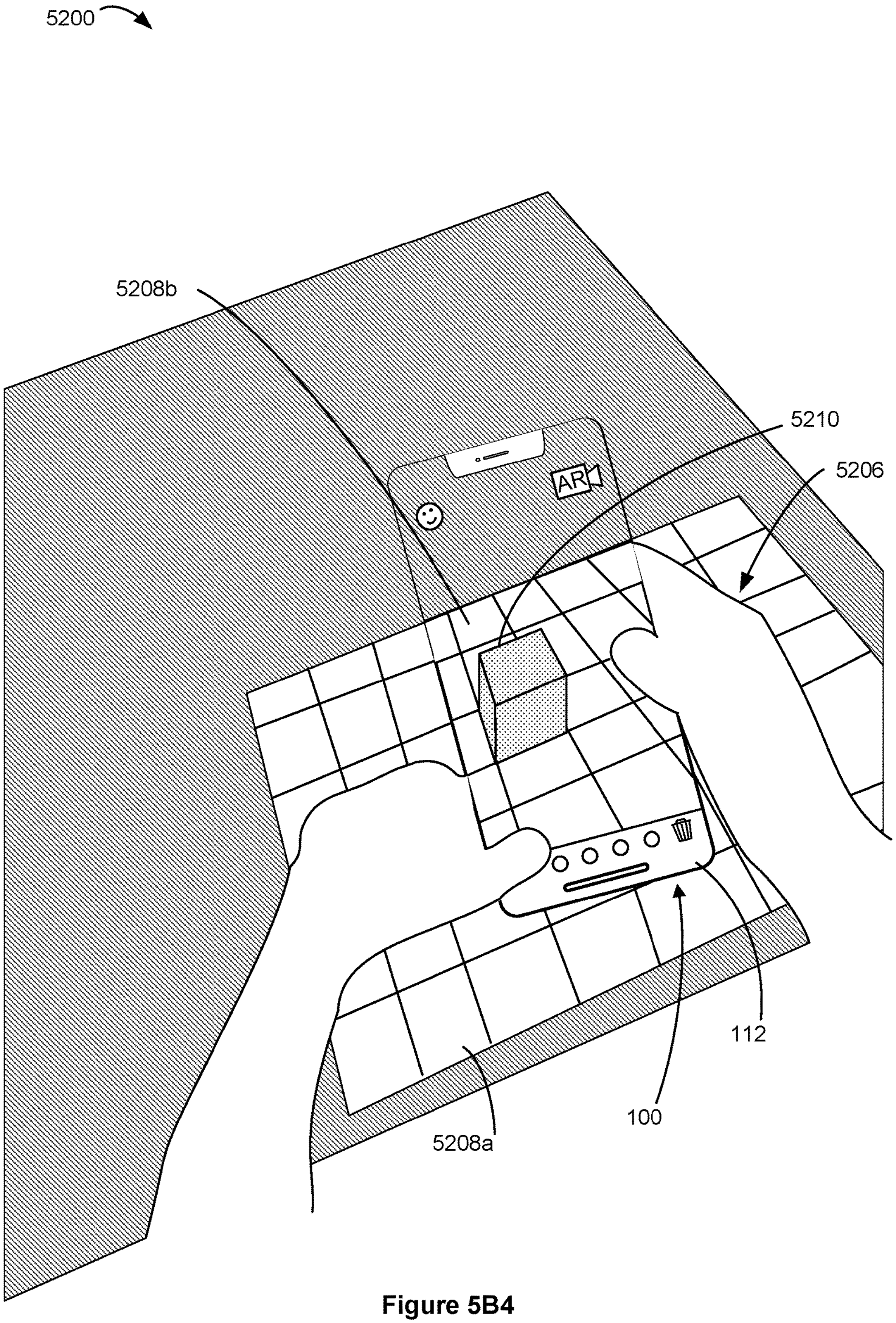
Figure 5B4

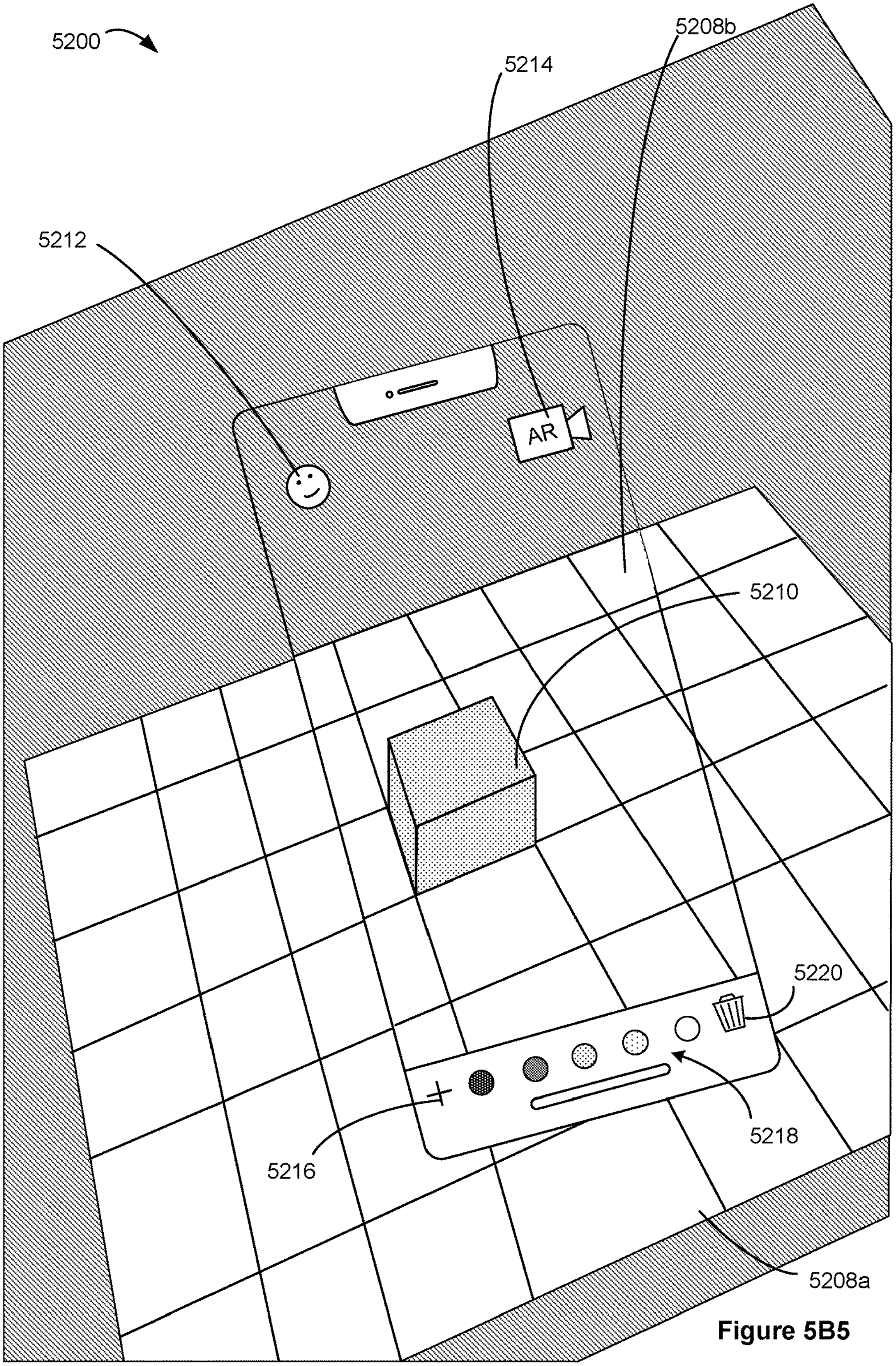
Figure 5B5

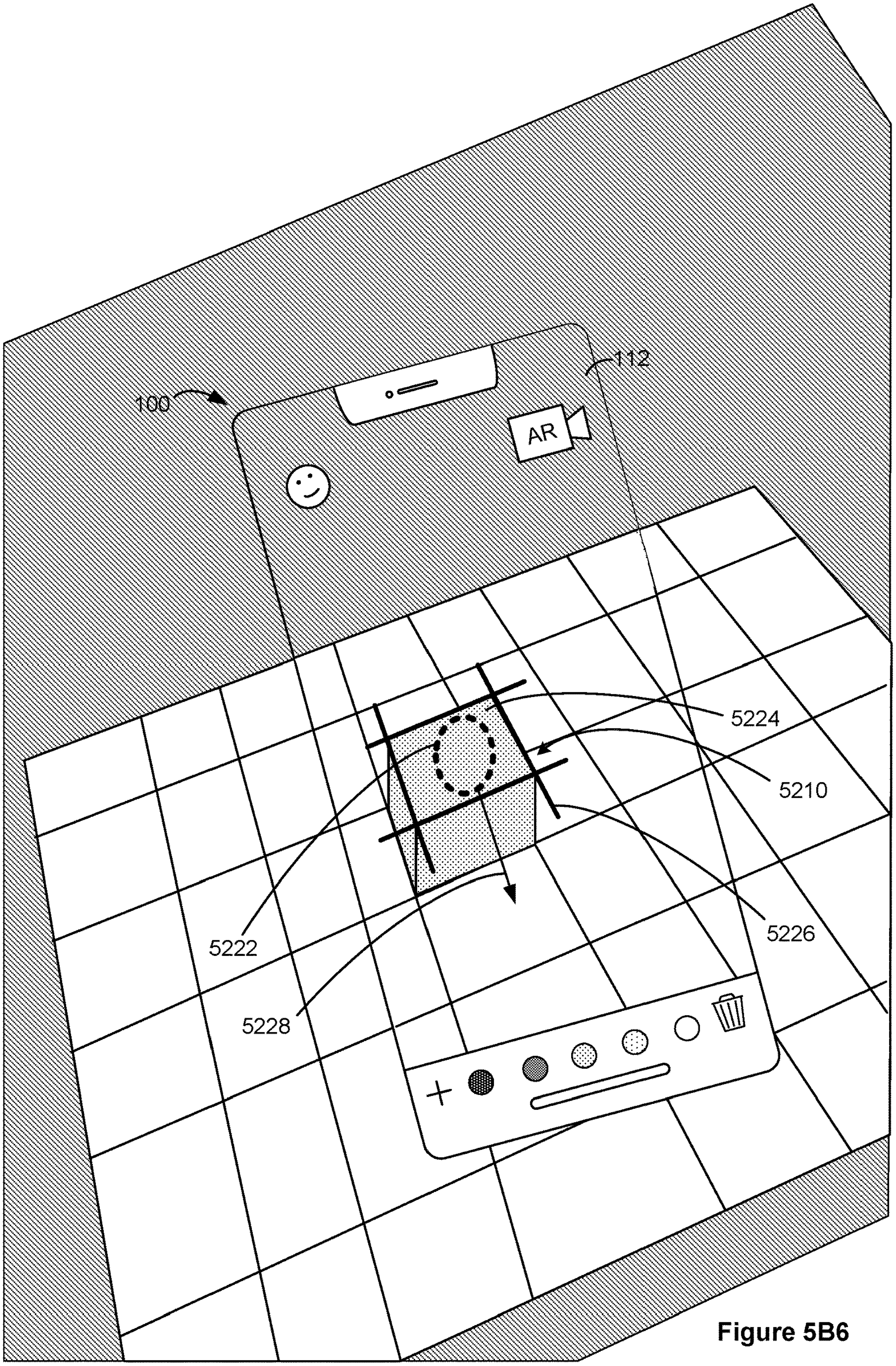
Figure 5B6

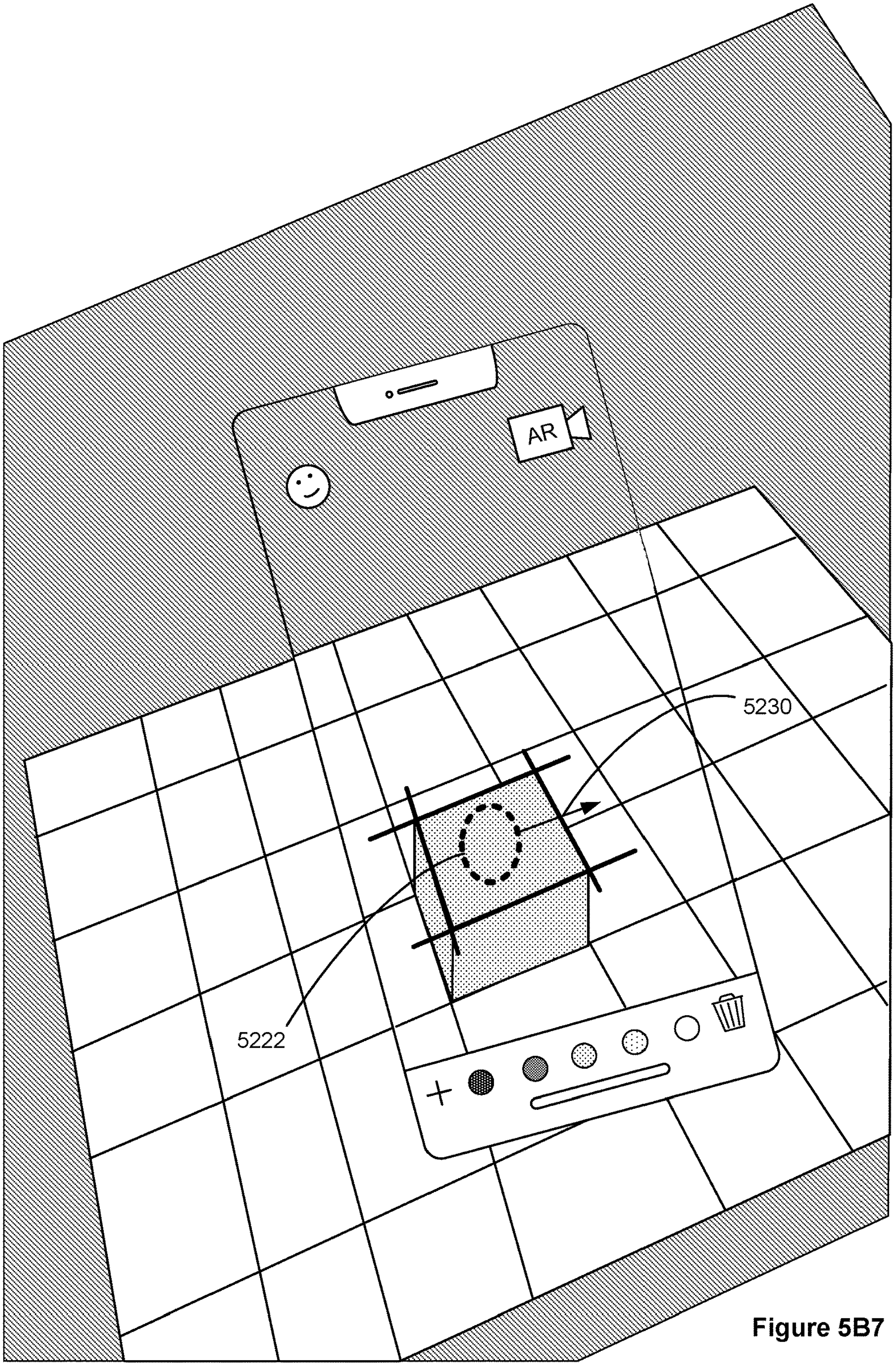
Figure 5B7

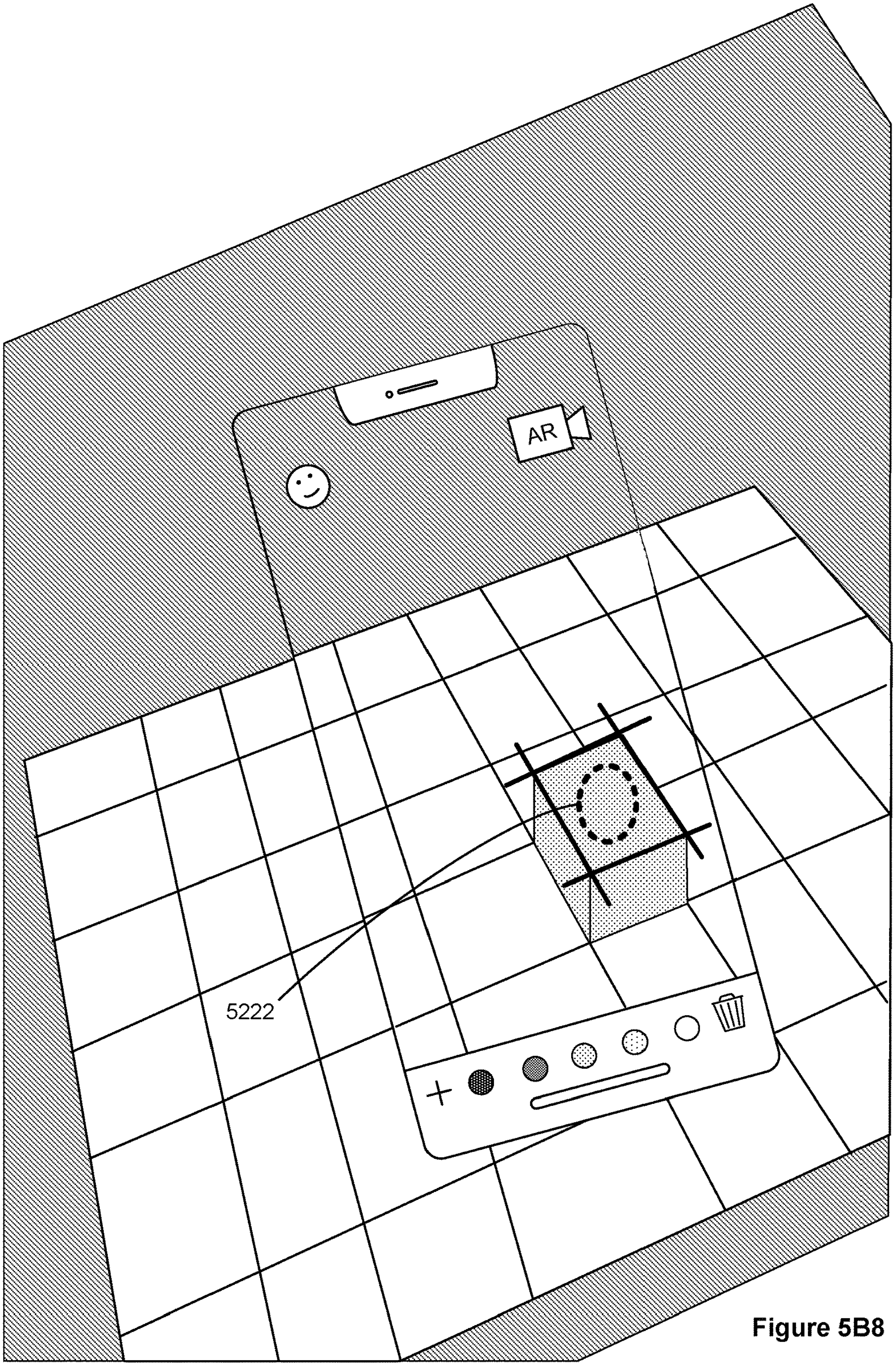
Figure 5B8

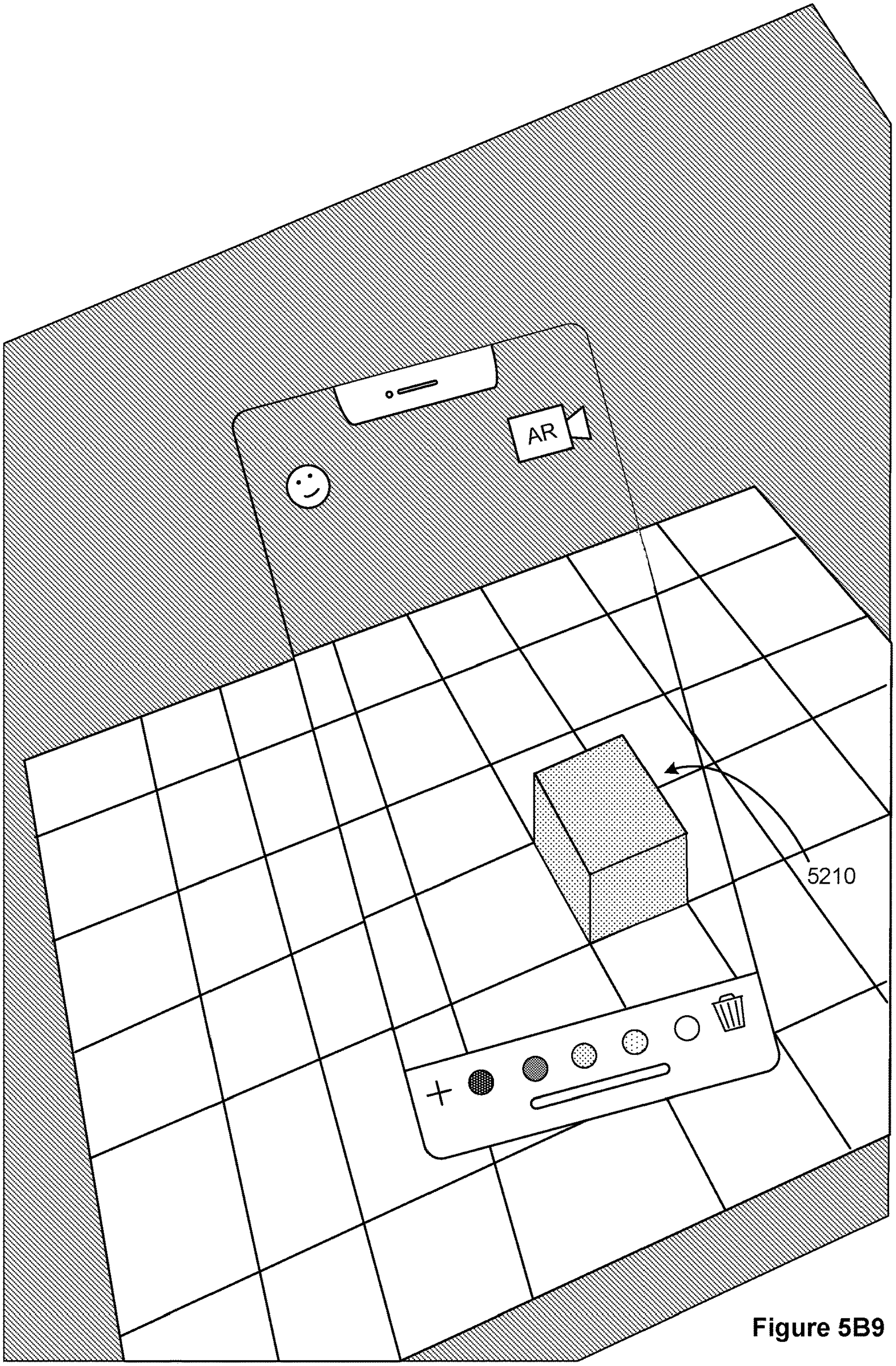
Figure 5B9

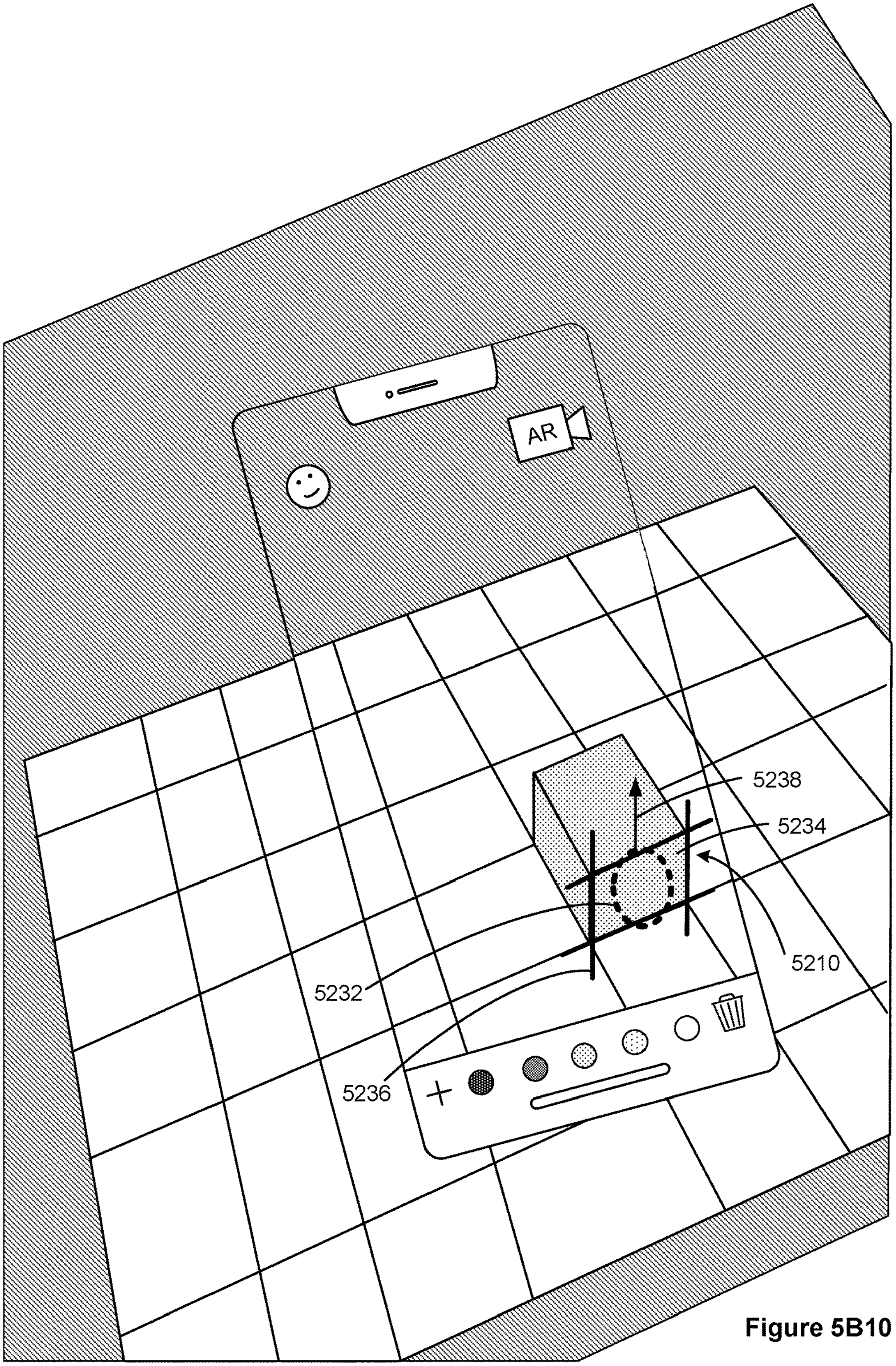
Figure 5B10

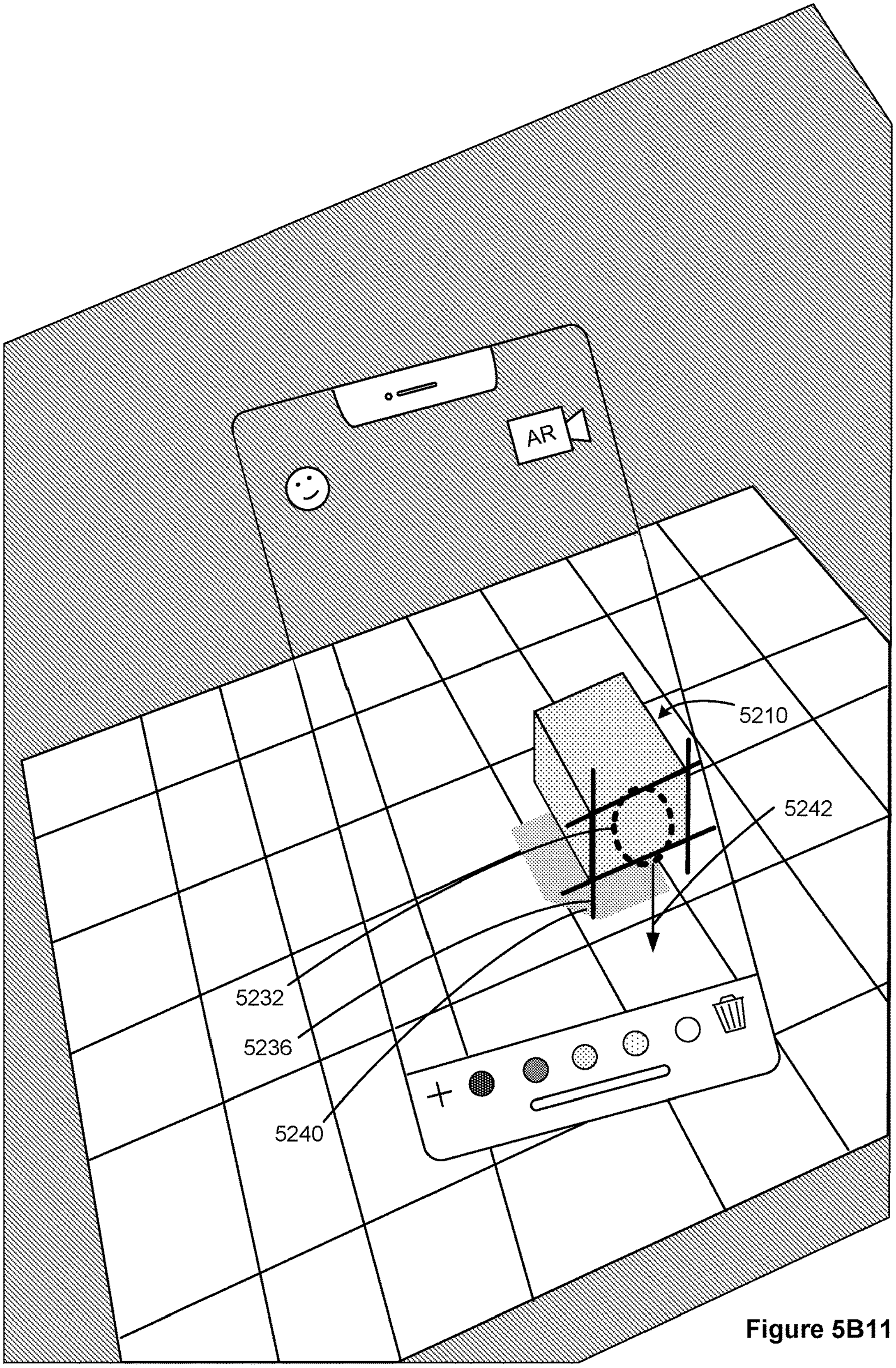
Figure 5B11

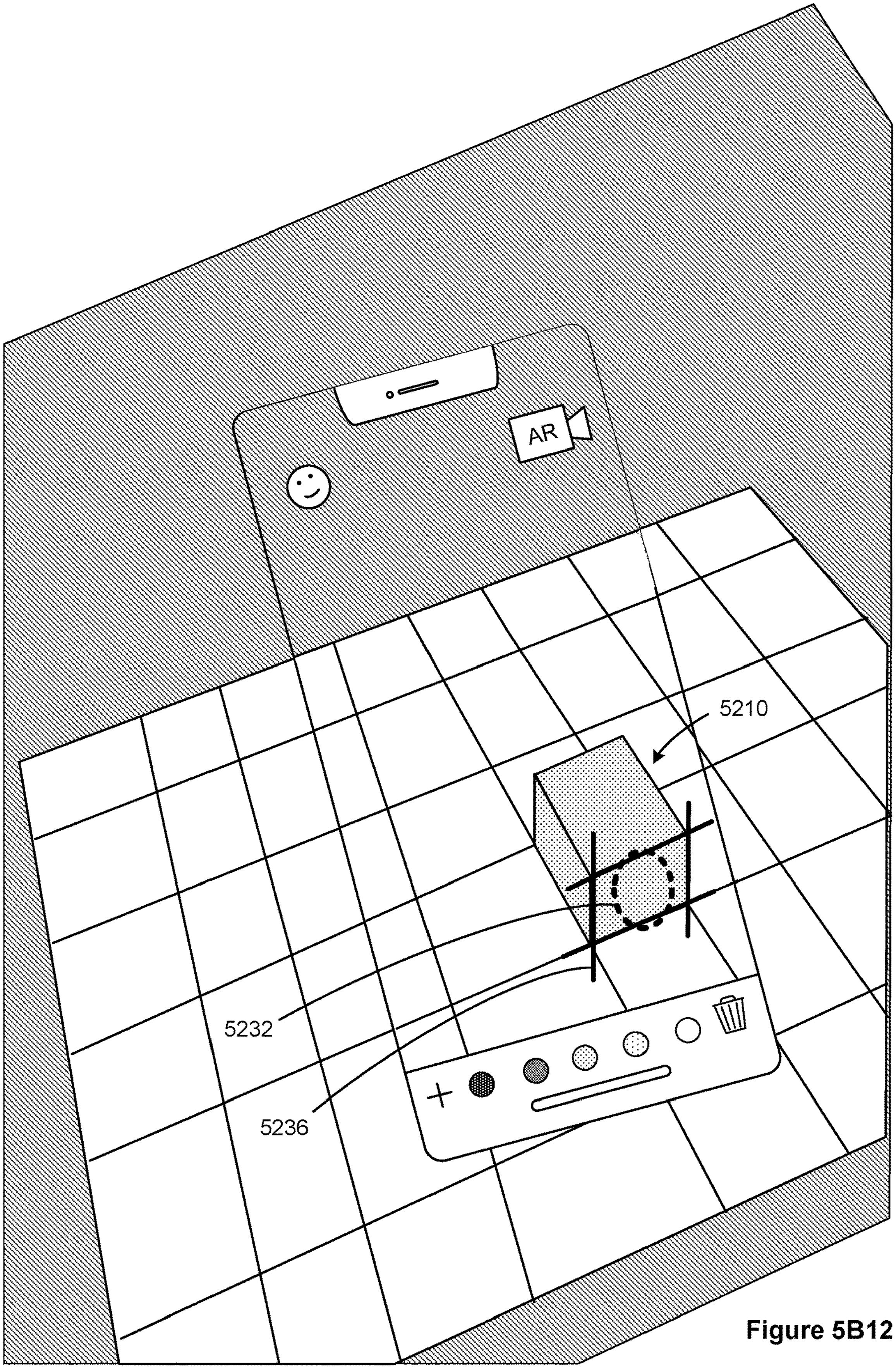
Figure 5B12

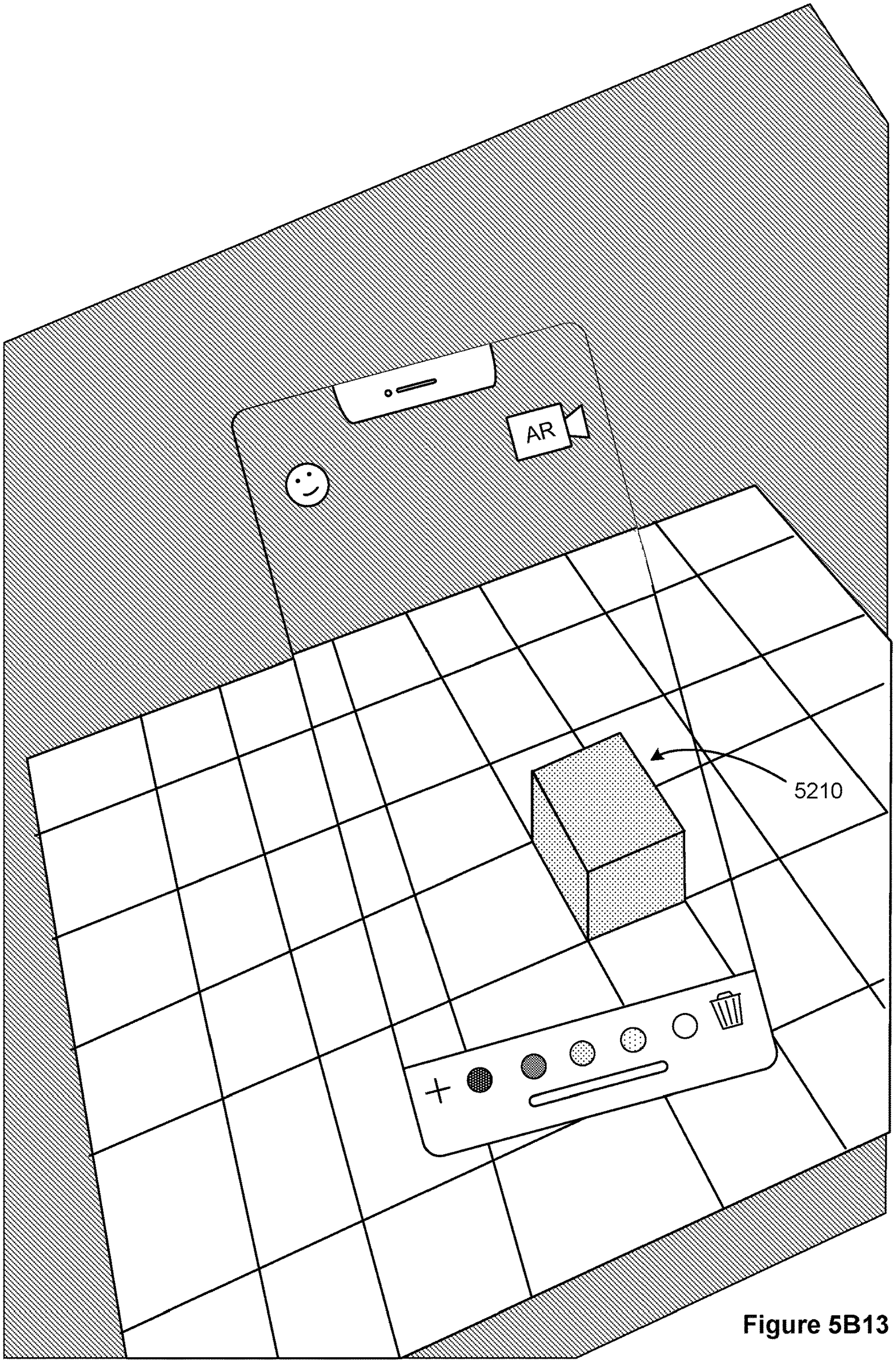
Figure 5B13

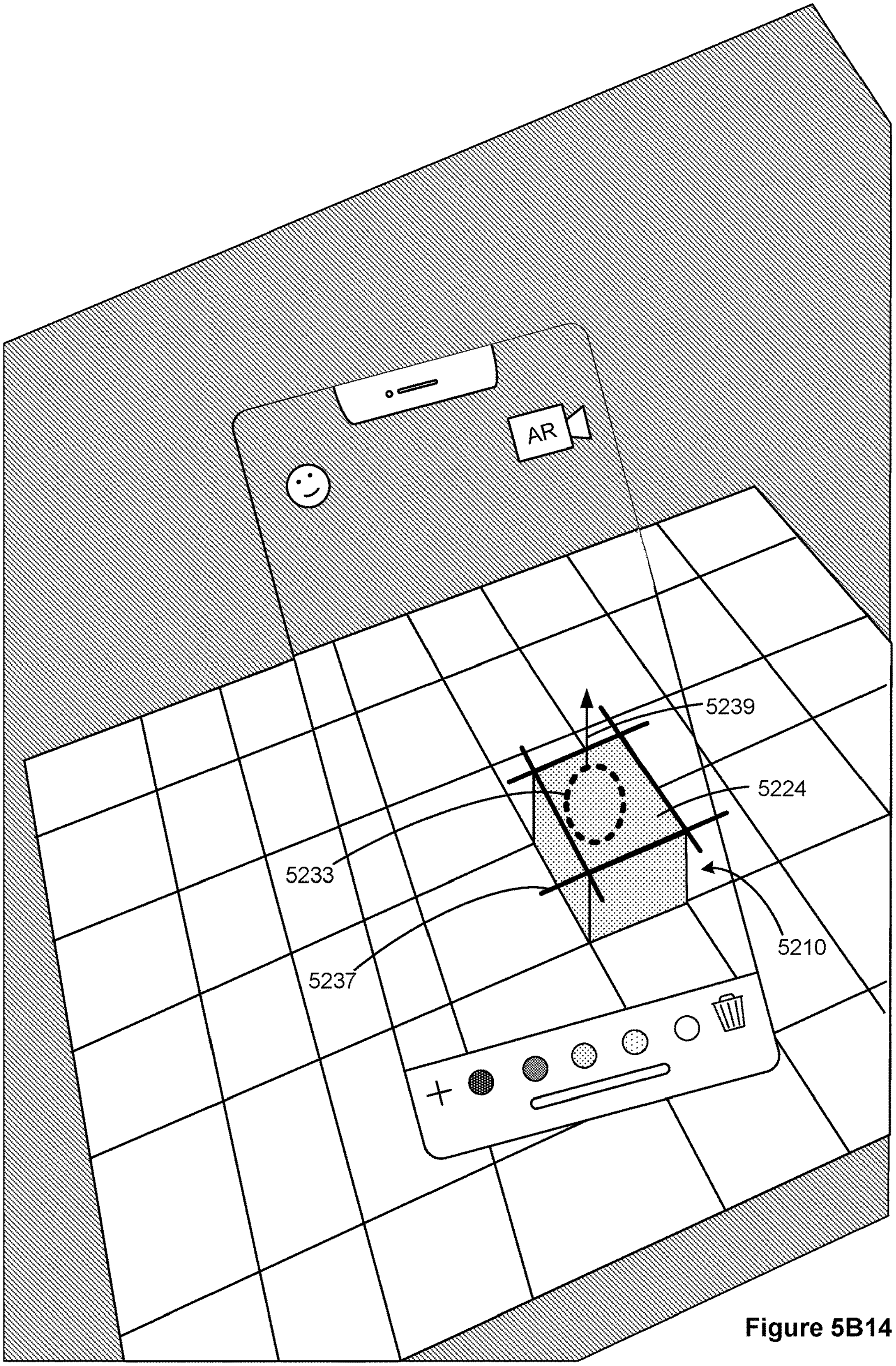
Figure 5B14

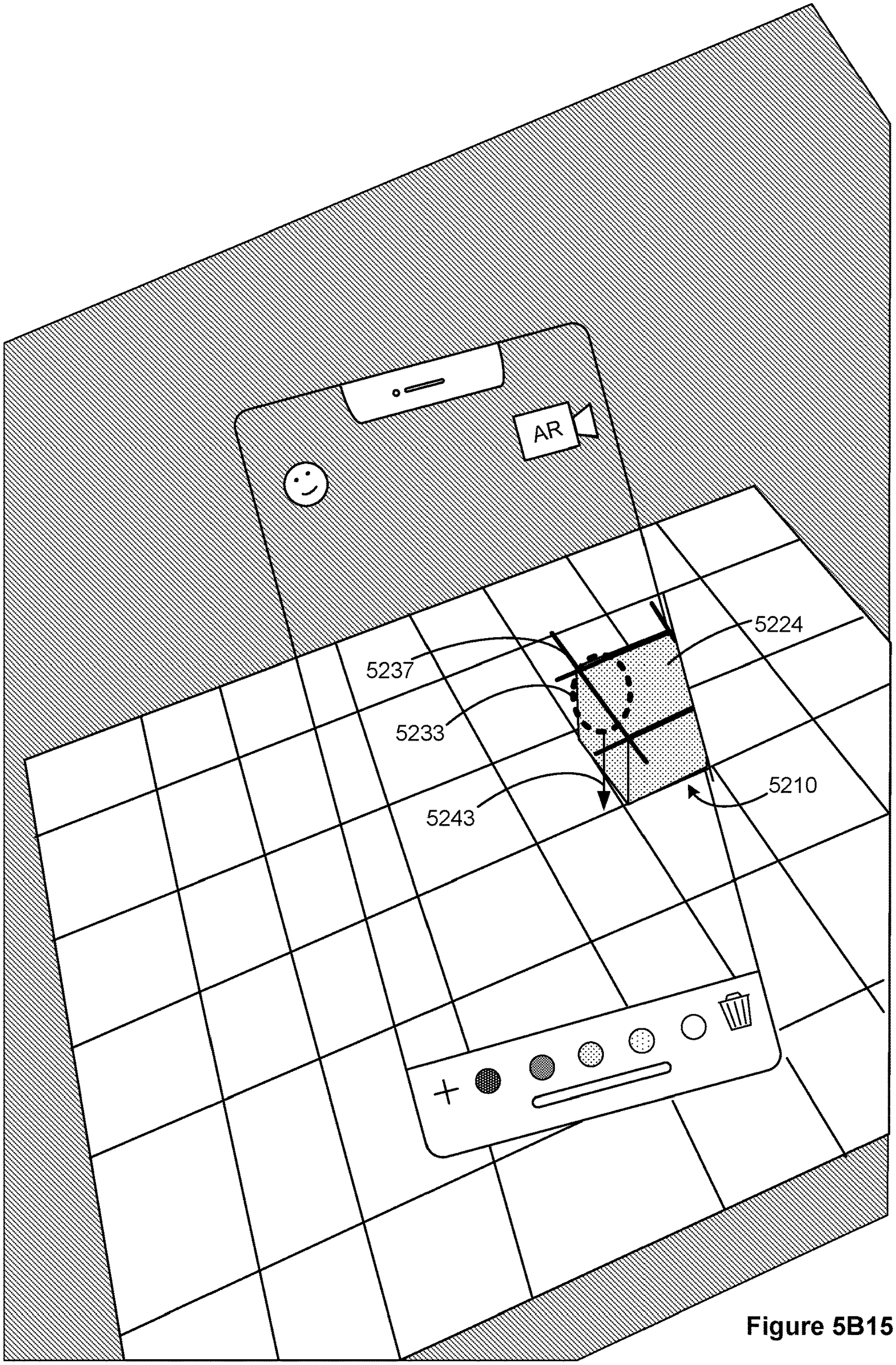
Figure 5B15

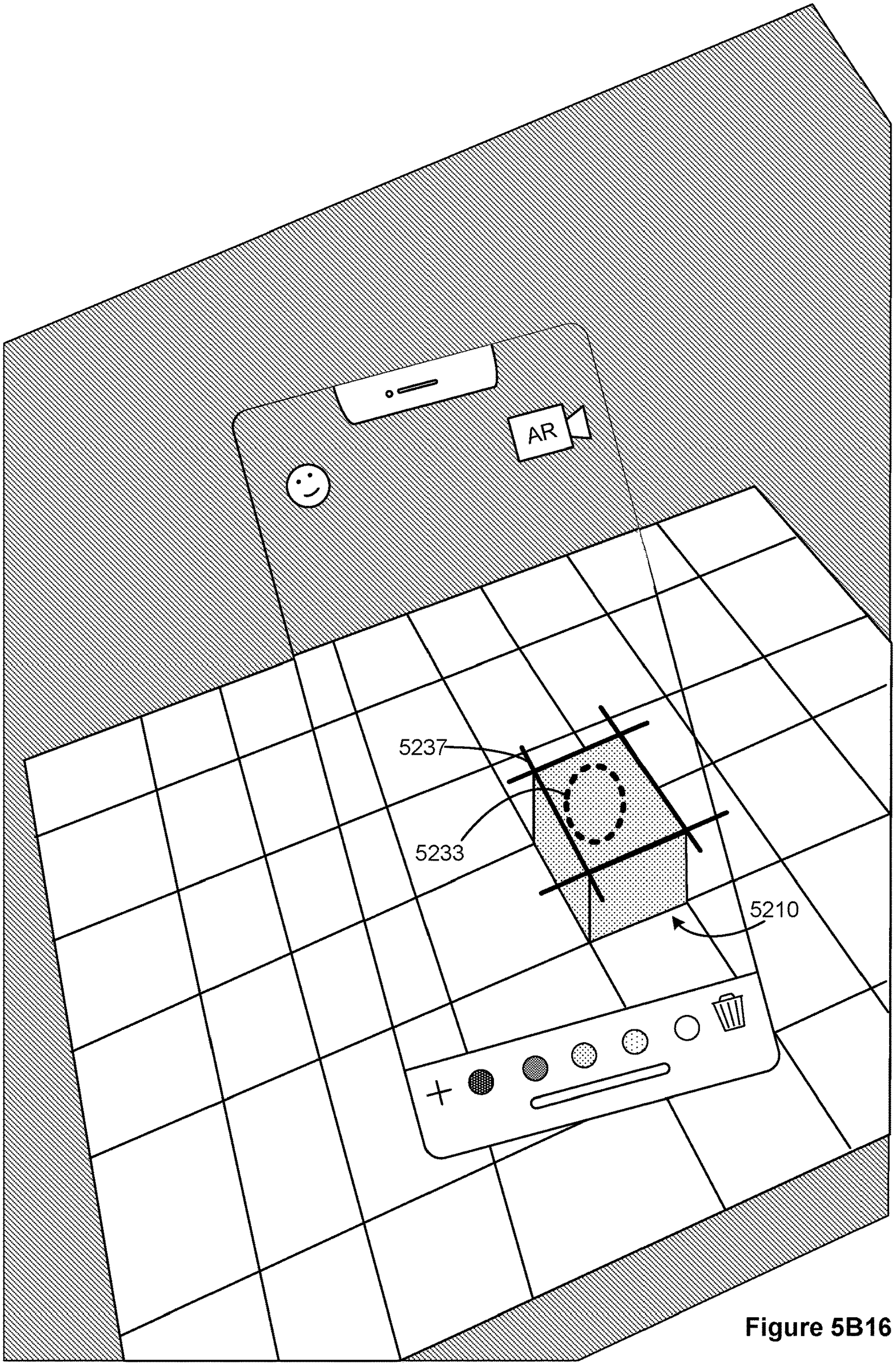
Figure 5B16

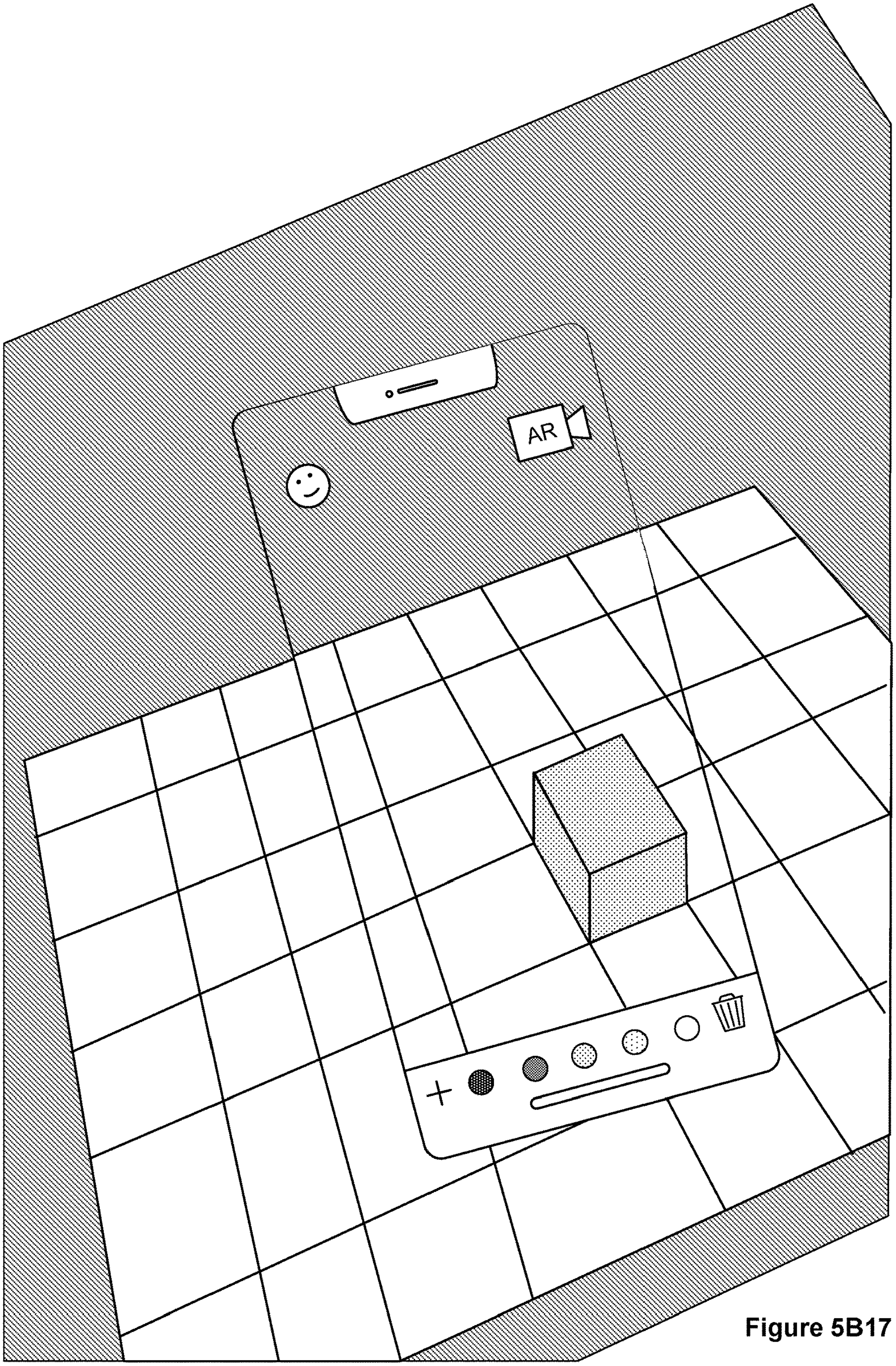
Figure 5B17

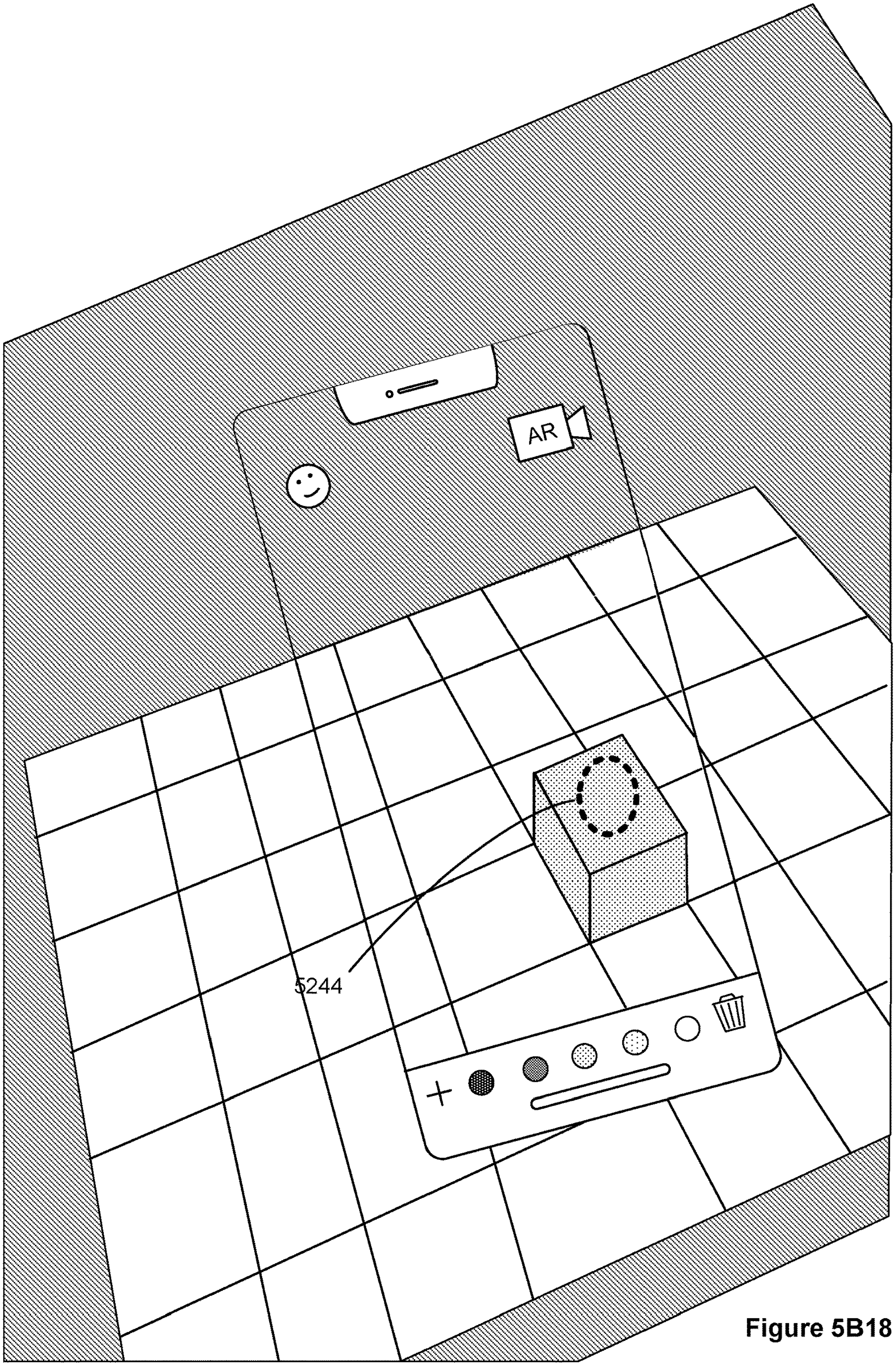
Figure 5B18

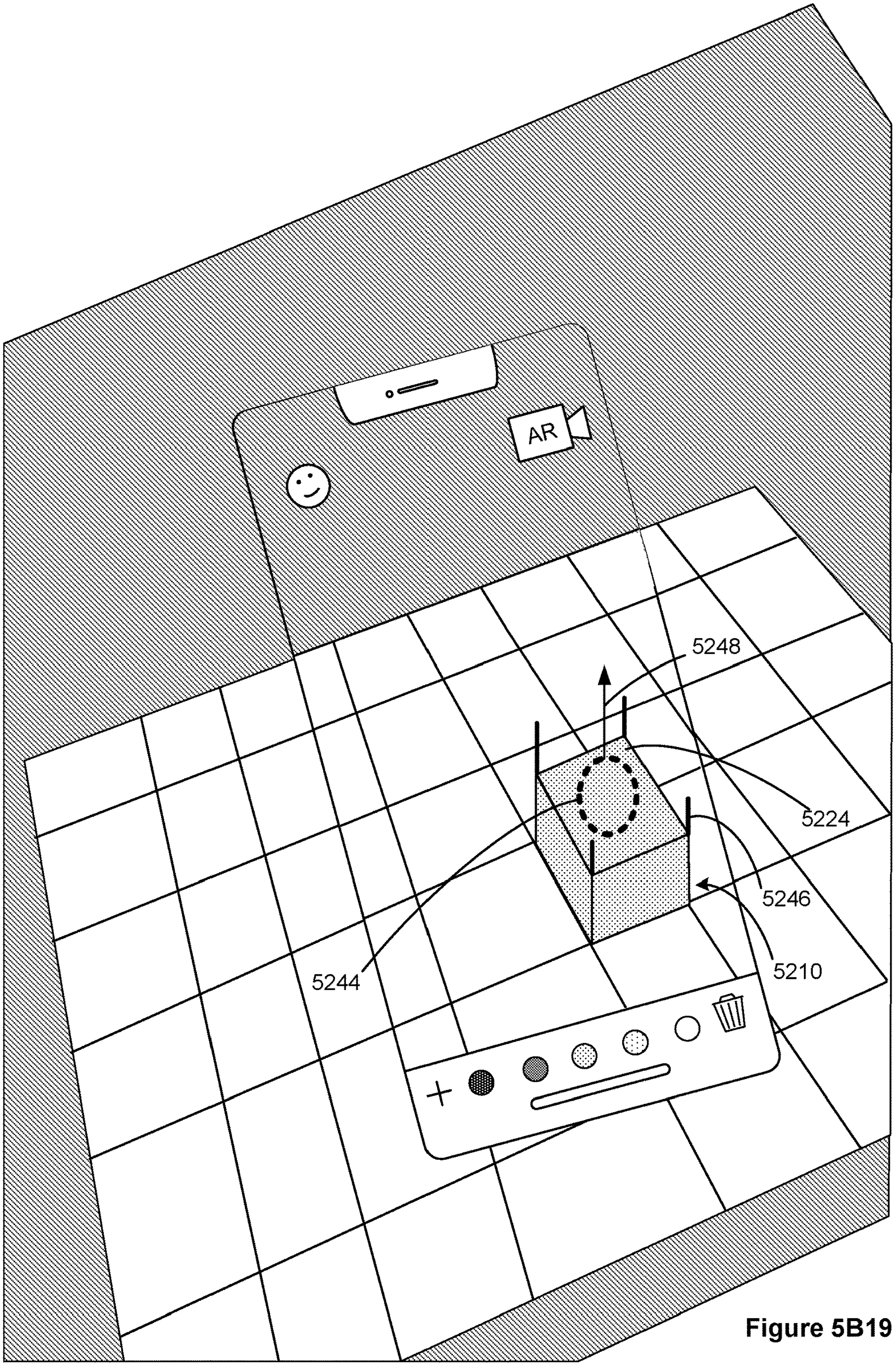
Figure 5B19

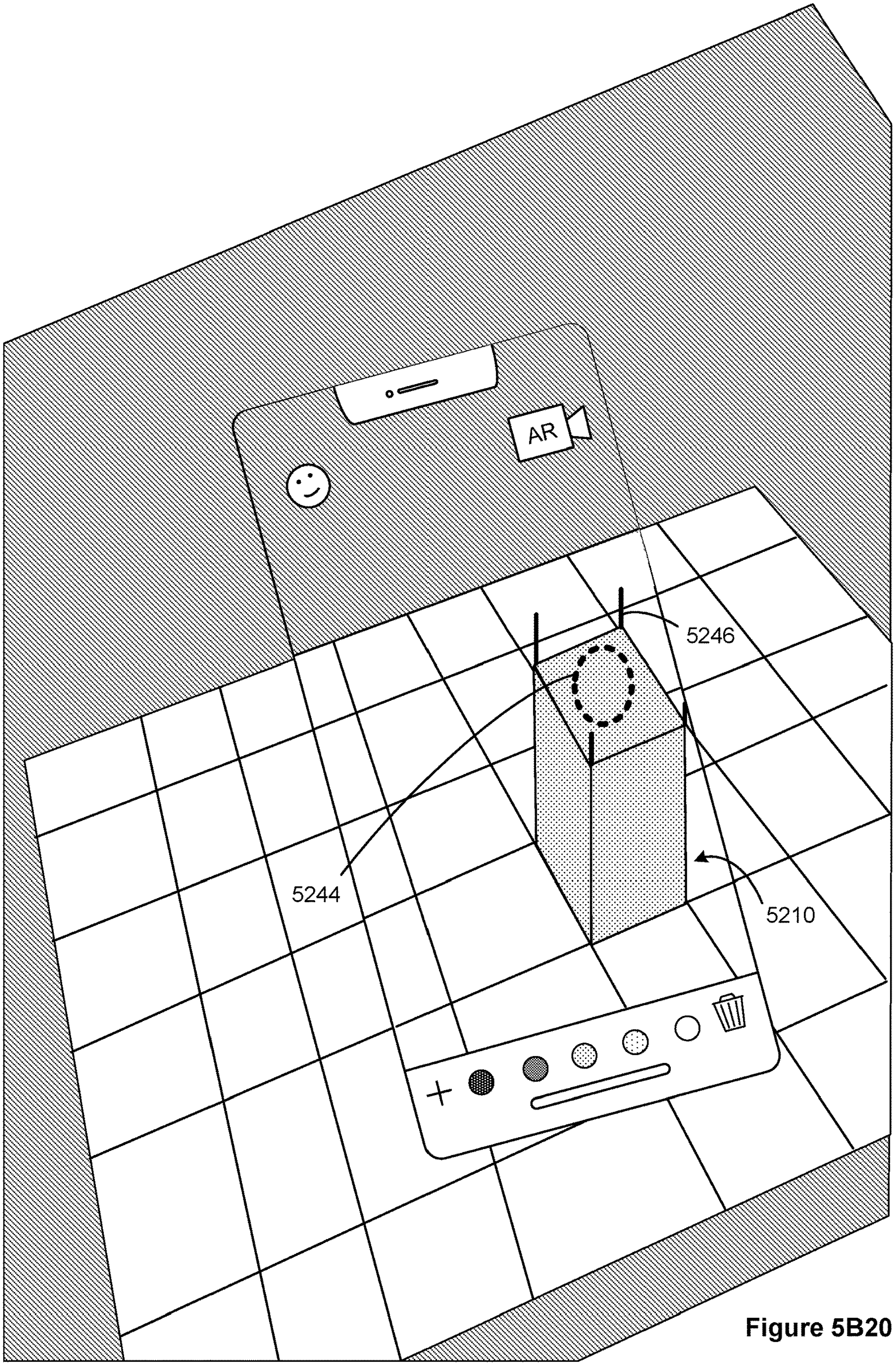
Figure 5B20

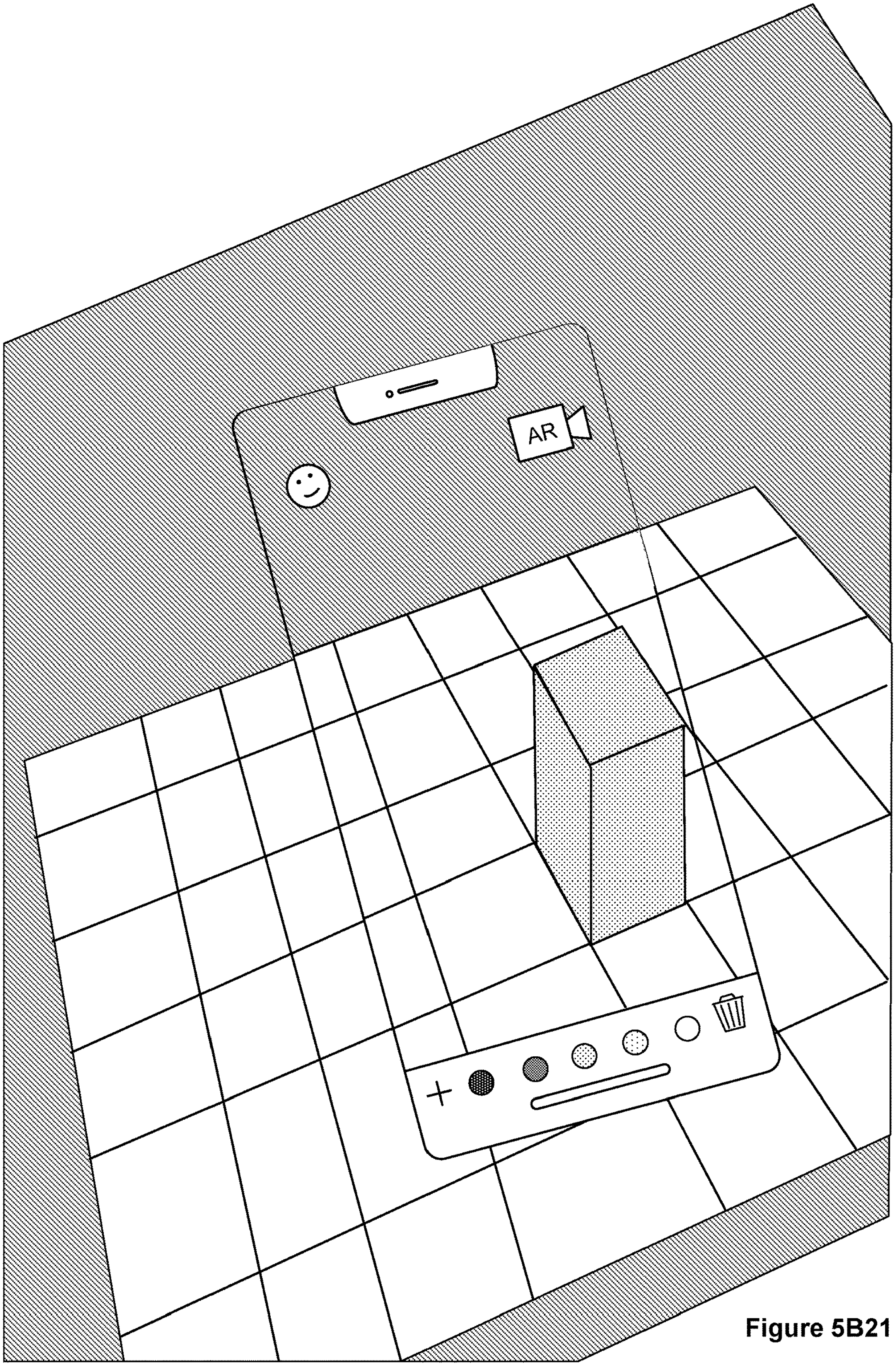
Figure 5B21

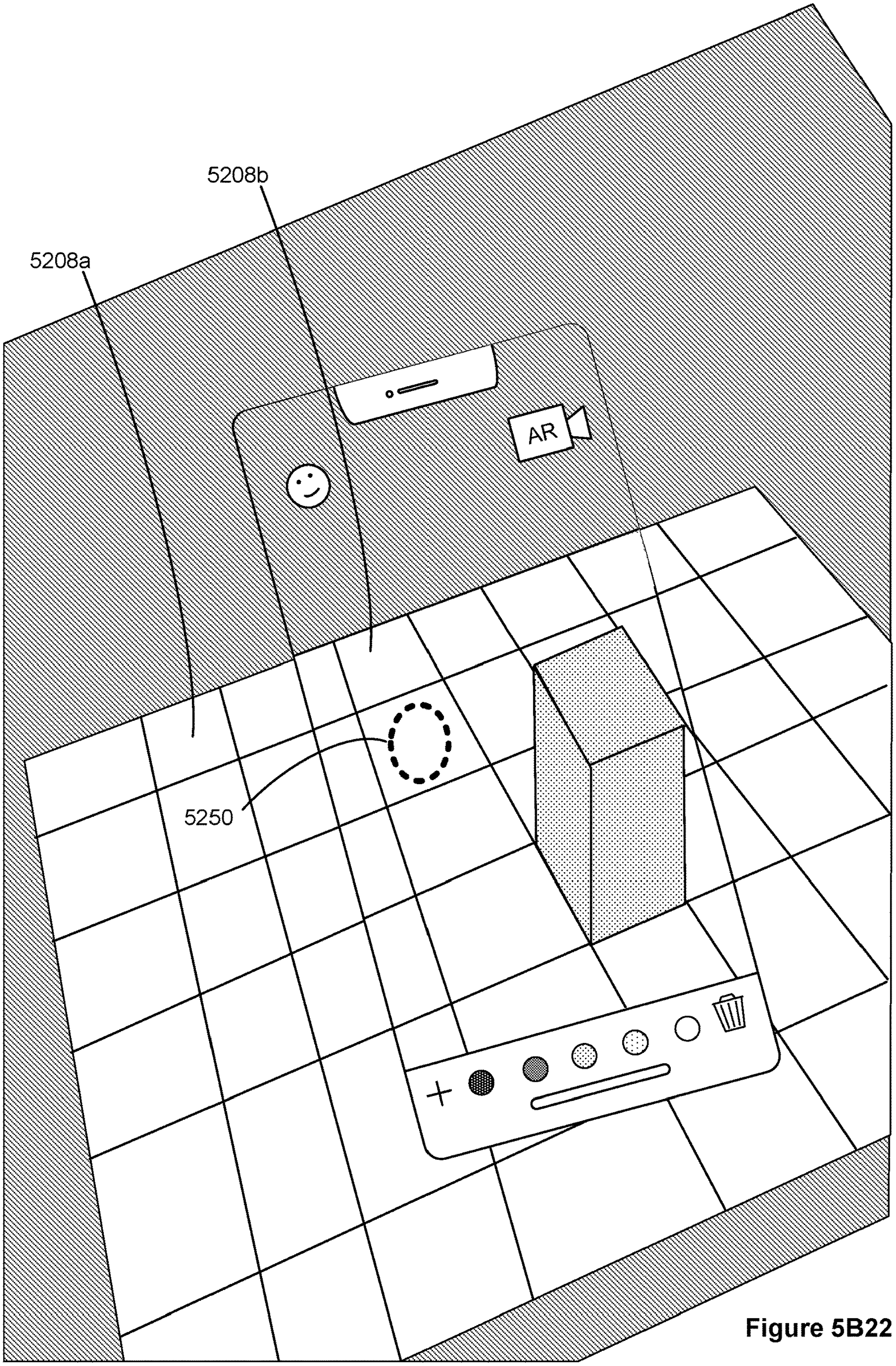
Figure 5B22

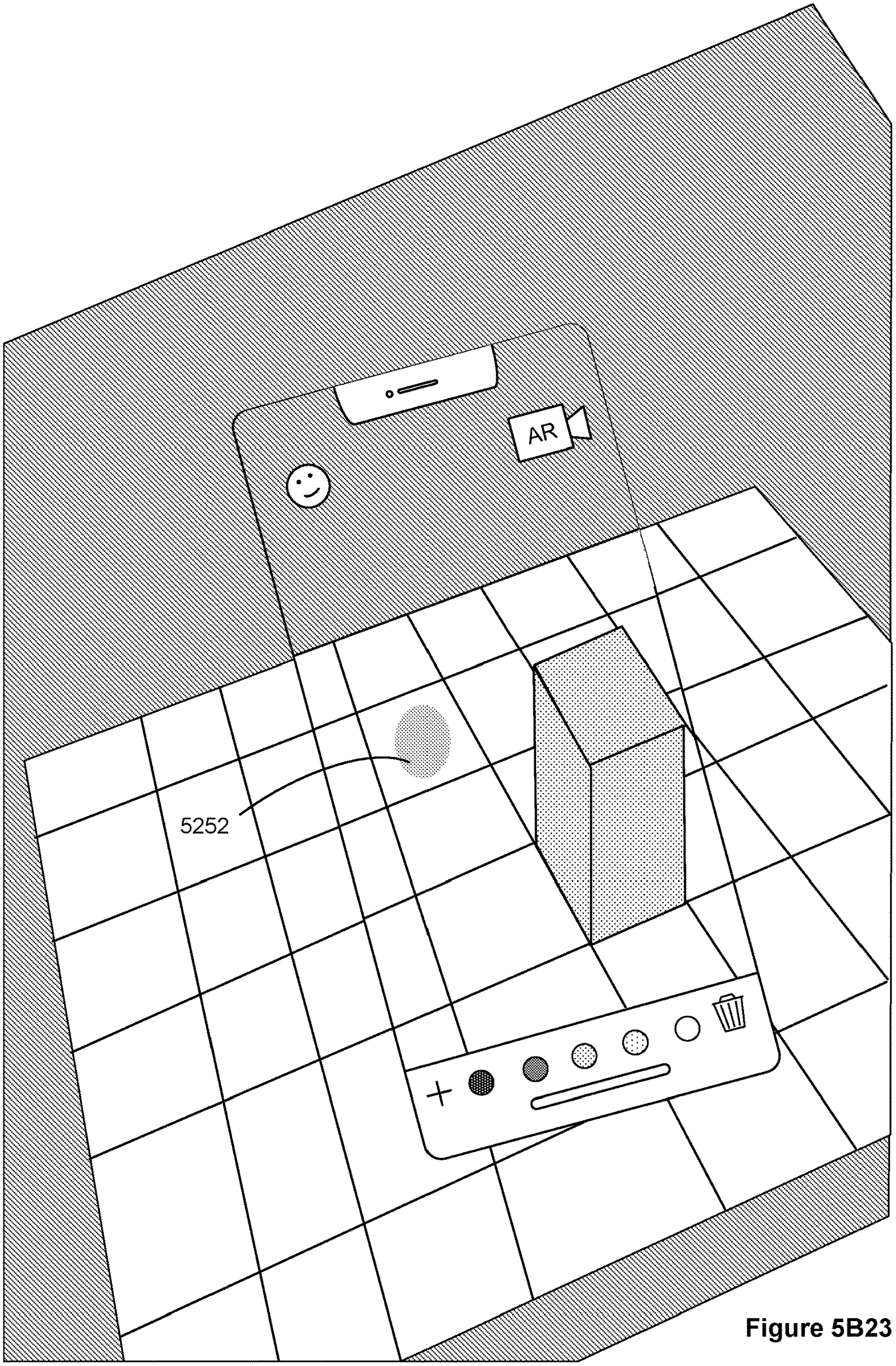
Figure 5B23

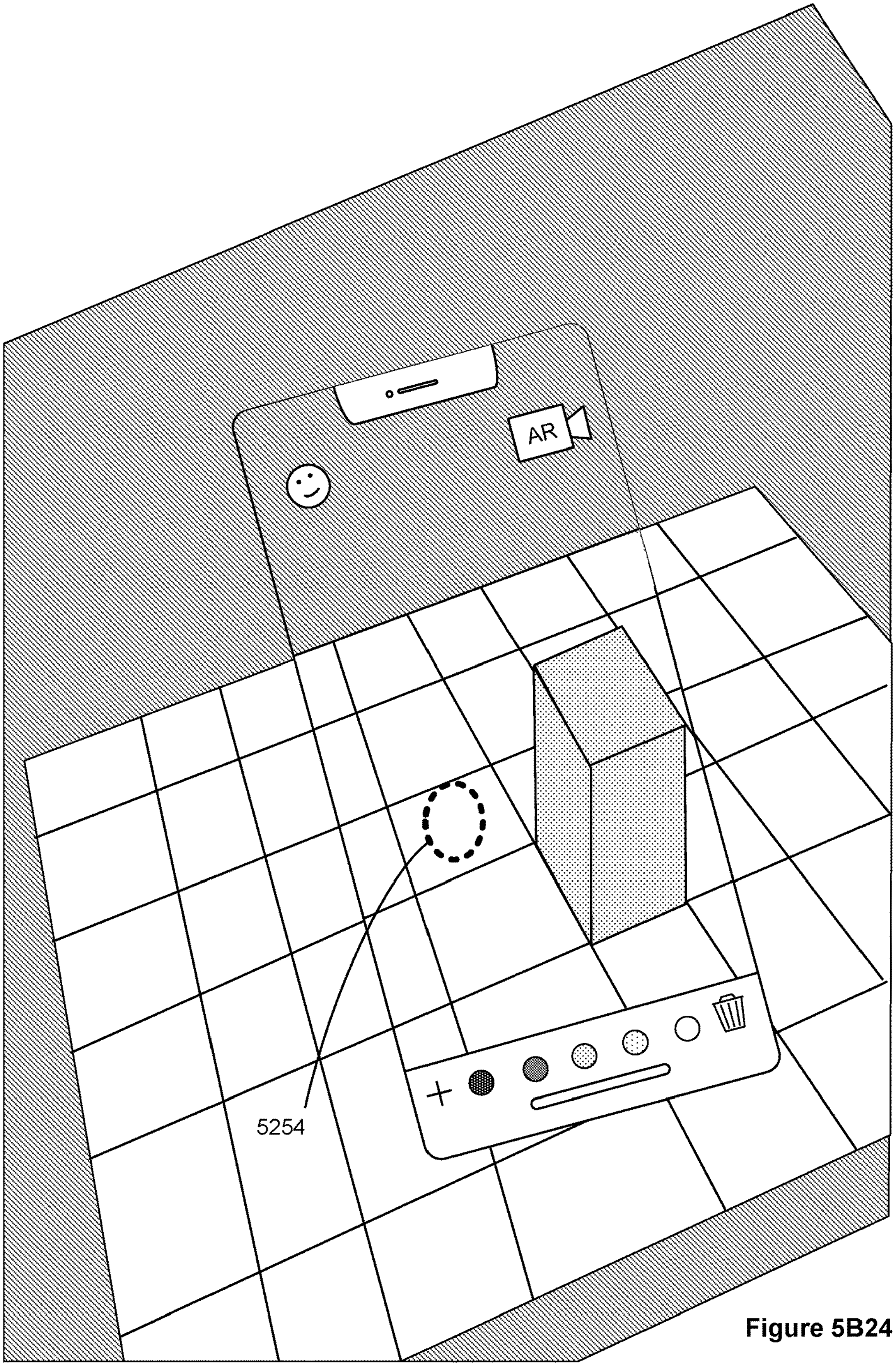
Figure 5B24

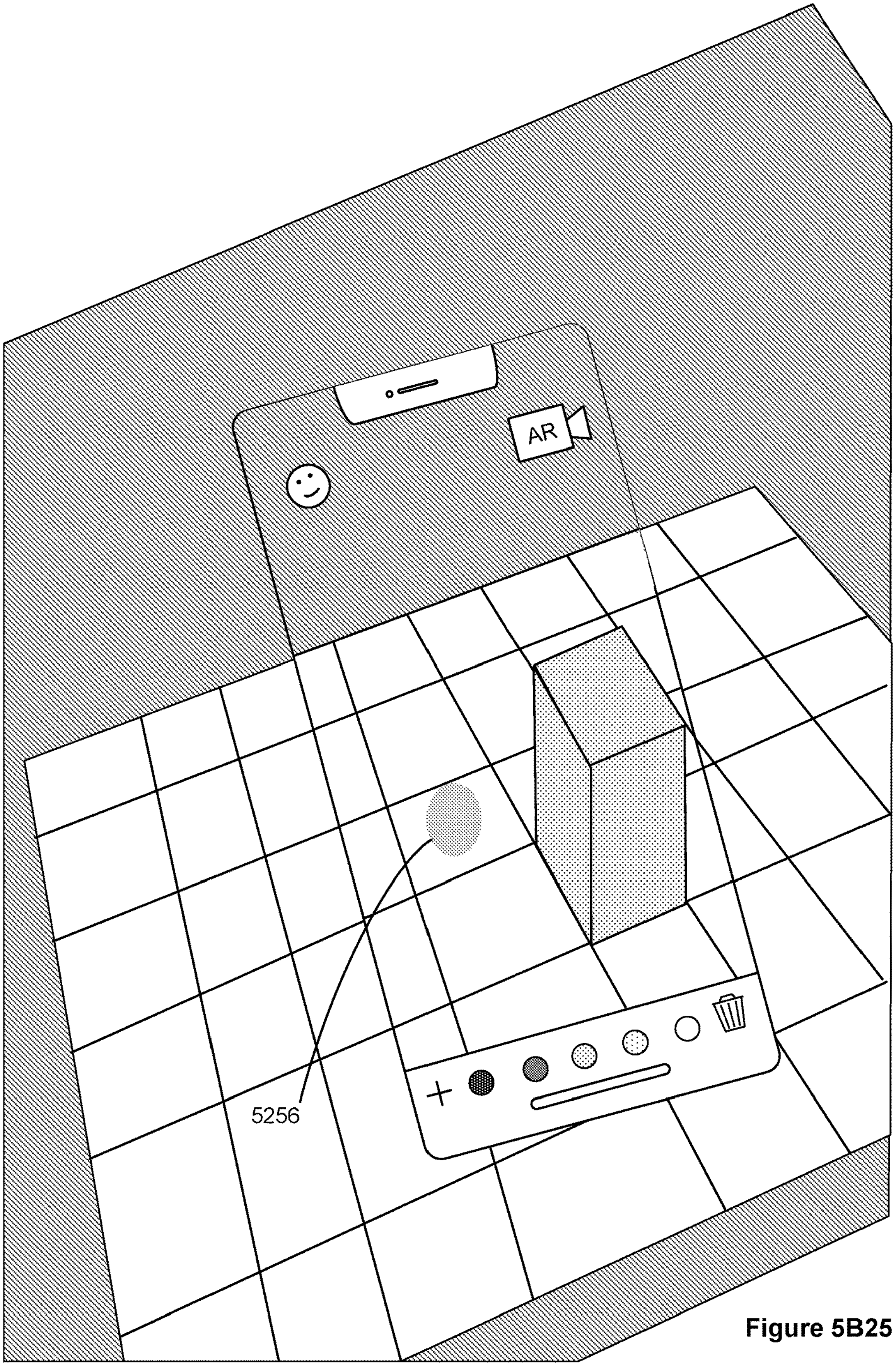
Figure 5B25

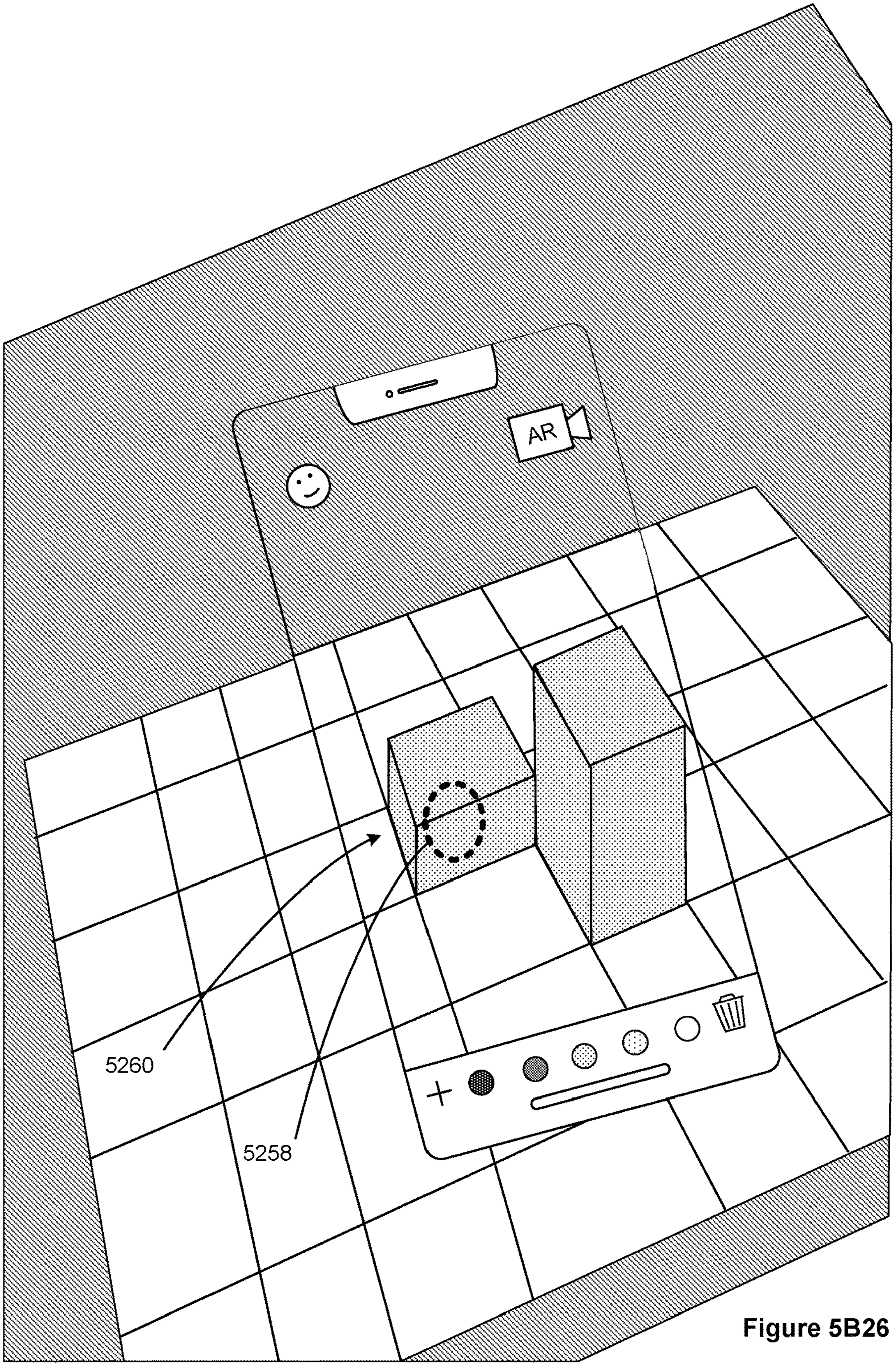
Figure 5B26

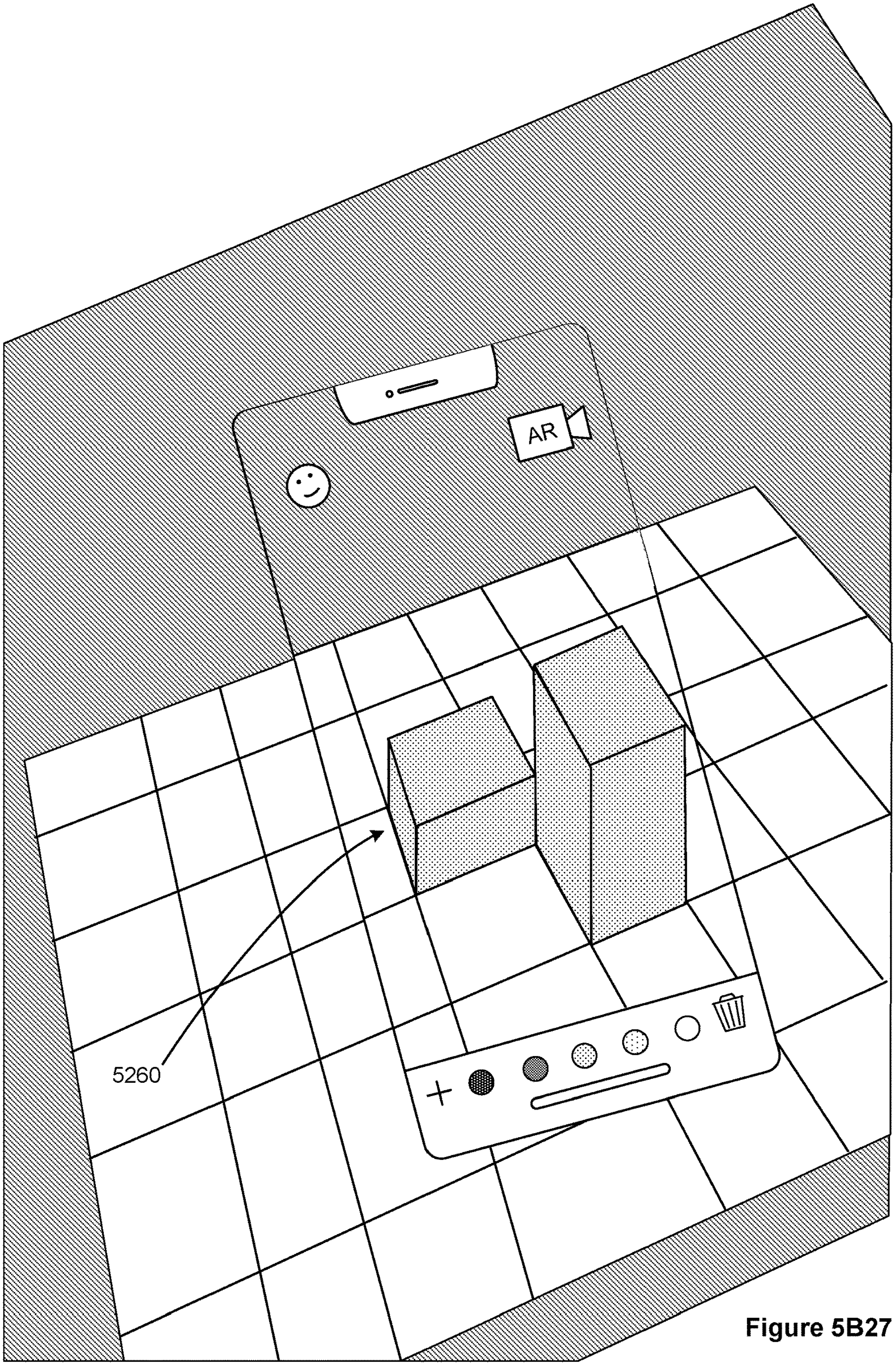
Figure 5B27

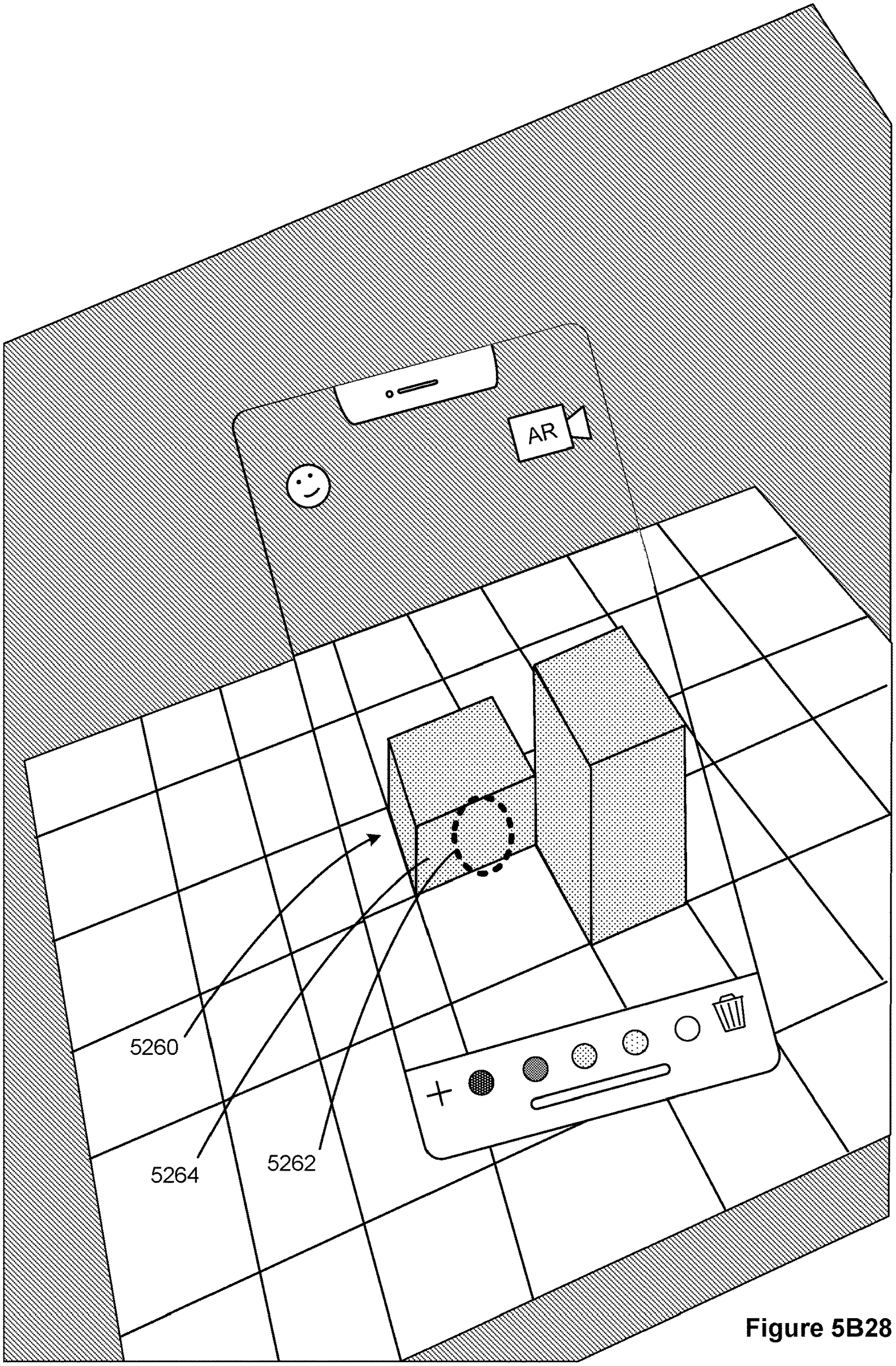
Figure 5B28

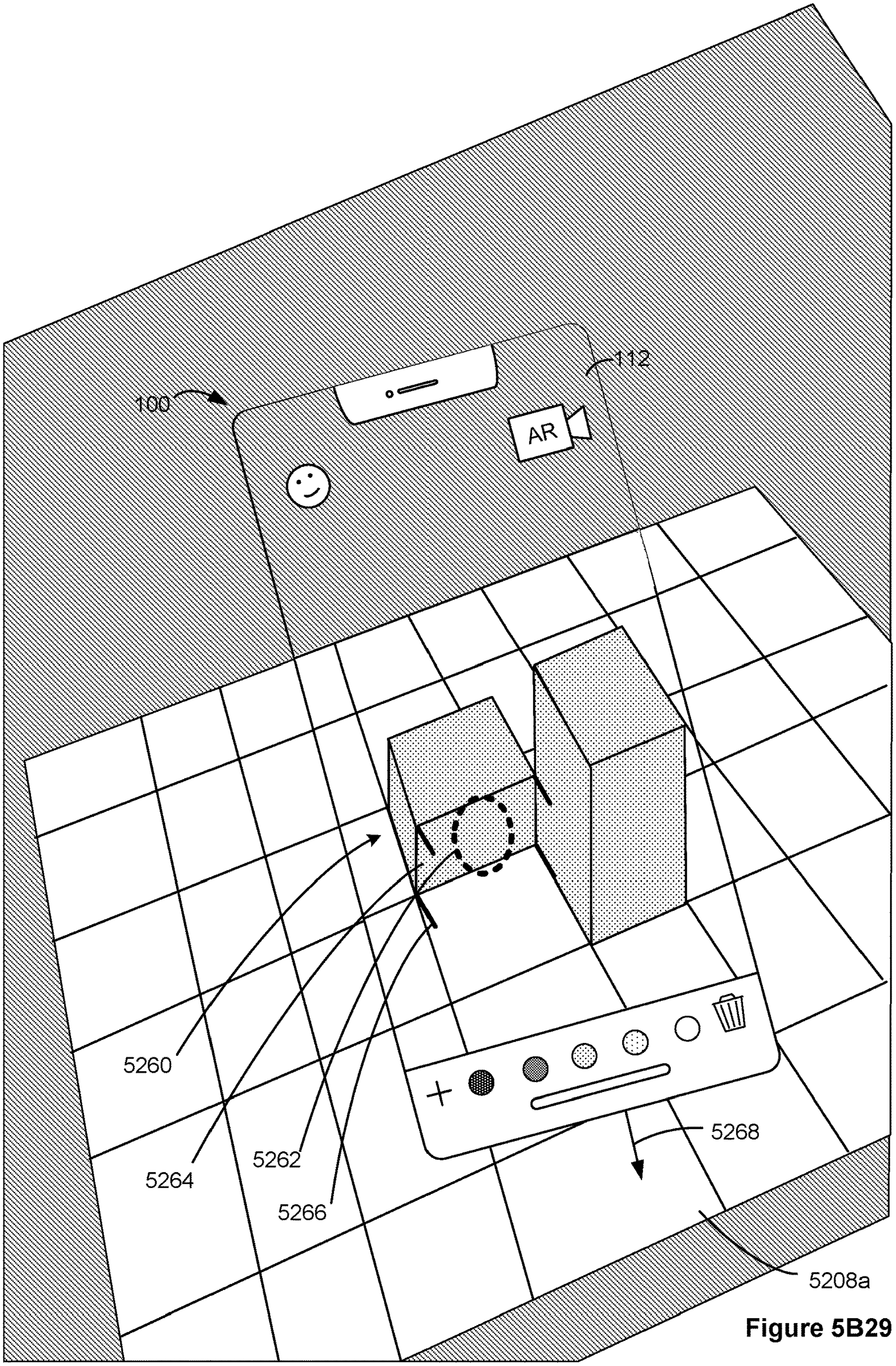
Figure 5B29

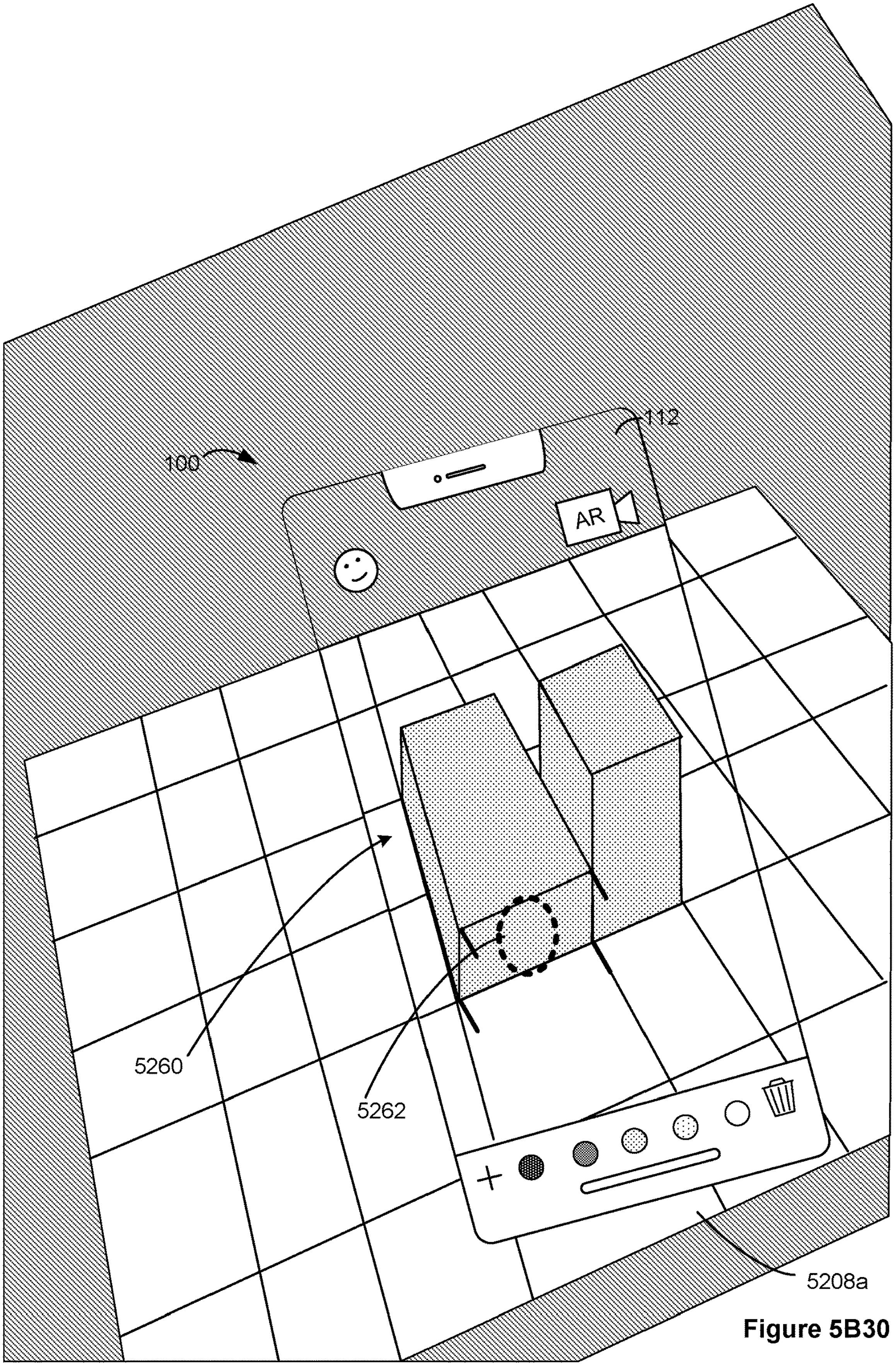
Figure 5B30

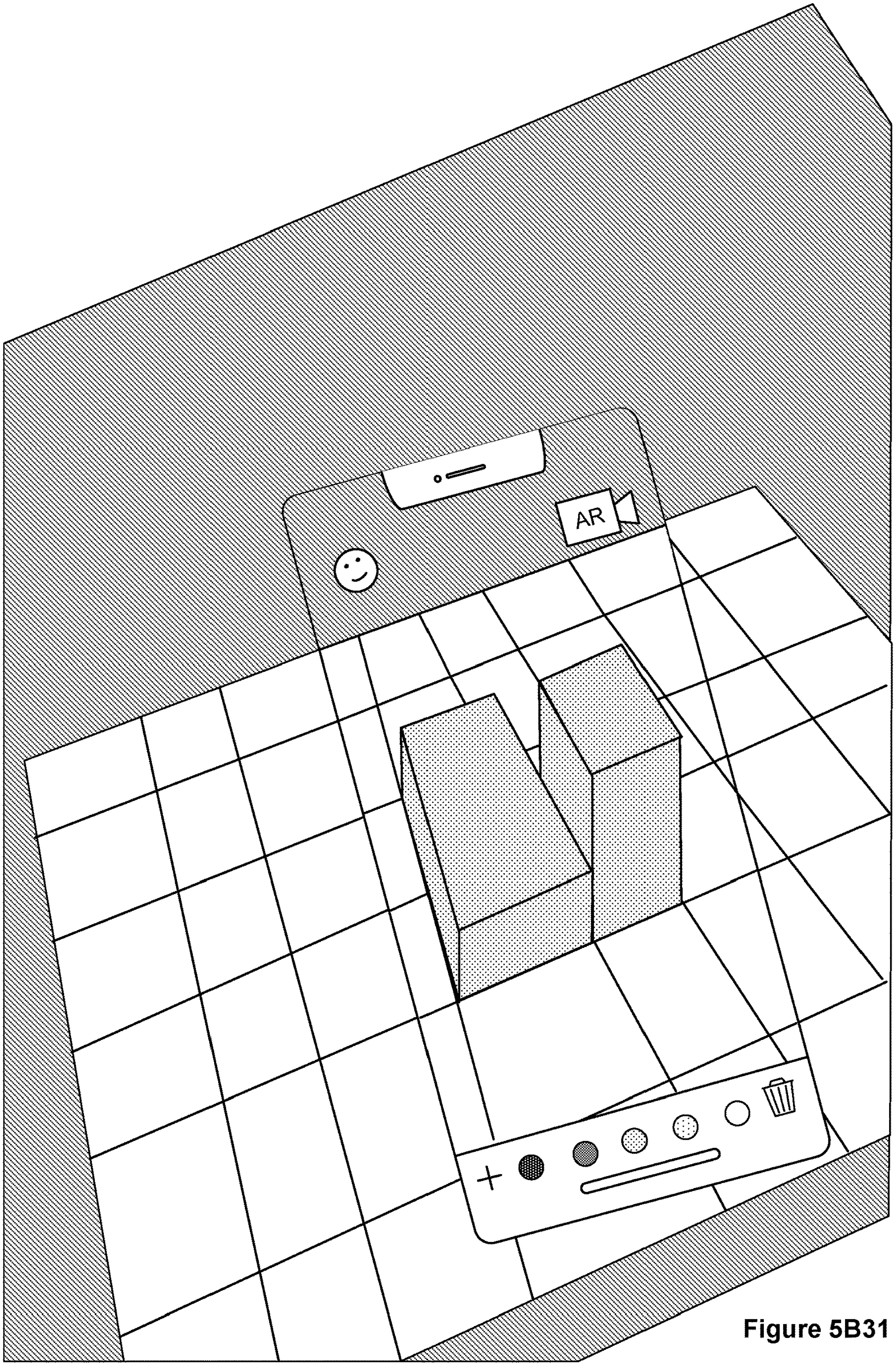
Figure 5B31

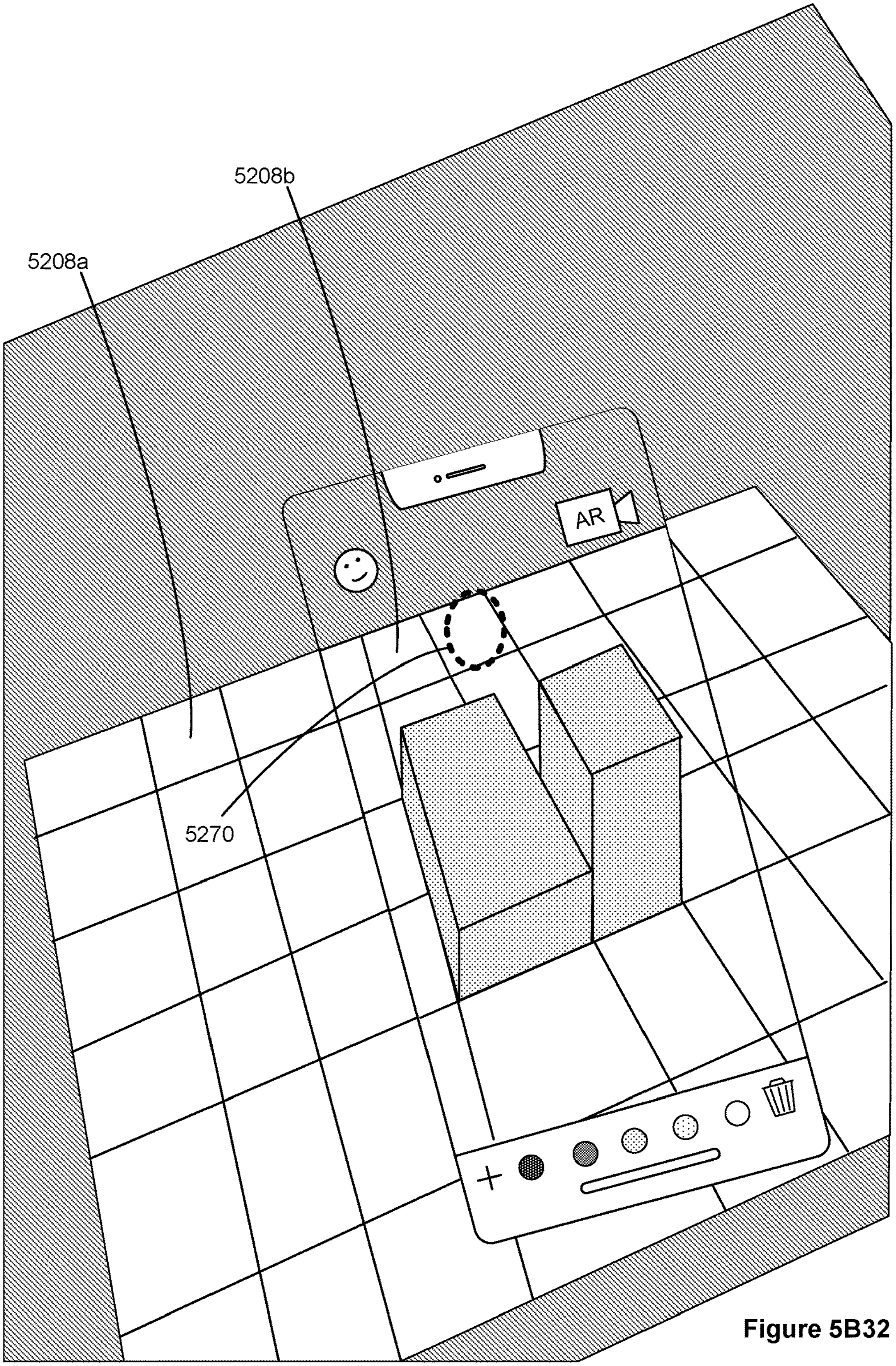
Figure 5B32

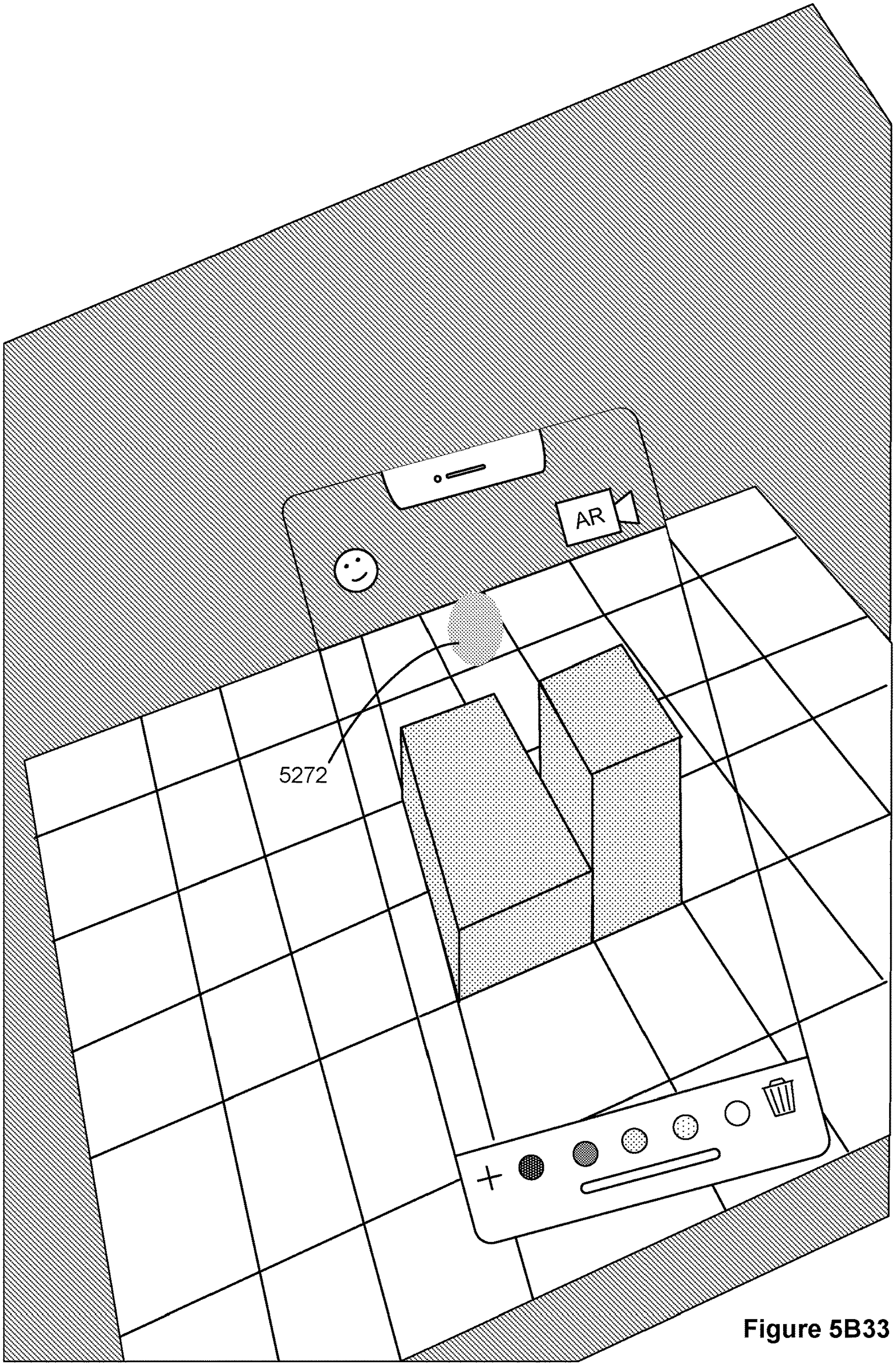
Figure 5B33

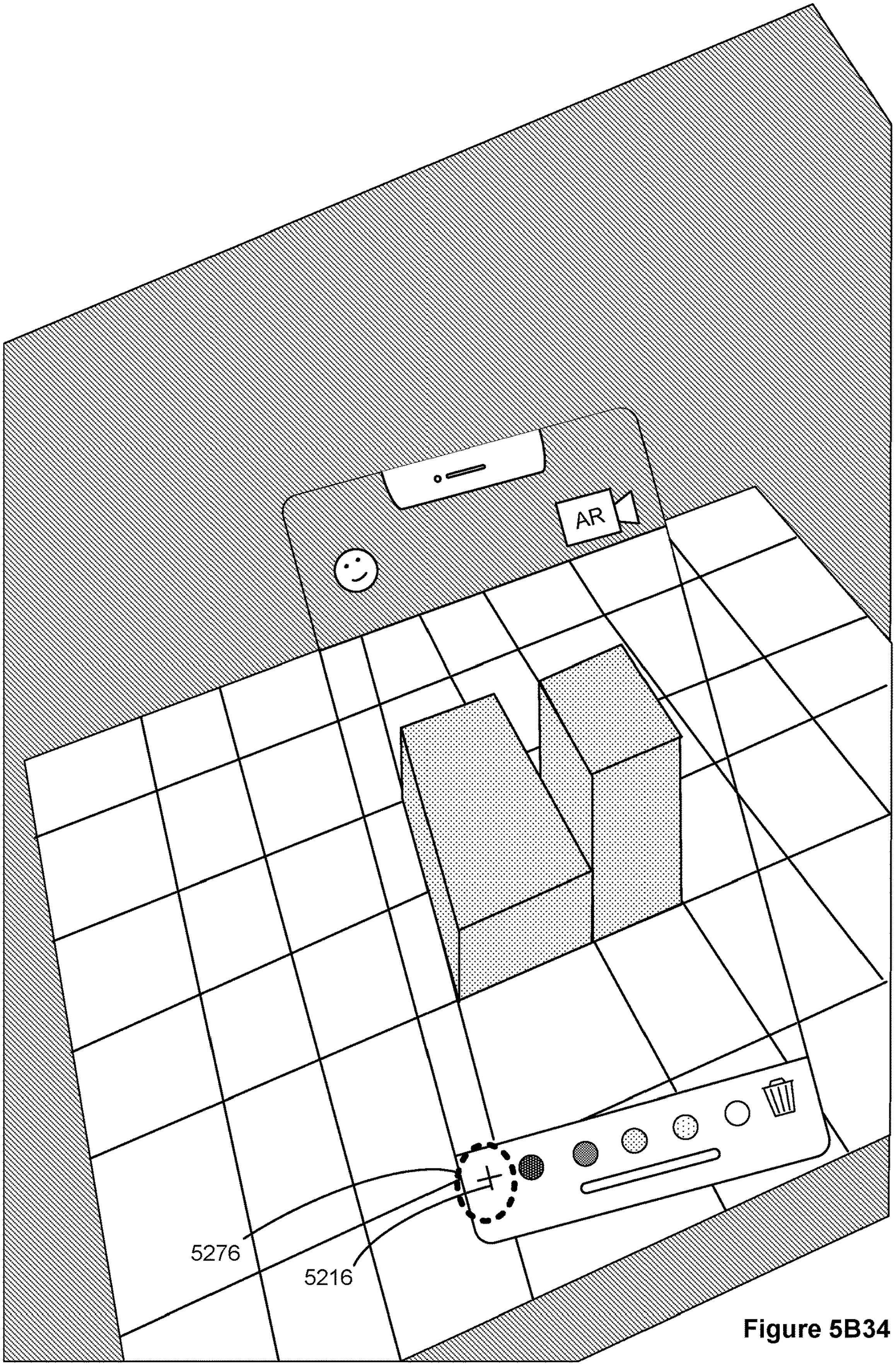
Figure 5B34

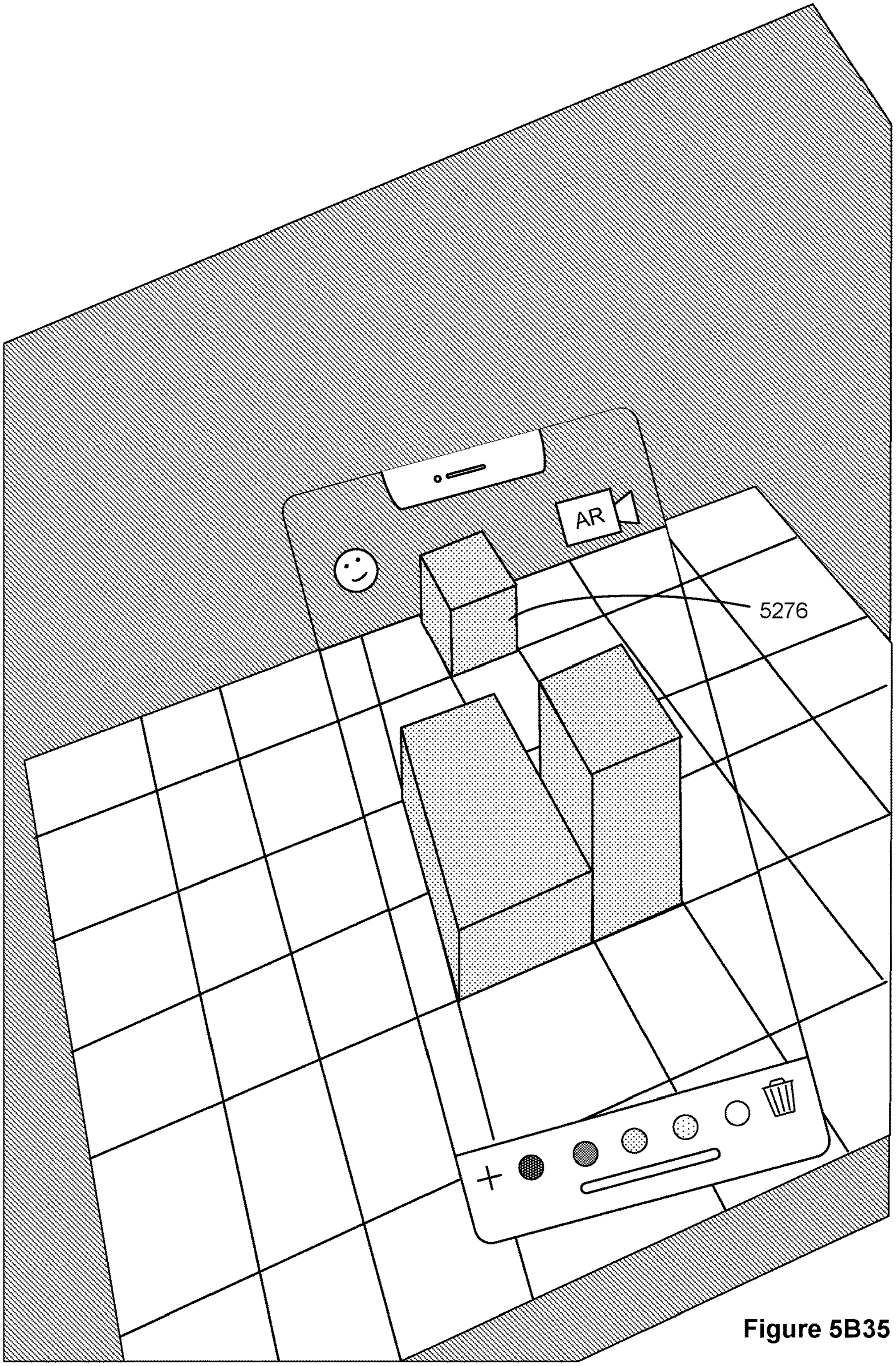
Figure 5B35

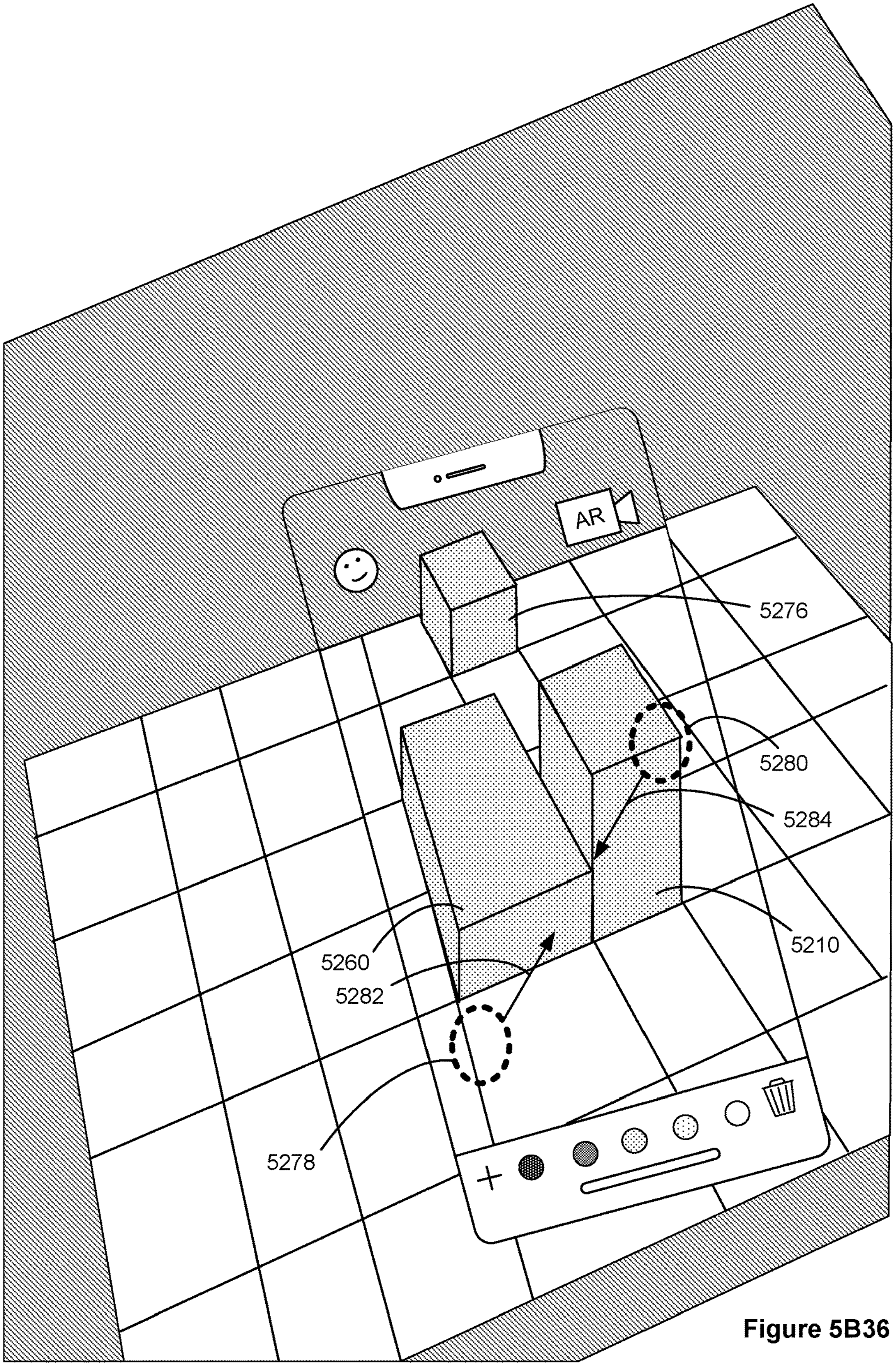
Figure 5B36

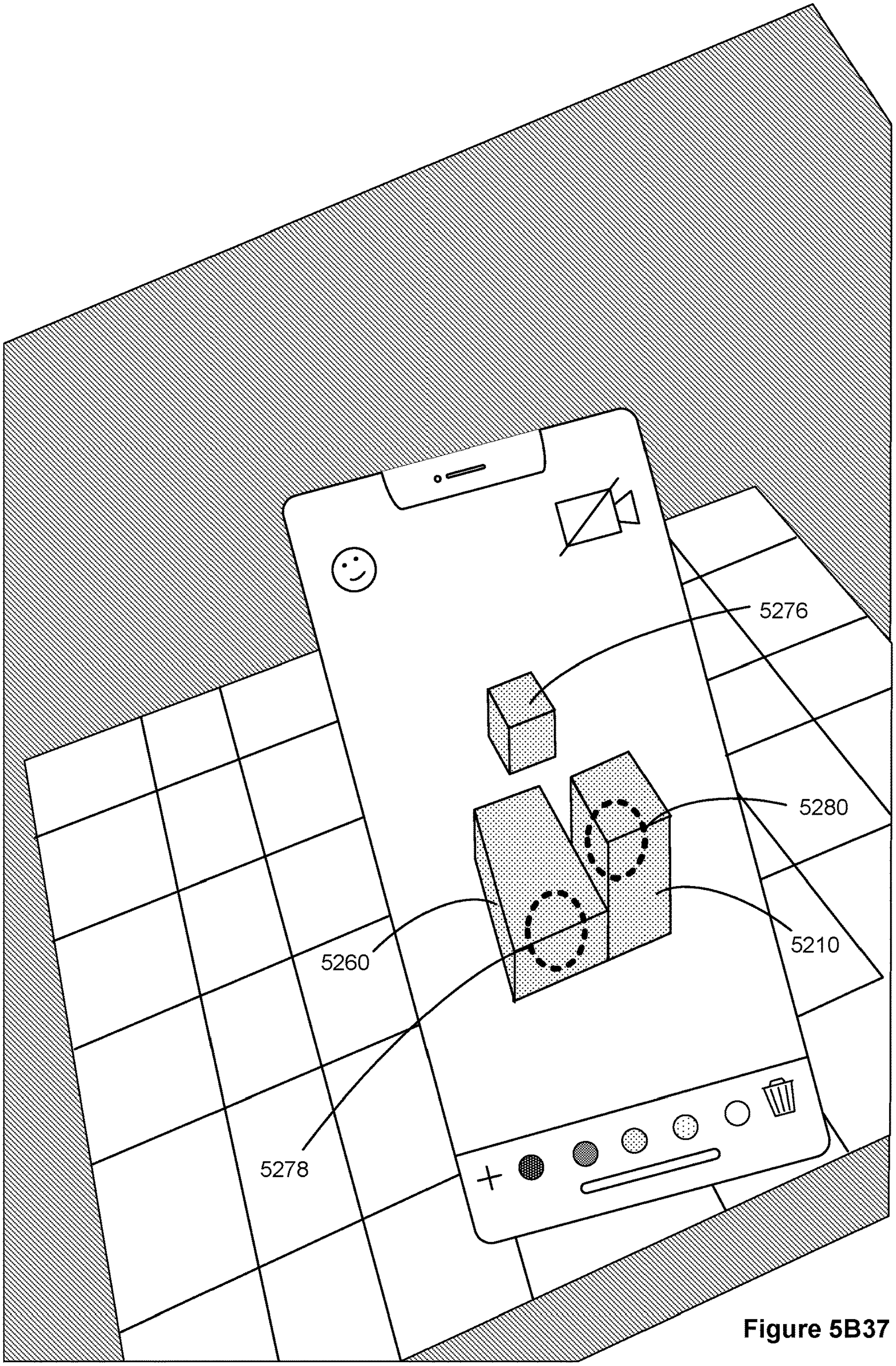
Figure 5B37

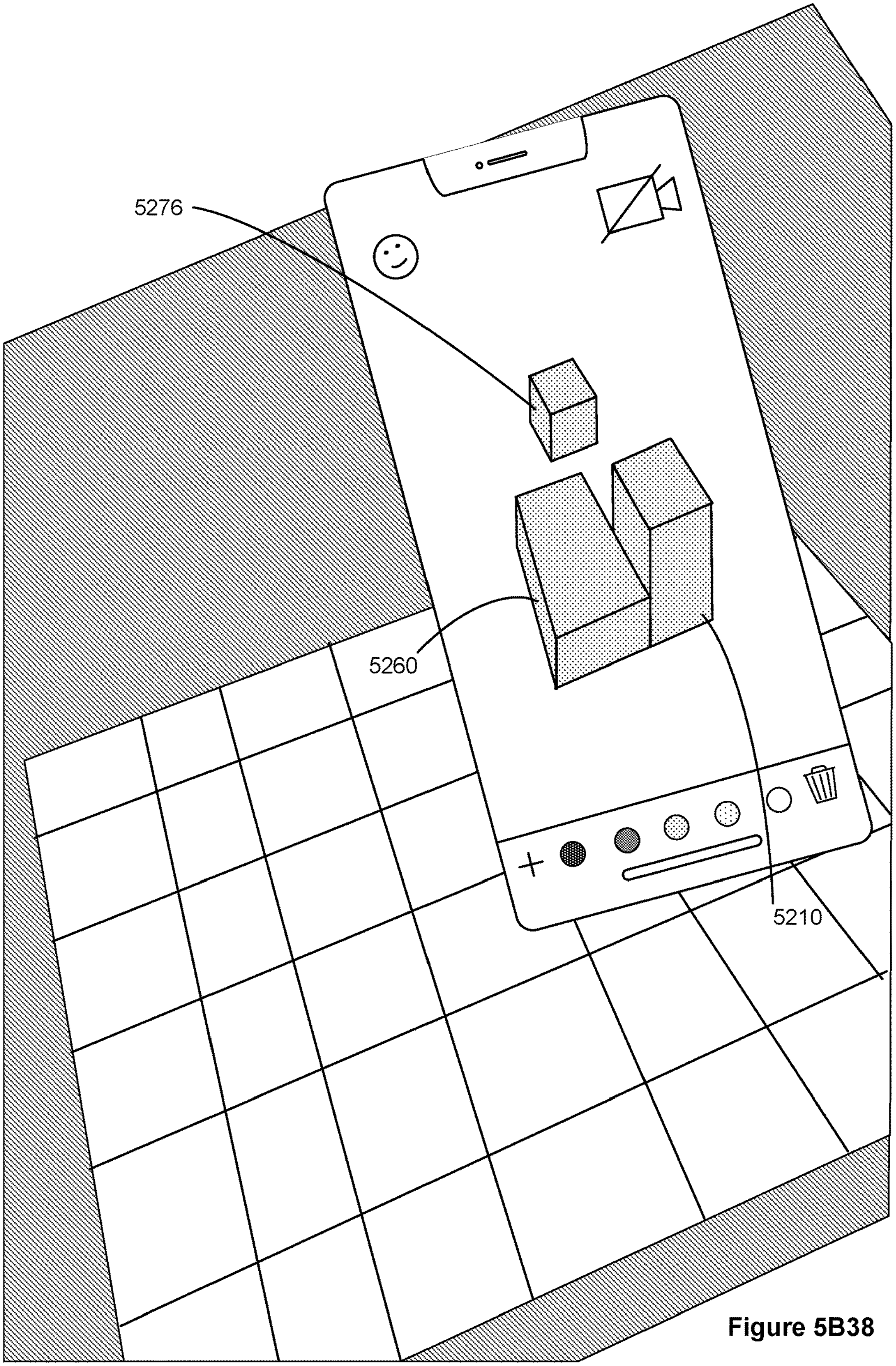
Figure 5B38

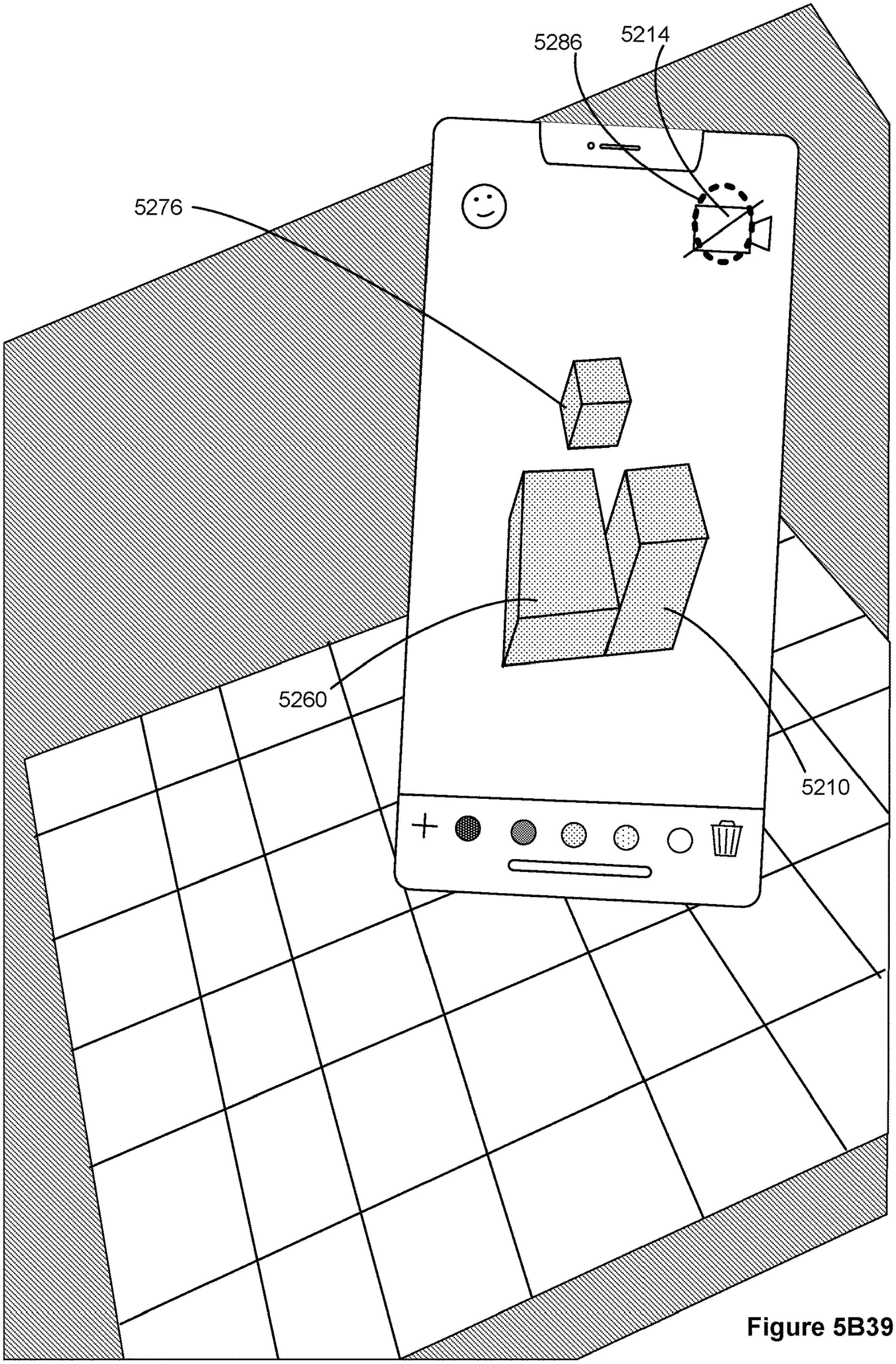
Figure 5B39

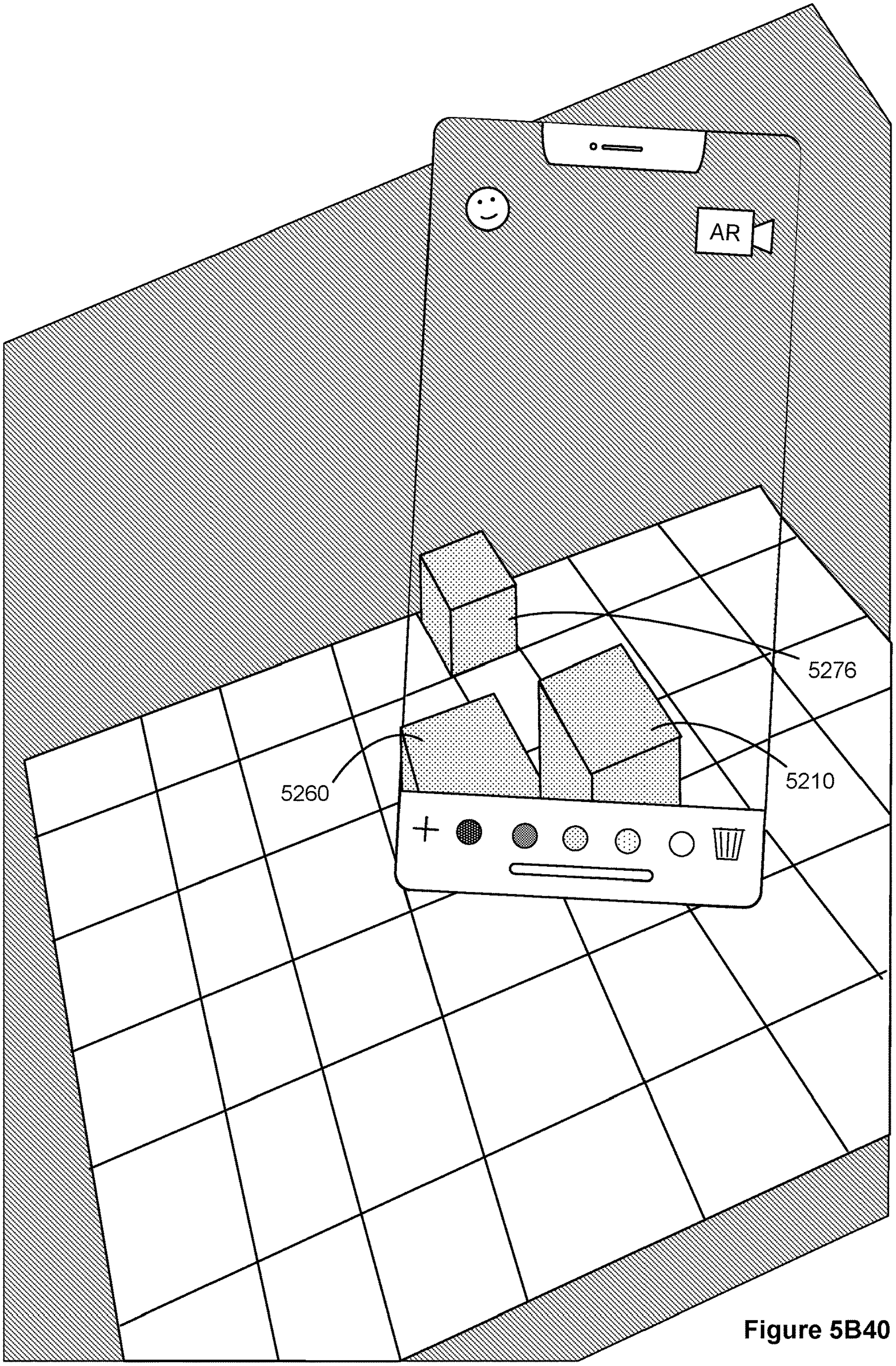
Figure 5B40

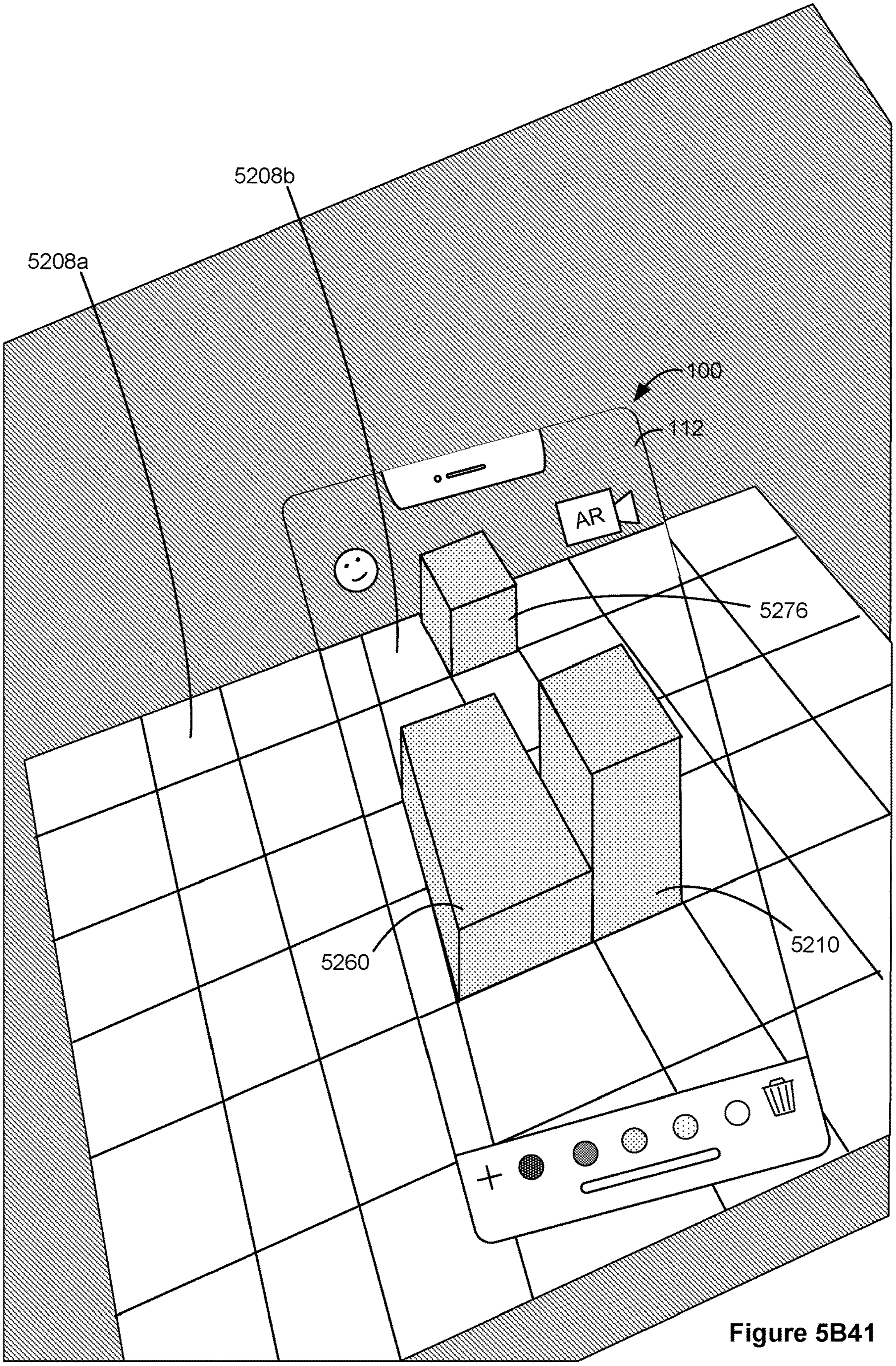
Figure 5B41

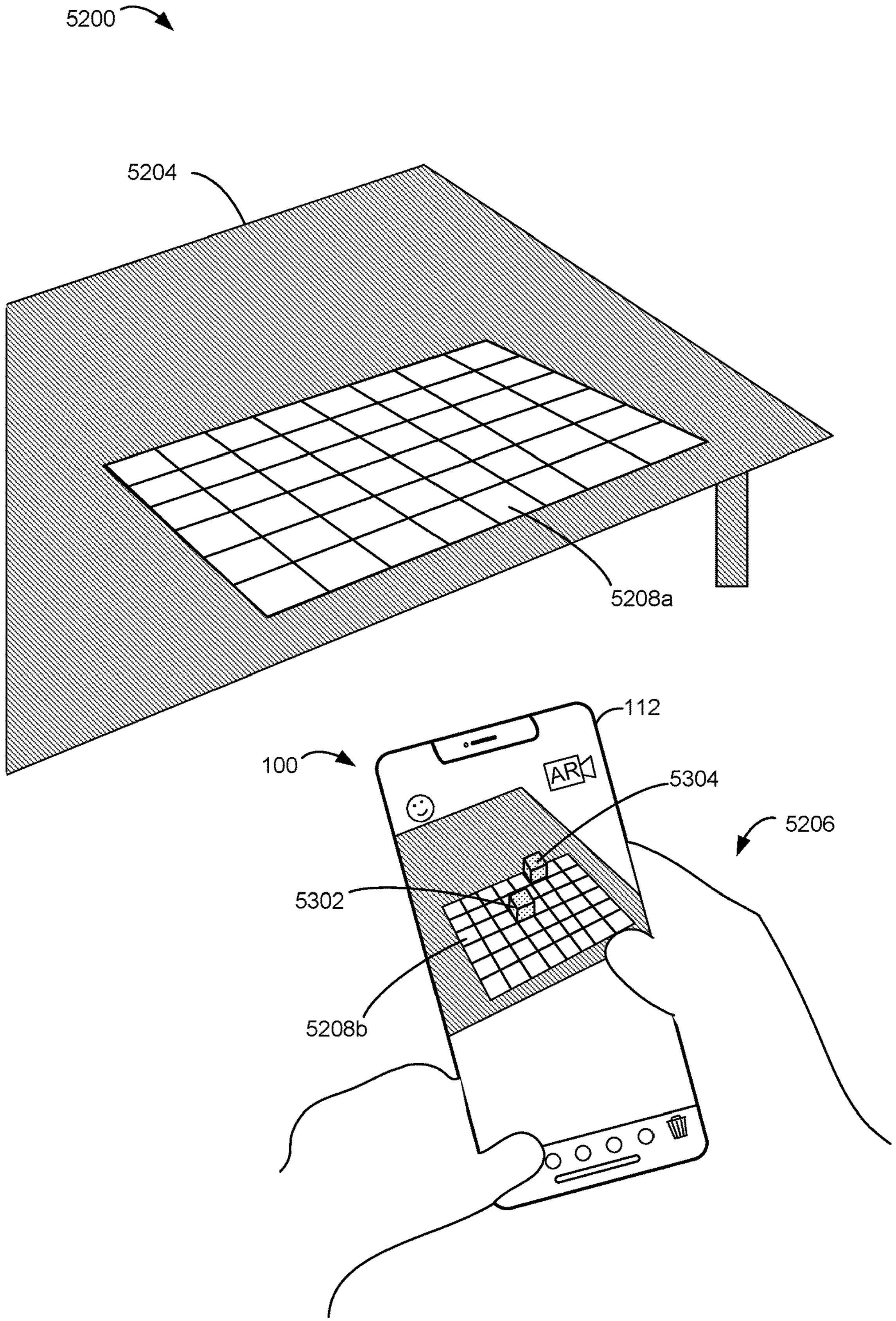
Figure 5C1

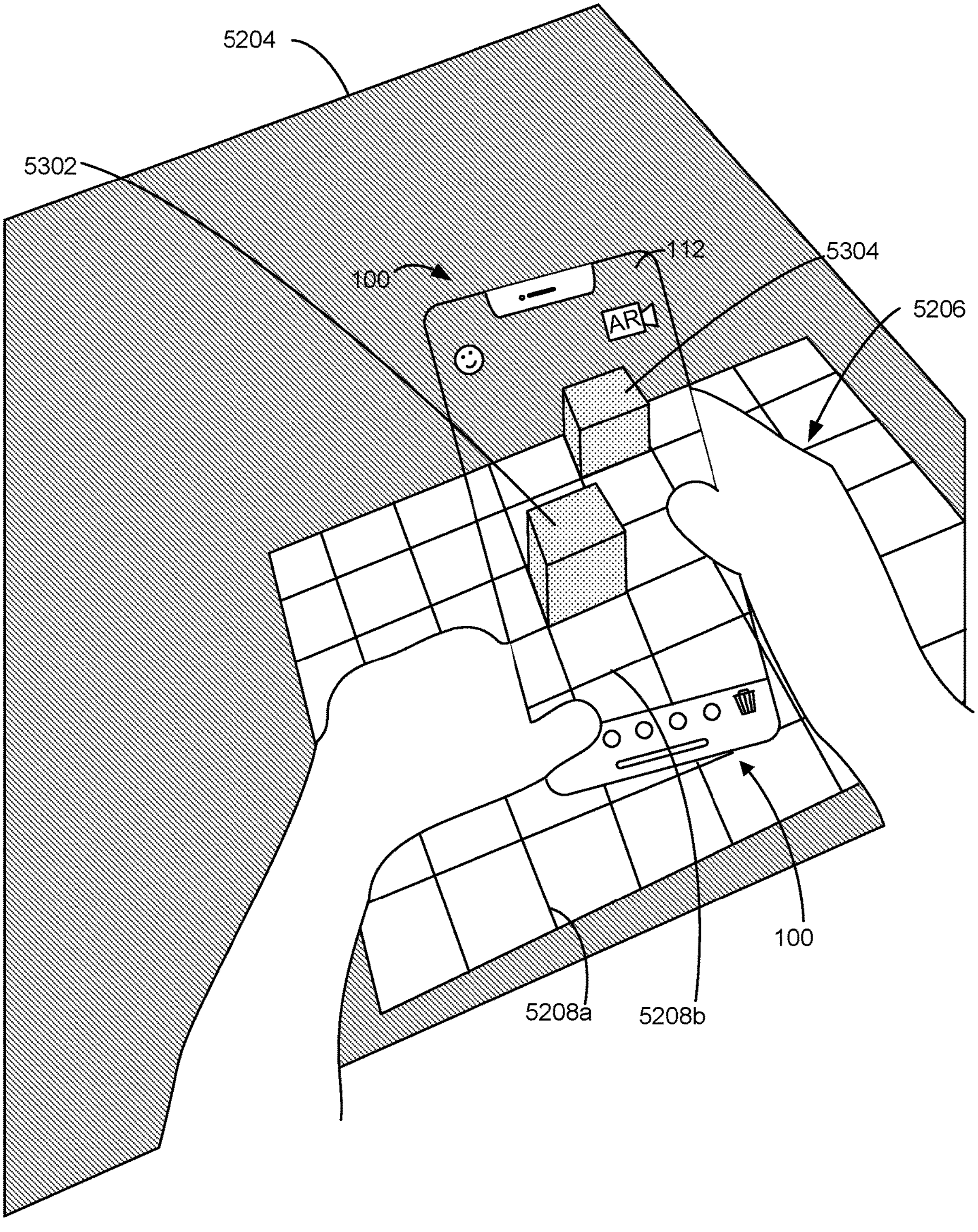
Figure 5C2

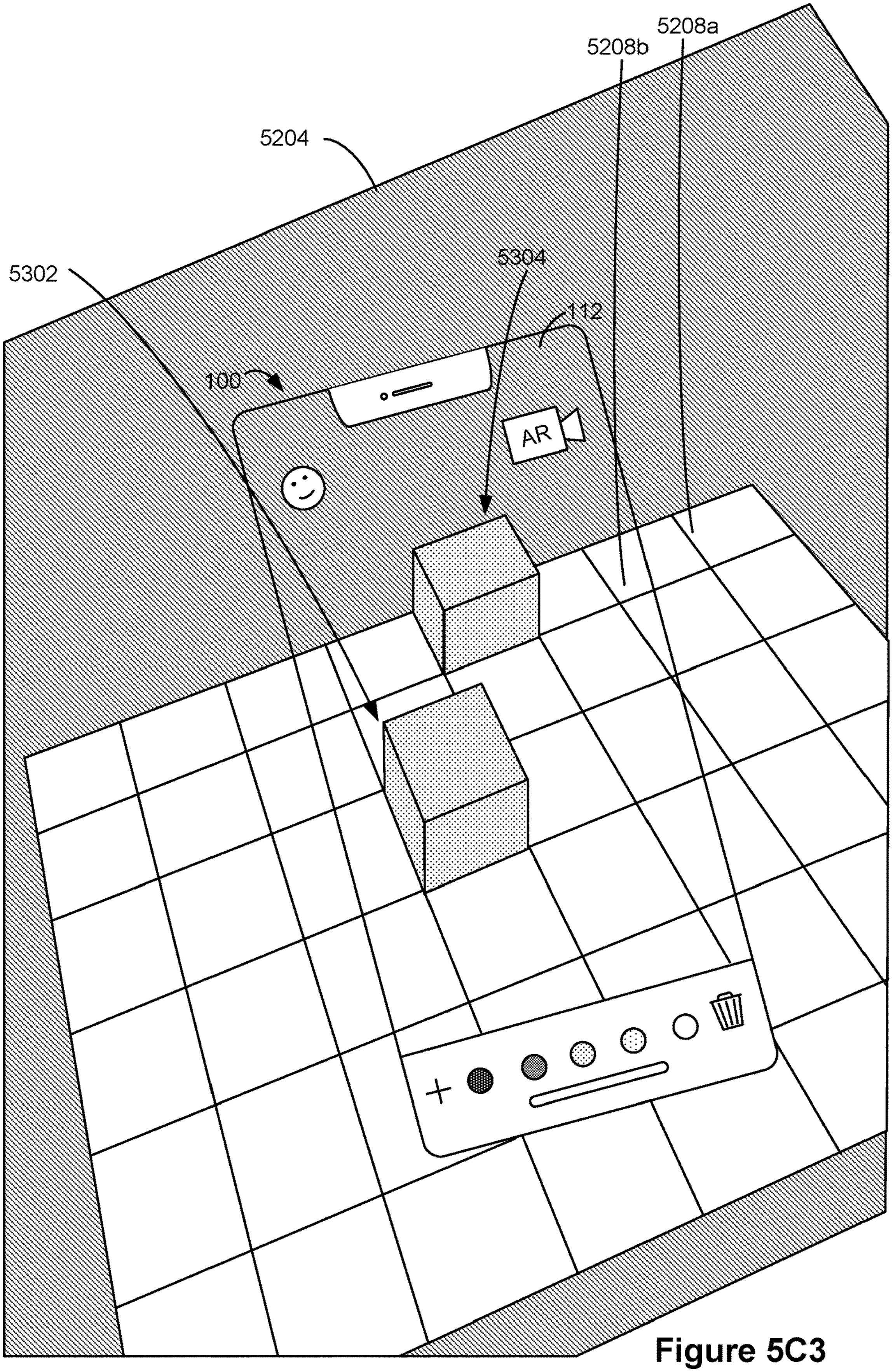
Figure 5C3

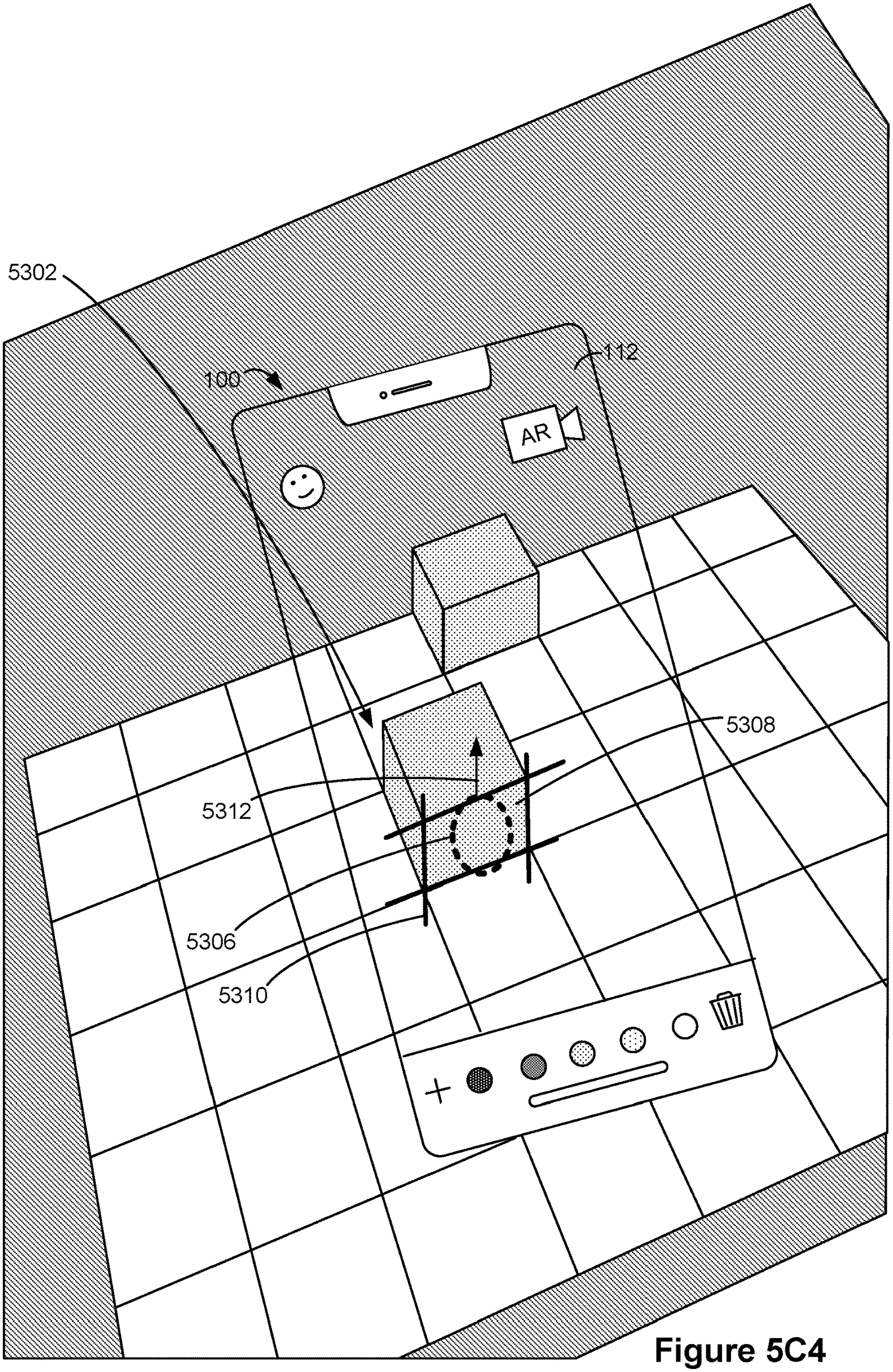
Figure 5C4

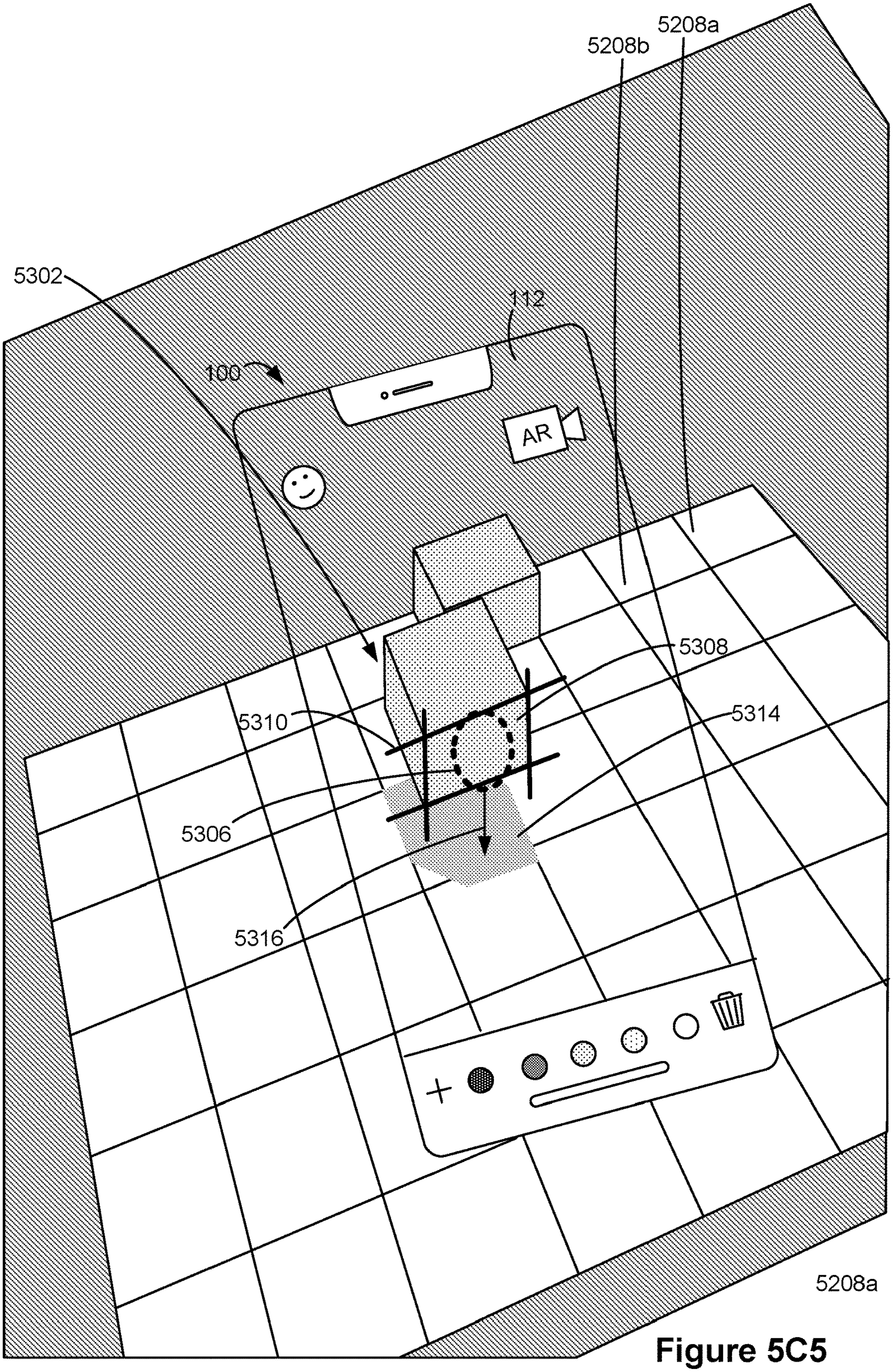
Figure 5C5

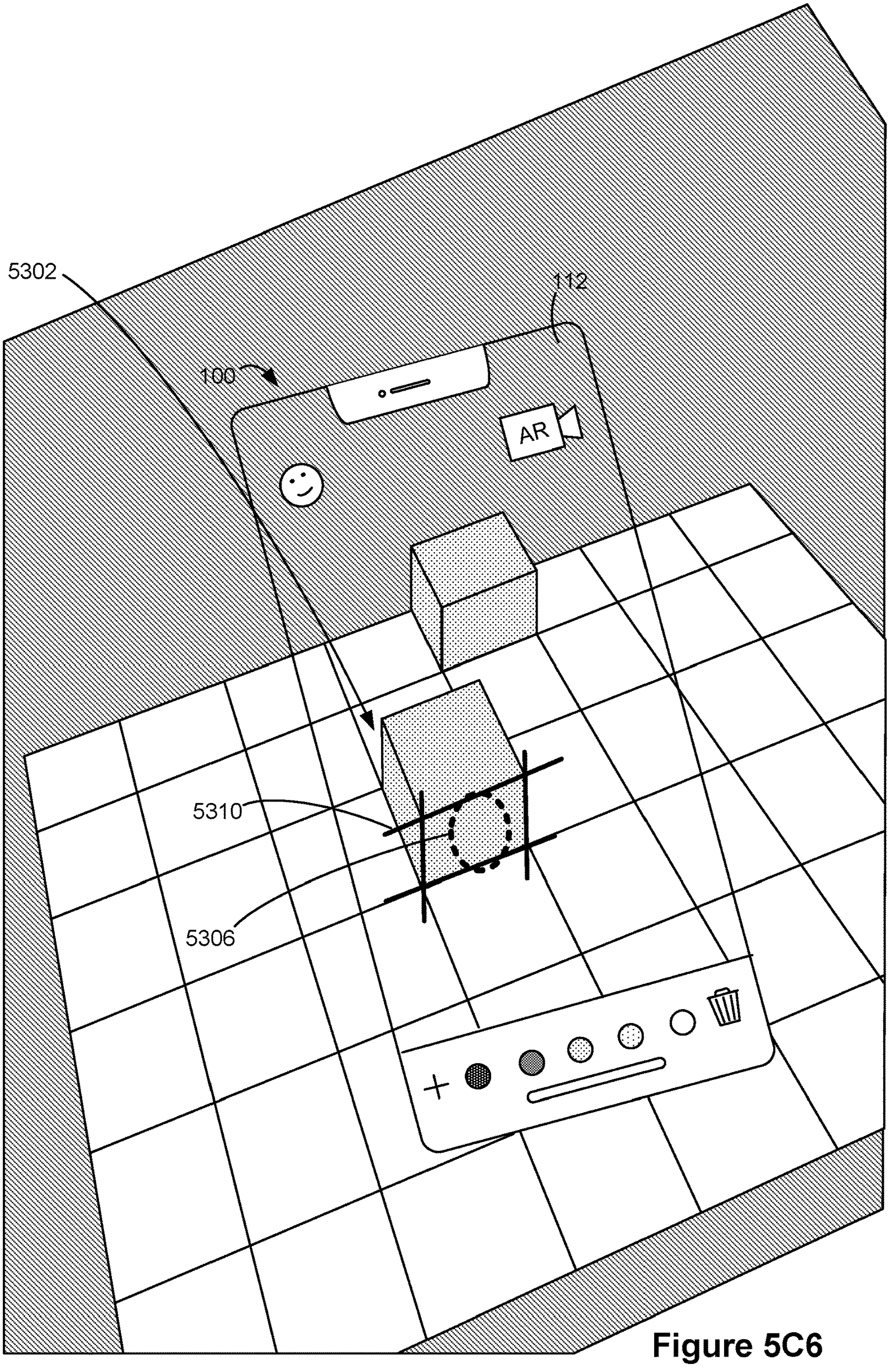
Figure 5C6

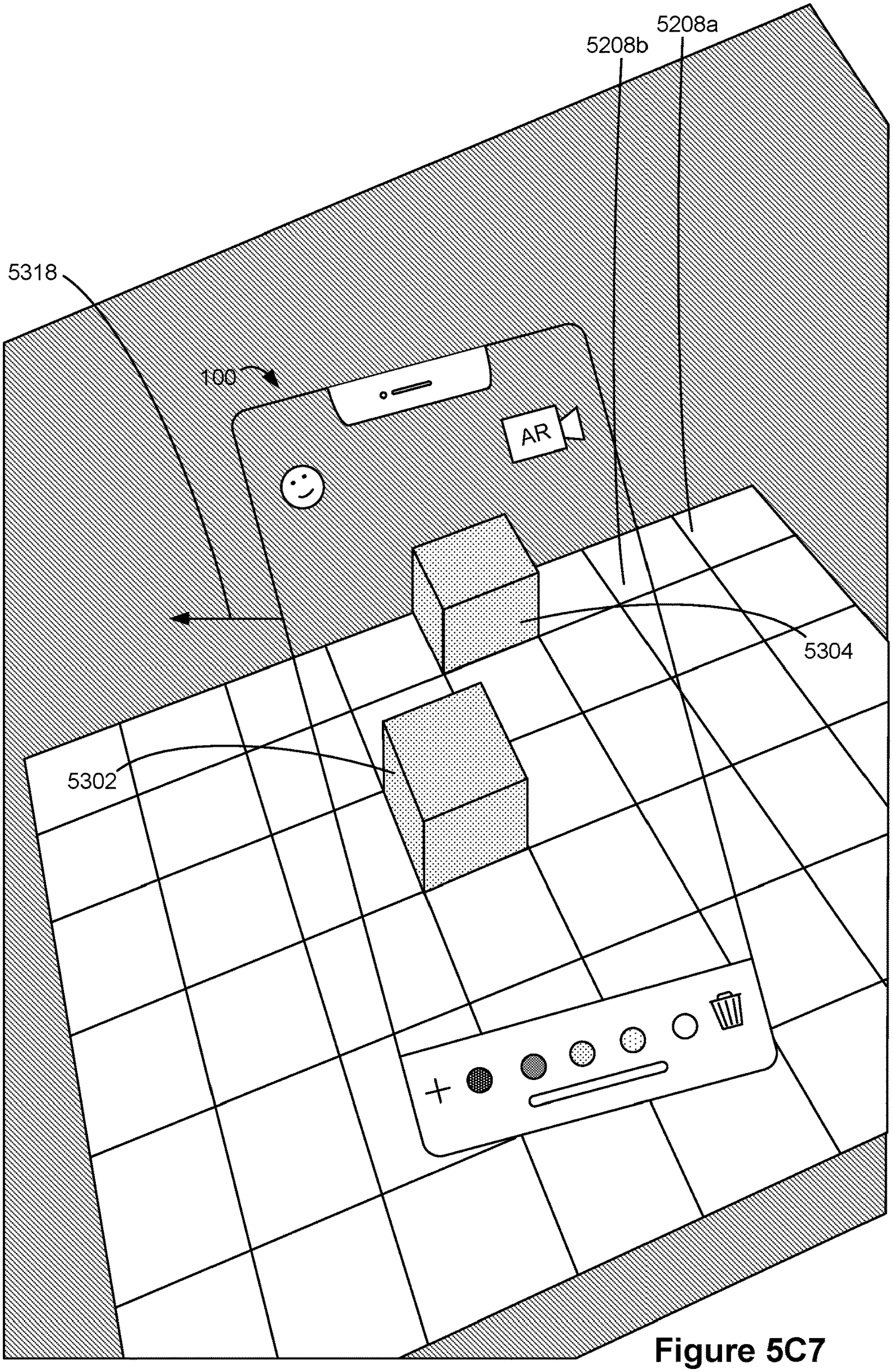
Figure 5C7

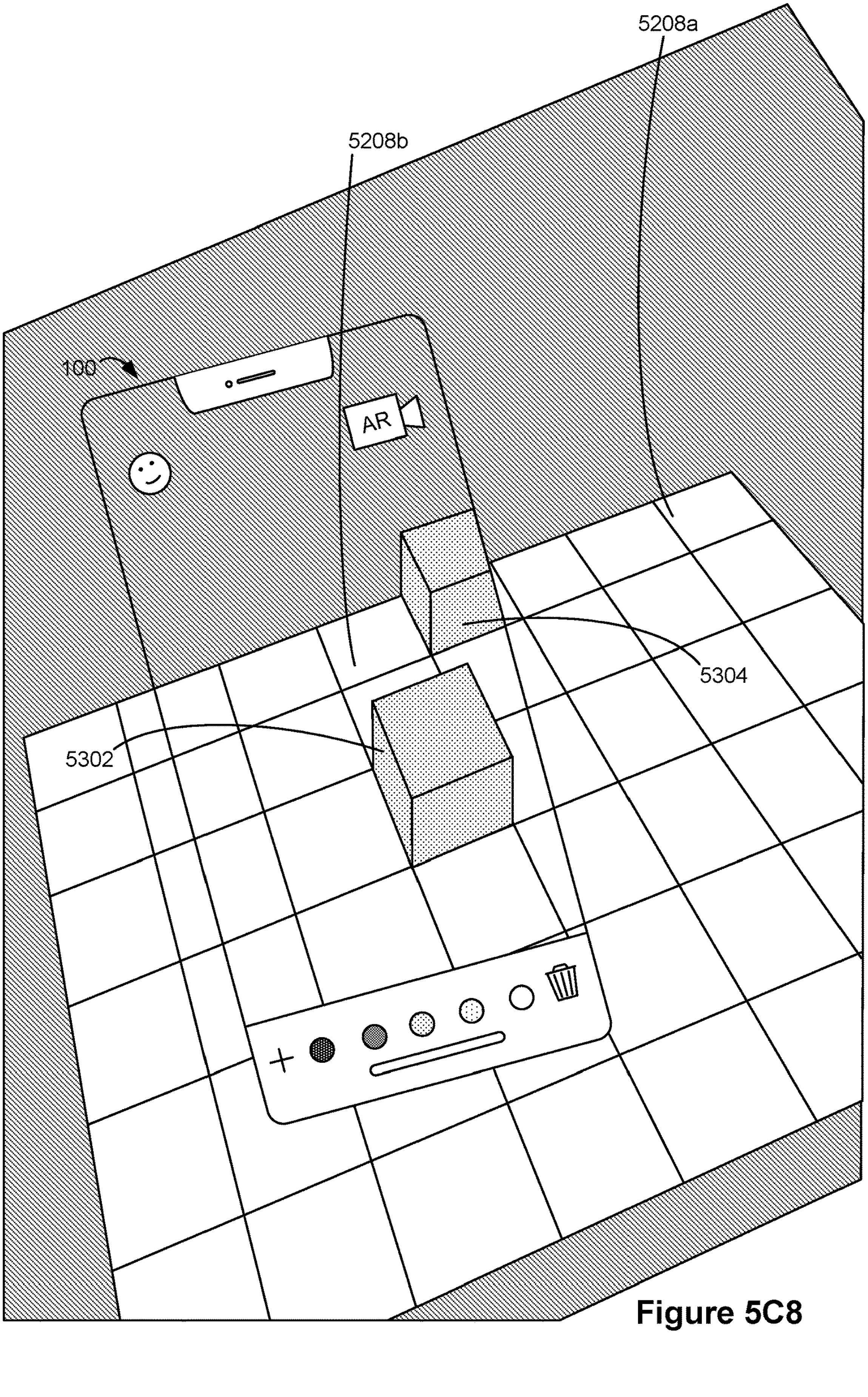
Figure 5C8

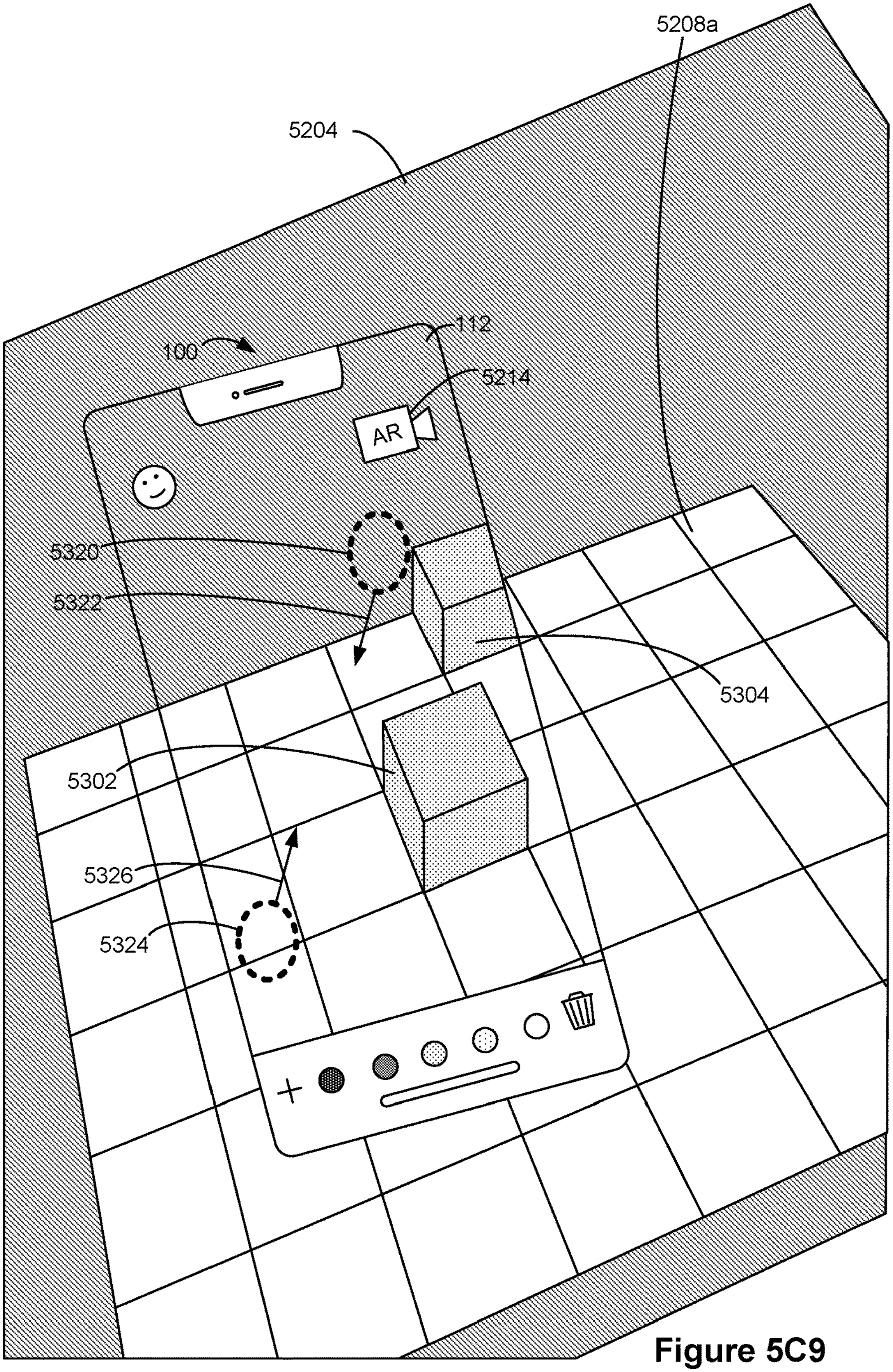
Figure 5C9

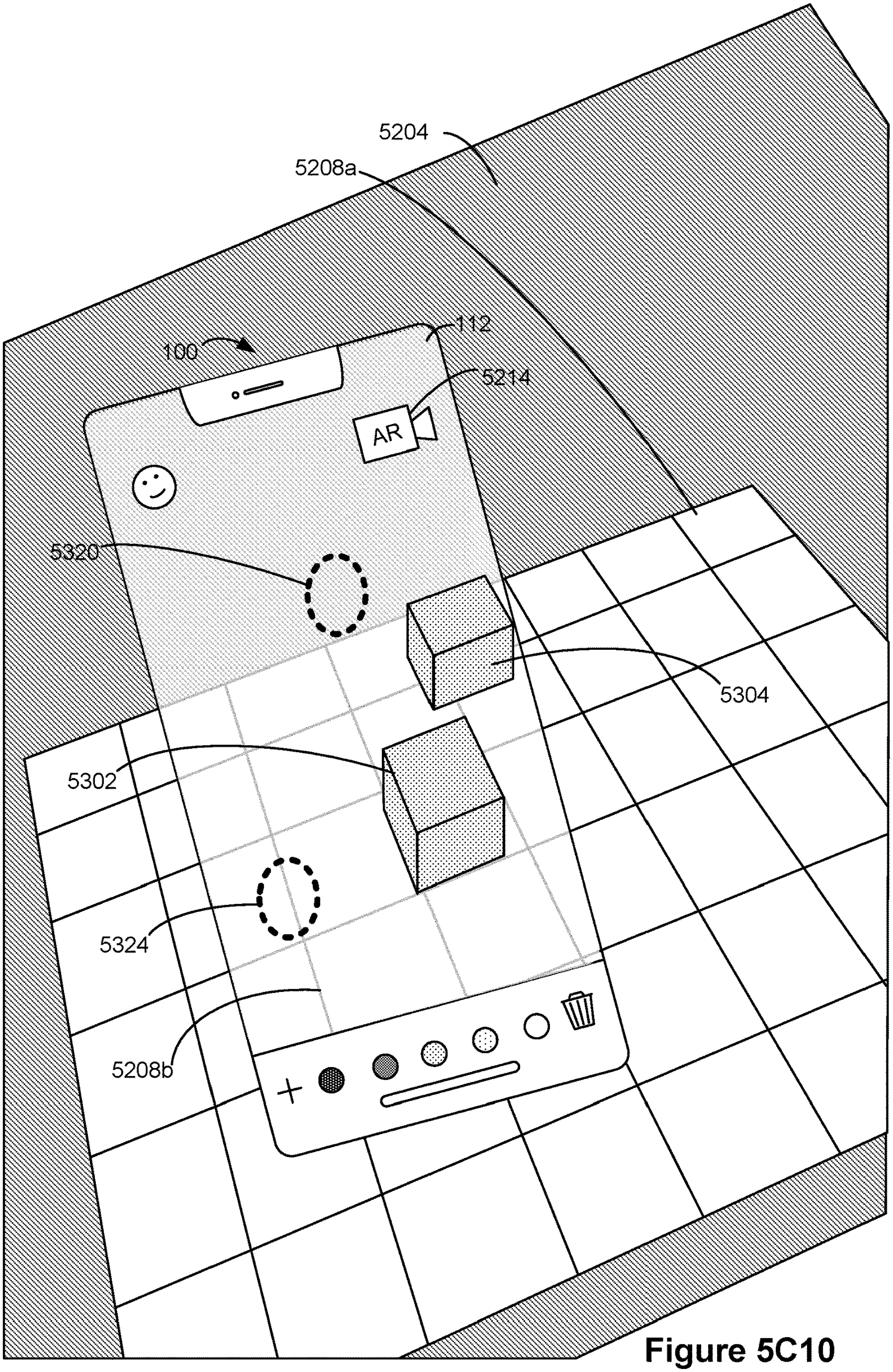
Figure 5C10

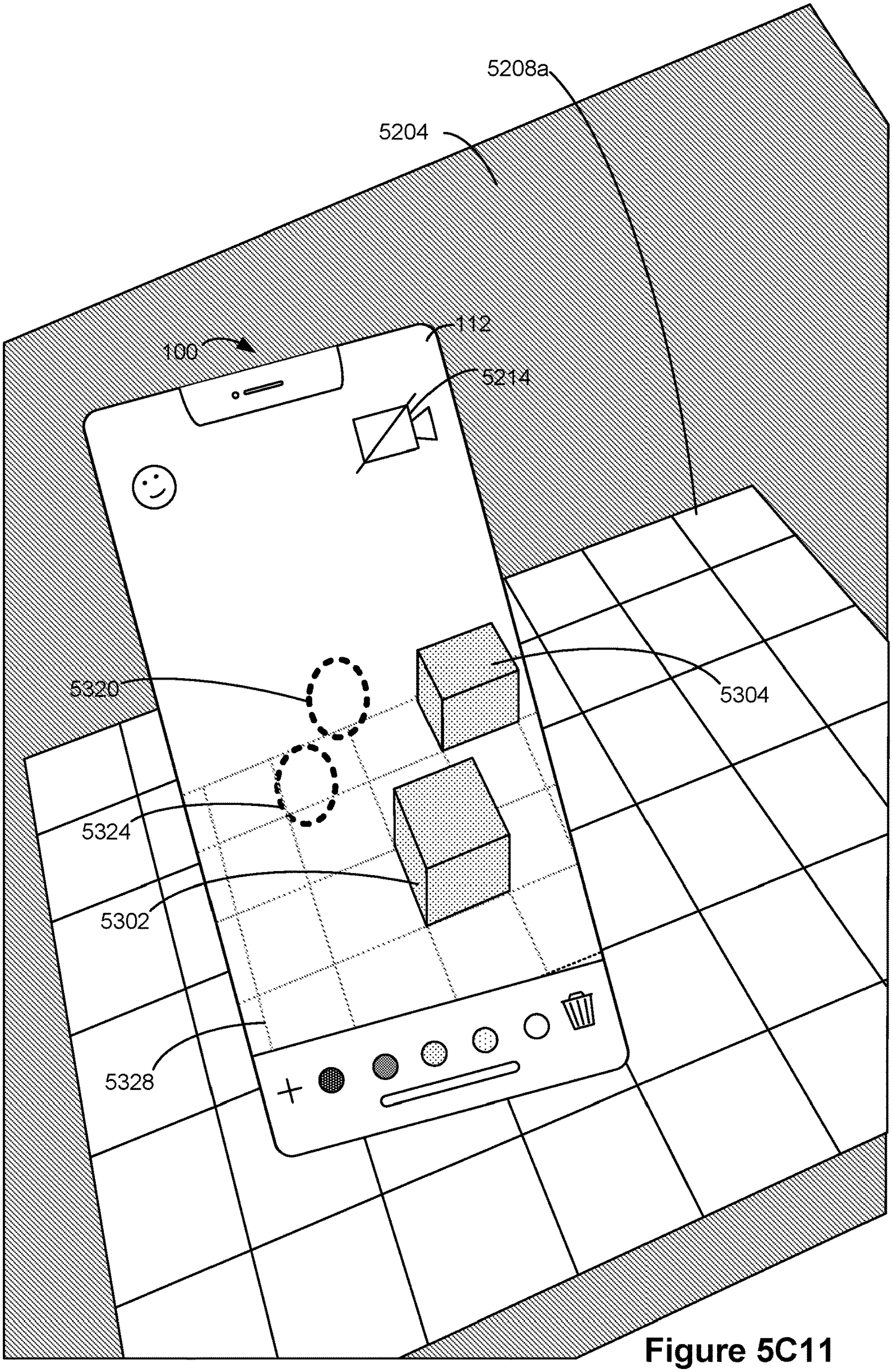
Figure 5C11

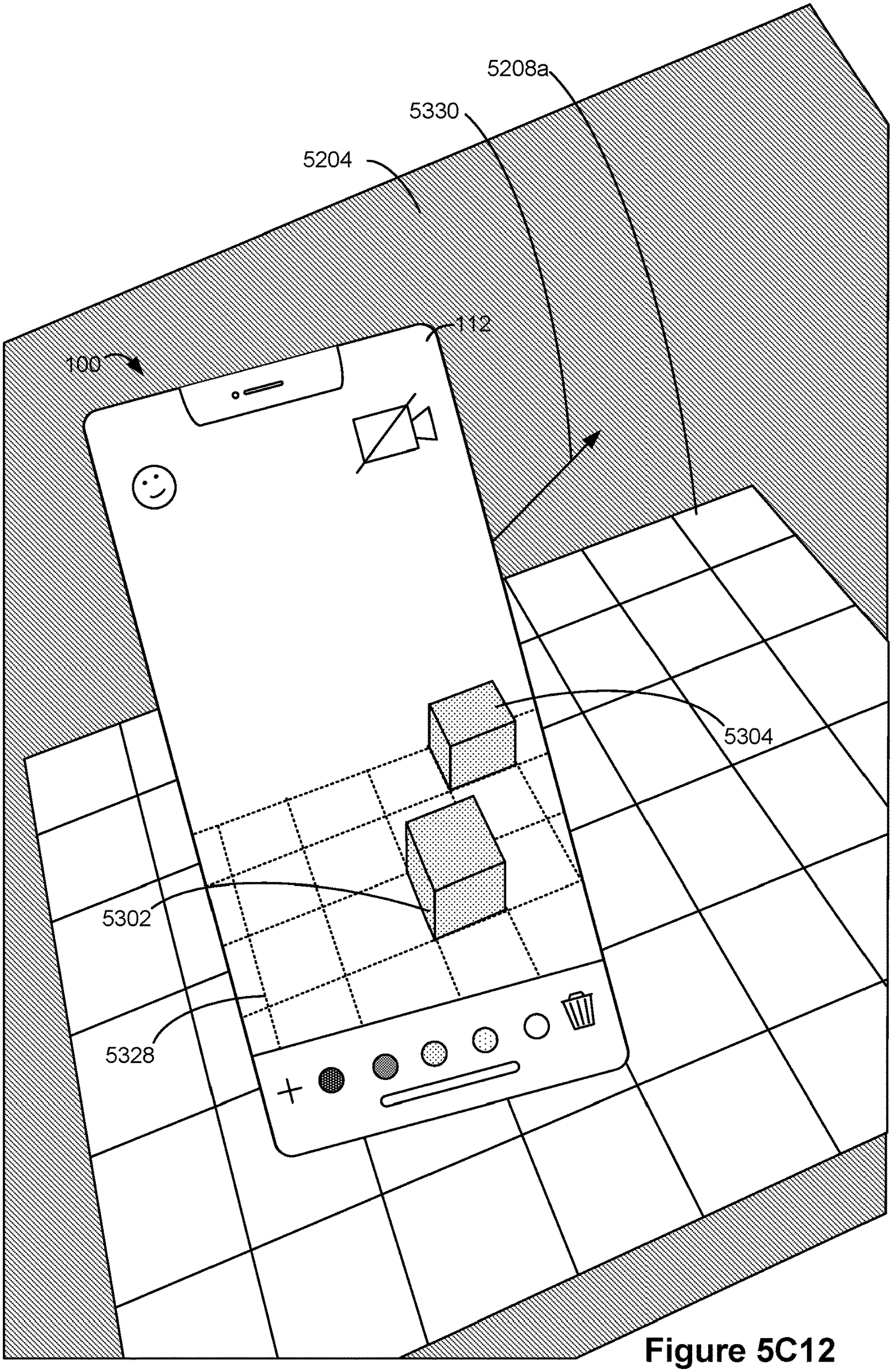
Figure 5C12

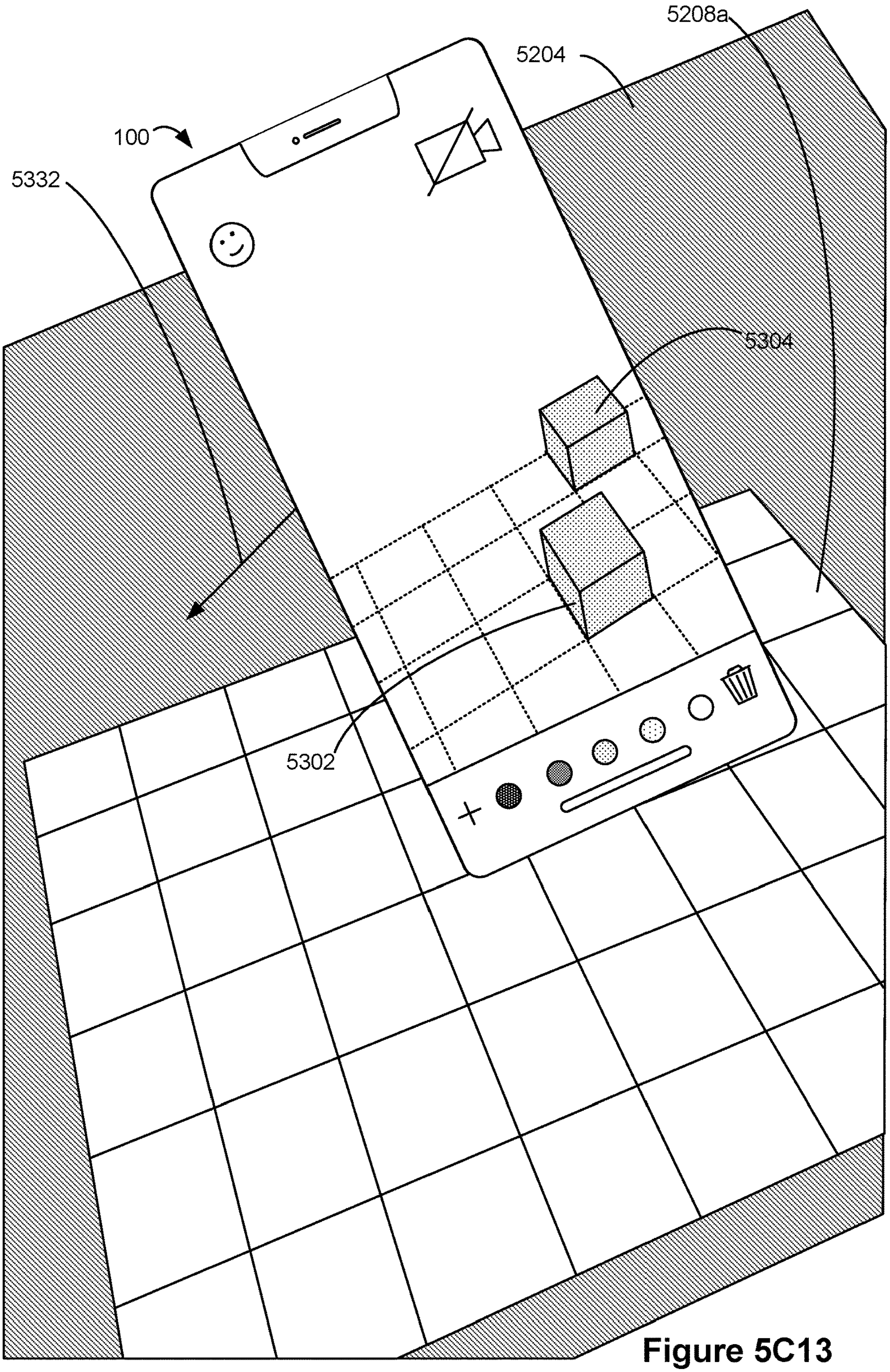
Figure 5C13

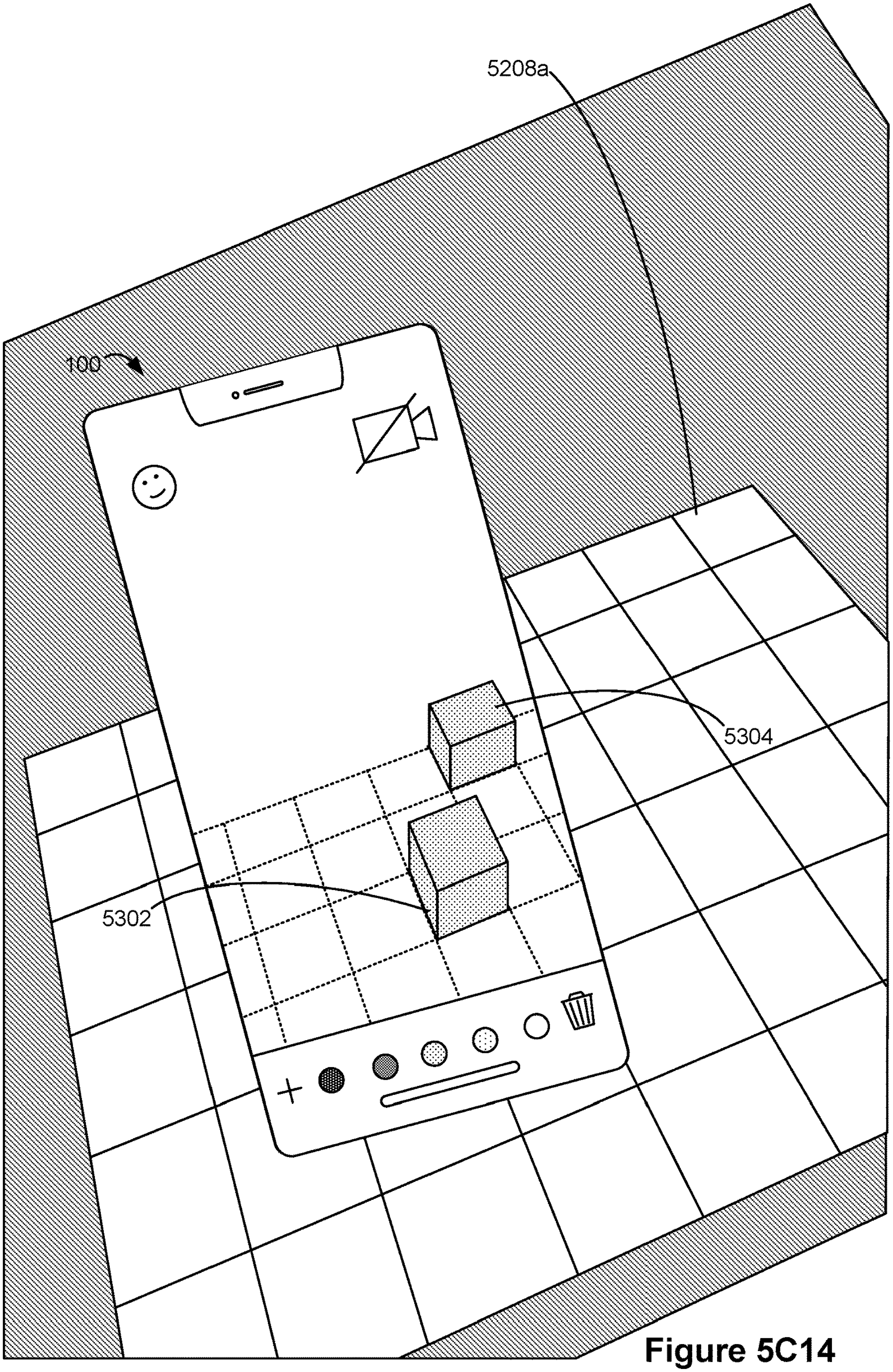
Figure 5C14

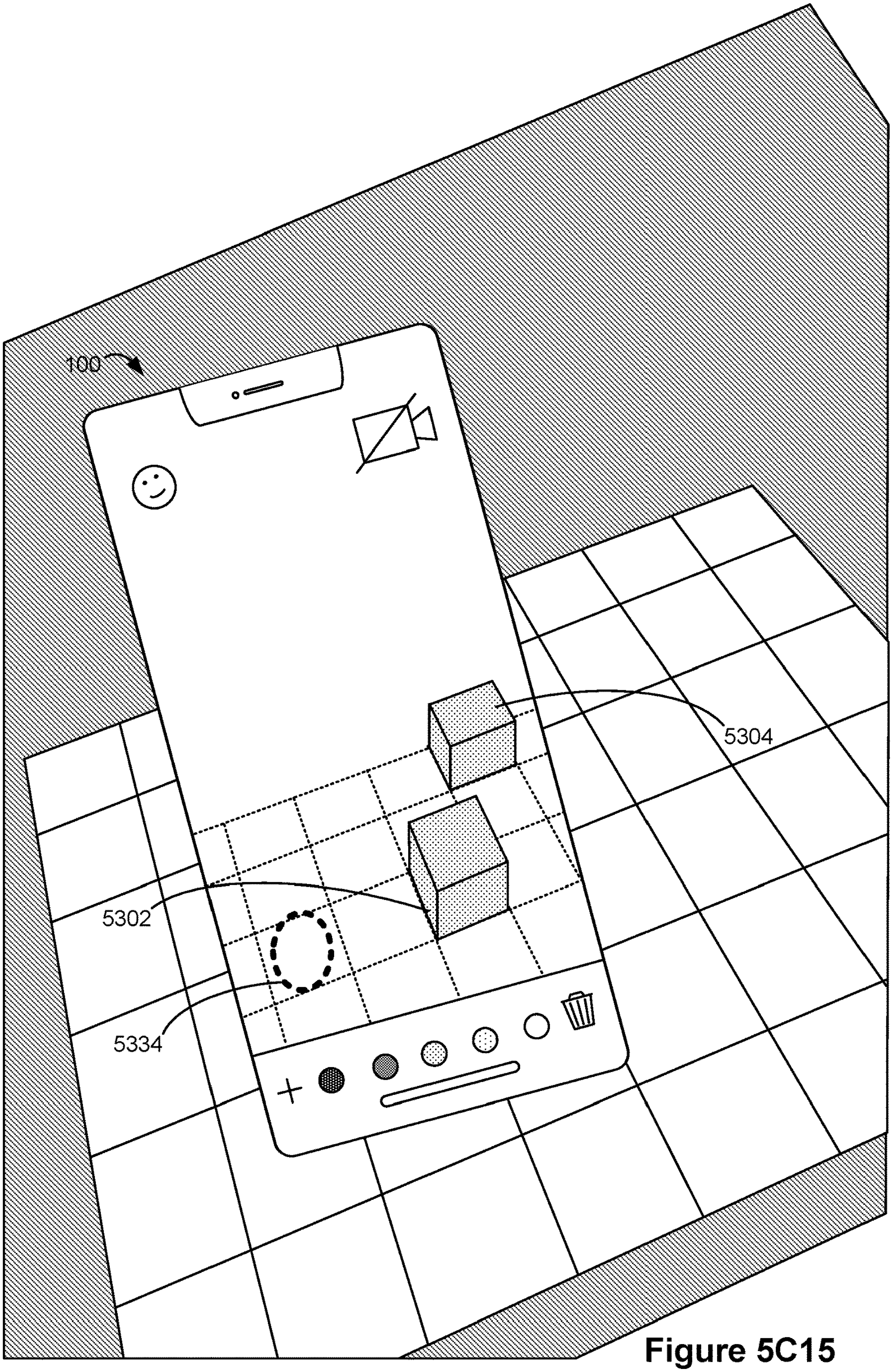
Figure 5C15

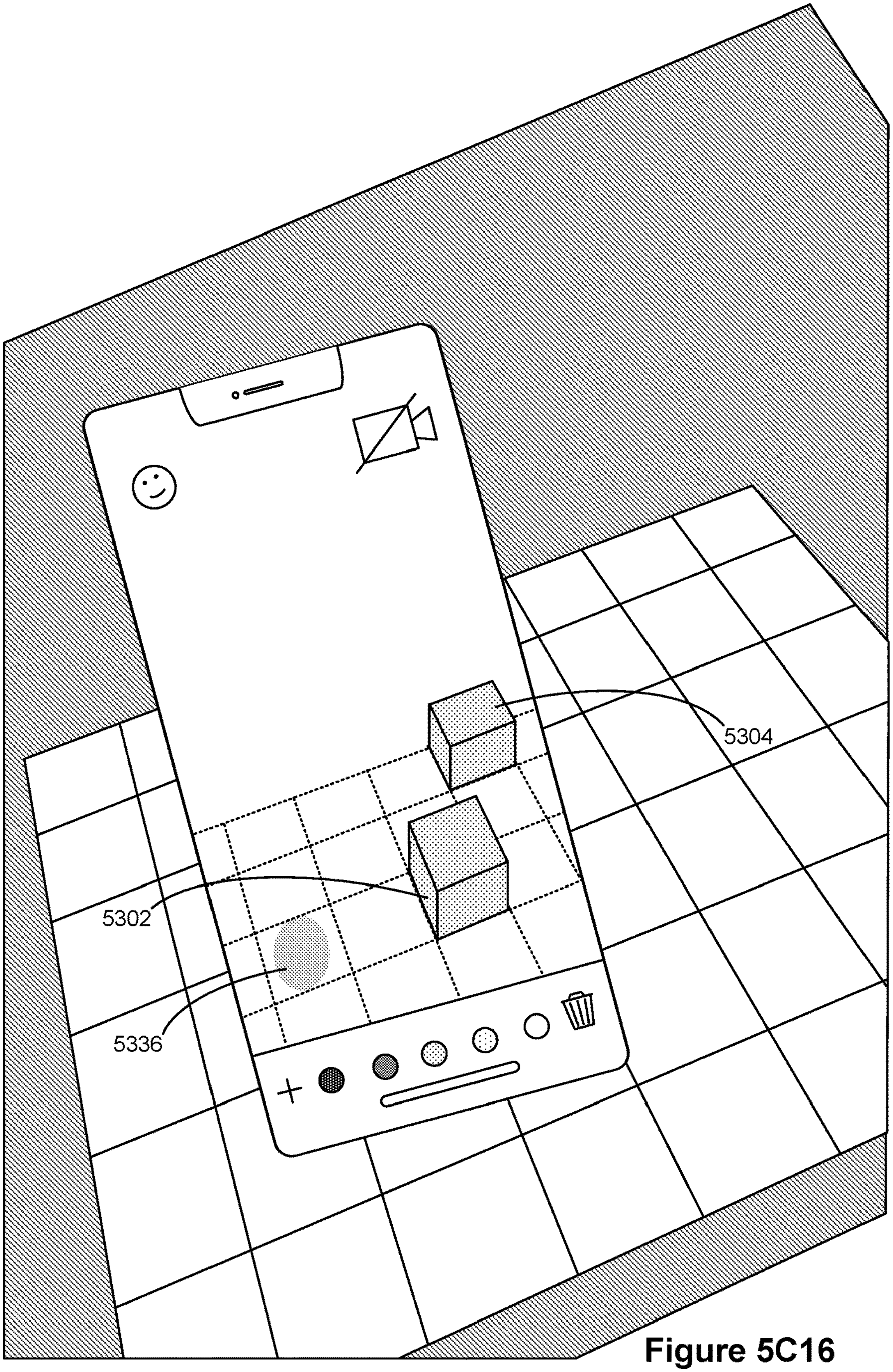
Figure 5C16

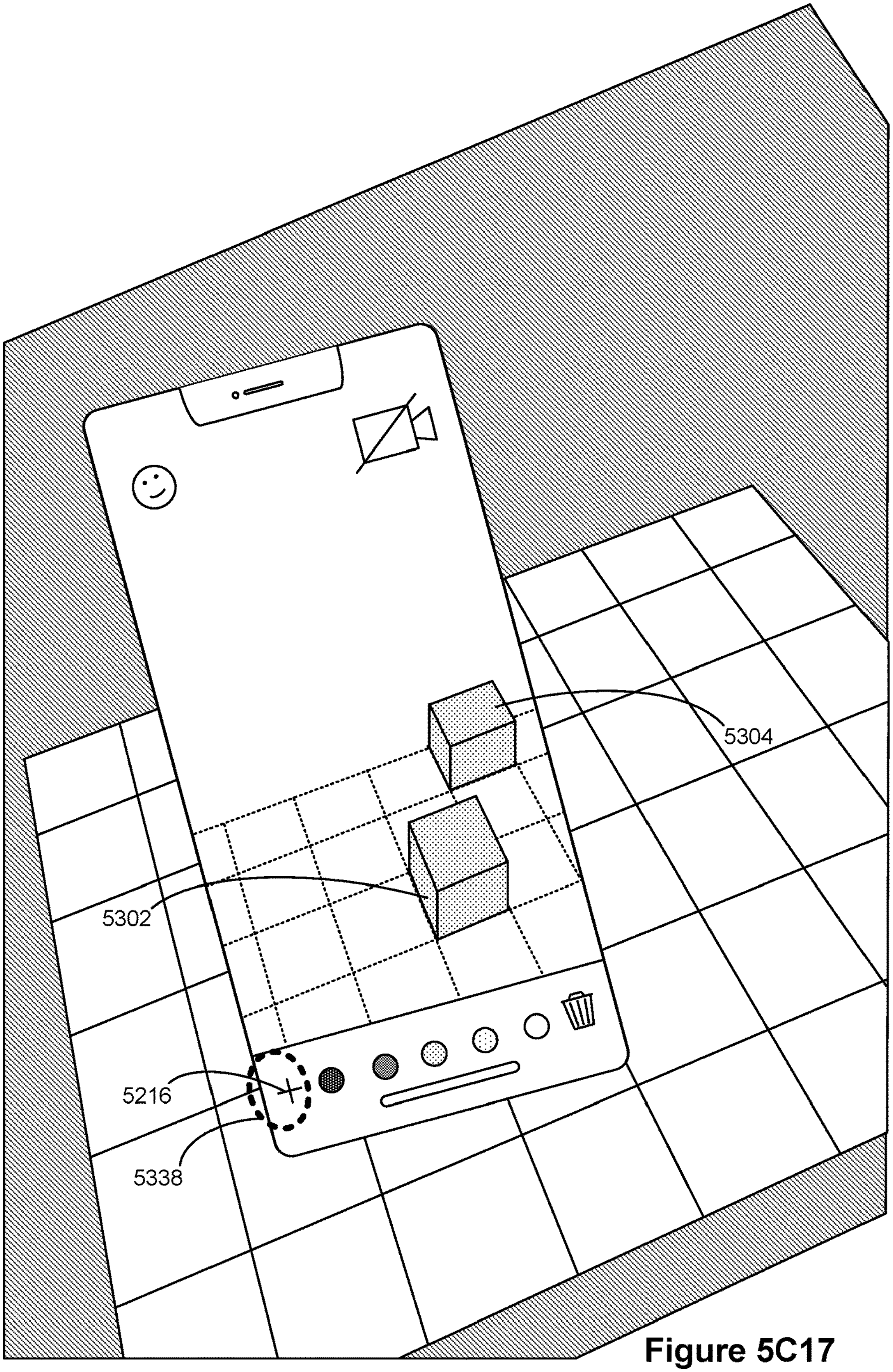
Figure 5C17

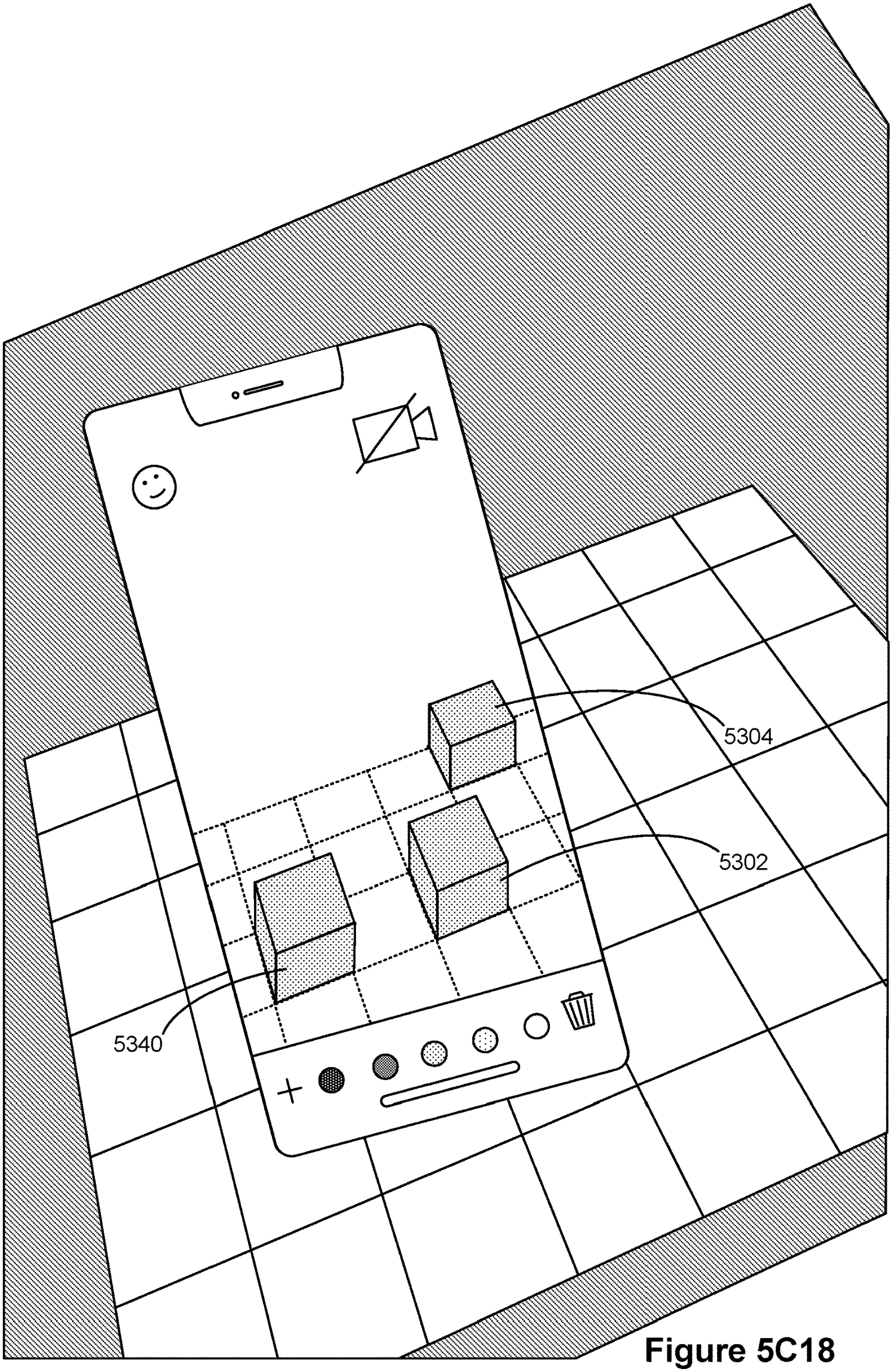
Figure 5C18

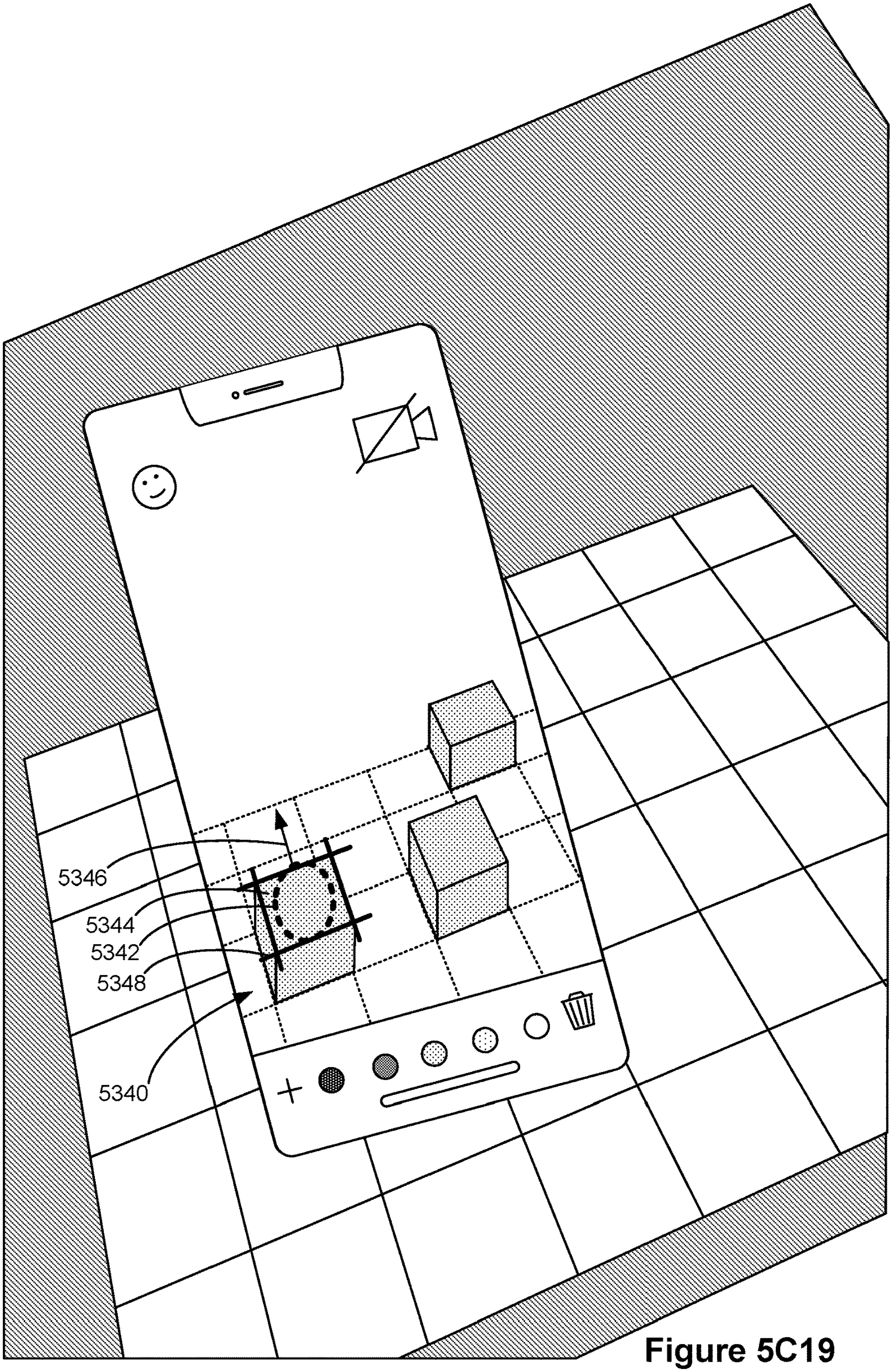
Figure 5C19

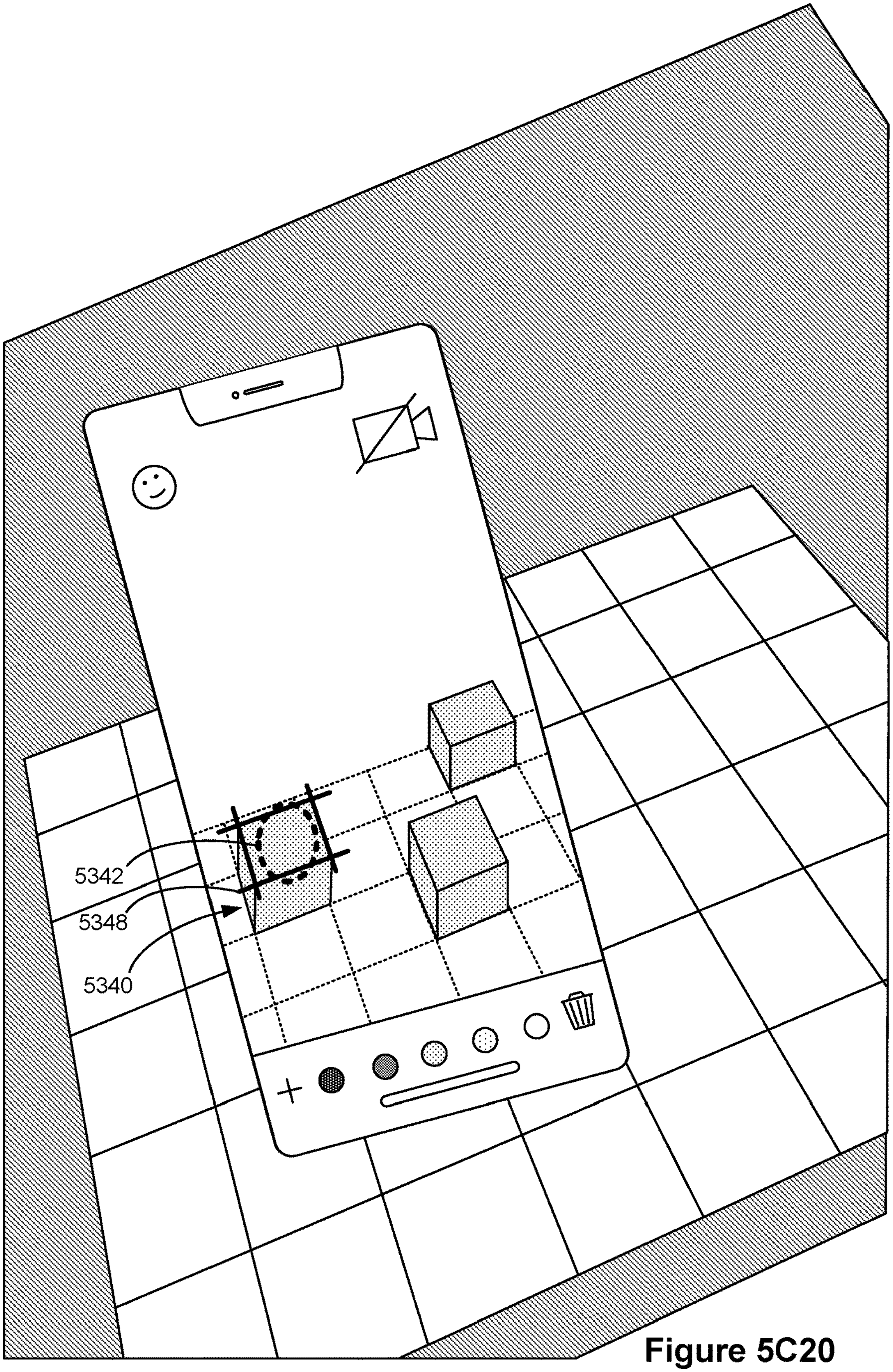
Figure 5C20

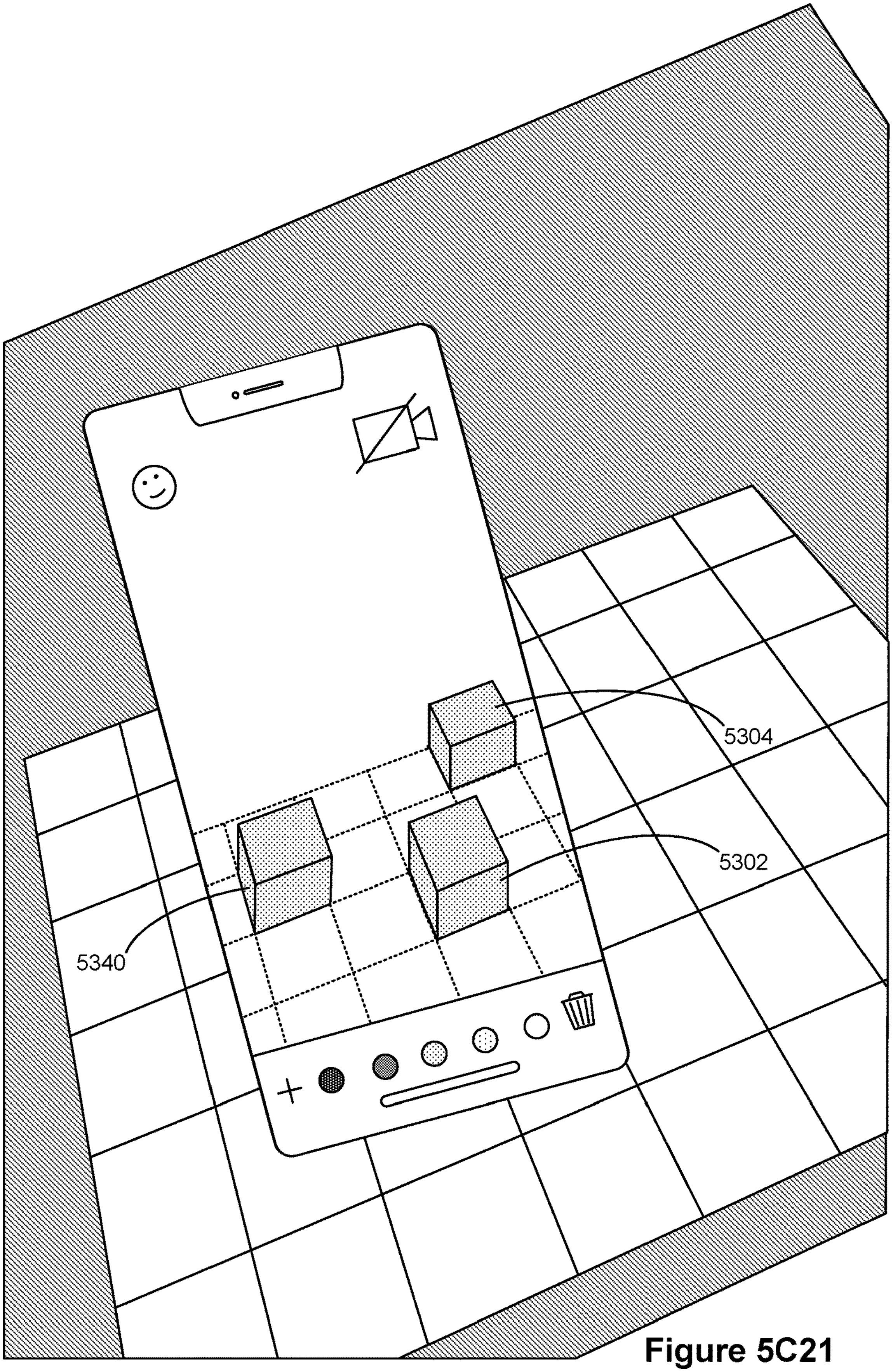
Figure 5C21

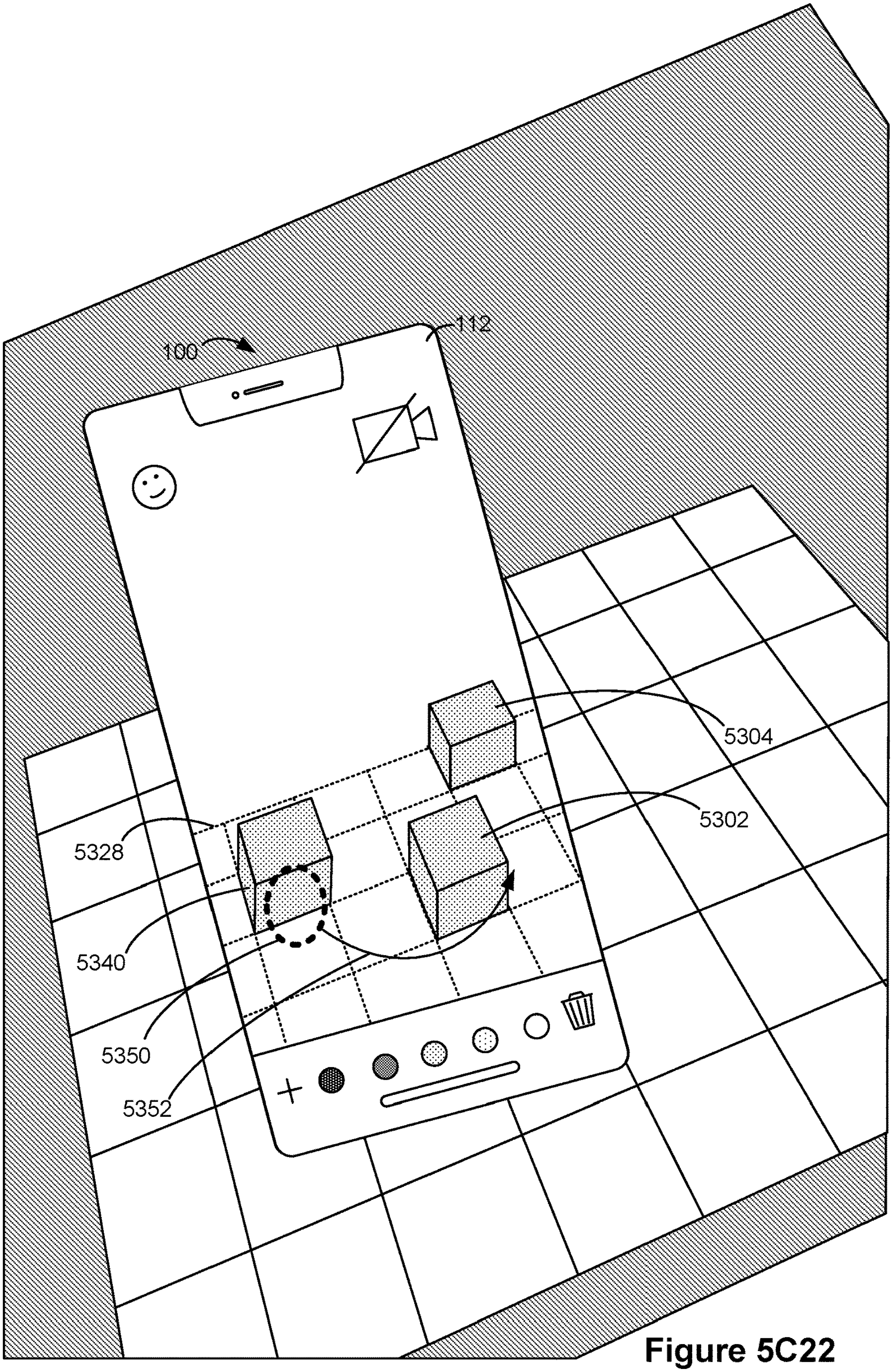
Figure 5C22

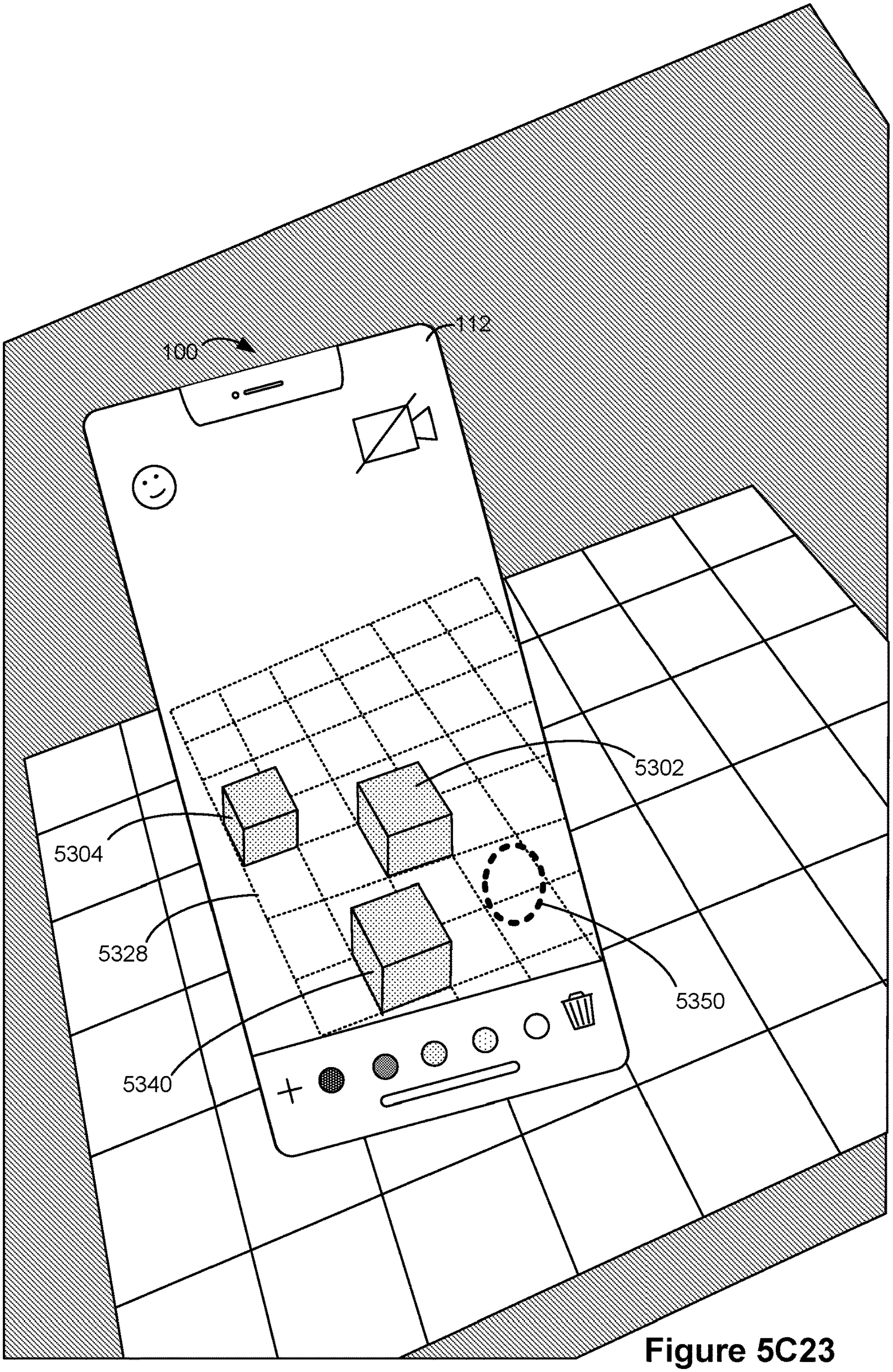
Figure 5C23

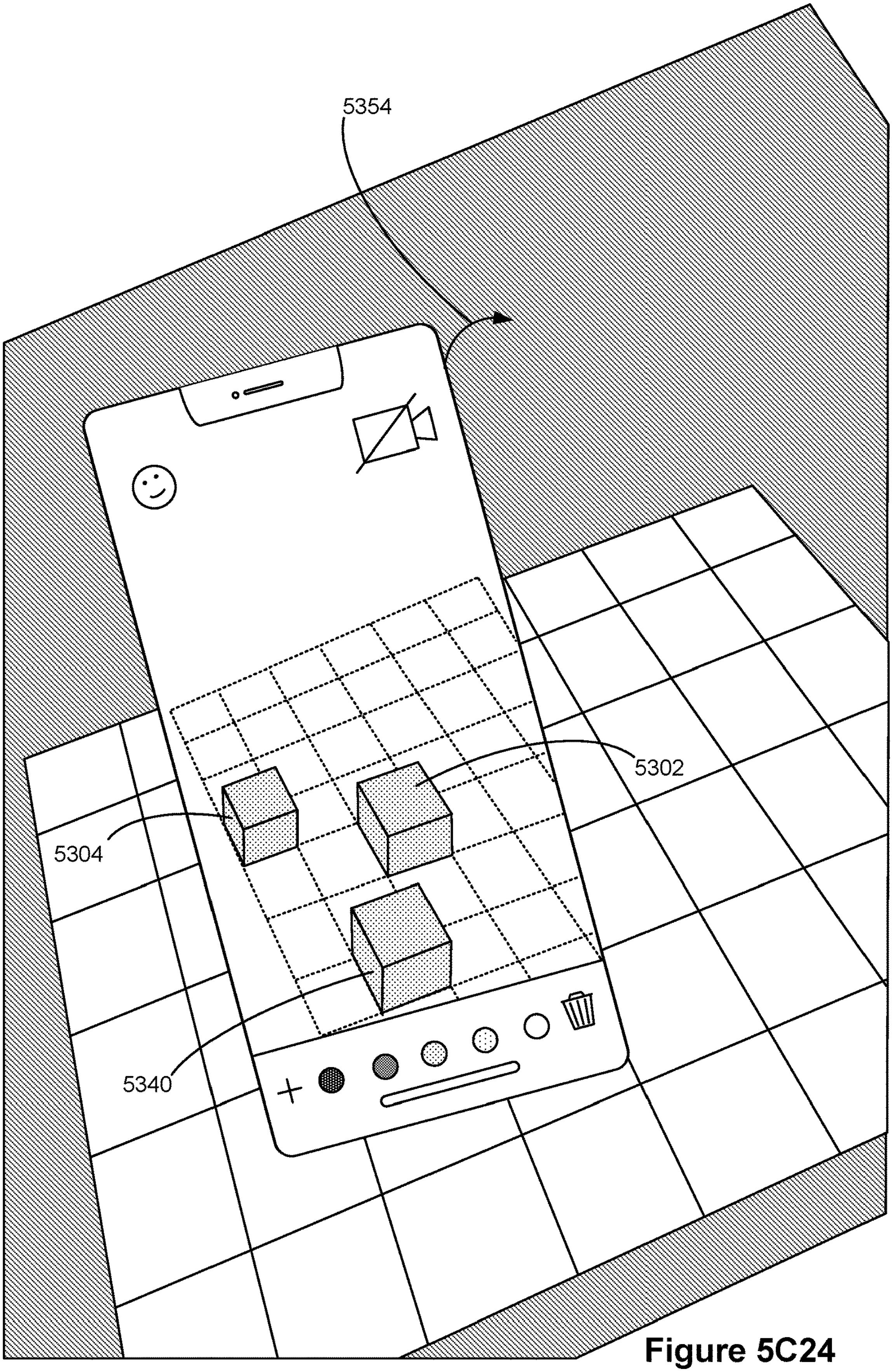
Figure 5C24

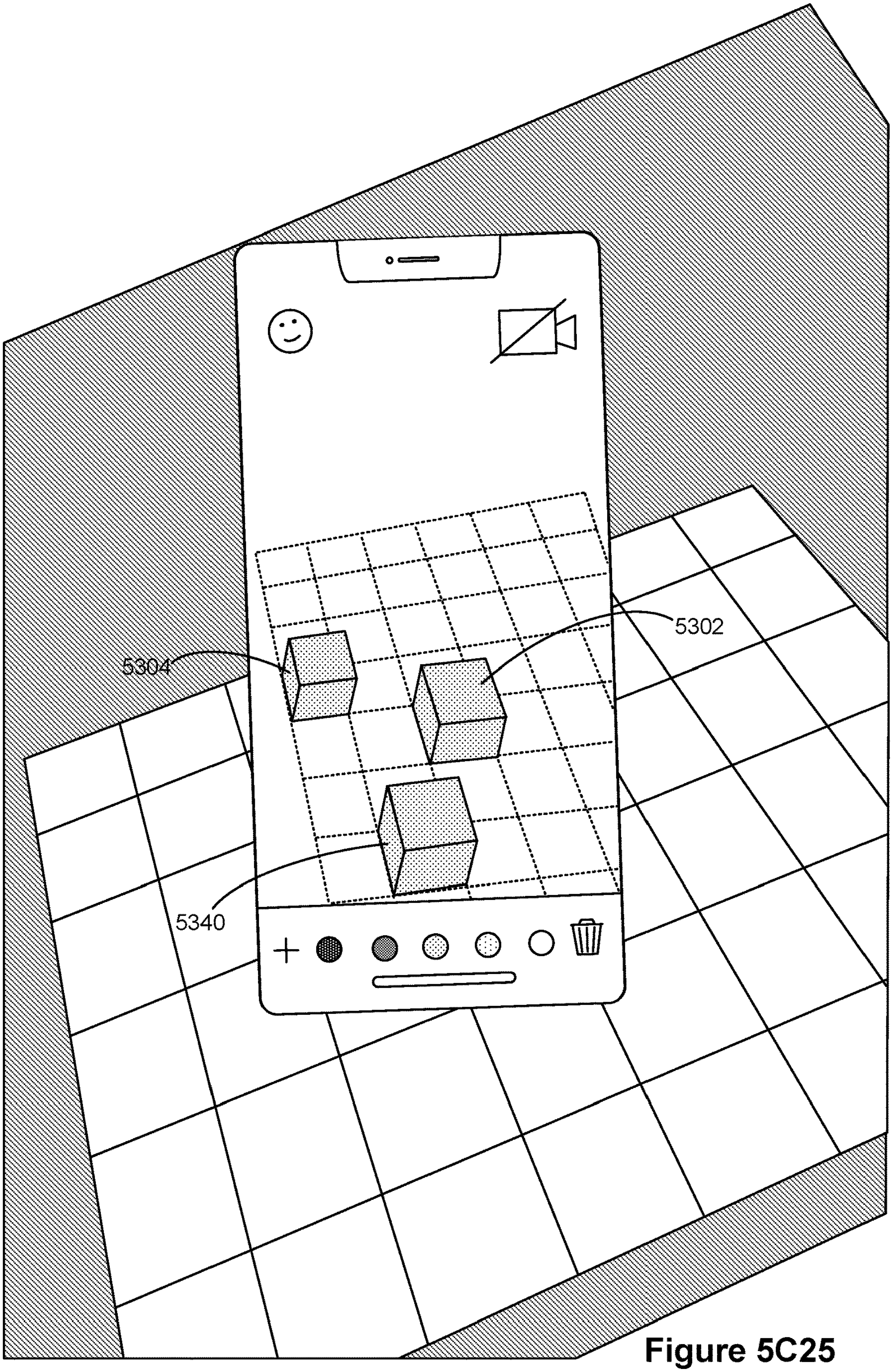
Figure 5C25

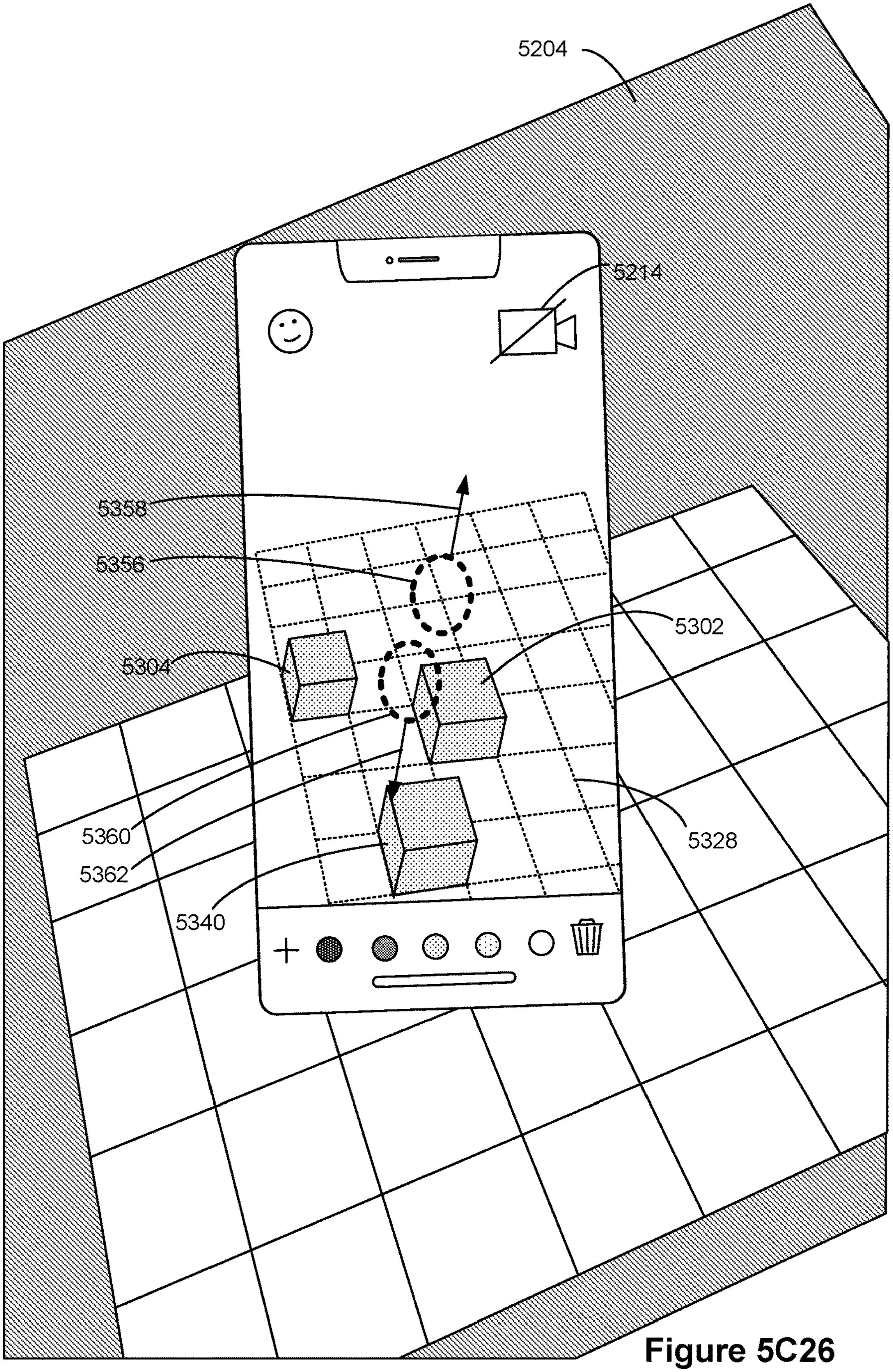
Figure 5C26

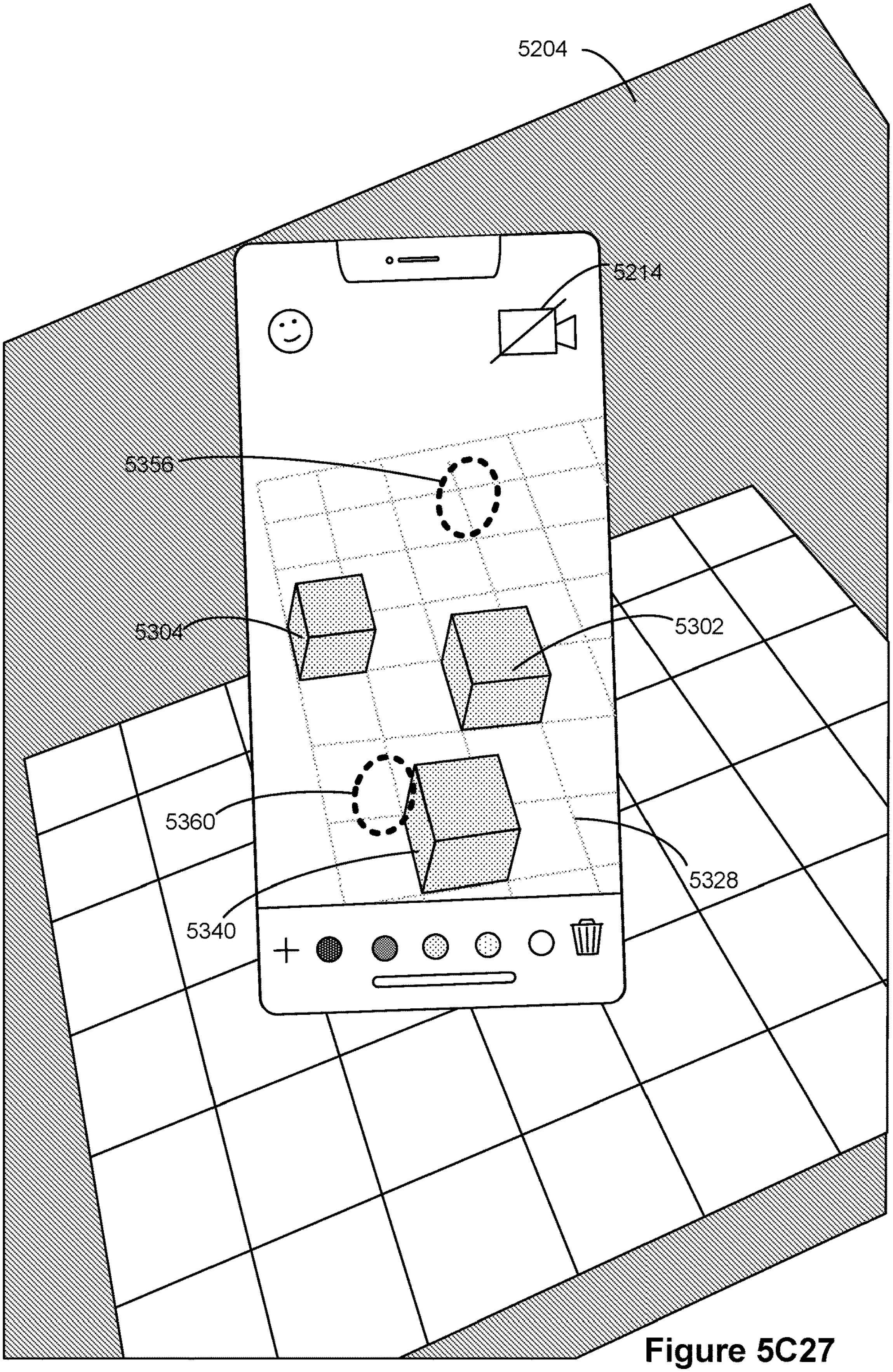
Figure 5C27

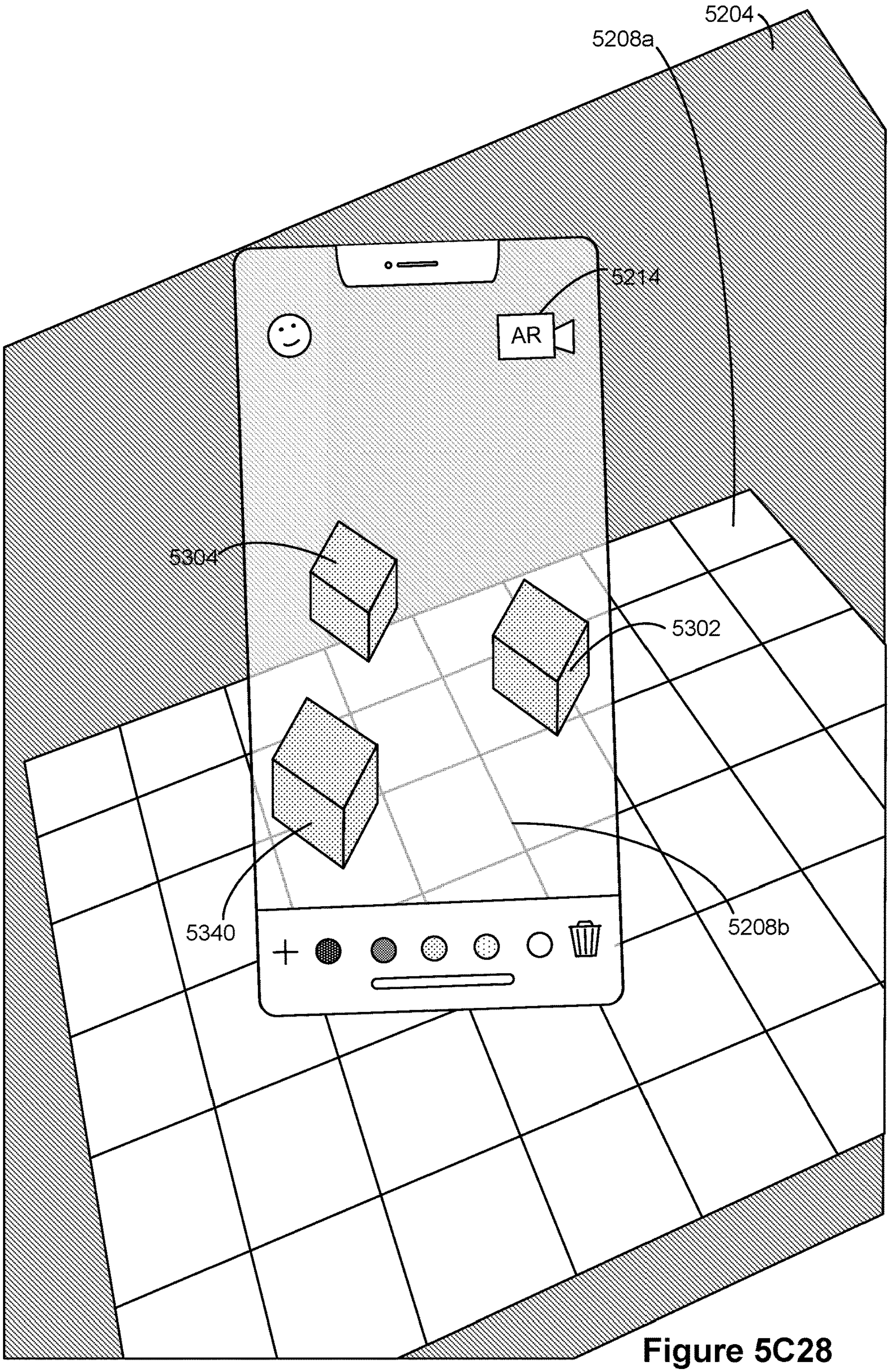
Figure 5C28

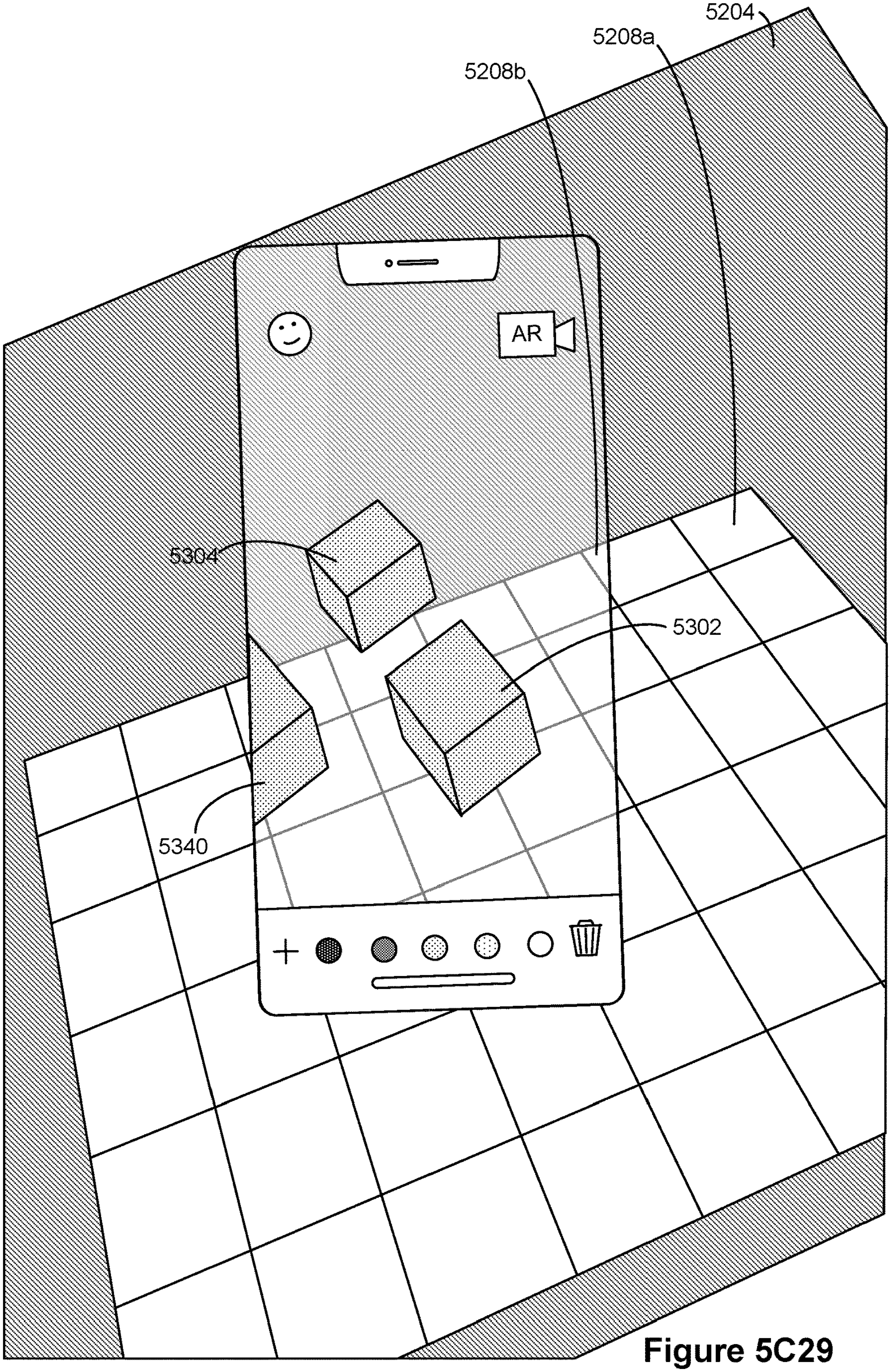
Figure 5C29

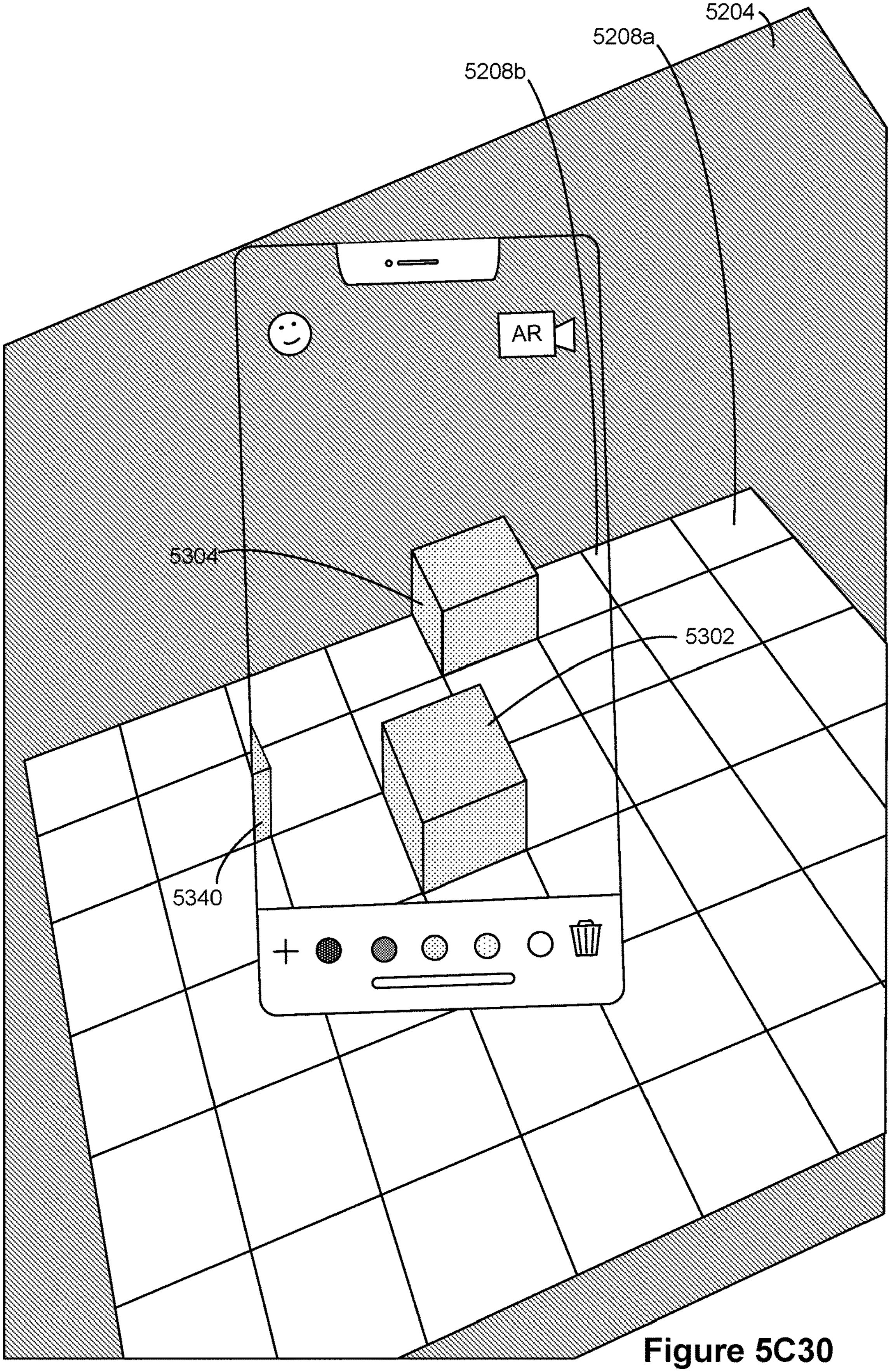
Figure 5C30

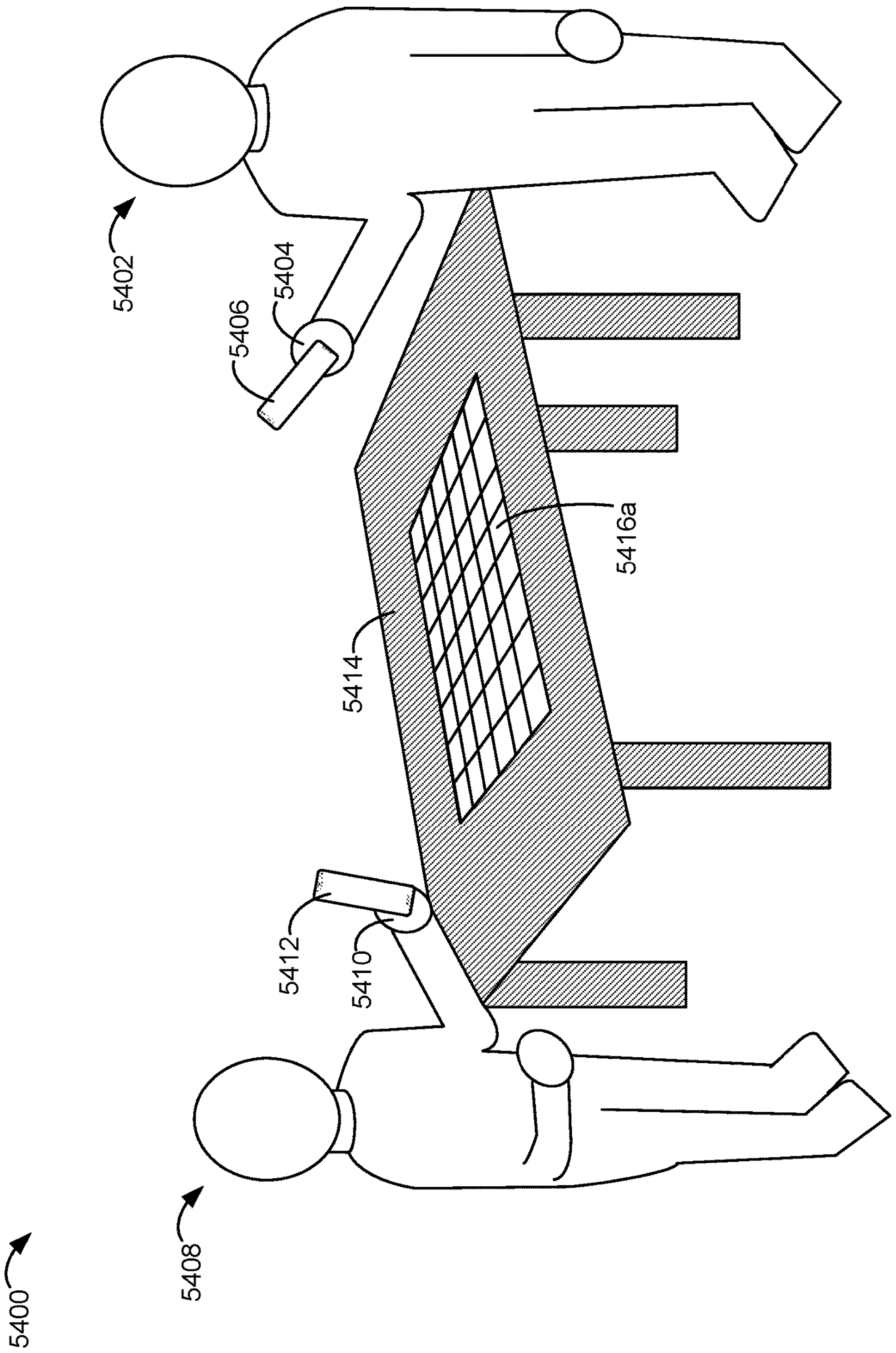
Figure 5D1

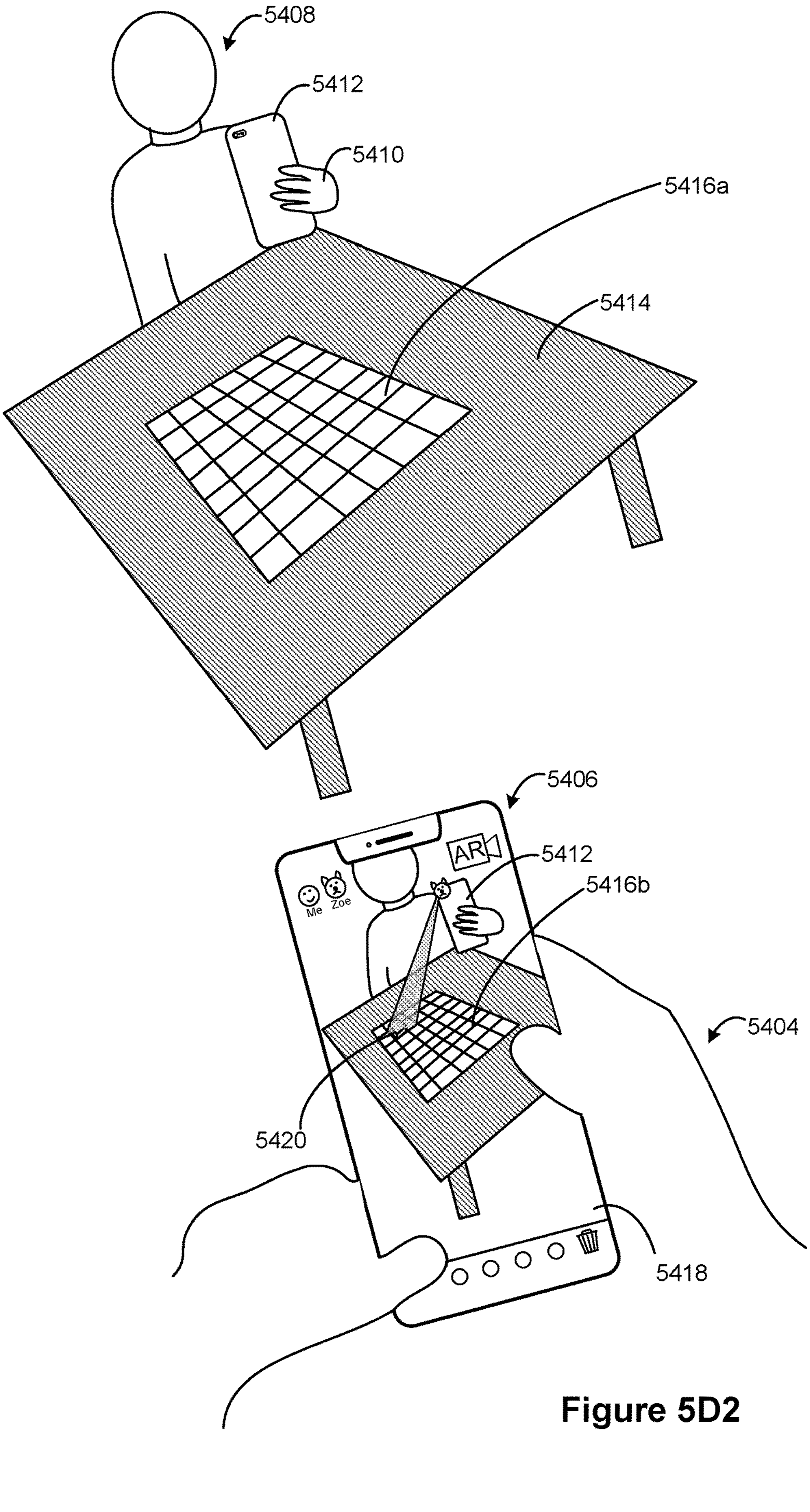
Figure 5D2

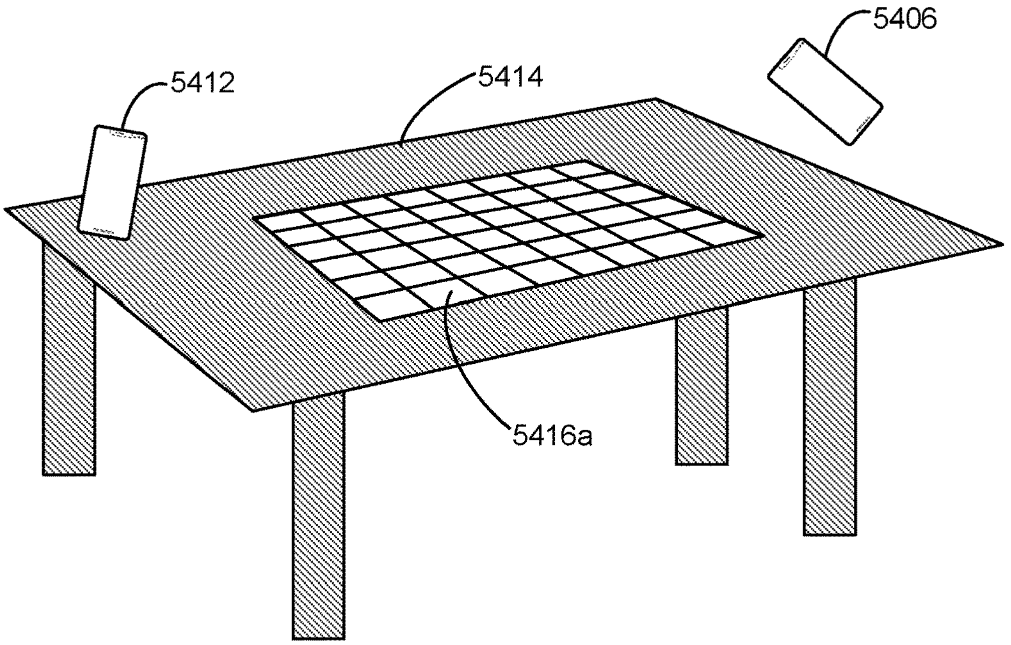
Figure 5D3a
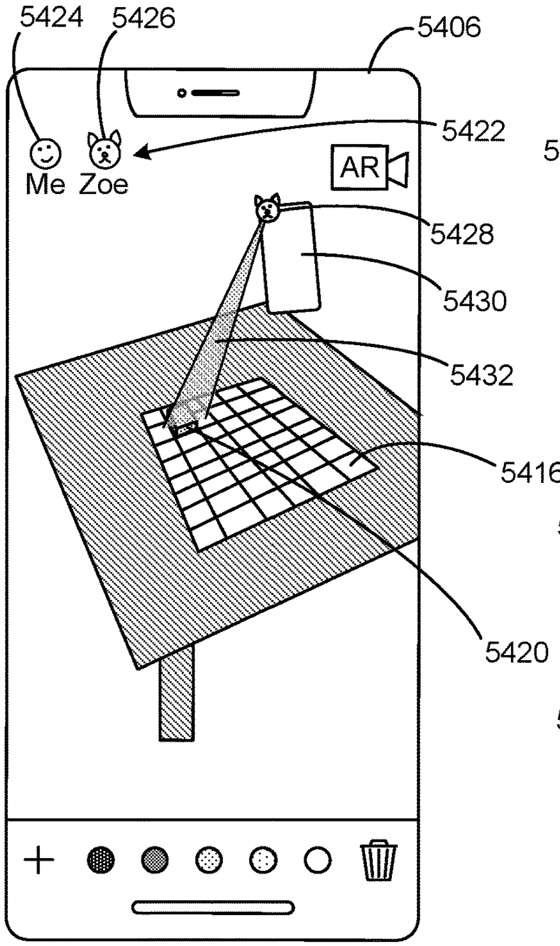
Figure 5D3b
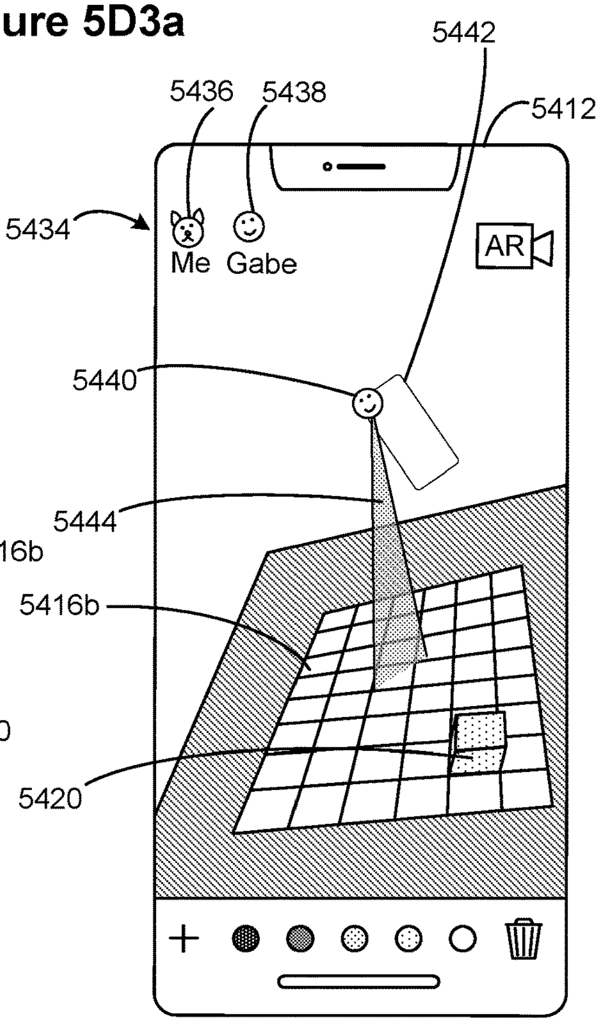
Figure 5D3c

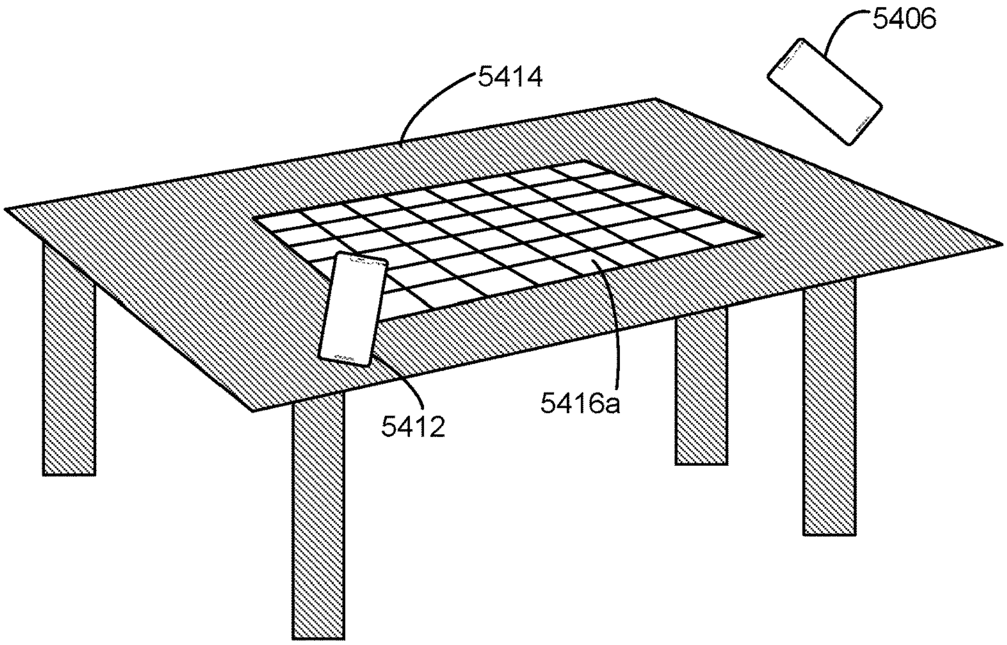
Figure 5D4a
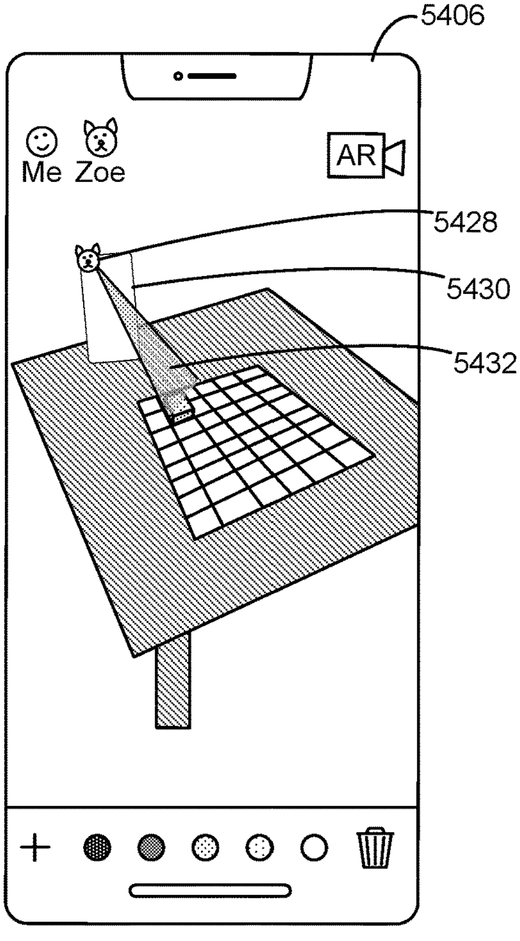
Figure 5D4b
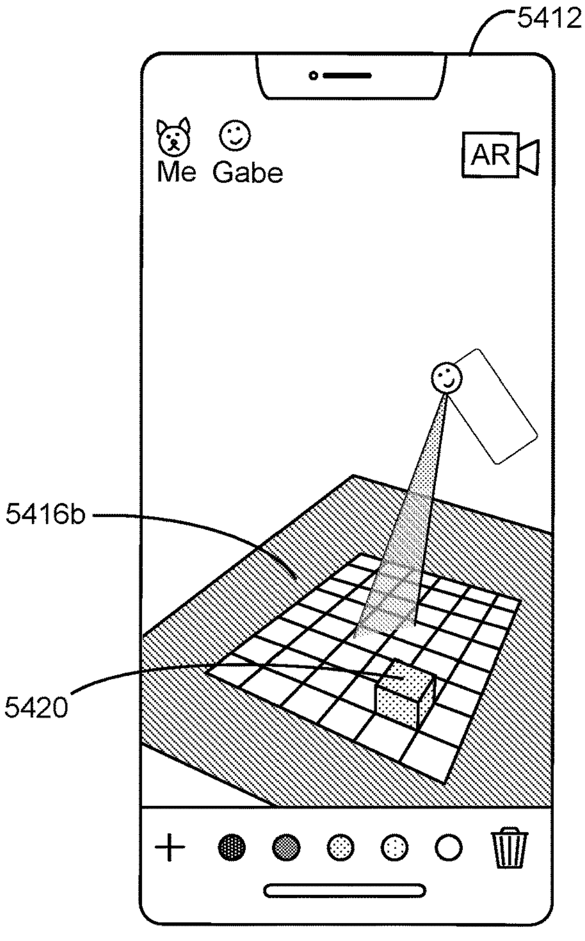
Figure 5D4c

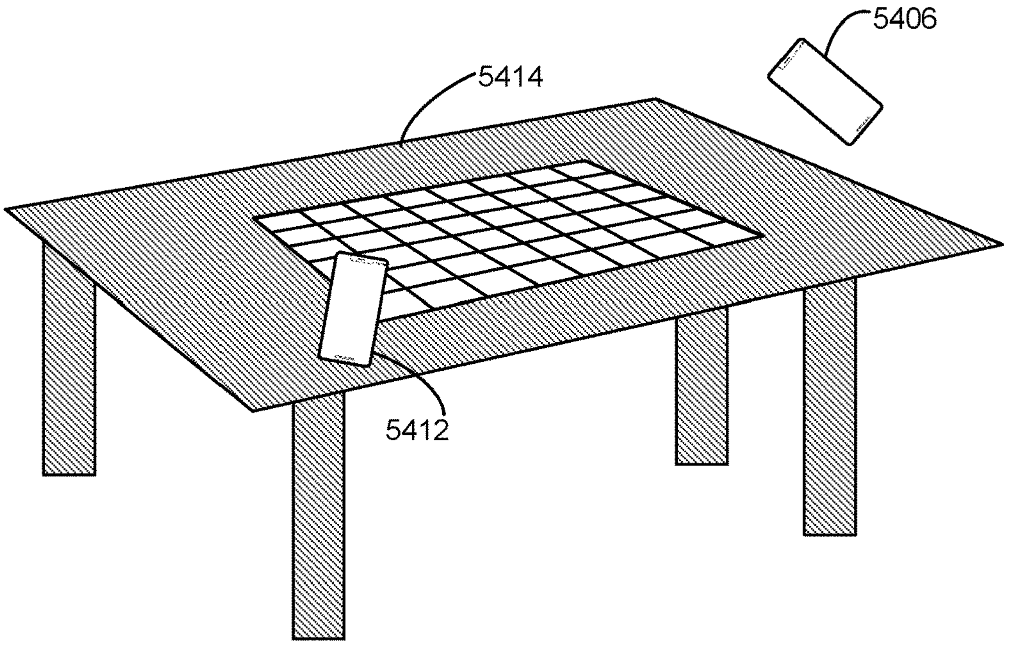
Figure 5D5a
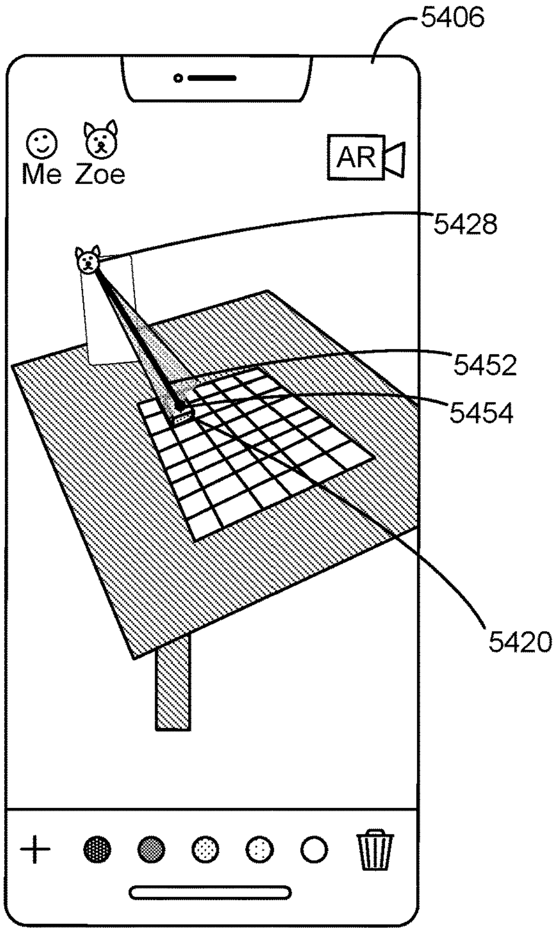
Figure 5D5b
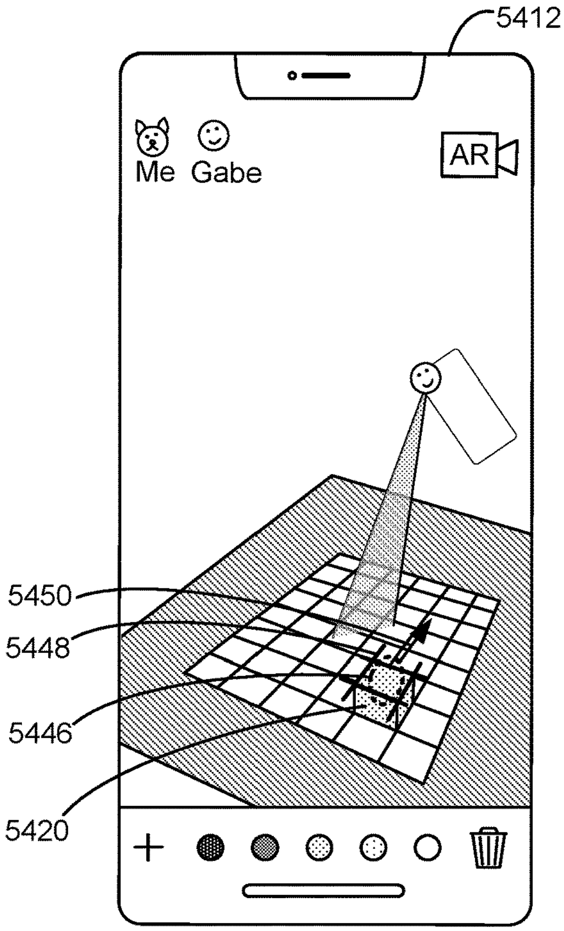
Figure 5D5c

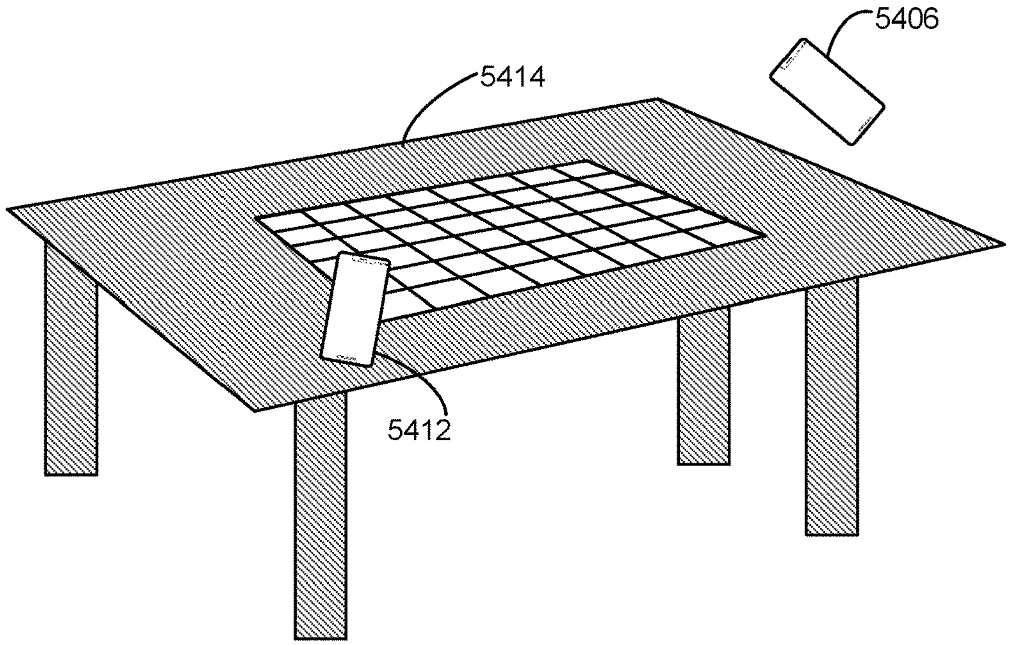
Figure 5D6a
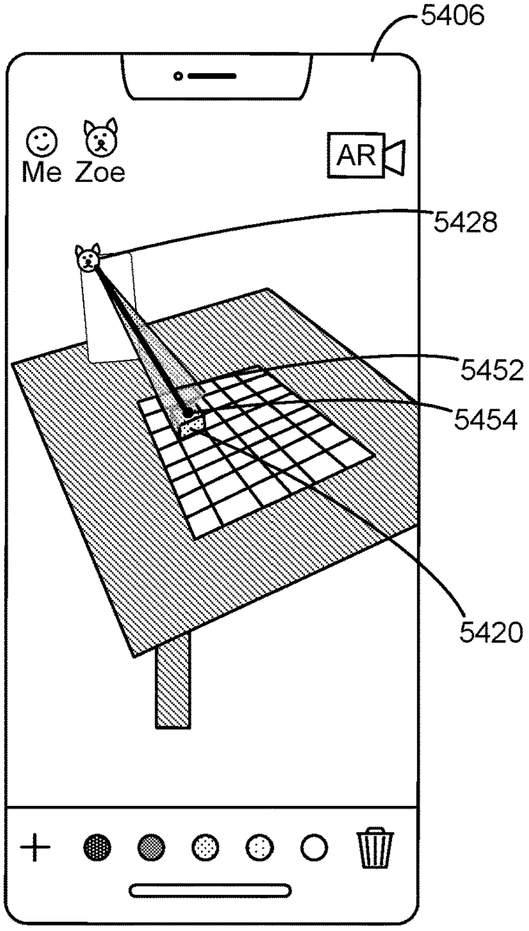
Figure 5D6b
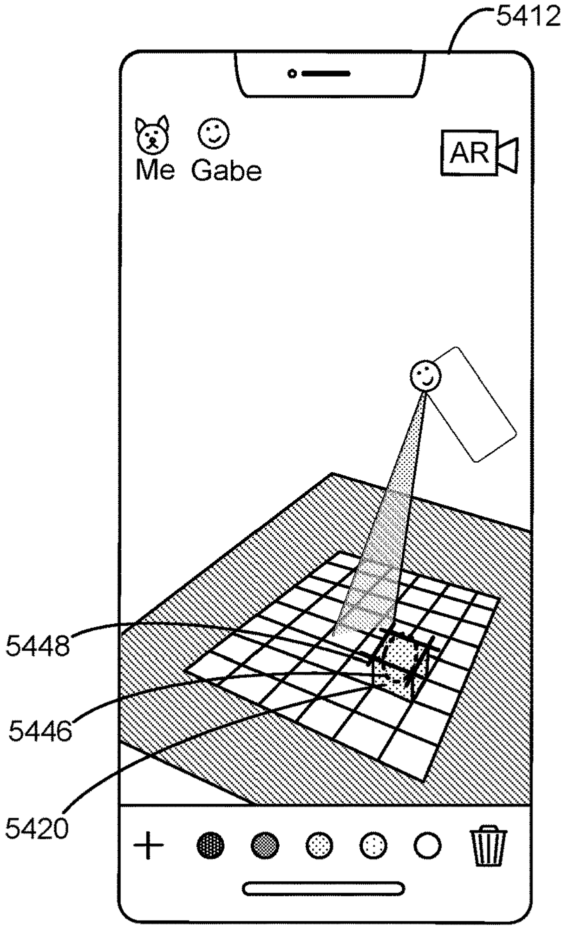
Figure 5D6c

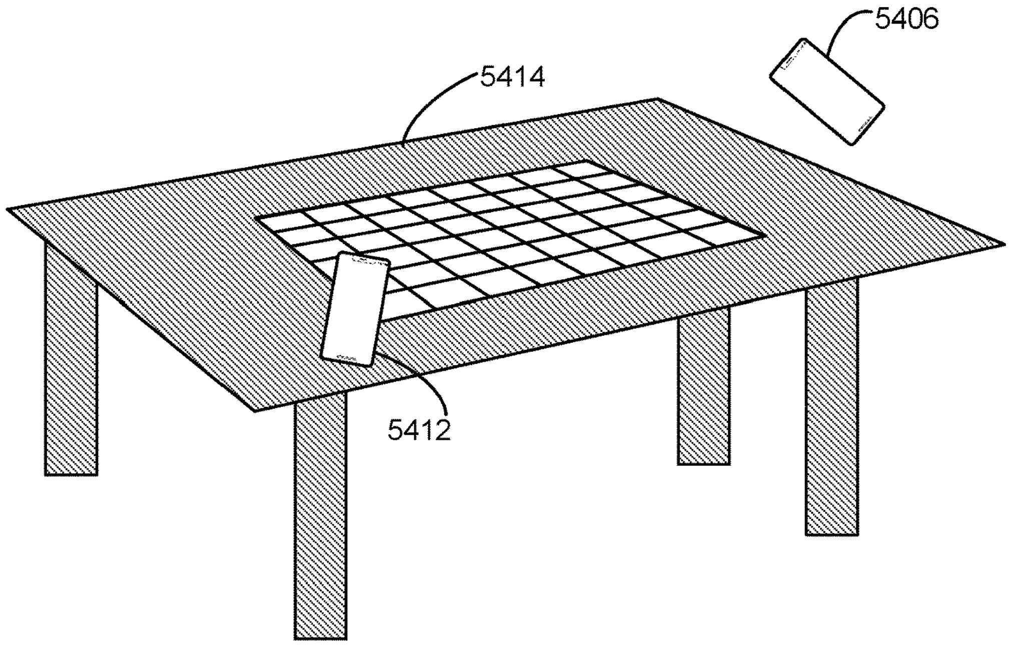
Figure 5D7a
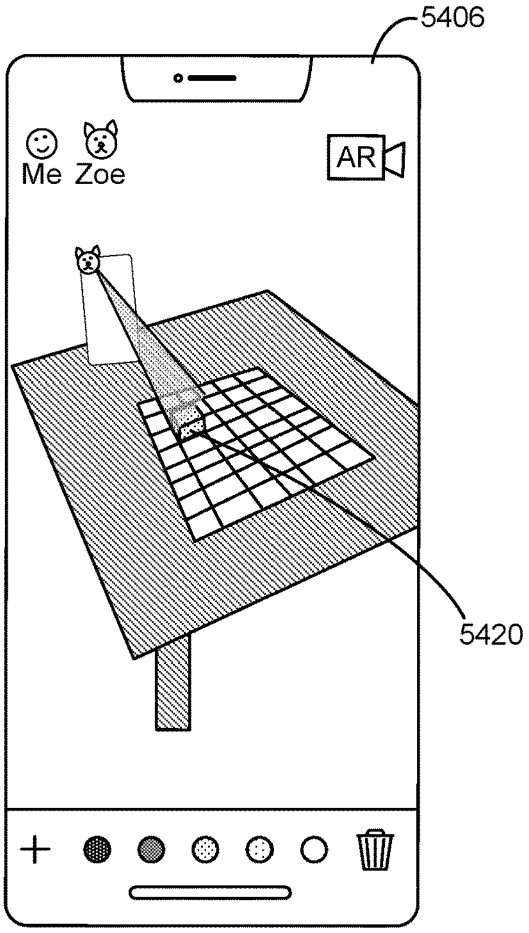
Figure 5D7b
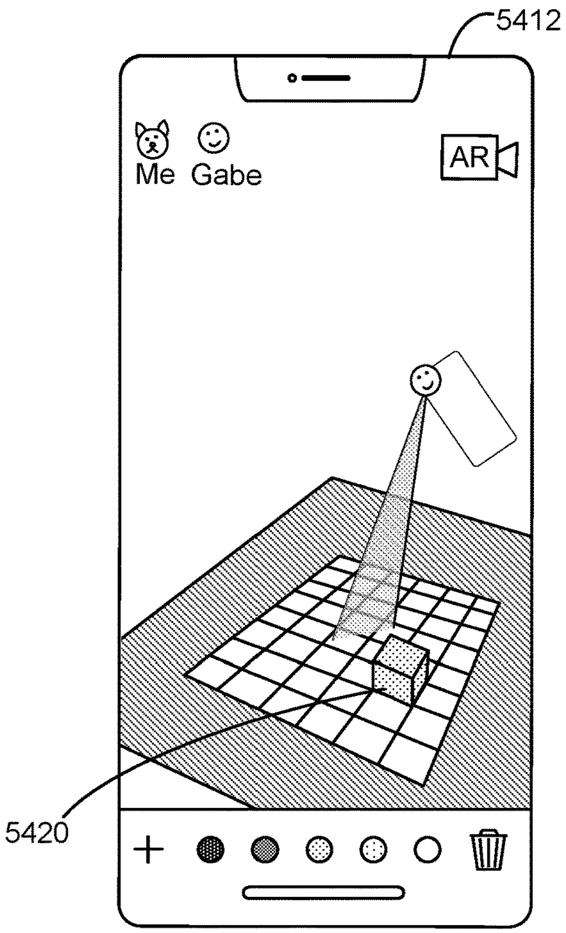
Figure 5D7c

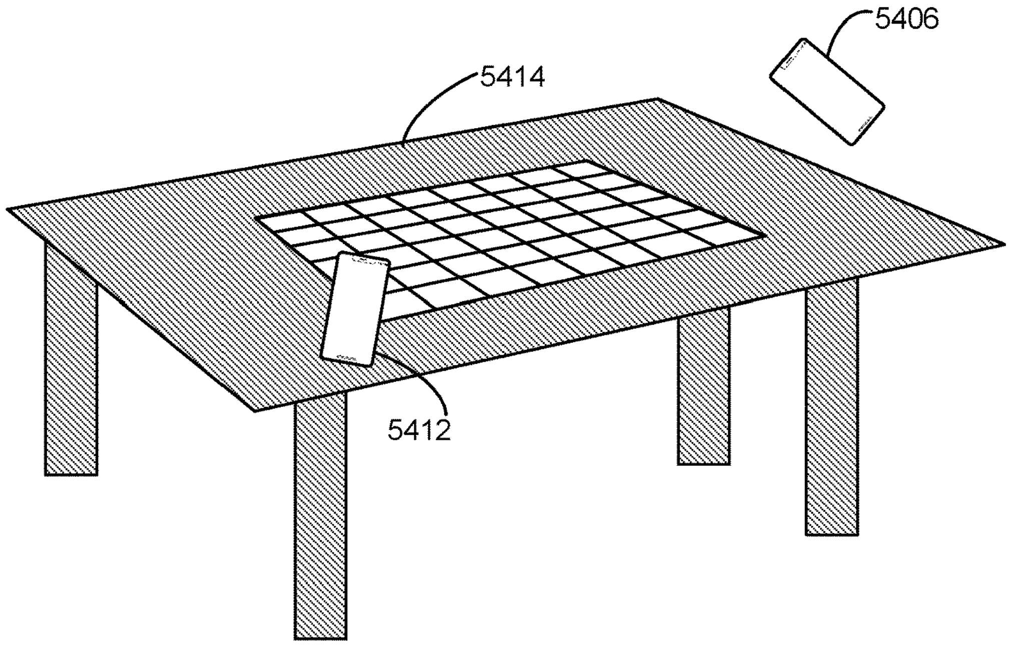
Figure 5D8a
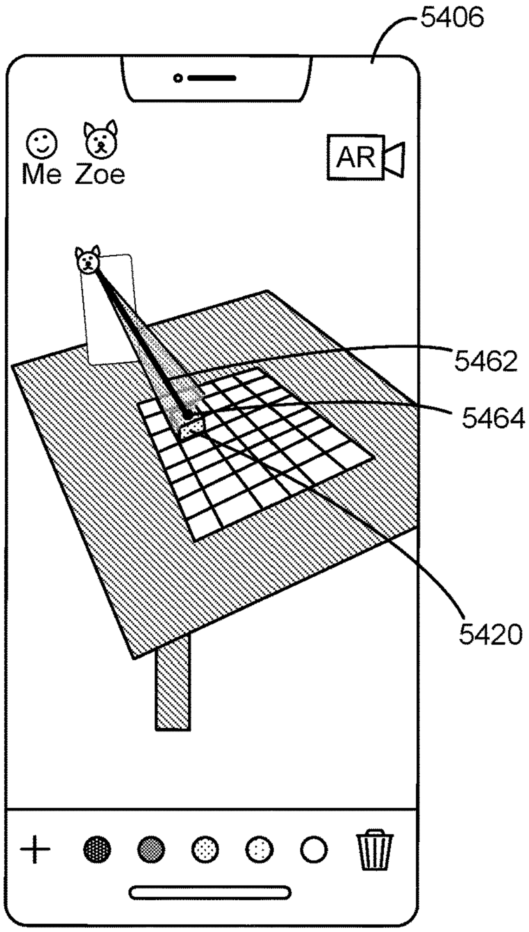
Figure 5D8b
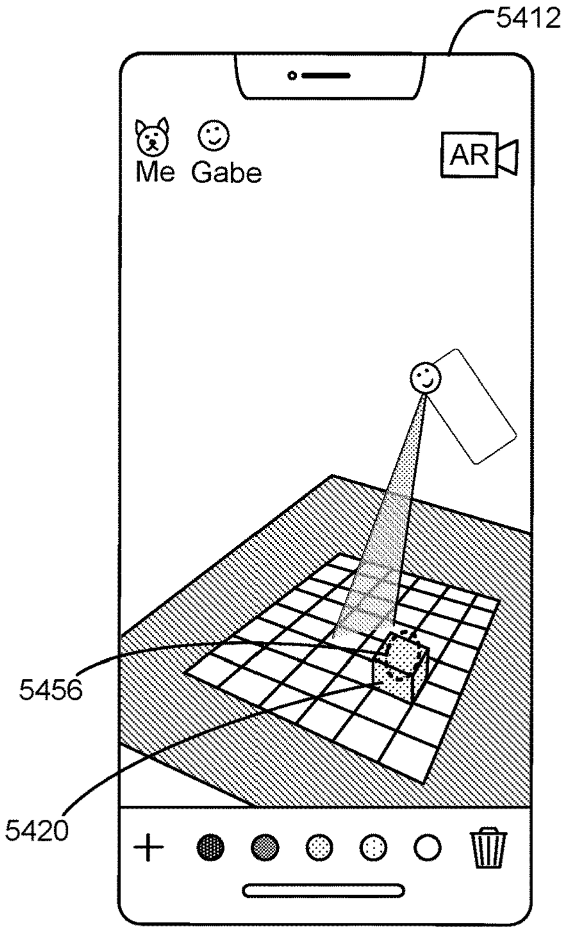
Figure 5D8c

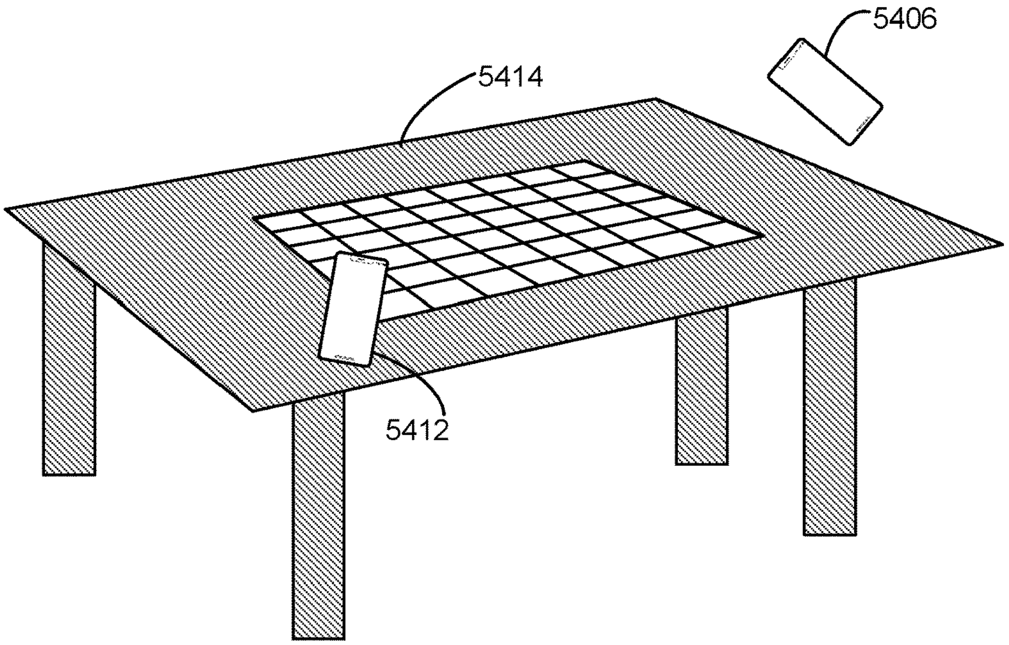
Figure 5D9a
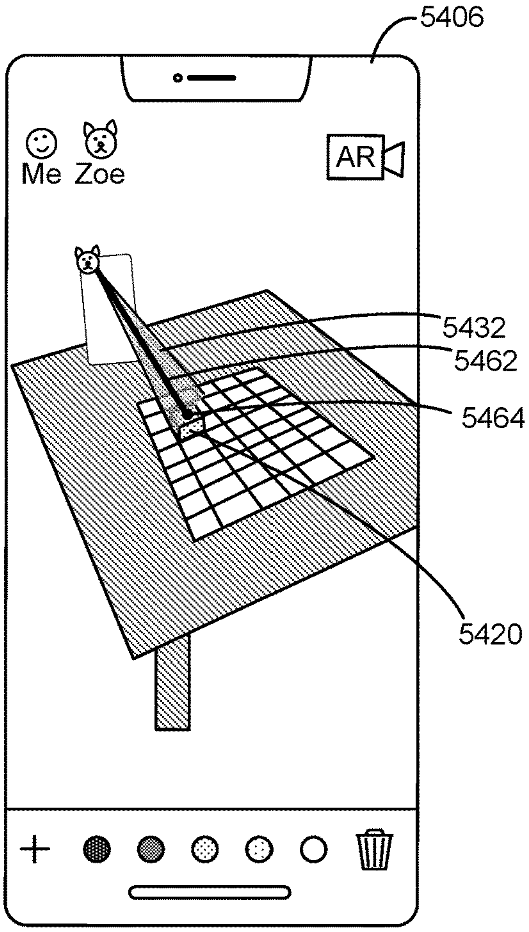
Figure 5D9b
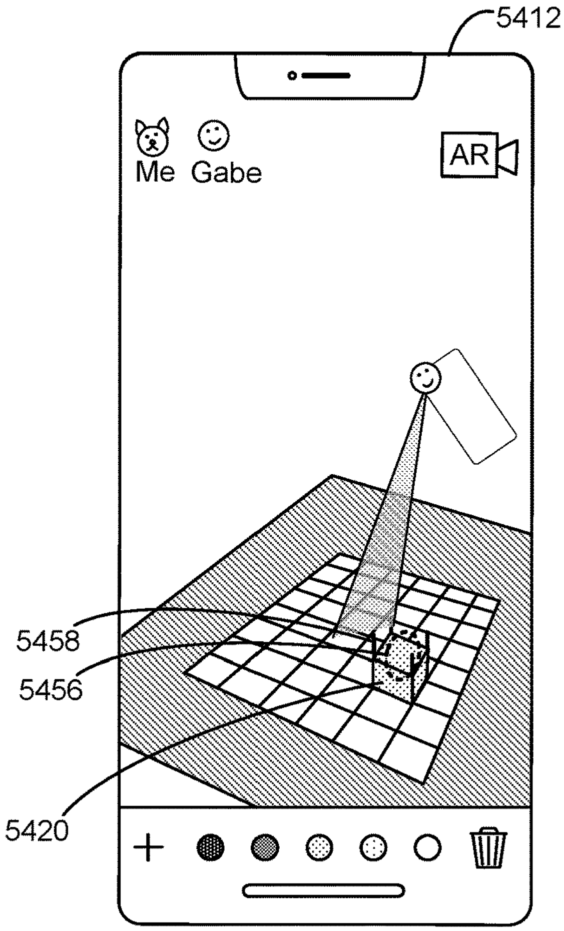
Figure 5D9c

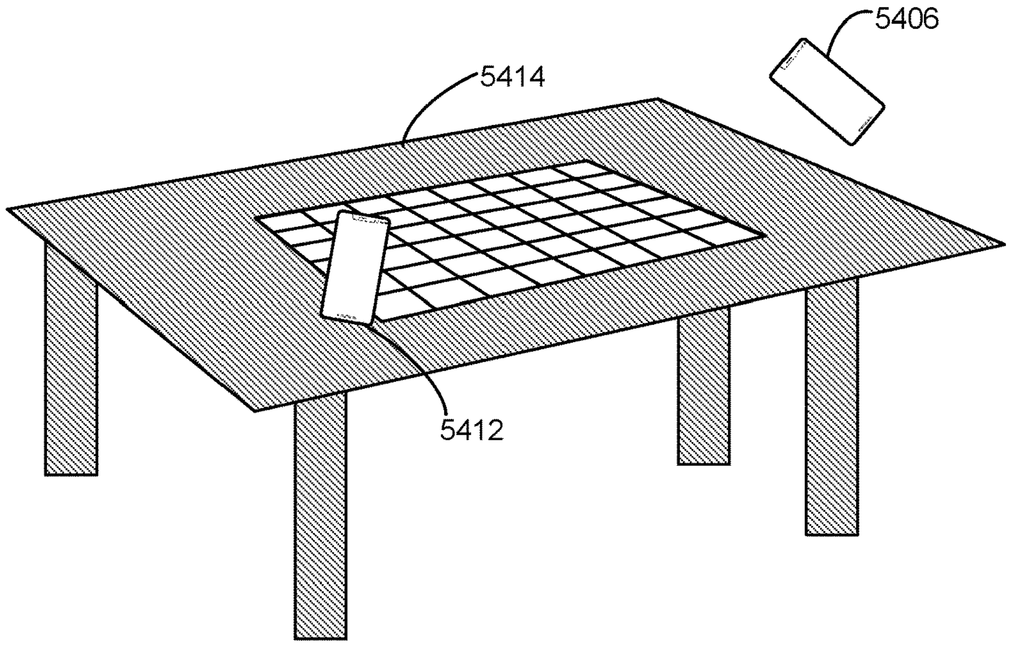
Figure 5D10a
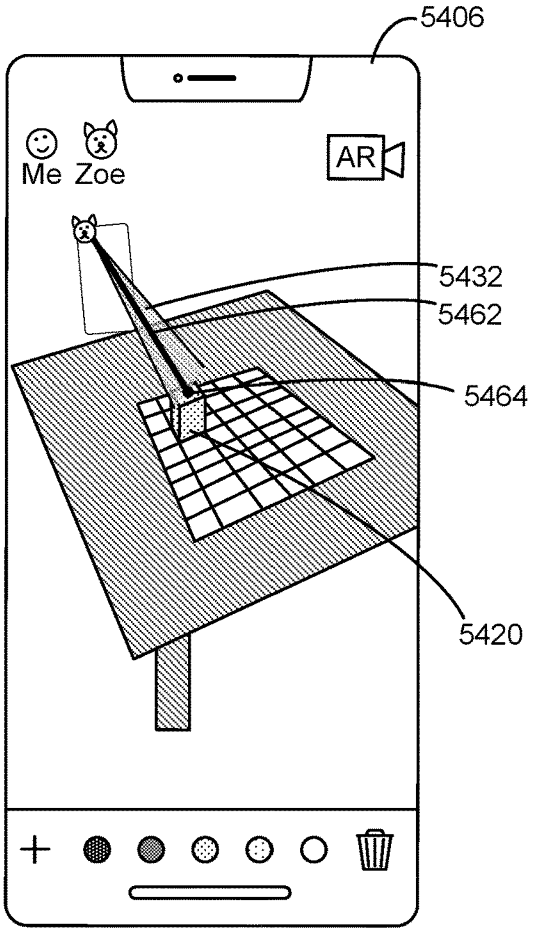
Figure 5D10b
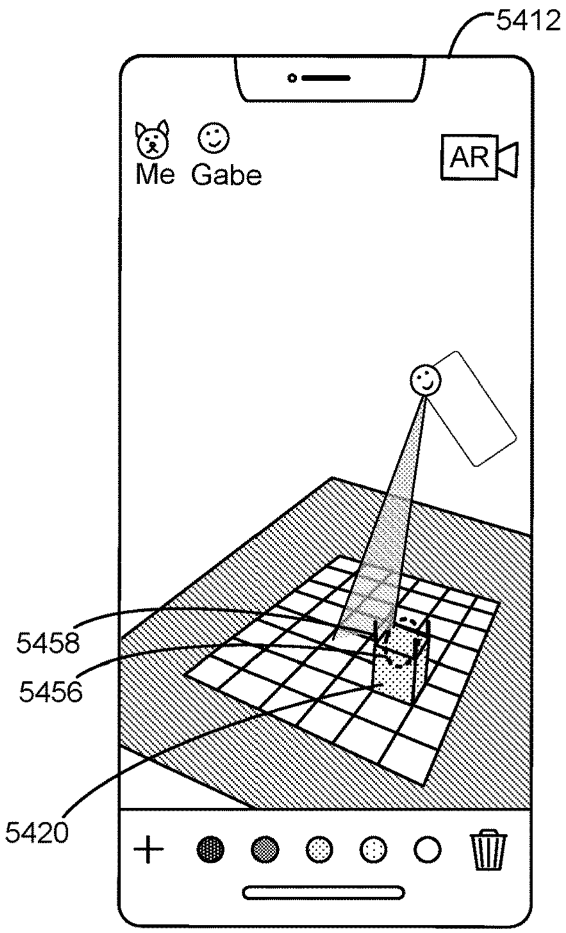
Figure 5D10c

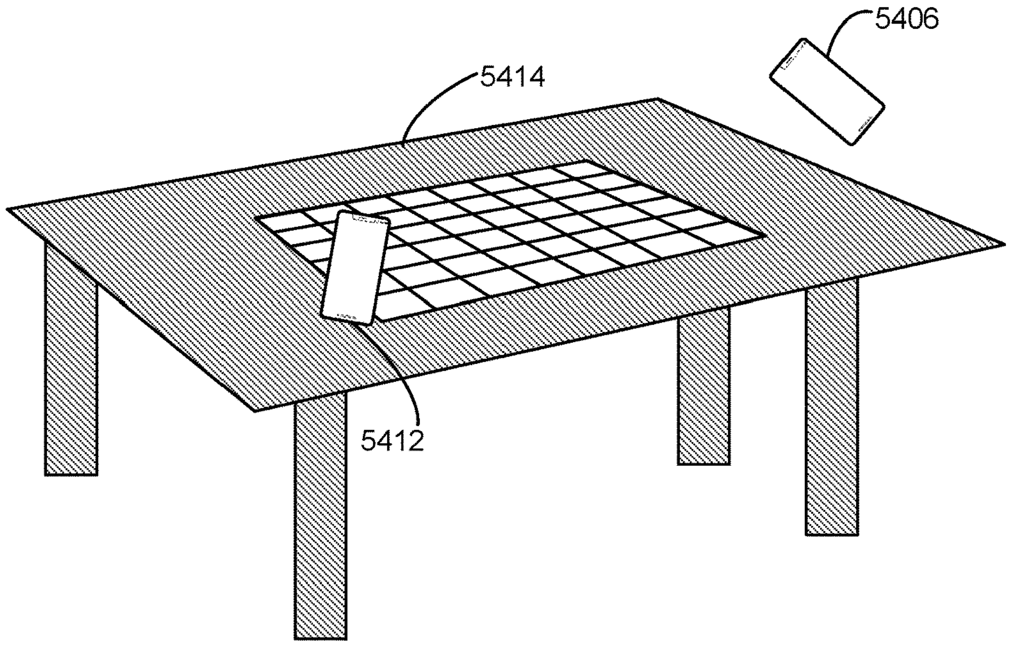
Figure 5D11a
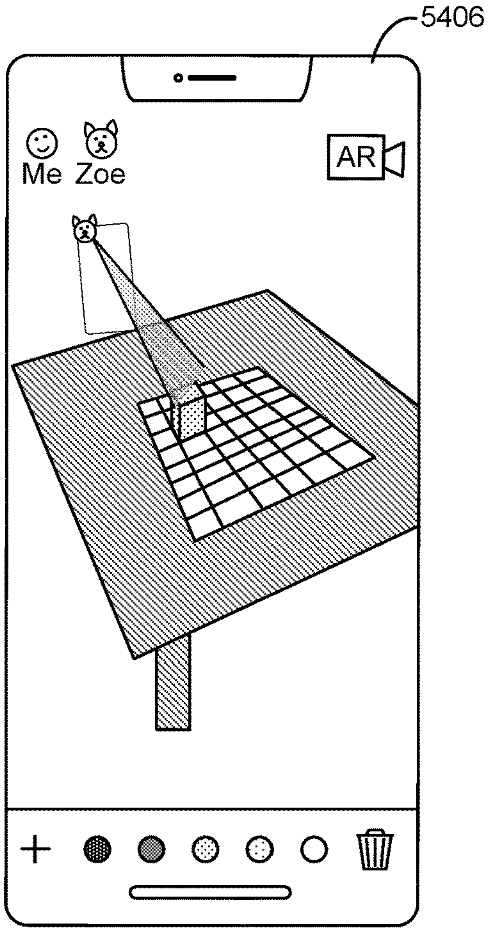
Figure 5D11b
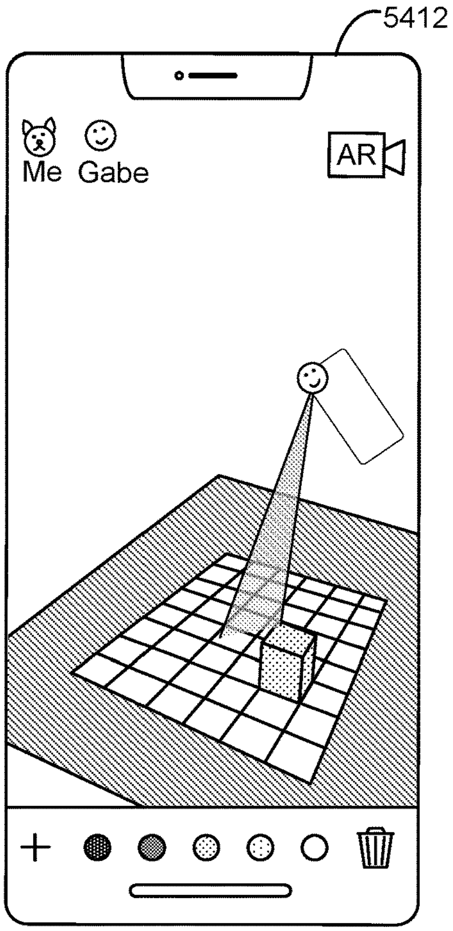
Figure 5D11c

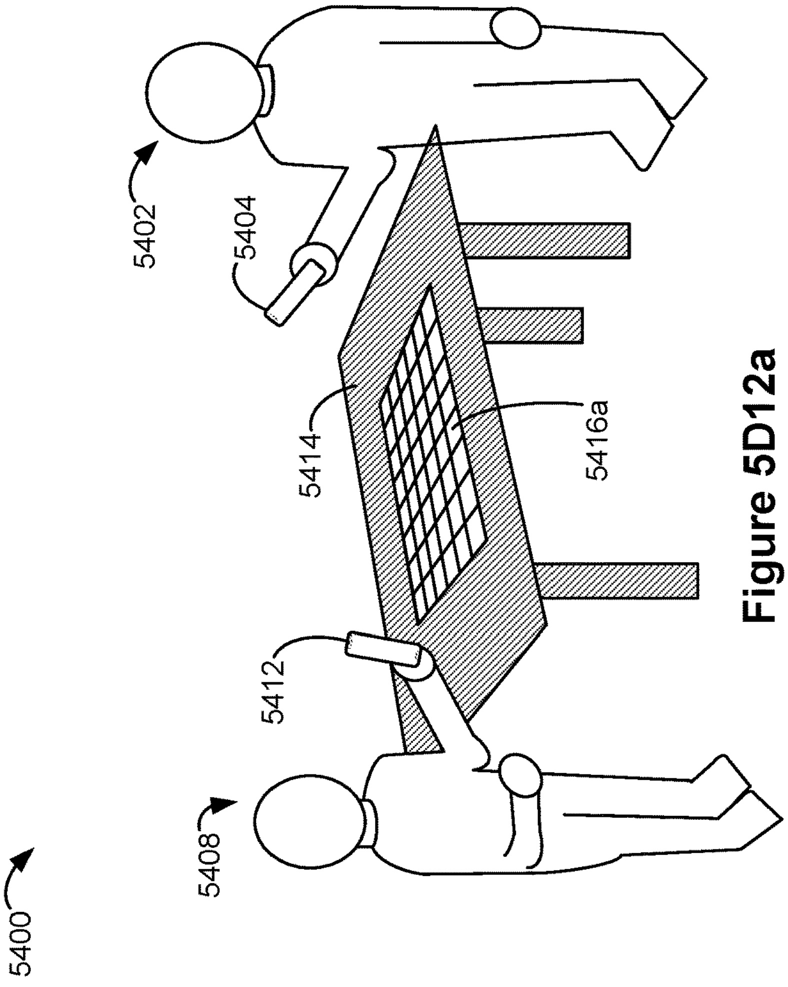
Figure 5D12a
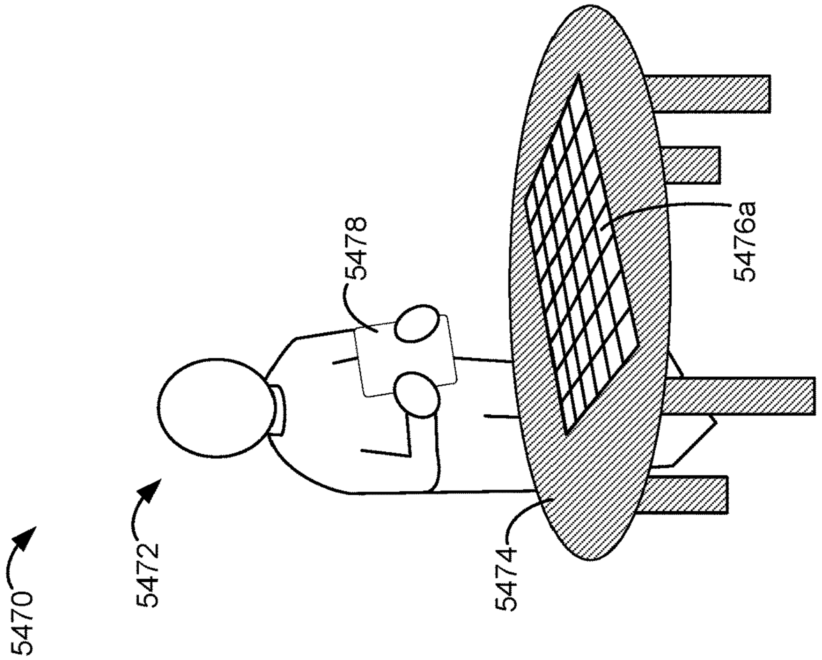
Figure 5D12b

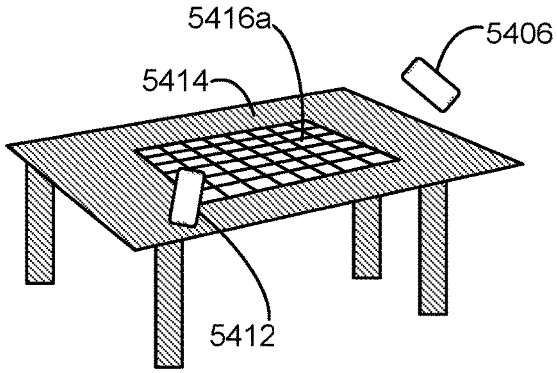
Figure 5D13a
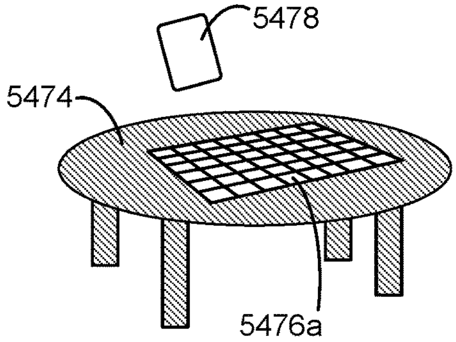
Figure 5D13b
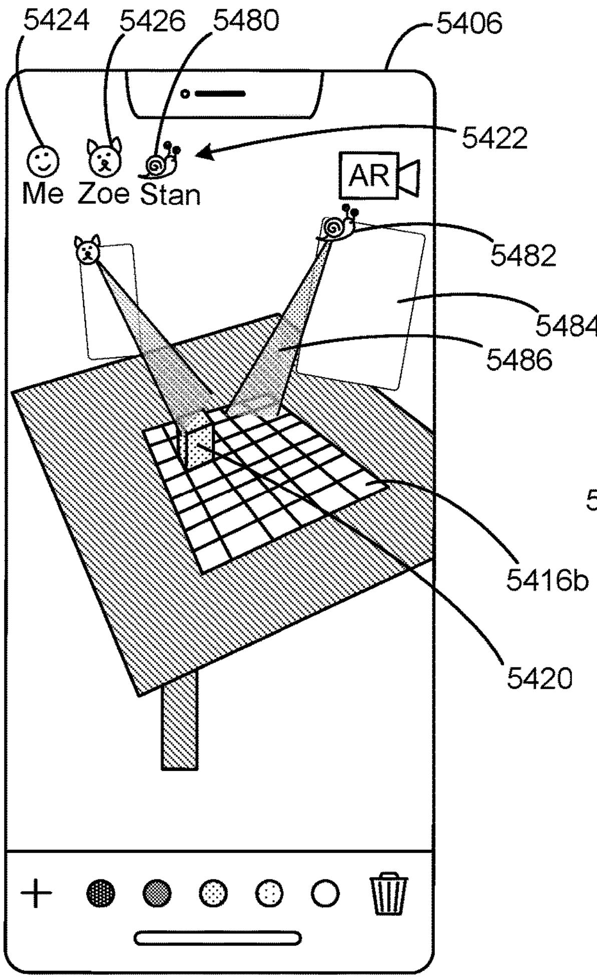
Figure 5D13c
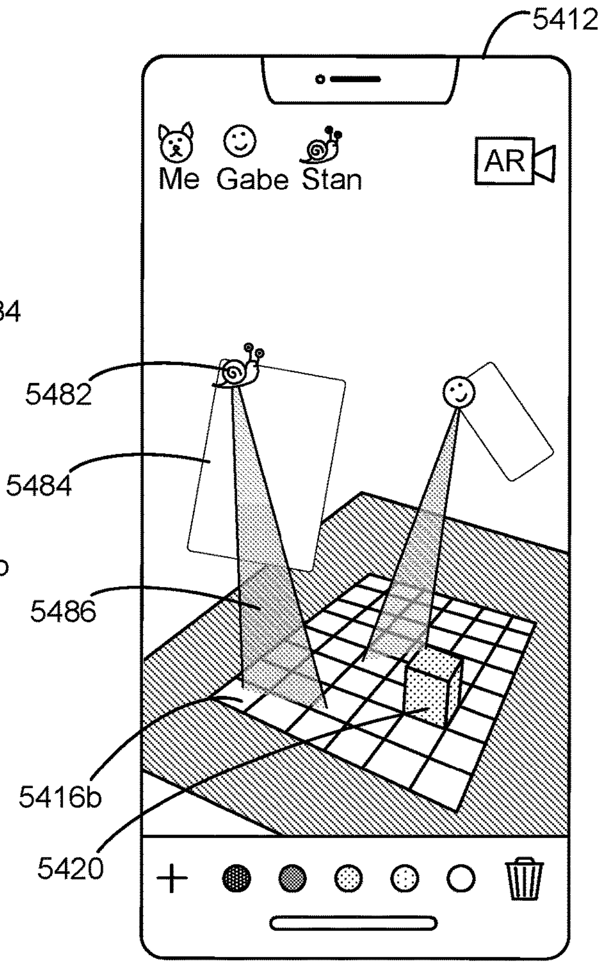
Figure 5D13d

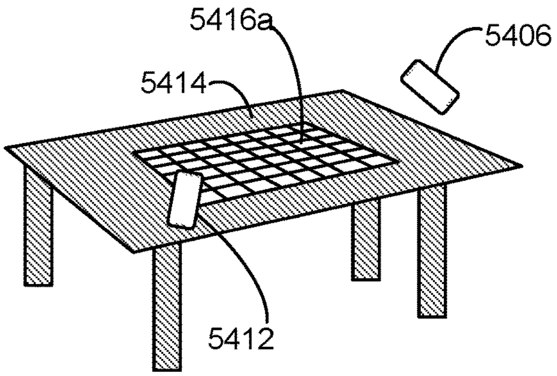
Figure 5D14a
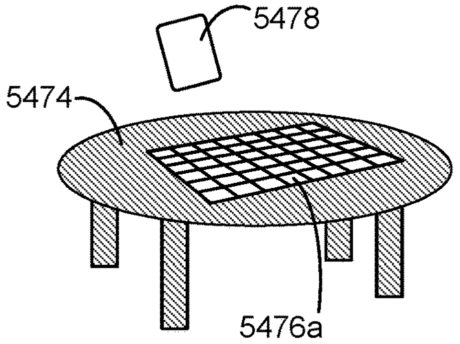
Figure 5D14b
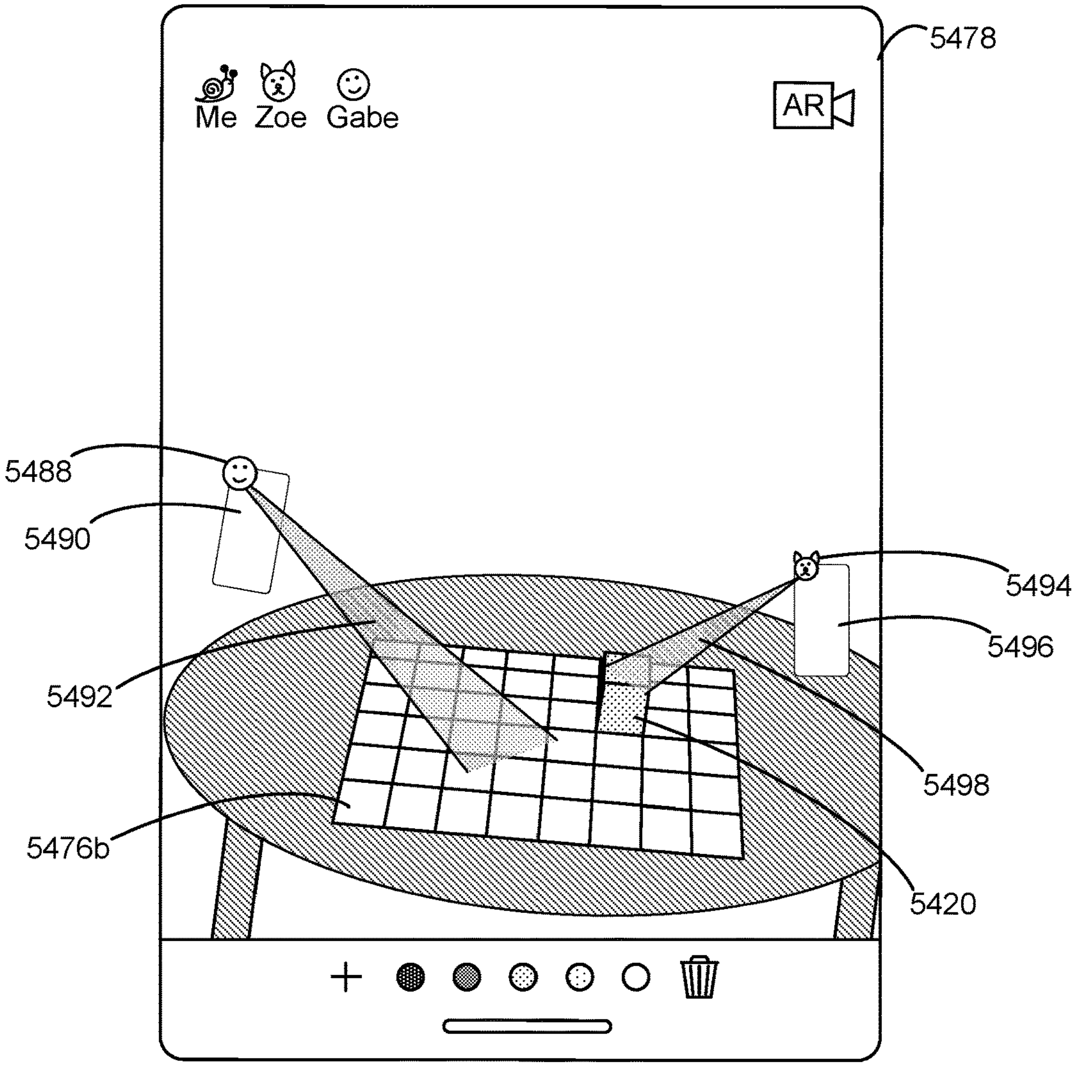
Figure 5D14c

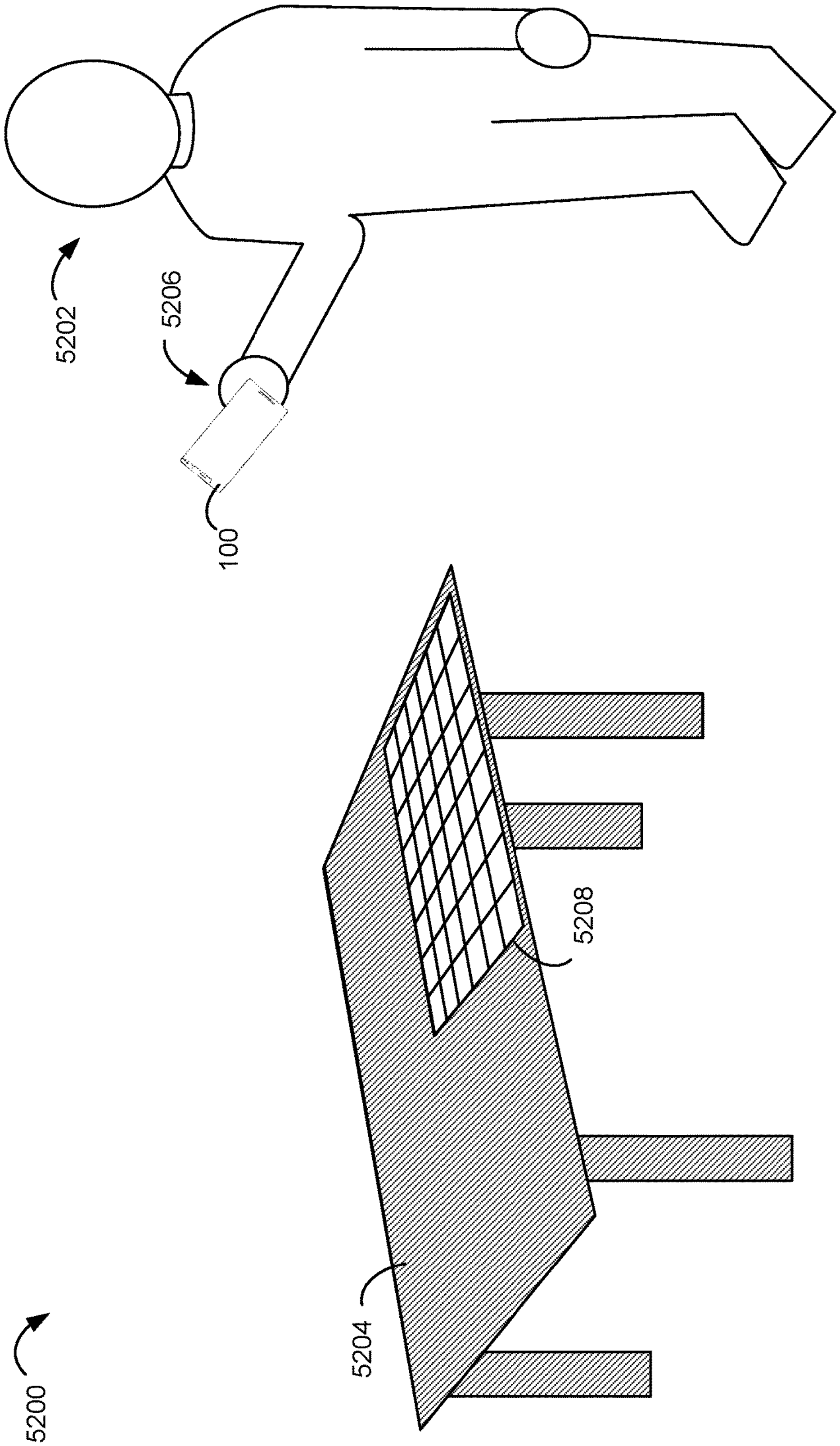
Figure 5E1

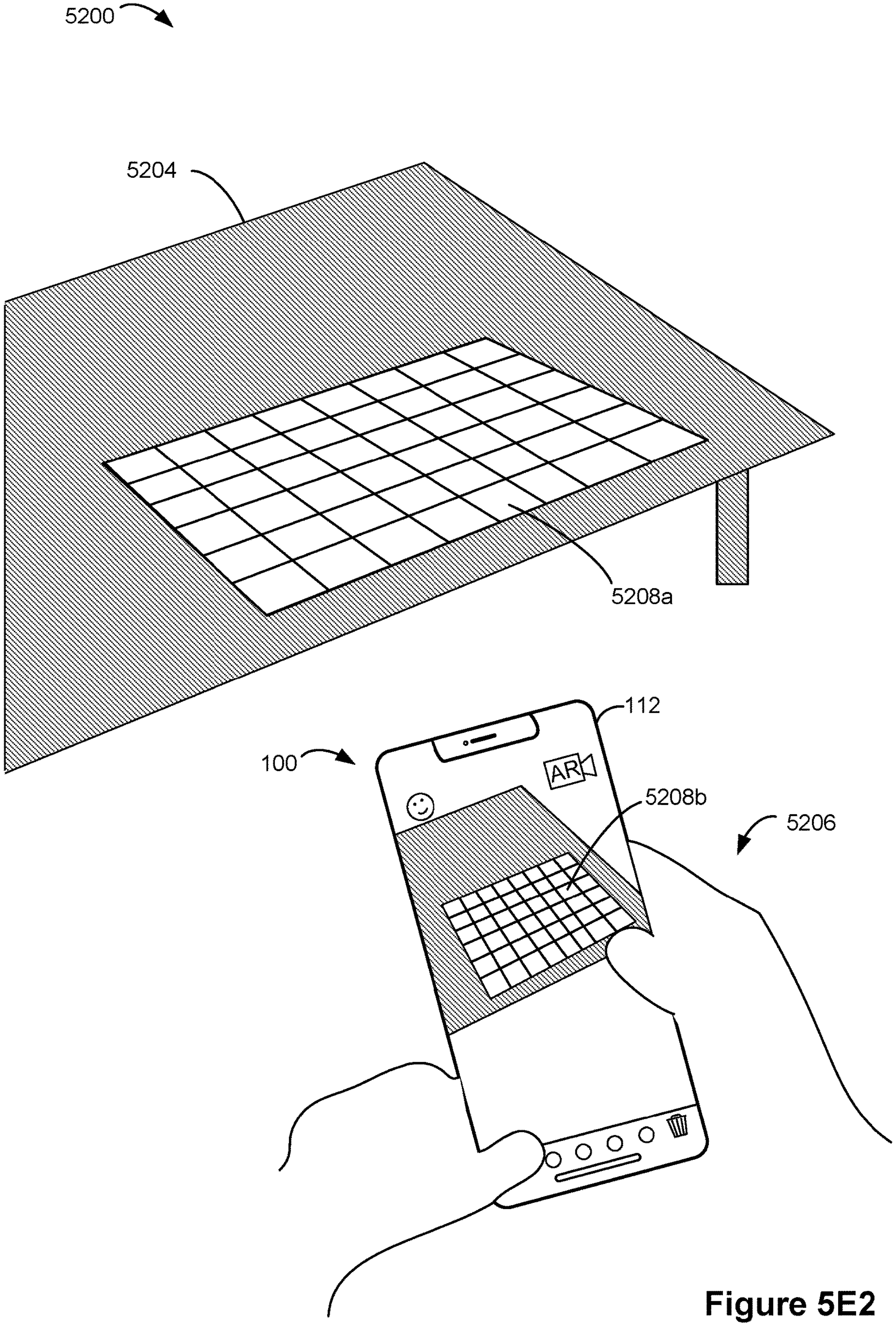
Figure 5E2

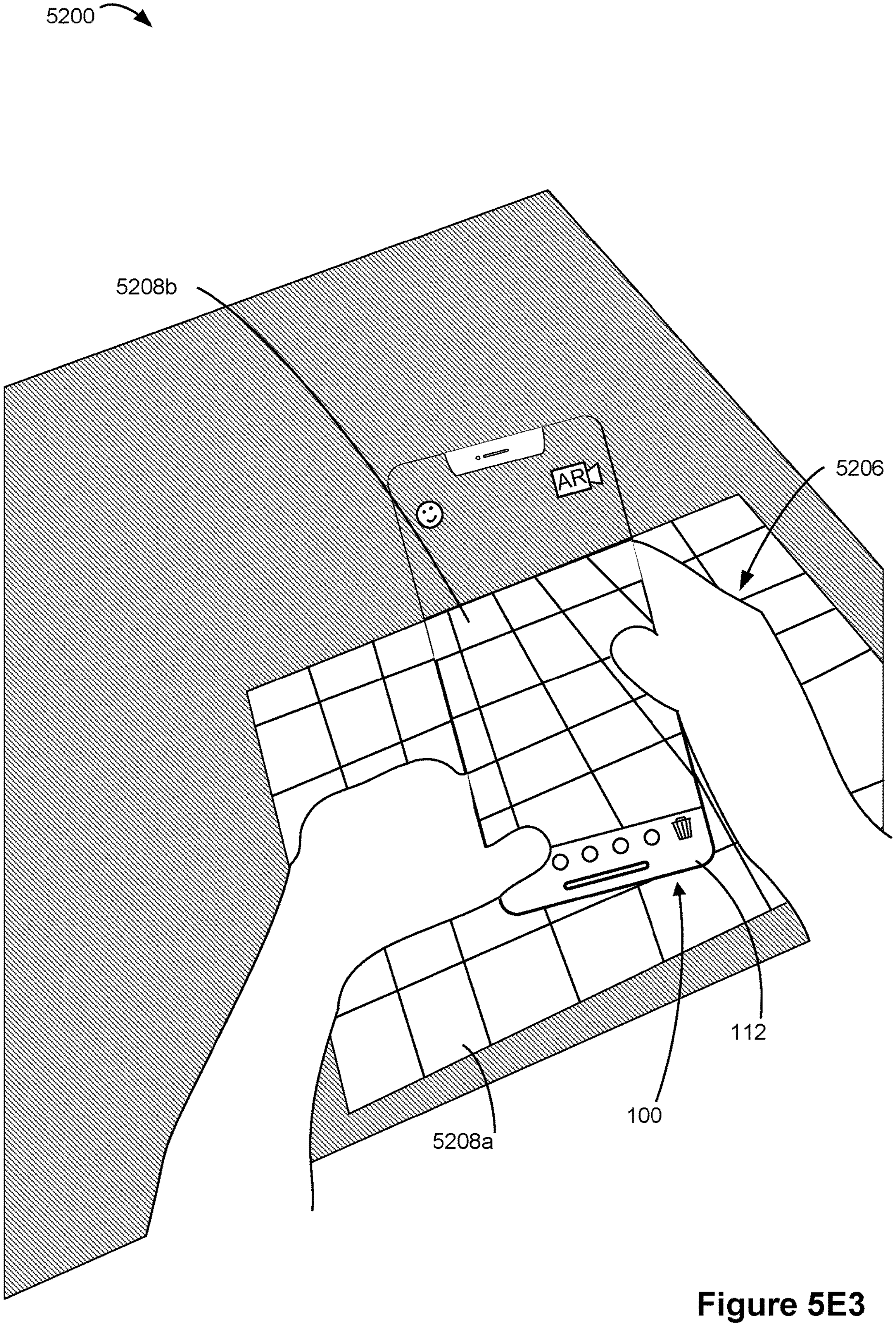
Figure 5E3

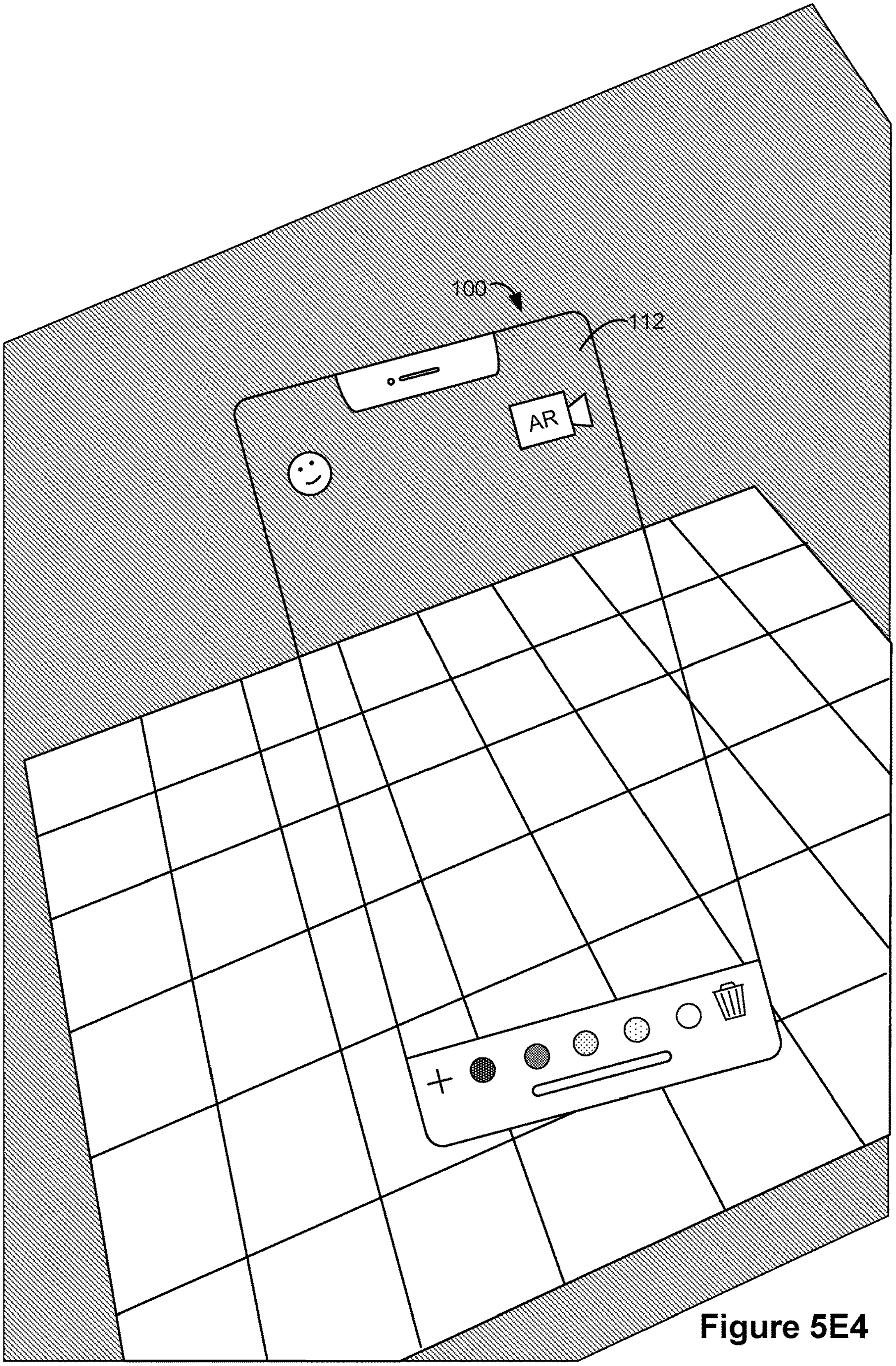
Figure 5E4

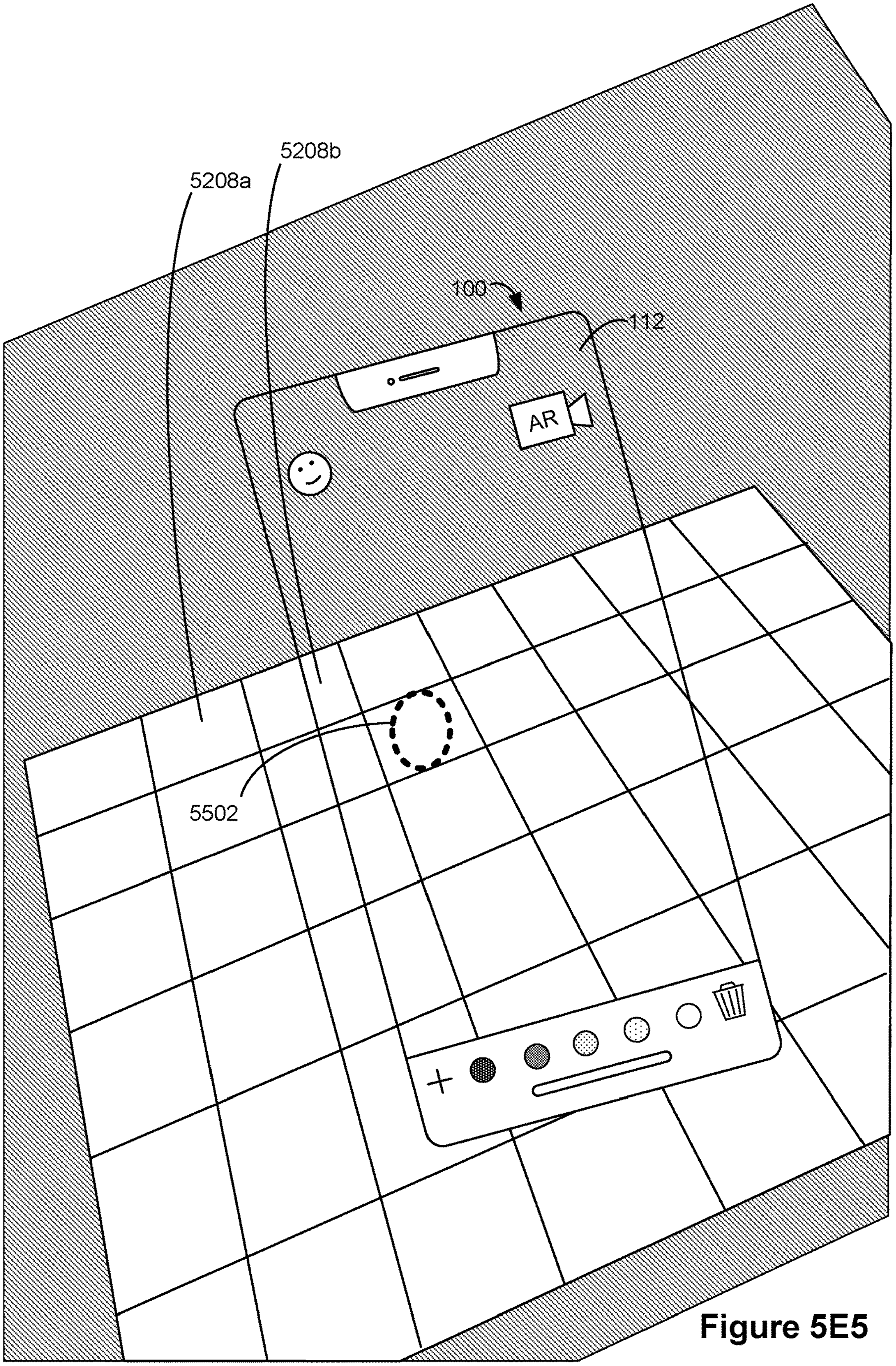
Figure 5E5

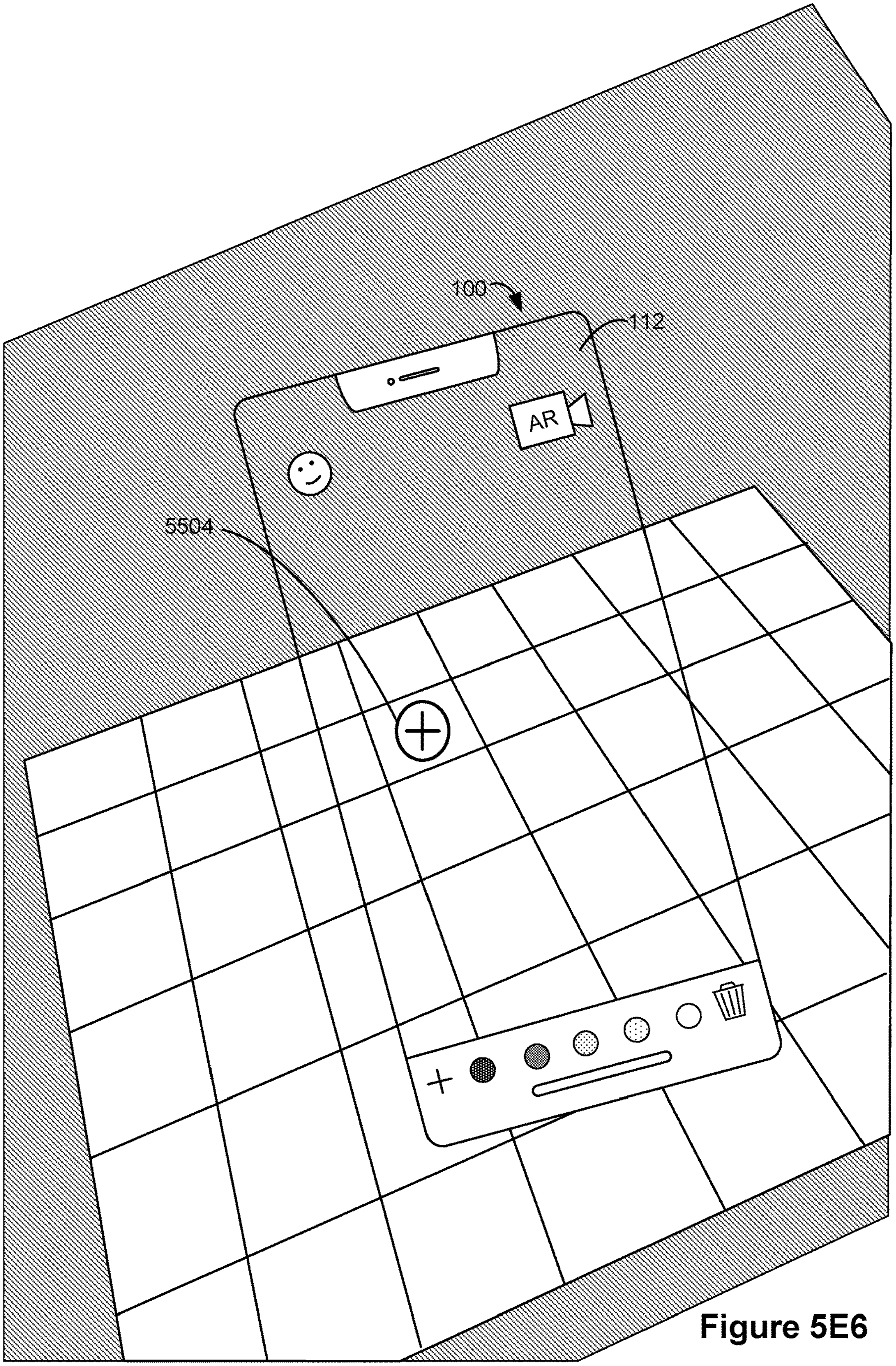
Figure 5E6

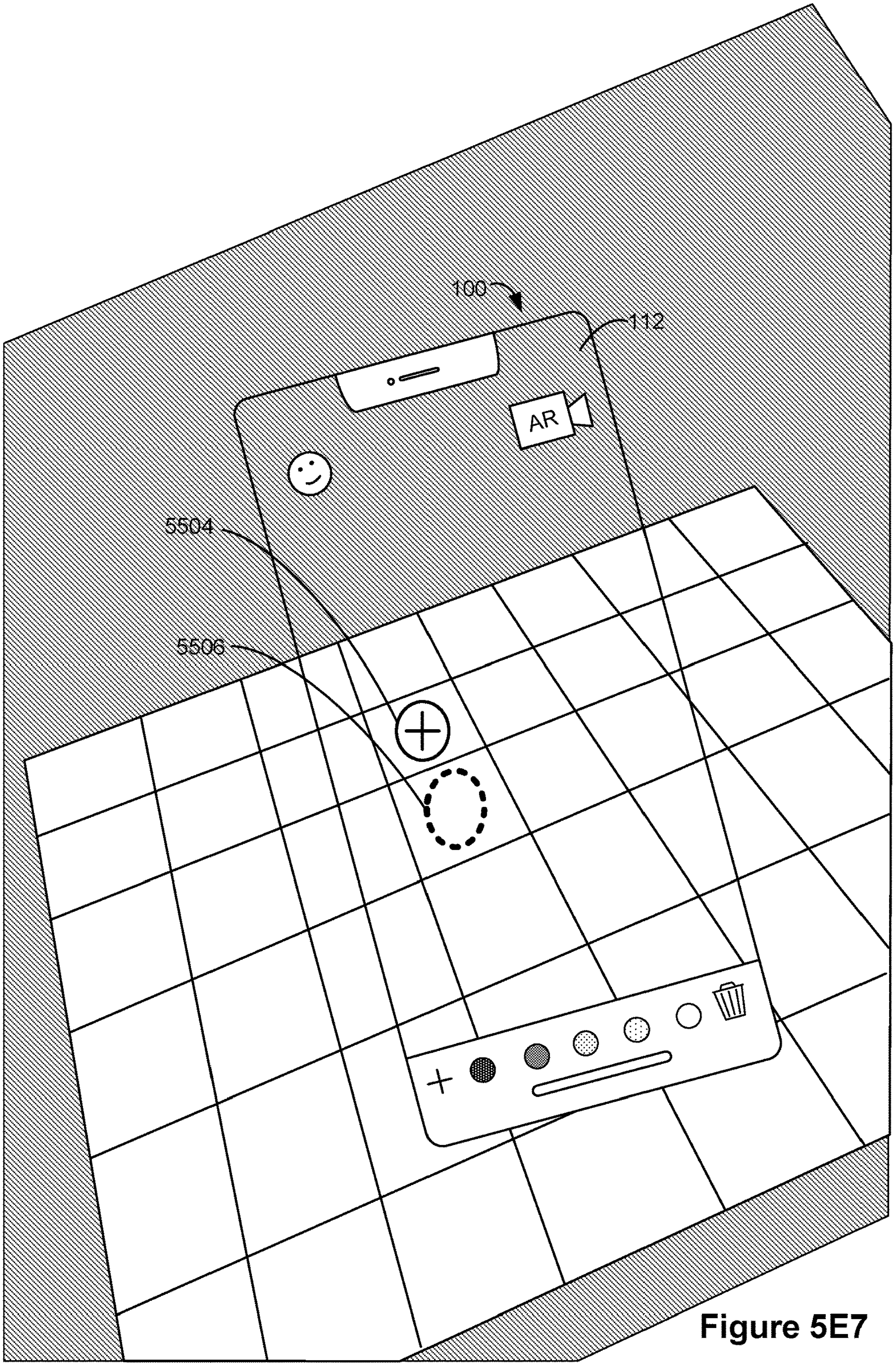
Figure 5E7

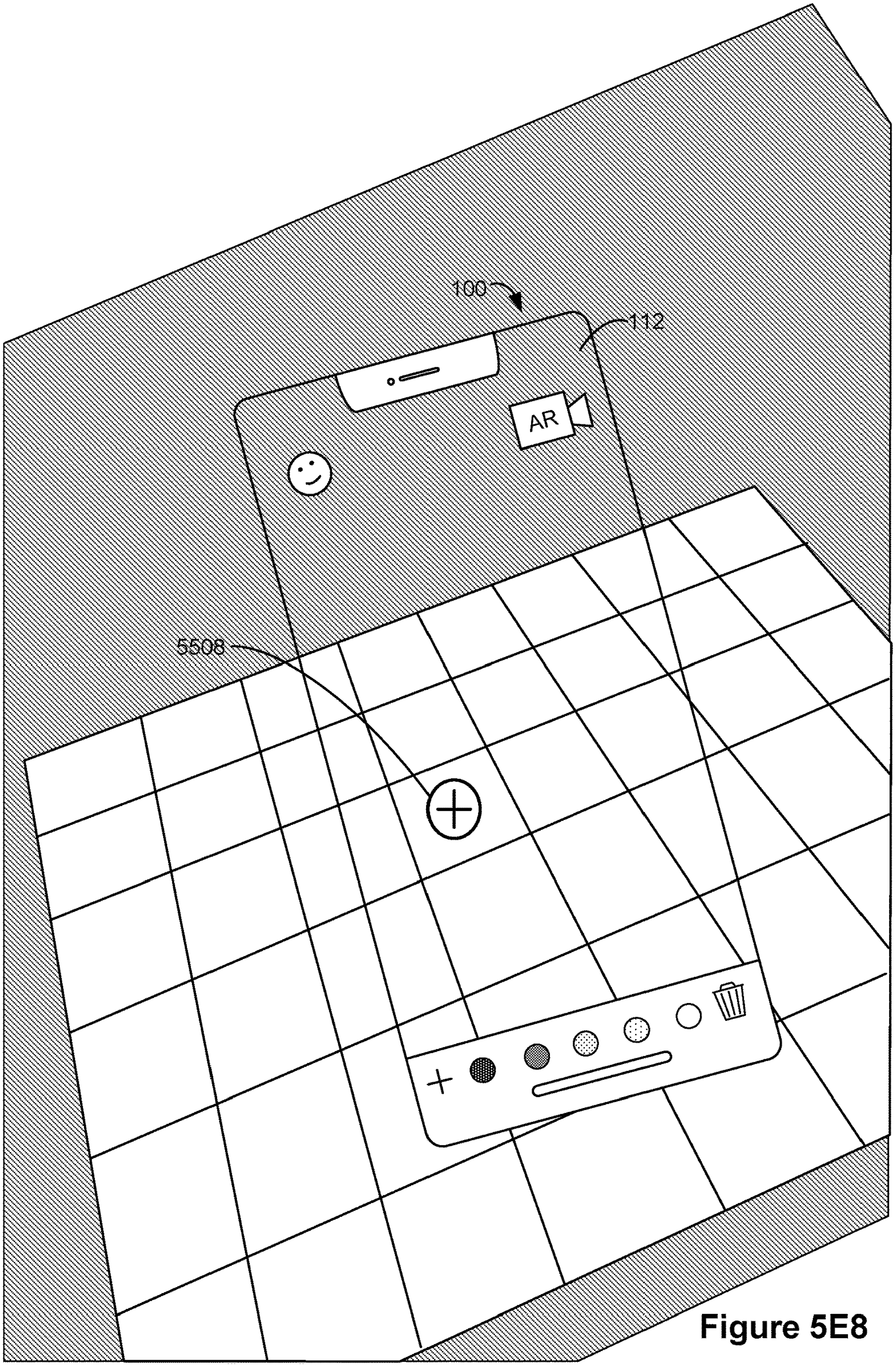
Figure 5E8

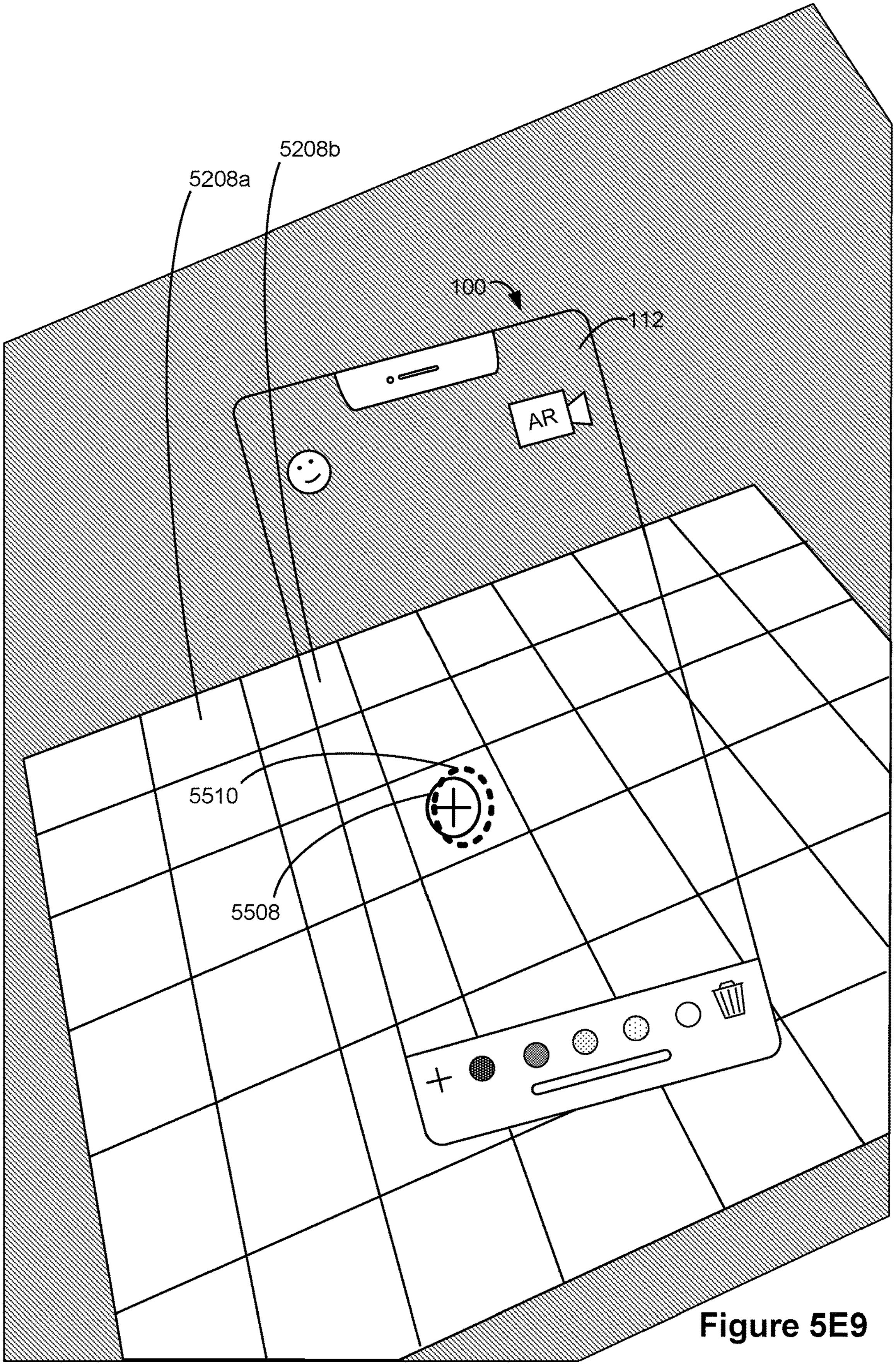
Figure 5E9

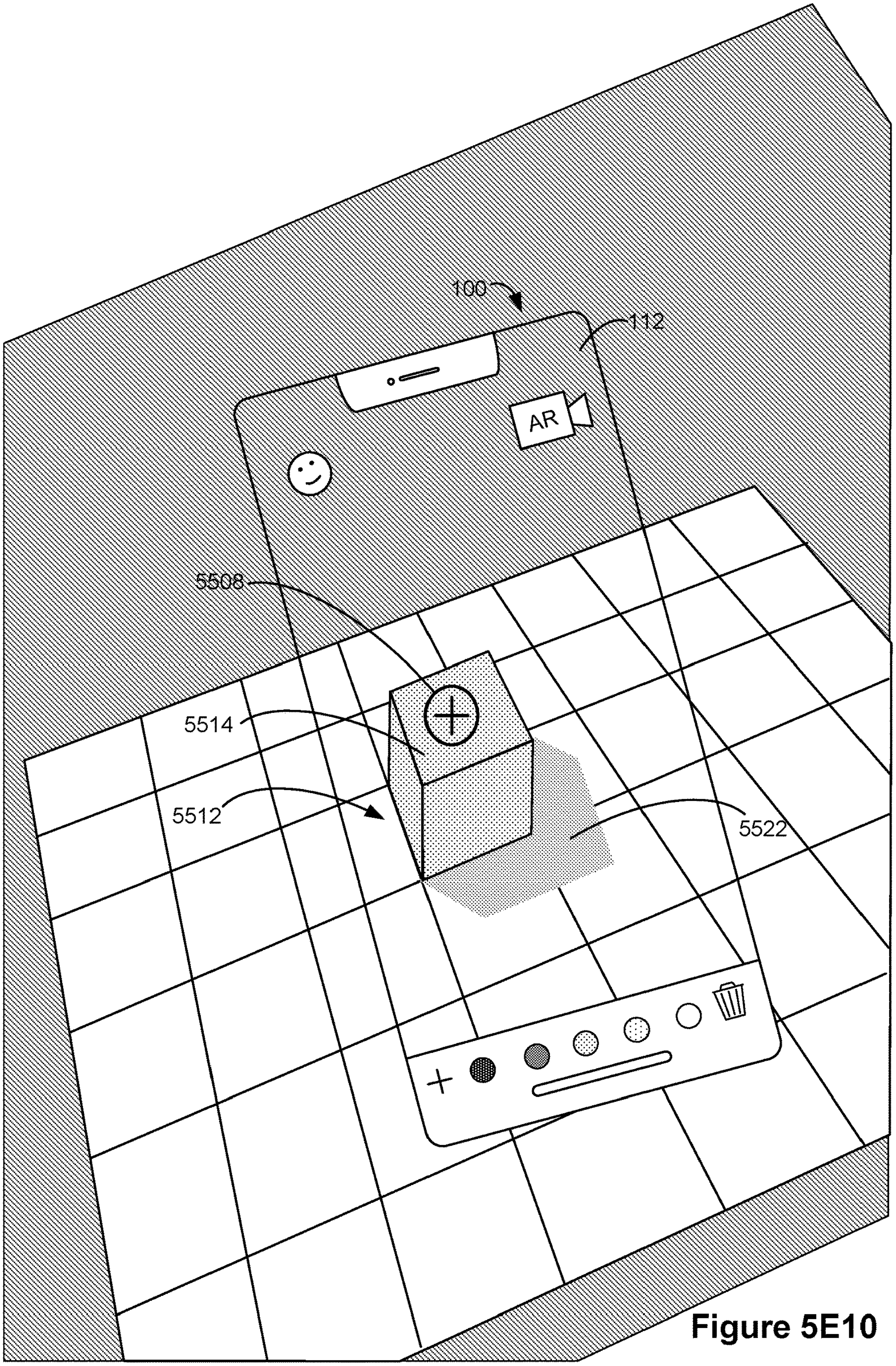
Figure 5E10

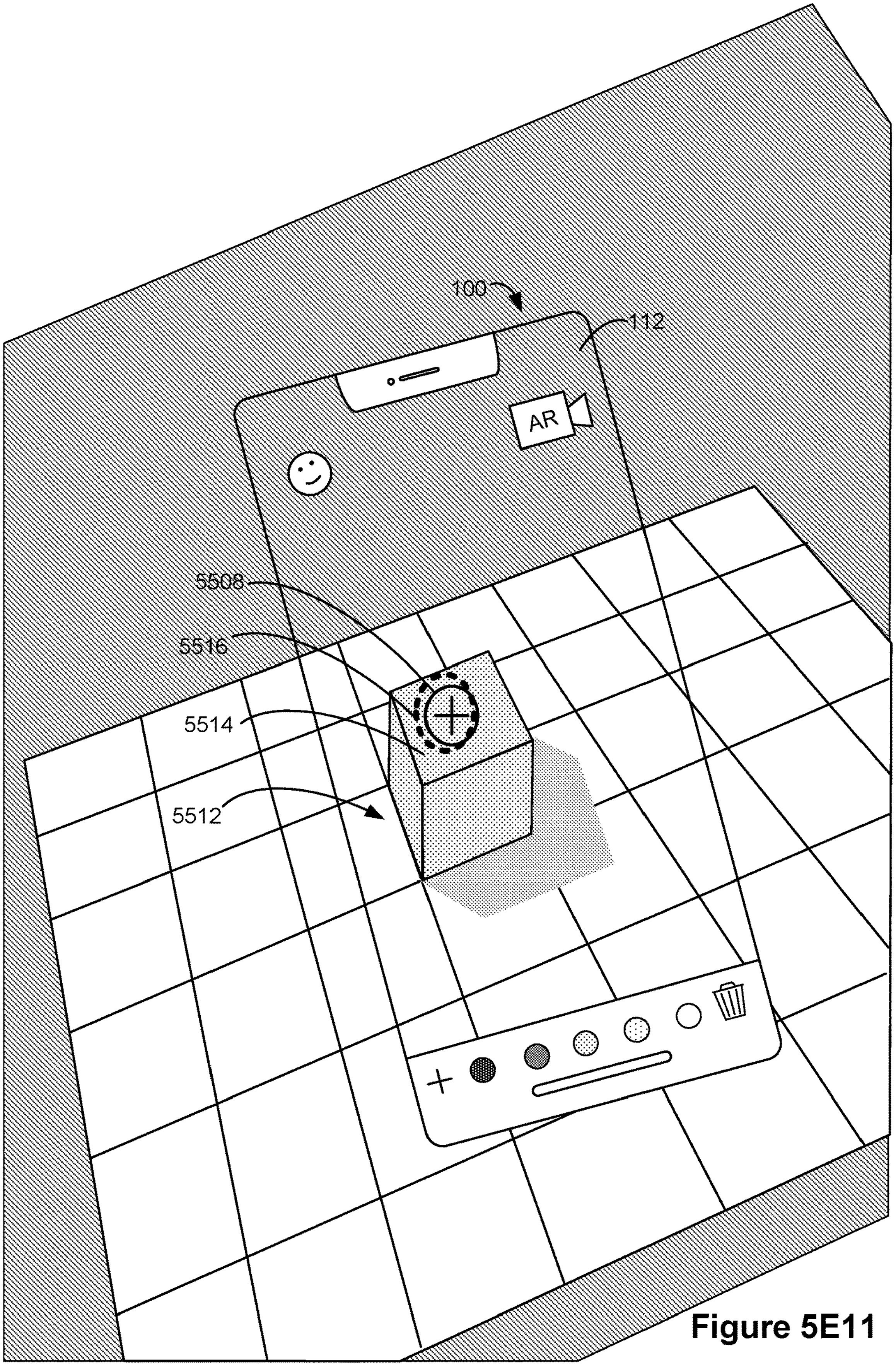
Figure 5E11

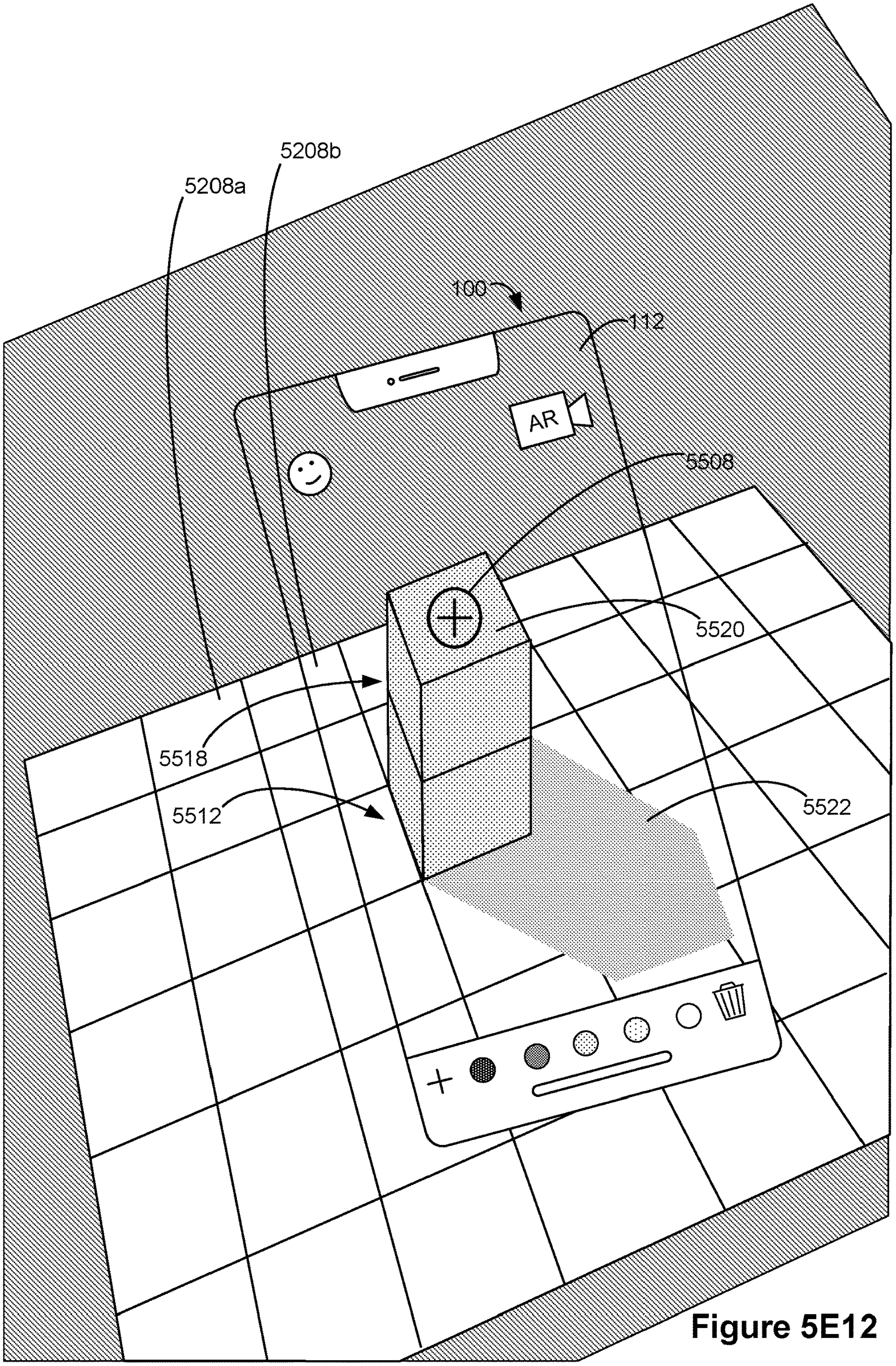
Figure 5E12

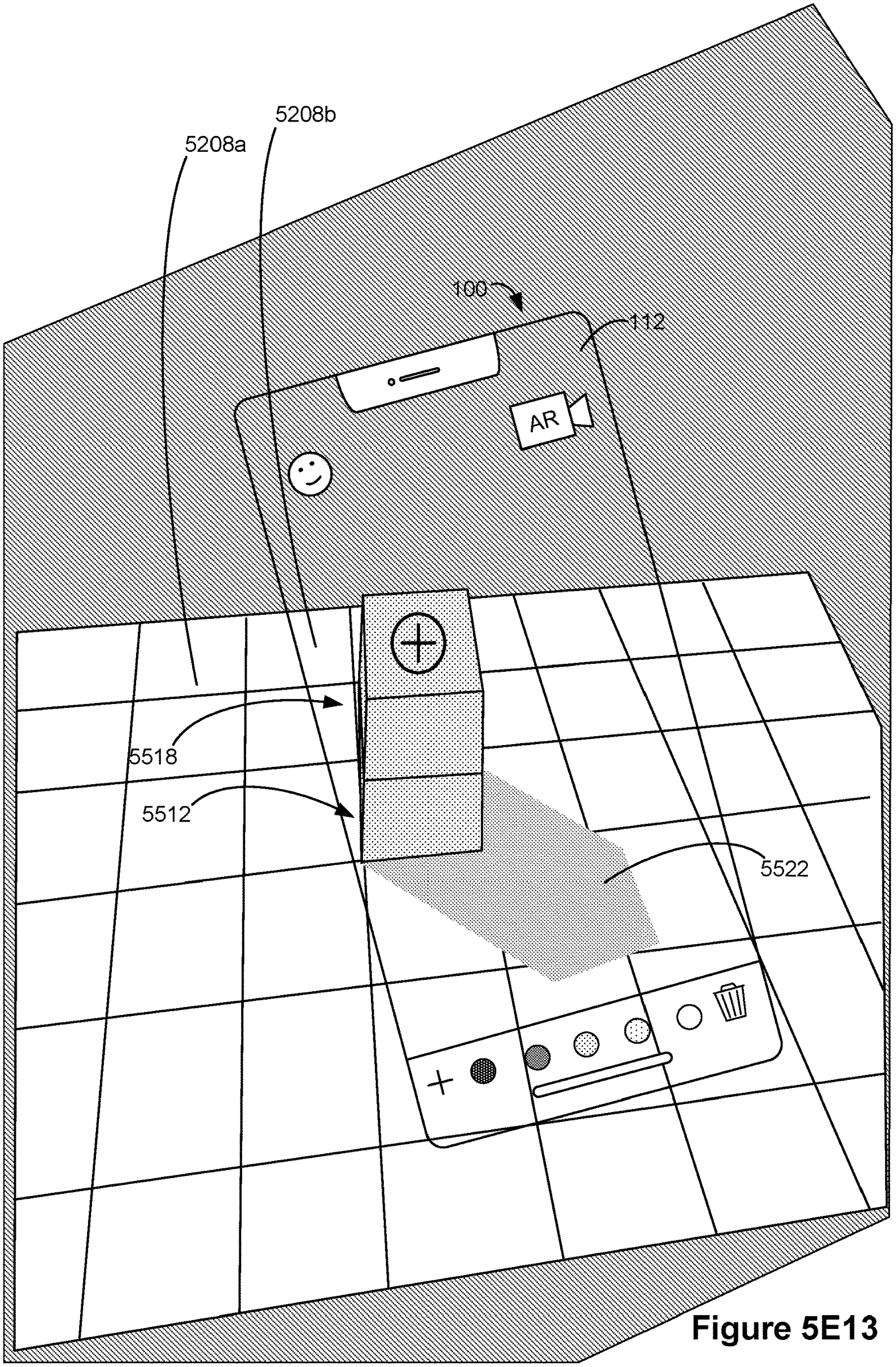
Figure 5E13

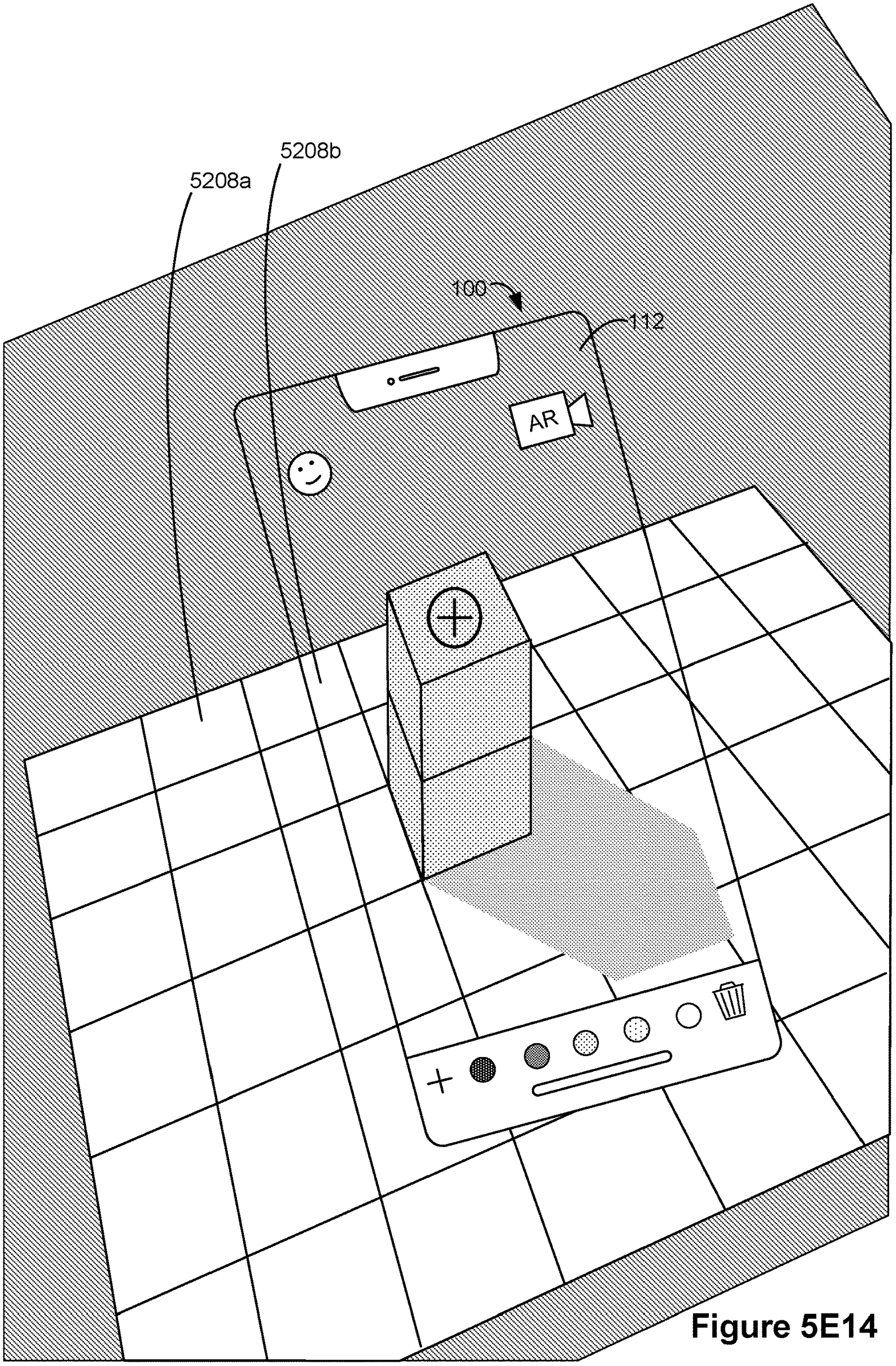
Figure 5E14

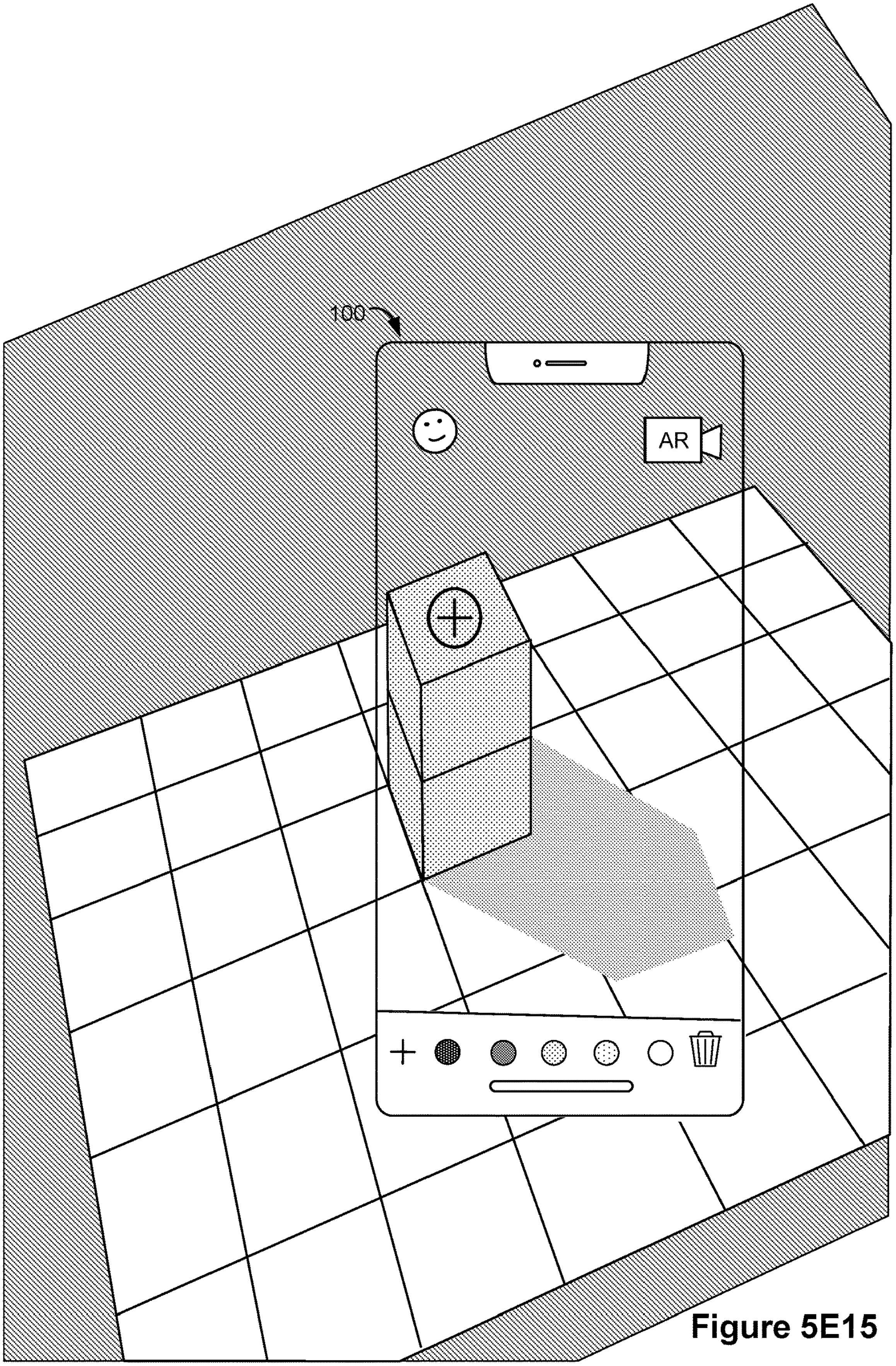
Figure 5E15

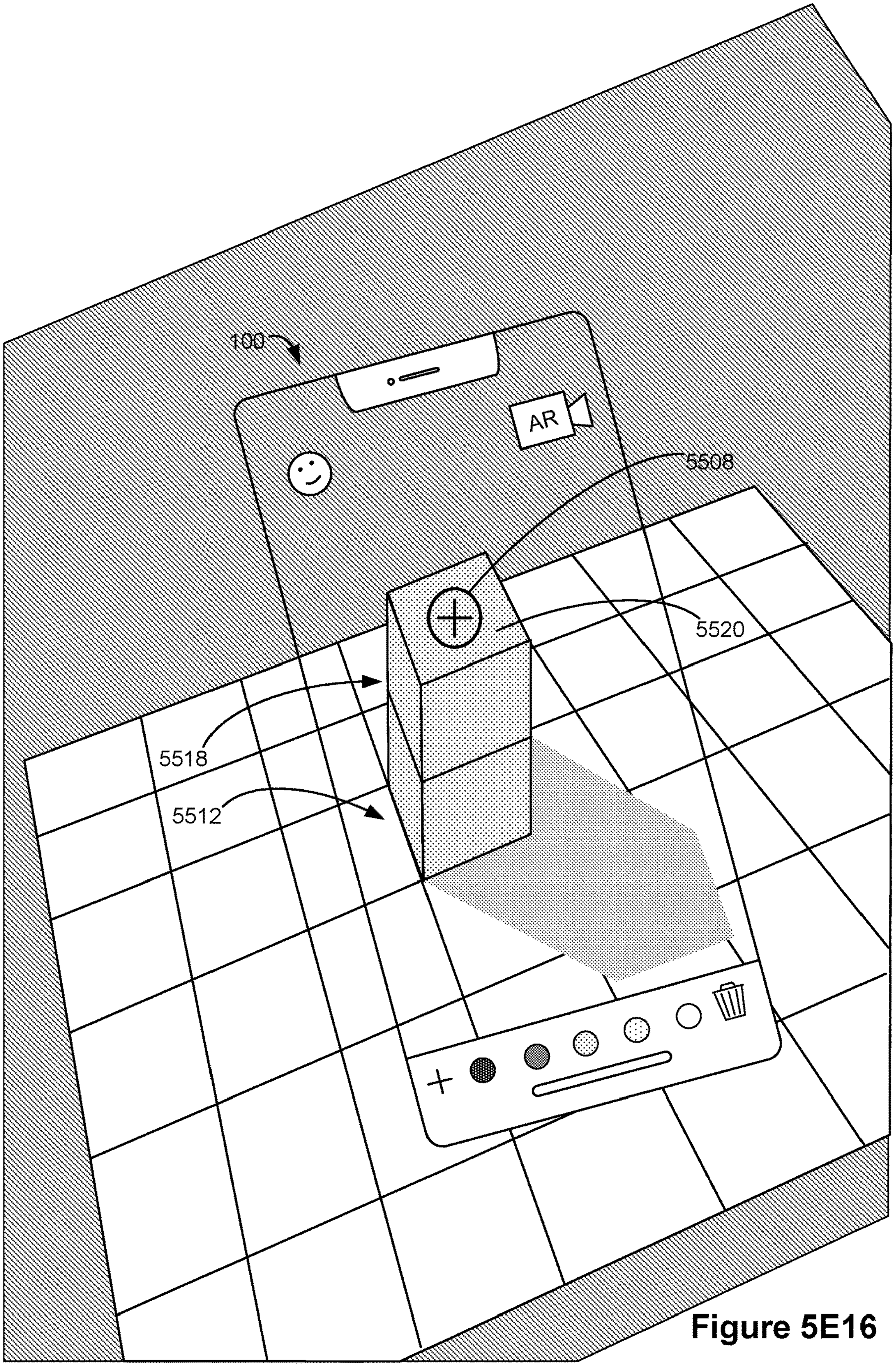
Figure 5E16

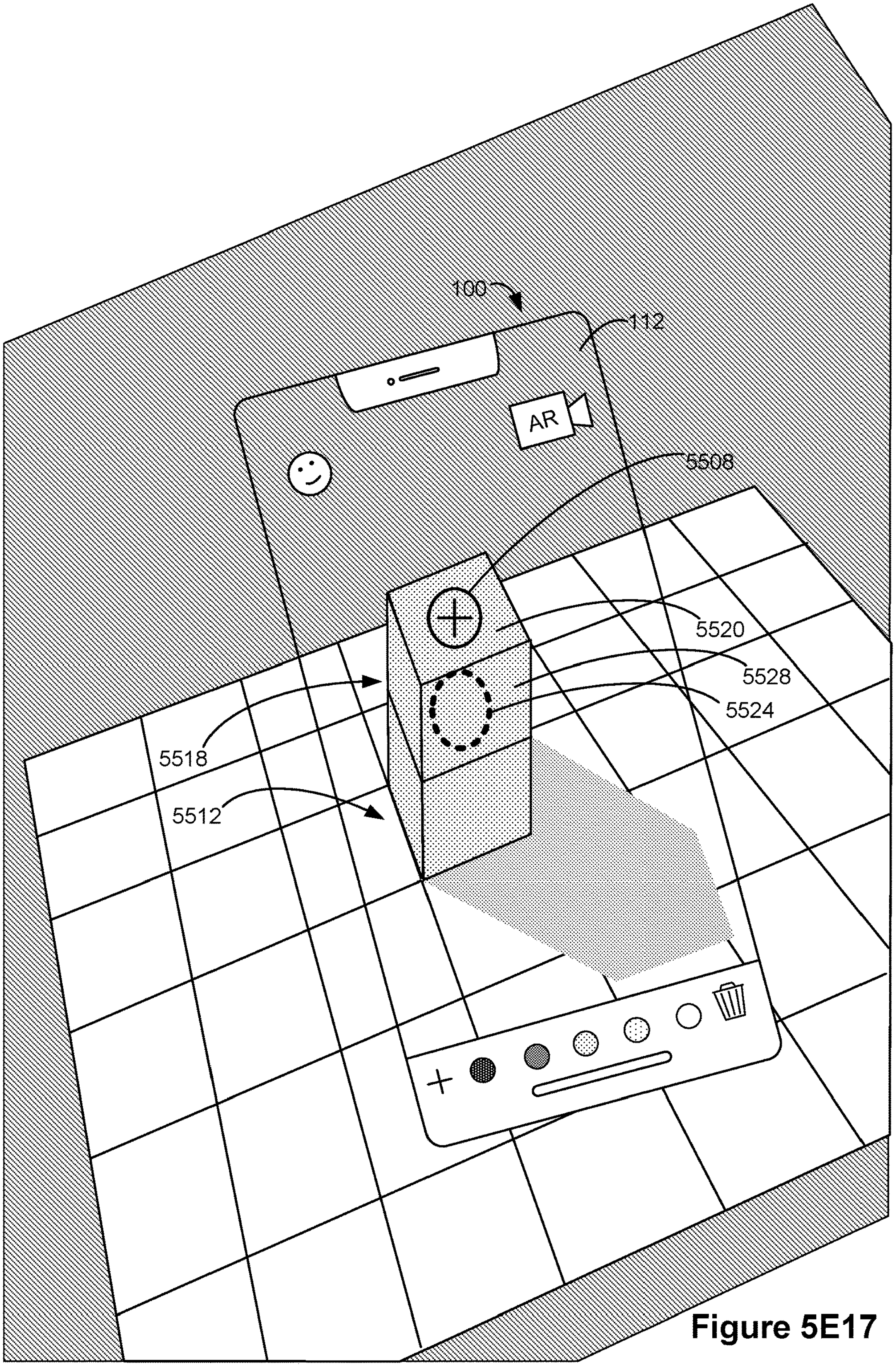
Figure 5E17

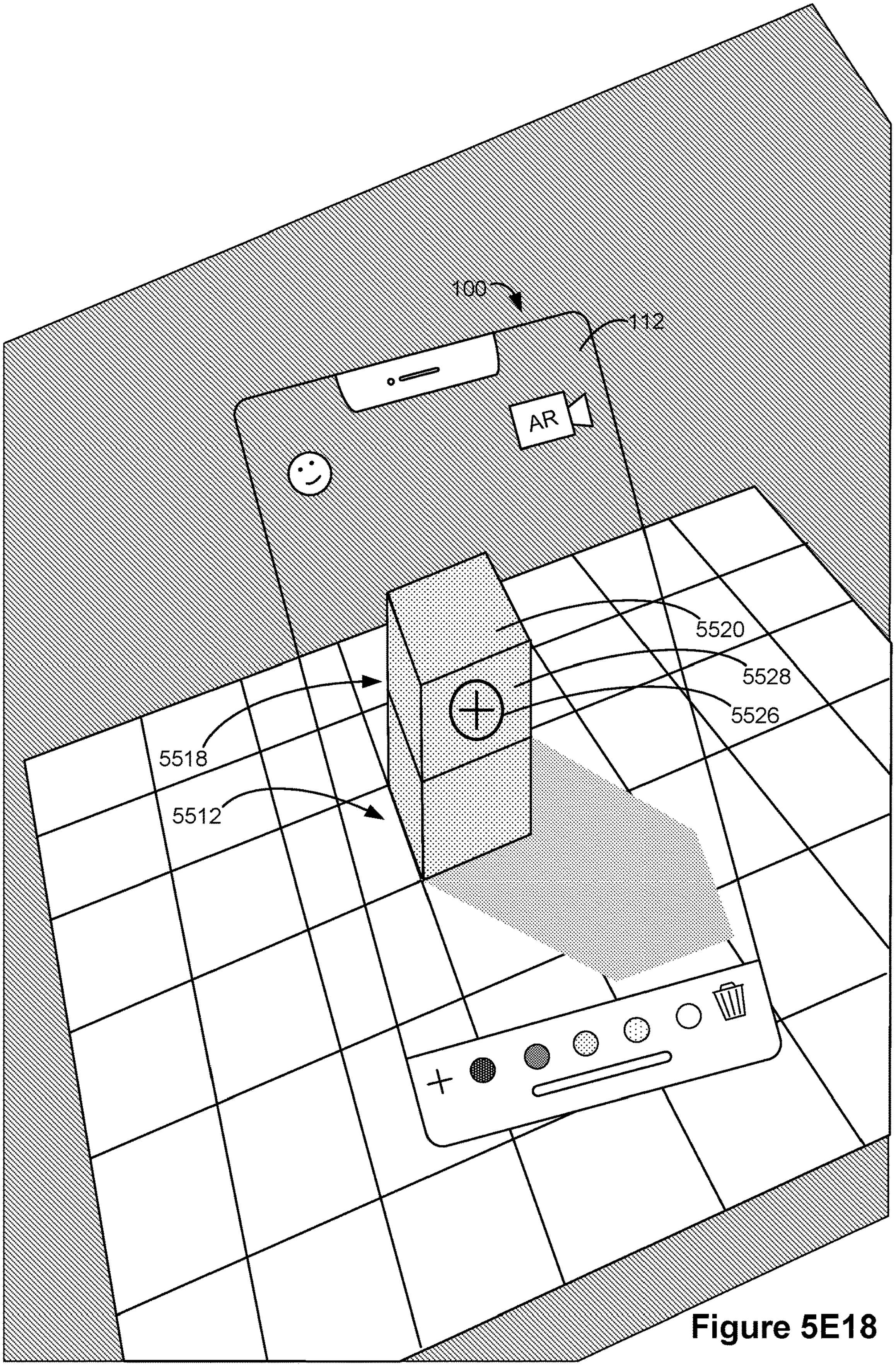
Figure 5E18

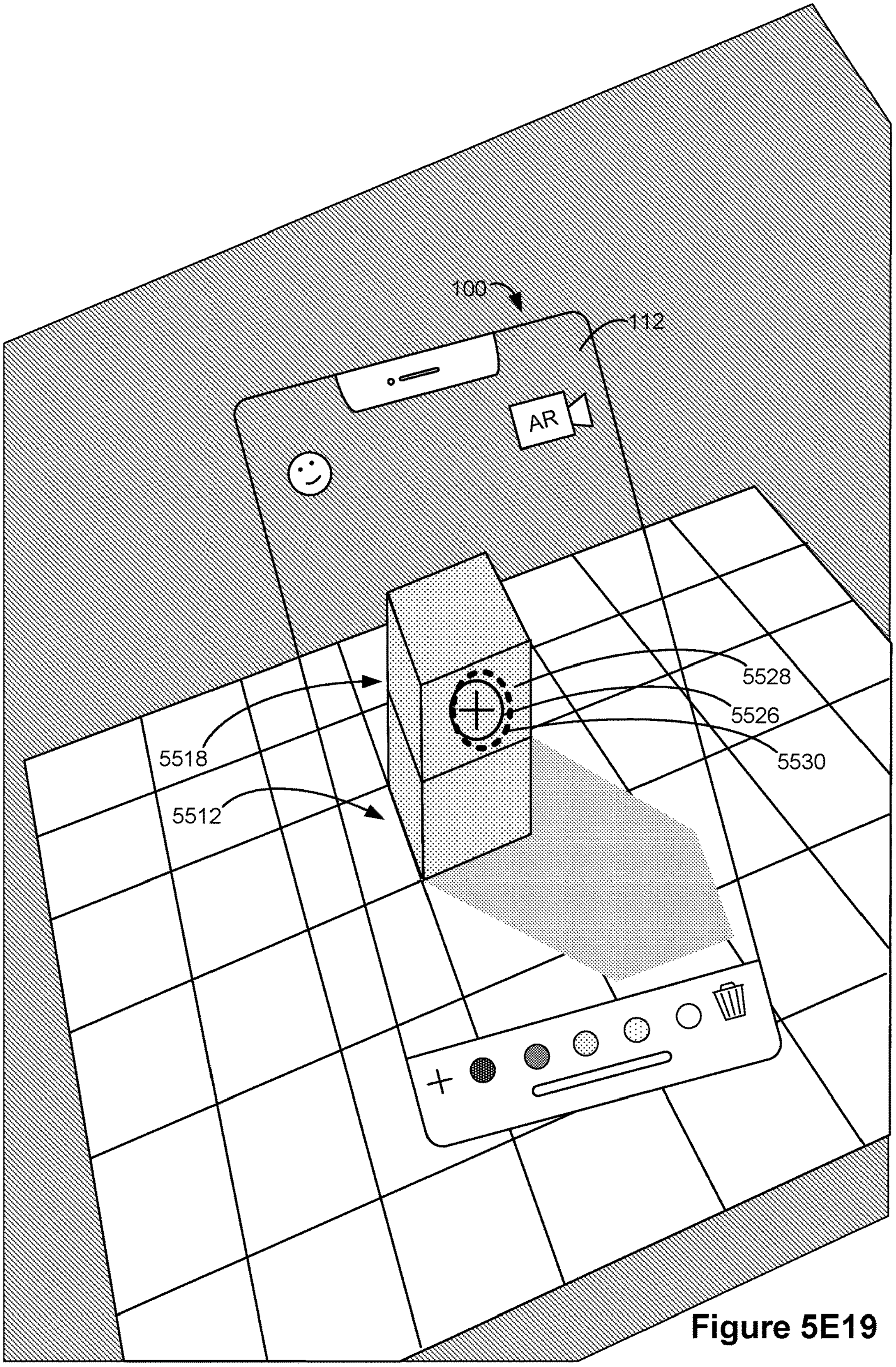
Figure 5E19

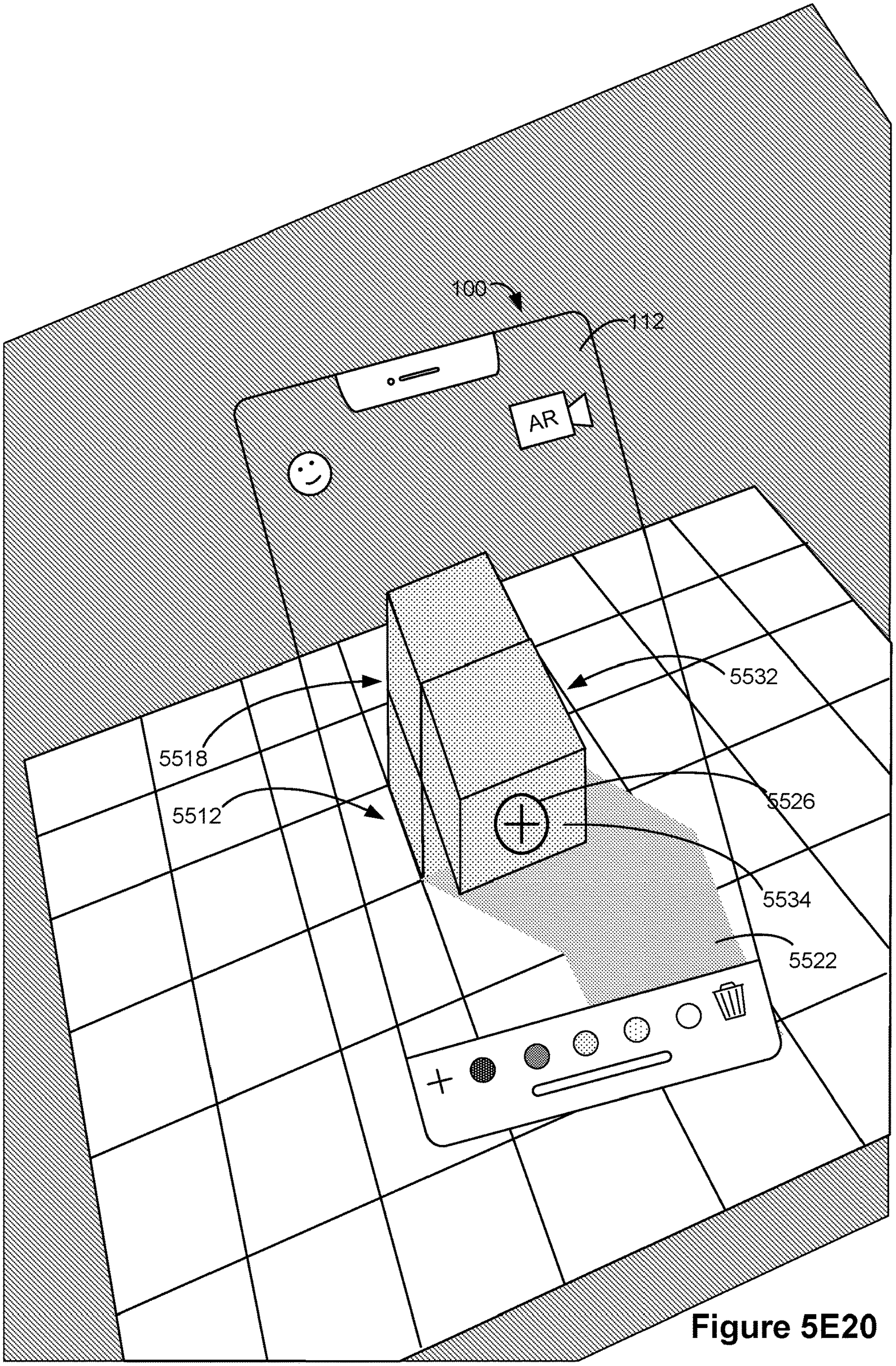
Figure 5E20

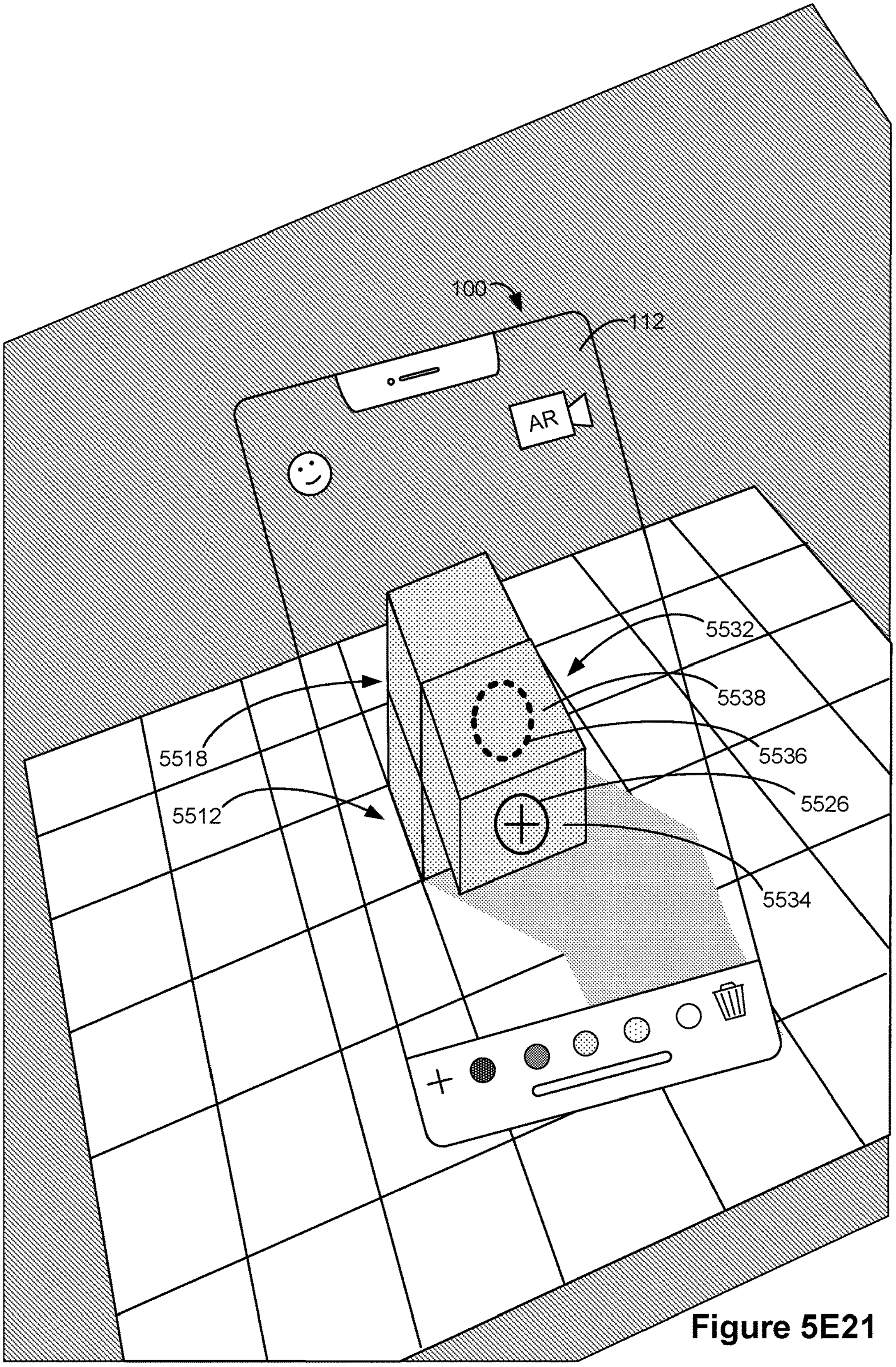
Figure 5E21

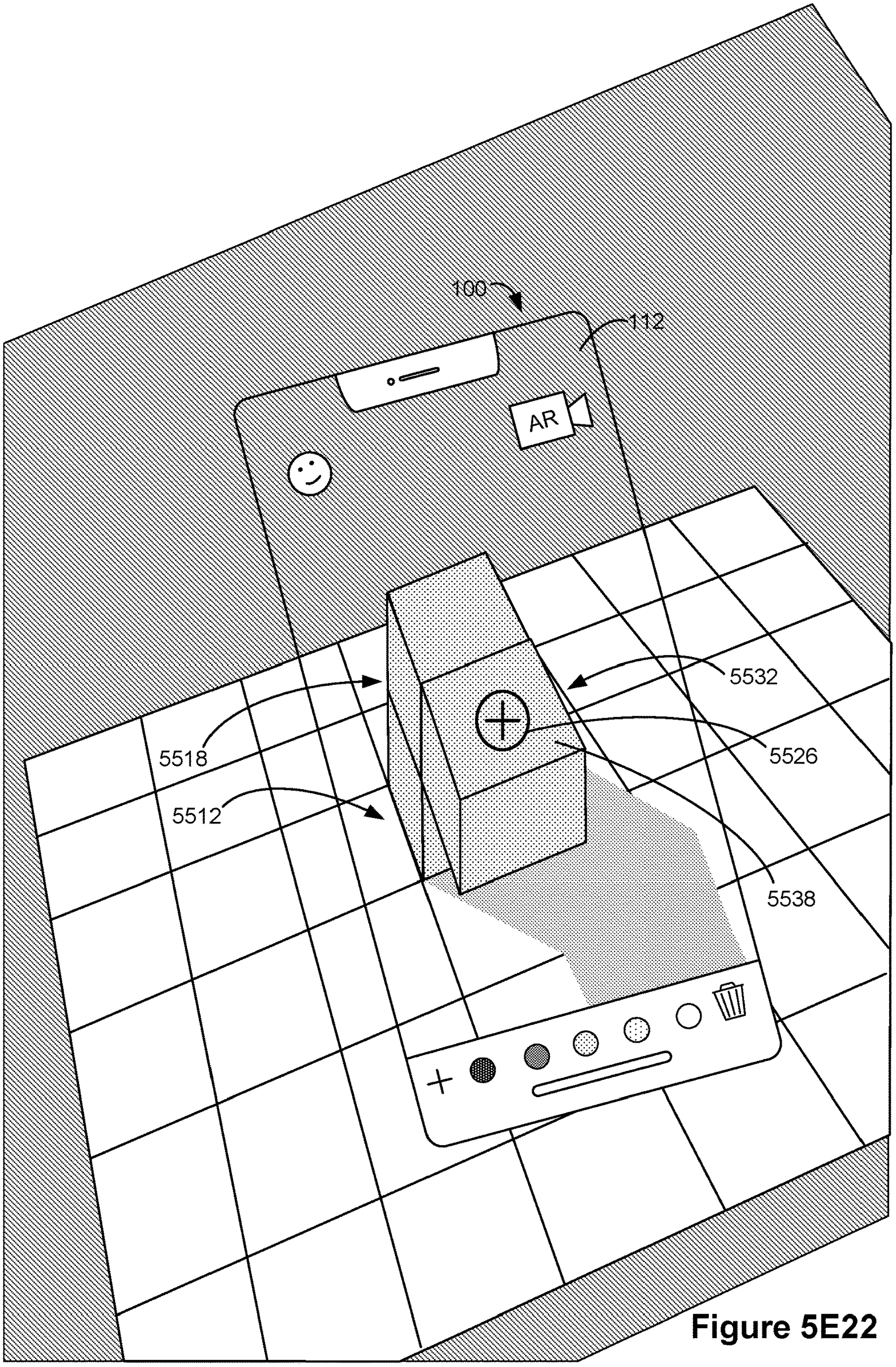
Figure 5E22

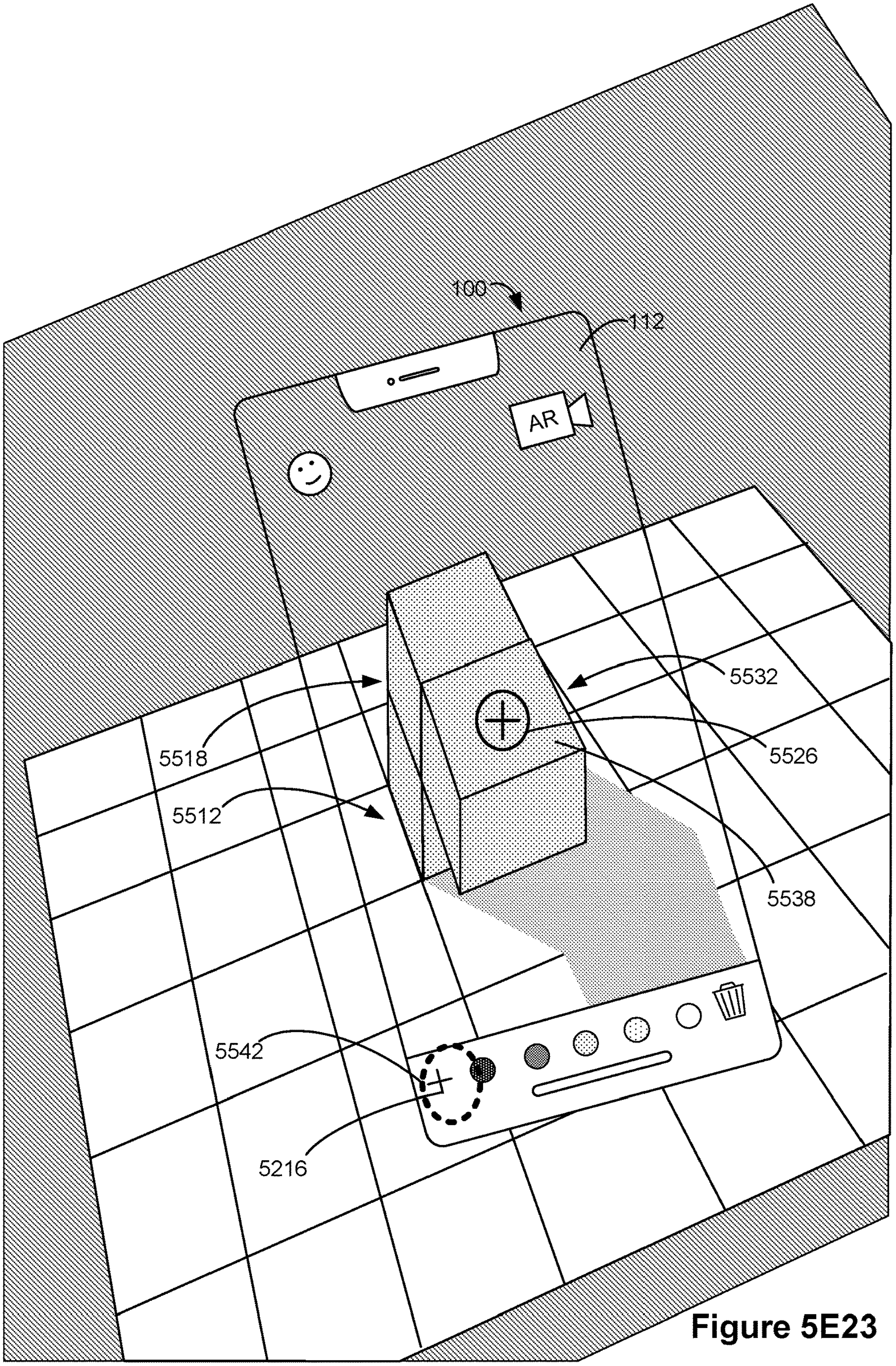
Figure 5E23

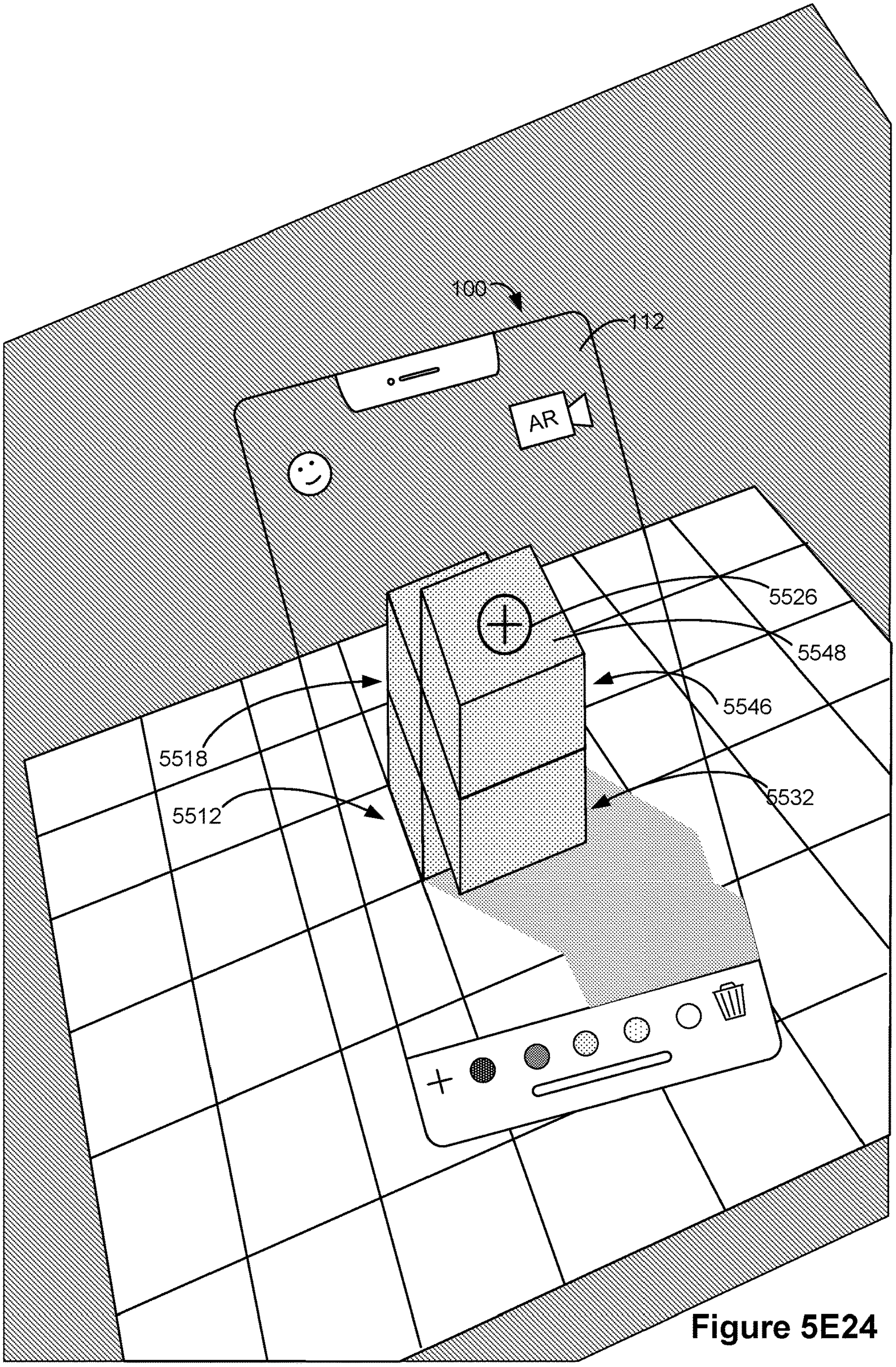
Figure 5E24

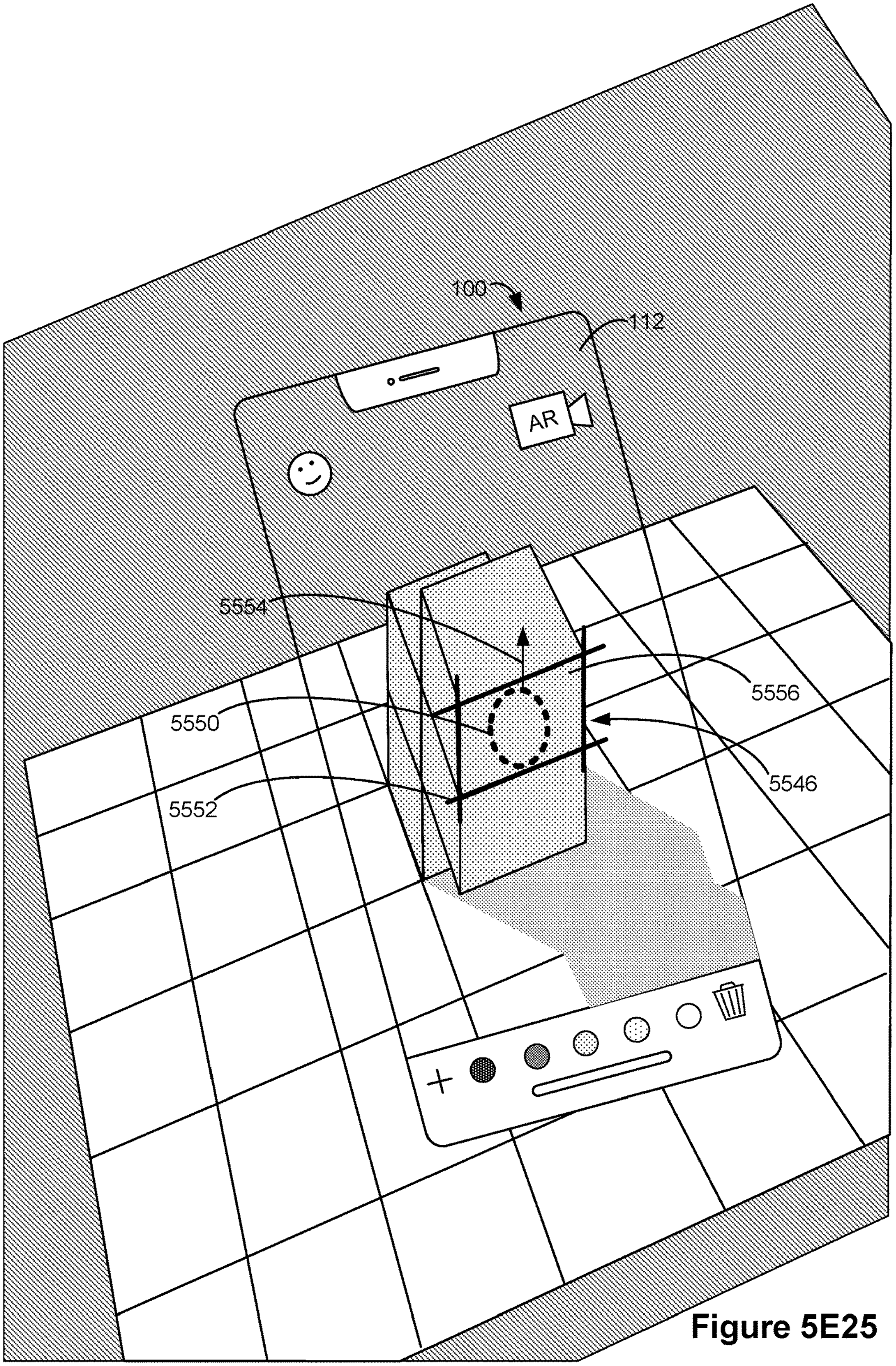
Figure 5E25

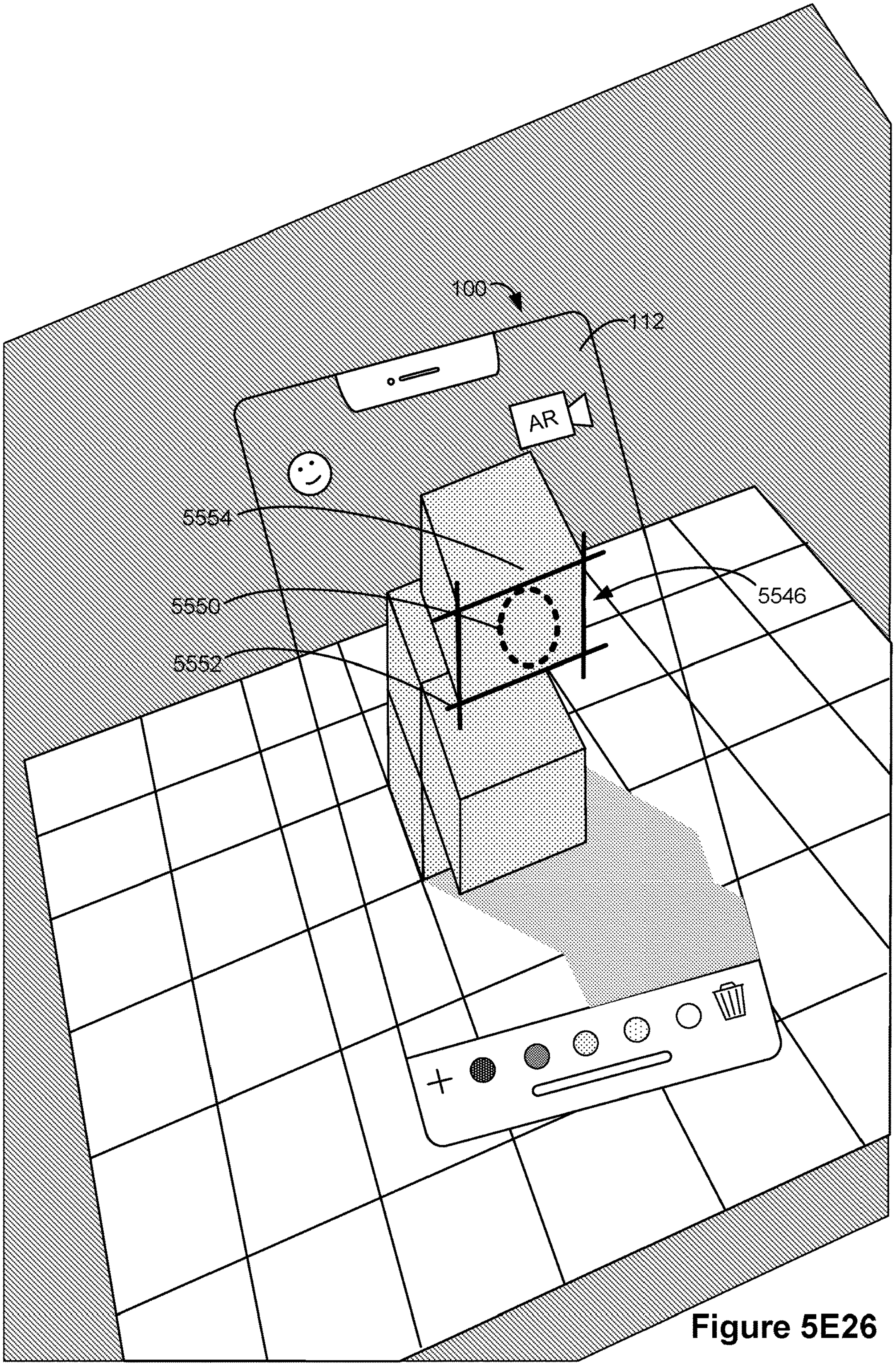
Figure 5E26

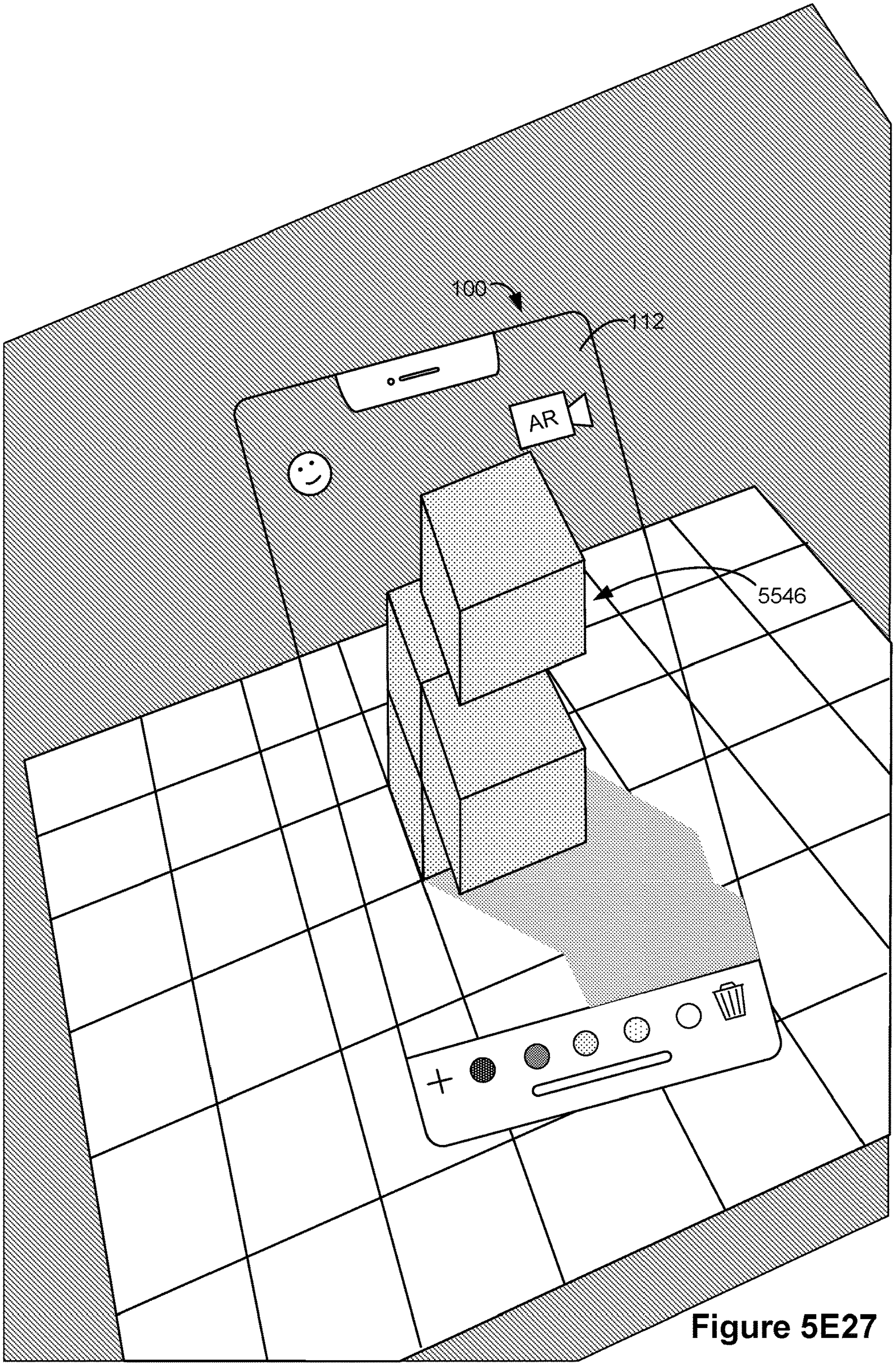
Figure 5E27

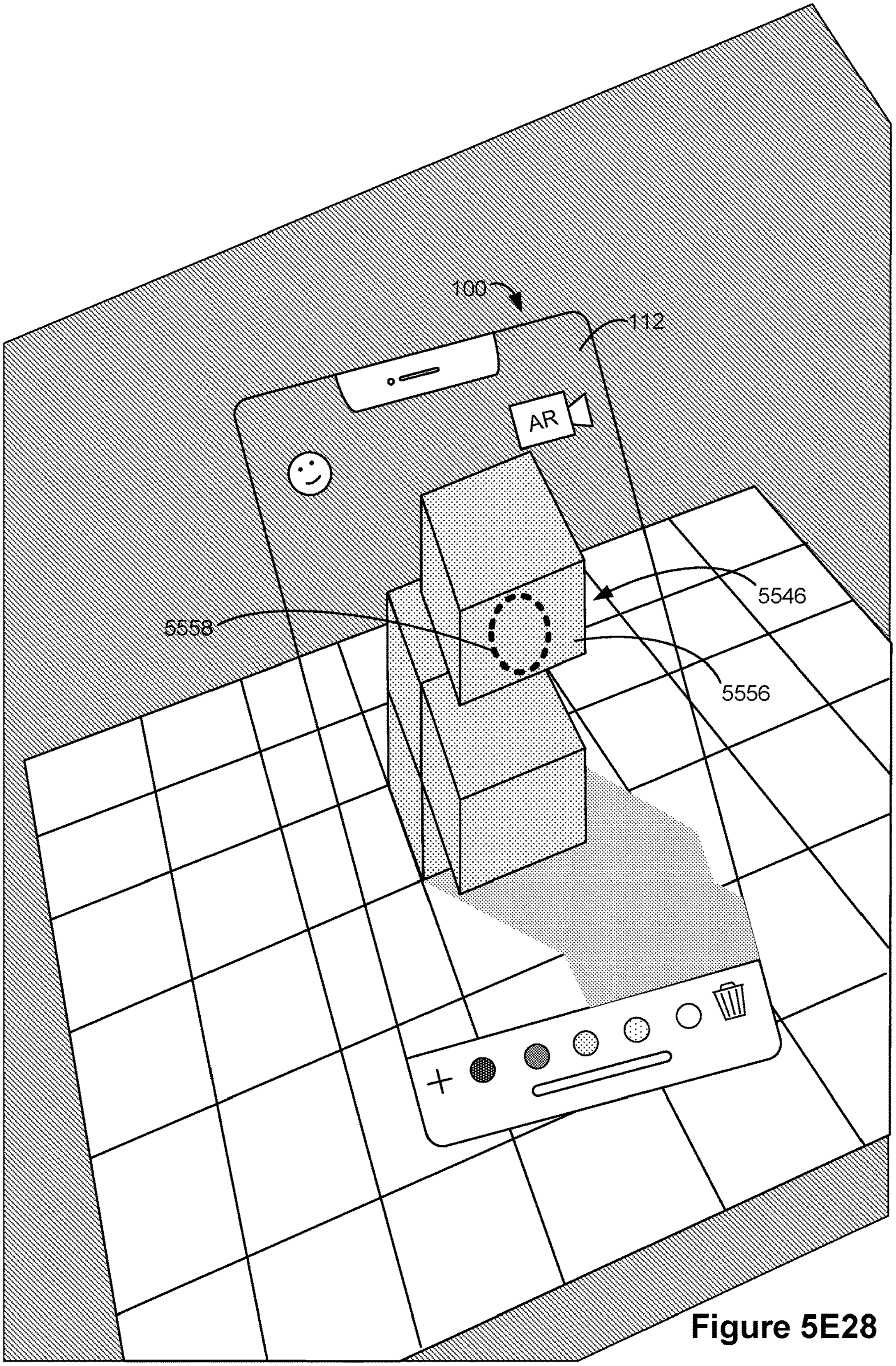
Figure 5E28

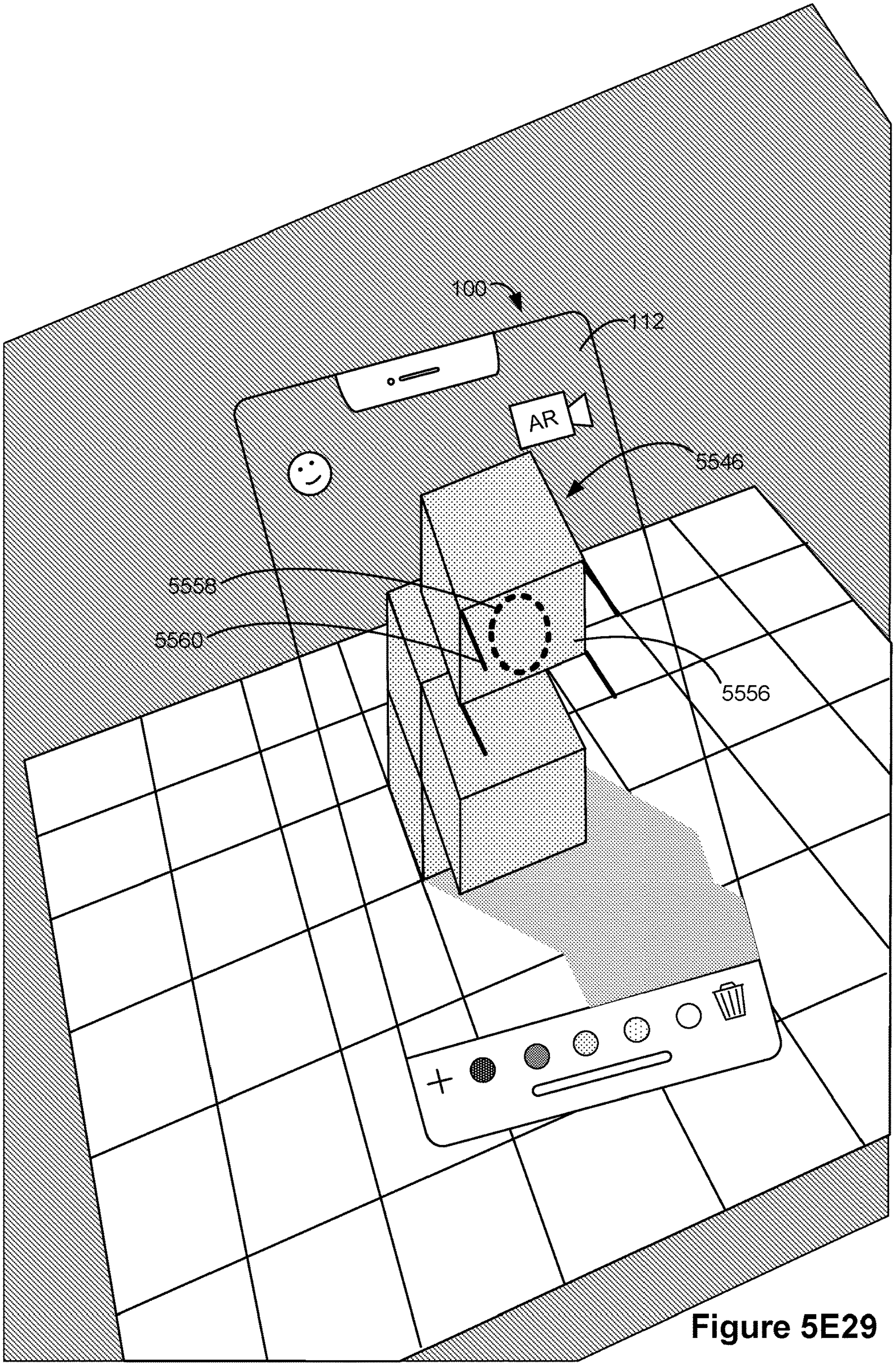
Figure 5E29

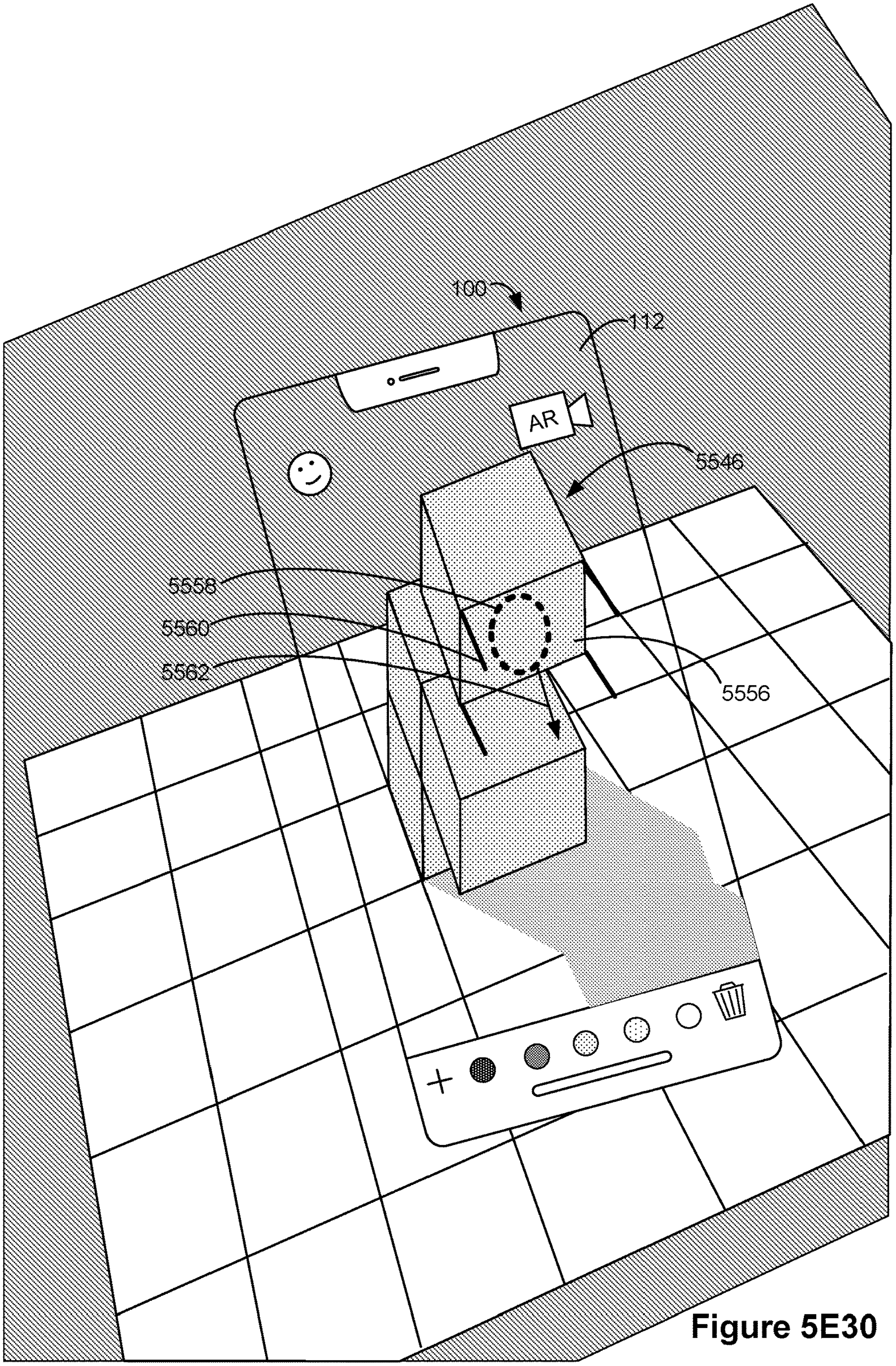
Figure 5E30

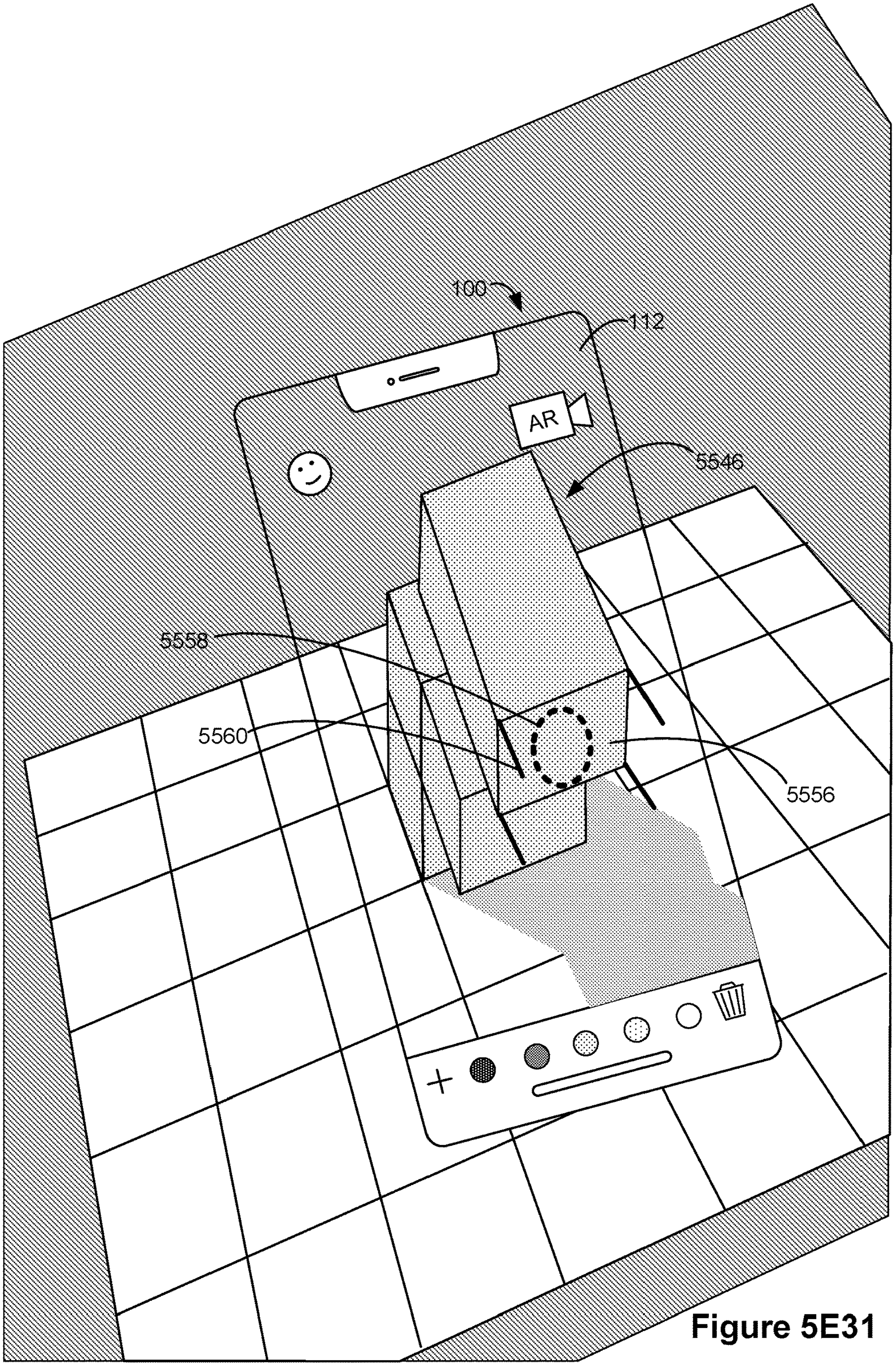
Figure 5E31

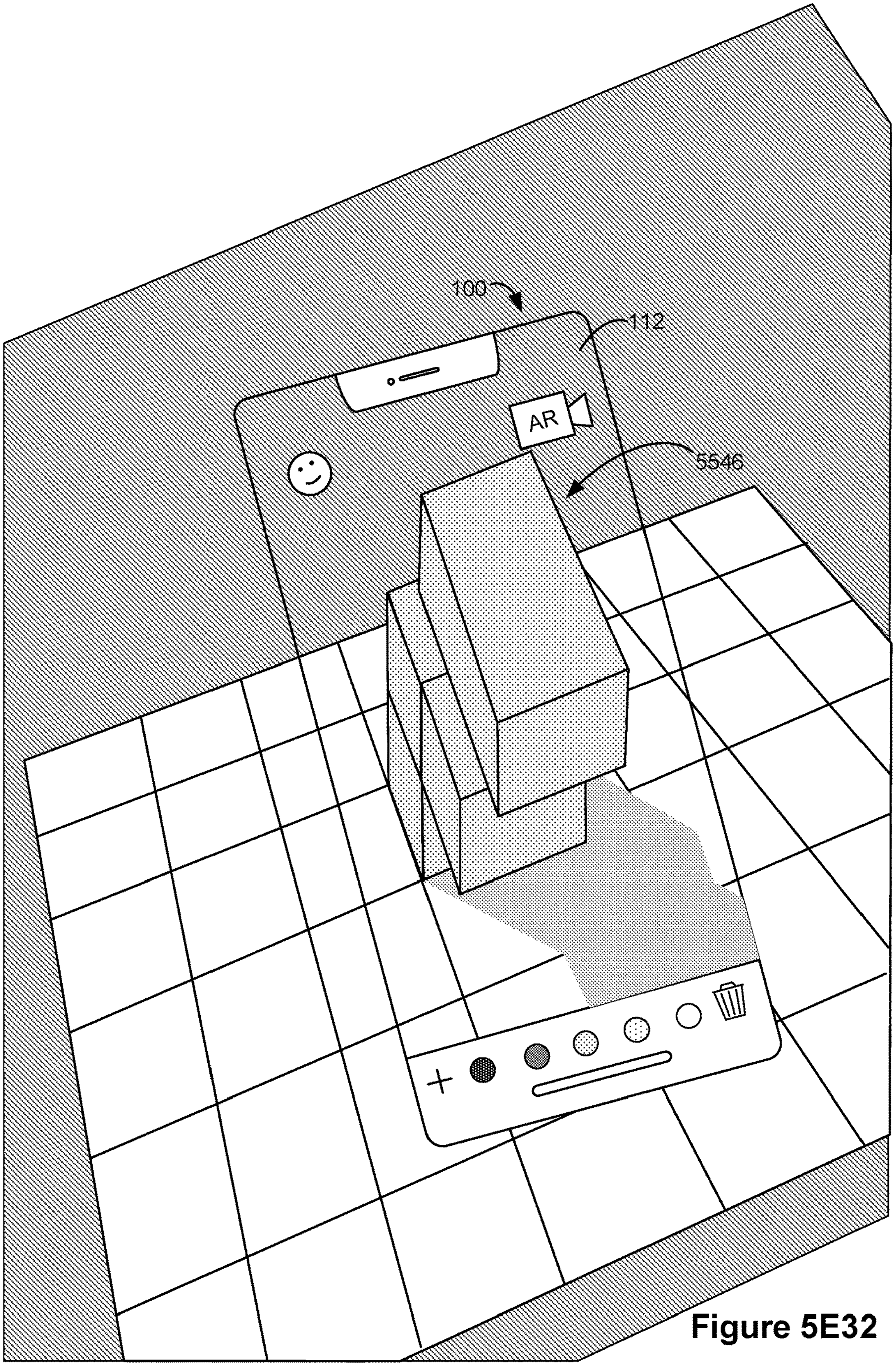
Figure 5E32

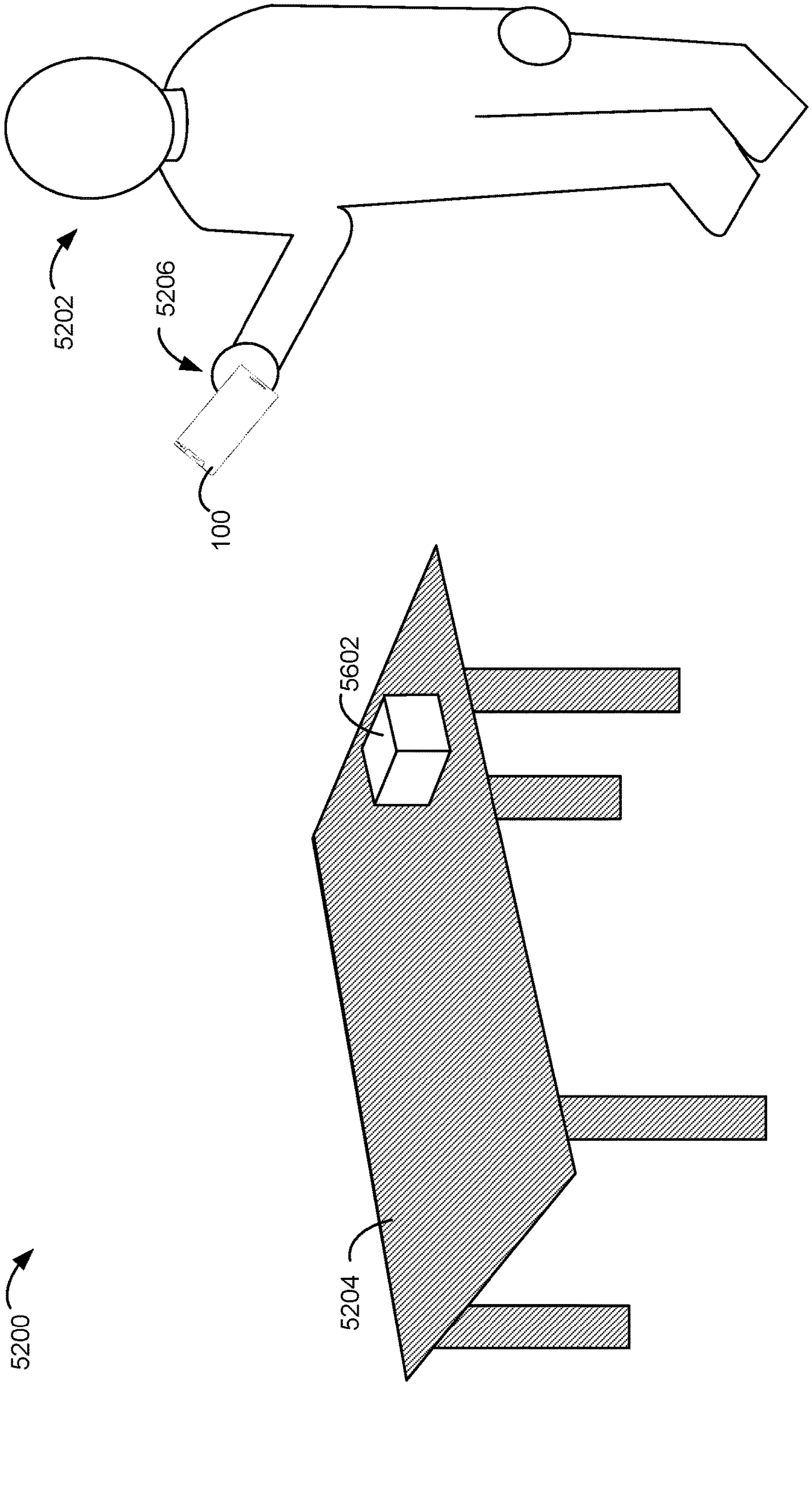
Figure 5F1

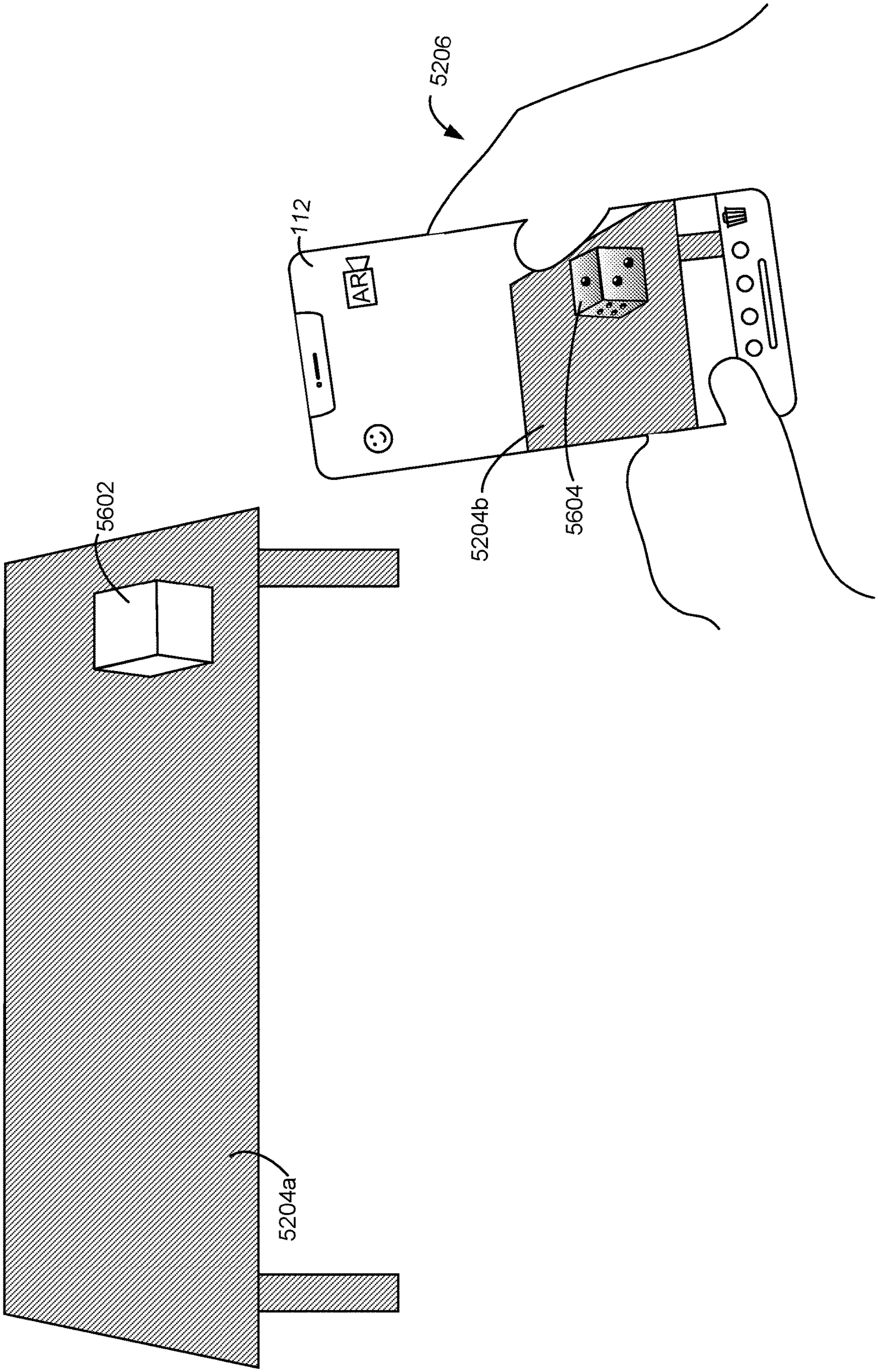
Figure 5F2

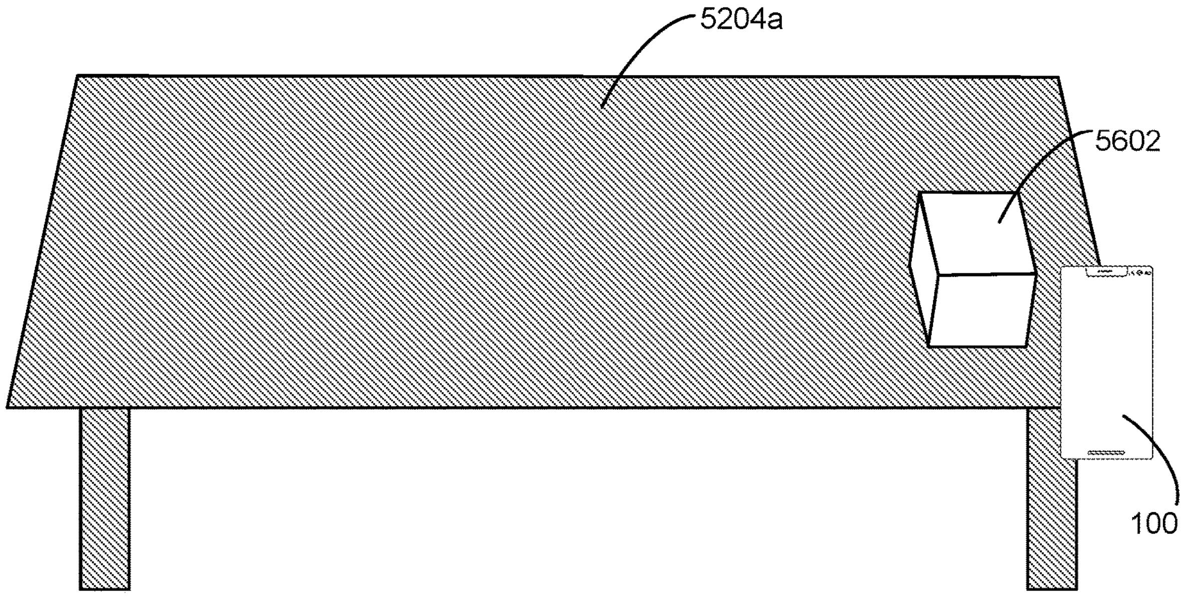
Figure 5F3a
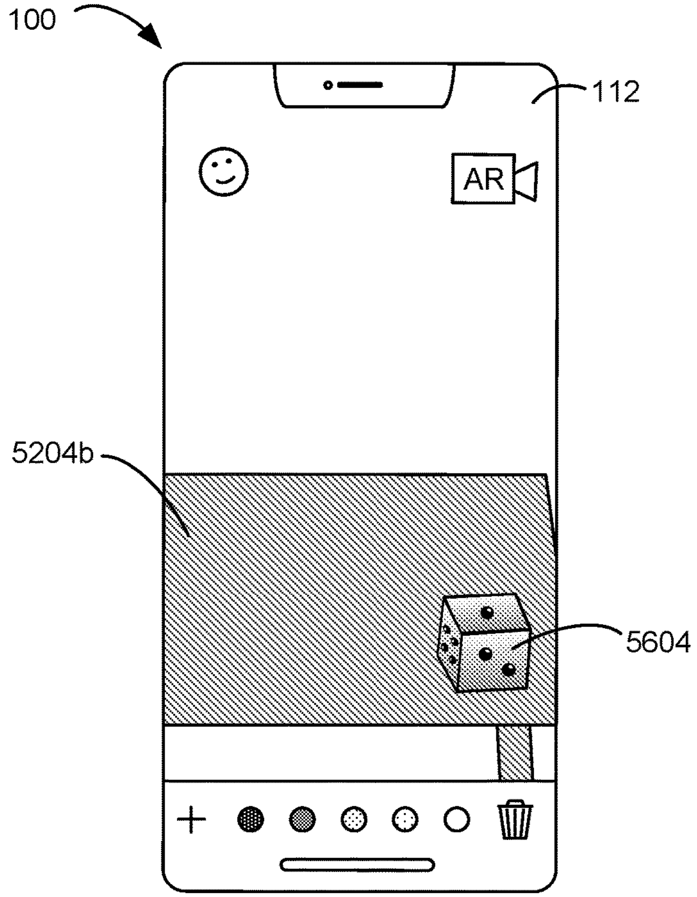
Figure 5F3b

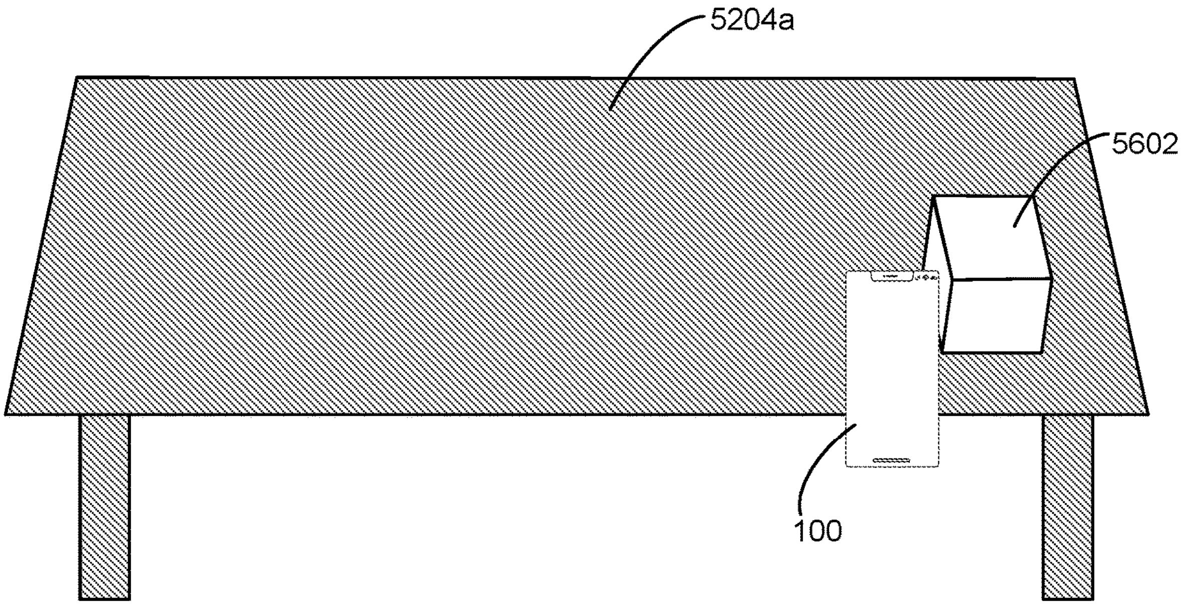
Figure 5F4a
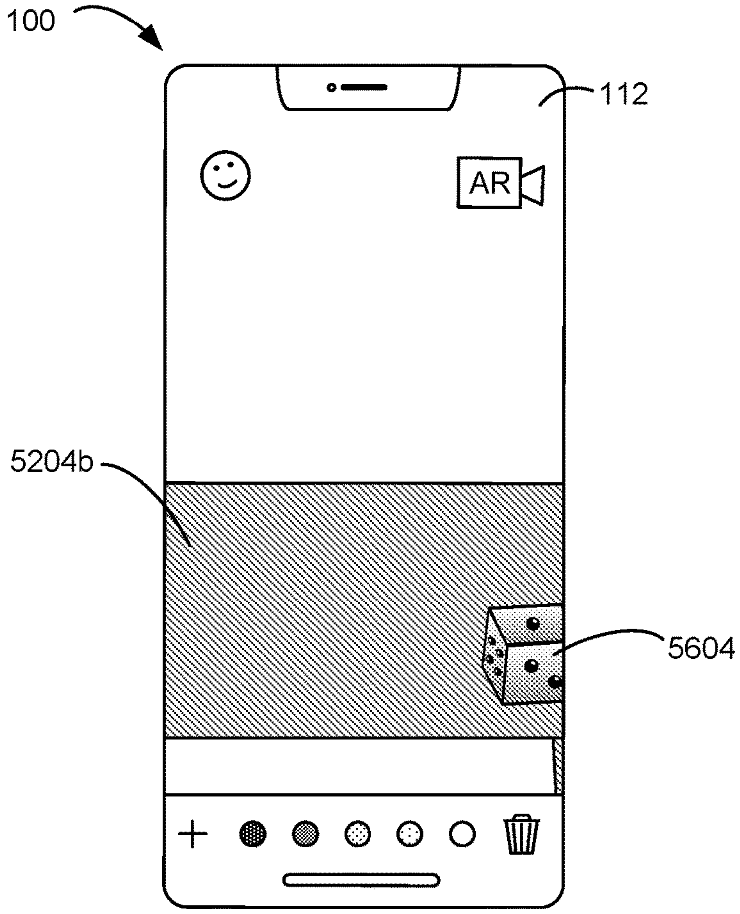
Figure 5F4b

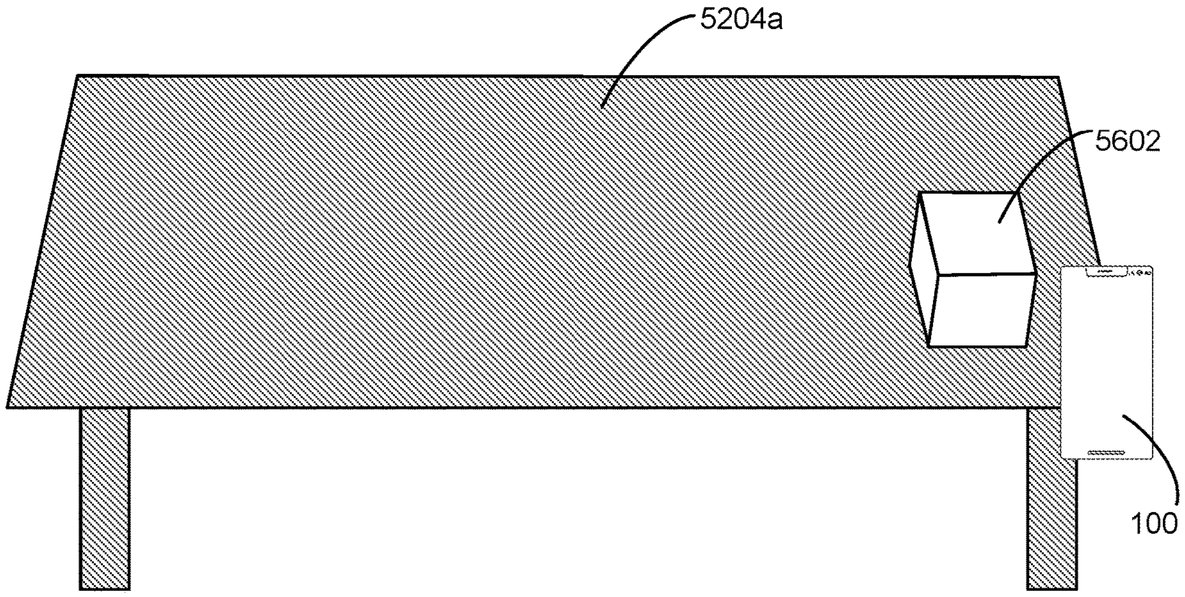
Figure 5F5a
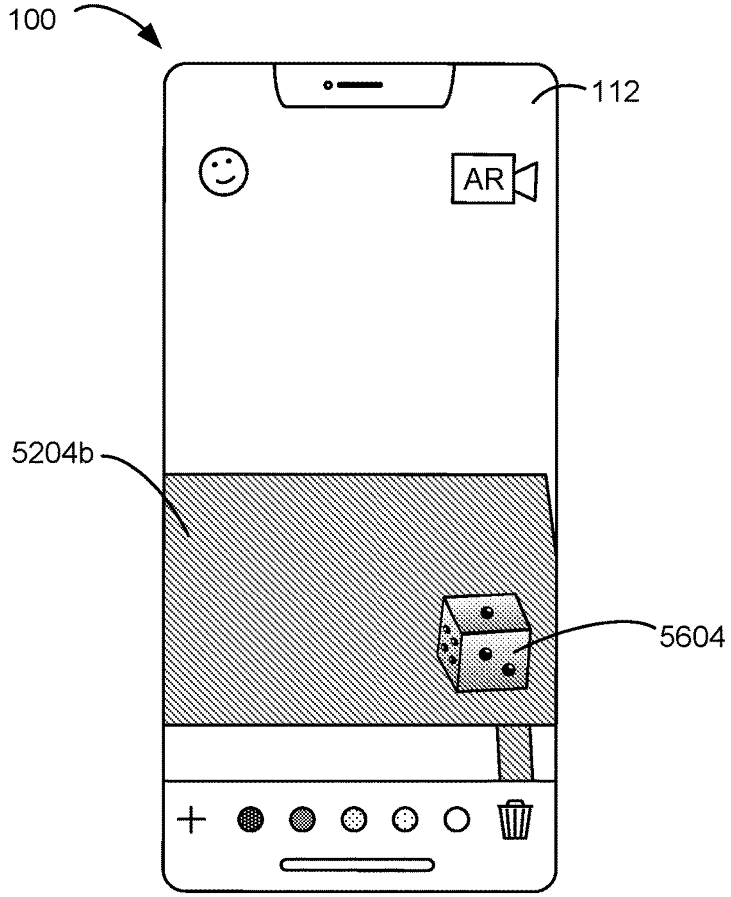
Figure 5F5b

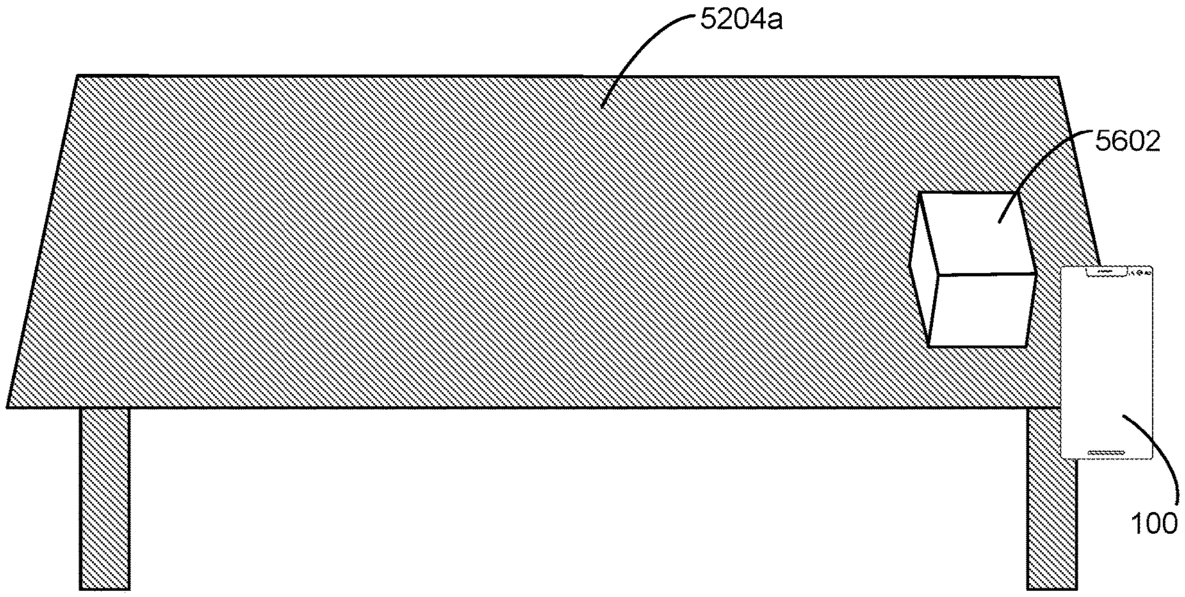
Figure 5F6a
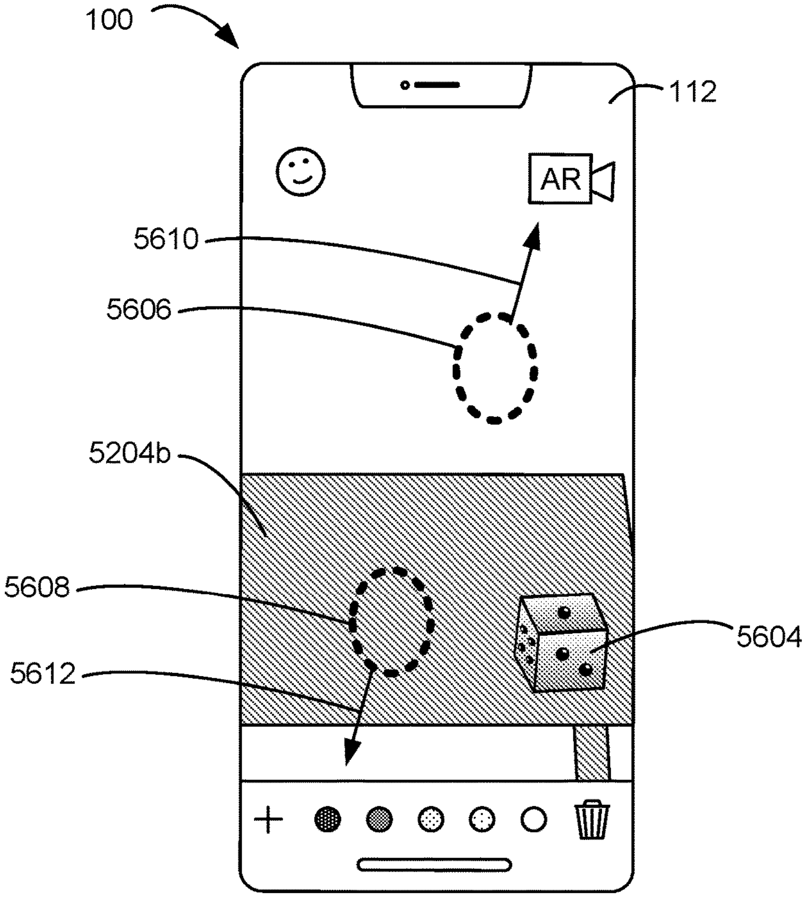
Figure 5F6b

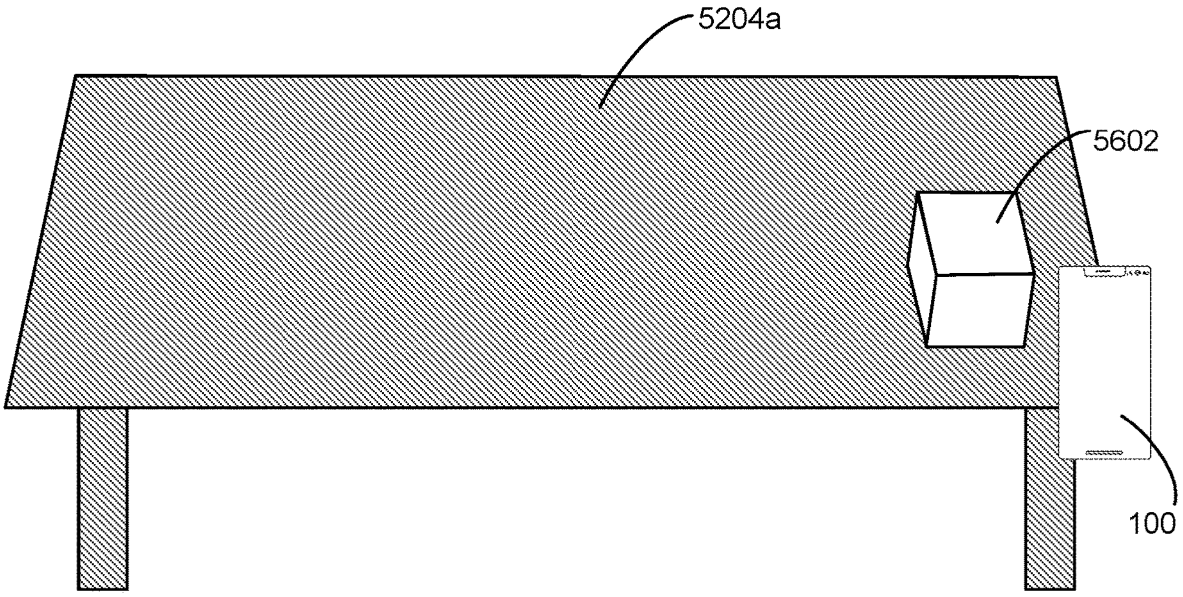
Figure 5F7a
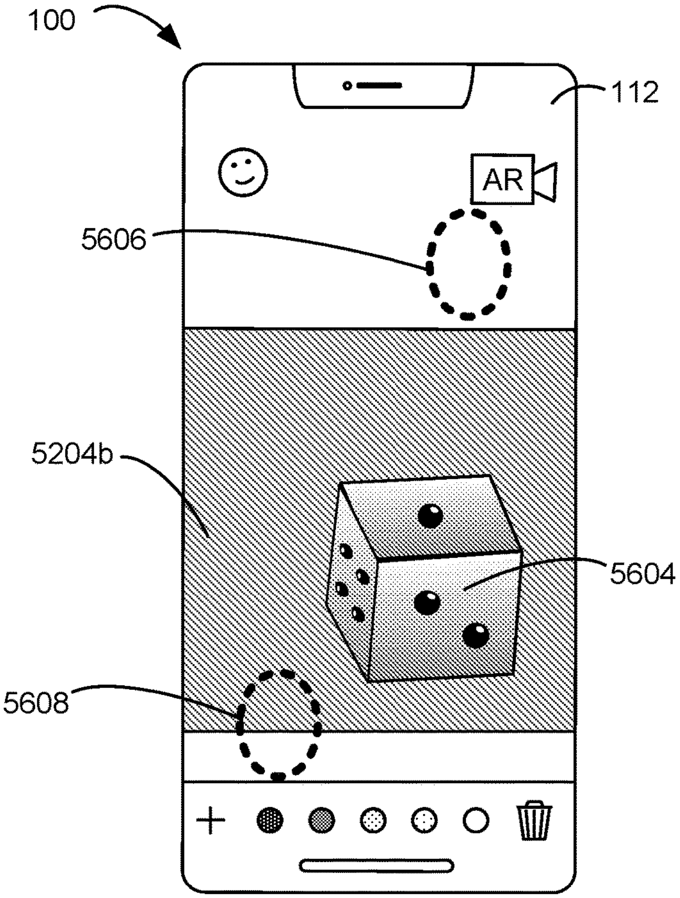
Figure 5F7b

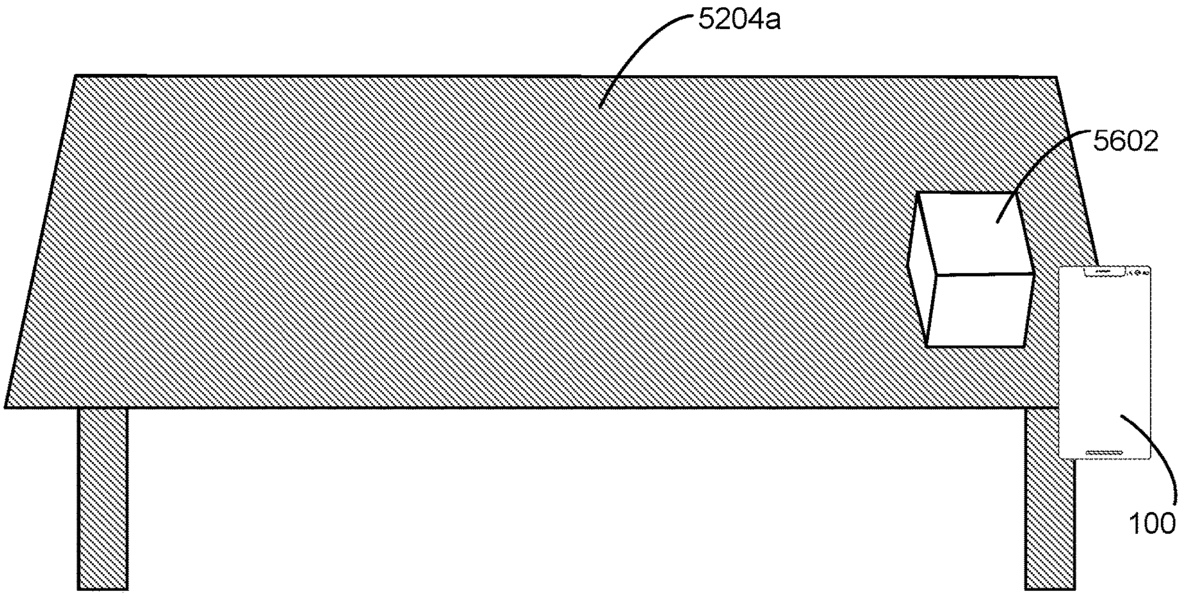
Figure 5F8a
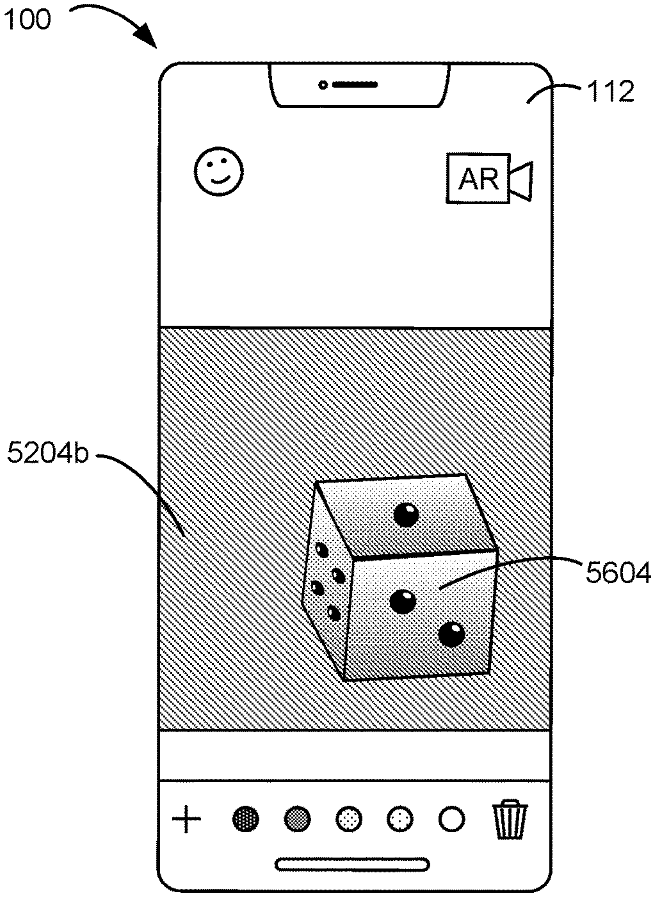
Figure 5F8b

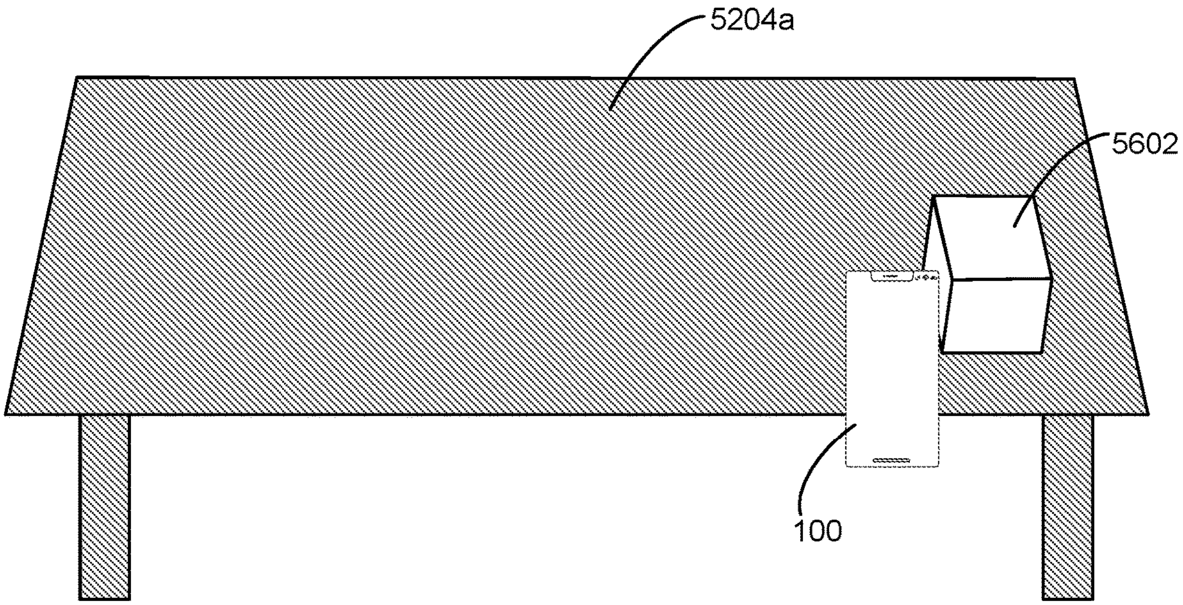
Figure 5F9a
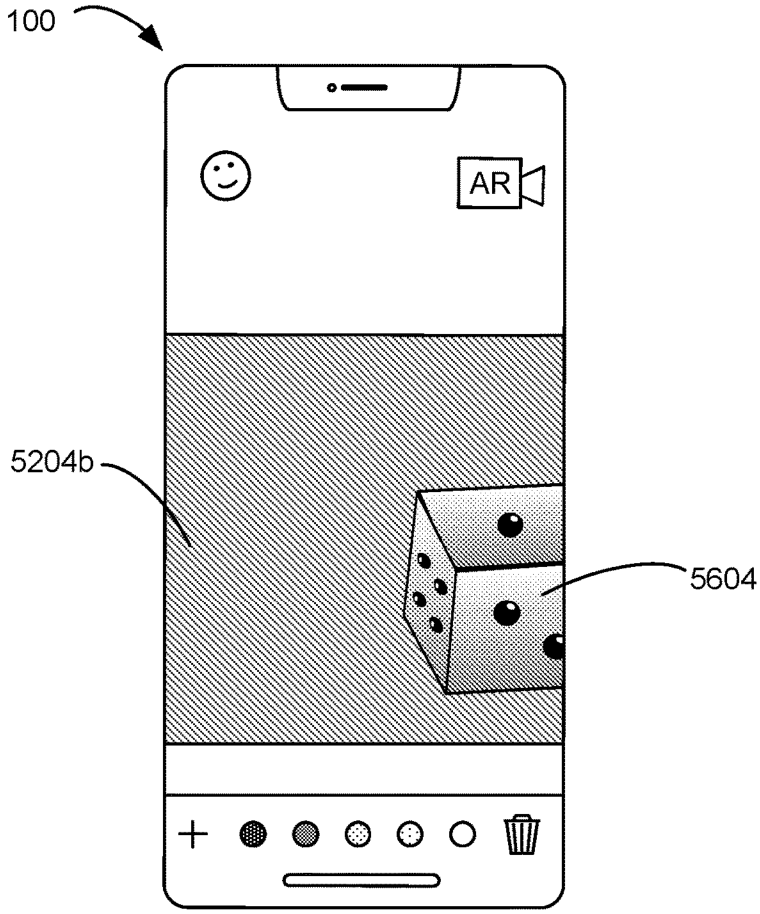
Figure 5F9b

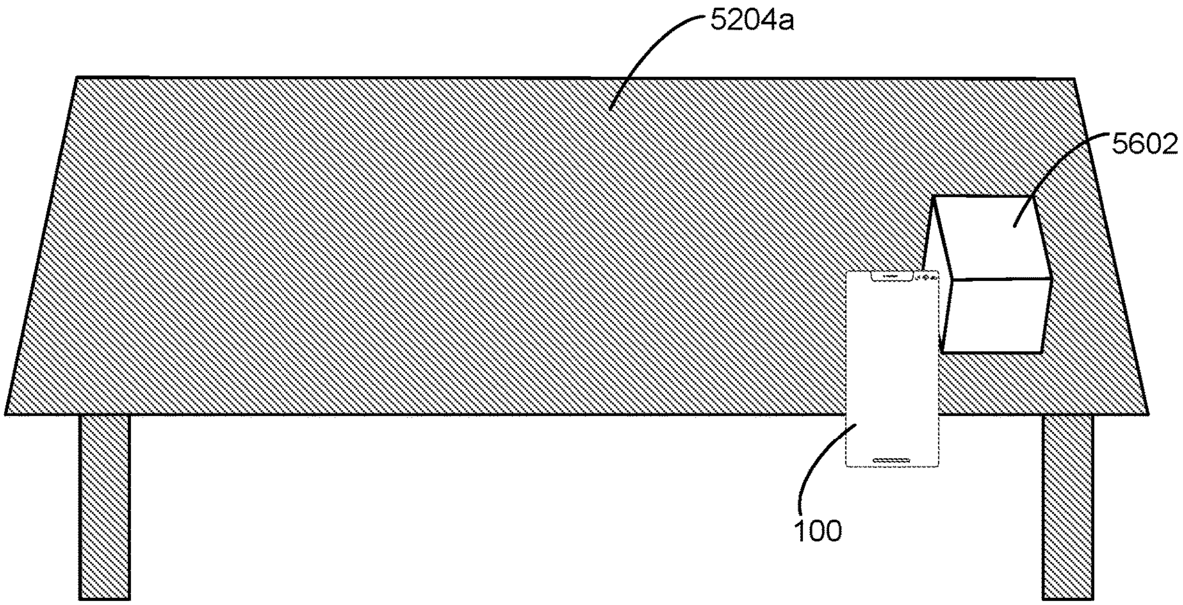
Figure 5F10a
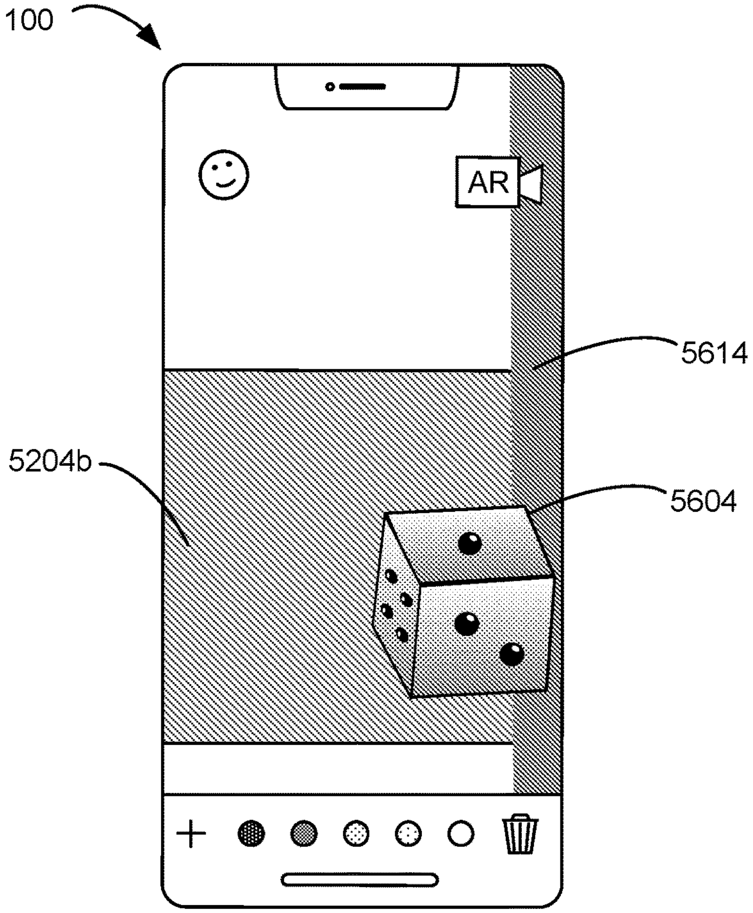
Figure 5F10b

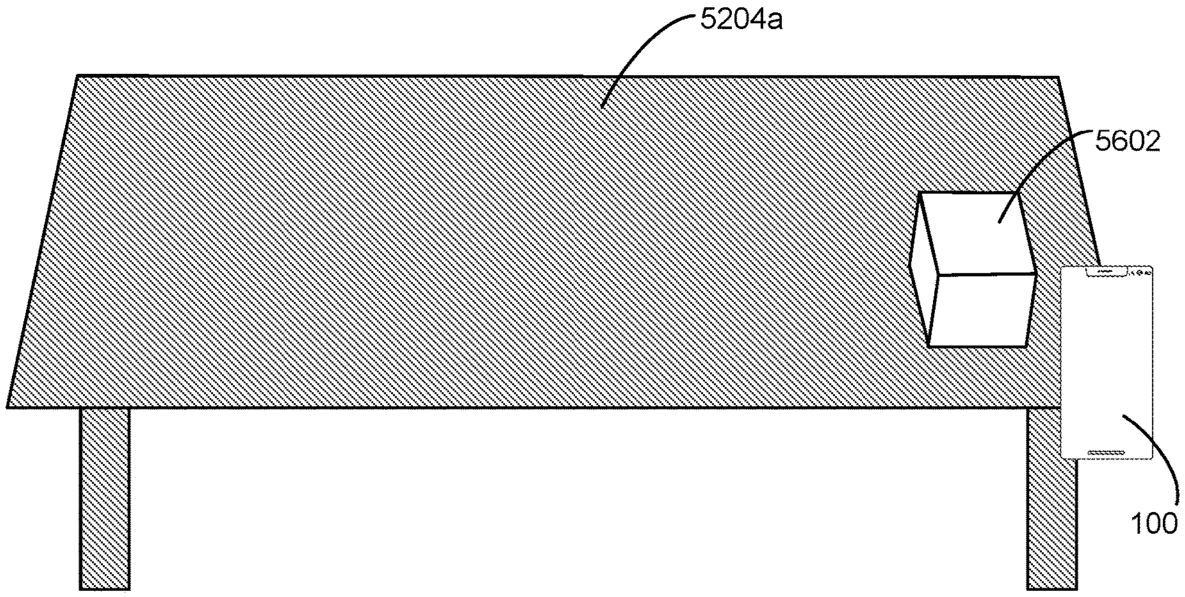
Figure 5F11a
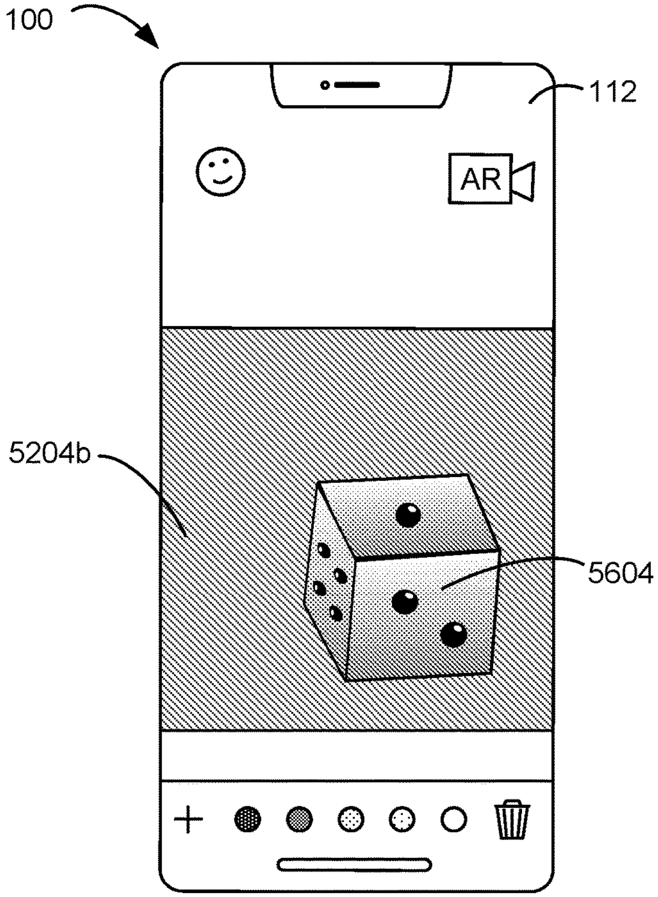
Figure 5F11b

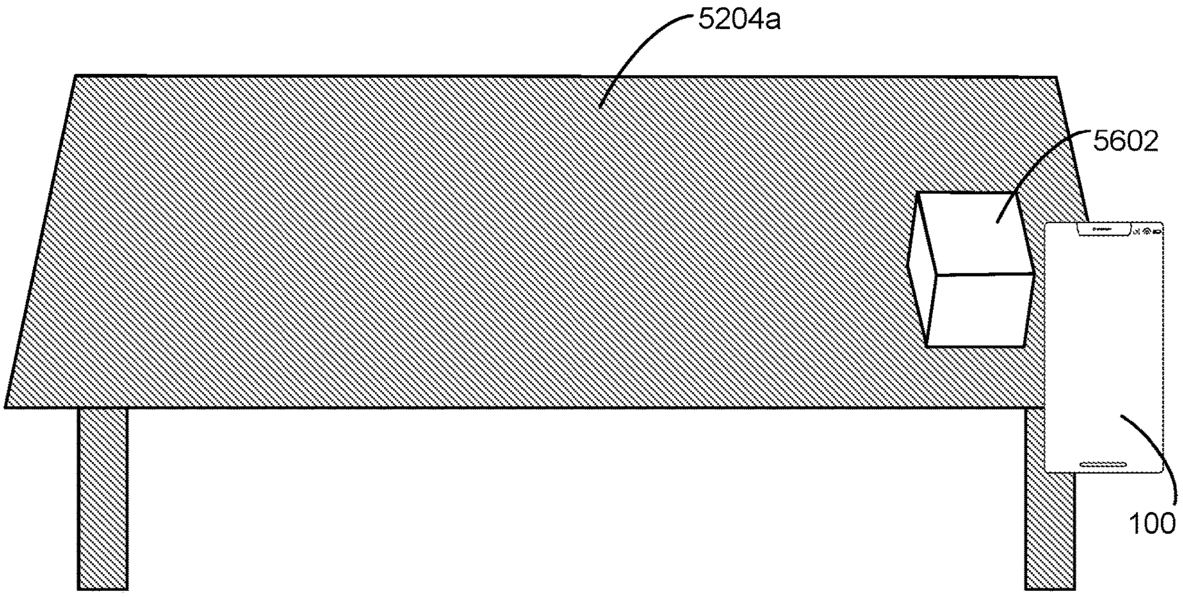
Figure 5F12a
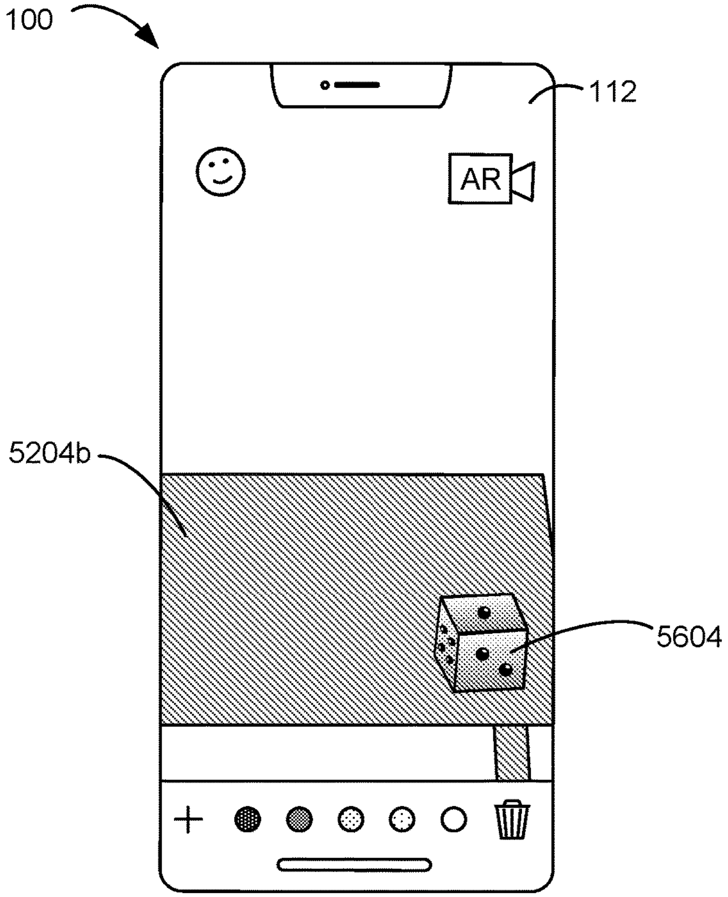
Figure 5F12b

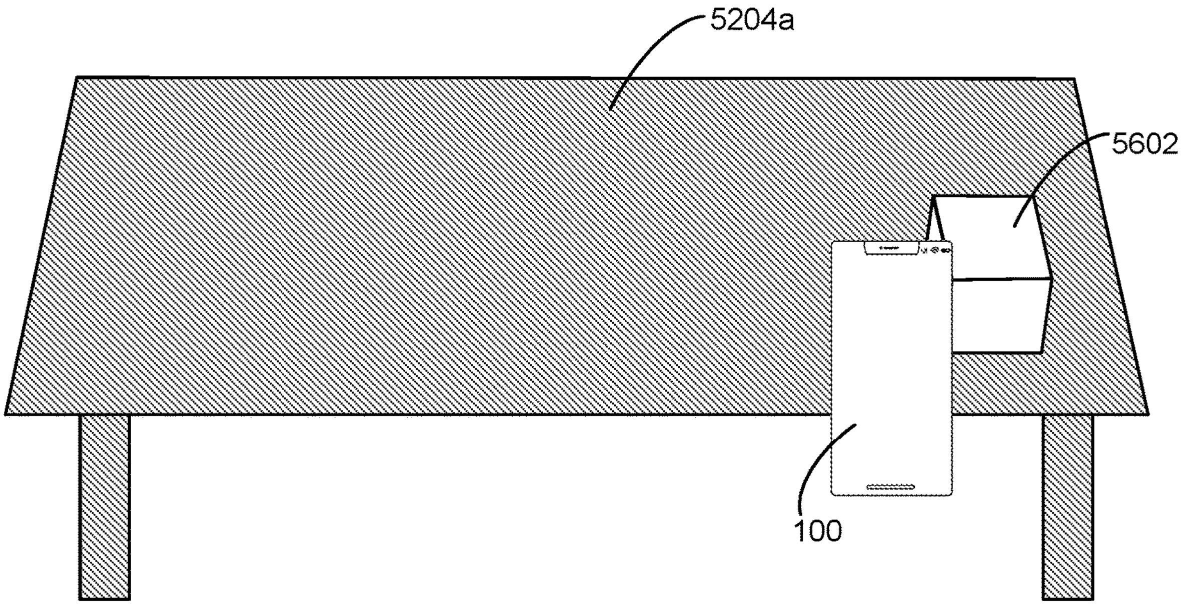
Figure 5F13a
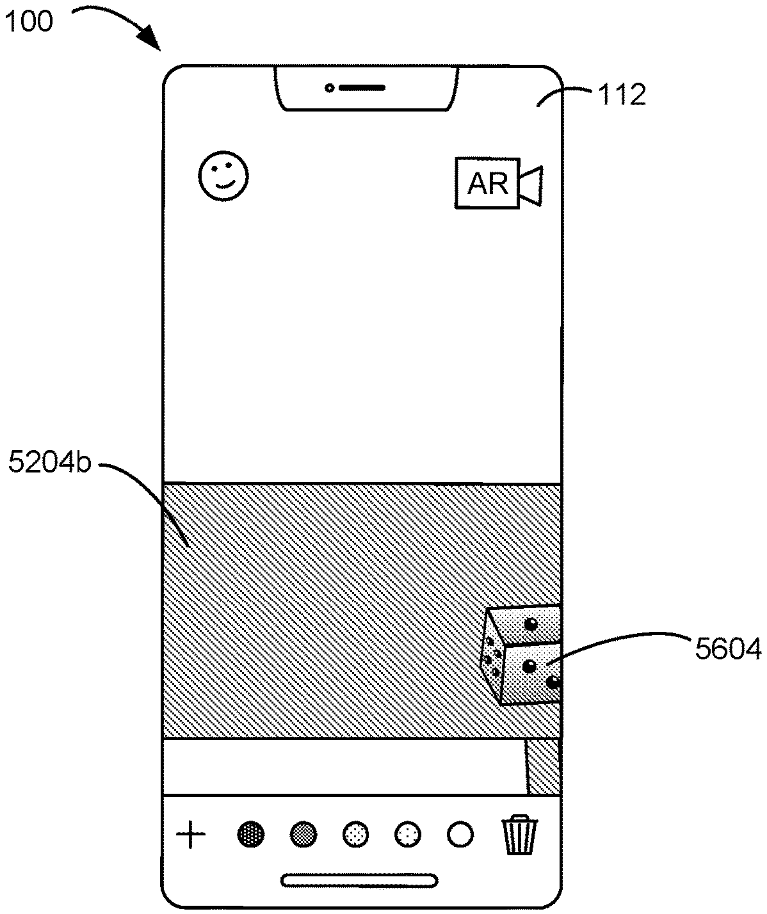
Figure 5F13b

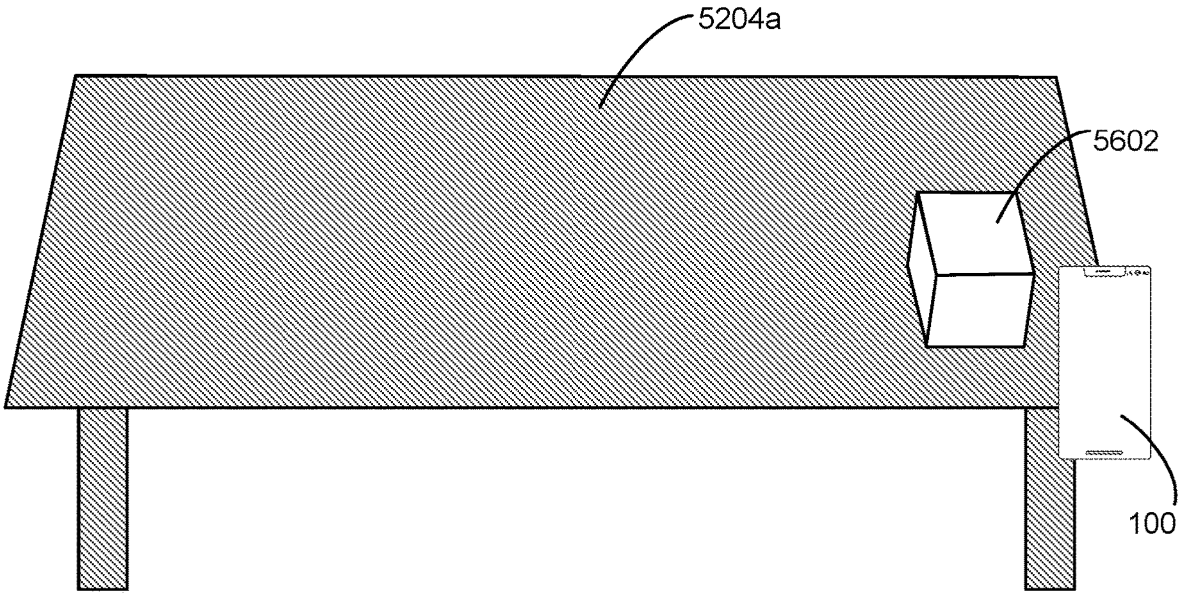
Figure 5F14a
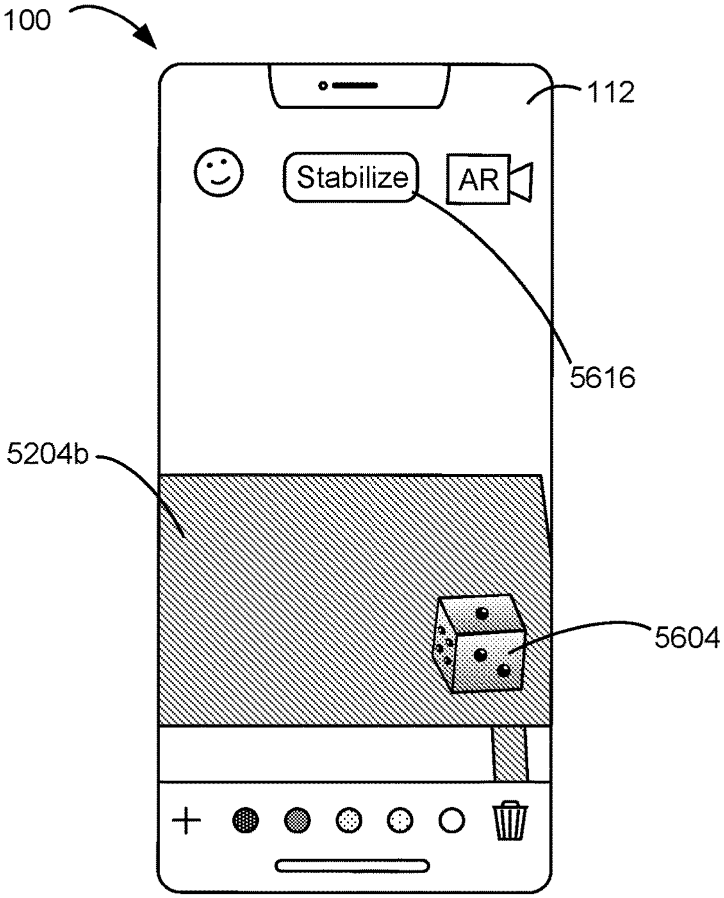
Figure 5F14b

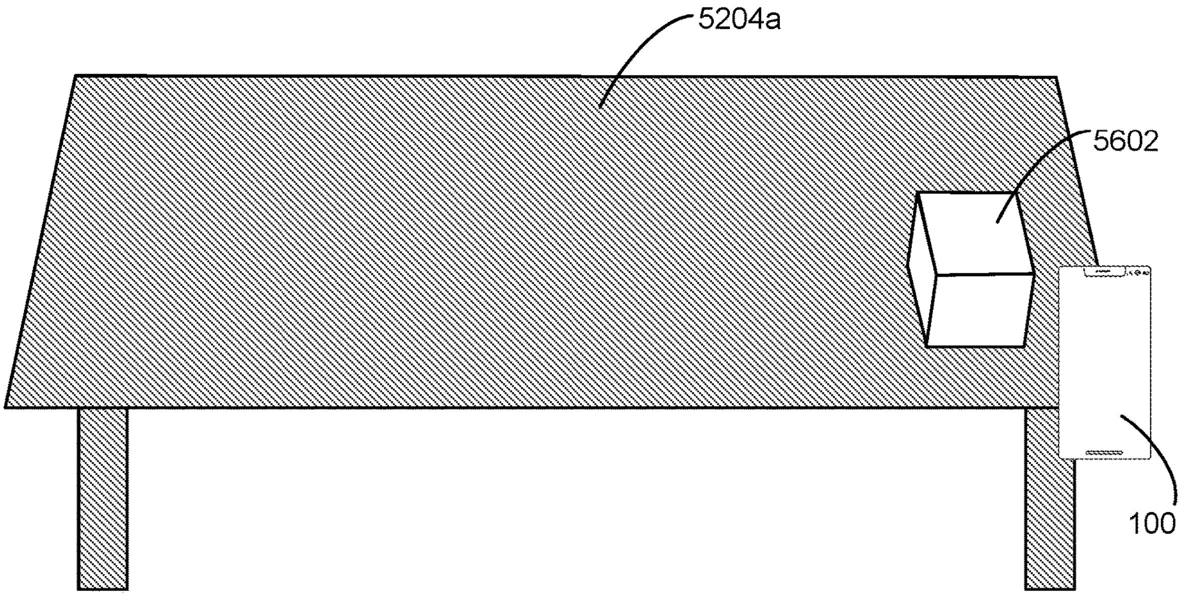
Figure 5F15a
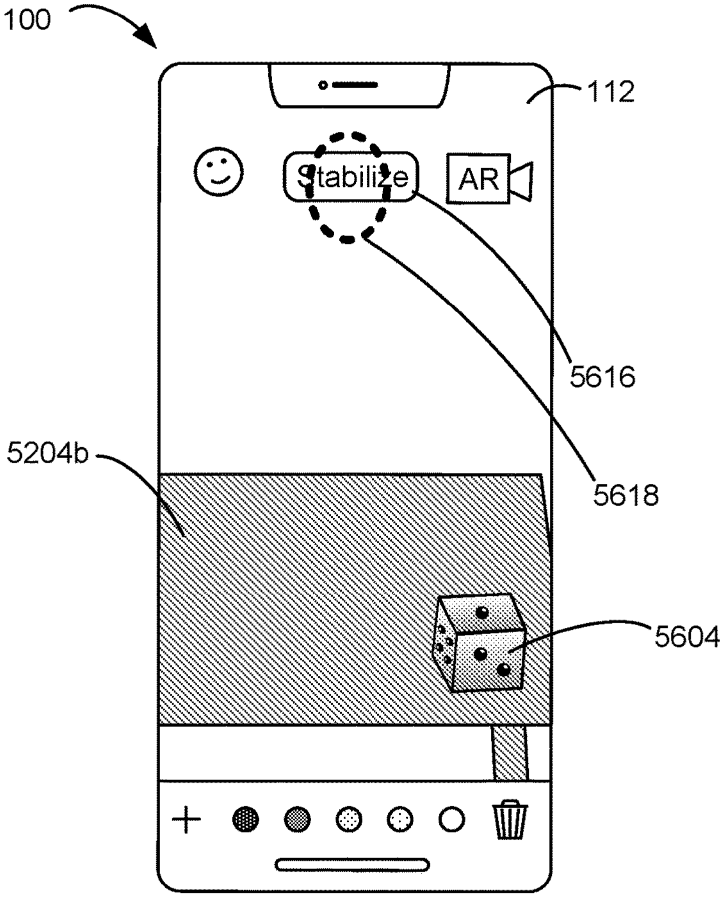
Figure 5F15b

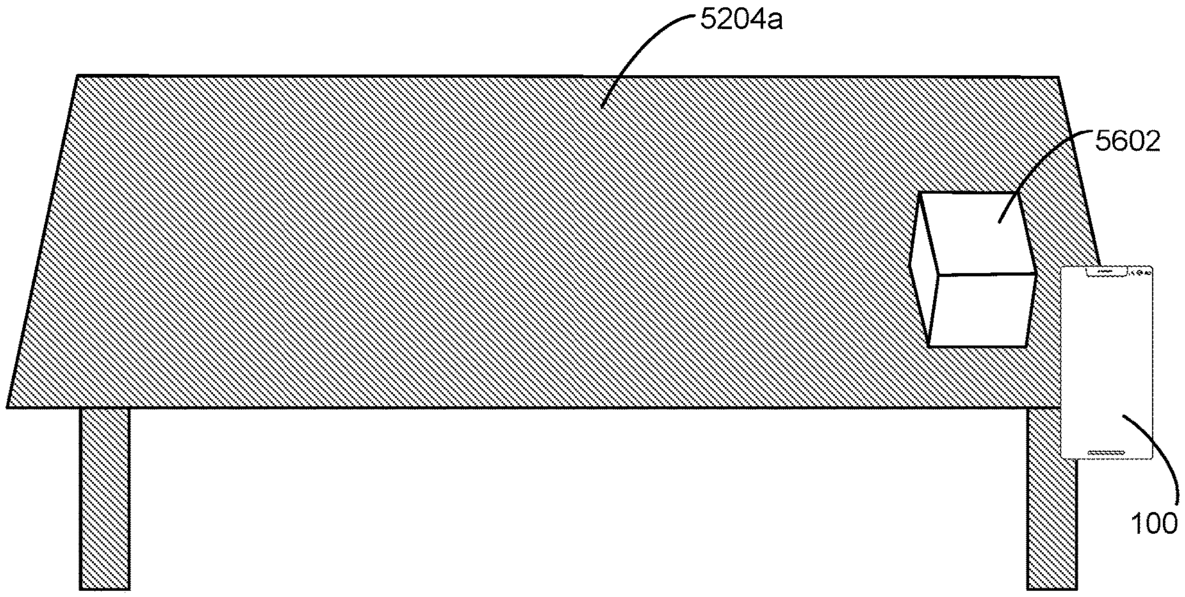
Figure 5F16a
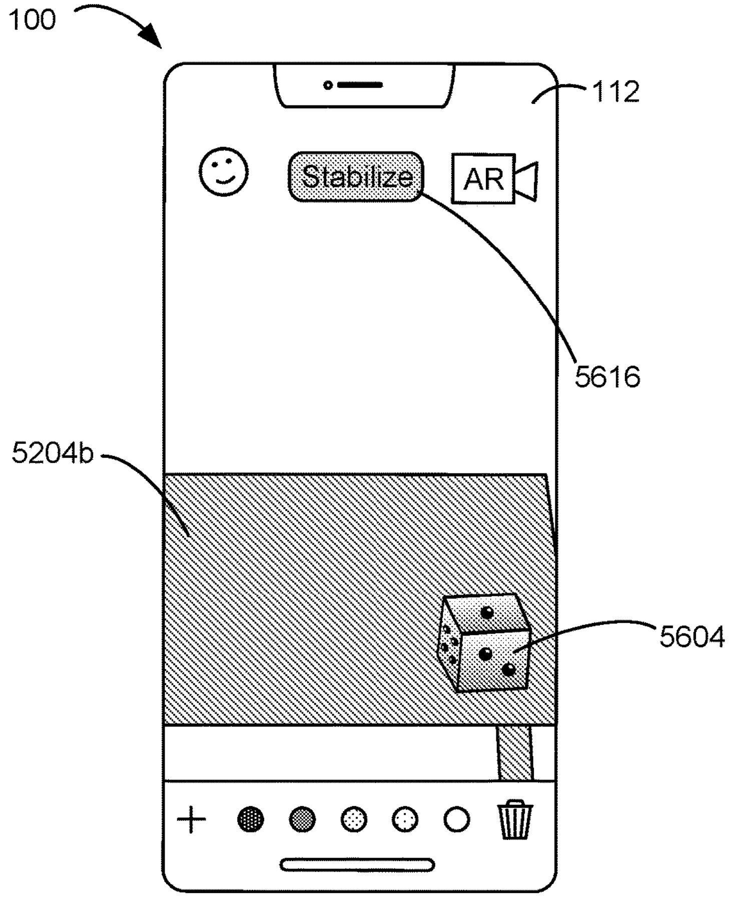
Figure 5F16b

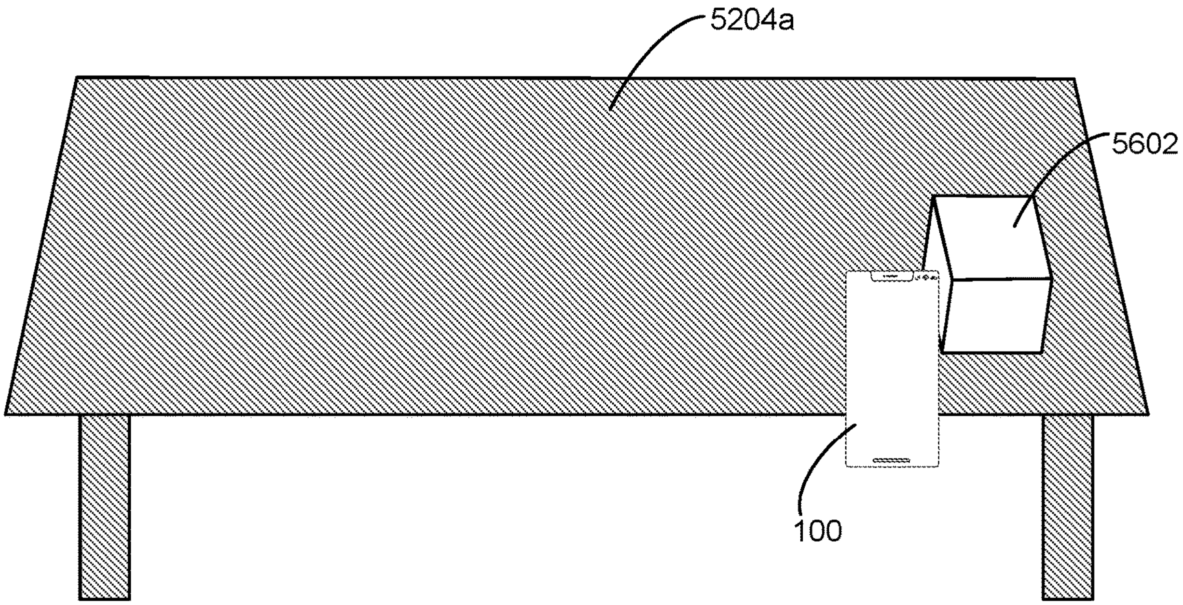
Figure 5F17a
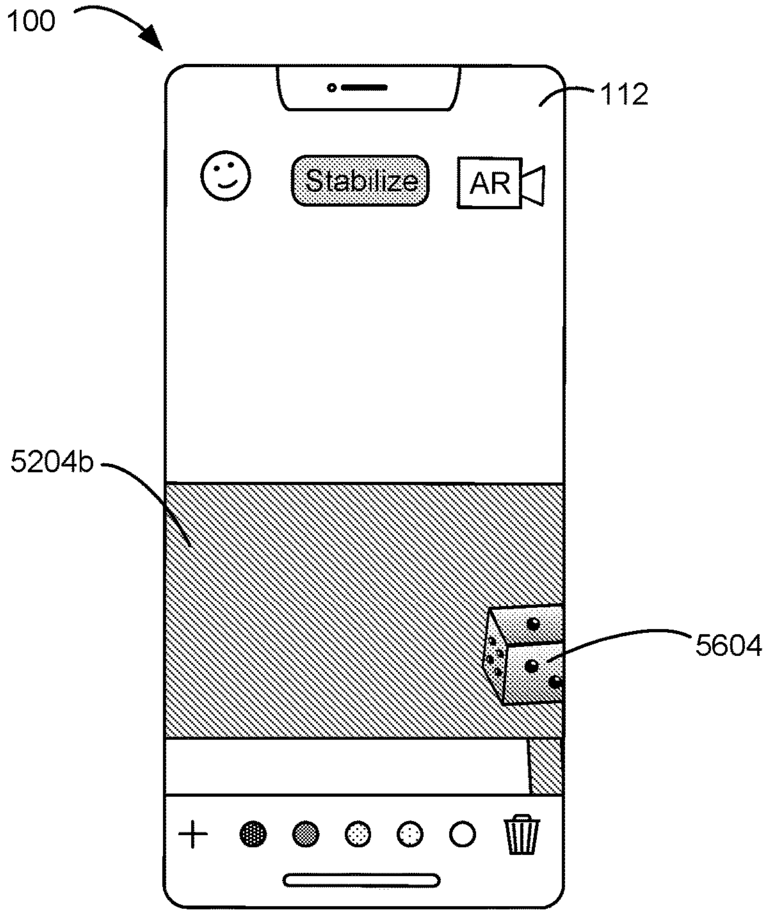
Figure 5F17b

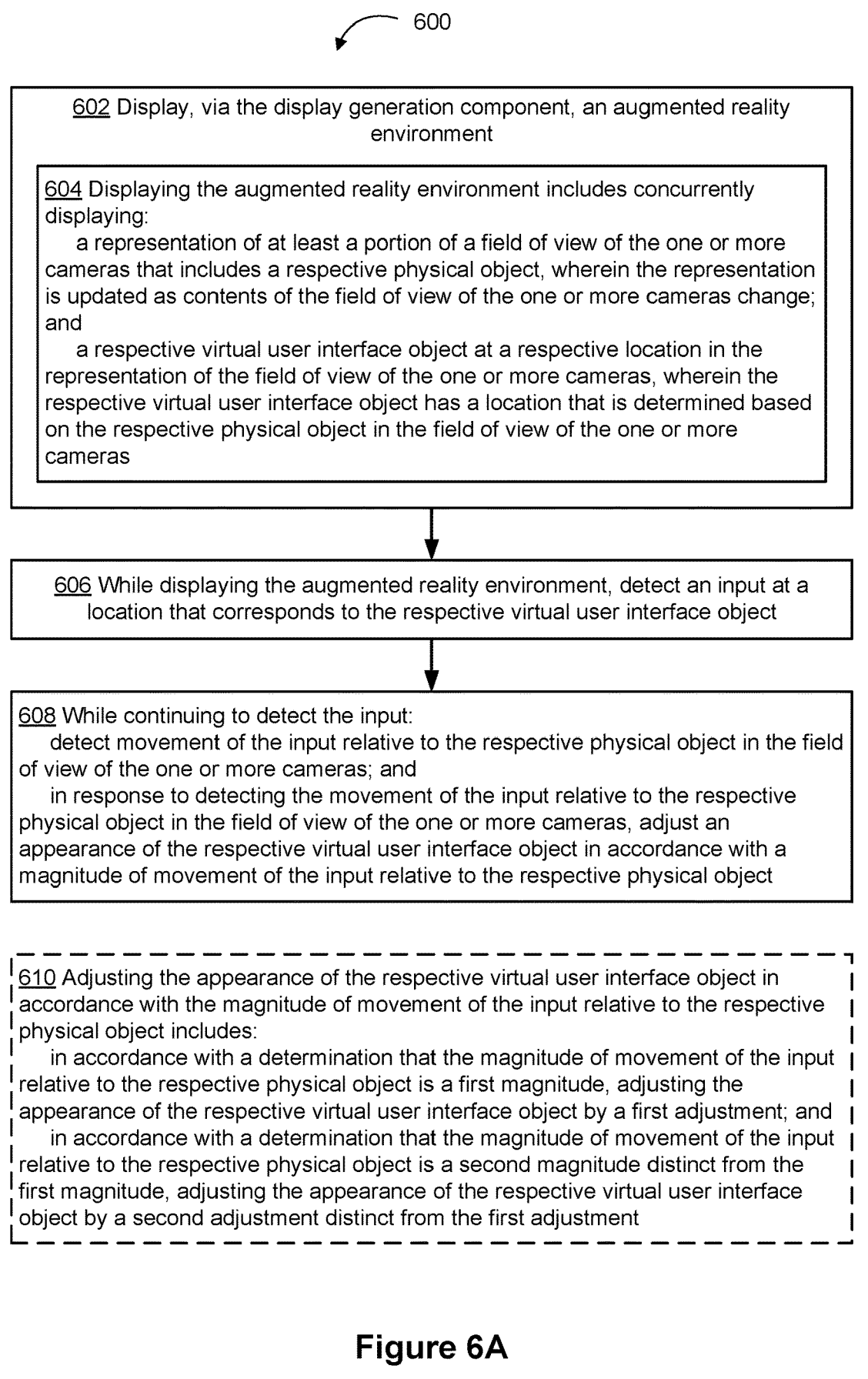

600

602 Display, via the display generation component, an augmented reality environment 604 Displaying the augmented reality environment includes concurrently displaying:
a representation of at least a portion of a field of view of the one or more cameras that includes a respective physical object, wherein the representation is updated as contents of the field of view of the one or more cameras change; and
a respective virtual user interface object at a respective location in the representation of the field of view of the one or more cameras, wherein the respective virtual user interface object has a location that is determined based on the respective physical object in the field of view of the one or more cameras 606 While displaying the augmented reality environment, detect an input at a location that corresponds to the respective virtual user interface object 608 While continuing to detect the input:
detect movement of the input relative to the respective physical object in the field of view of the one or more cameras; and
in response to detecting the movement of the input relative to the respective physical object in the field of view of the one or more cameras, adjust an appearance of the respective virtual user interface object in accordance with a magnitude of movement of the input relative to the respective physical object 610 Adjusting the appearance of the respective virtual user interface object in accordance with the magnitude of movement of the input relative to the respective physical object includes:
in accordance with a determination that the magnitude of movement of the input relative to the respective physical object is a first magnitude, adjusting the appearance of the respective virtual user interface object by a first adjustment; and
in accordance with a determination that the magnitude of movement of the input relative to the respective physical object is a second magnitude distinct from the first magnitude, adjusting the appearance of the respective virtual user interface object by a second adjustment distinct from the first adjustment

Figure 6A

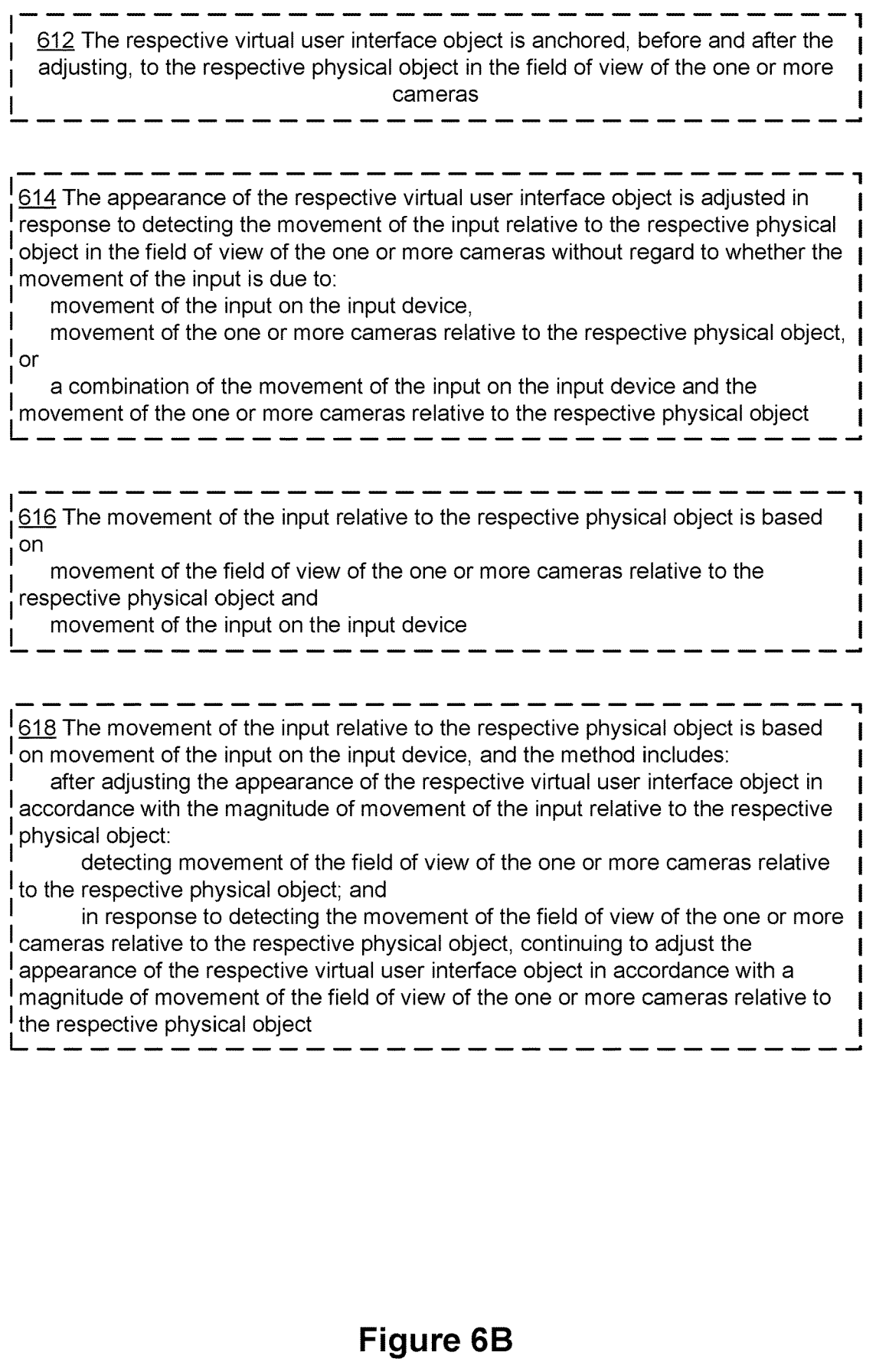

612 The respective virtual user interface object is anchored, before and after the adjusting, to the respective physical object in the field of view of the one or more cameras 614 The appearance of the respective virtual user interface object is adjusted in response to detecting the movement of the input relative to the respective physical object in the field of view of the one or more cameras without regard to whether the movement of the input is due to:
movement of the input on the input device,
movement of the one or more cameras relative to the respective physical object, or
a combination of the movement of the input on the input device and the movement of the one or more cameras relative to the respective physical object 616 The movement of the input relative to the respective physical object is based on
movement of the field of view of the one or more cameras relative to the respective physical object and
movement of the input on the input device 618 The movement of the input relative to the respective physical object is based on movement of the input on the input device, and the method includes:
after adjusting the appearance of the respective virtual user interface object in accordance with the magnitude of movement of the input relative to the respective physical object:
detecting movement of the field of view of the one or more cameras relative to the respective physical object; and
in response to detecting the movement of the field of view of the one or more cameras relative to the respective physical object, continuing to adjust the appearance of the respective virtual user interface object in accordance with a magnitude of movement of the field of view of the one or more cameras relative to the respective physical object

Figure 6B

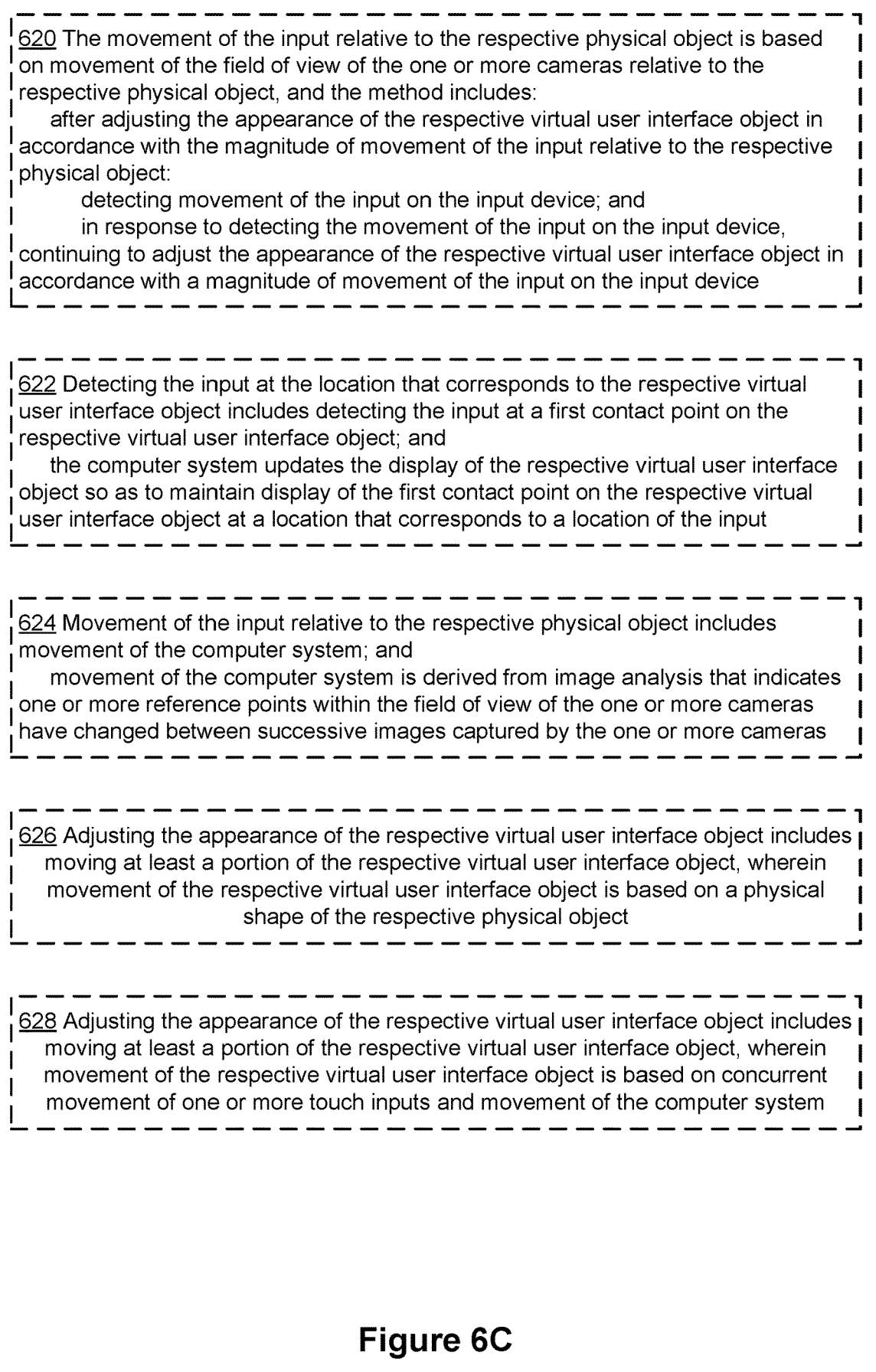

620 The movement of the input relative to the respective physical object is based on movement of the field of view of the one or more cameras relative to the respective physical object, and the method includes:

after adjusting the appearance of the respective virtual user interface object in accordance with the magnitude of movement of the input relative to the respective physical object:

detecting movement of the input on the input device; and in response to detecting the movement of the input on the input device, continuing to adjust the appearance of the respective virtual user interface object in accordance with a magnitude of movement of the input on the input device 622 Detecting the input at the location that corresponds to the respective virtual user interface object includes detecting the input at a first contact point on the respective virtual user interface object; and the computer system updates the display of the respective virtual user interface object so as to maintain display of the first contact point on the respective virtual user interface object at a location that corresponds to a location of the input 624 Movement of the input relative to the respective physical object includes movement of the computer system; and movement of the computer system is derived from image analysis that indicates one or more reference points within the field of view of the one or more cameras have changed between successive images captured by the one or more cameras 626 Adjusting the appearance of the respective virtual user interface object includes moving at least a portion of the respective virtual user interface object, wherein movement of the respective virtual user interface object is based on a physical shape of the respective physical object 628 Adjusting the appearance of the respective virtual user interface object includes moving at least a portion of the respective virtual user interface object, wherein movement of the respective virtual user interface object is based on concurrent movement of one or more touch inputs and movement of the computer system

Figure 6C

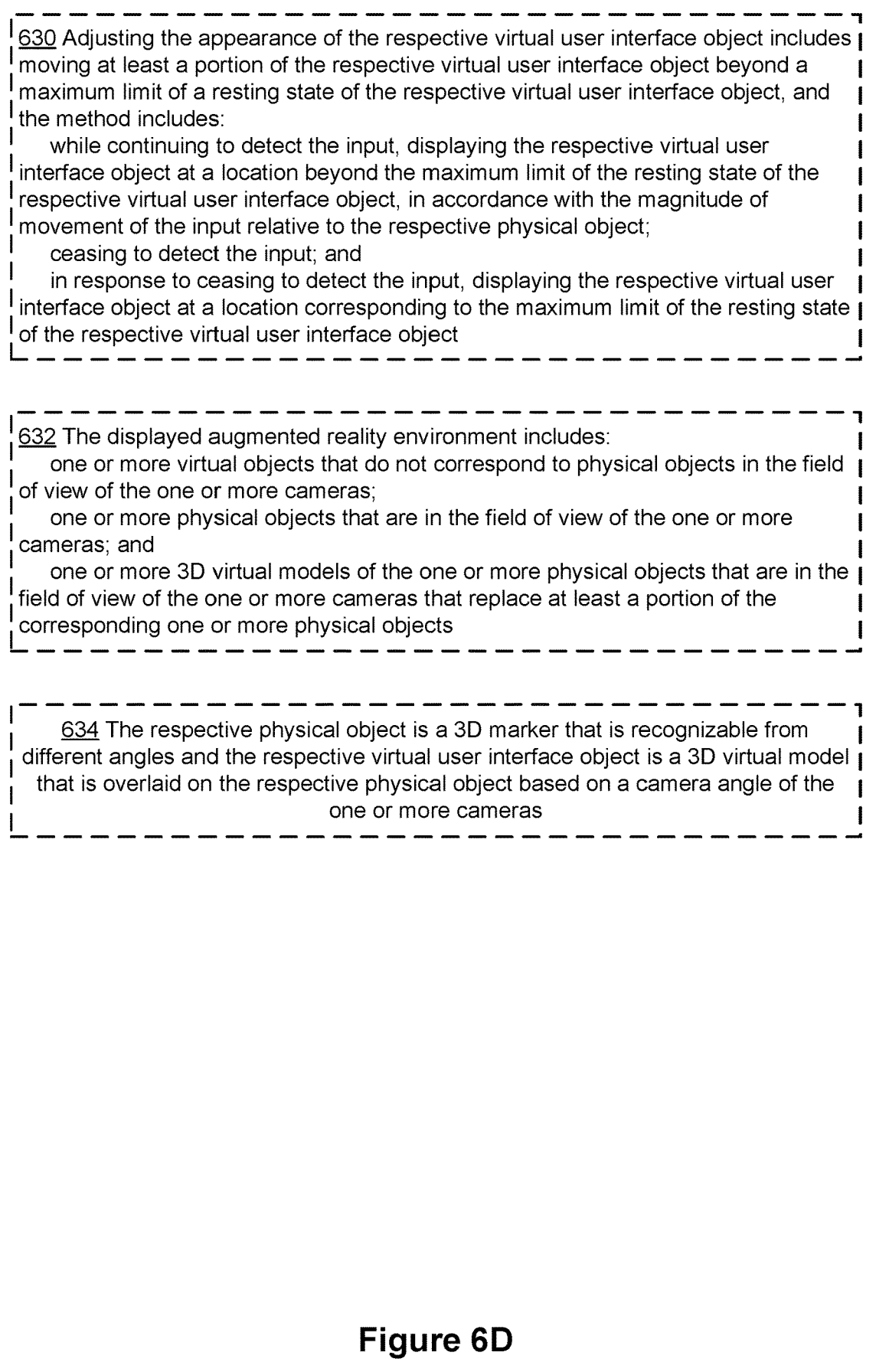

630 Adjusting the appearance of the respective virtual user interface object includes moving at least a portion of the respective virtual user interface object beyond a maximum limit of a resting state of the respective virtual user interface object, and the method includes:

while continuing to detect the input, displaying the respective virtual user interface object at a location beyond the maximum limit of the resting state of the respective virtual user interface object, in accordance with the magnitude of movement of the input relative to the respective physical object;

ceasing to detect the input; and in response to ceasing to detect the input, displaying the respective virtual user interface object at a location corresponding to the maximum limit of the resting state of the respective virtual user interface object 632 The displayed augmented reality environment includes:

one or more virtual objects that do not correspond to physical objects in the field of view of the one or more cameras;

one or more physical objects that are in the field of view of the one or more cameras; and one or more 3D virtual models of the one or more physical objects that are in the field of view of the one or more cameras that replace at least a portion of the corresponding one or more physical objects 634 The respective physical object is a 3D marker that is recognizable from different angles and the respective virtual user interface object is a 3D virtual model that is overlaid on the respective physical object based on a camera angle of the one or more cameras

Figure 6D

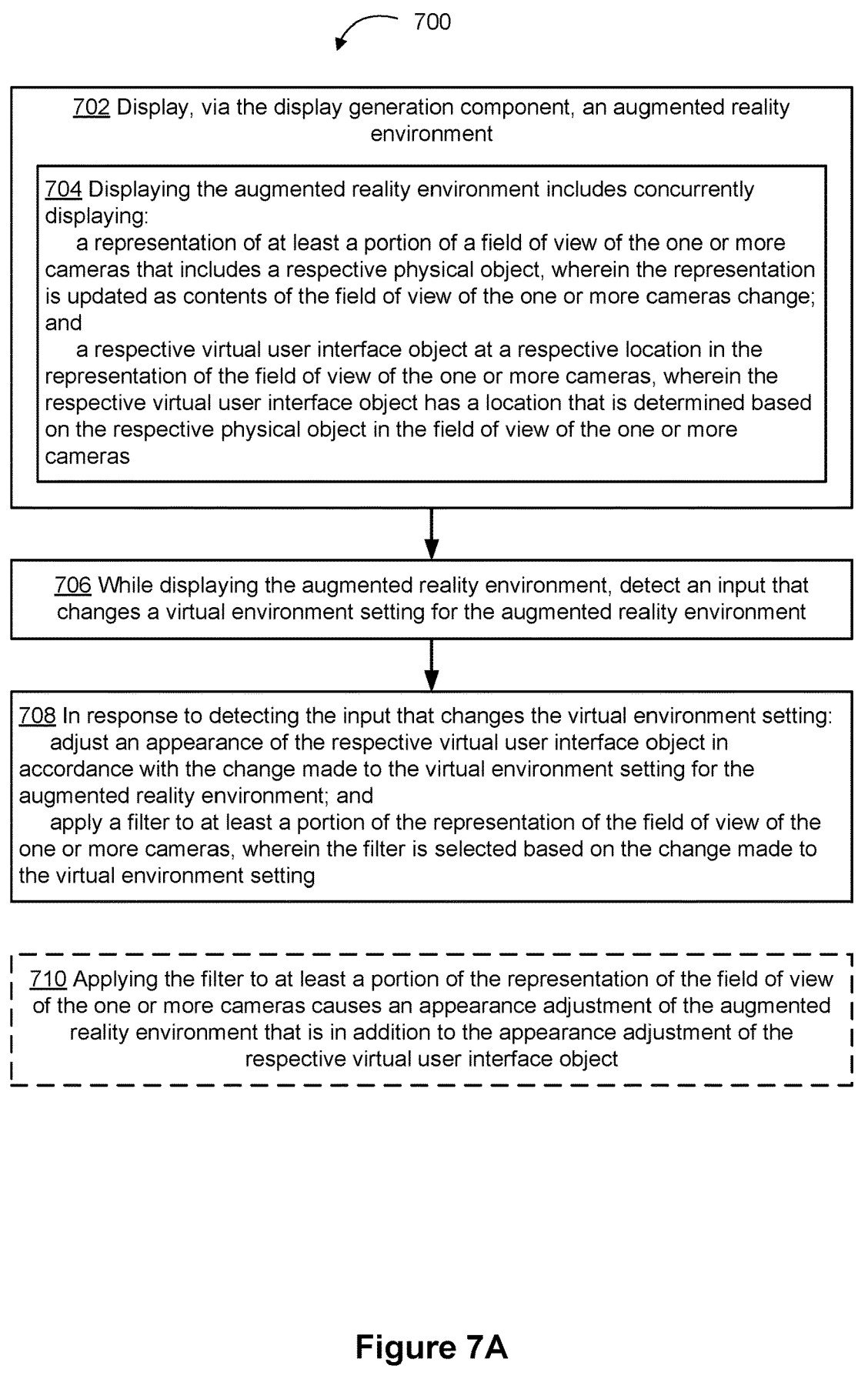

700

702 Display, via the display generation component, an augmented reality environment 704 Displaying the augmented reality environment includes concurrently displaying:
a representation of at least a portion of a field of view of the one or more cameras that includes a respective physical object, wherein the representation is updated as contents of the field of view of the one or more cameras change; and
a respective virtual user interface object at a respective location in the representation of the field of view of the one or more cameras, wherein the respective virtual user interface object has a location that is determined based on the respective physical object in the field of view of the one or more cameras

↓

706 While displaying the augmented reality environment, detect an input that changes a virtual environment setting for the augmented reality environment

↓

708 In response to detecting the input that changes the virtual environment setting:
adjust an appearance of the respective virtual user interface object in accordance with the change made to the virtual environment setting for the augmented reality environment; and
apply a filter to at least a portion of the representation of the field of view of the one or more cameras, wherein the filter is selected based on the change made to the virtual environment setting 710 Applying the filter to at least a portion of the representation of the field of view of the one or more cameras causes an appearance adjustment of the augmented reality environment that is in addition to the appearance adjustment of the respective virtual user interface object

Figure 7A

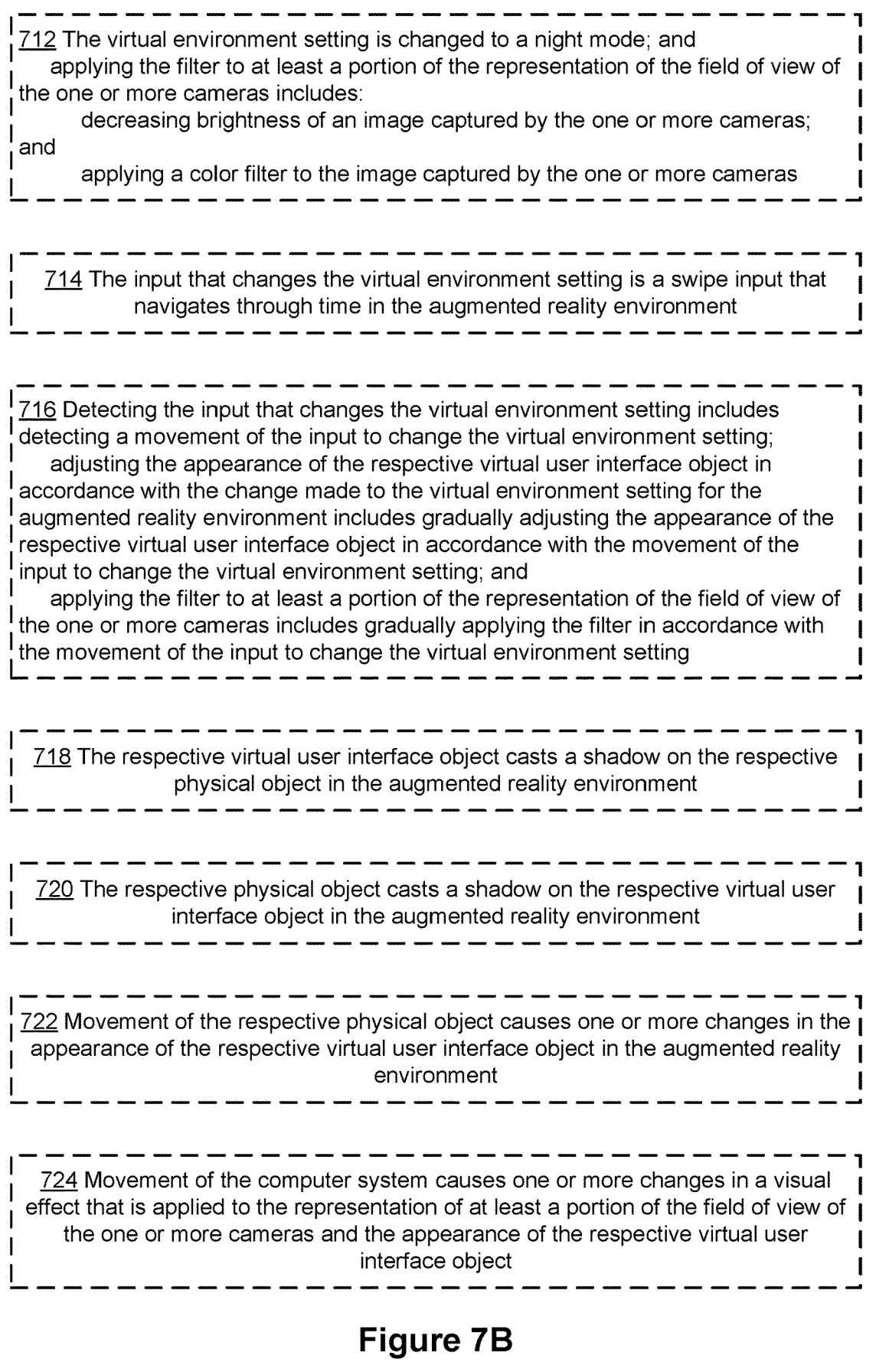

712 The virtual environment setting is changed to a night mode; and
applying the filter to at least a portion of the representation of the field of view of the one or more cameras includes:
decreasing brightness of an image captured by the one or more cameras; and
applying a color filter to the image captured by the one or more cameras 714 The input that changes the virtual environment setting is a swipe input that navigates through time in the augmented reality environment 716 Detecting the input that changes the virtual environment setting includes detecting a movement of the input to change the virtual environment setting;
adjusting the appearance of the respective virtual user interface object in accordance with the change made to the virtual environment setting for the augmented reality environment includes gradually adjusting the appearance of the respective virtual user interface object in accordance with the movement of the input to change the virtual environment setting; and
applying the filter to at least a portion of the representation of the field of view of the one or more cameras includes gradually applying the filter in accordance with the movement of the input to change the virtual environment setting 718 The respective virtual user interface object casts a shadow on the respective physical object in the augmented reality environment 720 The respective physical object casts a shadow on the respective virtual user interface object in the augmented reality environment 722 Movement of the respective physical object causes one or more changes in the appearance of the respective virtual user interface object in the augmented reality environment 724 Movement of the computer system causes one or more changes in a visual effect that is applied to the representation of at least a portion of the field of view of the one or more cameras and the appearance of the respective virtual user interface object

Figure 7B

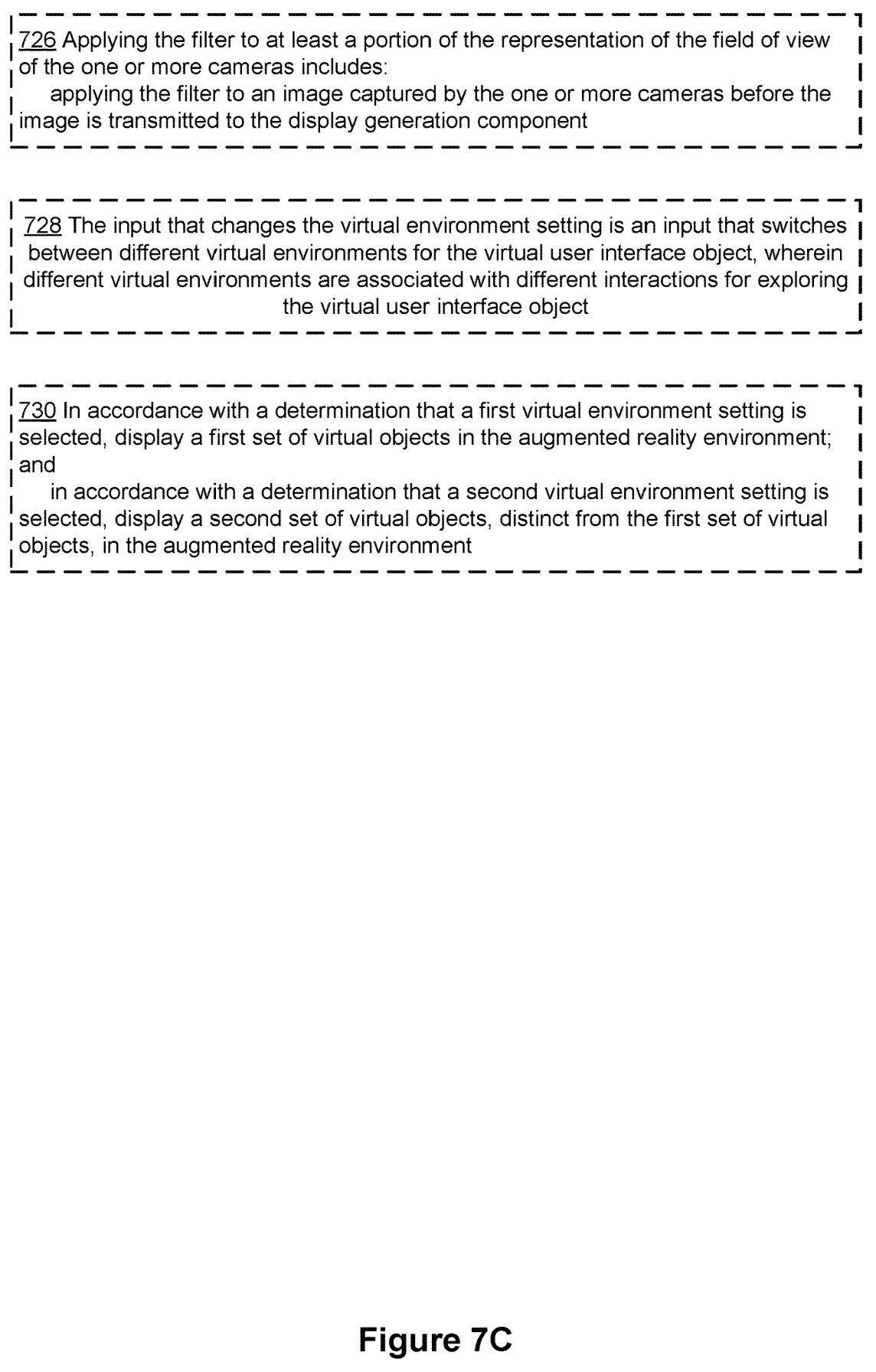

726 Applying the filter to at least a portion of the representation of the field of view of the one or more cameras includes:
applying the filter to an image captured by the one or more cameras before the image is transmitted to the display generation component 728 The input that changes the virtual environment setting is an input that switches between different virtual environments for the virtual user interface object, wherein different virtual environments are associated with different interactions for exploring the virtual user interface object 730 In accordance with a determination that a first virtual environment setting is selected, display a first set of virtual objects in the augmented reality environment; and
in accordance with a determination that a second virtual environment setting is selected, display a second set of virtual objects, distinct from the first set of virtual objects, in the augmented reality environment

Figure 7C

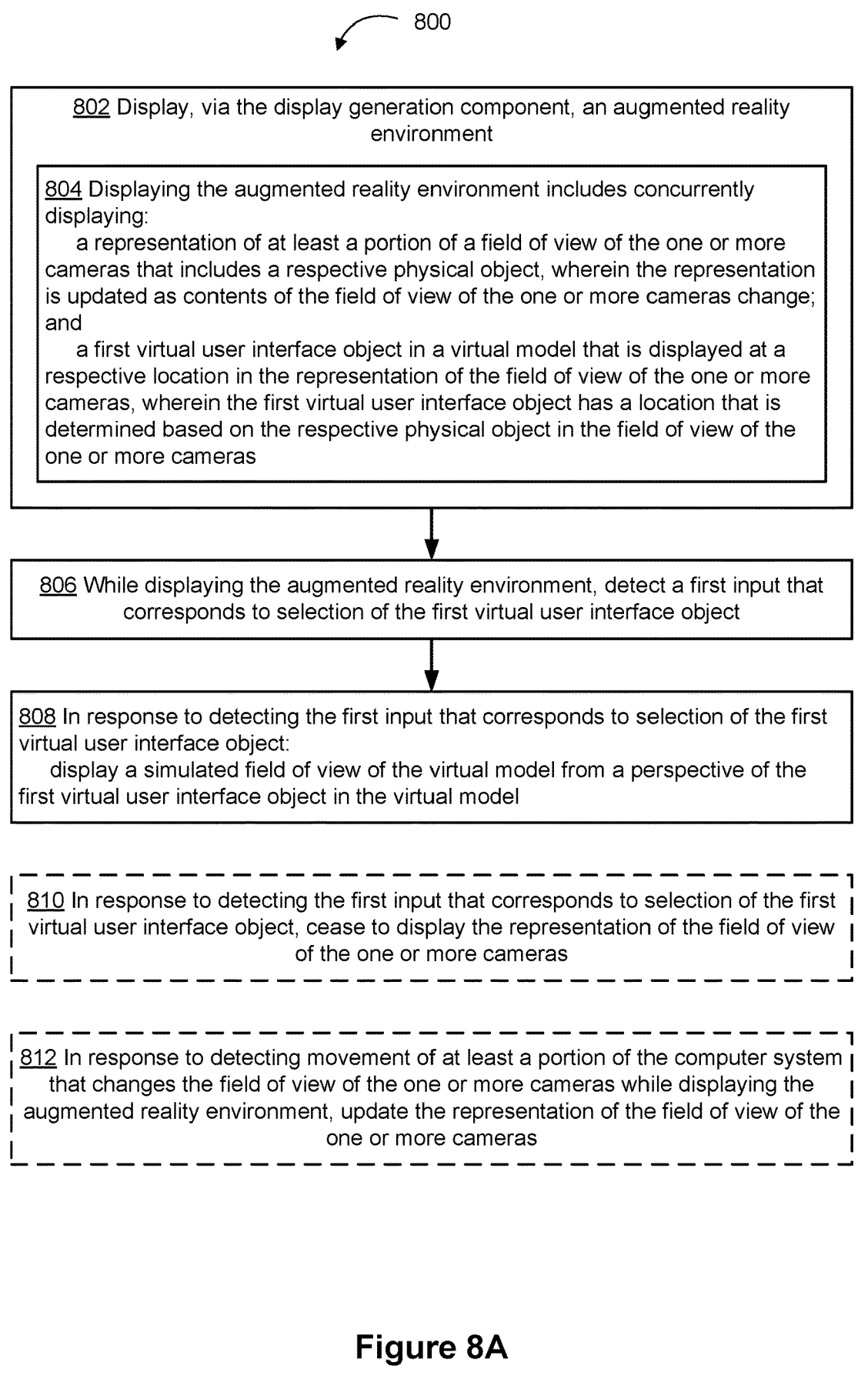

800

802 Display, via the display generation component, an augmented reality environment 804 Displaying the augmented reality environment includes concurrently displaying:
a representation of at least a portion of a field of view of the one or more cameras that includes a respective physical object, wherein the representation is updated as contents of the field of view of the one or more cameras change; and
a first virtual user interface object in a virtual model that is displayed at a respective location in the representation of the field of view of the one or more cameras, wherein the first virtual user interface object has a location that is determined based on the respective physical object in the field of view of the one or more cameras 806 While displaying the augmented reality environment, detect a first input that corresponds to selection of the first virtual user interface object 808 In response to detecting the first input that corresponds to selection of the first virtual user interface object:
display a simulated field of view of the virtual model from a perspective of the first virtual user interface object in the virtual model 810 In response to detecting the first input that corresponds to selection of the first virtual user interface object, cease to display the representation of the field of view of the one or more cameras 812 In response to detecting movement of at least a portion of the computer system that changes the field of view of the one or more cameras while displaying the augmented reality environment, update the representation of the field of view of the one or more cameras

Figure 8A

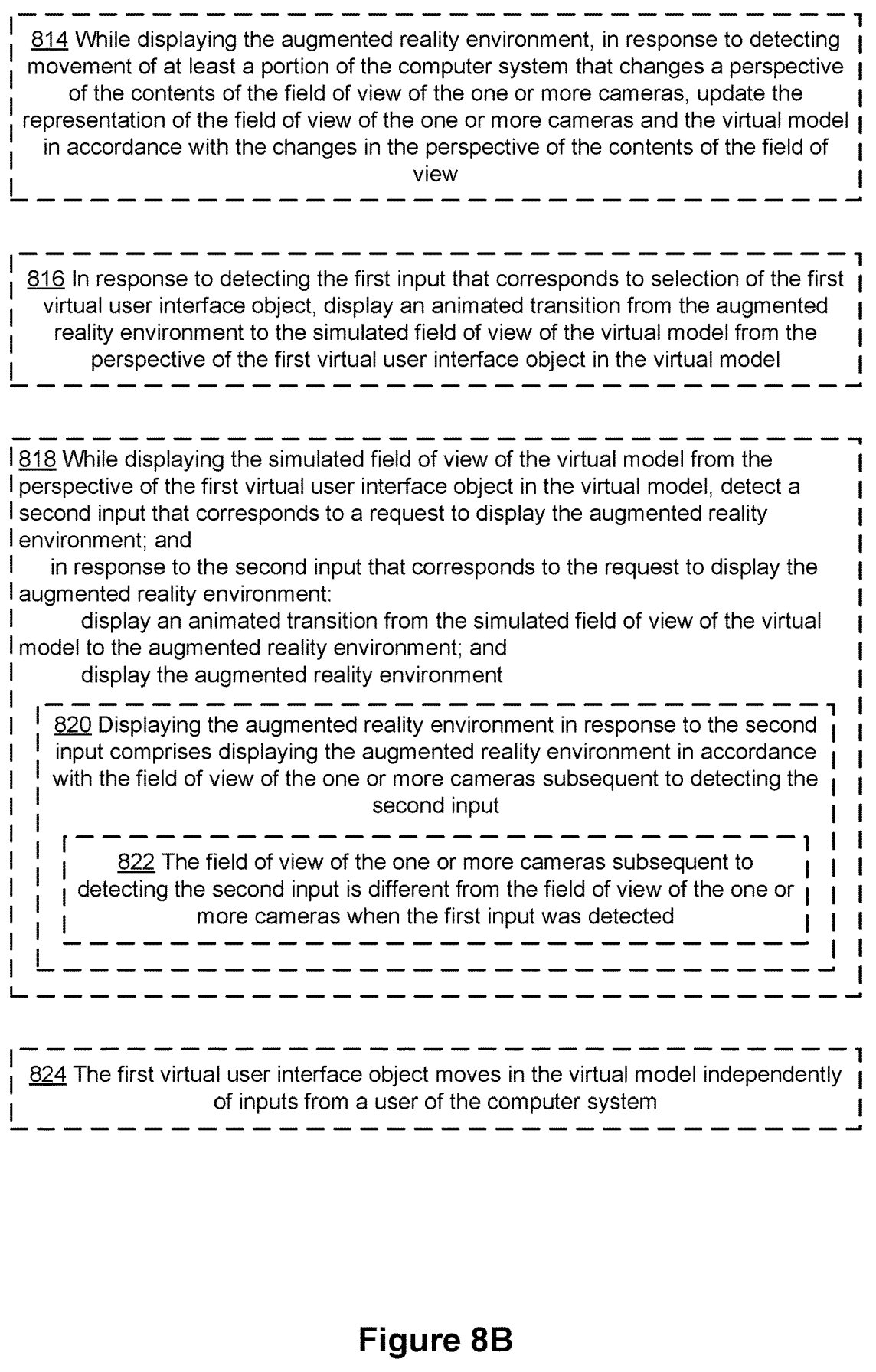

814 While displaying the augmented reality environment, in response to detecting movement of at least a portion of the computer system that changes a perspective of the contents of the field of view of the one or more cameras, update the representation of the field of view of the one or more cameras and the virtual model in accordance with the changes in the perspective of the contents of the field of view 816 In response to detecting the first input that corresponds to selection of the first virtual user interface object, display an animated transition from the augmented reality environment to the simulated field of view of the virtual model from the perspective of the first virtual user interface object in the virtual model 818 While displaying the simulated field of view of the virtual model from the perspective of the first virtual user interface object in the virtual model, detect a second input that corresponds to a request to display the augmented reality environment; and in response to the second input that corresponds to the request to display the augmented reality environment:

display an animated transition from the simulated field of view of the virtual model to the augmented reality environment; and display the augmented reality environment 820 Displaying the augmented reality environment in response to the second input comprises displaying the augmented reality environment in accordance with the field of view of the one or more cameras subsequent to detecting the second input 822 The field of view of the one or more cameras subsequent to detecting the second input is different from the field of view of the one or more cameras when the first input was detected 824 The first virtual user interface object moves in the virtual model independently of inputs from a user of the computer system

Figure 8B

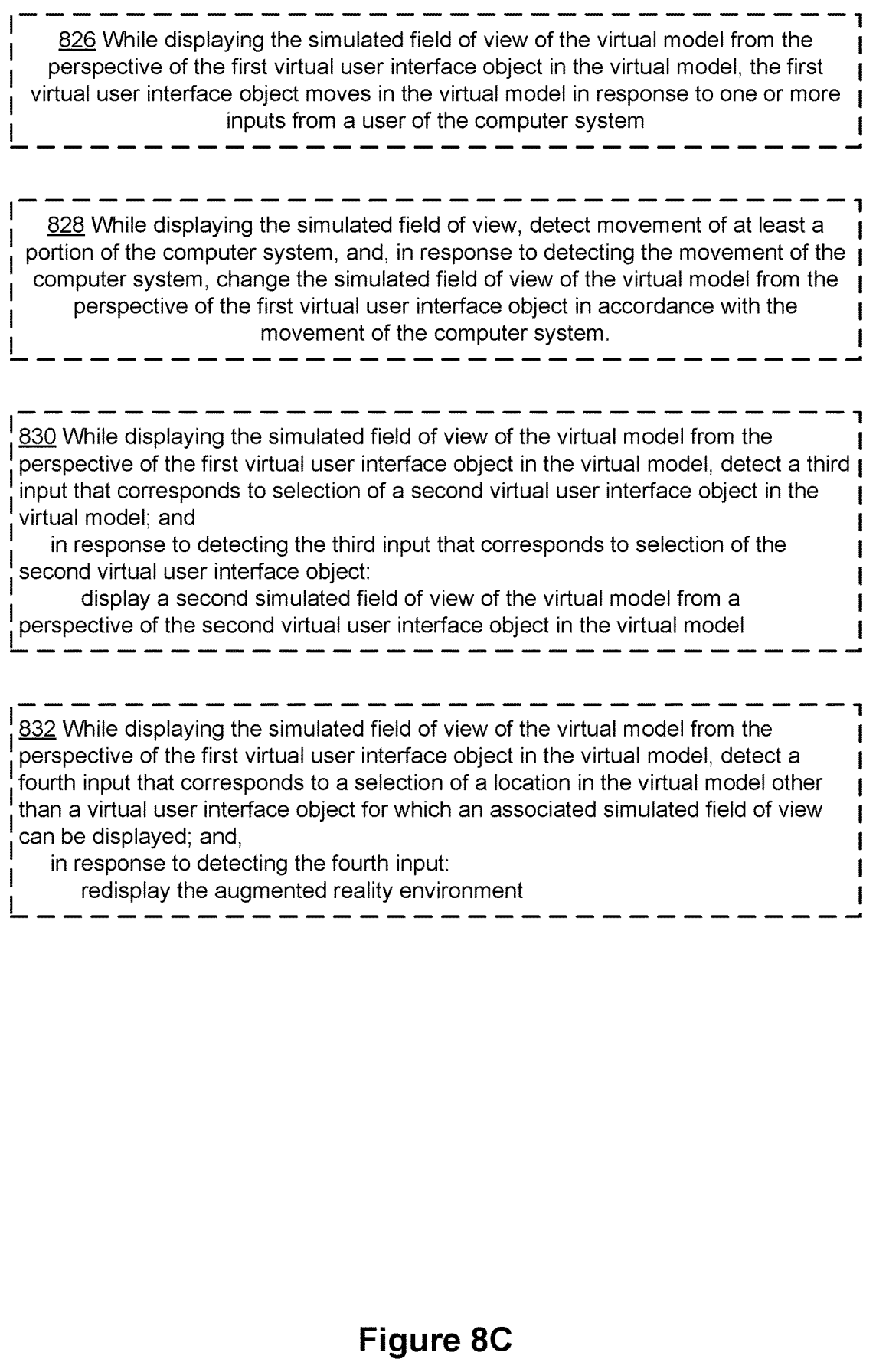

826 While displaying the simulated field of view of the virtual model from the perspective of the first virtual user interface object in the virtual model, the first virtual user interface object moves in the virtual model in response to one or more inputs from a user of the computer system 828 While displaying the simulated field of view, detect movement of at least a portion of the computer system, and, in response to detecting the movement of the computer system, change the simulated field of view of the virtual model from the perspective of the first virtual user interface object in accordance with the movement of the computer system.

830 While displaying the simulated field of view of the virtual model from the perspective of the first virtual user interface object in the virtual model, detect a third input that corresponds to selection of a second virtual user interface object in the virtual model; and
in response to detecting the third input that corresponds to selection of the second virtual user interface object:
display a second simulated field of view of the virtual model from a perspective of the second virtual user interface object in the virtual model 832 While displaying the simulated field of view of the virtual model from the perspective of the first virtual user interface object in the virtual model, detect a fourth input that corresponds to a selection of a location in the virtual model other than a virtual user interface object for which an associated simulated field of view can be displayed; and,
in response to detecting the fourth input:
redisplay the augmented reality environment

Figure 8C

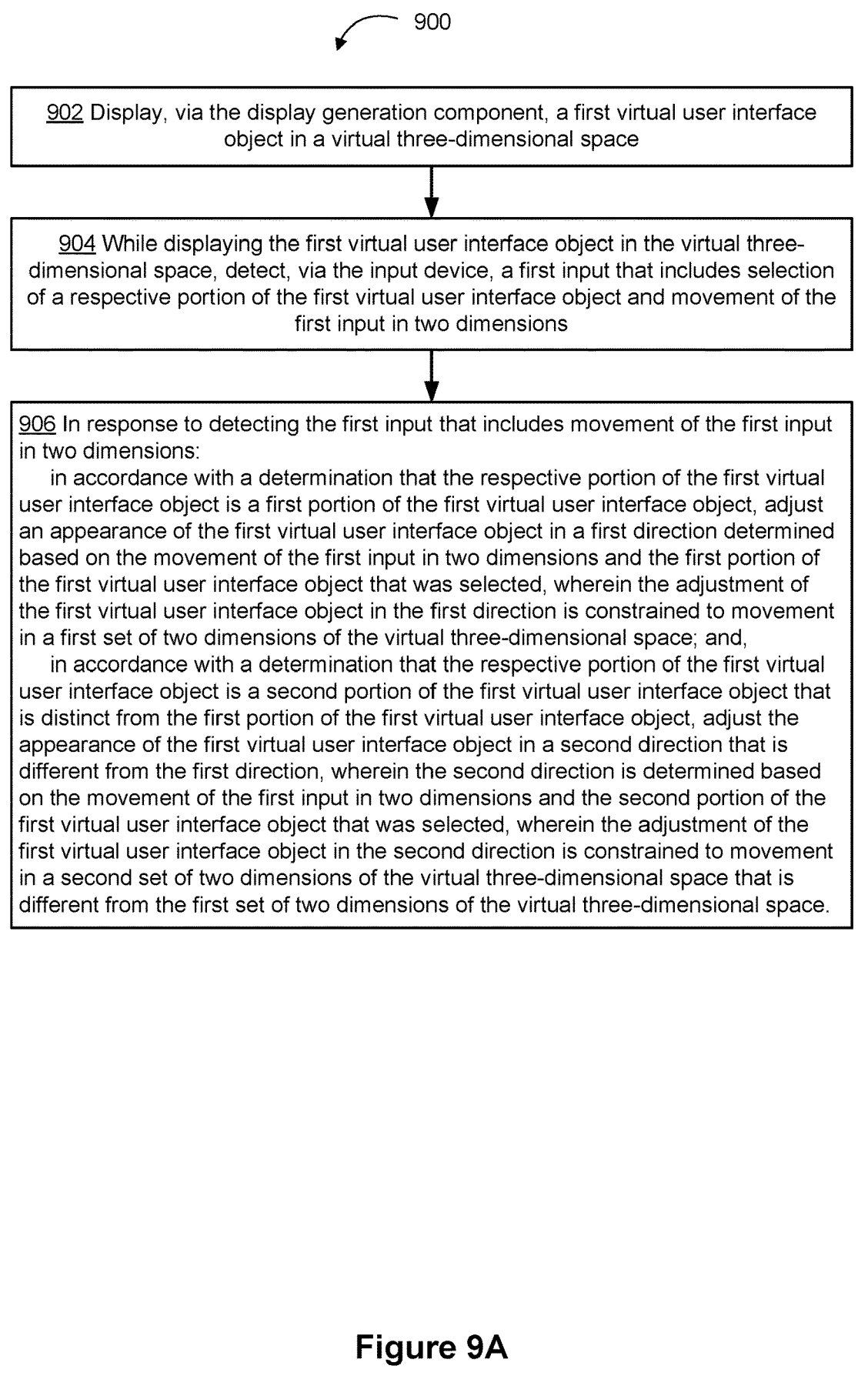

900

902 Display, via the display generation component, a first virtual user interface object in a virtual three-dimensional space

↓

904 While displaying the first virtual user interface object in the virtual three-dimensional space, detect, via the input device, a first input that includes selection of a respective portion of the first virtual user interface object and movement of the first input in two dimensions

↓

906 In response to detecting the first input that includes movement of the first input in two dimensions:

in accordance with a determination that the respective portion of the first virtual user interface object is a first portion of the first virtual user interface object, adjust an appearance of the first virtual user interface object in a first direction determined based on the movement of the first input in two dimensions and the first portion of the first virtual user interface object that was selected, wherein the adjustment of the first virtual user interface object in the first direction is constrained to movement in a first set of two dimensions of the virtual three-dimensional space; and, in accordance with a determination that the respective portion of the first virtual user interface object is a second portion of the first virtual user interface object that is distinct from the first portion of the first virtual user interface object, adjust the appearance of the first virtual user interface object in a second direction that is different from the first direction, wherein the second direction is determined based on the movement of the first input in two dimensions and the second portion of the first virtual user interface object that was selected, wherein the adjustment of the first virtual user interface object in the second direction is constrained to movement in a second set of two dimensions of the virtual three-dimensional space that is different from the first set of two dimensions of the virtual three-dimensional space.

Figure 9A

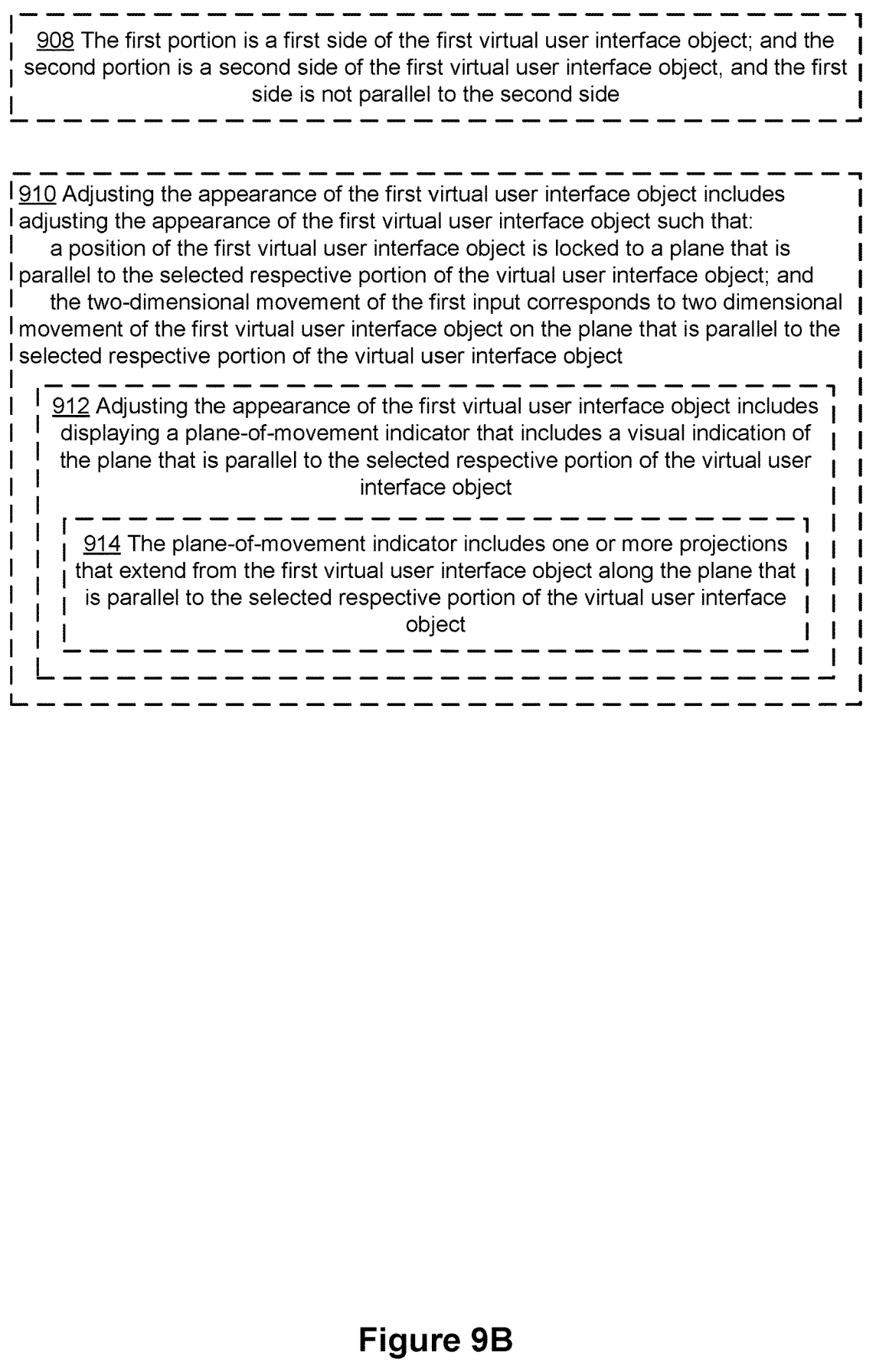

908 The first portion is a first side of the first virtual user interface object; and the second portion is a second side of the first virtual user interface object, and the first side is not parallel to the second side 910 Adjusting the appearance of the first virtual user interface object includes adjusting the appearance of the first virtual user interface object such that:

a position of the first virtual user interface object is locked to a plane that is parallel to the selected respective portion of the virtual user interface object; and the two-dimensional movement of the first input corresponds to two dimensional movement of the first virtual user interface object on the plane that is parallel to the selected respective portion of the virtual user interface object 912 Adjusting the appearance of the first virtual user interface object includes displaying a plane-of-movement indicator that includes a visual indication of the plane that is parallel to the selected respective portion of the virtual user interface object 914 The plane-of-movement indicator includes one or more projections that extend from the first virtual user interface object along the plane that is parallel to the selected respective portion of the virtual user interface object

Figure 9B

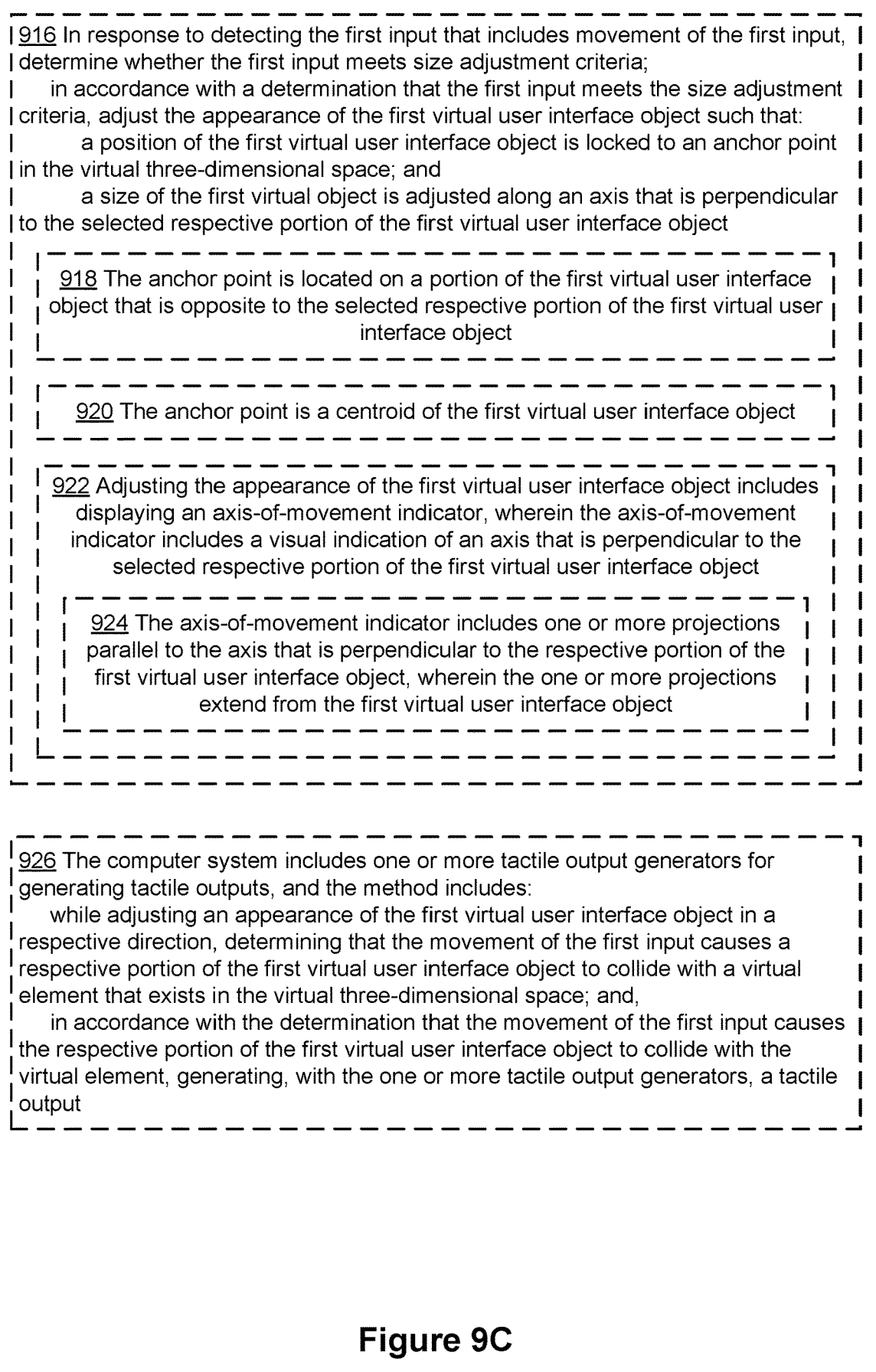

916 In response to detecting the first input that includes movement of the first input, determine whether the first input meets size adjustment criteria;
in accordance with a determination that the first input meets the size adjustment criteria, adjust the appearance of the first virtual user interface object such that:
a position of the first virtual user interface object is locked to an anchor point in the virtual three-dimensional space; and
a size of the first virtual object is adjusted along an axis that is perpendicular to the selected respective portion of the first virtual user interface object 918 The anchor point is located on a portion of the first virtual user interface object that is opposite to the selected respective portion of the first virtual user interface object 920 The anchor point is a centroid of the first virtual user interface object 922 Adjusting the appearance of the first virtual user interface object includes displaying an axis-of-movement indicator, wherein the axis-of-movement indicator includes a visual indication of an axis that is perpendicular to the selected respective portion of the first virtual user interface object 924 The axis-of-movement indicator includes one or more projections parallel to the axis that is perpendicular to the respective portion of the first virtual user interface object, wherein the one or more projections extend from the first virtual user interface object 926 The computer system includes one or more tactile output generators for generating tactile outputs, and the method includes:
while adjusting an appearance of the first virtual user interface object in a respective direction, determining that the movement of the first input causes a respective portion of the first virtual user interface object to collide with a virtual element that exists in the virtual three-dimensional space; and,
in accordance with the determination that the movement of the first input causes the respective portion of the first virtual user interface object to collide with the virtual element, generating, with the one or more tactile output generators, a tactile output

Figure 9C

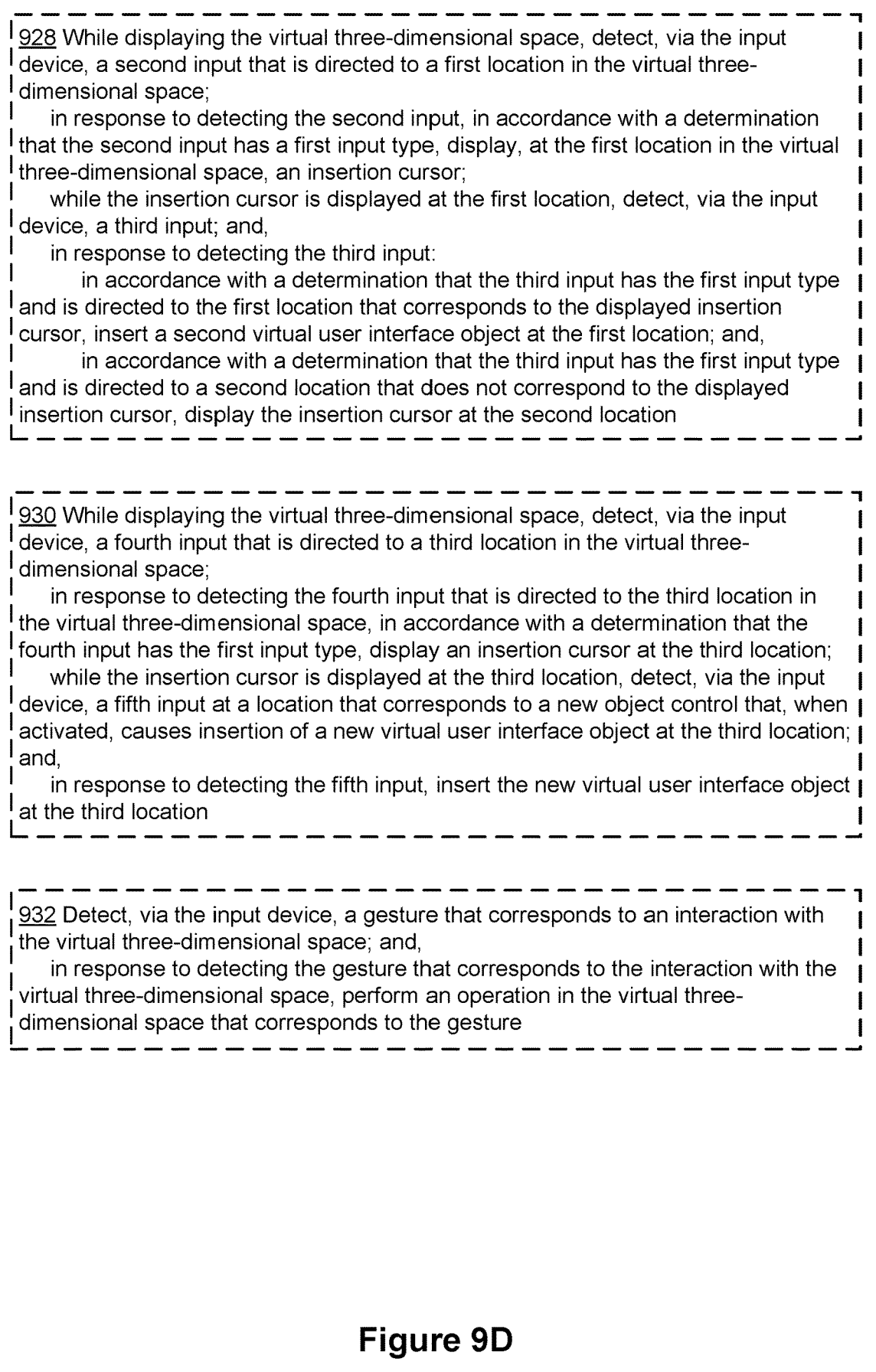

928 While displaying the virtual three-dimensional space, detect, via the input device, a second input that is directed to a first location in the virtual three-dimensional space;
in response to detecting the second input, in accordance with a determination that the second input has a first input type, display, at the first location in the virtual three-dimensional space, an insertion cursor;
while the insertion cursor is displayed at the first location, detect, via the input device, a third input; and,
in response to detecting the third input:
in accordance with a determination that the third input has the first input type and is directed to the first location that corresponds to the displayed insertion cursor, insert a second virtual user interface object at the first location; and,
in accordance with a determination that the third input has the first input type and is directed to a second location that does not correspond to the displayed insertion cursor, display the insertion cursor at the second location 930 While displaying the virtual three-dimensional space, detect, via the input device, a fourth input that is directed to a third location in the virtual three-dimensional space;
in response to detecting the fourth input that is directed to the third location in the virtual three-dimensional space, in accordance with a determination that the fourth input has the first input type, display an insertion cursor at the third location;
while the insertion cursor is displayed at the third location, detect, via the input device, a fifth input at a location that corresponds to a new object control that, when activated, causes insertion of a new virtual user interface object at the third location; and,
in response to detecting the fifth input, insert the new virtual user interface object at the third location 932 Detect, via the input device, a gesture that corresponds to an interaction with the virtual three-dimensional space; and,
in response to detecting the gesture that corresponds to the interaction with the virtual three-dimensional space, perform an operation in the virtual three-dimensional space that corresponds to the gesture

Figure 9D

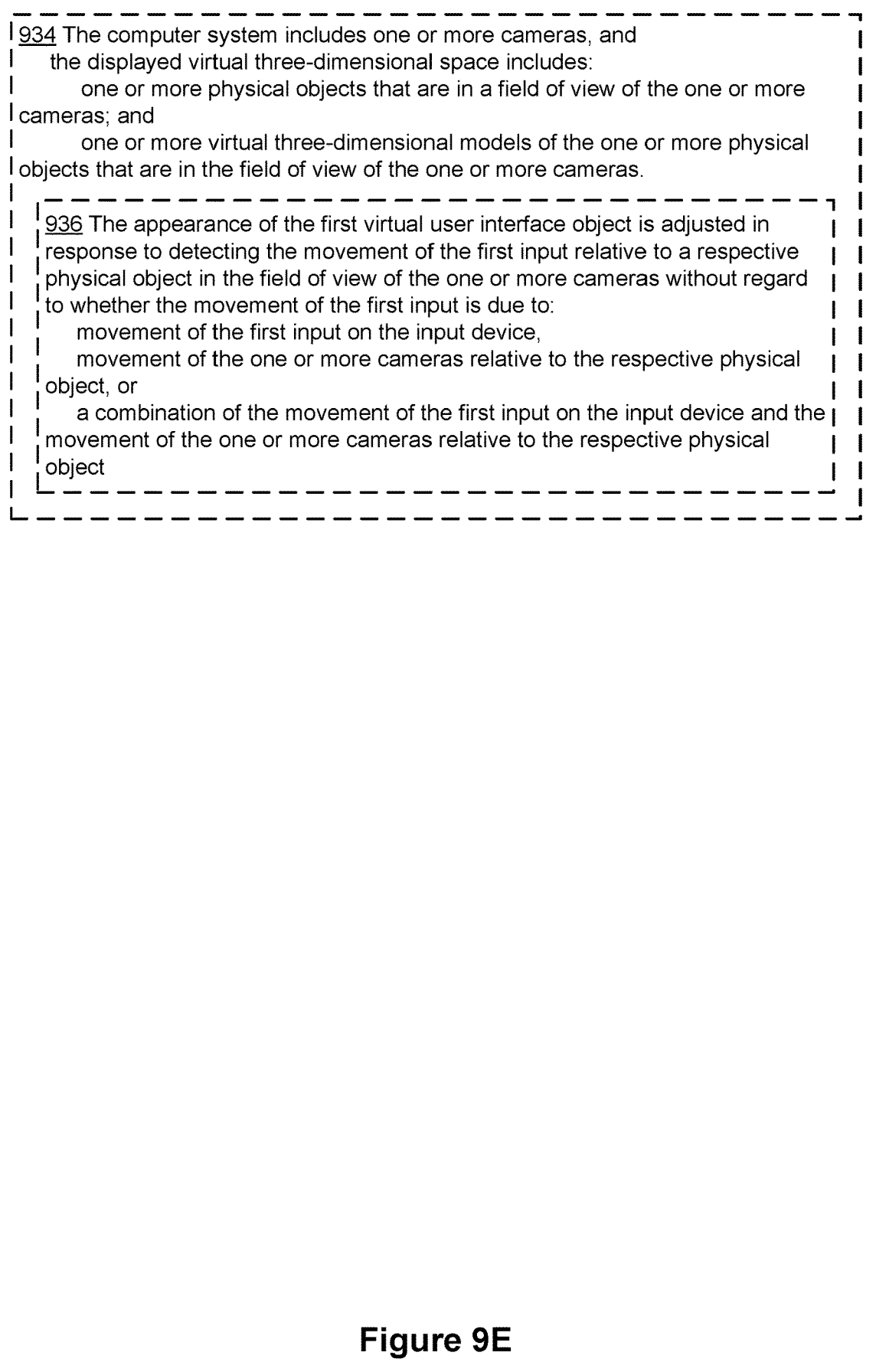

934 The computer system includes one or more cameras, and
the displayed virtual three-dimensional space includes:
one or more physical objects that are in a field of view of the one or more cameras; and
one or more virtual three-dimensional models of the one or more physical objects that are in the field of view of the one or more cameras.

936 The appearance of the first virtual user interface object is adjusted in response to detecting the movement of the first input relative to a respective physical object in the field of view of the one or more cameras without regard to whether the movement of the first input is due to:
movement of the first input on the input device,
movement of the one or more cameras relative to the respective physical object, or
a combination of the movement of the first input on the input device and the movement of the one or more cameras relative to the respective physical object

Figure 9E

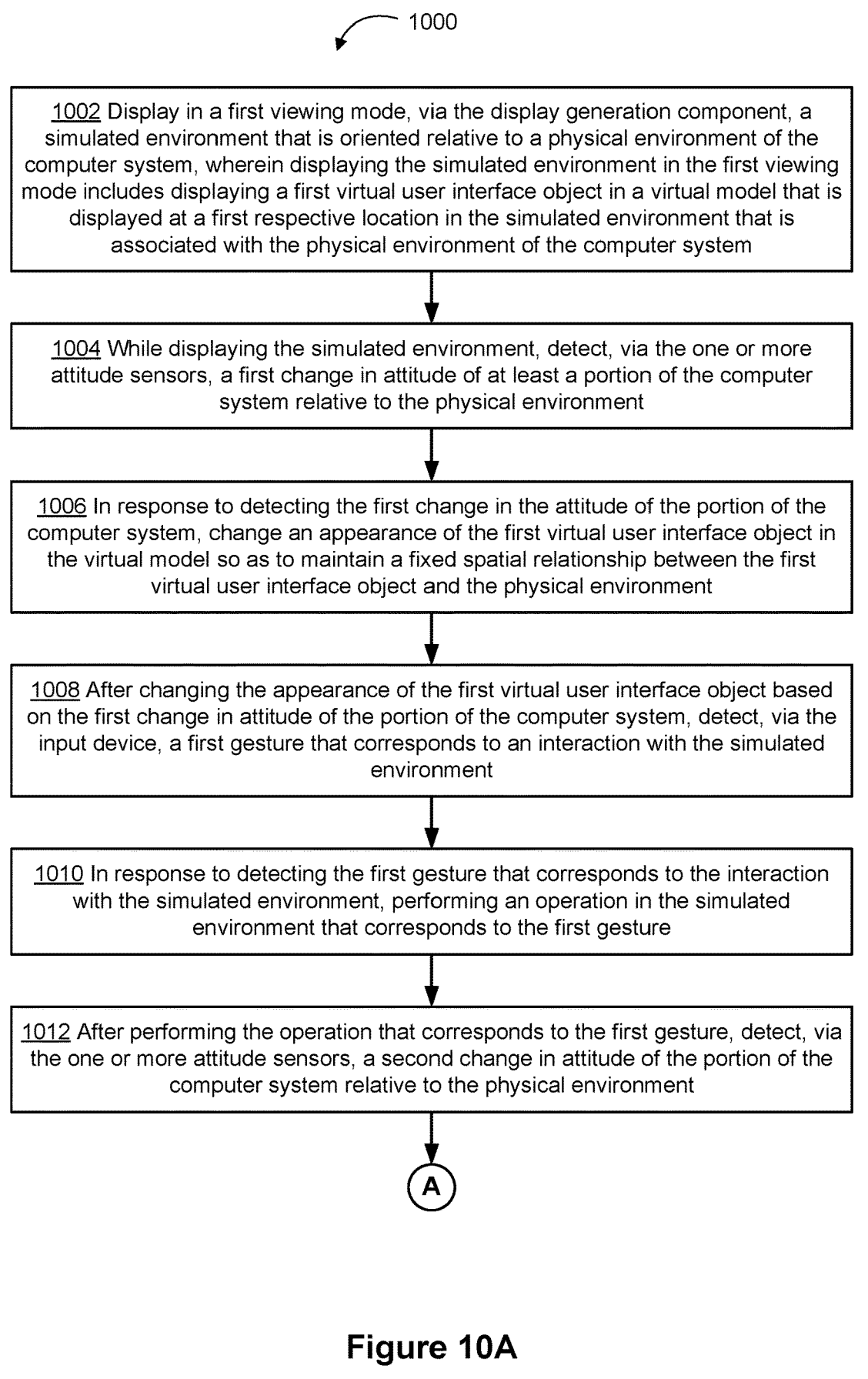

1000

1002 Display in a first viewing mode, via the display generation component, a simulated environment that is oriented relative to a physical environment of the computer system, wherein displaying the simulated environment in the first viewing mode includes displaying a first virtual user interface object in a virtual model that is displayed at a first respective location in the simulated environment that is associated with the physical environment of the computer system

↓

1004 While displaying the simulated environment, detect, via the one or more attitude sensors, a first change in attitude of at least a portion of the computer system relative to the physical environment

↓

1006 In response to detecting the first change in the attitude of the portion of the computer system, change an appearance of the first virtual user interface object in the virtual model so as to maintain a fixed spatial relationship between the first virtual user interface object and the physical environment

↓

1008 After changing the appearance of the first virtual user interface object based on the first change in attitude of the portion of the computer system, detect, via the input device, a first gesture that corresponds to an interaction with the simulated environment

↓

1010 In response to detecting the first gesture that corresponds to the interaction with the simulated environment, performing an operation in the simulated environment that corresponds to the first gesture

↓

1012 After performing the operation that corresponds to the first gesture, detect, via the one or more attitude sensors, a second change in attitude of the portion of the computer system relative to the physical environment

↓

A

Figure 10A

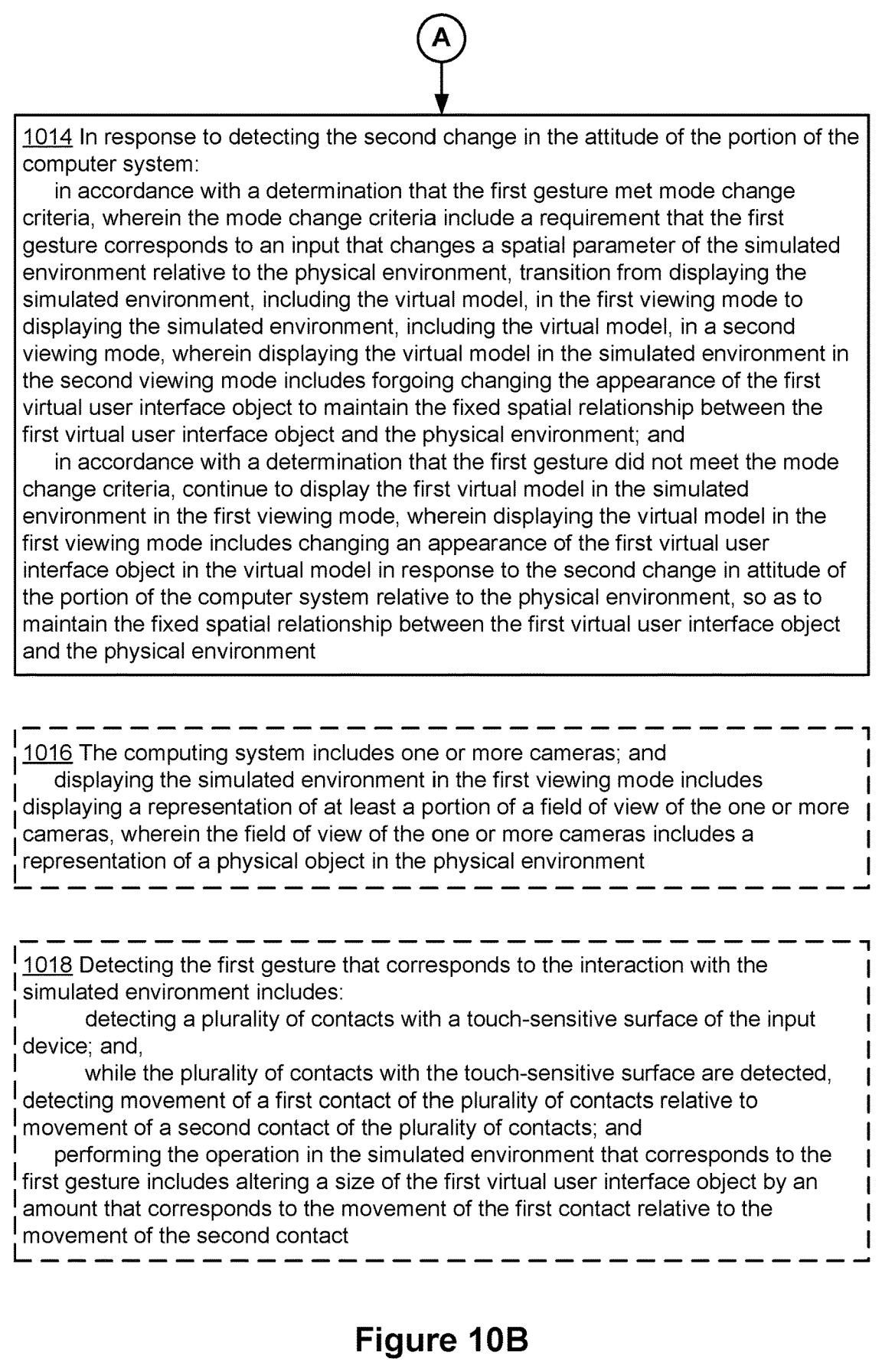

A

1014 In response to detecting the second change in the attitude of the portion of the computer system:
in accordance with a determination that the first gesture met mode change criteria, wherein the mode change criteria include a requirement that the first gesture corresponds to an input that changes a spatial parameter of the simulated environment relative to the physical environment, transition from displaying the simulated environment, including the virtual model, in the first viewing mode to displaying the simulated environment, including the virtual model, in a second viewing mode, wherein displaying the virtual model in the simulated environment in the second viewing mode includes forgoing changing the appearance of the first virtual user interface object to maintain the fixed spatial relationship between the first virtual user interface object and the physical environment; and
in accordance with a determination that the first gesture did not meet the mode change criteria, continue to display the first virtual model in the simulated environment in the first viewing mode, wherein displaying the virtual model in the first viewing mode includes changing an appearance of the first virtual user interface object in the virtual model in response to the second change in attitude of the portion of the computer system relative to the physical environment, so as to maintain the fixed spatial relationship between the first virtual user interface object and the physical environment 1016 The computing system includes one or more cameras; and
displaying the simulated environment in the first viewing mode includes displaying a representation of at least a portion of a field of view of the one or more cameras, wherein the field of view of the one or more cameras includes a representation of a physical object in the physical environment 1018 Detecting the first gesture that corresponds to the interaction with the simulated environment includes:
detecting a plurality of contacts with a touch-sensitive surface of the input device; and,
while the plurality of contacts with the touch-sensitive surface are detected, detecting movement of a first contact of the plurality of contacts relative to movement of a second contact of the plurality of contacts; and
performing the operation in the simulated environment that corresponds to the first gesture includes altering a size of the first virtual user interface object by an amount that corresponds to the movement of the first contact relative to the movement of the second contact

Figure 10B

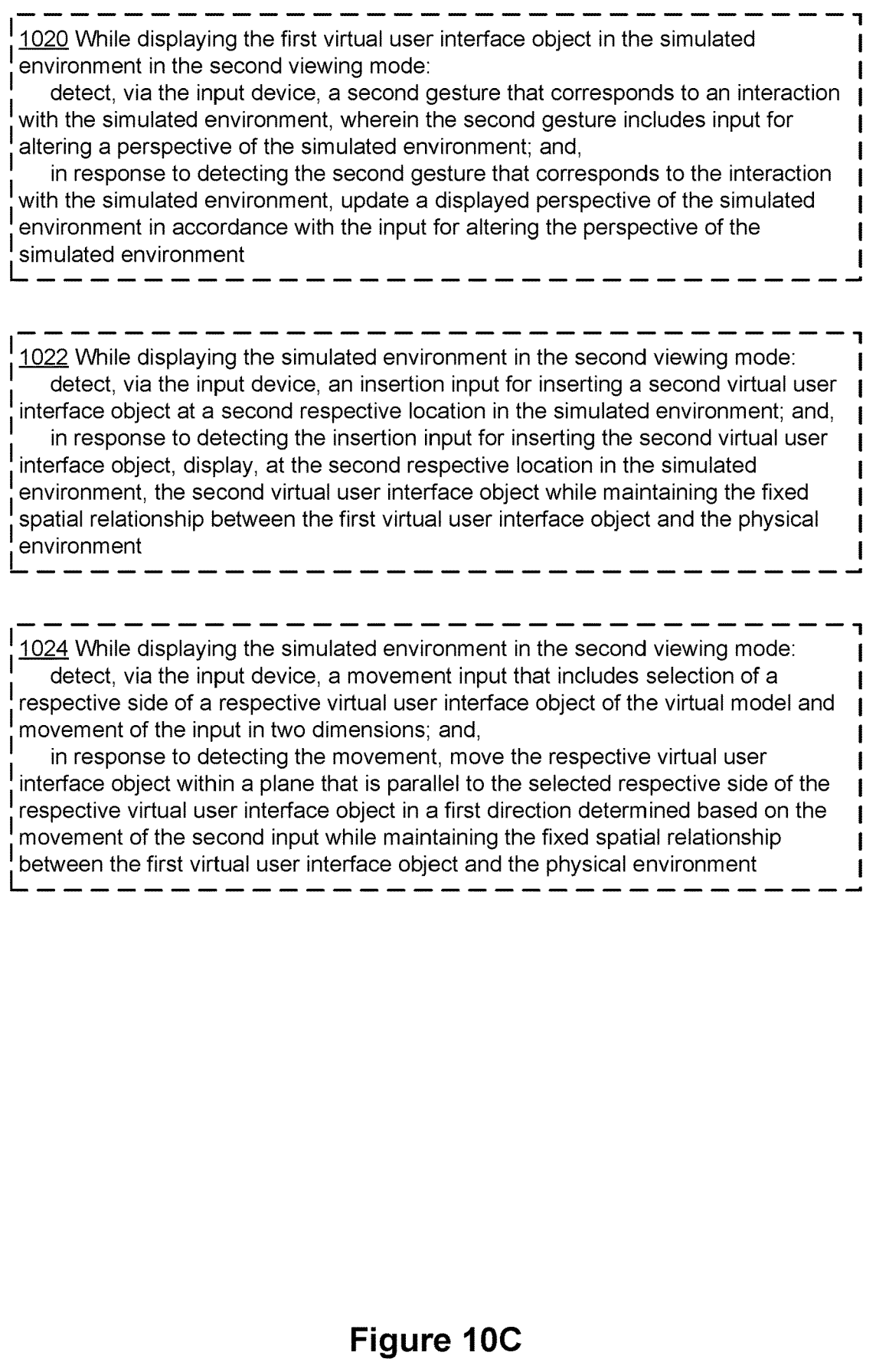

1020 While displaying the first virtual user interface object in the simulated environment in the second viewing mode:
detect, via the input device, a second gesture that corresponds to an interaction with the simulated environment, wherein the second gesture includes input for altering a perspective of the simulated environment; and,
in response to detecting the second gesture that corresponds to the interaction with the simulated environment, update a displayed perspective of the simulated environment in accordance with the input for altering the perspective of the simulated environment 1022 While displaying the simulated environment in the second viewing mode:
detect, via the input device, an insertion input for inserting a second virtual user interface object at a second respective location in the simulated environment; and,
in response to detecting the insertion input for inserting the second virtual user interface object, display, at the second respective location in the simulated environment, the second virtual user interface object while maintaining the fixed spatial relationship between the first virtual user interface object and the physical environment 1024 While displaying the simulated environment in the second viewing mode:
detect, via the input device, a movement input that includes selection of a respective side of a respective virtual user interface object of the virtual model and movement of the input in two dimensions; and,
in response to detecting the movement, move the respective virtual user interface object within a plane that is parallel to the selected respective side of the respective virtual user interface object in a first direction determined based on the movement of the second input while maintaining the fixed spatial relationship between the first virtual user interface object and the physical environment

Figure 10C

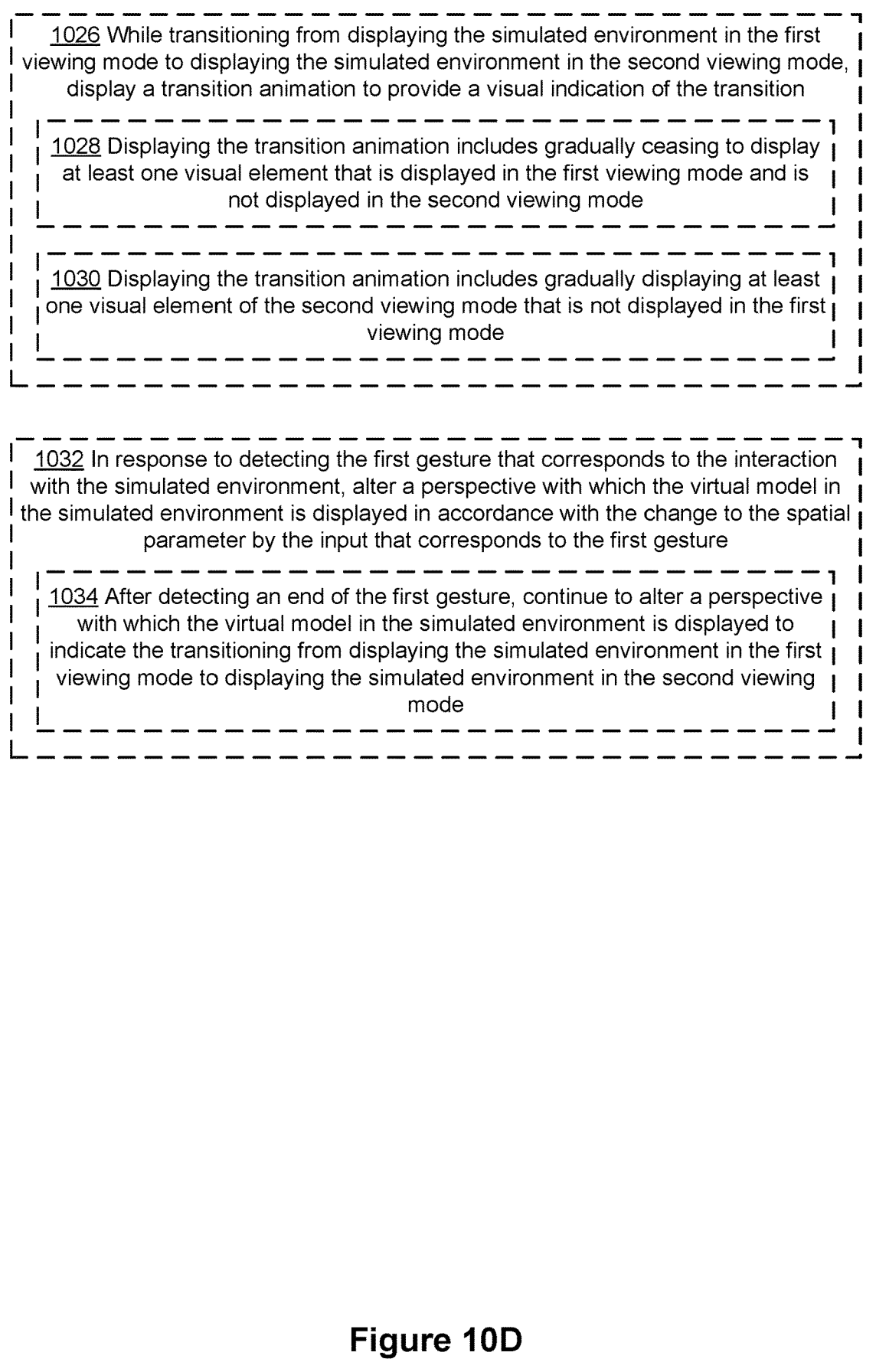

1026 While transitioning from displaying the simulated environment in the first viewing mode to displaying the simulated environment in the second viewing mode, display a transition animation to provide a visual indication of the transition 1028 Displaying the transition animation includes gradually ceasing to display at least one visual element that is displayed in the first viewing mode and is not displayed in the second viewing mode 1030 Displaying the transition animation includes gradually displaying at least one visual element of the second viewing mode that is not displayed in the first viewing mode 1032 In response to detecting the first gesture that corresponds to the interaction with the simulated environment, alter a perspective with which the virtual model in the simulated environment is displayed in accordance with the change to the spatial parameter by the input that corresponds to the first gesture 1034 After detecting an end of the first gesture, continue to alter a perspective with which the virtual model in the simulated environment is displayed to indicate the transitioning from displaying the simulated environment in the first viewing mode to displaying the simulated environment in the second viewing mode

Figure 10D

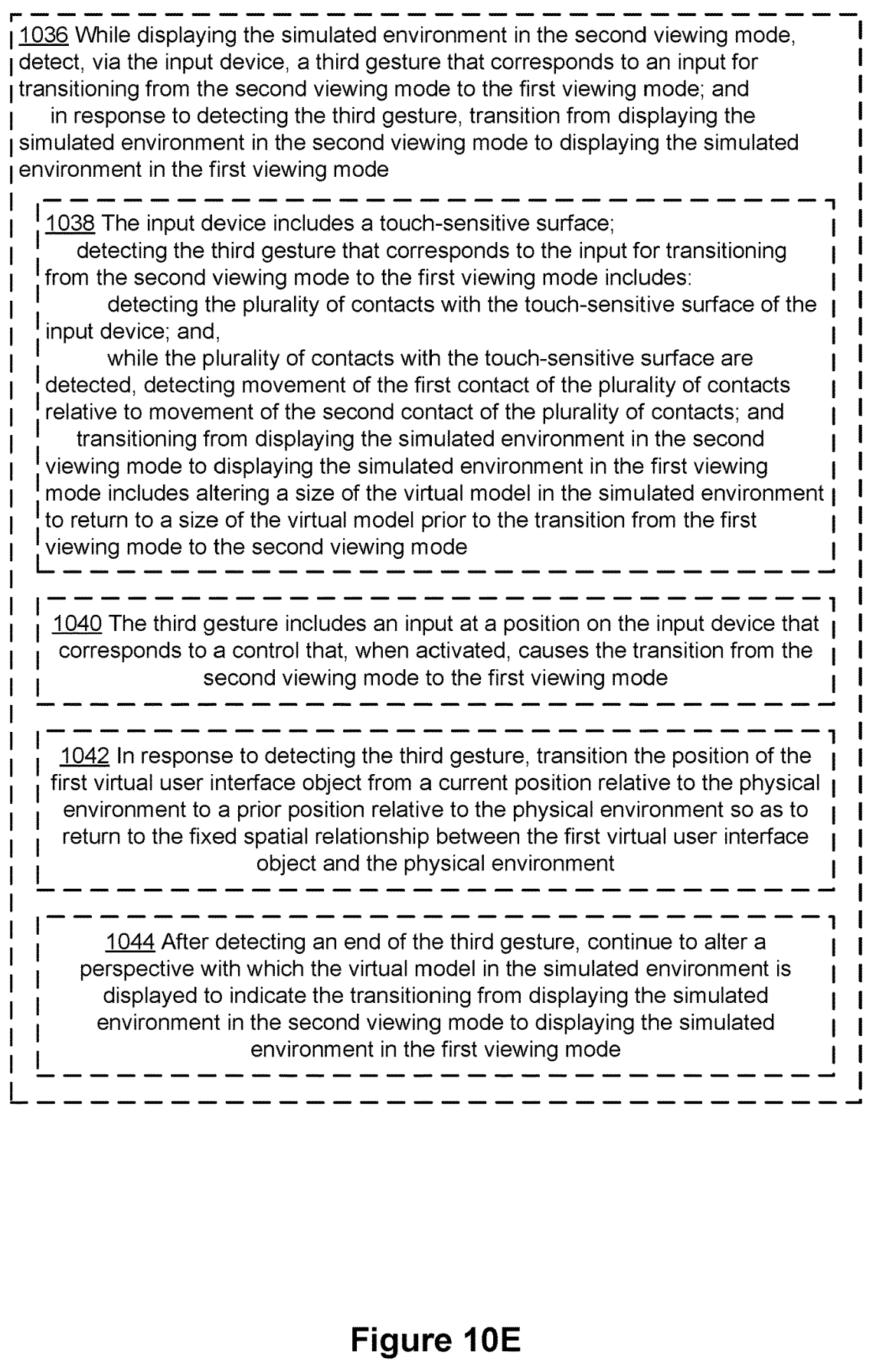

1036 While displaying the simulated environment in the second viewing mode, detect, via the input device, a third gesture that corresponds to an input for transitioning from the second viewing mode to the first viewing mode; and
in response to detecting the third gesture, transition from displaying the simulated environment in the second viewing mode to displaying the simulated environment in the first viewing mode 1038 The input device includes a touch-sensitive surface;
detecting the third gesture that corresponds to the input for transitioning from the second viewing mode to the first viewing mode includes:
detecting the plurality of contacts with the touch-sensitive surface of the input device; and,
while the plurality of contacts with the touch-sensitive surface are detected, detecting movement of the first contact of the plurality of contacts relative to movement of the second contact of the plurality of contacts; and
transitioning from displaying the simulated environment in the second viewing mode to displaying the simulated environment in the first viewing mode includes altering a size of the virtual model in the simulated environment to return to a size of the virtual model prior to the transition from the first viewing mode to the second viewing mode 1040 The third gesture includes an input at a position on the input device that corresponds to a control that, when activated, causes the transition from the second viewing mode to the first viewing mode 1042 In response to detecting the third gesture, transition the position of the first virtual user interface object from a current position relative to the physical environment to a prior position relative to the physical environment so as to return to the fixed spatial relationship between the first virtual user interface object and the physical environment 1044 After detecting an end of the third gesture, continue to alter a perspective with which the virtual model in the simulated environment is displayed to indicate the transitioning from displaying the simulated environment in the second viewing mode to displaying the simulated environment in the first viewing mode

Figure 10E

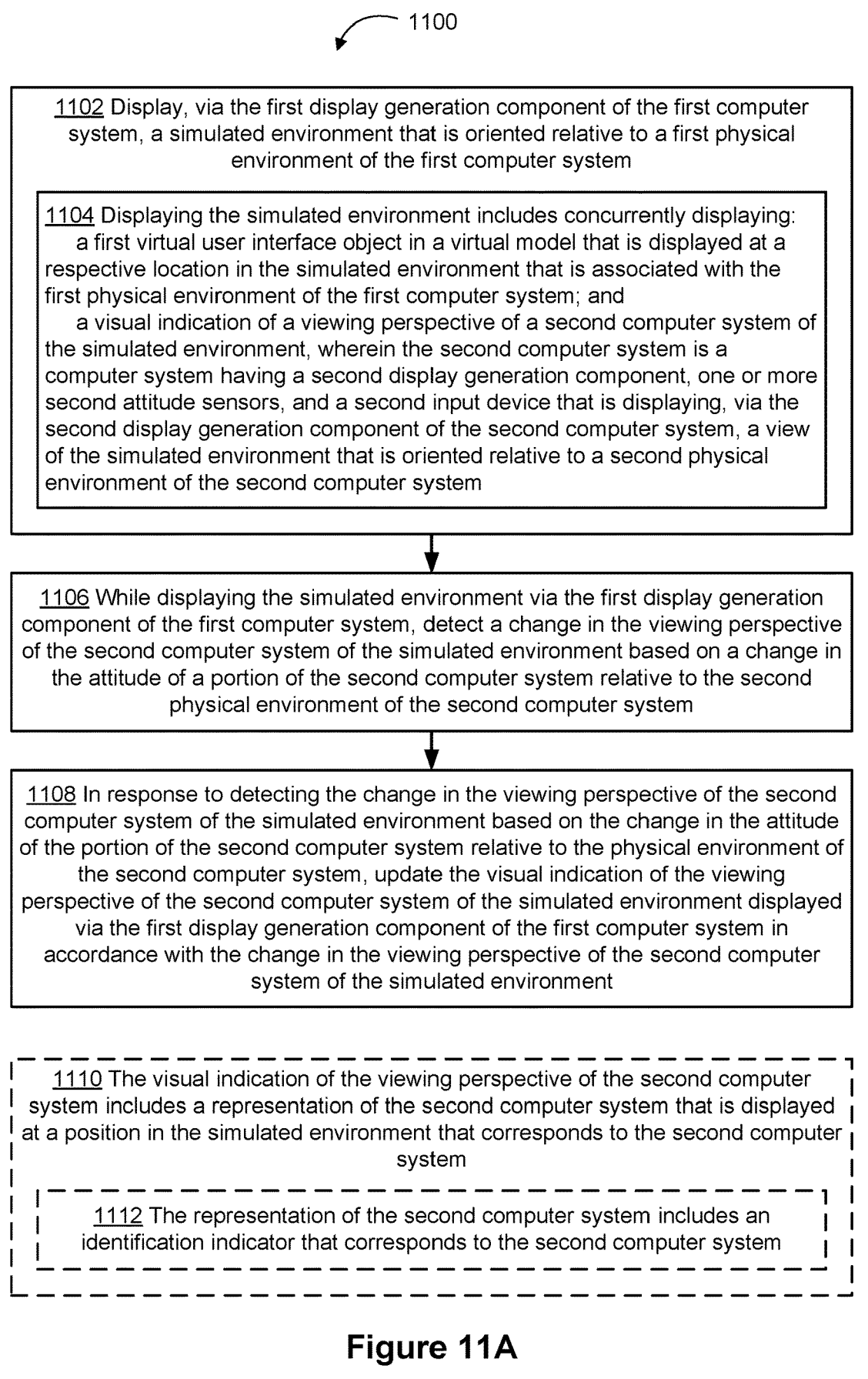

1100

1102 Display, via the first display generation component of the first computer system, a simulated environment that is oriented relative to a first physical environment of the first computer system 1104 Displaying the simulated environment includes concurrently displaying:
a first virtual user interface object in a virtual model that is displayed at a respective location in the simulated environment that is associated with the first physical environment of the first computer system; and
a visual indication of a viewing perspective of a second computer system of the simulated environment, wherein the second computer system is a computer system having a second display generation component, one or more second attitude sensors, and a second input device that is displaying, via the second display generation component of the second computer system, a view of the simulated environment that is oriented relative to a second physical environment of the second computer system 1106 While displaying the simulated environment via the first display generation component of the first computer system, detect a change in the viewing perspective of the second computer system of the simulated environment based on a change in the attitude of a portion of the second computer system relative to the second physical environment of the second computer system 1108 In response to detecting the change in the viewing perspective of the second computer system of the simulated environment based on the change in the attitude of the portion of the second computer system relative to the physical environment of the second computer system, update the visual indication of the viewing perspective of the second computer system of the simulated environment displayed via the first display generation component of the first computer system in accordance with the change in the viewing perspective of the second computer system of the simulated environment 1110 The visual indication of the viewing perspective of the second computer system includes a representation of the second computer system that is displayed at a position in the simulated environment that corresponds to the second computer system 1112 The representation of the second computer system includes an identification indicator that corresponds to the second computer system

Figure 11A

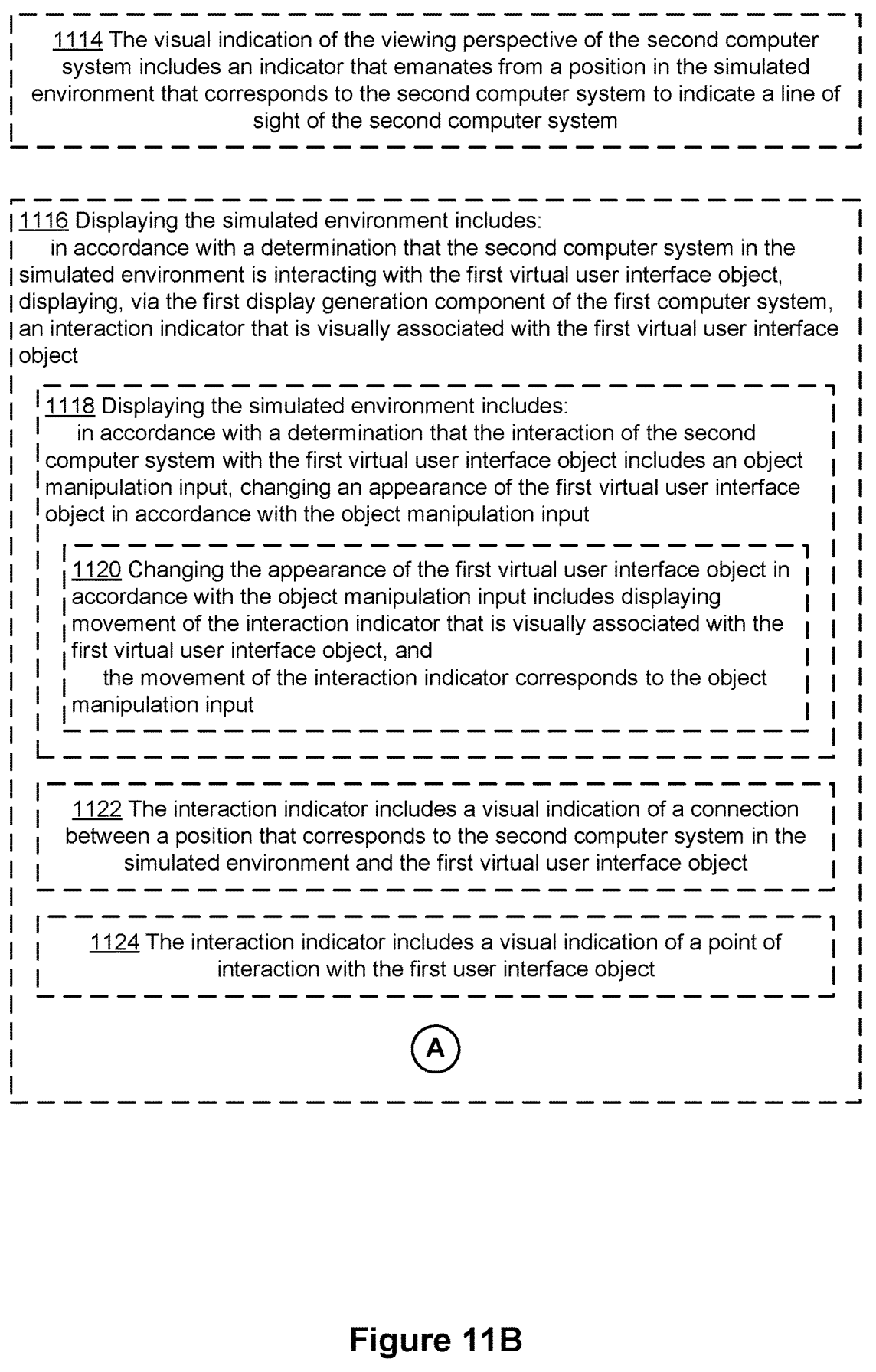

1114 The visual indication of the viewing perspective of the second computer system includes an indicator that emanates from a position in the simulated environment that corresponds to the second computer system to indicate a line of sight of the second computer system 1116 Displaying the simulated environment includes:
in accordance with a determination that the second computer system in the simulated environment is interacting with the first virtual user interface object, displaying, via the first display generation component of the first computer system, an interaction indicator that is visually associated with the first virtual user interface object 1118 Displaying the simulated environment includes:
in accordance with a determination that the interaction of the second computer system with the first virtual user interface object includes an object manipulation input, changing an appearance of the first virtual user interface object in accordance with the object manipulation input 1120 Changing the appearance of the first virtual user interface object in accordance with the object manipulation input includes displaying movement of the interaction indicator that is visually associated with the first virtual user interface object, and
the movement of the interaction indicator corresponds to the object manipulation input 1122 The interaction indicator includes a visual indication of a connection between a position that corresponds to the second computer system in the simulated environment and the first virtual user interface object 1124 The interaction indicator includes a visual indication of a point of interaction with the first user interface object

A

Figure 11B

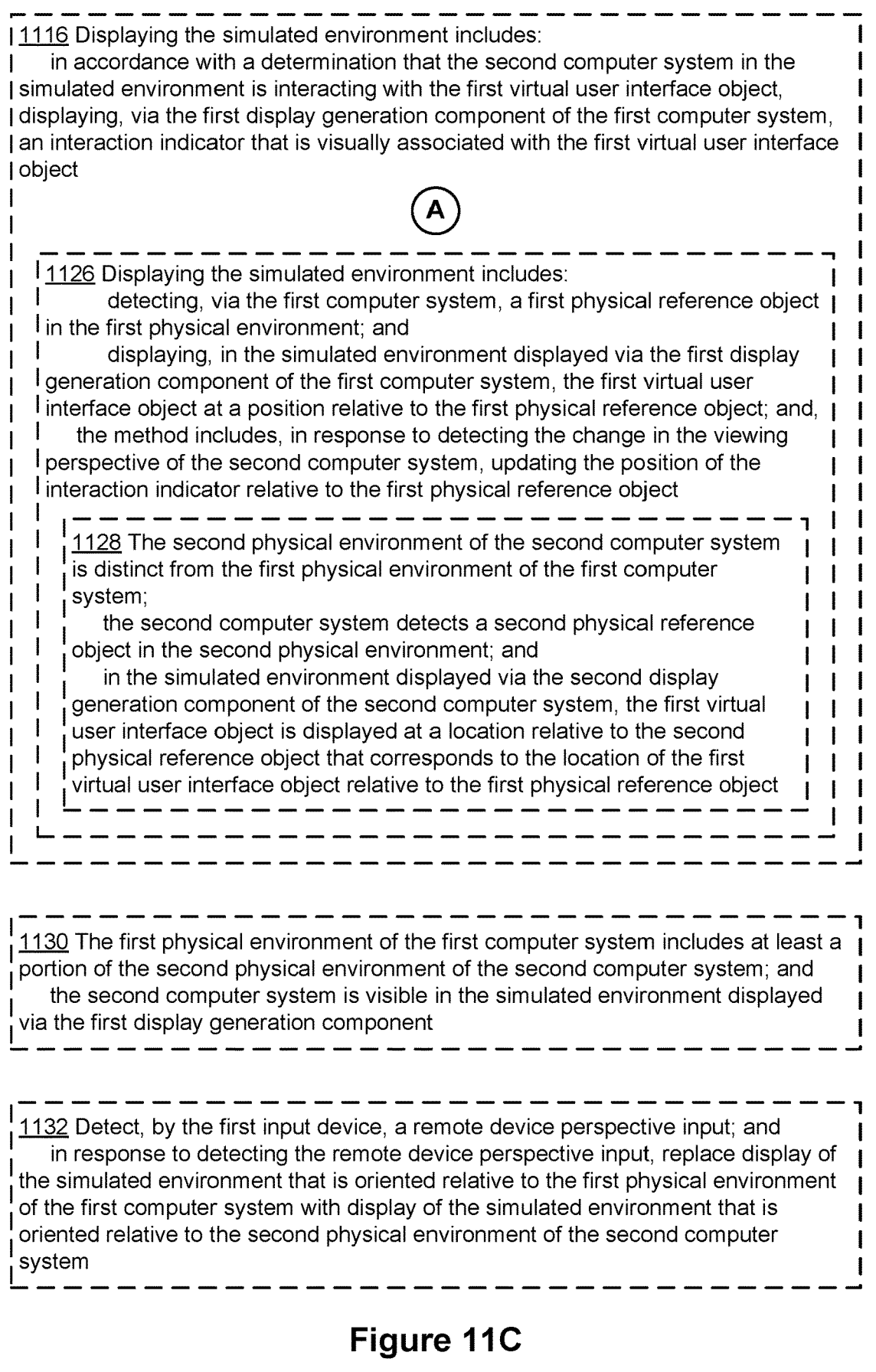

1116 Displaying the simulated environment includes:
in accordance with a determination that the second computer system in the simulated environment is interacting with the first virtual user interface object, displaying, via the first display generation component of the first computer system, an interaction indicator that is visually associated with the first virtual user interface object (A)

1126 Displaying the simulated environment includes:
detecting, via the first computer system, a first physical reference object in the first physical environment; and
displaying, in the simulated environment displayed via the first display generation component of the first computer system, the first virtual user interface object at a position relative to the first physical reference object; and,
the method includes, in response to detecting the change in the viewing perspective of the second computer system, updating the position of the interaction indicator relative to the first physical reference object 1128 The second physical environment of the second computer system is distinct from the first physical environment of the first computer system;
the second computer system detects a second physical reference object in the second physical environment; and
in the simulated environment displayed via the second display generation component of the second computer system, the first virtual user interface object is displayed at a location relative to the second physical reference object that corresponds to the location of the first virtual user interface object relative to the first physical reference object 1130 The first physical environment of the first computer system includes at least a portion of the second physical environment of the second computer system; and
the second computer system is visible in the simulated environment displayed via the first display generation component 1132 Detect, by the first input device, a remote device perspective input; and
in response to detecting the remote device perspective input, replace display of the simulated environment that is oriented relative to the first physical environment of the first computer system with display of the simulated environment that is oriented relative to the second physical environment of the second computer system

Figure 11C

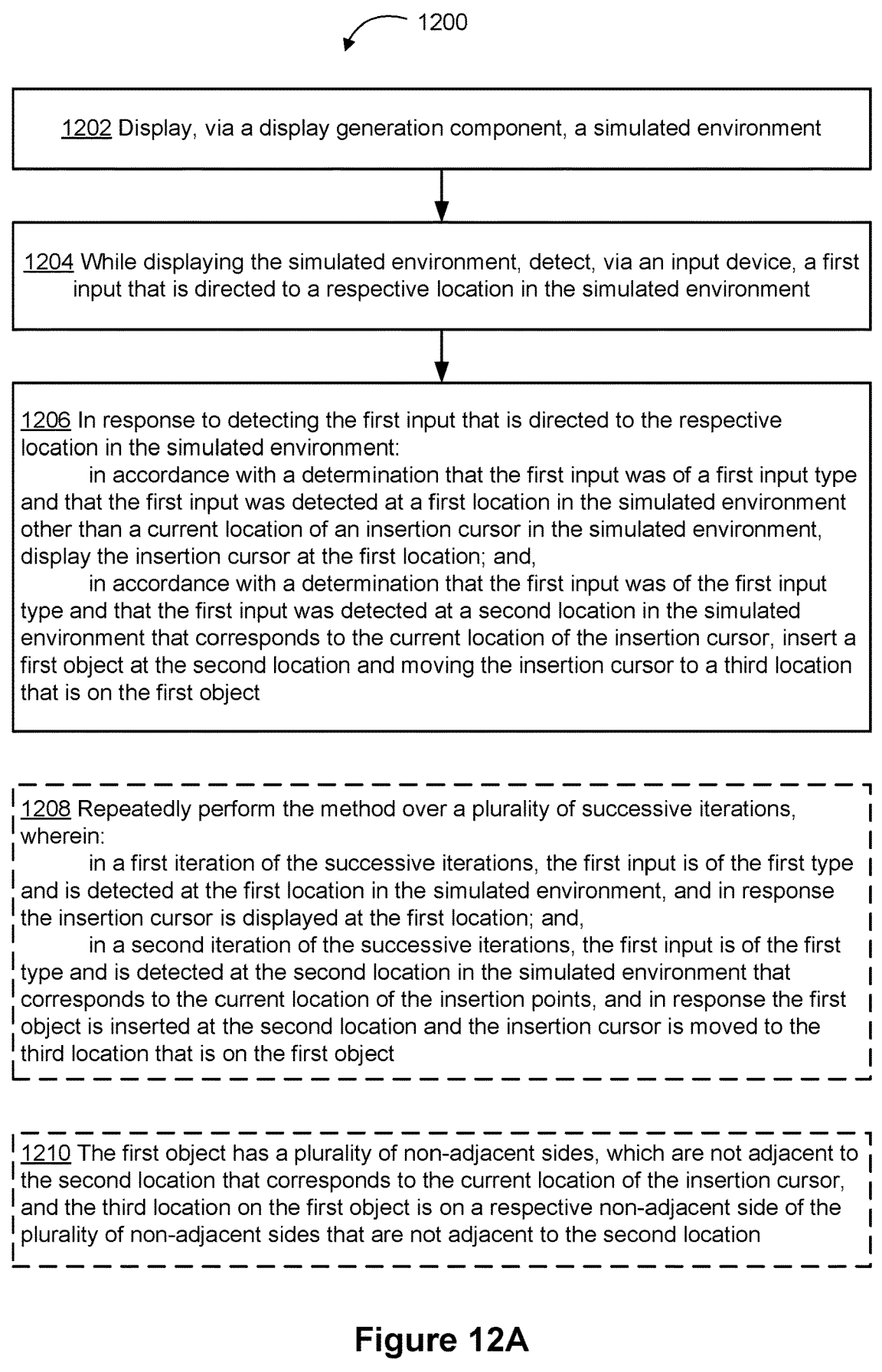

1200

1202 Display, via a display generation component, a simulated environment

↓

1204 While displaying the simulated environment, detect, via an input device, a first input that is directed to a respective location in the simulated environment

↓

1206 In response to detecting the first input that is directed to the respective location in the simulated environment:

in accordance with a determination that the first input was of a first input type and that the first input was detected at a first location in the simulated environment other than a current location of an insertion cursor in the simulated environment, display the insertion cursor at the first location; and, in accordance with a determination that the first input was of the first input type and that the first input was detected at a second location in the simulated environment that corresponds to the current location of the insertion cursor, insert a first object at the second location and moving the insertion cursor to a third location that is on the first object 1208 Repeatedly perform the method over a plurality of successive iterations, wherein:

in a first iteration of the successive iterations, the first input is of the first type and is detected at the first location in the simulated environment, and in response the insertion cursor is displayed at the first location; and, in a second iteration of the successive iterations, the first input is of the first type and is detected at the second location in the simulated environment that corresponds to the current location of the insertion points, and in response the first object is inserted at the second location and the insertion cursor is moved to the third location that is on the first object 1210 The first object has a plurality of non-adjacent sides, which are not adjacent to the second location that corresponds to the current location of the insertion cursor, and the third location on the first object is on a respective non-adjacent side of the plurality of non-adjacent sides that are not adjacent to the second location

Figure 12A

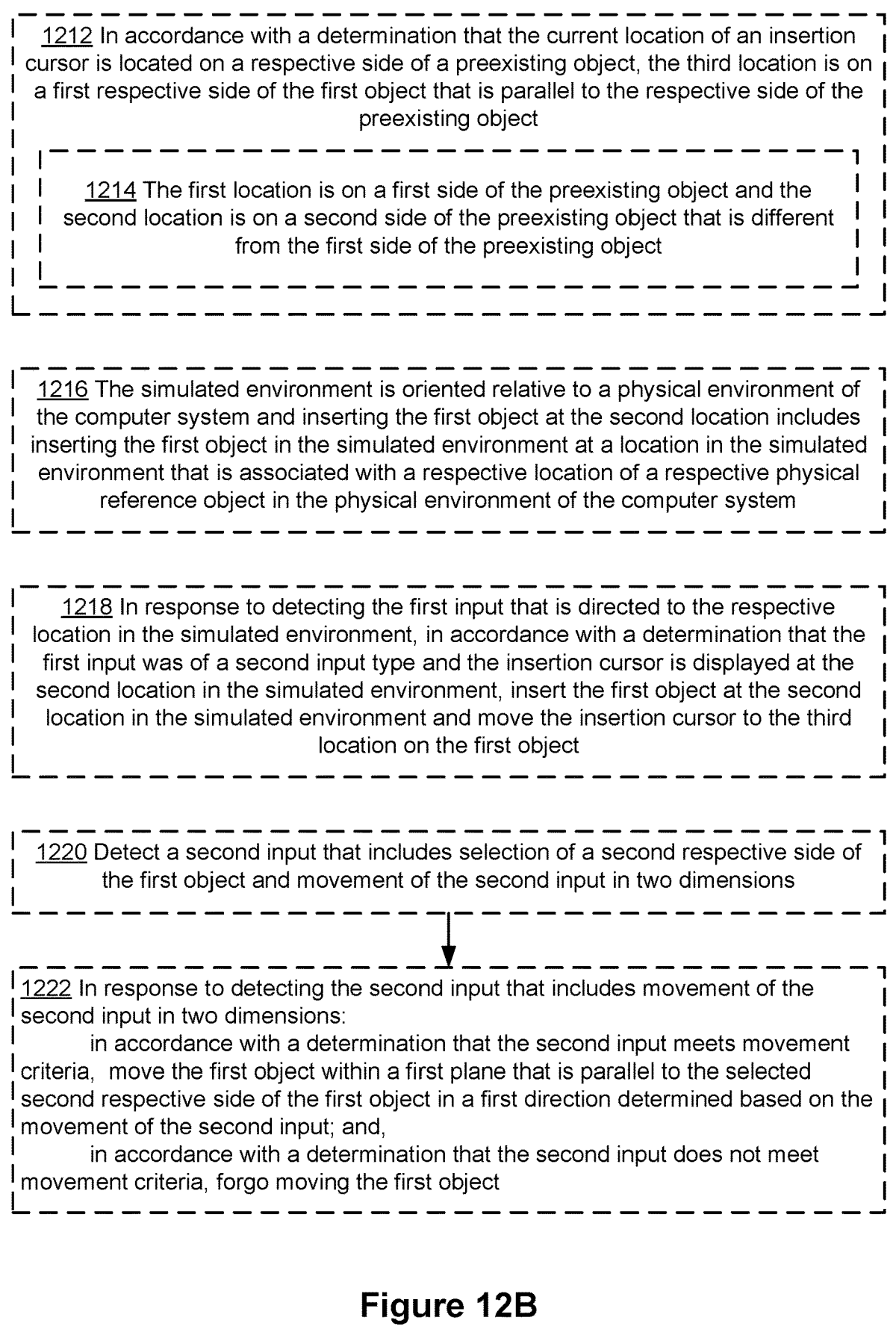

1212 In accordance with a determination that the current location of an insertion cursor is located on a respective side of a preexisting object, the third location is on a first respective side of the first object that is parallel to the respective side of the preexisting object 1214 The first location is on a first side of the preexisting object and the second location is on a second side of the preexisting object that is different from the first side of the preexisting object 1216 The simulated environment is oriented relative to a physical environment of the computer system and inserting the first object at the second location includes inserting the first object in the simulated environment at a location in the simulated environment that is associated with a respective location of a respective physical reference object in the physical environment of the computer system 1218 In response to detecting the first input that is directed to the respective location in the simulated environment, in accordance with a determination that the first input was of a second input type and the insertion cursor is displayed at the second location in the simulated environment, insert the first object at the second location in the simulated environment and move the insertion cursor to the third location on the first object 1220 Detect a second input that includes selection of a second respective side of the first object and movement of the second input in two dimensions

↓

1222 In response to detecting the second input that includes movement of the second input in two dimensions:

in accordance with a determination that the second input meets movement criteria, move the first object within a first plane that is parallel to the selected second respective side of the first object in a first direction determined based on the movement of the second input; and, in accordance with a determination that the second input does not meet movement criteria, forgo moving the first object

Figure 12B

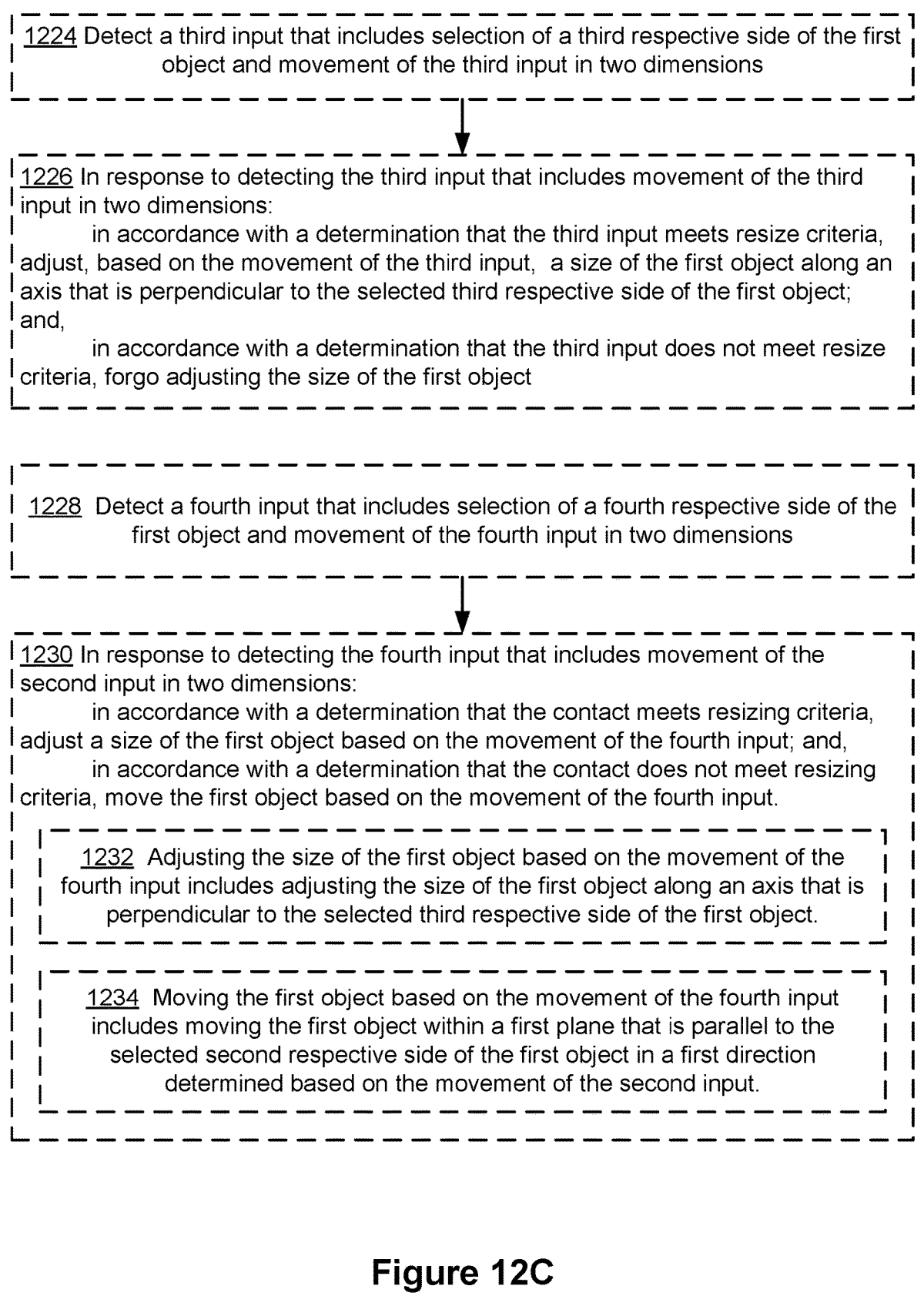

1224 Detect a third input that includes selection of a third respective side of the first object and movement of the third input in two dimensions

↓

1226 In response to detecting the third input that includes movement of the third input in two dimensions:

in accordance with a determination that the third input meets resize criteria, adjust, based on the movement of the third input, a size of the first object along an axis that is perpendicular to the selected third respective side of the first object; and, in accordance with a determination that the third input does not meet resize criteria, forgo adjusting the size of the first object 1228 Detect a fourth input that includes selection of a fourth respective side of the first object and movement of the fourth input in two dimensions

↓

1230 In response to detecting the fourth input that includes movement of the second input in two dimensions:

in accordance with a determination that the contact meets resizing criteria, adjust a size of the first object based on the movement of the fourth input; and, in accordance with a determination that the contact does not meet resizing criteria, move the first object based on the movement of the fourth input.

1232 Adjusting the size of the first object based on the movement of the fourth input includes adjusting the size of the first object along an axis that is perpendicular to the selected third respective side of the first object.

1234 Moving the first object based on the movement of the fourth input includes moving the first object within a first plane that is parallel to the selected second respective side of the first object in a first direction determined based on the movement of the second input.

Figure 12C

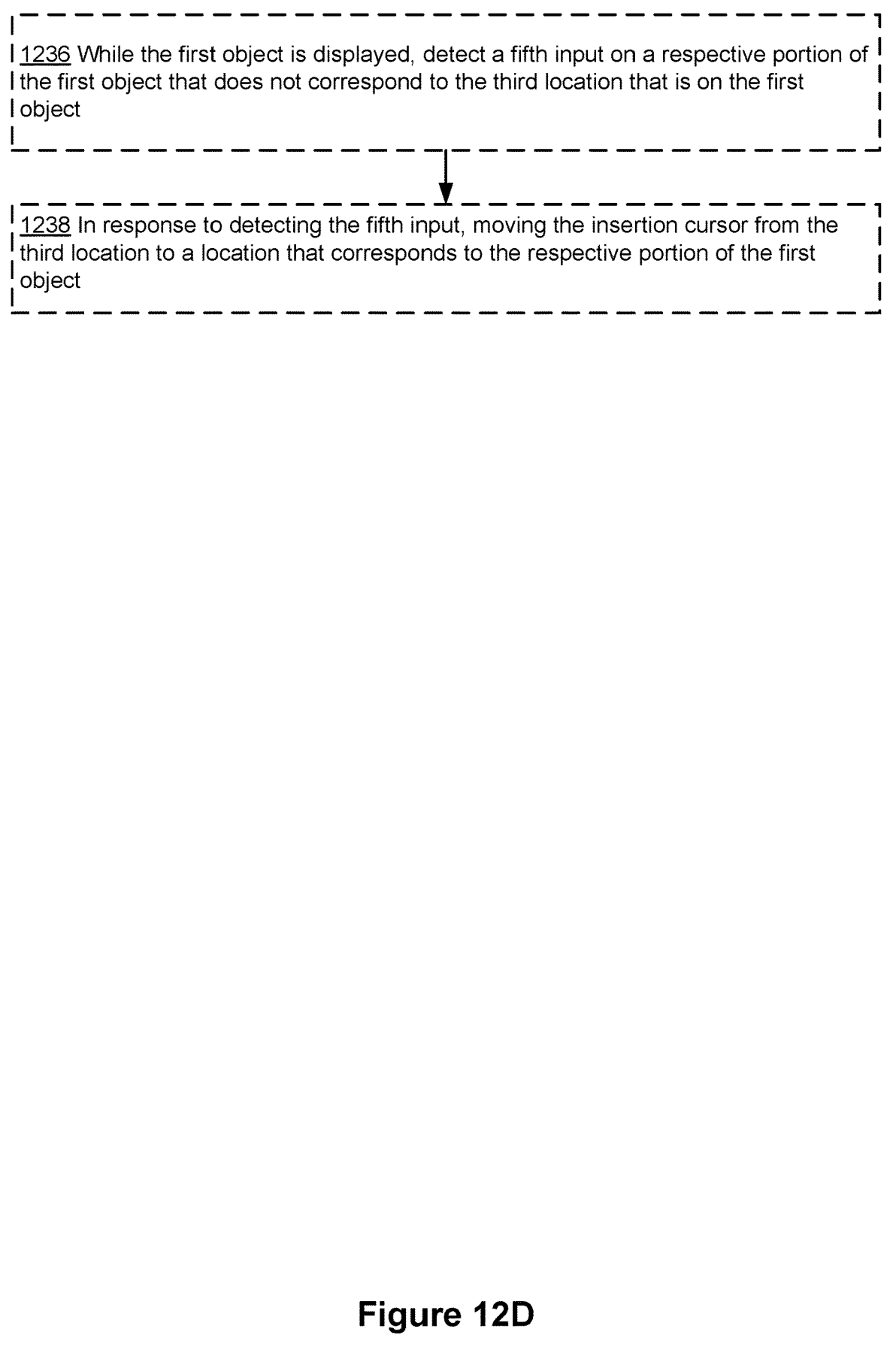

1236 While the first object is displayed, detect a fifth input on a respective portion of the first object that does not correspond to the third location that is on the first object

↓

1238 In response to detecting the fifth input, moving the insertion cursor from the third location to a location that corresponds to the respective portion of the first object

Figure 12D

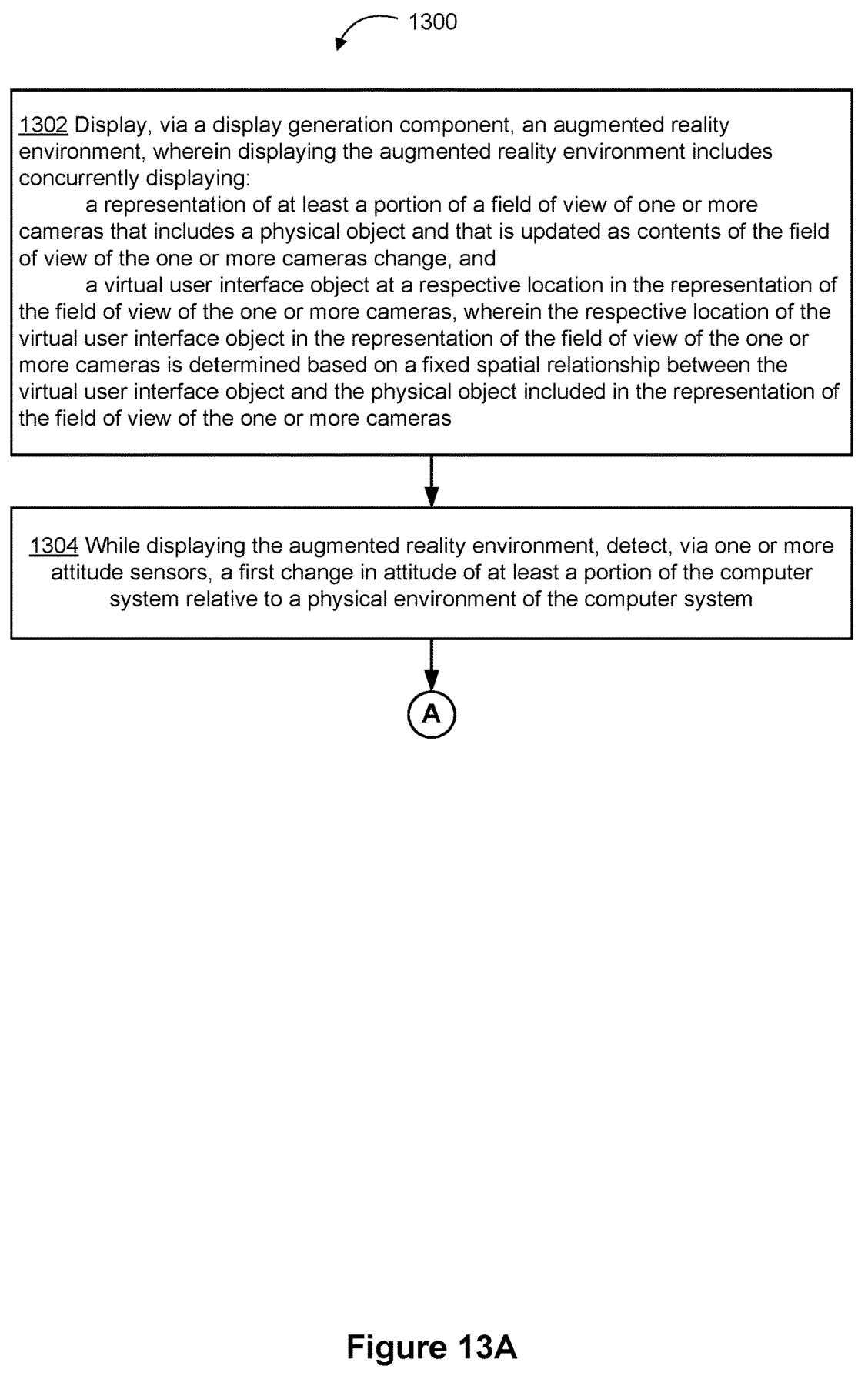

1300

1302 Display, via a display generation component, an augmented reality environment, wherein displaying the augmented reality environment includes concurrently displaying:

a representation of at least a portion of a field of view of one or more cameras that includes a physical object and that is updated as contents of the field of view of the one or more cameras change, and a virtual user interface object at a respective location in the representation of the field of view of the one or more cameras, wherein the respective location of the virtual user interface object in the representation of the field of view of the one or more cameras is determined based on a fixed spatial relationship between the virtual user interface object and the physical object included in the representation of the field of view of the one or more cameras

↓

1304 While displaying the augmented reality environment, detect, via one or more attitude sensors, a first change in attitude of at least a portion of the computer system relative to a physical environment of the computer system

↓

(A)

Figure 13A

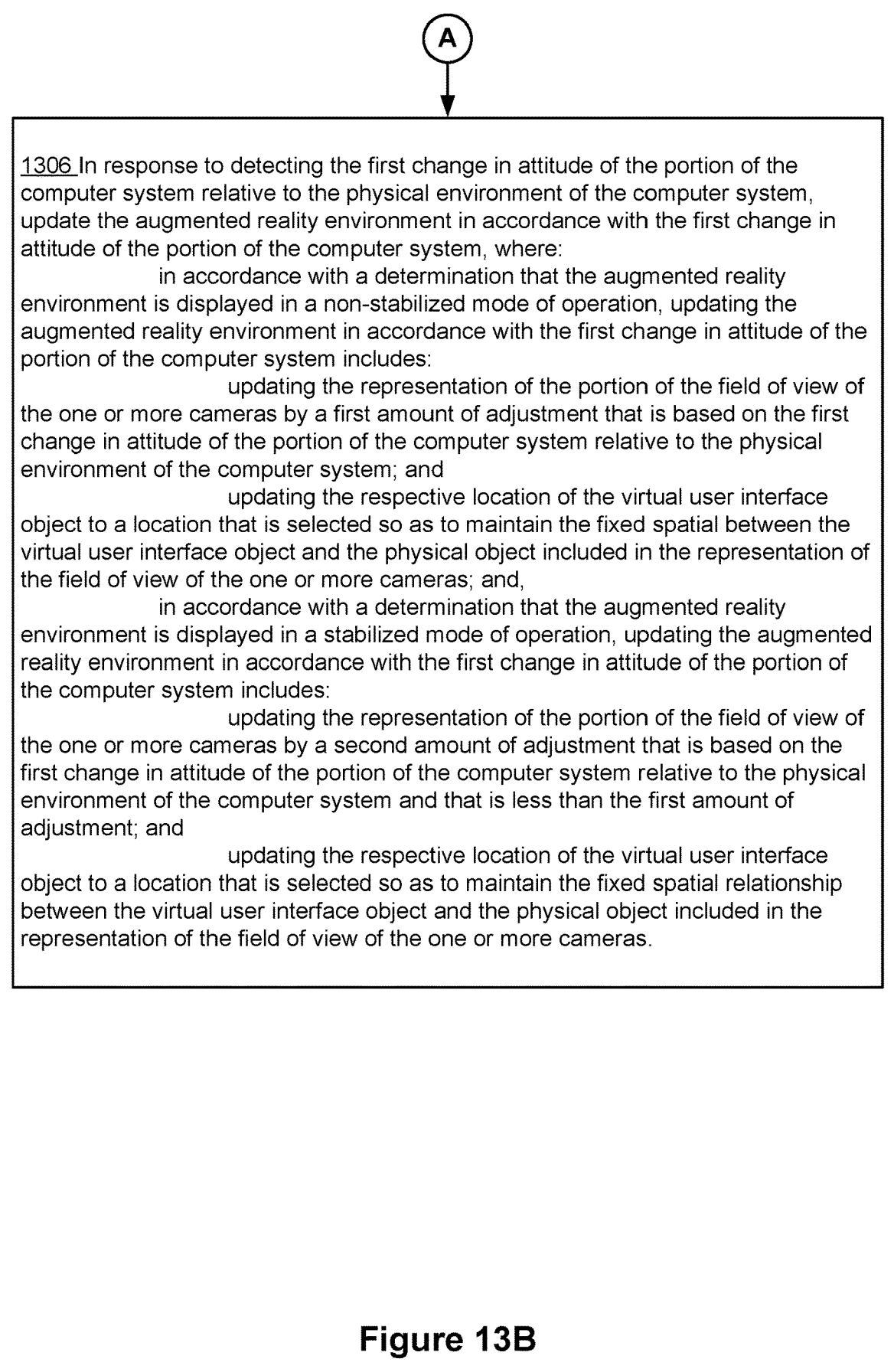

A

1306 In response to detecting the first change in attitude of the portion of the computer system relative to the physical environment of the computer system, update the augmented reality environment in accordance with the first change in attitude of the portion of the computer system, where:

in accordance with a determination that the augmented reality environment is displayed in a non-stabilized mode of operation, updating the augmented reality environment in accordance with the first change in attitude of the portion of the computer system includes:

updating the representation of the portion of the field of view of the one or more cameras by a first amount of adjustment that is based on the first change in attitude of the portion of the computer system relative to the physical environment of the computer system; and updating the respective location of the virtual user interface object to a location that is selected so as to maintain the fixed spatial between the virtual user interface object and the physical object included in the representation of the field of view of the one or more cameras; and, in accordance with a determination that the augmented reality environment is displayed in a stabilized mode of operation, updating the augmented reality environment in accordance with the first change in attitude of the portion of the computer system includes:

updating the representation of the portion of the field of view of the one or more cameras by a second amount of adjustment that is based on the first change in attitude of the portion of the computer system relative to the physical environment of the computer system and that is less than the first amount of adjustment; and updating the respective location of the virtual user interface object to a location that is selected so as to maintain the fixed spatial relationship between the virtual user interface object and the physical object included in the representation of the field of view of the one or more cameras.

Figure 13B

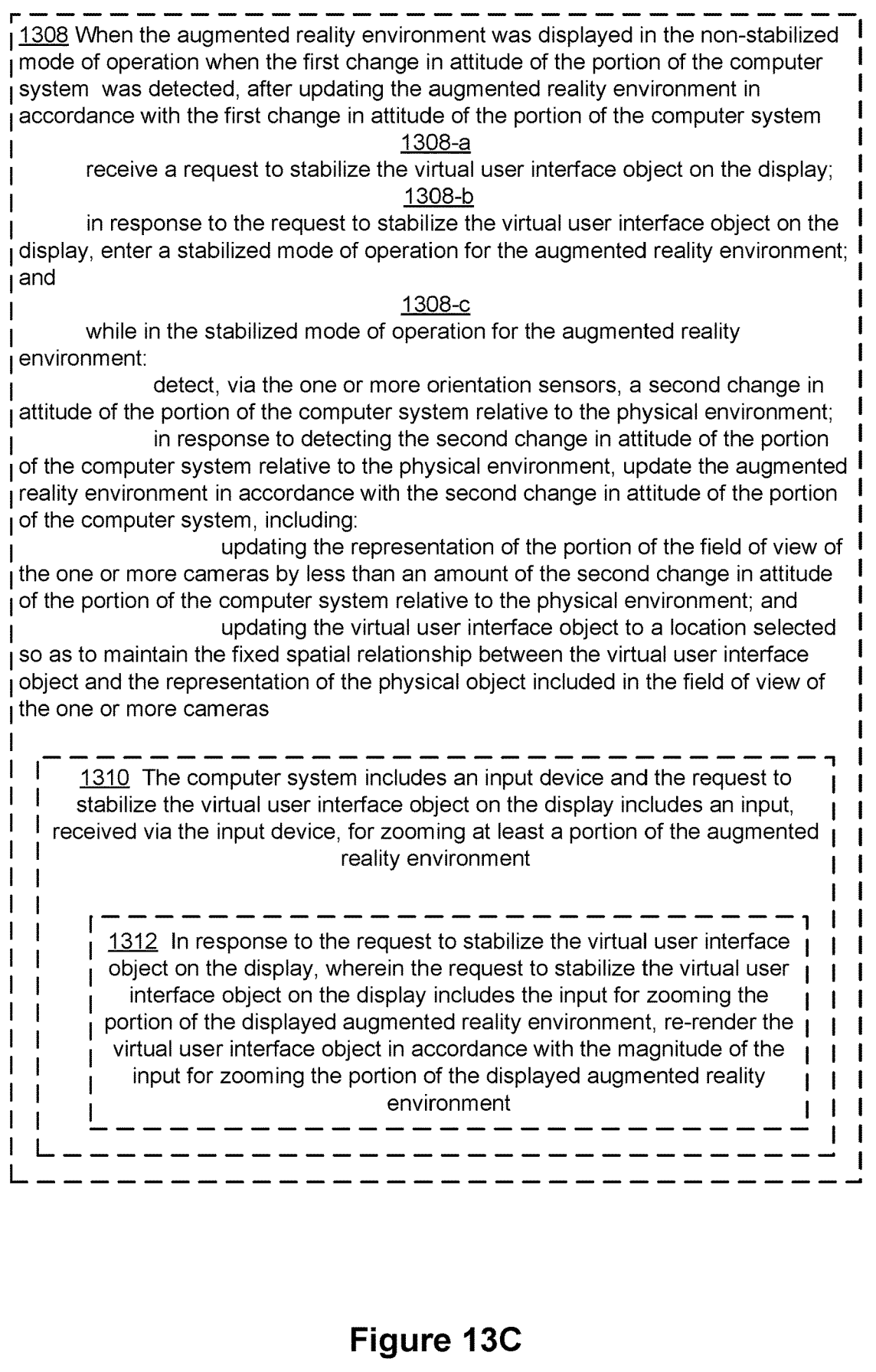

1308 When the augmented reality environment was displayed in the non-stabilized mode of operation when the first change in attitude of the portion of the computer system was detected, after updating the augmented reality environment in accordance with the first change in attitude of the portion of the computer system 1308-a receive a request to stabilize the virtual user interface object on the display;

1308-b in response to the request to stabilize the virtual user interface object on the display, enter a stabilized mode of operation for the augmented reality environment; and 1308-c while in the stabilized mode of operation for the augmented reality environment:

detect, via the one or more orientation sensors, a second change in attitude of the portion of the computer system relative to the physical environment;

in response to detecting the second change in attitude of the portion of the computer system relative to the physical environment, update the augmented reality environment in accordance with the second change in attitude of the portion of the computer system, including:

updating the representation of the portion of the field of view of the one or more cameras by less than an amount of the second change in attitude of the portion of the computer system relative to the physical environment; and updating the virtual user interface object to a location selected so as to maintain the fixed spatial relationship between the virtual user interface object and the representation of the physical object included in the field of view of the one or more cameras 1310 The computer system includes an input device and the request to stabilize the virtual user interface object on the display includes an input, received via the input device, for zooming at least a portion of the augmented reality environment 1312 In response to the request to stabilize the virtual user interface object on the display, wherein the request to stabilize the virtual user interface object on the display includes the input for zooming the portion of the displayed augmented reality environment, re-render the virtual user interface object in accordance with the magnitude of the input for zooming the portion of the displayed augmented reality environment

Figure 13C

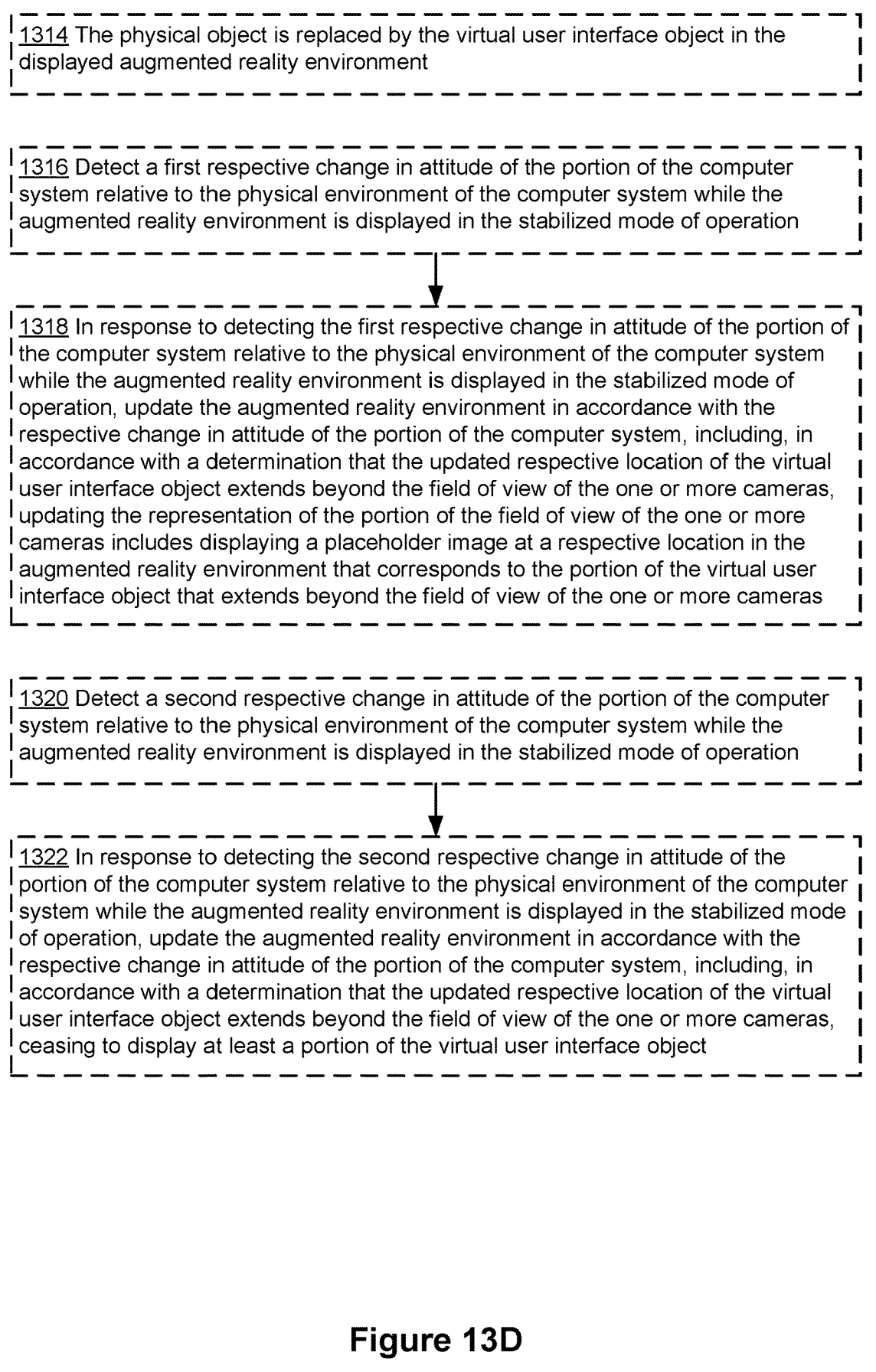

1314 The physical object is replaced by the virtual user interface object in the displayed augmented reality environment 1316 Detect a first respective change in attitude of the portion of the computer system relative to the physical environment of the computer system while the augmented reality environment is displayed in the stabilized mode of operation

↓

1318 In response to detecting the first respective change in attitude of the portion of the computer system relative to the physical environment of the computer system while the augmented reality environment is displayed in the stabilized mode of operation, update the augmented reality environment in accordance with the respective change in attitude of the portion of the computer system, including, in accordance with a determination that the updated respective location of the virtual user interface object extends beyond the field of view of the one or more cameras, updating the representation of the portion of the field of view of the one or more cameras includes displaying a placeholder image at a respective location in the augmented reality environment that corresponds to the portion of the virtual user interface object that extends beyond the field of view of the one or more cameras 1320 Detect a second respective change in attitude of the portion of the computer system relative to the physical environment of the computer system while the augmented reality environment is displayed in the stabilized mode of operation

↓

1322 In response to detecting the second respective change in attitude of the portion of the computer system relative to the physical environment of the computer system while the augmented reality environment is displayed in the stabilized mode of operation, update the augmented reality environment in accordance with the respective change in attitude of the portion of the computer system, including, in accordance with a determination that the updated respective location of the virtual user interface object extends beyond the field of view of the one or more cameras, ceasing to display at least a portion of the virtual user interface object

Figure 13D

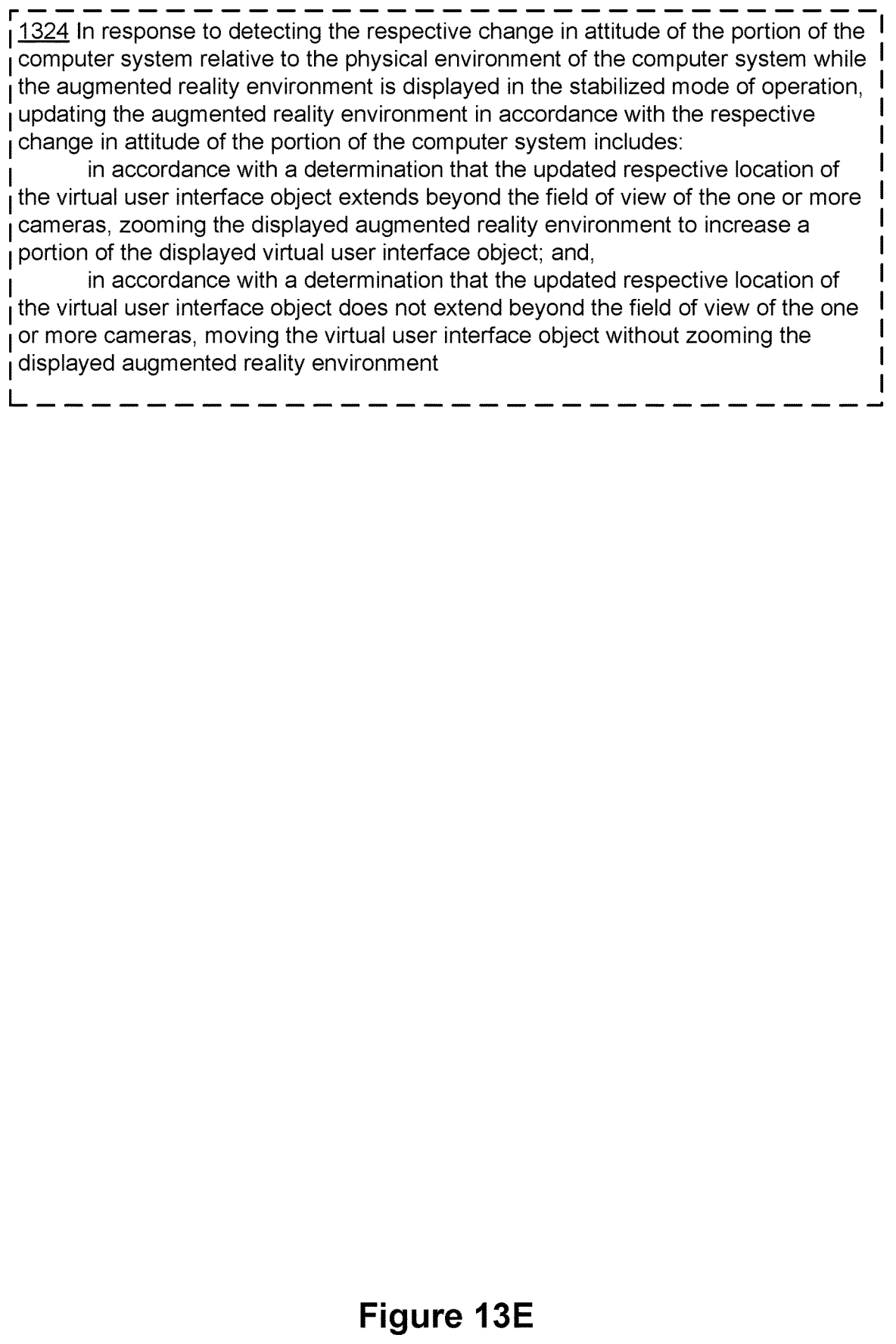

1324 In response to detecting the respective change in attitude of the portion of the computer system relative to the physical environment of the computer system while the augmented reality environment is displayed in the stabilized mode of operation, updating the augmented reality environment in accordance with the respective change in attitude of the portion of the computer system includes:

in accordance with a determination that the updated respective location of the virtual user interface object extends beyond the field of view of the one or more cameras, zooming the displayed augmented reality environment to increase a portion of the displayed virtual user interface object; and, in accordance with a determination that the updated respective location of the virtual user interface object does not extend beyond the field of view of the one or more cameras, moving the virtual user interface object without zooming the displayed augmented reality environment

Figure 13E

SYSTEMS, METHODS, AND GRAPHICAL USER INTERFACES FOR INTERACTING WITH AUGMENTED AND VIRTUAL REALITY ENVIRONMENTS

RELATED APPLICATIONS

This application is a continuation of U.S. patent application Ser. No. 17/488,191, filed Sep. 28, 2021, which is a continuation of U.S. patent application Ser. No. 16/116,276, filed Aug. 29, 2018, now U.S. Pat. No. 11,163,417, which claims priority to Provisional Patent Application No. 62/564,984, filed Sep. 28, 2017, and U.S. Provisional Patent Application No. 62/553,063, filed Aug. 31, 2017, each of which is hereby incorporated by reference in its entirety.

TECHNICAL FIELD

This relates generally to computer systems for virtual/augmented reality, including but not limited to electronic devices for interacting with augmented and virtual reality environments.

BACKGROUND

The development of computer systems for virtual/augmented reality has increased significantly in recent years. Example virtual/augmented reality environments include at least some virtual elements that replace or augment the physical world. Input devices, such as touch-sensitive surfaces, for computer systems and other electronic computing devices are used to interact with virtual/augmented reality environments. Example touch-sensitive surfaces include touchpads, touch-sensitive remote controls, and touch-screen displays. Such surfaces are used to manipulate user interfaces and objects therein on a display. Example user interface objects include digital images, video, text, icons, and control elements such as buttons and other graphics.

But methods and interfaces for interacting with environments that include at least some virtual elements (e.g., augmented reality environments, mixed reality environments, and virtual reality environments) are cumbersome, inefficient, and limited. For example, using a sequence of inputs to select one or more user interface objects (e.g., one or more virtual elements in the virtual/augmented reality environment) and perform one or more actions on the selected user interface objects is tedious, creates a significant cognitive burden on a user, and detracts from the experience with the virtual/augmented reality environment. In addition, these methods take longer than necessary, thereby wasting energy. This latter consideration is particularly important in battery-operated devices.

SUMMARY

Accordingly, there is a need for computer systems with improved methods and interfaces for interacting with augmented and virtual reality environments. Such methods and interfaces optionally complement or replace conventional methods for interacting with augmented and virtual reality environments. Such methods and interfaces reduce the number, extent, and/or nature of the inputs from a user and produce a more efficient human-machine interface. For battery-operated devices, such methods and interfaces conserve power and increase the time between battery charges.

The above deficiencies and other problems associated with user interfaces for virtual/augmented reality are reduced or eliminated by the disclosed computer systems. In some embodiments, the computer system includes a desktop computer. In some embodiments, the computer system is portable (e.g., a notebook computer, tablet computer, or handheld device). In some embodiments, the computer system includes a personal electronic device (e.g., a wearable electronic device, such as a watch). In some embodiments, the computer system has (and/or is in communication with) a touchpad. In some embodiments, the computer system has (and/or is in communication with) a touch-sensitive display (also known as a "touch screen" or "touch-screen display"). In some embodiments, the computer system has a graphical user interface (GUI), one or more processors, memory and one or more modules, programs or sets of instructions stored in the memory for performing multiple functions. In some embodiments, the user interacts with the GUI in part through stylus and/or finger contacts and gestures on the touch-sensitive surface. In some embodiments, the functions optionally include game playing, image editing, drawing, presenting, word processing, spreadsheet making, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In accordance with some embodiments, a method is performed at a computer system having a display generation component, one or more cameras, and an input device. The method includes displaying, via the display generation component, an augmented reality environment. Displaying the augmented reality environment includes concurrently displaying: a representation of at least a portion of a field of view of the one or more cameras that includes a respective physical object, wherein the representation is updated as contents of the field of view of the one or more cameras change; and a respective virtual user interface object at a respective location in the representation of the field of view of the one or more cameras, wherein the respective virtual user interface object has a location that is determined based on the respective physical object in the field of view of the one or more cameras. The method also includes, while displaying the augmented reality environment, detecting an input at a location that corresponds to the respective virtual user interface object. The method further includes, while continuing to detect the input: detecting movement of the input relative to the respective physical object in the field of view of the one or more cameras; and, in response to detecting the movement of the input relative to the respective physical object in the field of view of the one or more cameras, adjusting an appearance of the respective virtual user interface object in accordance with a magnitude of movement of the input relative to the respective physical object.

In accordance with some embodiments, a method is performed at a computer system having a display generation component, one or more cameras, and an input device. The method includes displaying, via the display generation component, an augmented reality environment. Displaying the augmented reality environment includes concurrently displaying: a representation of at least a portion of a field of view of the one or more cameras that includes a respective physical object, wherein the representation is updated as contents of the field of view of the one or more cameras change; and a respective virtual user interface object at a respective location in the representation of the field of view of the one or more cameras, wherein the respective virtual user interface object has a location that is determined based on the respective physical object in the field of view of the one or more cameras. The method also includes, while displaying the augmented reality environment, detecting an input that changes a virtual environment setting for the augmented reality environment. The method further includes, in response to detecting the input that changes the virtual environment setting: adjusting an appearance of the respective virtual user interface object in accordance with the change made to the virtual environment setting for the augmented reality environment; and applying a filter to at least a portion of the representation of the field of view of the one or more cameras, wherein the filter is selected based on the change made to the virtual environment setting.

In accordance with some embodiments, a method is performed at a computer system having a display generation component, one or more cameras, and an input device. The method includes displaying, via the display generation component, an augmented reality environment. Displaying the augmented reality environment includes concurrently displaying: a representation of at least a portion of a field of view of the one or more cameras that includes a respective physical object, wherein the representation is updated as contents of the field of view of the one or more cameras change; and a first virtual user interface object in a virtual model that is displayed at a respective location in the representation of the field of view of the one or more cameras, wherein the first virtual user interface object has a location that is determined based on the respective physical object in the field of view of the one or more cameras. The method also includes, while displaying the augmented reality environment, detecting a first input that corresponds to selection of the first virtual user interface object; and, in response to detecting the first input that corresponds to selection of the first virtual user interface object, displaying a simulated field of view of the virtual model from a perspective of the first virtual user interface object in the virtual model.

In accordance with some embodiments, a method is performed at a computer system with a display generation component and an input device. The method includes displaying, via the display generation component, a first virtual user interface object in a virtual three-dimensional space. The method also includes, while displaying the first virtual user interface object in the virtual three-dimensional space, detecting, via the input device, a first input that includes selection of a respective portion of the first virtual user interface object and movement of the first input in two dimensions. The method further includes, in response to detecting the first input that includes movement of the first input in two dimensions: in accordance with a determination that the respective portion of the first virtual user interface object is a first portion of the first virtual user interface object, adjusting an appearance of the first virtual user interface object in a first direction determined based on the movement of the first input in two dimensions and the first portion of the first virtual user interface object that was selected, wherein the adjustment of the first virtual user interface object in the first direction is constrained to movement in a first set of two dimensions of the virtual three-dimensional space; and, in accordance with a determination that the respective portion of the first virtual user interface object is a second portion of the first virtual user interface object that is distinct from the first portion of the first virtual user interface object, adjusting the appearance of the first virtual user interface object in a second direction that is different from the first direction, wherein the second direction is determined based on the movement of the first input in two dimensions and the second portion of the first virtual user interface object that was selected, wherein the adjustment of the first virtual user interface object in the second direction is constrained to movement in a second set of two dimensions of the virtual three-dimensional space that is different from the first set of two dimensions of the virtual three-dimensional space.

In accordance with some embodiments, a method is performed at a computer system with a display generation component, one or more attitude sensors, and an input device. The method includes displaying in a first viewing mode, via the display generation component, a simulated environment that is oriented relative to a physical environment of the computer system, wherein displaying the simulated environment in the first viewing mode includes displaying a first virtual user interface object in a virtual model that is displayed at a first respective location in the simulated environment that is associated with the physical environment of the computer system. The method also includes, while displaying the simulated environment, detecting, via the one or more attitude sensors, a first change in attitude of at least a portion of the computer system relative to the physical environment; and in response to detecting the first change in the attitude of the portion of the computer system, changing an appearance of the first virtual user interface object in the virtual model so as to maintain a fixed spatial relationship between the first virtual user interface object and the physical environment. The method further includes, after changing the appearance of the first virtual user interface object based on the first change in attitude of the portion of the computer system, detecting, via the input device, a first gesture that corresponds to an interaction with the simulated environment; and in response to detecting the first gesture that corresponds to the interaction with the simulated environment, performing an operation in the simulated environment that corresponds to the first gesture. In addition, the method includes, after performing the operation that corresponds to the first gesture, detecting, via the one or more attitude sensors, a second change in attitude of the portion of the computer system relative to the physical environment; and in response to detecting the second change in the attitude of the portion of the computer system: in accordance with a determination that the first gesture met mode change criteria, wherein the mode change criteria include a requirement that the first gesture corresponds to an input that changes a spatial parameter of the simulated environment relative to the physical environment, transitioning from displaying the simulated environment, including the virtual model, in the first viewing mode to displaying the simulated environment, including the virtual model, in a second viewing mode, wherein displaying the virtual model in the simulated environment in the second viewing mode includes forgoing changing the appearance of the first virtual user interface object to maintain the fixed spatial relationship between the first virtual user interface object and the physical environment; and in accordance with a determination that the first gesture did not meet the mode change criteria, continuing to display the first virtual model in the simulated environment in the first viewing mode, wherein displaying the virtual model in the first viewing mode includes changing an appearance of the first virtual user interface object in the virtual model in response to the second change in attitude of the portion of the computer system relative to the physical environment, so as to maintain the fixed spatial relationship between the first virtual user interface object and the physical environment.

In accordance with some embodiments, a method is performed at a first computer system with a first display generation component, one or more first attitude sensors, and a first input device. The method includes displaying, via the first display generation component of the first computer system, a simulated environment that is oriented relative to a first physical environment of the first computer system, wherein displaying the simulated environment includes concurrently displaying: a first virtual user interface object in a virtual model that is displayed at a respective location in the simulated environment that is associated with the first physical environment of the first computer system; and a visual indication of a viewing perspective of a second computer system of the simulated environment, wherein the second computer system is a computer system having a second display generation component, one or more second attitude sensors, and a second input device, that is displaying, via the second display generation component of the second computer system, a view of the simulated environment that is oriented relative to a second physical environment of the second computer system. The method also includes, while displaying the simulated environment via the first display generation component of the first computer system, detecting a change in the viewing perspective of the second computer system of the simulated environment based on a change in the attitude of a portion of the second computer system relative to the second physical environment of the second computer system. The method further includes, in response to detecting the change in the viewing perspective of the second computer system of the simulated environment based on the change in the attitude of the portion of the second computer system relative to the physical environment of the second computer system, updating the visual indication of the viewing perspective of the second computer system of the simulated environment displayed via the first display generation component of the first computer system in accordance with the change in the viewing perspective of the second computer system of the simulated environment.

In accordance with some embodiments, a method is performed at a computer system with a display generation component, one or more attitude sensors, and an input device. The method includes displaying, via the display generation component, a simulated environment. The method also includes, while displaying the simulated environment, detecting, via the input device, a first input that is directed to a respective location in the simulated environment. The method also includes, in response to detecting the first input that is directed to the respective location in the simulated environment: in accordance with a determination that the first input was of a first input type and that the first input was detected at a first location in the simulated environment other than a current location of an insertion cursor in the simulated environment, displaying the insertion cursor at the first location; and, in accordance with a determination that the first input was of the first input type and that the first input was detected at a second location in the simulated environment that corresponds to the current location of the insertion cursor, inserting a first object at the second location and moving the insertion cursor to a third location that is on the first object.

In accordance with some embodiments, a method is performed at a computer system with a display generation component, one or more cameras, and one or more attitude sensors. The method includes displaying, via the display generation component, an augmented reality environment, wherein displaying the augmented reality environment includes concurrently displaying: a representation of at least a portion of a field of view of the one or more cameras that includes a physical object and that is updated as contents of the field of view of the one or more cameras change; and a virtual user interface object at a respective location in the representation of the field of view of the one or more cameras, wherein the respective location of the virtual user interface object in the representation of the field of view of the one or more cameras is determined based on a fixed spatial relationship between the virtual user interface object and the physical object included in the representation of the field of view of the one or more cameras. The method also includes, while displaying the augmented reality environment, detecting, via the one or more attitude sensors, a first change in attitude of at least a portion of the computer system relative to a physical environment of the computer system. The method also includes, in response to detecting the first change in attitude of the portion of the computer system relative to the physical environment of the computer system, updating the augmented reality environment in accordance with the first change in attitude of the portion of the computer system, where: in accordance with a determination that the augmented reality environment is displayed in a non-stabilized mode of operation, updating the augmented reality environment in accordance with the first change in attitude of the portion of the computer system includes: updating the representation of the portion of the field of view of the one or more cameras by a first amount of adjustment that is based on the first change in attitude of the portion of the computer system relative to the physical environment of the computer system; and updating the respective location of the virtual user interface object to a location that is selected so as to maintain the fixed spatial between the virtual user interface object and the physical object included in the representation of the field of view of the one or more cameras; and, in accordance with a determination that the augmented reality environment is displayed in a stabilized mode of operation, updating the augmented reality environment in accordance with the first change in attitude of the portion of the computer system includes: updating the representation of the portion of the field of view of the one or more cameras by a second amount of adjustment that is based on the first change in attitude of the portion of the computer system relative to the physical environment of the computer system and that is less than the first amount of adjustment; and updating the respective location of the virtual user interface object to a location that is selected so as to maintain the fixed spatial relationship between the virtual user interface object and the physical object included in the representation of the field of view of the one or more cameras.

In accordance with some embodiments, a computer system includes (and/or is in communication with) a display generation component (e.g., a display, a projector, a heads-up display, or the like), one or more cameras (e.g., video cameras that continuously provide a live preview of at least a portion of the contents that are within the field of view of the cameras and optionally generate video outputs including one or more streams of image frames capturing the contents within the field of view of the cameras), and one or more input devices (e.g., a touch-sensitive surface, such as a touch-sensitive remote control, or a touch-screen display that also serves as the display generation component, a mouse, a joystick, a wand controller, and/or cameras tracking the position of one or more features of the user such as the user's hands), optionally one or more attitude sensors, optionally one or more sensors to detect intensities of contacts with the touch-sensitive surface, optionally one or more tactile output generators, one or more processors, and memory storing one or more programs; the one or more programs are configured to be executed by the one or more processors and the one or more programs include instructions for performing or causing performance of the operations of any of the methods described herein. In accordance with some embodiments, a computer readable storage medium has stored therein instructions which, when executed by a computer system that includes (and/or is in communication with) a display generation component, one or more cameras, one or more input devices, optionally one or more attitude sensors, optionally one or more sensors to detect intensities of contacts with the touch-sensitive surface, and optionally one or more tactile output generators, cause the computer system to perform or cause performance of the operations of any of the methods described herein. In accordance with some embodiments, a graphical user interface on a computer system that includes (and/or is in communication with) a display generation component, one or more cameras, one or more input devices, optionally one or more attitude sensors, optionally one or more sensors to detect intensities of contacts with the touch-sensitive surface, optionally one or more tactile output generators, a memory, and one or more processors to execute one or more programs stored in the memory includes one or more of the elements displayed in any of the methods described herein, which are updated in response to inputs, as described in any of the methods described herein. In accordance with some embodiments, a computer system includes (and/or is in communication with) a display generation component, one or more cameras, one or more input devices, optionally one or more attitude sensors, optionally one or more sensors to detect intensities of contacts with the touch-sensitive surface, optionally one or more tactile output generators, and means for performing or causing performance of the operations of any of the methods described herein. In accordance with some embodiments, an information processing apparatus, for use in a computer system that includes (and/or is in communication with) a display generation component, one or more cameras, one or more input devices, optionally one or more attitude sensors, optionally one or more sensors to detect intensities of contacts with the touch-sensitive surface, and optionally one or more tactile output generators, includes means for performing or causing performance of the operations of any of the methods described herein.

Thus, computer systems that have (and/or are in communication with) a display generation component, one or more cameras, one or more input devices, optionally one or more attitude sensors, optionally one or more sensors to detect intensities of contacts with the touch-sensitive surface, and optionally one or more tactile output generators, are provided with improved methods and interfaces for interacting with augmented and virtual reality environments, thereby increasing the effectiveness, efficiency, and user satisfaction with such computer systems. Such methods and interfaces may complement or replace conventional methods for interacting with augmented and virtual reality environments.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 5A1-5A40 illustrate example user interfaces for displaying an augmented reality environment and, in response to different inputs, adjusting the appearance of the augmented reality environment and/or the appearance of objects in the augmented reality environment, as well as transitioning between viewing a virtual model in the augmented reality environment and viewing simulated views of the virtual model from the perspectives of objects in the virtual model, in accordance with some embodiments.

FIGS. 5B1-5B41 illustrate examples of systems and user interfaces for three-dimensional manipulation of virtual user interface objects, in accordance with some embodiments.

FIGS. 5C1-5C30 illustrate examples of systems and user interfaces for transitioning between viewing modes of a displayed simulated environment, in accordance with some embodiments.

FIGS. 5D1-5D14C illustrate examples of systems and user interfaces for multiple users to interact with virtual user interface objects in a displayed simulated environment, in accordance with some embodiments.

FIGS. 5E1-5E32 illustrate examples of systems and user interfaces for placement of an insertion cursor, in accordance with some embodiments.

FIGS. 5F1-5F17*b* illustrate examples of systems and user interfaces for displaying an augmented reality environment in a stabilized mode of operation, in accordance with some embodiments.

FIGS. 6A-6D are flow diagrams of a process for adjusting an appearance of a virtual user interface object in an augmented reality environment, in accordance with some embodiments.

FIGS. 7A-7C are flow diagrams of a process for applying a filter on a live image captured by one or more cameras of a computer system in an augmented reality environment, in accordance with some embodiments.

FIGS. 8A-8C are flow diagrams of a process for transitioning between viewing a virtual model in the augmented reality environment and viewing simulated views of the virtual model from the perspectives of objects in the virtual model, in accordance with some embodiments.

FIGS. 9A-9E are flow diagrams of a process for three-dimensional manipulation of virtual user interface objects, in accordance with some embodiments.

FIGS. 10A-10E are flow diagrams of a process for transitioning between viewing modes of a displayed simulated environment, in accordance with some embodiments.

FIGS. 11A-11C are flow diagrams of a process for updating an indication of a viewing perspective of a second computer system in a simulated environment displayed by a first computer system, in accordance with some embodiments.

FIGS. 12A-12D are flow diagrams of a process for placement of an insertion cursor, in accordance with some embodiments.

FIGS. 13A-13E are flow diagrams of a process for displaying an augmented reality environment in a stabilized mode of operation, in accordance with some embodiments.

DESCRIPTION OF EMBODIMENTS

Figure 1A:
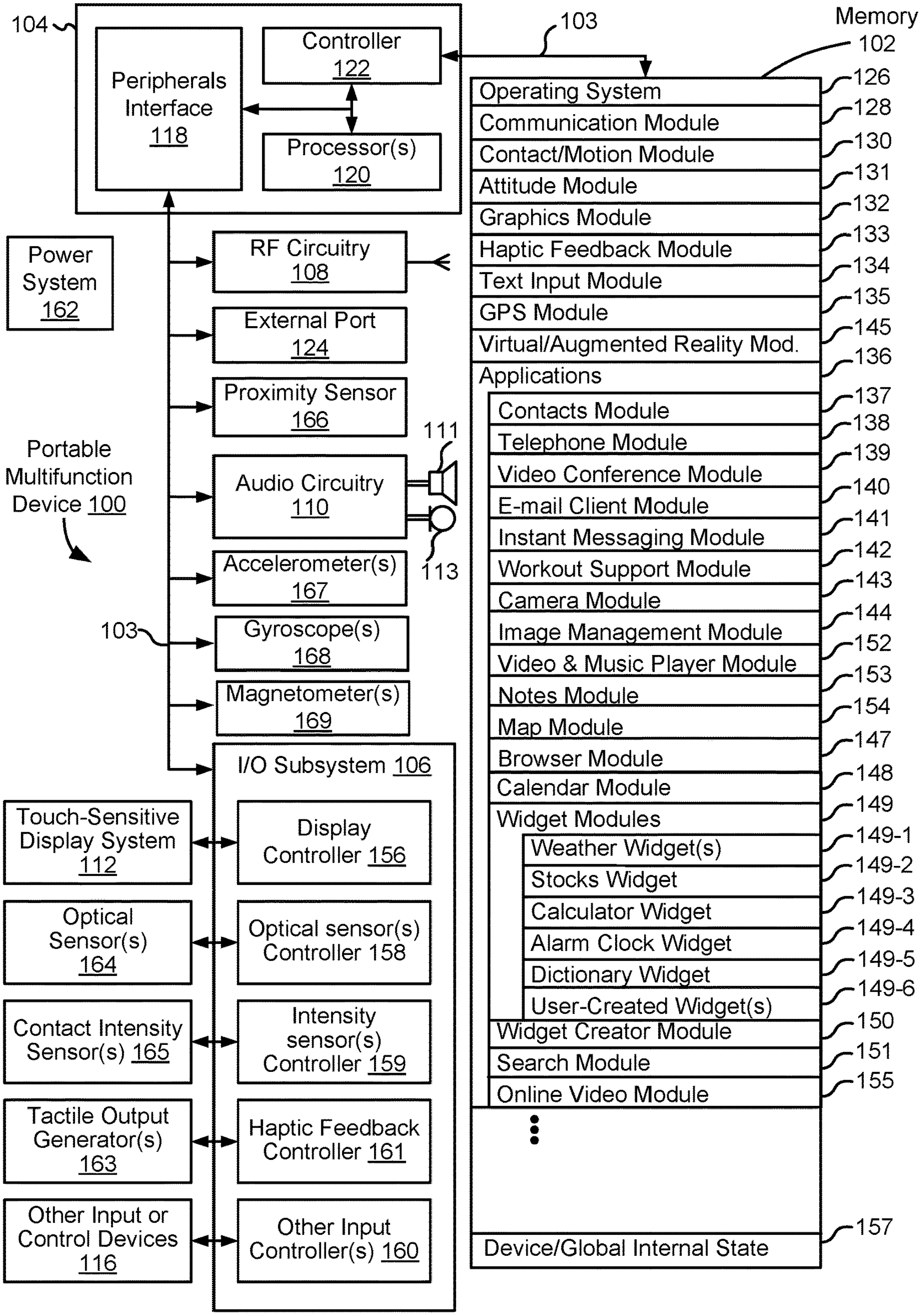
FIG. 1A is a block diagram illustrating a portable multifunction device with a touch-sensitive display in accordance with some embodiments.

An augmented reality environment is an environment in which reality is augmented with supplemental information that provides additional information to a user that is not available in the physical world. Conventional methods of interacting with augmented reality environments (e.g., to access the supplemental information) often require multiple separate inputs (e.g., a sequence of gestures and button presses, etc.) to achieve an intended outcome. Further, conventional methods of inputs are often limited in range (e.g., by the size of the touch-sensitive display of a computer system). The embodiments herein provide an intuitive way for a user to interact with an augmented reality environment (e.g., by adjusting an appearance of a virtual user interface object based on a combination of movement of the computer system and movement of a contact on an input device (e.g., a touch-screen display) of the computer system, and by applying a filter in real-time on a live image captured by one or more cameras of the computer system, where the filter is selected based on a virtual environment setting for the augmented reality environment).

Additionally, conventional interactions with virtual/augmented reality environments are generally limited to a single perspective (e.g., from the perspective of the user wearing/holding the device). The embodiments herein provide a more immersive and intuitive way to experience the virtual/augmented reality environment by presenting simulated views of a virtual model (e.g., of a physical object) in a virtual reality environment from the perspectives of virtual user interface objects (e.g., from the perspectives of a car or a person in the augmented reality environment).

The systems, methods, and GUIs described herein improve user interface interactions with virtual/augmented reality environments in multiple ways. For example, they make it easier to: display an augmented reality environment and, in response to different inputs, adjust the appearance of the augmented reality environment and/or of objects therein; transition between viewing a virtual model in the augmented reality environment and viewing simulated views of the virtual model from the perspectives of objects in the virtual model; and three-dimensional manipulation of virtual user interface objects.

Below, FIGS. 1A-1B, 2, and 3A-3C provide a description of example devices. FIGS. 4A-4B, 5A1-5A40, 5B1-5B41, 5C1-5C30, 5D1-5D14, 5E1-5E32, and 5F1-5F17 illustrate examples of systems and user interfaces for multiple users to interact with virtual user interface objects in a displayed simulated environment, in accordance with some embodiments illustrate example user interfaces for interacting with augmented and virtual reality environments, including displaying an augmented reality environment and, in response to different inputs, adjusting the appearance of the augmented reality environment and/or the appearance of objects in the augmented reality environment, transitioning between viewing a virtual model in the augmented reality environment and viewing simulated views of the virtual model from the perspectives of objects in the virtual model, and three-dimensional manipulation of virtual user interface objects, in accordance with some embodiments. FIGS. 6A-6D illustrate a flow diagram of a method of adjusting an appearance of a virtual user interface object in an augmented reality environment, in accordance with some embodiments. FIGS. 7A-7C illustrate a flow diagram of a method of applying a filter on a live image captured by one or more cameras of a computer system in an augmented reality environment, in accordance with some embodiments. FIGS. 8A-8C illustrate a flow diagram of a method of transitioning between viewing a virtual model in the augmented reality environment and viewing simulated views of the virtual model from the perspectives of objects in the virtual model, in accordance with some embodiments. FIGS. 9A-9E illustrate a flow diagram of a method of three-dimensional manipulation of virtual user interface objects, in accordance with some embodiments. FIGS. 10A-10E illustrate a flow diagram of a method of transitioning between viewing modes of a displayed simulated environment, in accordance with some embodiments. FIGS. 11A-11C illustrate a flow diagram of a method of updating an indication of a viewing perspective of a second computer system in a simulated environment displayed by a first computer system, in accordance with some embodiments. FIGS. 12A-12D illustrate a flow diagram of a method of placement of an insertion cursor, in accordance with some embodiments. FIGS. 13A-13E illustrate a flow diagram of a method of displaying an augmented reality environment in a stabilized mode of operation, in accordance with some embodiments.

The user interfaces in FIGS. 5A1-5A40, 5B1-5B41, 5C1-5C30, 5D1-5D14, 5E1-5E32, and 5F1-5F17 are used to illustrate the processes in FIGS. 6A-6D, 7A-7C, 8A-8C, 9A-9E, 10A-10E, 11A-11C, 12A-12D, and 13A-13E.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Computer systems for virtual/augmented reality include electronic devices that produce virtual/augmented reality environments. Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad) that also includes, or is in communication with, one or more cameras.

In the discussion that follows, a computer system that includes an electronic device that has (and/or is in communication with) a display and a touch-sensitive surface is described. It should be understood, however, that the computer system optionally includes one or more other physical user-interface devices, such as a physical keyboard, a mouse, a joystick, a wand controller, and/or cameras tracking the position of one or more features of the user such as the user's hands.

The device typically supports a variety of applications, such as one or more of the following: a gaming application, a note taking application, a drawing application, a presentation application, a word processing application, a spreadsheet application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed by the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164 (e.g., as part of one or more cameras). Device 100 optionally includes one or more intensity sensors 165 for detecting intensities of contacts on device 100 (e.g., a touch-sensitive surface such as touch-sensitive display system 112 of device 100). Device 100 optionally includes one or more tactile output generators 163 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user. Using tactile outputs to provide haptic feedback to a user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In some embodiments, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In some embodiments, projected mutual capacitance sensing technology is used, such as that found in the iPhone®, iPod Touch®, and iPad® from Apple Inc. of Cupertino, California.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164 (e.g., as part of one or more cameras). FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 163. FIG. 1A shows a tactile output generator coupled with haptic feedback controller 161 in I/O subsystem 106. In some embodiments, tactile output generator(s) 163 include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 163 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 167, gyroscopes 168, and/or magnetometers 169 (e.g., as part of an inertial measurement unit (IMU)) for obtaining information concerning the position (e.g., attitude) of the device. FIG. 1A shows sensors 167, 168, and 169 coupled with peripherals interface 118. Alternately, sensors 167, 168, and 169 are, optionally, coupled with an input controller 160 in I/O subsystem 106. In some embodiments, information is displayed on the touch-screen display in a portrait view or a landscape view based on an analysis of data received from the one or more accelerometers. Device 100 optionally includes a GPS (or GLONASS or other global navigation system) receiver (not shown) for obtaining information concerning the location of device 100.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Android, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, California. In some embodiments, the external port is a Lightning connector that is the same as, or similar to and/or compatible with the Lightning connector used in some iPhone®, iPod Touch®, and iPad® devices from Apple Inc. of Cupertino, California. In some embodiments, the external port is a USB Type-C connector that is the same as, or similar to and/or compatible with the USB Type-C connector used in some electronic devices from Apple Inc. of Cupertino, California.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

In some embodiments, detecting a finger tap gesture depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy particular input criteria that do not require that the characteristic intensity of a contact satisfy a given intensity threshold in order for the particular input criteria to be met. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is capable of detecting a finger or stylus contact hovering over a touch sensitive surface, the nominal contact-detection intensity threshold optionally does not correspond to physical contact between the finger or stylus and the touch sensitive surface.

The same concepts apply in an analogous manner to other types of gestures. For example, a swipe gesture, a pinch gesture, a depinch gesture, and/or a long press gesture are optionally detected based on the satisfaction of criteria that are either independent of intensities of contacts included in the gesture, or do not require that contact(s) that perform the gesture reach intensity thresholds in order to be recognized. For example, a swipe gesture is detected based on an amount of movement of one or more contacts; a pinch gesture is detected based on movement of two or more contacts towards each other; a depinch gesture is detected based on movement of two or more contacts away from each other;

and a long press gesture is detected based on a duration of the contact on the touch-sensitive surface with less than a threshold amount of movement. As such, the statement that particular gesture recognition criteria do not require that the intensity of the contact(s) meet a respective intensity threshold in order for the particular gesture recognition criteria to be met means that the particular gesture recognition criteria are capable of being satisfied if the contact(s) in the gesture do not reach the respective intensity threshold, and are also capable of being satisfied in circumstances where one or more of the contacts in the gesture do reach or exceed the respective intensity threshold. In some embodiments, a tap gesture is detected based on a determination that the finger-down and finger-up event are detected within a predefined time period, without regard to whether the contact is above or below the respective intensity threshold during the predefined time period, and a swipe gesture is detected based on a determination that the contact movement is greater than a predefined magnitude, even if the contact is above the respective intensity threshold at the end of the contact movement. Even in implementations where detection of a gesture is influenced by the intensity of contacts performing the gesture (e.g., the device detects a long press more quickly when the intensity of the contact is above an intensity threshold or delays detection of a tap input when the intensity of the contact is higher), the detection of those gestures does not require that the contacts reach a particular intensity threshold so long as the criteria for recognizing the gesture can be met in circumstances where the contact does not reach the particular intensity threshold (e.g., even if the amount of time that it takes to recognize the gesture changes).

Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses. The statement that a particular set of gesture recognition criteria do not require that the intensity of the contact(s) meet a respective intensity threshold in order for the particular gesture recognition criteria to be met does not preclude the concurrent evaluation of other intensity-dependent gesture recognition criteria to identify other gestures that do have a criteria that is met when a gesture includes a contact with an intensity above the respective intensity threshold. For example, in some circumstances, first gesture recognition criteria for a first gesture—which do not require that the intensity of the contact(s) meet a respective intensity threshold in order for the first gesture recognition criteria to be met—are in competition with second gesture recognition criteria for a second gesture—which are dependent on the contact(s) reaching the respective intensity threshold. In such competitions, the gesture is, optionally, not recognized as meeting the first gesture recognition criteria for the first gesture if the second gesture recognition criteria for the second gesture are met first. For example, if a contact reaches the respective intensity threshold before the contact moves by a predefined amount of movement, a deep press gesture is detected rather than a swipe gesture. Conversely, if the contact moves by the predefined amount of movement before the contact reaches the respective intensity threshold, a swipe gesture is detected rather than a deep press gesture. Even in such circumstances, the first gesture recognition criteria for the first gesture still do not require that the intensity of the contact(s) meet a respective intensity threshold in order for the first gesture recognition criteria to be met because if the contact stayed below the respective intensity threshold until an end of the gesture (e.g., a swipe gesture with a contact that does not increase to an intensity above the respective intensity threshold), the gesture would have been recognized by the first gesture recognition criteria as a swipe gesture. As such, particular gesture recognition criteria that do not require that the intensity of the contact(s) meet a respective intensity threshold in order for the particular gesture recognition criteria to be met will (A) in some circumstances ignore the intensity of the contact with respect to the intensity threshold (e.g. for a tap gesture) and/or (B) in some circumstances still be dependent on the intensity of the contact with respect to the intensity threshold in the sense that the particular gesture recognition criteria (e.g., for a long press gesture) will fail if a competing set of intensity-dependent gesture recognition criteria (e.g., for a deep press gesture) recognize an input as corresponding to an intensity-dependent gesture before the particular gesture recognition criteria recognize a gesture corresponding to the input (e.g., for a long press gesture that is competing with a deep press gesture for recognition).

Attitude module 131, in conjunction with accelerometers 167, gyroscopes 168, and/or magnetometers 169, optionally detects attitude information concerning the device, such as the device's attitude (e.g., roll, pitch, and/or yaw) in a particular frame of reference. Attitude module 131 includes software components for performing various operations related to detecting the position of the device and detecting changes to the attitude of the device.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions (e.g., instructions used by haptic feedback controller 161) to produce tactile outputs using tactile output generator(s) 163 at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing, to camera module 143 as picture/video metadata, and to applications that provide location-based services such as weather widgets, local yellow page widgets, and map/navigation widgets).

Virtual/augmented reality module 145 provides virtual and/or augmented reality logic to applications 136 that implement augmented reality, and in some embodiments virtual reality, features. Virtual/augmented reality module 145 facilitates superposition of virtual content, such as a virtual user interface object, on a representation of at least a portion of a field of view of the one or more cameras. For example, with assistance from the virtual/augmented reality module 145, the representation of at least a portion of a field of view of the one or more cameras may include a respective physical object and the virtual user interface object may be displayed at a location, in a displayed augmented reality environment, that is determined based on the respective physical object in the field of view of the one or more cameras or a virtual reality environment that is determined based on the attitude of at least a portion of a computer system (e.g., an attitude of a display device that is used to display the user interface to a user of the computer system).

Applications 136 optionally include the following modules (or sets of instructions), or a subset or superset thereof:

- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages, and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and video and music player module 152, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touch-sensitive surface. In some other embodiments, the menu button is a physical push button or other physical input control device instead of a touch-sensitive surface.

Figure 1B:
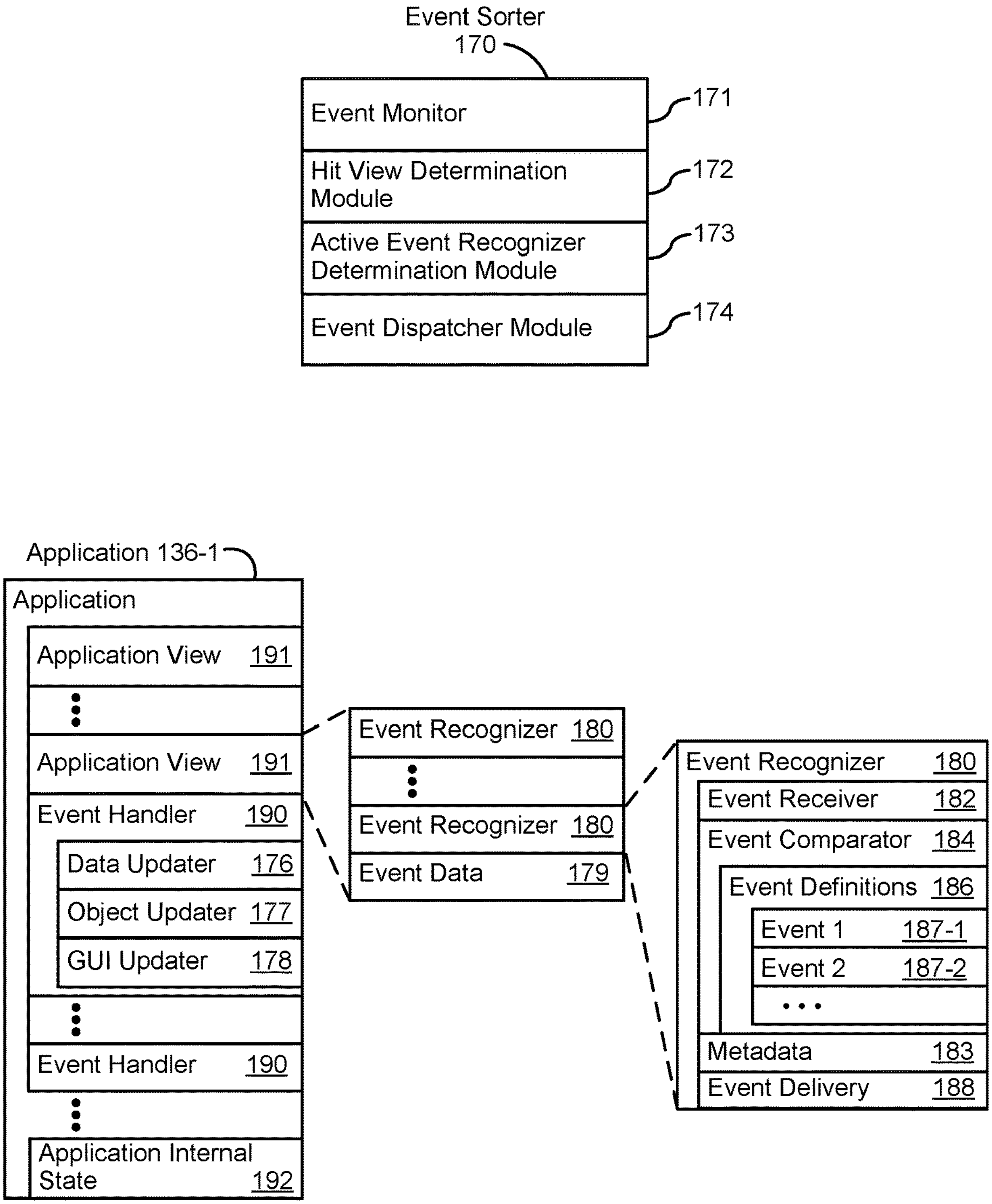
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3A) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 167, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video and music player module 152. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; inputs based on real-time analysis of video images obtained by one or more cameras; movement of the device; oral instructions; detected eye movements; biometric inputs; and/or any combination thereof are optionally utilized as inputs corresponding to sub-events which define an event to be recognized.

Figure 2:
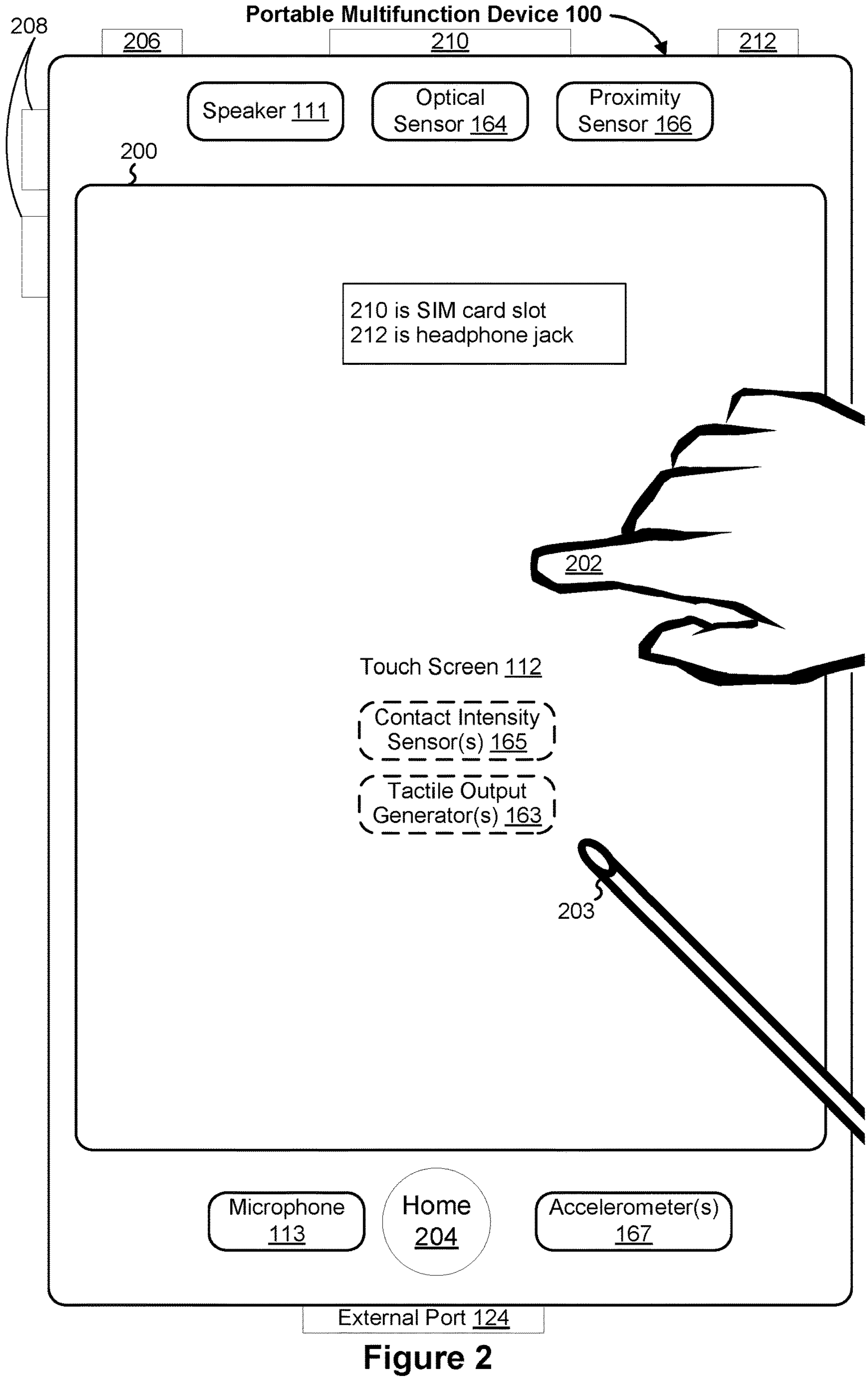
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In these embodiments, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204 (sometimes called home button 204), push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensities of contacts on touch-sensitive display system 112 and/or one or more tactile output generators 163 for generating tactile outputs for a user of device 100.

Figure 3A:
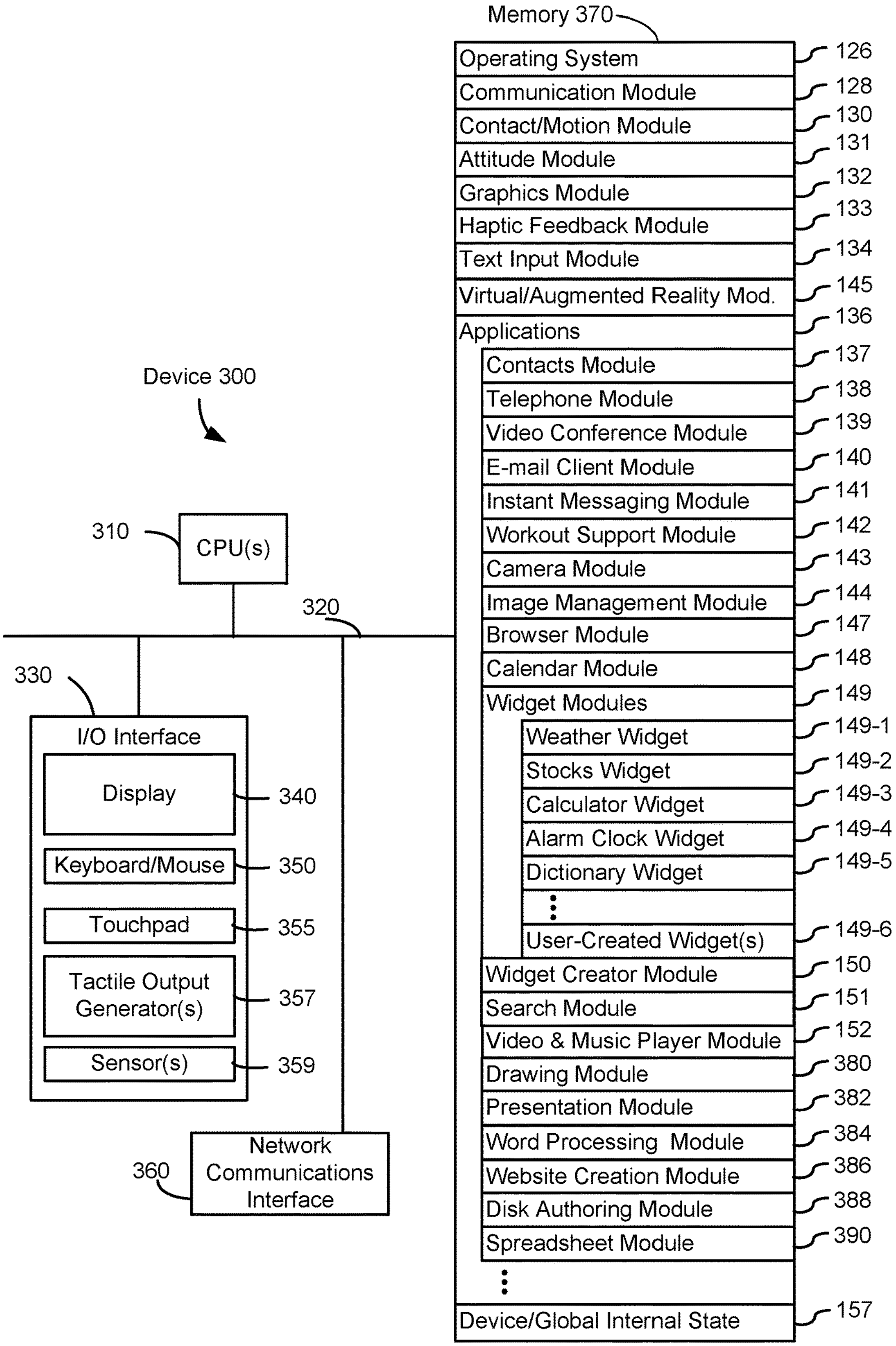
FIG. 3A is a block diagram of an example multifunction device with a display and a touch-sensitive surface in accordance with some embodiments.

FIG. 3A is a block diagram of an example multifunction device with a display and a touch-sensitive surface in accordance with some embodiments. Device 300 need not be portable. In some embodiments, device 300 is a gaming system, a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is optionally a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 163 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3A are, optionally, stored in one or more of the previously mentioned memory devices. Each of the above identified modules corresponds to a set of instructions for performing a function described above. The above identified modules or programs (e.g., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Figure 3B:
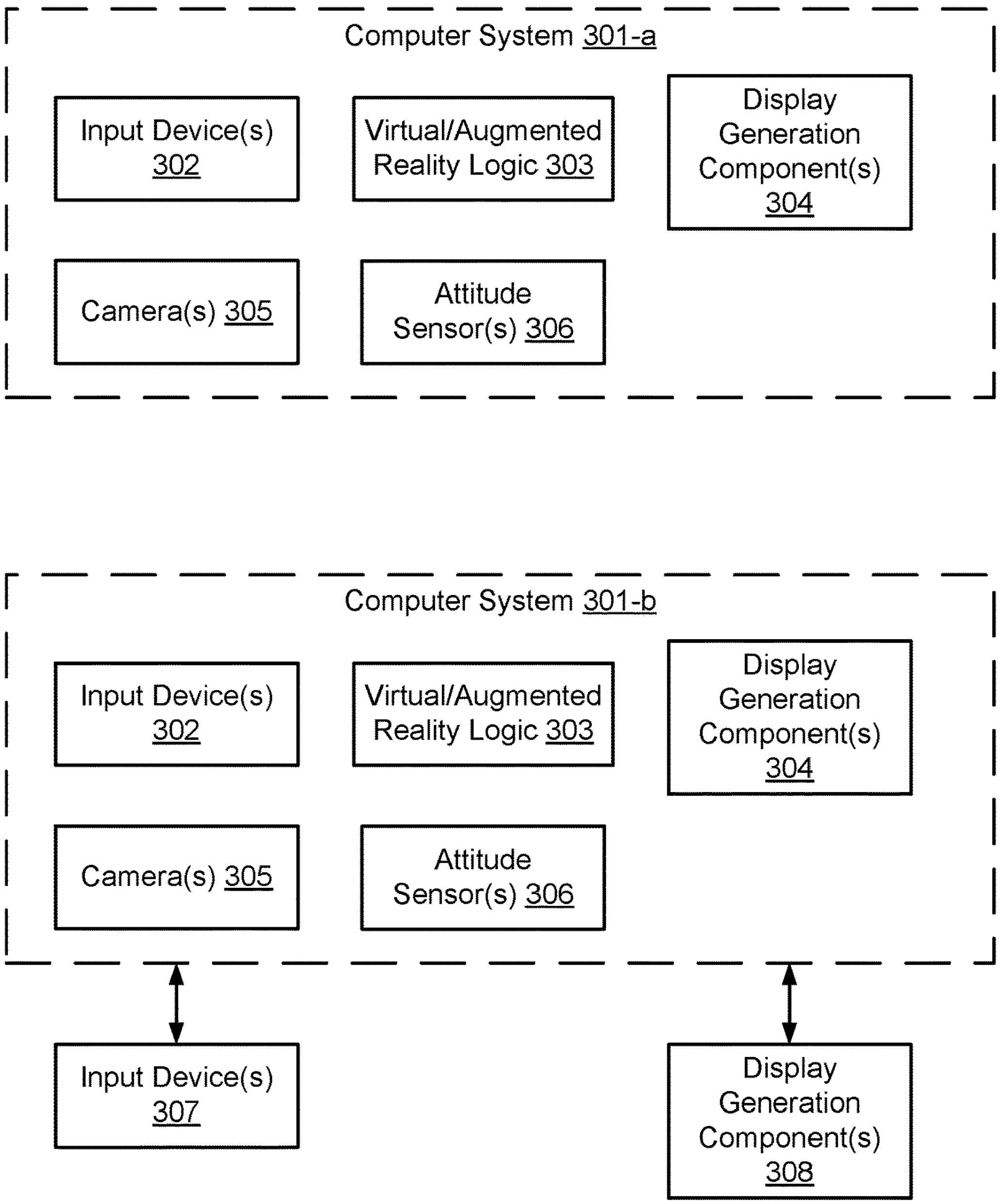
FIGS. 3B-3C are block diagrams of example computer systems in accordance with some embodiments.
Figure 3C:
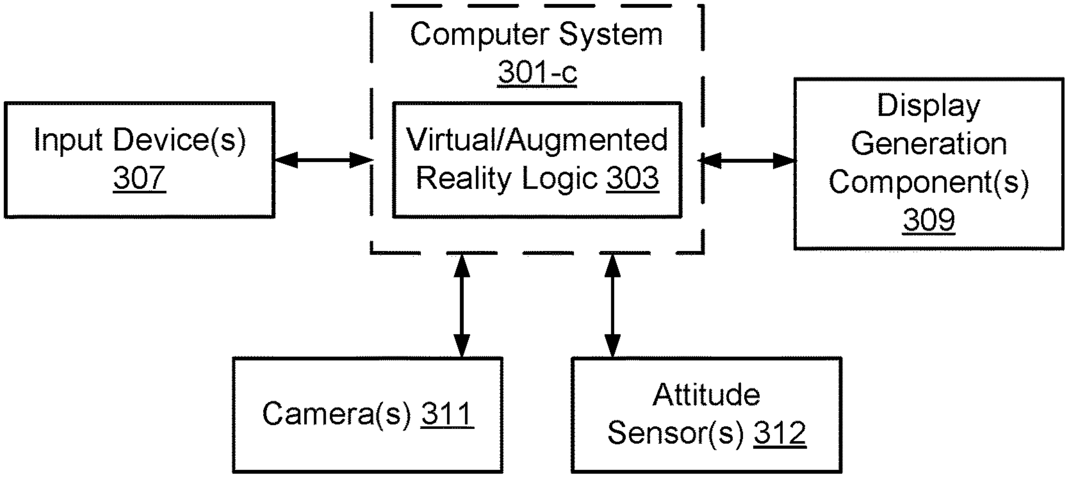

FIGS. 3B-3D are block diagrams of example computer systems 301 in accordance with some embodiments.

In some embodiments, computer system 301 includes and/or is in communication with:

- input device(s) (302 and/or 307, e.g., a touch-sensitive surface, such as a touch-sensitive remote control, or a touch-screen display that also serves as the display generation component, a mouse, a joystick, a wand controller, and/or cameras tracking the position of one or more features of the user such as the user's hands);
- virtual/augmented reality logic 303 (e.g., virtual/augmented reality module 145);
- display generation component(s) (304 and/or 308, e.g., a display, a projector, a heads-up display, or the like) for displaying virtual user interface elements to the user;
- camera(s) (e.g., 305 and/or 311) for capturing images of a field of view of the device, e.g., images that are used to determine placement of virtual user interface elements, determine an attitude of the device, and/or display a portion of the physical environment in which the camera(s) are located; and
- attitude sensor(s) (e.g., 306 and/or 311) for determining an attitude of the device relative to the physical environment and/or changes in attitude of the device.

In some computer systems (e.g., 301-*a* in FIG. 3B), input device(s) 302, virtual/augmented reality logic 303, display generation component(s) 304, camera(s) 305; and attitude sensor(s) 306 are all integrated into the computer system (e.g., portable multifunction device 100 in FIGS. 1A-1B or device 300 in FIG. 3 such as a smartphone or tablet).

In some computer systems (e.g., 301-*b*), in addition to integrated input device(s) 302, virtual/augmented reality logic 303, display generation component(s) 304, camera(s) 305; and attitude sensor(s) 306, the computer system is also in communication with additional devices that are separate from the computer system, such as separate input device(s) 307 such as a touch-sensitive surface, a wand, a remote control, or the like and/or separate display generation component(s) 308 such as virtual reality headset or augmented reality glasses that overlay virtual objects on a physical environment.

In some computer systems (e.g., 301-*c* in FIG. 3C), the input device(s) 307, display generation component(s) 309, camera(s) 311; and/or attitude sensor(s) 312 are separate from the computer system and are in communication with the computer system. In some embodiments, other combinations of components in computer system 301 and in communication with the computer system are used. For example, in some embodiments, display generation component(s) 309, camera(s) 311, and attitude sensor(s) 312 are incorporated in a headset that is either integrated with or in communication with the computer system.

In some embodiments, all of the operations described below with reference to FIGS. 5A1-5A40 and 5B1-5B41 are performed on a single computing device with virtual/augmented reality logic 303 (e.g., computer system 301-*a* described below with reference to FIG. 3B). However, it should be understood that frequently multiple different computing devices are linked together to perform the operations described below with reference to FIGS. 5A1-5A40 and 5B1-5B41 (e.g., a computing device with virtual/augmented reality logic 303 communicates with a separate computing device with a display 450 and/or a separate computing device with a touch-sensitive surface 451). In any of these embodiments, the computing device that is described below with reference to FIGS. 5A1-5A40 and 5B1-5B41 is the computing device (or devices) that contain(s) the virtual/augmented reality logic 303. Additionally, it should be understood that the virtual/augmented reality logic 303 could be divided between a plurality of distinct modules or computing devices in various embodiments; however, for the purposes of the description herein, the virtual/augmented reality logic 303 will be primarily referred to as residing in a single computing device so as not to unnecessarily obscure other aspects of the embodiments.

In some embodiments, the virtual/augmented reality logic 303 includes one or more modules (e.g., one or more event handlers 190, including one or more object updaters 177 and one or more GUI updaters 178 as described in greater detail above with reference to FIG. 1B) that receive interpreted inputs and, in response to these interpreted inputs, generate instructions for updating a graphical user interface in accordance with the interpreted inputs which are subsequently used to update the graphical user interface on a display. In some embodiments, an interpreted input for an input that has been detected (e.g., by a contact motion module 130 in FIGS. 1A and 3), recognized (e.g., by an event recognizer 180 in FIG. 1B) and/or distributed (e.g., by event sorter 170 in FIG. 1B) is used to update the graphical user interface on a display. In some embodiments, the interpreted inputs are generated by modules at the computing device (e.g., the computing device receives raw contact input data so as to identify gestures from the raw contact input data). In some embodiments, some or all of the interpreted inputs are received by the computing device as interpreted inputs (e.g., a computing device that includes the touch-sensitive surface 451 processes raw contact input data so as to identify gestures from the raw contact input data and sends information indicative of the gestures to the computing device that includes the virtual/augmented reality logic 303).

In some embodiments, both a display and a touch-sensitive surface are integrated with the computer system (e.g., 301-*a* in FIG. 3B) that contains the virtual/augmented reality logic 303. For example, the computer system may be a desktop computer or laptop computer with an integrated display (e.g., 340 in FIG. 3) and touchpad (e.g., 355 in FIG. 3). As another example, the computing device may be a portable multifunction device 100 (e.g., a smartphone, PDA, tablet computer, etc.) with a touch screen (e.g., 112 in FIG. 2).

In some embodiments, a touch-sensitive surface is integrated with the computer system while a display is not integrated with the computer system that contains the virtual/augmented reality logic 303. For example, the computer system may be a device 300 (e.g., a desktop computer or laptop computer) with an integrated touchpad (e.g., 355 in FIG. 3) connected (via wired or wireless connection) to a separate display (e.g., a computer monitor, television, etc.). As another example, the computer system may be a portable multifunction device 100 (e.g., a smartphone, PDA, tablet computer, etc.) with a touch screen (e.g., 112 in FIG. 2) connected (via wired or wireless connection) to a separate display (e.g., a computer monitor, television, etc.).

In some embodiments, a display is integrated with the computer system while a touch-sensitive surface is not integrated with the computer system that contains the virtual/augmented reality logic 303. For example, the computer system may be a device 300 (e.g., a desktop computer, laptop computer, television with integrated set-top box) with an integrated display (e.g., 340 in FIG. 3) connected (via wired or wireless connection) to a separate touch-sensitive surface (e.g., a remote touchpad, a portable multifunction device, etc.). As another example, the computer system may be a portable multifunction device 100 (e.g., a smartphone, PDA, tablet computer, etc.) with a touch screen (e.g., 112 in FIG. 2) connected (via wired or wireless connection) to a separate touch-sensitive surface (e.g., a remote touchpad, another portable multifunction device with a touch screen serving as a remote touchpad, etc.).

In some embodiments, neither a display nor a touch-sensitive surface is integrated with the computer system (e.g., 301-*c* in FIG. 3C) that contains the virtual/augmented reality logic 303. For example, the computer system may be a stand-alone computing device 300 (e.g., a set-top box, gaming console, etc.) connected (via wired or wireless connection) to a separate touch-sensitive surface (e.g., a remote touchpad, a portable multifunction device, etc.) and a separate display (e.g., a computer monitor, television, etc.).

In some embodiments, the computer system has an integrated audio system (e.g., audio circuitry 110 and speaker 111 in portable multifunction device 100). In some embodiments, the computing device is in communication with an audio system that is separate from the computing device. In some embodiments, the audio system (e.g., an audio system integrated in a television unit) is integrated with a separate display. In some embodiments, the audio system (e.g., a stereo system) is a stand-alone system that is separate from the computer system and the display.

Attention is now directed towards embodiments of user interfaces ("UI") that are, optionally, implemented on portable multifunction device 100.

Figure 4A:
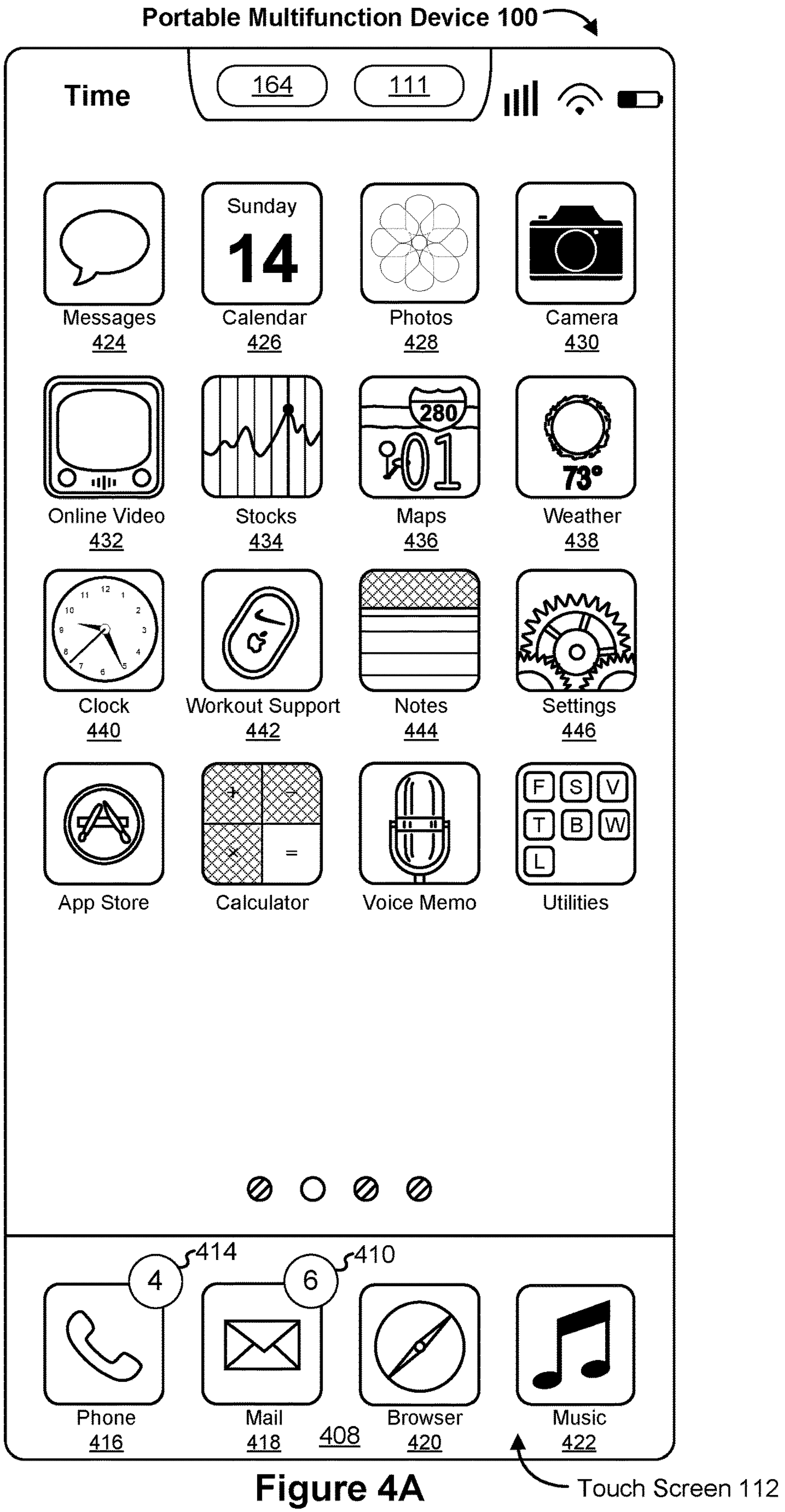
FIG. 4A illustrates an example user interface for a menu of applications on a portable multifunction device in accordance with some embodiments.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) for wireless communication(s), such as cellular and Wi-Fi signals;
- Time;
- a Bluetooth indicator;
- a Battery status indicator;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser"; and
  - Icon 422 for video and music player module 152, labeled "Music"; and
- Icons for other applications, such as:
  - Icon 424 for IM module 141, labeled "Messages";
  - Icon 426 for calendar module 148, labeled "Calendar";
  - Icon 428 for image management module 144, labeled "Photos";
  - Icon 430 for camera module 143, labeled "Camera";
  - Icon 432 for online video module 155, labeled "Online Video";
  - Icon 434 for stocks widget 149-2, labeled "Stocks";
  - Icon 436 for map module 154, labeled "Maps";
  - Icon 438 for weather widget 149-1, labeled "Weather";
  - Icon 440 for alarm clock widget 149-4, labeled "Clock";
  - Icon 442 for workout support module 142, labeled "Workout Support";
  - Icon 444 for notes module 153, labeled "Notes"; and
  - Icon 446 for a settings application or module, labeled "Settings," which provides access to settings for device 100 and its various applications 136.

It should be noted that the icon labels illustrated in FIG. 4A are merely examples. For example, other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
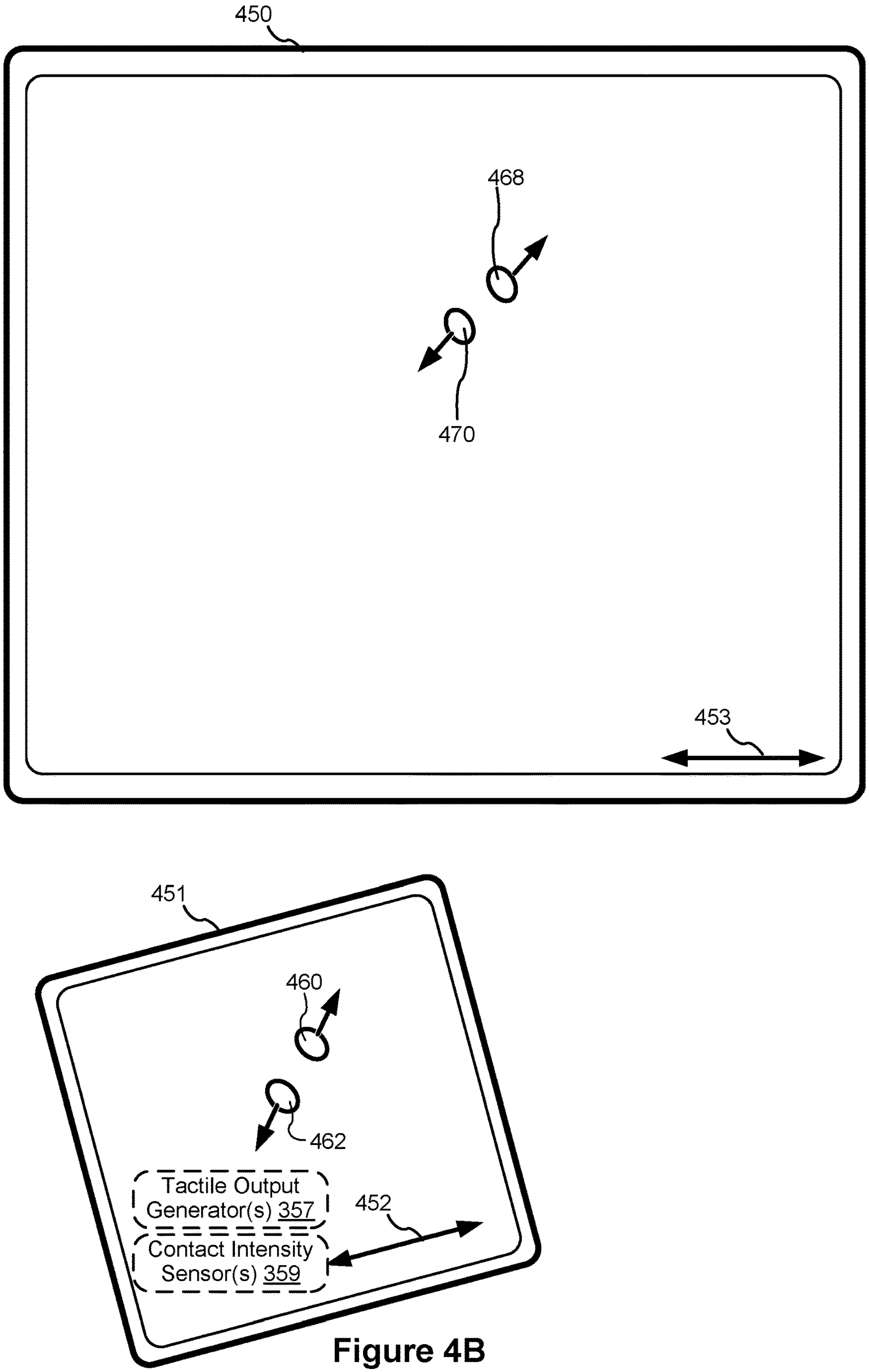
FIG. 4B illustrates an example user interface for a multifunction device with a touch-sensitive surface that is separate from the display in accordance with some embodiments.

FIG. 4B illustrates an example user interface on a device (e.g., device 300, FIG. 3A) with a touch-sensitive surface 451 (e.g., a tablet or touchpad 355, FIG. 3A) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, contact 460 corresponds to 468 and contact 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3A or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device). In some embodiments, a focus indicator (e.g., a cursor or selection indicator) is displayed via the display device to indicate a current portion of the user interface that will be affected by inputs received from the one or more input devices.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms (milliseconds) in duration (e.g., 40, 100, or 120 ms, depending on the magnitude of the second intensity threshold, with the delay time increasing as the second intensity threshold increases). This delay time helps to avoid accidental recognition of deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Example factors are described in U.S. patent application Ser. Nos. 14/399,606 and 14/624,296, which are incorporated by reference herein in their entireties.

Figure 4C:
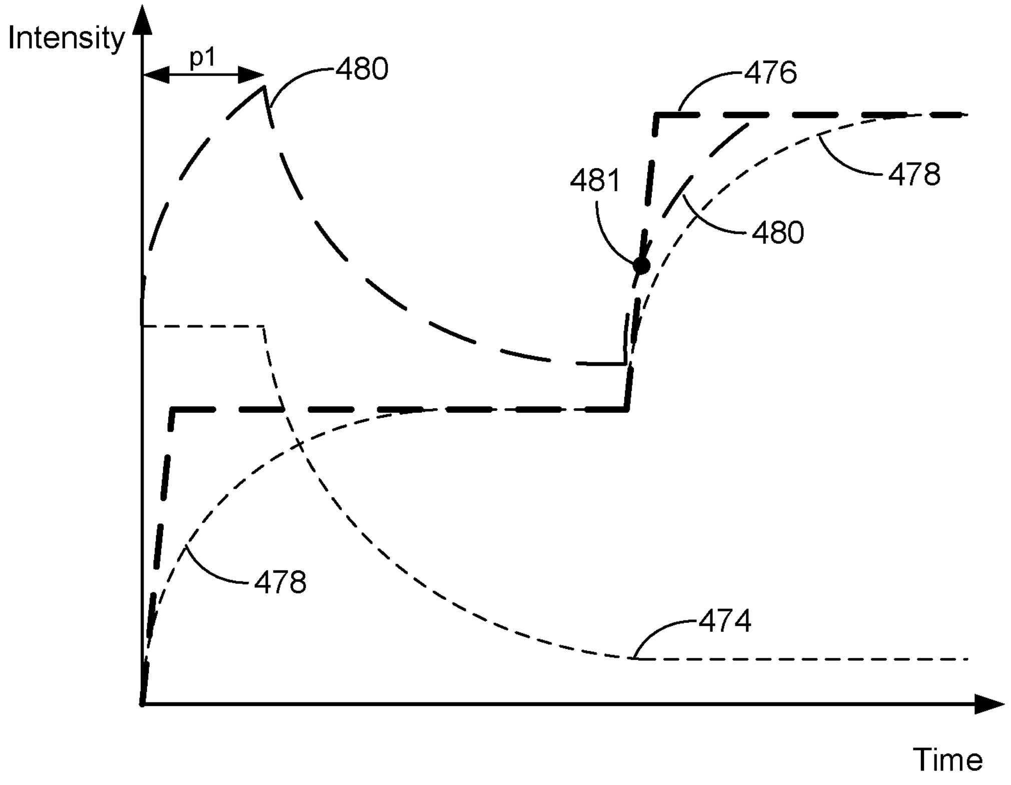
FIGS. 4C-4E illustrate examples of dynamic intensity thresholds in accordance with some embodiments.

For example, FIG. 4C illustrates a dynamic intensity threshold 480 that changes over time based in part on the intensity of touch input 476 over time. Dynamic intensity threshold 480 is a sum of two components, first component 474 that decays over time after a predefined delay time p1 from when touch input 476 is initially detected, and second component 478 that trails the intensity of touch input 476 over time. The initial high intensity threshold of first component 474 reduces accidental triggering of a "deep press" response, while still allowing an immediate "deep press" response if touch input 476 provides sufficient intensity. Second component 478 reduces unintentional triggering of a "deep press" response by gradual intensity fluctuations of in a touch input. In some embodiments, when touch input 476 satisfies dynamic intensity threshold 480 (e.g., at point 481 in FIG. 4C), the "deep press" response is triggered.

Figure 4D:
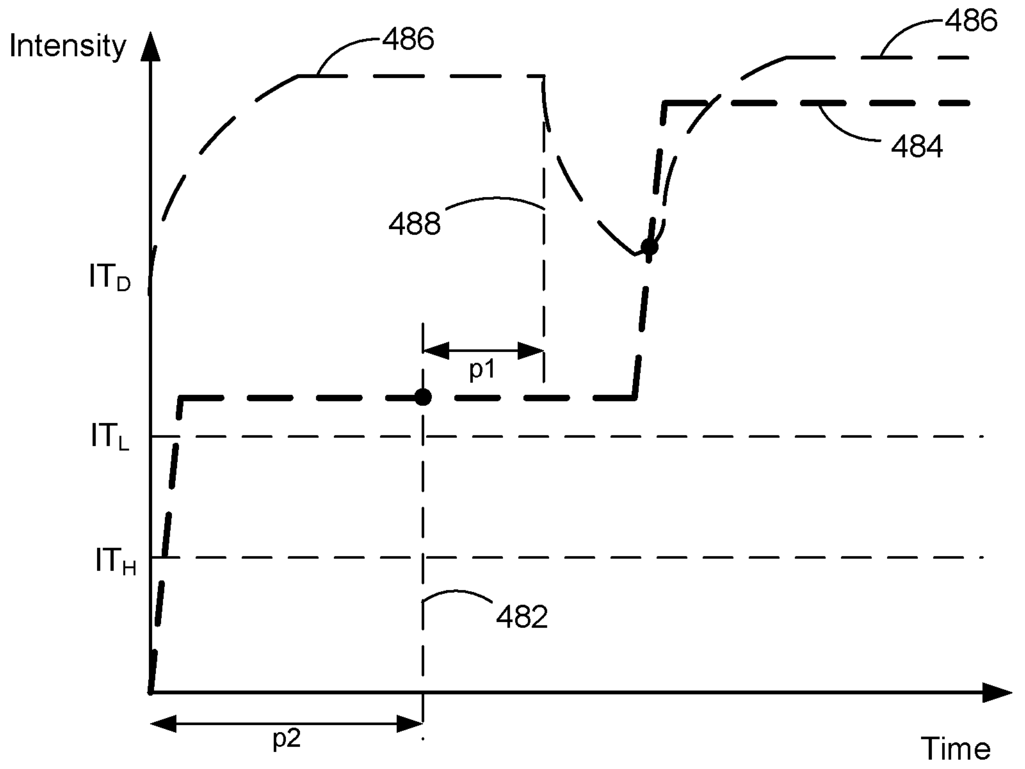

FIG. 4D illustrates another dynamic intensity threshold 486 (e.g., intensity threshold $IT_D$). FIG. 4D also illustrates two other intensity thresholds: a first intensity threshold $IT_H$ and a second intensity threshold $IT_L$. In FIG. 4D, although touch input 484 satisfies the first intensity threshold $IT_H$ and the second intensity threshold $IT_L$ prior to time p2, no response is provided until delay time p2 has elapsed at time 482. Also in FIG. 4D, dynamic intensity threshold 486 decays over time, with the decay starting at time 488 after a predefined delay time p1 has elapsed from time 482 (when the response associated with the second intensity threshold $IT_L$ was triggered). This type of dynamic intensity threshold reduces accidental triggering of a response associated with the dynamic intensity threshold $IT_D$ immediately after, or concurrently with, triggering a response associated with a lower intensity threshold, such as the first intensity threshold $IT_H$ or the second intensity threshold $IT_L$.

Figure 4E:
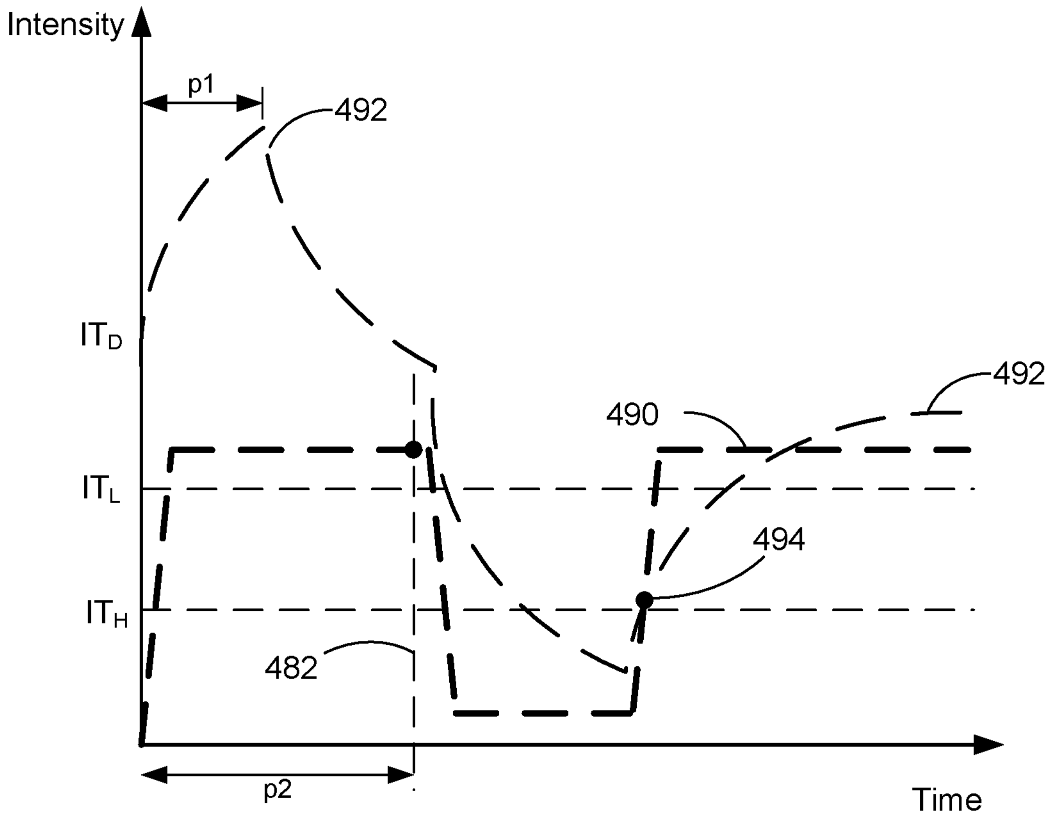

FIG. 4E illustrate yet another dynamic intensity threshold 492 (e.g., intensity threshold $IT_D$). In FIG. 4E, a response associated with the intensity threshold $IT_L$ is triggered after the delay time p2 has elapsed from when touch input 490 is initially detected. Concurrently, dynamic intensity threshold 492 decays after the predefined delay time p1 has elapsed from when touch input 490 is initially detected. So a decrease in intensity of touch input 490 after triggering the response associated with the intensity threshold $IT_L$, followed by an increase in the intensity of touch input 490, without releasing touch input 490, can trigger a response associated with the intensity threshold $IT_D$ (e.g., at time 494) even when the intensity of touch input 490 is below another intensity threshold, for example, the intensity threshold $IT_L$.

User Interfaces and Associated Processes

Attention is now directed towards embodiments of user interfaces ("UI") and associated processes that may be implemented on a computer system (e.g., portable multifunction device 100 or device 300) that includes (and/or is in communication with) a display generation component (e.g., a display, a projector, a heads-up display, or the like), one or more cameras (e.g., video cameras that continuously provide a live preview of at least a portion of the contents that are within the field of view of the cameras and optionally generate video outputs including one or more streams of image frames capturing the contents within the field of view of the cameras), and one or more input devices (e.g., a touch-sensitive surface, such as a touch-sensitive remote control, or a touch-screen display that also serves as the display generation component, a mouse, a joystick, a wand controller, and/or cameras tracking the position of one or more features of the user such as the user's hands), optionally one or more attitude sensors, optionally one or more sensors to detect intensities of contacts with the touch-sensitive surface, and optionally one or more tactile output generators.

FIGS. 5A1-5A40 illustrate example user interfaces for displaying an augmented reality environment and, in response to different inputs, adjusting the appearance of the augmented reality environment and/or the appearance of objects in the augmented reality environment, as well as transitioning between viewing a virtual model in the augmented reality environment and viewing simulated views of the virtual model from the perspectives of objects in the virtual model, in accordance with some embodiments. The user interfaces in these figures are used to illustrate the processes described below, including the processes in FIGS. 6A-6D, 7A-7C, and 8A-8C. For convenience of explanation, some of the embodiments will be discussed with reference to operations performed on a device with a touch-sensitive display system 112. Similarly, analogous operations are, optionally, performed on a computer system (e.g., as shown in FIG. 5A2) with a headset 5008 and a separate input device 5010 with a touch-sensitive surface in response to detecting the contacts on the touch-sensitive surface of the input device 5010 while displaying the user interfaces shown in the figures on the display of headset 5008, along with a focus indicator.

FIGS. 5A1-5A27 illustrate example user interfaces for displaying an augmented reality environment and, in response to different inputs, adjusting the appearance of the augmented reality environment and/or the appearance of objects in the augmented reality environment, in accordance with some embodiments.

FIGS. 5A1-5A2 illustrate a context in which user interfaces described with regard to 5A3-5A40 are used.

FIG. 5A1 illustrates a physical space in which user 5002, table 5004, and a physical building model 5006 are located. User 5002 holds device 100 to view physical building model 5006 through the display of device 100 (e.g., on touch-sensitive display system 112, sometimes referred to as "touch-screen display 112," "touch screen 112," "display 112" or "touch-sensitive display 112," of device 100, as shown in FIGS. 1A, 4A, 5A4). One or more cameras of device 100 (sometimes referred to as "a camera" of device 100) continuously provide a live preview of the contents that are within the field of view of the cameras, including one or more physical objects in the physical space (e.g., wallpaper 5007 in the room of the physical space, table 5004, etc.). Device 100 displays an augmented reality environment that includes a representation of at least a portion of the field of view of the cameras that includes a physical object (e.g., physical building model 5006) and one or more virtual objects (e.g., a virtual model of the building covering the physical building model 5006, virtual trees, etc.), and user 5002 uses the touch-screen display of device 100 to interact with the augmented reality environment.

FIG. 5A2 illustrates an alternative method in which user 5002 views physical building model 5006 using a computer system that includes a headset 5008 and a separate input device 5010 with a touch-sensitive surface. In this example, headset 5008 displays the augmented reality environment and user 5002 uses the separate input device 5010 to interact with the augmented reality environment. In some embodiments, device 100 is used as the separate input device 5010. In some embodiments, the separate input device 5010 is a touch-sensitive remote control, a mouse, a joystick, a wand controller, or the like. In some embodiments, the separate input device 5010 includes one or more cameras that track the position of one or more features of user 5002 such as the user's hands and movement.

FIGS. 5A3-5A4 illustrate a view of an augmented reality environment displayed on touch screen 112 of device 100. FIG. 5A3 illustrates the position of device 100, in relation to table 5004 and physical building model 5006, from the perspective of user 5002. FIG. 5A4 shows a closer view of device 100 from FIG. 5A3. Device 100 displays an augmented reality environment including a live view of the physical space as captured by the camera of device 100 and a virtual user interface object (virtual building model 5012). Here, virtual building model 5012 is a 3D virtual model of the physical building model 5006 that appears to be attached to, or cover, the physical building model 5006 in the field of view of the camera (e.g., replacing the physical building model 5006 in the augmented reality environment). The displayed augmented reality environment also includes virtual objects that do not correspond to physical objects in the field of view of the camera (e.g., virtual trees, virtual bushes, a virtual person, and a virtual car) and physical objects that are in the field of view of the camera (e.g., wallpaper 5007). In some embodiments, device 100 displays one or more buttons (e.g., button 5014, button 5016, and button 5018, sometimes called virtual buttons or displayed buttons) for interacting with the augmented reality environment (e.g., as discussed below with respect to FIGS. 5A25-5A27).

FIGS. 5A5-5A6 illustrate a different view of the augmented reality environment displayed on touch screen 112 of device 100, after user 5002 has moved from the front of table 5004 (e.g., as shown in FIG. 5A3) to the side of table 5004 (e.g., as shown in FIG. 5A5). FIG. 5A5 illustrates the position of device 100, in relation to table 5004 and physical building model 5006, from the perspective of user 5002. FIG. 5A6 shows a closer view of device 100 from FIG. 5A5. As shown in FIGS. 5A5-5A6, virtual building model 5012 remains anchored to physical building model 5006, and the view of virtual building model 5012 changes as the location, shape, and/or orientation of physical building model 5006 changes in the field of view of the camera.

FIGS. 5A7-5A14 illustrate adjusting an appearance of virtual building model 5012 in the augmented reality environment based on a combination of movement of a contact on touch screen 112 and movement of device 100. Reference box 5019 illustrates the position of device 100, in relation to table 5004 and physical building model 5006, from the perspective of user 5002.

In FIG. 5A7, device 100 displays an augmented reality environment when device 100 is in a first position relative to table 5004 and physical building model 5006 (e.g., as shown in reference box 5019). In FIG. 5A8, device 100 detects an input on virtual building model 5012 (e.g., by detecting a touch input by contact 5020-*a* on the roof of virtual building model 5012). In FIGS. 5A9-5A11, while continuing to detect the input (e.g., while contact 5020 is maintained on touch screen 112), device 100 detects movement of the input relative to physical building model 5006 (e.g., a drag gesture by contact 5020) and adjusts the appearance of virtual building model 5012 (e.g., lifting virtual roof 5012-*a* up from the virtual building model) in accordance with a magnitude of movement of the input relative to physical building model 5006. In FIG. 5A9, when contact 5020-*b* has moved a relatively small amount, virtual roof 5012-*a* is lifted by a corresponding small amount. In FIG. 5A10, when contact 5020-*c* has moved a larger amount, virtual roof 5012-*a* is lifted by a corresponding larger amount. In some embodiments, as shown in FIG. 5A11, as virtual roof 5012-*a* continues to lift up, floors of the virtual building model 5012 lift up and expand (e.g., showing virtual first floor 5012-*d*, virtual second floor 5012-*c*, and virtual third floor 5012-*b*). As shown in FIGS. 5A9-5A11, as contact 5020 moves up, device 100 updates the display of virtual building model 5012 so as to maintain display of the initial contact point on virtual roof 5012-*a* at the location of contact 5020.

In FIGS. 5A12-5A13, while contact 5020-*d* is maintained and kept stationary on touch screen 112, device 100 detects movement of device 100 in physical space (e.g., movement 5022, from a first position that is lower relative to physical building model 5006, as shown in reference box 5019 in FIG. 5A12, to a second position that is higher relative to physical building model 5006, as shown in reference box 5019 in FIG. 5A13). In response to the movement of the input (from movement of device 100 in physical space), device 100 adjusts the appearance of virtual building model 5012 by lifting virtual roof 5012-*a* further up in accordance with the magnitude of the movement. In some embodiments, as shown in FIG. 5A13, the virtual roof 5012-*a* is displayed at a location beyond a maximum limit of the resting state of virtual roof 5012-*a* when the appearance of virtual model 5012 is adjusted in accordance with the magnitude of the movement.

In FIG. 5A14, device 100 ceases to detect the input (e.g., contact 5020 lifts off) and displays virtual roof 5012-*a* at a location corresponding to the maximum limit of the resting state. In some embodiments, device 100 displays an animated transition (e.g., from FIG. 5A13 to FIG. 5A14) from the virtual roof 5012-*a* at the location beyond the maximum limit of the resting state (e.g., in FIG. 5A13) to the location corresponding to the maximum limit of the resting state (e.g., in FIG. 5A14).

FIGS. 5A15-5A16 illustrate movement of device 100 in physical space (e.g., movement 5024) when no input is detected on touch screen 112 (e.g., no touch input by a contact is detected on touch screen 112). Since no input is detected, movement of device 100 changes the field of view of the camera of device 100 from a first position that is lower relative to physical building model 5006 (e.g., as shown in reference box 5019 in FIG. 5A15) to a second position that is higher relative to physical building model 5006 (e.g., as shown in reference box 5019 in FIG. 5A16), without adjusting the appearance of virtual building model 5012.

In contrast to FIGS. 5A15-5A16, FIGS. 5A17-5A18 illustrate movement of device 100 in physical space (e.g., movement 5028) when an input is detected on touch screen 112 (e.g., touch input by contact 5026-*a* is detected on touch screen 112). While continuing to detect the input (e.g., while contact 5026-*a* is maintained and kept stationary on touch screen 112), device 100 detects movement of device 100 in physical space (from a first position that is lower relative to physical building model 5006, as shown in reference box 5019 in FIG. 5A17, to a second position that is higher relative to physical building model 5006, as shown in reference box 5019 in FIG. 5A18). In response to the movement of the input (from movement of device 100 in physical space), device 100 adjusts the appearance of virtual building model 5012 by lifting virtual roof 5012-*a* up in accordance with the magnitude of the movement.

In FIGS. 5A19-5A20, while continuing to detect the input (e.g., while contact 5026 is maintained on touch screen 112), device 100 detects movement of the input relative to physical building model 5006 (e.g., a drag gesture by contact 5026) and adjusts the appearance of virtual building model 5012 (e.g., lifting virtual roof 5012-*a* up further from the virtual building model 5012) in accordance with a magnitude of movement of the input relative to physical building model 5006. In some embodiments, as shown in FIG. 5A20, as virtual roof 5012-*a* continues to lift up, floors of the virtual building model 5012 lift up and expand (e.g., showing first floor 5012-*d*, second floor 5012-*c*, and third floor 5012-*b*).

As shown in FIGS. 5A17-5A20, as the input moves up (whether the movement of the input is due to movement of device 100 while the contact (e.g., contact 5026-*a*) is maintained and kept stationary on touch screen 112 or whether the movement of the input is due to movement of the contact across touch screen 112 while device 100 is held substantially stationary in the physical space), device 100 updates the display of virtual building model 5012 so as to maintain display of the initial contact point on virtual roof 5012-*a* at the location of contact 5026.

FIGS. 5A21-5A24 illustrate changing a virtual environment setting (e.g., time of day) for the augmented reality environment in response to an input to navigate through time in the augmented reality environment. In FIGS. 5A21-5A24, device 100 detects an input (e.g., a swipe gesture from left to right by contact 5030) that changes the virtual environment setting and in response, device 100 changes the time of day in the augmented reality environment (e.g., by adjusting the appearance of virtual building model 5012 and applying a filter to the portion of the representation of the field of view of the camera that is not obscured by virtual building model 5012). In FIG. 5A21, the time of day in the augmented reality environment is morning, with the shadows of virtual building model 5012 and the shadows of virtual objects (e.g., virtual trees, virtual bushes, a virtual person, and a virtual car) to the right of the objects. As contact 5030 moves from left to right, the time of day in the augmented reality environment changes from morning to night (e.g., in accordance with the speed and/or distance of the input movement) (e.g., changing from morning in FIG. 5A21 to midday in FIG. 5A22 to afternoon in 5A23 to night in FIG. 5A24). In some embodiments, device 100 applies a filter to the portions of the live view that are not obscured by the virtual scene (e.g., to wallpaper 5007) in addition to adjusting the appearance of the virtual scene. For example, in FIG. 5A24 (e.g., when the virtual environment setting is changed to night mode), a different filter is applied to wallpaper 5007 (e.g., illustrated by a first shading pattern) in addition to adjusting the appearance of the virtual scene for night mode (e.g., illustrated by a second shading pattern).

FIGS. 5A25-5A27 illustrate changing the virtual environment setting for the augmented reality environment in response to an input (e.g., a tap input on a displayed button) that switches between different virtual environments for the virtual user interface object (e.g., virtual building model 5012), where different virtual environments are associated with different interactions for exploring the virtual user interface object (e.g., predefined virtual environments such as landscape view, interior view, day/night view). In FIG. 5A25, landscape button 5014 is selected, and the landscape view for virtual building model 5012 is displayed (e.g., with virtual trees, virtual bushes, a virtual person, and a virtual car). In FIGS. 5A26-5A27, device 100 detects an input on interior button 5016, such as a tap gesture by contact 5032, and in response, displays the interior view for virtual building model 5012 (e.g., with no virtual trees, no virtual bushes, no virtual person, and no virtual car, but instead showing an expanded view of virtual building model 5012 with virtual first floor 5012-*d*, virtual second floor 5012-*c*, virtual third floor 5012-*b*, and virtual roof 5012-*a*). In some embodiments, when the virtual environment setting is changed (e.g., to the interior view), the surrounding physical environment is blurred out (e.g., using a filter). For example, although not shown in FIG. 5A27, in some embodiments, wallpaper 5007 is blurred out when the virtual environment setting is changed to the interior view.

FIGS. 5A28-5A40 illustrate example user interfaces for transitioning between viewing a virtual model in the augmented reality environment and viewing simulated views of the virtual model from the perspectives of objects in the virtual model, in accordance with some embodiments.

FIG. 5A28, like FIG. 5A4, illustrates a view of an augmented reality environment displayed on touch screen 112 of device 100, including a live view of the physical space as captured by the camera of device 100, virtual building model 5012, virtual vehicle 5050, and virtual person 5060. In addition, reference box 5019 in FIG. 5A28 illustrates the position of device 100 relative to table 5004 and physical building model 5006, from the perspective of user 5002 (e.g., as shown in FIGS. 5A1 and 5A2).

FIGS. 5A29-5A31 illustrate a transition from FIG. 5A28. In particular, FIGS. 5A29-5A31 illustrate a transition from a view of the augmented reality environment (e.g., shown in FIG. 5A28) to a simulated view of the virtual model from the perspective of virtual vehicle 5050 in the virtual model.

FIG. 5A29 shows input 5052 detected at a location that corresponds to vehicle 5050 (e.g., a tap gesture on touch screen 112 of device 100, or selection using a separate input device along with a focus indicator).

FIGS. 5A30-5A31 illustrate the transition from the view of the augmented reality environment to a simulated view of the virtual model from the perspective of vehicle 5050, displayed in response to detecting input 5052. In particular, FIG. 5A30 illustrates the view shown on device 100 during an animated transition from the view shown in FIG. 5A29 to the simulated perspective view from vehicle 5050 (e.g., from the perspective of a person, such as a driver or passenger, inside vehicle 5050), and FIG. 5A31 illustrates the simulated perspective view from vehicle 5050.

In some embodiments, the transition from the view of the augmented reality environment to the simulated perspective view includes an animated transition. Optionally, the transition includes an animation of flying from the position of viewing the augmented reality environment to the position of vehicle 5050 (e.g., the position of a person inside vehicle 5050). For example, FIG. 5A30 shows a view of the virtual model from a position between the position of the user in FIG. 5A29 and the position of vehicle 5050 (e.g., partway through the animated transition), even though the user has not moved device 100 (e.g., the position of device 100 relative to physical building model 5006 as shown in reference box 5019 in FIG. 5A30 is the same as in FIG. 5A29).

In some embodiments, portions of the field of view of device 100 (e.g., the cameras of device 100) continue to be displayed during the animated transition to the perspective view from vehicle 5050. For example, as shown in FIG. 5A30, wallpaper 5007 and the edge of table 5004 are displayed during the animated transition to the simulated perspective view (e.g., as if viewed from the position corresponding to the view shown in FIG. 5A30, between the position of the user in FIG. 5A29 and the position of vehicle 5050). In some embodiments, the field of view of the cameras ceases to be displayed during the animated transition to the perspective view from vehicle 5050 (e.g., wallpaper 5007 and the edge of table 5004 are not displayed during the animated transition, and optionally, corresponding portions of the virtual model are displayed instead).

In FIG. 5A31, the simulated perspective view from vehicle 5050, also shows control 5054, including directional arrows (up, down, left, and right) for controlling movement (e.g., direction of movement) of vehicle 5050 (e.g., the virtual object from which the simulated perspective view is displayed). In the example shown in FIG. 5A31, up-arrow 5056 controls forward movement of vehicle 5050. Thus, in some embodiments, the user can control the movement of a respective virtual object (e.g., vehicle 5050), while the simulated view from the perspective of that virtual object is displayed. In some embodiments, the user cannot control the movement of the respective virtual object (e.g., virtual vehicle 5050 and/or virtual person 5060) in the virtual model, while the view of the augmented reality environment is displayed. For example, in some embodiments, the user cannot control the movement of vehicle 5050 in the view of the augmented reality environment in FIG. 5A28. In some embodiments, vehicle 5050 moves autonomously in the virtual model while the view of the augmented reality environment (e.g., FIG. 5A28) is displayed.

FIGS. 5A32-5A33 illustrate a transition from FIG. 5A31. In particular, FIGS. 5A32-5A33 illustrate user-controlled movement of vehicle 5050 in the virtual model. FIG. 5A32 shows input 5058 detected at a location that corresponds to up-arrow 5056 (shown in FIG. 5A31) of control 5054. In response to input 5058 on up-arrow 5056, vehicle 5050 moves forward in the virtual model. Accordingly, FIG. 5A33 illustrates that an updated simulated perspective view of the virtual model, corresponding to forward movement of vehicle 5050 in the virtual model, is displayed. For example, in the updated simulated perspective view in FIG. 5A33, less of virtual building model 5012 is visible, and person 5060 appears closer than in FIG. 5A32.

FIGS. 5A34-5A35 illustrate a transition from FIG. 5A33. In particular, FIGS. 5A34-5A35 illustrate a transition from the simulated view of the virtual model from the perspective of vehicle 5050 to a simulated view of the virtual model from the perspective of virtual person 5060. FIG. 5A34 shows input 5062 detected at a location that corresponds to person 5060. FIG. 5A35 illustrates a simulated view of the virtual model from the perspective of person 5060, displayed in response to detecting input 5062. In some embodiments, device 100 displays an animated transition between the simulated perspective view from vehicle 5050 and the simulated perspective view from person 5060 (e.g., as if the user were moving from the position of vehicle 5050 (e.g., within vehicle 5050) to the position of person 5060).

FIGS. 5A36-5A37 illustrate a transition from FIG. 5A35. In particular, FIGS. 5A36-5A37 illustrate changing the view of the virtual model from the perspective of person 5060 (e.g., the selected virtual object) in response to movement of device 100 (e.g., in physical space).

FIG. 5A36 shows arrow 5064 indicating movement of device 100 toward the left, and rotation of device 100 about a z-axis (e.g., such that the right edge of device 100 moves closer to the user, and the left edge of device 100 moves further away from the user). FIG. 5A37 shows an updated simulated perspective view of the virtual model from the perspective of person 5060, displayed in response to detecting the movement of device 100. The updated simulated perspective view in FIG. 5A37 corresponds to the view of the virtual model as if person 5060 moved toward the left and turned his head slightly toward the right relative to his position in FIG. 5A36. Reference box 5019 in FIG. 5A37 shows the new position of device 100 relative to physical building model 5006 after device 100 is moved as indicated by arrow 5064.

In some embodiments, control 5054 (shown, for example, in FIG. 5A31, but not shown in FIGS. 5A35, 5A36) is displayed while displaying the simulated view from the perspective of person 5060, so that, while the simulated view from the perspective of person 5060 is displayed (e.g., FIG. 5A35), the user can control movement of person 5060 in the virtual model using the arrows on control 5054.

FIGS. 5A38-5A40 illustrate a transition from FIG. 5A37. In particular, FIGS. 5A38-5A40 illustrate a transition from the simulated perspective view shown in FIG. 5A37 back to a view of the augmented reality environment.

FIG. 5A38 shows input 5066. In the example shown in 5A38, input 5066 is a pinch gesture (e.g., from a minimum zoom level for the simulated perspective view of the virtual model). In some embodiments, input 5066 is a gesture (e.g., a tap) on an "empty" location in the virtual model (e.g., a location from which a simulated perspective view is not available, such as a patch of grass). In some embodiments, input 5066 is a gesture (e.g., a tap) on an affordance for displaying, or redisplaying, the augmented reality environment (e.g., an icon, such as an "X", for exiting the simulated perspective view).

FIGS. 5A39-5A40 illustrate the transition from the simulated view of the virtual model from the perspective of person 5060 to a view of the augmented reality environment, displayed in response to detecting input 5066. In particular, FIG. 5A39 illustrates the view shown on device 100 during an animated transition from the view shown in FIG. 5A38 to the view of the augmented reality environment, and FIG. 5A40 illustrates the view of the augmented reality environment. In some embodiments, the transition from the simulated perspective view to the view of the augmented reality environment includes an animated transition that optionally includes an animation of flying from the position of the virtual object (from which the simulated perspective view is shown) to the position of viewing the augmented reality environment.

Because device 100 is at a different position relative to physical building model 5006 in FIG. 5A38-5A40 than in FIGS. 5A28-5A30, the view of the augmented reality as shown in FIG. 5A40 corresponds to the new position of device 100 and is different from that shown in FIG. 5A28. Similarly, FIG. 5A39 shows a view of the virtual model from a position between the position of person 5060 in FIG. 5A38 and the position of the user in FIG. 5A40 (e.g., partway through the animated transition), even though the user has not moved device 100 (e.g., the position of device 100 relative to physical building model 5006 as shown in reference box 5019 is the same in each of FIGS. 5A38-5A40).

Similar to the animated transition to the simulated perspective view, described above with reference to FIGS. 5A29-5A31, in some embodiments, portions of the field of view of device 100 (e.g., the cameras of device 100) are visible during the animated transition from the simulated perspective view to the view of the augmented reality environment. For example, as shown in FIG. 5A39, wallpaper 5007 is displayed during the animated transition from the simulated perspective view (e.g., as if viewed from the position corresponding to the view shown in FIG. 5A39, between the position of person 5060 and the position of the user in FIG. 5A40). In some embodiments, the field of view of the cameras ceases to be displayed during the animated transition to the view of the augmented reality environment (e.g., wallpaper 5007 is not displayed during the animated transition, and optionally, corresponding portions of the virtual model are displayed instead).

FIGS. 5B1-5B41 illustrate examples of systems and user interfaces for three-dimensional manipulation of virtual user interface objects, in accordance with some embodiments. The user interfaces in these figures are used to illustrate the processes described below, including the processes in FIGS. 6A-6D, 7A-7C, and 8A-8C. For convenience of explanation, some of the embodiments will be discussed with reference to operations performed on a device with a touch-sensitive display system 112. Similarly, analogous operations are, optionally, performed on a computer system (e.g., as shown in FIG. 5B2) with a headset 5008 and a separate input device 5010 with a touch-sensitive surface in response to detecting the contacts on the touch-sensitive surface of the input device 5010 while displaying the user interfaces shown in the figures on the display of headset 5008, along with a focus indicator.

FIGS. 5B1-5B4 illustrate a context in which user interfaces described with regard to 5B5-5B41 are used.

FIG. 5B1 illustrates physical space 5200 in which a user 5202 and a table 5204 are located. Device 100 is held by user 5202 in the user's hand 5206. A reference mat 5208 is located on table 5204.

FIG. 5B2 shows a view of virtual-three dimensional space displayed on display 112 of device 100. Reference mat 5208 is in the field of view of one or more cameras (e.g., optical sensors 164) of device 100 (hereinafter referred to as "a camera," which indicates one or more cameras of device 100). Display 112 shows a live view of the physical space 5200 as captured by the camera, including a displayed version **5208*b* of physical reference mat 5208*a*. A virtual user interface object (virtual box 5210) is displayed in virtual-three dimensional space displayed on display 112. In some embodiments, virtual box 5210 is anchored to reference mat 5208*b*, such that a view of virtual box 5210 will change as the displayed view 5208*b* of the reference mat changes in response to movement of reference mat 5208*a* in physical space 5200 (e.g., as shown in FIGS. 5B2-5B3). Similarly, a view of virtual box 5210 will change as a view of the displayed version 5208*b* changes in response to movement of device 100 relative to reference mat 5208*a***.

In FIG. 5B3, the reference mat 5208 has been rotated such that the longer side of reference mat **5208*a* is adjacent to device 100 (whereas in FIG. 5B2 the shorter side of reference mat 5208*a* was adjacent to device 100). The rotation of the displayed version 5208*b* of reference mat from FIGS. 5B2 to 5B3 occurs as a result of the rotation of the reference mat 5208*a* in physical space 5200**.

In FIGS. 5B3-5B4, the device 100 has moved closer to reference mat **5208*a*. As a result, the sizes of the displayed version 5208*b* of the reference mat and virtual box 5210** have increased.

FIGS. 5B5-5B41 show a larger view of device 100 and, to provide a full view of the user interface displayed on display 112, do not show the user's hands 5206.

FIG. 5B5 illustrates a user interface, displayed on display 112, for creating and adjusting virtual user interface objects. The user interface includes an avatar 5212, a toggle 5214 (e.g., for toggling between a virtual reality display mode and an augmented reality display mode), a new object control 5216 (e.g., for adding a new object 5216 to the virtual three-dimensional space displayed by display 112), a color selection palette 5218 that includes a number of controls that correspond to available colors (e.g., for selecting a color for a virtual object), and a deletion control 5220 (e.g., for removing a virtual user interface object from the virtual three-dimensional space). In FIG. 5B5, toggle 5214 indicates that a current display mode is an augmented reality display mode (e.g., display 112 is displaying virtual box 5210 and a view of physical space 5200 as captured by a camera of device 100). FIGS. 5B37-5B39 illustrate a virtual reality display mode. In FIGS. 5B37-5B39, the appearance of toggle 5214 is altered to indicate that a virtual reality display mode is active (and that input at the toggle 5214 will cause a transition from the virtual reality display mode to the augmented reality display mode).

FIGS. 5B6-5B17 illustrate inputs that cause movement of virtual box 5210.

In FIG. 5B6, an input (e.g., a selection and movement input) by a contact 5222 (e.g., a contact with touch-sensitive display 112) is detected on a first surface 5224 of virtual box 5210. When a surface of virtual box 5210 is selected, movement of virtual box 5210 is limited to movement in a plane that is parallel to the selected surface. In response to detection of the contact 5222 that selects the first surface 5224 of virtual box 5210, movement projections 5226 are shown extending from virtual box 5210 to indicate the plane of movement of virtual box 5210 (e.g., a plane of movement that is parallel to the selected first surface 5224 of virtual box 5210).

In FIGS. 5B6-5B7, the contact 5222 has moved along the surface of touch-sensitive display 112 in a direction indicated by arrow 5228. In response to the movement of the contact 5222, virtual box 5210 has moved within the plane indicated by the movement projections 5226 in the direction indicated by arrow 5228. In FIGS. 5B7-5B8, the contact 5222 has moved along the surface of touch-sensitive display 112 in a direction indicated by arrow 5230. In response to the movement of the contact 5222, virtual box 5210 has moved within the plane indicated by the movement projections

5226 in the direction indicated by arrow 5230. In FIG. 5B9, the contact 5222 has lifted off of touch-sensitive display 112, and movement projections 5226 are no longer displayed.

In FIG. 5B10, an input (e.g., a selection and movement input) by a contact 5232 is detected on a second surface 5234 of virtual box 5210. In response to detection of the contact 5232 that selects the second surface 5234 of virtual box 5210, movement projections 5236 are shown extending from virtual box 5210 to indicate the plane of movement of virtual box 5210 (e.g., a plane of movement that is parallel to the selected second surface 5234 of virtual box 5210).

In FIGS. 5B10-5B11, the contact 5232 has moved along the surface of touch-sensitive display 112 in a direction indicated by arrow 5238. In response to the movement of the contact 5232, virtual box 5210 has moved within the plane indicated by the movement projections 5236 in the direction indicated by arrow 5238. As virtual box 5210 moves upward such that it is hovering over displayed reference mat 5208*b*, shadow 5240 of virtual box 5210 is displayed to indicate that the virtual box 5210 is hovering.

In FIGS. 5B11-5B12, the contact 5232 has moved along the surface of touch-sensitive display 112 in a direction indicated by arrow 5242. In response to the movement of the contact 5232, virtual box 5210 has moved within the plane indicated by the movement projections 5236 in the direction indicated by arrow 5242. In FIG. 5B13, the contact 5232 has lifted off of touch-sensitive display 112 and movement projections 5236 are no longer displayed.

In FIG. 5B14, an input (e.g., a selection and movement input) by a contact 5233 is detected on the first surface 5224 of virtual box 5210. In response to detection of the contact 5233 that selects the first surface 5224 of virtual box 5210, movement projections 5237 are shown extending from virtual box 5210 to indicate the plane of movement of virtual box 5210 (e.g., a plane of movement that is parallel to the selected first surface 5224 of virtual box 5210).

In FIGS. 5B14-5B15, the contact 5233 has moved along the surface of touch-sensitive display 112 in a direction indicated by arrow 5239. In response to the movement of the contact 5233, virtual box 5210 has moved within the plane indicated by the movement projections 5237 in the direction indicated by arrow 5238. The movement of contact 5232 illustrated in FIGS. 5B10-5B11 is in the same direction as the movement of contact 5233 illustrated in FIGS. 5B14-5B15. Because the movement of contact 5232 occurs while second surface 5234 of virtual box 5210 is selected, the plane of movement of virtual box 5210 in FIGS. 5B10-5B11 differs from the plane of movement of virtual box 5210 in FIGS. 5B14-5B15, in which the movement of contact 5233 occurs while first surface 5224 of virtual box 5210 is selected. In this manner, a selection and movement input with the same direction of movement of the input causes different movement of the virtual box 5210 depending on the surface of the virtual box 5210 that is selected.

In FIGS. 5B15-5B16, the contact 5233 has moved along the surface of touch-sensitive display 112 in a direction indicated by arrow 5243. In response to the movement of the contact 5233, virtual box 5210 has moved within the plane indicated by the movement projections 5237 in the direction indicated by arrow 5243. In FIG. 5B17, the contact 5233 has lifted off of touch-sensitive display 112 and movement projections 5237 are no longer displayed.

FIGS. 5B18-5B21 illustrate inputs that cause resizing of virtual box 5210.

In FIG. 5B18, an input (e.g., a resizing input) by contact 5244 is detected on the first surface 5224 of virtual box 5210. In some embodiments, when a contact remains at a location that corresponds to a surface of a virtual object for a period of time that increases above a resizing time threshold, subsequent movement of the contact (and/or movement of the device 100) causes resizing of the virtual object. In FIG. 5B19, contact 5244 has remained in contact with the first surface 5224 of virtual box 5210 for a period of time that has increased above the resizing time threshold, and resizing projections 5246 are shown to indicate an axis (that is perpendicular to the selected first surface 5224) along which virtual box 5210 will be resized in response to subsequent movement of the contact 5244.

In FIGS. 5B19-FIG. 5B20, contact 5244 has moved along a path indicated by arrow 5248. In response to the movement of the contact 5244, the size of virtual box 5210 has increased along the axis indicated by the resizing projections 5246 in the direction indicated by arrow 5248. In FIG. 5B21, the contact 5244 has lifted off of touch-sensitive display 112, and projections 5246 are no longer displayed.

FIGS. 5B22-5B27 illustrate placement of an object insertion cursor and placement of a virtual box using an insertion cursor.

In FIG. 5B22, an input (e.g., a tap input) by contact 5250 is detected at a location that corresponds to the displayed version 5208*b* of physical reference mat 5208*a*. In response to detection of the contact 5250, an insertion cursor 5252 is displayed at a location on display 112 that corresponds to the contact 5250; in FIG. 5B23, the contact 5250 has lifted off of touch-sensitive display 112 and insertion cursor 5252 is shown. In some embodiments, the insertion cursor 5252 ceases to be displayed after a predetermined period of time. In FIG. 5B24, insertion cursor 5252 has ceased to be displayed and an input (e.g., a tap input) by a contact 5254 is detected at a location that is different from the location where insertion cursor 5252 had been shown (as indicated in FIG. 5B23). In response to detection of the contact 5254, a new insertion cursor 5256 is displayed at a location on display 112 that corresponds to the contact 5254. In FIG. 5B25, the contact 5254 has lifted off of touch-sensitive display 112 and insertion cursor 5256 is shown.

In FIG. 5B26, insertion cursor 5256 has ceased to be displayed and an input (e.g., a tap input) by a contact 5258 is detected at a location that corresponds to the location where insertion cursor 5256 had been shown (as indicated in FIG. 5B25). In response to detection of the contact 5258 at the location where an insertion cursor had been placed, a new virtual user interface object (virtual box 5260) is displayed on display 112 at a location that corresponds to contact 5258. In FIG. 5B27, the contact 5258 has lifted off of touch-sensitive display 112.

FIGS. 5B28-5B31 illustrate resizing of virtual box 5260 by movement of device 100.

In FIG. 5B28, an input (e.g., a resizing input) by contact 5262 with touch-sensitive display 112 is detected on a surface 5264 of virtual box 5260. In FIG. 5B29, contact 5262 has remained in contact with surface 5264 of virtual box 5260 for a period of time that has increased above the resizing time threshold, and resizing projections 5266 are shown to indicate an axis (that is perpendicular to the selected surface 5264) along which virtual box 5260 will be resized in response to subsequent movement of the device 100. In FIGS. 5B29-5B30, device 100 moves along a path indicated by arrow 5268 while contact 5262 remains in contact with touch-sensitive display 112. In response to the movement of the device 100, the size of virtual box 5260 increases along the axis indicated by resizing projections 5266, as shown in FIG. 5B30. In FIG. 5B31, the contact

5262 has lifted off of touch-sensitive display 112 and resizing projections 5266 are no longer displayed.

FIGS. 5B32-5B35 illustrate insertion of a new virtual object using new object control 5216.

In FIG. 5B32, an input (e.g., a tap input) by contact 5270 is detected at a location on the displayed version 5208*b* of physical reference mat 5208*a*. In response to detection of the contact 5270, an insertion cursor 5272 is displayed at a location on display 112 that corresponds to the contact 5270. In FIG. 5B33, the contact 5270 has lifted off of touch-sensitive display 112 and insertion cursor 5272 is shown. In FIG. 5B34, insertion cursor 5272 has ceased to be displayed and an input by contact 5274 with touch-sensitive display 112 (e.g., a tap input) is detected at a location that corresponds to new object control 5216. In FIG. 5B35, in response to the input at new object control 5216 (e.g., after placement of the insertion cursor 5272), a new virtual user interface object (virtual box 5276) is displayed on display 112 at a location that corresponds to the location where insertion cursor 5272 was shown.

FIGS. 5B36-5B37 illustrate a pinch-to-zoom input that causes a transition from an augmented reality display mode to a virtual reality display mode. FIGS. 5B39-5B40 illustrate an input at toggle 5214 for returning from the virtual reality display mode to the augmented reality display mode.

In FIG. 5B36, contacts 5278 and 5280 with touch-sensitive display 112 are simultaneously detected. A pinch gesture is detected in which contacts 5278 and 5280 are moved simultaneously along the paths indicated by arrows 5282 and 5284, respectively, as indicated in FIGS. 5B36-5B37. In response to detecting the pinch gesture, the display of virtual boxes 5210, 5260, and 5276 is zoomed (e.g., zoomed out, such that the displayed sizes of the virtual boxes 5210, 5260, and 5276 become smaller). In some embodiments, the gesture for zooming causes a transition from an augmented reality display mode to a virtual reality display mode (e.g., because the zoomed view of the boxes no longer aligns with the field of view of the camera of device 100). In some embodiments, in a virtual reality display mode, physical objects in the field of view of the camera of device 100 (e.g., reference mat 5208) cease to be displayed, or a virtual (rendered) version of one or more of the physical objects are displayed.

In some embodiments, in a virtual reality display mode, virtual objects displayed by device 100 are locked to the frame of reference of the device 100. In FIGS. 5B37-5B38, the position of device 100 has changed. Because device 100 is in a virtual reality display mode, the positions of virtual boxes 5210, 5260, and 5276 have not changed in response to the changed position of device 100.

In FIG. 5B39, an input (e.g., a tap input) by contact 5286 is detected at a location that corresponds to toggle 5214. In response to the input by contact 5286, a transition from the virtual reality display mode to the augmented reality display mode occurs. FIG. 5B40 illustrates the user interface, displayed on display 112, after the transition to the augmented reality display mode in response to the input by contact 5286. The transition includes re-displaying the field of view of the camera of device 100 (e.g., re-displaying the displayed view 5208*b* of the reference mat). In some embodiments, the transition includes zooming (e.g., zooming in) the display of virtual boxes 5210, 5260, and 5276 (e.g., to realign the boxes with the field of view of the camera of device 100).

In some embodiments, in an augmented reality display mode, virtual objects displayed by device 100 are locked to physical space 5200 and/or a physical object (e.g., reference mat 5208) in physical space 5200. In FIGS. 5B40-5B41, the position of device 100 has changed. Because device 100 is in an augmented reality display mode, the virtual boxes 5210, 5260, and 5276 are locked to the reference mat 5208*a* and the positions of the virtual boxes on the display 112 are changed in response to the changed position of device 100.

FIGS. 5C1-5C30 illustrate examples of systems and user interfaces for transitioning between viewing modes of a displayed simulated environment, in accordance with some embodiments. The user interfaces in these figures are used to illustrate the processes described below, including the processes in FIGS. 10A-10E. For convenience of explanation, some of the embodiments will be discussed with reference to operations performed on a device with a touch-sensitive display system 112. Similarly, analogous operations are, optionally, performed on a computer system (e.g., as shown in FIG. 5A2) with a headset 5008 and a separate input device 5010 with a touch-sensitive surface in response to detecting the contacts on the touch-sensitive surface of the input device 5010 while displaying the user interfaces shown in the figures on the display of headset 5008, along with a focus indicator.

FIGS. 5C1-5C2 illustrate a context in which user interfaces described with regard to 5C3-5C30 are used.

FIG. 5C1 illustrates physical space 5200 in which a user and a table 5204 are located. Device 100 is held by the user in the user's hand 5206. A reference mat 5208 is located on table 5204. A view of a simulated environment is displayed on display 112 of device 100. Reference mat 5208 is in the field of view of one or more cameras (e.g., optical sensors 164) of device 100 (hereinafter referred to as "a camera," which indicates one or more cameras of device 100). Display 112 shows a live view of the physical space 5200 as captured by the camera, including a displayed version 5208*b* of physical reference mat 5208*a*. Two virtual user interface objects (first virtual box 5302 and second virtual box 5304) are displayed in the simulated environment displayed on display 112. In a first viewing mode (e.g., an augmented reality viewing mode), virtual boxes 5302 and 5304 are anchored to reference mat 5208*b*, such that a view of virtual boxes 5302 and 5304 will change as the displayed view 5208*b* of the reference mat changes in response to movement of reference mat 5208*a* in physical space 5200 (e.g., a fixed spatial relationship is maintained between virtual boxes 5302 and 5304 and the physical environment, including reference mat 5208*a*). Similarly, in the first viewing mode, a view of virtual boxes 5302 and 5304 changes in response to movement of device 100 relative to reference mat 5208*a*.

In FIG. 5C2, the device 100 has moved closer to reference mat 5208*a*. As a result, the sizes of the displayed version 5208*b* of the reference mat and virtual boxes 5302 and 5304 have increased.

FIGS. 5C3-5C30 show a larger view of device 100 and, to provide a full view of the user interface displayed on display 112, do not show the user's hands 5206. Features of the user interface are described further above with regard to FIG. 5B5.

FIGS. 5C4-5C6 illustrate an input gesture (including an upward swipe and a downward swipe) to move virtual box 5302 while the virtual box is displayed in an augmented reality viewing mode. Because the input gesture described with regard to FIGS. 5C4-5C6 is not a gesture that meets mode change criteria (e.g., for changing a viewing mode from an augmented reality viewing mode to a virtual reality viewing mode), a view of virtual boxes 5302 and 5304 changes in response to subsequent movement of device 100, as illustrated in FIGS. 5C7-5C8 (e.g., such that a fixed spatial relationship is maintained between virtual boxes 5302 and 5304 and the physical environment, including reference mat 5208*a*).

Another example of gestures that do not meet mode change criteria are a resizing gesture (e.g., as described above with regard to FIGS. 5B18-5B21).

In FIG. 5C4, an input (e.g., a selection and movement input) by a contact 5306 is detected on a surface 5308 of virtual box 5302. In response to detection of the contact 5306 that selects the surface 5308 of virtual box 5302, movement projections 5310 are shown extending from virtual box 5302 to indicate the plane of movement of virtual box 5302 (e.g., a plane of movement that is parallel to the selected surface 5308 of virtual box 5302).

In FIGS. 5C4-5C5, the contact 5306 moves along the surface of touch-sensitive display 112 in a direction indicated by arrow 5312. In response to the movement of the contact 5306, virtual box 5302 has moved within the plane indicated by the movement projections 5310 in the direction indicated by arrow 5312. As virtual box 5302 moves upward such that it is hovering over displayed reference mat 5208*b*, shadow 5314 of virtual box 5302 is displayed to indicate that the virtual box 5210 is hovering.

In FIGS. 5C5-5C6, the contact 5306 moves along the surface of touch-sensitive display 112 in a direction indicated by arrow 5316. In response to the movement of the contact 5306 virtual box 5302 has moved within the plane indicated by the movement projections 5310 in the direction indicated by arrow 5316. In FIG. 5C7, the contact 5306 has lifted off of touch-sensitive display 112 and movement projections 5310 are no longer displayed.

FIGS. 5C7-5C8 illustrate movement of the device 100 along a path indicated by arrow 5318. As device 100 is moved, the positions of virtual boxes 5302 and 5304 as displayed be device 100 change on display 112 (e.g., such that a fixed spatial relationship is maintained between virtual boxes 5302 and 5304 and reference mat 5208*a* in the physical environment of device 100).

FIGS. 5C9-5C10 illustrate an input gesture (a pinch gesture) that meets mode change criteria (e.g., causing a change in a viewing mode from an augmented reality viewing mode to a virtual reality viewing mode).

In FIG. 5C9, contacts 5320 and 5324 are detected at touch-sensitive display 112. In FIGS. 5C9-5C11, contact 5320 moves along a path indicated by arrow 5322 and contact 5324 moves along a path indicated by arrow 5324. In response to the simultaneous movement of contacts 5320 and 5324 that decreases the distance between contacts 5320 and 5324, the displayed view of the simulated environment, including virtual boxes 5302 and 5304, is zoomed out (e.g., such that the sizes of virtual boxes 5302 and 5304 increase on display 112). As the zoom input is received, a transition from an augmented reality viewing mode to a virtual reality viewing mode occurs. A transition animation that occurs during the transition includes a gradual fading out of the displayed view of the physical environment. For example, the displayed view of table 5204 and displayed view 5208*b* of reference mat 5208*a*, as captured by one or more cameras of device 100, gradually fade out (e.g., as shown at FIGS. 5C10-5C11). The transition animation includes a gradual fade in of virtual grid lines of a virtual reference grid 5328 (e.g., as shown at FIGS. 5C11-5C12). During the transition, an appearance of toggle 5214 (e.g., for toggling between a virtual reality display mode and an augmented reality display mode) is changed to indicate the current viewing mode (e.g., as shown at FIGS. 5C10-5C11). After liftoff of contacts 5320 and 5324, virtual boxes 5302 and 5304 in the simulated environment continue to move and decrease in size (e.g., the alteration of the simulated environment continues to have “momentum” that causes movement after the end of the input gesture).

In FIGS. 5C12-5C13, device 100 is moved along a path indicated by arrow 5330. Because the pinch-to-zoom input gesture described with regard to FIGS. 5C9-5C11 caused a change from an augmented reality viewing mode to a virtual reality viewing mode, the positions of virtual boxes 5302 and 5304 does not change in response to the movement of device 100 (e.g., in the virtual reality viewing mode, a fixed spatial relationship is not maintained between virtual boxes 5302 and 5304 and the physical environment).

In FIGS. 5C13-5C14, device 100 is moved along a path indicated by arrow 5332.

FIGS. 5C15-5C18 illustrate input for inserting a virtual box in the simulated environment displayed on device 100 while the simulated environment is displayed in a virtual reality viewing mode.

In FIG. 5C15, an input (e.g., a tap input) by contact 5334 is detected on touch-sensitive display 112. In response to detection of the contact 5334, an insertion cursor 5336 is displayed at a location on display 112 that corresponds to the contact 5334, as shown in FIG. 5C16. In FIG. 5C17, insertion cursor 5336 has ceased to be displayed and an input by contact 5338 (e.g., a tap input) is detected at a location that corresponds to new object control 5216. In FIG. 5C18, in response to the input at new object control 5216 (e.g., after placement of the insertion cursor 5336), a new virtual user interface object (virtual box 5340) is displayed at a location that corresponds to the location where insertion cursor 5336 was shown.

FIGS. 5C19-5C20 illustrate input for manipulating a virtual user interface object in the simulated environment displayed on device 100 while the simulated environment is displayed in a virtual reality viewing mode.

In FIG. 5C19, an input (e.g., a selection and movement input) by a contact 5342 is detected on a surface 5344 of virtual box 5340. In response to detection of the contact 5342 that selects the surface 5344 of virtual box 5340, movement projections 5348 are shown extending from virtual box 5340 to indicate the plane of movement of virtual box 5340 (e.g., a plane of movement that is parallel to the selected surface 5344 of virtual box 5340). In FIGS. 5194-5C20, the contact 5342 moves along the surface of touch-sensitive display 112 in a direction indicated by arrow 5346. In response to the movement of the contact 5342, virtual box 5340 has moved within the plane indicated by the movement projections 5348 in the direction indicated by arrow 5346.

In FIG. 5C21, the contact 5342 has lifted off of touch-sensitive display 112 and movement projections 5384 are no longer displayed.

FIGS. 5C22-5C23 illustrate an input gesture (e.g., a rotational gesture) to change the perspective of the simulated environment.

In FIG. 5C22, a contact 5350 is detected at touch-sensitive display 112. In FIGS. 5C22-5C23, contact 5350 moves along a path indicated by arrow 5352. As the contact 5350 moves, the simulated environment rotates. In FIG. 5C23, the positions of virtual reference grid 5328 and virtual boxes 5302, 5304, and 5340 have rotated in response to the input by contact 5350.

In FIGS. 5C24-5C25, device 100 is moved along a path indicated by arrow 5354. Because the simulated environment displayed on display 112 in FIGS. 5C24-5C25 is displayed in a virtual reality viewing mode, the positions of virtual boxes 5302 and 5304 on display 112 does not change in response to the movement of device 100.

FIGS. 5C26-5C27 illustrate an input gesture (a depinch gesture) that cause a change in a viewing mode from a virtual reality viewing mode to an augmented reality viewing mode.

In FIG. 5C26, contacts 5356 and 5360 are detected at touch-sensitive display 112. In FIGS. 5C26-5C27, contact 5356 moves along a path indicated by arrow 5358 and contact 5360 moves along a path indicated by arrow 5362. In response to the simultaneous movement of contacts 5356 and 5360 that increases the distance between contacts 5356 and 5360, the displayed view of the simulated environment, including virtual boxes 5302, 5304, and 5340, is zoomed in (e.g., such that the sizes of virtual boxes 5302, 5304, and 5340 increase on display 112). As the zoom input is received, a transition from a virtual reality viewing mode to an augmented reality viewing mode occurs. A transition animation that occurs during the transition includes a gradual fading out of the virtual reference grid 5328 (e.g., as shown at FIGS. 5C26-5C27). The transition animation includes a gradual fading in of a view of the physical environment. For example, table 5204 and reference mat 5208*a*, as captured by one or more cameras of device 100, gradually become visible on display 112 (e.g., as shown at FIGS. 5C28-5C30). During the transition, an appearance of toggle 5214 is changed to indicate the current viewing mode (e.g., as shown at FIGS. 5C27-5C28). After liftoff of contacts 5356 and 5360, virtual boxes 5302, 5304, and 5340 in the simulated environment continue to increase in size, move, and rotate (e.g., until the original spatial between virtual boxes 5302 and 5304 and reference mat 5208*a* is restored), as shown in FIG. 5C28-5C30.

In some embodiments, the virtual box 5340 that was added while a virtual reality viewing mode was active is visible in the alternate reality viewing mode, as shown in FIG. 5C30.

In some embodiments, a change in a viewing mode from a virtual reality viewing mode to an augmented reality viewing mode occurs in response to an input (e.g., a tap input) by a contact at a location corresponding to toggle 5214. For example, in response to a tap input detected at a location corresponding to toggle 5214, a transition from displaying a virtual reality viewing mode (e.g., as shown in FIG. 5C26) to an augmented reality viewing mode (e.g., as shown in FIG. 5C30) occurs. In some embodiments, during the transition, a transition animation that is the same as or similar to the animation illustrated at 5C26-5C30 is displayed.

FIGS. 5D1-5D14 illustrate examples of systems and user interfaces for updating an indication of a viewing perspective of a second computer system in a simulated environment displayed by a first computer system, in accordance with some embodiments. The user interfaces in these figures are used to illustrate the processes described below, including the processes in FIGS. 11A-11C. For convenience of explanation, some of the embodiments will be discussed with reference to operations performed on a device with a touch-sensitive display system 112. Similarly, analogous operations are, optionally, performed on a computer system (e.g., as shown in FIG. 5A2) with a headset 5008 and a separate input device 5010 with a touch-sensitive surface in response to detecting the contacts on the touch-sensitive surface of the input device 5010 while displaying the user interfaces shown in the figures on the display of headset 5008, along with a focus indicator.

FIGS. 5D1-5D2 illustrate a context in which user interfaces described with regard to 5D3-5D14 are used.

FIG. 5D1 illustrates physical space 5400 in which two users 5402 and 5408 and a table 5414 are located. A first device 5406 (e.g., a device 100) is held by first user 5402 in the first user's hand 5404. A second device 5412 (e.g., a device 100) is held by second user 5408 in the second user's hand 5410. A reference mat 5416*a* is located on table 5414.

FIG. 5D2 shows a view of virtual-three dimensional space displayed on display 5148 (e.g., a display 112) of device 5406. Reference mat 5416 is in the field of view of one or more cameras (e.g., optical sensors 164) of device 5406 (hereinafter referred to as "a camera," which indicates one or more cameras of device 5406). Display 5148 shows a live view of the physical space 5400 as captured by the camera, including a displayed version 5416*b* of physical reference mat 5416*a*. A virtual user interface object (virtual box 5420) in a simulated environment displayed on display 5418. In some embodiments, virtual box 5420 is anchored to reference mat 5416*b*, such that a view of virtual box 5420 will change as a view of the displayed version 5416*b* of the reference mat changes in response to movement of device 100 relative to reference mat 5416*a*. Features of the user interface are described further above with regard to FIG. 5B5.

FIGS. 5D3-5D111 include a sub-figure "a" that illustrates the orientation in physical space 5400 of first device 5406 and second device 5412 relative to table 5414 (e.g., as shown at FIG. 5D3*a*), a sub-figure "b" that illustrates a user interface of the first device 5412 (e.g., as shown at FIG. 5D3*b*), and a sub-figure "c" that illustrates a user interface of the second device 5412 (e.g., as shown at FIG. 5D3*c*). To provide a full view of the user interfaces, the user interfaces in FIGS. 5D3-5D11 do not show the hands that are holding the devices. Also, for clarity, the user interfaces in FIGS. 5D3-5D111 do not show the bodies of users 5402 and 5408. It is to be understood that any part of the body of user 5408 that is in the field of view of a camera of device 5406 will typically be visible in a user interface displayed on device 5406 (although the view of the user's body may be blocked by a virtual user interface object or other user interface element). For example, in FIG. 5D2, the body and hand of user 5408 is visible in the user interface displayed by device 5409.

FIGS. 5D3-5D4 illustrate movement of second device 5412.

In FIG. 5D3*a*, second device 5412 is displayed at a first position relative to table 5414 (e.g., a position that is adjacent to the far left side of the table).

In FIG. 5D3*b*, the user interface of device 5406 includes an avatar key 5422 that includes a key avatar 5424 that corresponds to device 5406 and a key avatar 5426 that corresponds to device 5412. The avatar key 5422 includes a name ("Me") that corresponds to key avatar 5424 and a name ("Zoe") that corresponds to key avatar 5426. The key avatars shown in the avatar key provide a guide to the avatars (e.g., avatar 5428) that are shown in the visible environment, for example, to help the user of device 5406 to understand that avatar 5428 in the simulated environment corresponds to the device 5412 of user "Zoe" (e.g., because avatar 5428 in the simulated environment is a cat icon that matches key avatar 5426).

The simulated environment displayed on the user interface of device 5406 includes virtual box 5420 and a displayed view 5416*b* of physical reference mat 5416*a*, shown from the perspective of device 5406. A viewing perspective of device 5412 is indicated by viewing perspective indicator

5432. Viewing perspective indicator 5432 is shown emanating from avatar 5428. In the simulated environment, a representation 5430 of device 5412 (e.g., a view of device 5412 as captured by a camera of device 5406 and/or a rendered version of device 5412) is shown.

In FIG. 5D3*c*, the user interface of device 5412 includes an avatar key 5434 that includes a key avatar 5436 that corresponds to device 5412 and a key avatar 5468 that corresponds to device 5406. The avatar key 5434 includes a name ("Me") that corresponds to key avatar 5436 and a name ("Gabe") that corresponds to key avatar 5438. The key avatars shown in the avatar key provide a guide to the avatars (e.g., avatar 5440) that are shown in the visible environment, for example, to help the user of device 5412 to understand that avatar 5440 in the simulated environment corresponds to the device 5406 of user "Gabe" (e.g., because avatar 5440 in the simulated environment is a smiley face icon that matches key avatar 5438).

In FIG. 5D4*a*, second device 5412 has moved from the first position relative to table 5414 shown in FIG. 5D3*a* to a second position relative to table 5414 (e.g., a position that is adjacent to the near left side of the table). In FIG. 5D4*b*, the user interface of device 5406 shows device 5412 (indicated by avatar 5428 and representation 5430 of the device) at a position that has changed from FIG. 5D3*b*. A change in the viewing perspective of device 5412 is indicated by the different angles of viewing perspective indicator 5432 from FIG. 5D3*b* to FIG. 5D4*b*. The movement of device 5412 is also illustrated by the changed view displayed reference mat 5416*b*, and virtual box 5420 from in the user interface of device 5412 in FIGS. 5D3*c* to 5D4*c*.

FIGS. 5D5-5D7 illustrate selection and movement of virtual box 5420 by device 5412.

In FIG. 5D5*c*, an input (e.g., a selection and movement input) by a contact 5446 is detected on a touch screen display of second device 5412 at a location that corresponds to a surface of virtual box 5420. In response to detection of the contact 5446 that selects the surface of virtual box 5420, movement projections 5448 are shown extending from virtual box 5420 to indicate the plane of movement of virtual box 5420 (e.g., a plane of movement that is parallel to the selected surface of virtual box 5420).

In FIG. 5D5*b*, an interaction indicator 5452 is shown to indicate to the user of first device 5406 that second device 5412 is interacting with virtual box 5420. Interaction indicator 5452 extends from a location that corresponds to avatar 5428 to a location that corresponds to virtual box 5420. A control handle 5454 is shown at a location where indication indicator 5452 meets virtual box 5420.

In FIGS. 5D5*c*-5D6*c*, the contact 5446 moves along the touch-sensitive display of device 5412 in a direction indicated by arrow 5450. In response to the movement of the contact 5446, virtual box 5420 has moved within the plane indicated by the movement projections 5448 in the direction indicated by arrow 5450.

In FIGS. 5D5*b*-5D6*b*, the user interface of first device 5406 shows movement of interaction indicator 5452 and control handle 5454 (e.g., to maintain the connection between interaction indicator 5452 and virtual box 5420) as virtual box 5420 is moved by the movement input detected at second device 5412.

In FIG. 5D7*c*, the contact 5446 has lifted off of the touch-sensitive display of device 5412 and movement projections 5448 are no longer displayed. In FIG. 5D7*b*, interaction indicator 5452 and control handle 5454 are no longer displayed (because device 5412 is not interacting with virtual box 5420).

FIGS. 5D8-5D11 illustrate resizing of virtual box 5420 by device 5412.

In FIG. 5D8*c*, an input (e.g., a resizing input) by a contact 5456 is detected on a touch screen display of second device 5412 at a location that corresponds to a surface of virtual box 5420.

In FIG. 5D8*b*, an interaction indicator 5462 and control handle 5464 are shown on the user interface of first device 5406 to indicate that second device 5412 is interacting with virtual box 5420.

In FIG. 5D9*c*, after contact 5456 has remained at a location that corresponds to a surface of virtual box 5420 for a period of time that increases above a resizing time threshold, resizing projections 5458 are shown to indicate an axis (that is perpendicular to the selected surface of virtual box 5420) along which virtual box 5420 will be resized in response to subsequent movement of the contact 5456.

FIGS. 5D9*a*-5D10*a* show second device 5412 moving upward (while contact 5456 is in contact with the touch screen display of second device 5412) to resize virtual box 5420. In response to the movement of the device 5412, the size of virtual box 5420 has increased along the axis indicated by the resizing projections 5458 in the direction that second device 5412 moved.

In FIG. 5D11*c*, the contact 5456 has lifted off of touch-sensitive display 112, and projections 5458 are no longer displayed.

As illustrated in FIGS. 5D12-5D14, users that are not in the same physical space can view and collaboratively manipulate objects in a simulated environment. For example, a user in a first physical space views a virtual user interface object (e.g., virtual box 5420) that is anchored to a displayed version of a first physical reference mat (e.g., 5416*a*), and a different user at a remote location views the same virtual user interface object anchored to a displayed version of a second physical reference mat (e.g., 5476*a*).

FIG. 5D12*a* illustrates a first physical space 5400 in which two users 5402 and 5408 and a table 5414 are located, as was shown in FIG. 5D1. FIG. 5D12*b* shows a second physical space 5470, separate from the first physical space 5400, in which a third user 5472 and a table 5474 are located. A third device 5478 (e.g., a device 100) is held by third user 5472. A reference mat 5476*a* is located on table 5474. The device 5478 of third user 5472 displays the same simulated environment that is displayed by device 5412 of first user 5408 and device 5404 of second user 5402.

FIG. 5D13*a* shows first physical space 5400, as described with regard to FIG. 5D12*a*, and FIG. 5D13*b* shows second physical space 5470, as described with regard to FIG. 5D12*b*.

In FIG. 5D13*c*, the user interface of first device 5406 includes an avatar key 5422 that includes a key avatar 5480 (for "Stan") that corresponds to third device 5478. Avatar 5482, which corresponds to third device 5478 (as indicated by key avatar 5480), is shown in the simulated environment displayed by 5406 at a location relative to displayed version 5416*b* of physical reference mat 5416*a* that corresponds to a position of device 5478 relative to physical reference mat 5476*a*. A viewing perspective of device 5478 is indicated by viewing perspective indicator 5486. A representation 5484 of device 5478 (e.g., a rendered version of the device) is shown in the simulated environment displayed by device 5406.

As shown in FIG. 5D13*d*, the user interface of second device 5412 also displays an avatar 5482 that corresponds to third device 5478, a viewing perspective indicator 5486 to indicate the viewing perspective of device 5478, and a representation 5484 of device 5478.

FIG. 5D14*a* shows first physical space 5400, as described with regard to FIG. 5D12*a*, and FIG. 5D14*b* shows second physical space 5470, as described with regard to FIG. 5D12*b*.

FIG. 5D14*c* shows the user interface of the third device 5478. In FIG. 5D14*c*, virtual box 5420 is shown anchored to a displayed view 5476*b* of physical reference mat 5476*a*. Avatar 5488, which corresponds to first device 5406, is shown in the simulated environment displayed by third device 5478 at a location relative to displayed version 5476*b* of physical reference mat 5476*a* that corresponds to a position of first device 5406 relative to physical reference mat 5416*a*. A viewing perspective of first device 5406 is indicated by viewing perspective indicator 5490. A representation 5490 of first device 5406 (e.g., a rendered version of the first device) is shown in the simulated environment displayed by third device 5476. Avatar 5494, which corresponds to second device 5412, is shown in the simulated environment at a location relative to displayed version 5476*b* of physical reference mat 5476*a* that corresponds to a position of second device 5412 relative to physical reference mat 5416*a*. A viewing perspective of second device 5412 is indicated by viewing perspective indicator 5498. A representation 5496 of second device 5412 (e.g., a rendered version of the second device) is shown in the simulated environment displayed by third device 5476.

FIGS. 5E1-5E32 illustrate examples of systems and user interfaces for placement of an insertion cursor, in accordance with some embodiments. The user interfaces in these figures are used to illustrate the processes described below, including the processes in FIGS. 12A-12D. For convenience of explanation, some of the embodiments will be discussed with reference to operations performed on a device with a touch-sensitive display system 112. Similarly, analogous operations are, optionally, performed on a computer system (e.g., as shown in FIG. 5A2) with a headset 5008 and a separate input device 5010 with a touch-sensitive surface in response to detecting the contacts on the touch-sensitive surface of the input device 5010 while displaying the user interfaces shown in the figures on the display of headset 5008, along with a focus indicator.

FIGS. 5E1-5E3 illustrate a context in which user interfaces described with regard to 5E4-5E32 are used.

FIG. 5E1 illustrates physical space 5200 in which a user 5202 and a table 5204 are located. Device 100 is held by user 5202 in the user's hand 5206. A reference mat 5208 is located on table 5204.

FIG. 5E2 shows a view of virtual-three dimensional space displayed on display 112 of device 100. Reference mat 5208 is in the field of view of one or more cameras (e.g., optical sensors 164) of device 100 (hereinafter referred to as "a camera," which indicates one or more cameras of device 100). Display 112 shows a live view of the physical space 5200 as captured by the camera, including a displayed version 5208*b* of physical reference mat 5208*a*.

In FIG. 5E3, the device 100 has moved closer to reference mat 5208*a*. As a result, the size of the displayed version 5208*b* of the reference mat has increased.

FIGS. 5E4-5E32 show a larger view of device 100 and, to provide a full view of the user interface displayed on display 112, do not show the user's hands 5206.

FIGS. 5E5-5E6 illustrate an input that causes placemen t of an insertion cursor at a first location.

In FIG. 5E5, an input (e.g., a tap input) by contact 5502 is detected at a first location on displayed version 5208*b* of physical reference mat 5208*a*. In FIG. 5E6, the contact 5502 has lifted off of touch-sensitive display 112 and insertion cursor 5504 is shown at a location where contact 5502 was detected.

FIGS. 5E7-5E8 illustrate an input that causes placement of an insertion cursor at a second location. In FIG. 5E7, an input (e.g., a tap input) by a contact 5506 is detected at a location that is different from the location where insertion cursor 5504 is displayed. In FIG. 5E8, the contact 5506 has lifted off of touch-sensitive display 112 and insertion cursor 5508 is shown at a location where contact 5506 was detected.

FIGS. 5E9-5E10 illustrate an input that causes insertion of a virtual user interface object. In FIG. 5E9, an input (e.g., a tap input) by a contact 5510 is detected at a location that corresponds to the location of insertion cursor 5508. In response to detection of the contact 5510 at the location where an insertion cursor had been placed, a virtual user interface object (first virtual box 5512) is displayed on display 112 at a location that corresponds to contact 5510 and the insertion cursor 5508 is moved from its previous position on displayed view 5208*b* of reference mat 5208*a* to surface 5514 of first virtual box 5512. In some embodiments, a shadow 5522 is displayed (e.g., a simulated light causes a shadow to be cast by the first virtual box 5512).

FIGS. 5E11-5E12 illustrate an input detected at a surface of a virtual user interface object (first virtual box 5512) that causes insertion of an additional virtual user interface object. In FIG. 5E11, an input (e.g., a tap input) by a contact 5516 is detected at a location on surface 5514 of first virtual box 5512 while insertion cursor 5516 is located on surface 5514. In response to detection of the input by contact 5516, a new virtual user interface object (second virtual box 5518) is displayed on display 112 at a location that corresponds to contact 5510 and the insertion cursor 5508 is moved from surface 5514 of first virtual box 5512 to surface 5520 of the second virtual box 5518. A length of shadow 5522 is increased (such that the shadow appears to be cast by first virtual box 5512 and newly added second virtual box 5518).

FIGS. 5E12-5E13 illustrate rotation of physical reference mat 5208. For example, a user 5202 manually changes the position and/or orientation of reference mat 5208. As physical reference mat 5208*a* rotates, virtual boxes 5512 and 5518 and shadow 5522 rotate (because the virtual boxes 5512 and 5518 are anchored to displayed view 5208*b* of physical reference mat 5208*a*).

FIGS. 5E14-5E16 illustrate movement of device 100. For example, a user 5202 holding device 100 changes the position and/or orientation of the device. In FIGS. 5E14-5E15, as device 100 moves, virtual boxes 5512 and 5518 and shadow 5522 move (because the virtual boxes 5512 and 5518 are anchored to displayed view 5208*b* of physical reference mat 5208*a*). Similarly, in FIGS. 5E15-5E16, as device 100 moves, virtual boxes 5512 and 5518 and shadow 5522 move FIGS. 5E17-5E18 illustrate input that changes the location of insertion cursor 5526 on virtual box 5518. In FIG. 5E17, an input (e.g., a tap input) by a contact 5524 is detected at surface 5528 of virtual box 5518 while insertion cursor 5526 is located on surface 5520 of virtual box 55182. In FIG. 5E18, the contact 5524 has lifted off of touch-sensitive display 112 and insertion cursor 5508 is moved from surface 5520 of virtual box 5518 to surface 5528 of virtual box 5518.

FIGS. 5E19-5E20 illustrate an input detected at a surface of second virtual box 5518 that causes insertion of a third virtual box 5532. In FIG. 5E19, an input (e.g., a tap input)

by a contact 5530 is detected at a location on surface 5528 of second virtual box 5518 while insertion cursor 5526 is located on surface 5268. In response to detection of the input by contact 5530, a third virtual box 5532 is displayed on display 112 at a location that corresponds to contact 5530 and the insertion cursor 5526 is moved from surface 5528 of second virtual box 5518 to surface 5526 of the third virtual box 5532. A shape of shadow 5522 is changed (such that the shadow appears to be cast by first virtual box 5512, second virtual box 5518, and newly added third virtual box 5532).

FIGS. 5E21-5E22 illustrate input that changes the location of insertion cursor 5538 on virtual box 5532. In FIG. 5E21, an input (e.g., a tap input) by a contact 5536 is detected at surface 5538 of virtual box 5532 while insertion cursor 5526 is located on surface 5534 of virtual box 5532. In FIG. 5E22, the contact 5536 has lifted off of touch-sensitive display 112 and insertion cursor 5526 is moved from surface 5534 of virtual box 5518 to surface 5538 of virtual box 5532.

FIGS. 5E23-5E24 illustrate insertion of a new virtual user interface object using new object control 5216.

In FIG. 5E23, while insertion cursor 5526 is at surface 5538 of virtual box 5532, an input (e.g., a tap input) by contact 5542 is detected at a location on display 112 that corresponds to new object control 5216. In FIG. 5E24, in response to the input at the location that corresponds to new object control 5216, a fourth virtual box 5546 is displayed on display 112 at a location that corresponds to the location where insertion cursor 5526 was shown and insertion cursor 5526 is moved from surface 5538 of virtual box 5532 to surface 5548 of fourth virtual box 5546.

FIGS. 5E25-5E27 illustrate input that causes movement of fourth virtual box 5546.

In FIG. 5E25, an input (e.g., a selection and movement input) by a contact 5550 is detected on the surface 5556 of fourth virtual box 5546. In response to detection of the contact 5550 that selects the surface 5556 of fourth virtual box 5546, movement projections 5552 are shown extending from virtual box 5546 to indicate the plane of movement of fourth virtual box 5546 (e.g., a plane of movement that is parallel to the selected surface 5556 of virtual box 5546).

In FIGS. 5E25-5E26, the contact 5550 has moved along the surface of touch-sensitive display 112 in a direction indicated by arrow 5554. In response to the movement of the contact 5550, fourth virtual box 5546 has moved within the plane indicated by the movement projections 5552 in the direction indicated by arrow 5554. In FIG. 5E27, the contact 5550 has lifted off of touch-sensitive display 112 and movement projections 5552 are no longer displayed.

FIGS. 5E28-5E32 illustrate input that causes resizing of fourth virtual box 5546.

In FIG. 5E28, an input (e.g., a resizing input) by a contact 5258 is detected on touch screen display 112 at a location that corresponds to surface 5556 of fourth virtual box 5546.

In FIG. 5E29, after contact 5255 has remained at the location that corresponds to surface 5556 of fourth virtual box 5546 for a period of time that increases above a resizing time threshold, resizing projections 5560 are shown to indicate an axis (that is perpendicular to the selected surface of virtual box 5546) along which virtual box 5546 will be resized in response to subsequent movement of the contact 5558.

In FIGS. 5E30-5E31, contact 5558 moves across touch screen display 112 along a path indicated by arrow 5562. In response to the movement of the contact 5558, the size of virtual box 5548 has increased along the axis indicated by the resizing projections 5560 in the direction of movement of contact 5558.

In FIG. 5E32, the contact 5558 has lifted off of touch-sensitive display 112, and projections 5560 are no longer displayed.

FIGS. 5F1-5F17 illustrate examples of systems and user interfaces for displaying an augmented reality environment in a stabilized mode of operation, in accordance with some embodiments. The user interfaces in these figures are used to illustrate the processes described below, including the processes in FIGS. 13A-13E. For convenience of explanation, some of the embodiments will be discussed with reference to operations performed on a device with a touch-sensitive display system 112. Similarly, analogous operations are, optionally, performed on a computer system (e.g., as shown in FIG. 5A2) with a headset 5008 and a separate input device 5010 with a touch-sensitive surface in response to detecting the contacts on the touch-sensitive surface of the input device 5010 while displaying the user interfaces shown in the figures on the display of headset 5008, along with a focus indicator.

FIGS. 5F1-5F2 illustrate a context in which user interfaces described with regard to 5F3-5F17 are used.

FIG. 5F1 illustrates physical space 5200 in which a user 5202 and a table 5204 are located. Device 100 is held by user 5202 in the user's hand 5206. An object (physical box 5602) is located on table 5204.

FIG. 5F2 shows an augmented reality environment displayed by display 112 of device 100. Table 5204 (referenced as 5204*a* when referring to the table in physical space) and physical box 5602 are in the field of view of one or more cameras (e.g., optical sensors 164) of device 100 (hereinafter referred to as "a camera," which indicates one or more cameras of device 100). Display 112 shows a live view of the physical space 5200 as captured by the camera, including a displayed version 5204*b* of table 5204*a* and a rendered virtual box 5604 displayed at a location in the simulated environment that corresponds to physical box 5602 as detected by the camera of device 100.

FIGS. 5F3-5F17 include a sub-figure "a" that illustrates the orientation in physical space 5200 of device 100 relative to table 5204*a* and physical box 5602 (e.g., as shown at FIG. 5F3*a*), and a sub-figure "b" that illustrates a user interface of device 100 (e.g., as shown at FIG. 5F3*b*). Also, for clarity, FIGS. 5F3-5F18 show a larger view of device 100 and, to provide a full view of the user interface displayed on display 112, do not show the user's hands 5206.

FIGS. 5F3*a*-5F4*a* illustrate movement of device 100 relative to table 5204*a* and physical box 5602 that occurs while the augmented reality environment is displayed by device 100 (as shown in FIGS. 5F3*b*-5F4*b*) in a non-stabilized mode of operation. When device 100 is at a first position relative to table 5204*a*, as shown in FIG. 5F3*a*, the rendered version 5604 of physical object 5602 is fully visible in the user interface shown in FIG. 5F3*b*. In FIG. 5F4*a*, device 100 has been moved to a second position relative to table 5204*a* and the rendered version 5604 of physical object 5602 is only partially visible in the user interface shown in FIG. 5F4*b*. In the non-stabilized mode of operation, as device 100 moves, the view of virtual box 5604 changes so as to maintain a fixed spatial relationship between virtual box 5604 and physical box 5602 and the displayed representation of the field of view of the camera of device 100 (e.g., including displayed table 5204*b*) is updated based on the movement of the device.

FIGS. 5F5-5F8 illustrate an input (e.g., a depinch-to-zoom-out input) that causes the device to display an augmented reality environment in a stabilized mode of operation.

In FIG. 5F5, device 100 is at the first position relative to table 5204. In FIG. 5F6, contacts 5606 and 5608 are detected at touch-sensitive display 112 (as shown at FIG. 5F6*b*). As shown in FIGS. 5F6*b*-5F7*b*, contact 5606 moves along a path indicated by arrow 5610 and contact 5608 moves along a path indicated by arrow 5612. In response to the simultaneous movement of contacts 5606 and 5608 that increases the distance between contacts 5606 and 5608, the displayed augmented reality environment, including virtual box 5604, is zoomed in (e.g., such that the sizes of virtual box 5604 increases on display 112). The virtual box 5604 is re-rendered in response to the zoom input (e.g., the larger virtual box 5604 of FIG. 5F8*b* has the same resolution as the smaller virtual box 5604 of FIG. 5F5*b*). In some embodiments, the field of view of camera of device 100 displayed on display 112 (e.g., the displayed view 5204*b* of table 5204*a*) is not changed in response to the zoom input (as shown in FIGS. 5F5*b*-5F8*b*). As the zoom input is received, a transition from a non-stabilized mode of operation to a stabilized mode of operation occurs. In FIG. 5F8, the contacts 5606 and 5608 have lifted off of touchscreen display 112.

In some embodiments, while a device is displaying an augmented reality environment in a stabilized mode of operation, as movement of the device causes a virtual user interface object to extend beyond the field of view of the device camera, a portion of the virtual user interface object ceases to be displayed. FIGS. 5F8-5F9 illustrate a movement of device 100, while device 100 is in a stabilized mode of operation, that causes a portion of the virtual user interface object 5304 to cease to be displayed. FIGS. 5F8*a*-5F9*a* illustrate movement of device 100 relative to table 5204*a* and physical box 5602 that occurs while the augmented reality environment is displayed by device 100 (as shown in FIGS. 5F8*b*-5F9*b*) in a stabilized mode of operation. When device 100 is at a first position relative to table 5204*a*, as shown in FIG. 5F8*a*, the zoomed, rendered version 5604 of physical object 5602 is fully visible in the user interface shown in FIG. 5F8*b*. In FIG. 5F9*a*, device 100 has been moved to a second position relative to table 5204*a* such that updating the view of virtual box 5604 to maintain a fixed spatial relationship between virtual box 5604 and physical box 5602 causes the virtual box 5604 to extend beyond the field of the camera of device 100. As a result, a portion of virtual box 5064 that extends beyond the field of the camera of device 100 is not displayed.

In some embodiments, while a device is displaying an augmented reality environment in a stabilized mode of operation and movement of the device causes a virtual user interface object to extend beyond the field of view of the device camera, the augmented reality environment is zoomed out such that the virtual user interface object is fully displayed. For example, from FIG. 5F9*b* to FIG. 5F10*b*, the displayed augmented reality environment, including virtual box 5604 has zoomed out such that virtual box 5604 is fully displayed.

In some embodiments, in the stabilized mode of operation, when updating the view of virtual box 5604 to maintain a fixed spatial relationship between virtual box 5604 and physical box 5602 causes the virtual box 5604 to extend beyond the field of the camera of device 100, the virtual box 5604 is displayed with a placeholder image at a location that corresponds to the portion of virtual box 5064 that extends beyond the field of view of the device camera. In FIG. 5F10*b*, the rendered version 5604 of physical object 5602 is displayed with placeholder image 5614 (a blank space) in a location that corresponds to the portion of virtual box 5064 that extends beyond the field of view of the device camera. For example, the placeholder image 5614 is displayed at a location in the augmented reality environment that is beyond the field of view of the camera, so no camera data is available to be displayed in the space occupied by the placeholder image 5614.

FIGS. 5F10-5F11 illustrate movement of device 100 (back to the position of device 100 illustrated in FIGS. 5F8 and 5F3).

FIGS. 5F11*a*-5F12*a* illustrate movement of device 100 (e.g., backing away from table 5204*a* and physical object 5602, such that device 100 appears larger). In FIG. 5F12*b*, as a result of the movement illustrated in 5F11*a*-5F12*a*, the size of virtual object 5604 has decreased from the size of virtual object 5604 in FIG. 5F11*b*. The movement is shown in FIGS. 5F11*a*-5F12*a* for illustrative purposes (such that the size of virtual object 5604 in FIG. 5F12*b*, in the stabilized mode, is the same as the size of virtual object 5604 in FIG. 5F3*b*, in the non-stabilized mode) to provide a straightforward comparison of updating of the augmented reality environment in the stabilized and non-stabilized modes of operation.

FIGS. 5F12*a*-5F13*a* illustrate movement of device 100 relative to table 5204*a* and physical box 5602 that occurs while the augmented reality environment is displayed by device 100 in a stabilized mode of operation. When device 100 is at a first position relative to table 5204*a*, as shown in FIG. 5F12*a*, the rendered version 5604 of physical object 5602 is fully visible in the user interface shown in FIG. 5F12*b*. In FIG. 5F13*a*, device 100 has been moved to a second position relative to table 5204*a* and the rendered version 5604 of physical object 5602 is only partially visible in the user interface shown in FIG. 5F13*b*. In some embodiments, in the stabilized mode of operation, as device 100 moves, the view of virtual box 5604 changes so as to maintain a fixed spatial relationship between virtual box 5604 and physical box 5602 and the displayed representation of the field of view of the camera of device 100 (e.g., including displayed table 5204*b*) changes by an amount that is less than the amount of change that occurs in the non-stabilized mode (e.g., the amount of movement of displayed table 5204*b* from FIG. 5F12*b*-5F13*b*, while device 100 is in the stabilized mode of operation, is less than the amount of movement of displayed table 5204*b* from FIG. 5F4*b* to 5F5*b*, while device 100 is in the non-stabilized mode of operation).

FIGS. 5F14-5F16 illustrate an input at a stabilization toggle 5616 to transition from a non-stabilized mode of operation to a stabilized mode of operation. In FIG. 5F15*b*, an input (e.g., a tap input) by contact 5618 is detected at a location on touch screen display 112 to corresponds to stabilization toggle 5616. In response to the input by contact 5618, the appearance of stabilization toggle 5616 is changed (e.g., the toggle changes from an unshaded state to a shaded state) to indicate that a transition from a non-stabilized mode of operation to a stabilized mode of operation has occurred, as shown in FIG. 5F16*b*.

FIGS. 5F16*a*-5F17*a* illustrate movement of device 100 relative to table 5204*a* and physical box 5602 that occurs while the augmented reality environment is displayed by device 100 (as shown in FIGS. 5F16*a*-5F17*a*) in a stabilized mode of operation. When device 100 is at a first position relative to table 5204*a*, as shown in FIG. 5F16*a*, the rendered version 5604 of physical object 5602 is fully visible in the user interface shown in FIG. 5F16*b*. In FIG. 5F17*a*, device 100 has been moved to a second position relative to table 5204*a* and the rendered version 5604 of physical object 5602 is only partially visible in the user interface shown in FIG. 5F17*b*. In the stabilized mode of operation, as device 100 moves, the view of virtual box 5604 changes so as to maintain a fixed spatial relationship between virtual box 5604 and physical box 5602 and the displayed representation of the field of view of the camera of device 100 (e.g., including displayed table 5204*b*) changes by an amount that is less than the amount of change that occurs in the non-stabilized mode (e.g., the amount of movement of displayed table 5204*b* from FIG. 5F15*b*-5F16*b*, while device 100 is in the stabilized mode of operation, is less than the amount of movement of displayed table 5204*b* from FIG. 5F4*b* to 5F5*b*, while device 100 is in the non-stabilized mode of operation).

FIGS. 6A-6D are flow diagrams illustrating method 600 of adjusting an appearance of a virtual user interface object in an augmented reality environment, in accordance with some embodiments. Method 600 is performed at a computer system (e.g., portable multifunction device 100, FIG. 1A, device 300, FIG. 3A, or a multi-component computer system including headset 5008 and input device 5010, FIG. 5A2) having a display generation component (e.g., a display, a projector, a heads-up display, or the like), one or more cameras (e.g., video cameras that continuously provide a live preview of at least a portion of the contents that are within the field of view of the cameras and optionally generate video outputs including one or more streams of image frames capturing the contents within the field of view of the cameras), and an input device (e.g., a touch-sensitive surface, such as a touch-sensitive remote control, or a touch-screen display that also serves as the display generation component, a mouse, a joystick, a wand controller, and/or cameras tracking the position of one or more features of the user such as the user's hands). In some embodiments, the input device (e.g., with a touch-sensitive surface) and the display generation component are integrated into a touch-sensitive display. As described above with respect to FIGS. 3B-3D, in some embodiments, method 600 is performed at a computer system 301 (e.g., computer system 301-*a*, 301-*b*, or 301-*c*) in which respective components, such as a display generation component, one or more cameras, one or more input devices, and optionally one or more attitude sensors are each either included in or in communication with computer system 301.

In some embodiments, the display generation component is a touch-screen display and the input device (e.g., with a touch-sensitive surface) is on or integrated with the display generation component. In some embodiments, the display generation component is separate from the input device (e.g., as shown in FIG. 4B and FIG. 5A2). Some operations in method 600 are, optionally, combined and/or the order of some operations is, optionally, changed.

For convenience of explanation, some of the embodiments will be discussed with reference to operations performed on a computer system with a touch-sensitive display system 112 (e.g., on device 100 with touch screen 112) and one or more integrated cameras. However, analogous operations are, optionally, performed on a computer system (e.g., as shown in FIG. 5A2) with a headset 5008 and a separate input device 5010 with a touch-sensitive surface in response to detecting the contacts on the touch-sensitive surface of the input device 5010 while displaying the user interfaces shown in the figures on the display of headset 5008. Similarly, analogous operations are, optionally, performed on a computer system having one or more cameras that are implemented separately (e.g., in a headset) from one or more other components (e.g., an input device) of the computer system; and in some such embodiments, "movement of the computer system" corresponds to movement of one or more cameras of the computer system, or movement of one or more cameras in communication with the computer system.

As described below, method 600 relates to adjusting an appearance of a virtual user interface object (on a display of a computer system), in an augmented reality environment (e.g., in which reality is augmented with supplemental information that provides additional information to the user that is not available in the physical world), based on a combination of movement of the computer system (e.g., movement of one or more cameras of the computer system) and movement of a contact on an input device (e.g., a touch-screen display) of the computer system. In some embodiments, adjusting the appearance of the virtual user interface object allows the user to access the supplemental information in the augmented reality environment. Adjusting an appearance of a virtual user interface object based on a combination of movement of the computer system and movement of a contact on an input device of the computer system provides an intuitive way for the user to adjust the appearance of the virtual user interface object (e.g., by allowing the user to adjust the appearance of the virtual user interface object with only movement of the computer system, with only movement of a contact on the input device, or with a combination of movement of the computer system and movement of the contact) and allows the user to extend the range of adjustments available to the user (e.g., by allowing the user to continue adjusting the appearance of the virtual user interface object even if the contact or the one or more cameras of the computer system cannot move further in the desired direction), thereby enhancing the operability of the device and making the user-device interface more efficient (e.g., by reducing the number of steps that are needed to achieve an intended outcome when operating the device and reducing user mistakes when operating/interacting with the device) which, additionally, reduces power usage and improves battery life of the device by enabling the user to use the device more quickly and efficiently.

The computer system (e.g., device 100, FIG. 5A7) displays (602), via the display generation component (e.g., touch screen 112, FIG. 5A7), an augmented reality environment (e.g., as shown in FIG. 5A7). Displaying the augmented reality environment includes (604) concurrently displaying: a representation of at least a portion of a field of view of the one or more cameras that includes a respective physical object (e.g., a 3D model of a building, a sheet of paper with a printed pattern, a poster on a wall or other physical object, a statue sitting on a surface, etc.) (e.g., physical building model 5006, FIG. 5A1), wherein the representation is updated as contents of the field of view of the one or more cameras change (e.g., the representation is a live preview of at least a portion of the field of view of the one or more cameras, and the respective physical object is included and visible in the field of view of the cameras); and a respective virtual user interface object (e.g., a virtual roof of the 3D model of the building, a virtual car parked on a surface represented by the sheet of paper with the printed pattern, an interactive logo overlaid on the poster, a virtual 3D mask covering the contours of the statue, etc.) (e.g., virtual building model 5012, FIG. 5A7) at a respective location in the representation of the field of view of the one or more cameras, wherein the respective virtual user interface object (e.g., virtual building model 5012, FIG. 5A7) has a location that is determined based on the respective physical object (e.g., physical building model 5006) in the field of view of the one or more cameras. For example, in some embodiments, the respective virtual user interface object is a graphical object or a 2D or 3D virtual object that appears to be attached to, or that appears to cover, the respective physical object in the field of view of the one or more cameras (e.g., virtual building model 5012 is a 3D virtual object that appears to cover physical building model 5006, FIG. 5A7). The location and/or orientation of the respective virtual user interface object is determined based on the location, shape, and/or orientation of the physical object in the field of view of the one or more cameras (e.g., as shown in FIGS. 5A3 and 5A5). While displaying the augmented reality environment (606), the computer system detects an input (e.g., detects the input on the input device such as by detecting a touch input by a contact on a touch-screen display or a touch-sensitive remote control) at a location (e.g., a location on the touch-screen display or the touch-sensitive remote control, or movement of a wand or a user's hands while a cursor is at a location of the respective virtual user interface object) that corresponds to the respective virtual user interface object (e.g., device 100 detects contact 5020-*a* on the virtual roof of virtual building model 5012, FIG. 5A8).

While continuing to detect the input (608) (e.g., while the contact is maintained on the input device such as while the contact is maintained on the touch-screen display or on the touch-sensitive remote control) (e.g., while contact 5020 is maintained on touch screen 112, FIGS. 5A9-5A13), the computer system detects movement of the input relative to the respective physical object in the field of view of the one or more cameras (e.g., as shown in FIGS. 5A9-5A13). In some embodiments, the movement of the input optionally includes movement of the contact across the touch-screen display or across the touch-sensitive surface of the touch-sensitive remote control while the computer system (e.g., device 100) is held substantially stationary in the physical space (e.g., as shown in FIGS. 5A8-5A11). In some embodiments, the movement of the input optionally includes movement of the device including the cameras in the physical space while the contact is maintained and kept stationary on the touch-screen display or touch-sensitive remote control (e.g., as shown in FIGS. 5A17-5A18). In some embodiments, the movement of the input optionally includes concurrent movement of the contact across the touch-screen display or touch-sensitive remote control and movement of the device including the cameras in the physical space. In some embodiments, the movement of the computer system includes movement of a component of a multi-component computer system, such as movement of a virtual reality display headset, etc. (e.g., as shown in FIG. 5A2). In addition, while continuing to detect the input, and in response to detecting the movement of the input relative to the respective physical object in the field of view of the one or more cameras, the device adjusts an appearance of the respective virtual user interface object (e.g., by expanding, contracting, stretching, squeezing together, spreading out, and/or pushing together, all or part(s) of the virtual user interface object) in accordance with a magnitude of movement of the input relative to the respective physical object. For example, when the contact is detected over the virtual roof of the building model and then moves across the touch-screen display, the virtual roof is lifted away from the building model in the live preview of the field of view of the cameras (e.g., as shown in FIGS. 5A8-5A11); and while the contact is maintained on the touch-screen display, and the device as a whole is moved relative to the building model in the physical space, the movement of the virtual roof is determined based on both the location of the contact on the touch-screen display, and the location and orientation of the device relative to the respective physical object in the physical space (e.g., as determined based on the location of the respective physical object shown in the live preview of the field of view of the cameras) (e.g., as shown in FIGS. 5A11-5A13).

As another example, in a block building application (e.g., as described in further detail with respect to FIGS. 5B1-5B41) in which a virtual model is built on the respective physical object (e.g., a table top or a sheet of paper with a printed pattern), when the contact is detected on a block (e.g., in response to a long-press input on the block) (e.g., contact 5262, FIG. 5B28) and the computer system displays a guide for how the block will scale (e.g., as shown using resizing projections 5266, FIG. 5B29), while the contact is maintained on the block, and the device as a whole is moved relative to the block (e.g., as shown in FIGS. 5B28-5B30), the scaling of the block (e.g., stretching of the block in the direction of the guide) is determined based on both the location of the contact on the touch-screen display (e.g., on a particular side or face of the block cube) and the location and orientation of the device relative to the respective physical object in the physical space (e.g., as determined based on the location of the respective physical object shown in the live preview of the field of view of the cameras).

In some embodiments, adjusting the appearance of the respective virtual user interface object (e.g., virtual building model 5012, FIGS. 5A8-5A13) in accordance with the magnitude of movement of the input relative to the respective physical object includes (610): in accordance with a determination that the magnitude of movement of the input relative to the respective physical object is a first magnitude (e.g., a relatively larger magnitude of movement), adjusting the appearance of the respective virtual user interface object by a first adjustment (e.g., a larger amount of relative movement causes a larger adjustment) (e.g., as shown in FIG. 5A10, compared to FIG. 5A9); and in accordance with a determination that the magnitude of movement of the input relative to the respective physical object is a second magnitude distinct from the first magnitude (e.g., a relatively smaller magnitude of movement), adjusting the appearance of the respective virtual user interface object by a second adjustment distinct from the first adjustment (e.g., a smaller amount of relative movement causes a smaller adjustment) (e.g., as shown in FIG. 5A9, compared to FIG. 5A10). Adjusting the respective virtual user interface object by a first adjustment when the magnitude of movement of the input is a first magnitude (e.g., a larger amount of relative movement causes a larger adjustment) and adjusting the respective virtual user interface object by a second adjustment when the magnitude of movement of the input is a second magnitude (e.g., a smaller amount of relative movement causes a smaller adjustment) improves the visual feedback provided to the user (e.g., by making the computer system appear more responsive to user input), enhances the operability of the device, and makes the user-device interface more efficient (e.g., by helping the user to achieve an intended outcome with the required inputs and reducing user mistakes when operating/interacting with the device) which, additionally, reduces power usage and improves battery life of the device by enabling the user to use the device more quickly and efficiently.

In some embodiments, the respective virtual user interface object (e.g., virtual building model 5012, FIGS. 5A3-5A6) is (612) anchored, before and after the adjusting, to the respective physical object (e.g., physical building model 5006) in the field of view of the one or more cameras. For example, in some embodiments, the respective virtual user interface object appears to cover the respective physical object in the field of view of the one or more cameras, and when the location and/or orientation of the physical object in the field of view of the one or more cameras changes, the location and/or orientation of the respective virtual user interface object changes accordingly (e.g., as shown in FIGS. 5A3-5A6). In some embodiments, the respective virtual user interface object is anchored to the respective physical object in the field of view of the one or more cameras during some or all of the adjusting (e.g., during a transition from FIG. 5A3 to FIG. 5A5). Anchoring the respective virtual user interface object to the respective physical object improves the visual feedback provided to the user (e.g., by making the computer system appear more responsive to user input), enhances the operability of the device, and makes the user-device interface more efficient (e.g., by helping the user to achieve an intended outcome with the required inputs and reducing user mistakes when operating/interacting with the device) which, additionally, reduces power usage and improves battery life of the device by enabling the user to use the device more quickly and efficiently.

In some embodiments, the appearance of the respective virtual user interface object is (614) adjusted in response to detecting the movement of the input relative to the respective physical object in the field of view of the one or more cameras without regard to whether the movement of the input is due to: movement of the input on the input device (e.g., movement of a contact across the touch-screen display or across the touch-sensitive surface of the input device while the input device is held substantially stationary in the physical space) (e.g., as shown in FIGS. 5A9-5A11), movement of the one or more cameras relative to the respective physical object (e.g., movement of the computer system including the cameras in the physical space while the contact is maintained and kept stationary on the touch-screen display or touch-sensitive surface of the input device) (e.g., as shown in FIGS. 5A11-5A13), or a combination of the movement of the input on the input device and the movement of the one or more cameras relative to the respective physical object (e.g., concurrent movement of the contact across the touch-screen display or touch-sensitive surface of the input device and movement of the computer system including the cameras in the physical space). Adjusting the appearance of the virtual user interface object without regard to the manner of movement of the input (e.g., by allowing the user to adjust the appearance of the virtual user interface object with only movement of the input on the input device, with only movement of the cameras relative to the physical object, or with a combination of movement of the input and the cameras) provides an intuitive way for the user to adjust the appearance of the virtual user interface object, improves the visual feedback provided to the user (e.g., by making the computer system appear more responsive to user input), enhances the operability of the device, and makes the user-device interface more efficient (e.g., by helping the user to achieve an intended outcome with the required inputs and reducing user mistakes when operating/interacting with the device) which, additionally, reduces power usage and improves battery life of the device by enabling the user to use the device more quickly and efficiently.

In some embodiments, the movement of the input relative to the respective physical object is (616) based on movement of the field of view of the one or more cameras relative to the respective physical object (e.g., as a result of movement of the computer system including the cameras in the physical space) (e.g., as shown in FIGS. 5A11-5A13) and movement of the input on the input device (e.g., movement of a contact across the touch-screen display or across the touch-sensitive surface of the input device) (e.g., as shown in FIGS. 5A8-5A11). Allowing the user to move the input relative to the respective physical object by movement of the computer system and movement of a contact provides an intuitive way for the user to move the input, improves the feedback provided to the user (e.g., by making the computer system appear more responsive to user input), enhances the operability of the device, and makes the user-device interface more efficient (e.g., by helping the user to achieve an intended outcome with the required inputs and reducing user mistakes when operating/interacting with the device) which, additionally, reduces power usage and improves battery life of the device by enabling the user to use the device more quickly and efficiently.

In some embodiments, the movement of the input relative to the respective physical object is (618) based on movement of the input on the input device (e.g., movement of a contact across the touch-screen display or across the touch-sensitive surface of the input device while the input device is held substantially stationary in the physical space) (e.g., as shown in FIGS. 5A8-5A11), and the computer system, after adjusting the appearance of the respective virtual user interface object in accordance with the magnitude of movement of the input relative to the respective physical object (e.g., as shown in FIG. 5A11): detects movement of the field of view of the one or more cameras relative to the respective physical object (e.g., movement 5022, FIG. 5A12); and in response to detecting the movement of the field of view of the one or more cameras relative to the respective physical object, continues to adjust the appearance of the respective virtual user interface object (e.g., in the same manner) in accordance with a magnitude of movement of the field of view of the one or more cameras relative to the respective physical object (e.g., as shown in FIG. 5A13). In some embodiments, adjusting the appearance of the respective virtual user interface object includes moving part of the respective virtual user interface object, where the movement is started by a contact dragging on the virtual user interface object and the movement is continued by moving the device as a whole (e.g., as shown in FIGS. 5A8-5A13). For example, when a contact is detected over the virtual roof of a 3D model of a building and the contact moves across the touch-screen display (e.g., in an upward direction), the virtual roof is lifted up from the building model in the displayed augmented reality environment (e.g., as shown in FIGS. 5A8-5A11). After the virtual roof is lifted up, when the device as a whole is moved relative to the building model in the physical space (e.g., in an upward direction), the virtual roof continues to lift up (e.g., as shown in FIGS. 5A11-5A13) (and optionally, floors of the building model lift up and expand). In some embodiments, adjusting the appearance of the respective virtual user interface object in accordance with the magnitude of movement of the input and then continuing to adjust the appearance of the respective virtual user interface object in accordance with a magnitude of movement of the field of view of the one or more cameras allows the user to continue adjusting the appearance of the respective virtual user interface object even if the contact cannot move much further in the desired direction on the touch-screen display (e.g., because the touch is at or near an edge of the touch-screen display and further movement of the touch would move the touch off of the edge of the touch-screen display). For example, with the virtual roof, when the contact gets close to the top edge of the touch-screen display but the user still wants to continue lifting the roof, the user can do so by moving the device or cameras to continue the adjustment even if the contact cannot move much higher on the touch-screen display (e.g., as shown in FIGS. 5A8-5A13). Adjusting the appearance of the respective virtual user interface object in accordance with the magnitude of movement of the input and then continuing to adjust the appearance of the respective virtual user interface object in accordance with a magnitude of movement of the field of view of the one or more cameras allows the user to extend the range of adjustments available to the user (e.g., allowing the user to continue adjusting the appearance of the respective virtual user interface object with movement of the computer system, even if the contact cannot move much further in the desired direction on the touch-screen display), thereby enhancing the operability of the device and making the user-device interface more efficient (e.g., by reducing the number of steps that are needed to achieve an intended outcome when operating the device and reducing user mistakes when operating/interacting with the device) which, additionally, reduces power usage and improves battery life of the device by enabling the user to use the device more quickly and efficiently.

In some embodiments, the movement of the input relative to the respective physical object is (620) based on movement of the field of view of the one or more cameras relative to the respective physical object (e.g., as a result of movement of one or more cameras of the computer system, or one or more cameras in communication with the computer system, in the physical space while a contact is maintained and kept stationary on the touch-screen display or touch-sensitive surface of the input device) (e.g., as shown in FIGS. 5A17-5A18), and the computer system, after adjusting the appearance of the respective virtual user interface object in accordance with the magnitude of movement of the input relative to the respective physical object (e.g., as shown in FIG. 5A18): detects movement of the input on the input device (e.g., movement of the (previously stationary) contact across the touch-screen display or across the touch-sensitive surface of the input device while the input device is held substantially stationary in the physical space) (e.g., as shown in FIGS. 5A19-5A20); and in response to detecting the movement of the input on the input device, continues to adjust the appearance of the respective virtual user interface object (e.g., in the same manner) in accordance with a magnitude of movement of the input on the input device (e.g., as shown in FIG. 5A20). In some embodiments, adjusting the appearance of the respective virtual user interface object includes moving part of the respective virtual user interface object (e.g., moving virtual roof 5012-*a*, FIGS. 5A17-5A20), where the movement is started by a (stationary) contact touch on the virtual user interface object and moving the device as a whole (e.g., as shown in FIGS. 5A17-5A18), and the movement is continued by the contact dragging on the virtual user interface object (e.g., as shown in FIGS. 5A19-5A20). For example, when a contact is detected over the virtual roof of a 3D model of a building and the device as a whole is moved relative to the building model in the physical space (e.g., in an upward direction), the virtual roof is lifted up from the building model in the live preview of the field of view of the cameras (e.g., as shown in FIGS. 5A17-5A18). After the virtual roof is lifted up, when the (previously stationary) contact moves across the touch-screen display (e.g., in an upward direction), the virtual roof continues to lift up (and optionally, floors of the building model lift up and expand) (e.g., as shown in FIGS. 5A19-5A20). Adjusting the appearance of the respective virtual user interface object in accordance with the magnitude of movement of the field of view of the one or more cameras and then continuing to adjust the appearance of the respective virtual user interface object in accordance with a magnitude of movement of the input on the input device allows the user to extend the range of adjustments available to the user (e.g., allowing the user to continue adjusting the appearance of the respective virtual user interface object with the input device, even if the computer system (or the one or more cameras of, or in communication with, the computer system) cannot move much further in the desired direction), thereby enhancing the operability of the device and making the user-device interface more efficient (e.g., by reducing the number of steps that are needed to achieve an intended outcome when operating the device and reducing user mistakes when operating/interacting with the device) which, additionally, reduces power usage and improves battery life of the device by enabling the user to use the device more quickly and efficiently.

In some embodiments, detecting the input at the location that corresponds to the respective virtual user interface object includes (622) detecting the input at a first contact point on the respective virtual user interface object; and the computer system (e.g., device 100) updates the display of the respective virtual user interface object so as to maintain display of the first contact point on the respective virtual user interface object at a location that corresponds to a location of the input (e.g., when the virtual user interface object is displayed on a touch-screen device, the device updates the respective virtual user interface so as to keep the virtual user interface object under the user's finger without regard to whether the movement of the input is due to movement of the input on the input device (e.g., movement of a contact across the touch-screen display or across the touch-sensitive surface of the input device while the input device is held substantially stationary in the physical space) (e.g., as shown in FIGS. 5A8-5A11), movement of the one or more cameras relative to the respective physical object (e.g., movement of the computer system including the cameras in the physical space while the contact is maintained and kept stationary on the touch-screen display or touch-sensitive surface of the input device) (e.g., as shown in FIGS. 5A11-5A13), or a combination of the movement of the input on the input device and the movement of the one or more cameras relative to the respective physical object (e.g., concurrent movement of the contact across the touch-screen display or touch-sensitive surface of the input device and movement of the computer system including the cameras in the physical space)). For example, when a contact (e.g., by a user's finger) is detected "on" the virtual roof of a 3D model of a building (e.g., detected on touch screen 112 at a location at which the virtual roof of the 3D model of the building is displayed), movement on the touch-screen display and movement of the computer system are synced to keep the contact at the same point on the virtual roof (e.g., the virtual roof lifts up and remains under the user's finger as the contact moves across the touch-screen display in an upward direction, the virtual roof lifts up and remains under the user's finger as the device as a whole is moved in an upward direction relative to the building model in the physical space, the virtual roof remains under the user's finger (e.g., moving up or down) based on a combination of the movement of the contact and movement of the device as a whole, etc.) (e.g., as shown in FIGS. 5A8-5A13). Maintaining display of the contact point on the respective virtual user interface object at a location that corresponds to a location of the input improves the visual feedback provided to the user (e.g., by making the computer system appear more responsive to user input), enhances the operability of the device, and makes the user-device interface more efficient (e.g., by helping the user to achieve an intended outcome with the required inputs and reducing user mistakes when operating/interacting with the device) which, additionally, reduces power usage and improves battery life of the device by enabling the user to use the device more quickly and efficiently.

In some embodiments, movement of the input relative to the respective physical object includes (624) movement of the computer system (e.g., movement of the computer system, including the one or more cameras, in the physical space) (e.g., as shown in FIG. 5A17); and movement of the computer system is derived (e.g., determined) from image analysis that indicates one or more reference points within the field of view of the one or more cameras have changed (e.g., the movement of the computer system is determined from the changed location or position of one or more reference points within the field of view of the one or more cameras) between successive images captured by the one or more cameras (e.g., comparison of consecutive image frames and tracking the objects identified in the images). In some embodiments, the image analysis is performed by the computer system. In some embodiments, the image analysis includes tracking three or more points of reference within the field of view of the cameras. In some embodiments, new points of reference are identified as old points of reference move out of the field of view of the one or more cameras. In some embodiments, a determination of movement of the computer system is derived from image analysis instead of derived from using an inertial measurement unit (IMU) of the computer system. In some embodiments, movement of the computer system is derived from image analysis in addition to using one or more elements of an IMU of the computer system (e.g., an accelerometer, a gyroscope, and/or a magnetometer). Detecting movement of the computer system from image analysis improves the feedback provided to the user (e.g., by making the computer system appear more responsive to user input), enhances the operability of the device, and makes the user-device interface more efficient (e.g., by helping the user to achieve an intended outcome with the required inputs and reducing user mistakes when operating/interacting with the device) which, additionally, reduces power usage and improves battery life of the device by enabling the user to use the device more quickly and efficiently.

In some embodiments, adjusting the appearance of the respective virtual user interface object includes (626) moving at least a portion of the respective virtual user interface object, wherein movement of the respective virtual user interface object is based on a physical shape of the respective physical object (e.g., based on the shape of the physical model). For example, in some embodiments, the respective physical object is a 3D highway model and the respective virtual user interface object is a virtual car. In this example, adjusting the appearance of the virtual car includes moving the virtual car on the 3D highway model and movement of the virtual car is based on the physical shape of the 3D highway model (e.g., the virtual car moves on a ramp of the 3D highway model). As another example, in some embodiments, the respective physical object is a physical building model (e.g., physical building model 5006, FIG. 5A1) and the respective virtual user interface object is a virtual building model (e.g., virtual building model 5012, FIG. 5A8), and adjusting the appearance of the respective virtual user interface object includes moving at least a portion of the respective virtual user interface object (e.g., virtual roof 5012-*a*, FIG. 5A9). Moving the respective virtual user interface object based on the physical shape of the respective physical object improves the feedback provided to the user (e.g., by making the computer system appear more responsive to user input), enhances the operability of the device, and makes the user-device interface more efficient (e.g., by helping the user to achieve an intended outcome with the required inputs and reducing user mistakes when operating/interacting with the device) which, additionally, reduces power usage and improves battery life of the device by enabling the user to use the device more quickly and efficiently.

In some embodiments, adjusting the appearance of the respective virtual user interface object includes (628) moving at least a portion of the respective virtual user interface object, wherein movement of the respective virtual user interface object is based on concurrent movement of one or more touch inputs (e.g., swipe inputs on the input device) and movement of the computer system. For example, in some embodiments, adjusting the appearance of a virtual roof of a 3D model of a building includes moving at least a portion of the virtual roof, where movement of the virtual roof is based on concurrent movement of a contact moving across the touch-screen display (e.g., in an upward direction) and movement of the device as a whole relative to the building model in the physical space (e.g., in an upward direction) (e.g., if the device movement 5028 in FIGS. 5A17-5A18 occurred concurrently with the movement of contact 5026 in FIGS. 5A19-5A20). As another example, in some embodiments, movement of a virtual car is based on concurrent movement of dragging the virtual car on a ramp of a 3D highway model and movement of the model itself on the display because the device is moving. Allowing the user to move the respective virtual user interface object by concurrent movement of touch inputs and movement of the computer system provides an intuitive way for the user to move the respective virtual user interface object, improves the feedback provided to the user (e.g., by making the computer system appear more responsive to user input), enhances the operability of the device, and makes the user-device interface more efficient (e.g., by helping the user to achieve an intended outcome with the required inputs and reducing user mistakes when operating/interacting with the device) which, additionally, reduces power usage and improves battery life of the device by enabling the user to use the device more quickly and efficiently.

In some embodiments, adjusting the appearance of the respective virtual user interface object includes (630) moving at least a portion of the respective virtual user interface object beyond a maximum limit of a resting state of the respective virtual user interface object (e.g., moving virtual roof 5012-*a* beyond a maximum limit of its resting state, as shown in FIG. 5A13) (e.g., based on movement of a contact across the touch-screen display or across the touch-sensitive surface of the input device, movement of the one or more cameras relative to the respective physical object, or a combination of the movement of the contact on the input device and the movement of the one or more cameras relative to the respective physical object), and the computer system: while continuing to detect the input, displays the respective virtual user interface object at a location beyond the maximum limit of the resting state of the respective virtual user interface object, in accordance with the magnitude of movement of the input relative to the respective physical object (e.g., as shown in FIG. 5A13); ceases to detect the input (e.g., liftoff of contact 5020-*d* in FIG. 5A13); and in response to ceasing to detect the input, displays the respective virtual user interface object at a location corresponding to the maximum limit of the resting state of the respective virtual user interface object (e.g., as shown in FIG. 5A14). In some embodiments, this includes displaying an animated transition from the respective virtual user interface object at the location beyond the maximum limit of the resting state to the location corresponding to the maximum limit of the resting state (e.g., displaying an animated transition from virtual roof 5012-*a* at the location in FIG. 5A13 to virtual roof 5012-*a* at the location in FIG. 5A14). In some embodiments, if the respective virtual user interface object moves beyond a furthest extent of its maximum resting state based on movement of the input, the respective virtual user interface object snaps back (e.g., in an animated transition) to its maximum resting state when the input lifts off. For example, if a virtual roof of a 3D building model can be displayed resting directly on the 3D building model and hovering up to twelve inches above the building model (e.g., the resting state of the virtual roof is between zero and twelve inches from the building model), if a user lifts the virtual roof fifteen inches above the building model, when the user input lifts off, the virtual roof snaps back to twelve inches above the building model. Moving the respective virtual user interface object in accordance with the magnitude of movement of the input (even if beyond the maximum limit of the resting state of the respective virtual user interface object) and then displaying the respective virtual user interface object snapping back to its maximum resting state when the input lifts off improves the feedback provided to the user (e.g., by making the computer system appear more responsive to user input), enhances the operability of the device, and makes the user-device interface more efficient (e.g., by helping the user to achieve an intended outcome with the required inputs and reducing user mistakes when operating/interacting with the device) which, additionally, reduces power usage and improves battery life of the device by enabling the user to use the device more quickly and efficiently.

In some embodiments, the displayed augmented reality environment includes (632): one or more virtual objects that do not correspond to physical objects in the field of view of the one or more cameras (e.g., virtual cars driving in front of a virtual building that is a replacement for a physical model of a building) (e.g., virtual trees, virtual bushes, a virtual person, and a virtual car in the augmented reality environment shown in FIG. 5A4); one or more physical objects that are in the field of view of the one or more cameras (e.g., a table on which a physical model of a building is sitting) (e.g., table 5004 and wallpaper 5007, FIG. 5A4); and one or more 3D virtual models of the one or more physical objects that are in the field of view of the one or more cameras that replace at least a portion of the corresponding one or more physical objects (e.g., virtual building model 5012, FIG. 5A4) (e.g., a replacement for a physical model of a building) (e.g., a respective 3D virtual model is projected onto a corresponding respective physical marker). In some embodiments, a respective 3D virtual model of a respective physical object in the field of view of the one or more cameras replaces a portion (but not all) of the corresponding respective physical object (e.g., a 3D virtual model of a statue's head replaces a portion of the physical statue's head in the field of view of the one or more cameras, showing an interior cross section of one quarter of the head, for example). In some embodiments, a respective 3D virtual model of a respective physical object in the field of view of the one or more cameras replaces all of the corresponding respective physical object (e.g., a 3D virtual model of a building replaces the entire physical model of the building in the field of view of the one or more cameras) (e.g., virtual building model 5012 replaces the entire physical building model 5006 in the augmented reality environment, FIG. 5A4). In some embodiments, the displayed augmented reality environment includes all three of the above (e.g., pure virtual objects, physical objects, and 3D virtual models of the physical objects) in different layers. For example, in some embodiments, the displayed augmented reality environment includes a statue in a museum (e.g., a physical object in the field of view of the one or more cameras) with a 3D virtual model of the statue's head (e.g., a 3D virtual model of the statue's head showing an interior cross section of the statue) in a virtual environment with Egyptian pyramids (e.g., pure virtual objects showing the surroundings of where the statue was originally displayed).

In some embodiments, the displayed augmented reality environment includes a subset of the above (e.g., including one or more physical objects that are in the field of view of the one or more cameras and one or more 3D virtual models of the one or more physical objects, but not one or more pure virtual objects). For example, using the example above of the statute in the museum, in some embodiments, the displayed augmented reality environment includes the statue in the museum with a 3D virtual model of the statue's head, but does not include any pure virtual objects. As another example, in some embodiments, the displayed augmented reality environment includes a physical 3D model of a building on a table or platform (e.g., physical objects in the field of view of the one or more cameras) with a 3D virtual model of at least part of the building (e.g., a 3D virtual model of a portion of the building showing an interior view of the building) in a virtual outdoor environment (e.g., with virtual objects such as virtual trees surrounding the building, virtual cars driving in front of the building, or virtual people walking around the building). As the physical 3D model of the building moves in the field of view (e.g., as a result of movement in the physical world of the building model and/or as a result of movement of the computer system, for example, as the user moves the computer system by walking around to a different side of the physical building model) (e.g., as shown in FIGS. 5A3-5A6), the one or more 3D virtual models of the physical 3D model of the building move accordingly. For example, as the user moves around to a different side of the building, the 3D virtual model of the portion of the building showing the interior view of the building changes to correspond to the updated view of the physical objects in the field of view of the one or more cameras. Displaying the augmented reality environment with virtual objects, physical objects, and 3D virtual models of the physical objects provides a realistic view (with one or more physical objects that are in the field of view of the one or more cameras) along with supplemental information (with one or more virtual objects and one or more 3D virtual models) that provides information to the user, thereby enhancing the operability of the device (e.g., by allowing the user to easily access supplemental information about the one or more physical objects that are in the field of view of the one or more cameras) and making the user-device interface more efficient (e.g., by helping the user to achieve an intended outcome with the required inputs and reducing user mistakes when operating/interacting with the device) which, additionally, reduces power usage and improves battery life of the device by enabling the user to use the device more quickly and efficiently.

In some embodiments, the respective physical object is (634) a 3D marker that is recognizable from different angles and the respective virtual user interface object is a 3D virtual model that is overlaid on the respective physical object (e.g., in the displayed augmented reality environment) based on a camera angle of the one or more cameras. In some embodiments, the camera angle of the one or more cameras corresponds to an orientation of the one or more cameras relative to the respective physical object. For example, using the example above where the displayed augmented reality environment includes a statue in a museum with a 3D virtual model of the statue's head, when the camera angle of the one or more cameras is positioned to include the front of the statue in the field of view of the one or more cameras, the displayed augmented reality environment includes the front of the statue and the 3D virtual model of the front of the statue's head. As the camera angle changes (e.g., as the user of the device walks around the statue in the museum while viewing the statue in the field of view of the one or more cameras) and the camera angle of the one or more cameras is positioned to include the back of the statue in the field of view of the one or more cameras, the displayed augmented reality environment includes the back of the statue and the 3D virtual model of the back of the statue's head. As the respective physical object moves in the field of view (e.g., as a result of movement in the physical world of the respective physical object and/or as a result of movement of the computer system that causes movement of the respective physical object in the field of view of the one or more cameras), the 3D virtual model that is overlaid on the respective physical object moves accordingly (e.g., changes to follow the respective physical object). For example, using the example above where the displayed augmented reality environment includes a physical 3D building model on a table (e.g., physical building model 5006 on table 5004, FIG. 5A1) with a 3D virtual model of a portion of the building showing the building interior, when the physical 3D building model moves (e.g., in the field of view of the one or more cameras) (e.g., as user 5002 walks from a position as shown in FIG. 5A3 to a position as shown in FIG. 5A5) the 3D virtual model of the building that is overlaid on the physical 3D building model moves accordingly (e.g., when the user walks around the physical 3D building model (e.g., from the front of the physical 3D building model to the side of the physical 3D building model) while viewing the building in the field of view of the one or more cameras, the 3D virtual model changes to display the interior portion of the building in the field of view of the one or more cameras from the user's new location (e.g., from displaying the interior of the front of the physical 3D building model to displaying the interior of the side of the physical 3D building model). Overlaying the 3D virtual model on the respective physical object based on a camera angle of the one or more cameras improves the feedback provided to the user (e.g., by making the computer system appear more responsive to user input), enhances the operability of the device, and makes the user-device interface more efficient (e.g., by helping the user to achieve an intended outcome with the required inputs and reducing user mistakes when operating/interacting with the device) which, additionally, reduces power usage and improves battery life of the device by enabling the user to use the device more quickly and efficiently.

It should be understood that the particular order in which the operations in FIGS. 6A-6D have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 800, 900, 1000, 1100, 1200, and 1300) are also applicable in an analogous manner to method 600 described above with respect to FIGS. 6A-6D. For example, the contacts, gestures, user interface objects, intensity thresholds, focus indicators, and/or animations described above with reference to method 600 optionally have one or more of the characteristics of the contacts, gestures, user interface objects, intensity thresholds, focus indicators, and/or animations described herein with reference to other methods described herein (e.g., methods 700, 800, 900, 1000, 1100, 1200, and 1300). For brevity, these details are not repeated here.

FIGS. 7A-7C are flow diagrams illustrating method 700 of applying a filter on a live image captured by one or more cameras of a computer system in an augmented reality environment, in accordance with some embodiments. Method 700 is performed at a computer system (e.g., portable multifunction device 100, FIG. 1A, device 300, FIG. 3A, or a multi-component computer system including headset 5008 and input device 5010, FIG. 5A2) having a display generation component (e.g., a display, a projector, a heads-up display, or the like), one or more cameras (e.g., video cameras that continuously provide a live preview of at least a portion of the contents that are within the field of view of the cameras and optionally generate video outputs including one or more streams of image frames capturing the contents within the field of view of the cameras), and an input device (e.g., a touch-sensitive surface, such as a touch-sensitive remote control, or a touch-screen display that also serves as the display generation component, a mouse, a joystick, a wand controller, and/or cameras tracking the position of one or more features of the user such as the user's hands). In some embodiments, the input device (e.g., with a touch-sensitive surface) and the display generation component are integrated into a touch-sensitive display. As described above with respect to FIGS. 3B-3D, in some embodiments, method 700 is performed at a computer system 301 in which respective components, such as a display generation component, one or more cameras, one or more input devices, and optionally one or more attitude sensors are each either included in or in communication with computer system 301.

In some embodiments, the display generation component is a touch-screen display and the input device (e.g., with a touch-sensitive surface) is on or integrated with the display generation component. In some embodiments, the display generation component is separate from the input device (e.g., as shown in FIG. 4B and FIG. 5A2). Some operations in method 700 are, optionally, combined and/or the order of some operations is, optionally, changed.

For convenience of explanation, some of the embodiments will be discussed with reference to operations performed on a computer system with a touch-sensitive display system 112 (e.g., on device 100 with touch screen 112). However, analogous operations are, optionally, performed on a computer system (e.g., as shown in FIG. 5A2) with a headset 5008 and a separate input device 5010 with a touch-sensitive surface in response to detecting the contacts on the touch-sensitive surface of the input device 5010 while displaying the user interfaces shown in the figures on the display of headset 5008.

As described below, method 700 relates to applying a filter to a representation of the field of view of one or more cameras of a computer system (e.g., a live preview of the field of view of the one or more cameras), in an augmented reality environment (e.g., in which reality is augmented with supplemental information that provides additional information to a user that is not available in the physical world), where the filter is selected based on a virtual environment setting for the augmented reality environment. Applying a filter in real-time on a live image captured by the one or more cameras provides an intuitive way for the user to interact with the augmented reality environment (e.g., by allowing the user to easily change a virtual environment setting (e.g., time of day, scene/environment, etc.) for the augmented reality environment) and allows the user to see the changes made to the virtual environment setting in real-time, thereby enhancing the operability of the device and making the user-device interface more efficient (e.g., by reducing the number of steps that are needed to achieve an intended outcome when operating the device and reducing user mistakes when operating/interacting with the device) which, additionally, reduces power usage and improves battery life of the device by enabling the user to use the device more quickly and efficiently. Additionally, changing the appearance of the view of the physical environment makes the virtual model more visible (e.g., as compared to a dark model on a very bright background) while still providing the user with information about the physical environment in which the virtual model has been placed.

The computer system (e.g., device 100, FIG. 5A21) displays (702), via the display generation component (e.g., touch screen 112, FIG. 5A21), an augmented reality environment (e.g., as shown in FIG. 5A21). Displaying the augmented reality environment includes (704) concurrently displaying: a representation of at least a portion of a field of view of the one or more cameras that includes a respective physical object (e.g., a 3D model of a building, a sheet of paper with a printed pattern, a poster on a wall or other physical object, a statue sitting on a surface, etc.) (e.g., physical building model 5006, FIG. 5A1), wherein the representation is updated as contents of the field of view of the one or more cameras change (e.g., the representation is a live preview of at least a portion of the field of view of the one or more cameras, and the respective physical object is included and visible in the field of view of the cameras); and a respective virtual user interface object (e.g., a virtual roof of the 3D model of the building, a virtual car parked on the a surface represented by the sheet of paper with the printed pattern, an interactive logo overlaid on the poster, a virtual 3D mask covering the contours of the statue, etc.) (e.g., virtual building model 5012, FIG. 5A21) at a respective location in the representation of the field of view of the one or more cameras, wherein the respective virtual user interface object has a location that is determined based on the respective physical object in the field of view of the one or more cameras. For example, in some embodiments, the respective virtual user interface object is a graphical object or a 2D or 3D virtual object that appears to be attached to, or that appears to cover, the respective physical object in the field of view of the one or more cameras (e.g., virtual building model 5012 is a 3D virtual object that appears to cover physical building model 5006, FIG. 5A21). The location and/or orientation of the respective virtual user interface object is determined based on the location, shape, and/or orientation of the physical object in the field of view of the one or more cameras (e.g., as shown in FIGS. 5A3 and 5A5). While displaying the augmented reality environment, the computer system detects (706) an input that changes a virtual environment setting (e.g., time of day, lighting angle, story, etc.) for the augmented reality environment (e.g., a swipe input that navigates through time in the augmented reality environment, as shown in FIGS. 5A21-5A24) (e.g., selecting a different display setting among a plurality of display settings corresponding to the respective physical object that is in the field of view of the one or more cameras, as shown in FIGS. 5A25-5A27). In response to detecting the input that changes the virtual environment setting, the computer system (708): adjusts an appearance of the respective virtual user interface object in accordance with the change made to the virtual environment setting for the augmented reality environment; and applies a filter to at least a portion of the representation of the field of view of the one or more cameras (e.g., the portion of the representation of the field of view of the one or more cameras that is not obscured by the respective virtual user interface object), wherein the filter is selected based on the change made to the virtual environment setting (e.g., applying overall color filter to darken the scene (e.g., as shown in FIG. 5A24), adding shadows to both the respective physical object and the virtual objects based on the direction of the virtual Sun (e.g., as shown in FIGS. 5A21-5A23), adding additional virtual objects to the scene (and/or removing virtual objects from the scene) based on the selected story (e.g., historical view, construction, day in the life of view, etc.) (e.g., as shown in FIGS. 5A25-5A27), and changing the color temperature, brightness, contrast, clarity, transparency, etc. of the image output of the cameras before the image output is displayed in the live preview of the field of view of the cameras).

In some embodiments, applying the filter to at least a portion of the representation of the field of view of the one or more cameras causes (710) an appearance adjustment of the augmented reality environment that is in addition to the appearance adjustment of the respective virtual user interface object. In some embodiments, the filter is applied to the portion of the representation of the field of view of the one or more cameras that is not obscured by the respective virtual user interface object (e.g., in FIG. 5A24, the filter is applied to wallpaper 5007, which is not obscured by the virtual scene). For example, when the construction view is selected, the virtual roof may be removed (e.g., adjusting the appearance of the respective virtual user interface object) to show the inside of the physical building model (e.g., as shown in FIG. 5A27) and a virtual scene showing the inside of the building under construction is overlaid on the live preview of the physical building model, while the surrounding physical environment is blurred out (e.g., using a filter). When a time-lapse animation is displayed showing the construction over a period of several days, light filters are applied to the portions of the live preview that are not obscured by the virtual scene, such that lighting changes throughout the days are applied to the physical objects surrounding the building model that are also included in the live preview (e.g., wallpaper 5007 is also darkened in night mode, FIG. 5A24). In some embodiments, the filter is applied to the augmented reality environment, including the respective virtual user interface object. For example, in some embodiments, an overall color filter is applied to the entire representation of the field of view of the one or more cameras, including the portion that is occupied by the respective virtual user interface object. Adjusting the appearance of the augmented reality environment in addition to adjusting the appearance of the respective virtual user interface object improves the visual feedback provided to the user (e.g., by making the computer system appear more responsive to user input), enhances the operability of the device, and makes the user-device interface more efficient (e.g., by helping the user to achieve an intended outcome with the required inputs and reducing user mistakes when operating/interacting with the device) which, additionally, reduces power usage and improves battery life of the device by enabling the user to use the device more quickly and efficiently.

In some embodiments, the virtual environment setting is (712) changed to a night mode; and applying the filter to at least a portion of the representation of the field of view of the one or more cameras includes: decreasing brightness of an image (or sequence of images) captured by the one or more cameras; and applying a color filter to the image (or sequence of images) captured by the one or more cameras (e.g., as shown in FIG. 5A24). In some embodiments, the filters that are applied to the image captured by the one or more cameras are applied before the image output is displayed in a live preview of the field of view of the one or more cameras (e.g., before the image captured by the one or more cameras is displayed in the augmented reality environment), as discussed below with respect to operation (726). Applying a filter for night mode (e.g., by decreasing brightness and applying a color filter) improves the visual feedback provided to the user (e.g., by making the computer system appear more responsive to user input), enhances the operability of the device, and makes the user-device interface more efficient (e.g., by reducing the number of steps that are needed to achieve an intended outcome when operating the device and reducing user mistakes when operating/interacting with the device) which, additionally, reduces power usage and improves battery life of the device by enabling the user to use the device more quickly and efficiently.

In some embodiments, the input that changes the virtual environment setting is (714) a swipe input (e.g., left to right or right to left) that navigates through time in the augmented reality environment. For example, in some embodiments, when a user swipes from left to right on the input device, the time of day in the augmented reality environment changes from day to night (e.g., in accordance with the speed and/or distance of the swipe input movement) (e.g., as shown in FIGS. 5A21-5A24). Allowing the user to navigate through time in the augmented reality environment using a swipe input provides an intuitive way for the user to change the virtual environment setting, improves the feedback provided to the user (e.g., by making the computer system appear more responsive to user input), enhances the operability of the device, and makes the user-device interface more efficient (e.g., by reducing the number of steps that are needed to achieve an intended outcome when operating the device and reducing user mistakes when operating/interacting with the device) which, additionally, reduces power usage and improves battery life of the device by enabling the user to use the device more quickly and efficiently.

In some embodiments, detecting the input that changes the virtual environment setting includes (716) detecting a movement of the input to change the virtual environment setting; adjusting the appearance of the respective virtual user interface object in accordance with the change made to the virtual environment setting for the augmented reality environment includes gradually adjusting the appearance of the respective virtual user interface object in accordance with the movement of the input to change the virtual environment setting; and applying the filter to at least a portion of the representation of the field of view of the one or more cameras includes gradually applying the filter in accordance with the movement of the input to change the virtual environment setting (e.g., as shown in FIGS. 5A21-5A24). For example, in some embodiments, the filter is gradually applied based on movement of the input and the appearance of the respective virtual user interface object is gradually adjusted based on the speed and/or distance of movement of the input (e.g., movement of a contact on a touch-sensitive surface, movement of a wand, or movement of a hand of the user in view of a camera of the computer system) (e.g., movement of contact 5030 on touch screen 112, FIGS. 5A21-5A24). Gradually adjusting the appearance of the virtual user interface object and gradually applying the filter in accordance with movement of the input to change the virtual environment setting improves the visual feedback provided to the user (e.g., by making the computer system appear more responsive to user input), enhances the operability of the device, and makes the user-device interface more efficient (e.g., by reducing the number of steps that are needed to achieve an intended outcome when operating the device and reducing user mistakes when operating/interacting with the device) which, additionally, reduces power usage and improves battery life of the device by enabling the user to use the device more quickly and efficiently.

In some embodiments, the respective virtual user interface object casts (718) a shadow on the respective physical object in the augmented reality environment. For example, in some embodiments, the virtual roof of a 3D model of a building casts a shadow on the 3D model of the building. As the time of day or lighting angle is changed (e.g., by changing the virtual environment setting), the shadow cast by the respective virtual user interface object on the respective physical object changes accordingly. For example, as shown in FIGS. 5A21-5A23, as the time of day is changed, the shadow cast by virtual building model 5012 changes accordingly. Displaying the virtual user interface object with a shadow (e.g., cast on the physical object) in the augmented reality environment improves the visual feedback provided to the user (e.g., by making the augmented reality environment more realistic and making the computer system appear more responsive to user input as the user changes the virtual environment setting), enhances the operability of the device, and makes the user-device interface more efficient (e.g., by reducing user mistakes when operating/interacting with the device) which, additionally, reduces power usage and improves battery life of the device by enabling the user to use the device more quickly and efficiently.

In some embodiments, the respective physical object casts (720) a shadow on the respective virtual user interface object in the augmented reality environment. For example, in some embodiments, the 3D model of a building casts a shadow on a virtual car parked next to the building. As the time of day or lighting angle is changed (e.g., by changing the virtual environment setting or due to movement of the physical object), the shadow cast by the respective physical object on the respective virtual user interface object changes accordingly. For example, in some embodiments, as the time of day in the augmented reality environment changes from mid-day (e.g., when respective shadows of objects in the augmented reality environment are relatively small) to morning or afternoon (e.g., when respective shadows of objects in the augmented reality environment are longer), the shadow cast by the respective physical object on the respective virtual user interface object changes accordingly (e.g., the shadow gets smaller/shorter as the time of day changes from morning to mid-day and the shadow gets larger/longer as the time of day changes from mid-day to afternoon). In some embodiments, a 3D virtual model of the respective physical object is used to determine where the shadow of the respective physical object should be in the augmented reality environment. Although in FIGS. 5A21-5A24 virtual building model 5012 completely covers physical building model 5006, if a portion of physical building model 5006 was exposed, that portion of the physical building model 5006 would cast a similar shadow as the time of day is changed in the augmented reality environment. Displaying the physical object with a shadow (e.g., cast on the virtual user interface object) in the augmented reality environment improves the visual feedback provided to the user (e.g., by making the augmented reality environment more realistic and making the computer system appear more responsive to user input as the user changes the virtual environment setting), enhances the operability of the device, and makes the user-device interface more efficient (e.g., by reducing user mistakes when operating/interacting with the device) which, additionally, reduces power usage and improves battery life of the device by enabling the user to use the device more quickly and efficiently.

In some embodiments, movement of the respective physical object (e.g., as a result of movement in the physical world of the respective physical object and/or as a result of movement of the computer system that causes movement of the respective physical object in the field of view of the one or more cameras) (e.g., movement of user 5002 from a first location (e.g., as shown in FIG. 5A3) to a second location (e.g., as shown in FIG. 5A5) causes (722) one or more changes in the appearance of the respective virtual user interface object in the augmented reality environment (e.g., changing the view of virtual building model 5012 from a front view to a side view, FIGS. 5A3-5A6). In some embodiments, movement of the respective physical object causes the respective physical object to cast shadows on the respective virtual user interface object differently because as the respective physical object moves, the ambient light source is at a different angle relative to the respective physical object (e.g., as shown in FIGS. 5A3-5A6). Changing the appearance of the virtual user interface object in the augmented reality environment in response to movement of the physical object improves the visual feedback provided to the user (e.g., by making the computer system appear more responsive to user input), enhances the operability of the device, and makes the user-device interface more efficient (e.g., by reducing user mistakes when operating/interacting with the device) which, additionally, reduces power usage and improves battery life of the device by enabling the user to use the device more quickly and efficiently.

In some embodiments, movement of the computer system causes (724) one or more changes in a visual effect that is applied to the representation of at least a portion of the field of view of the one or more cameras (e.g., the live preview) and the appearance of the respective virtual user interface object. For example, if the respective physical object is a physical 3D building model, as the user moves the computer system by walking around to a different side of the physical 3D building model, the angle of the lighting changes, which causes a change in the visual effect that is applied to the live preview and any virtual user interface objects (e.g., shadows, cast by the physical 3D building model and by one or more virtual objects, change) (e.g., as shown in FIGS. 5A3-5A6). Changing the visual effect that is applied to the live preview and changing the appearance of the virtual user interface object in response to movement of the computer system improves the visual feedback provided to the user (e.g., by making the computer system appear more responsive to user input), enhances the operability of the device, and makes the user-device interface more efficient (e.g., by reducing user mistakes when operating/interacting with the device) which, additionally, reduces power usage and improves battery life of the device by enabling the user to use the device more quickly and efficiently.

In some embodiments, applying the filter to at least a portion of the representation of the field of view of the one or more cameras includes (726): applying the filter to an image (or sequence of images) captured by the one or more cameras (e.g., a live preview of at least a portion of the contents that are within the field of view of the one or more cameras) before the image is transmitted to the display generation component (e.g., as shown in FIGS. 5A21-5A24). Applying the filter to the image captured by the cameras before the image is transmitted to the display provides a real-time view of changes made to the virtual environment setting, improves the visual feedback provided to the user (e.g., by making the computer system appear more responsive to user input), enhances the operability of the device, and makes the user-device interface more efficient (e.g., by reducing user mistakes when operating/interacting with the device) which, additionally, reduces power usage and improves battery life of the device by enabling the user to use the device more quickly and efficiently.

In some embodiments, the input that changes the virtual environment setting is (728) an input (e.g., a swipe input or a tap input on a button) (e.g., tap input by contact 5032 on button 5016, FIG. 5A26) that switches between different virtual environments for the virtual user interface object, wherein different virtual environments are associated with different interactions for exploring the virtual user interface object (e.g., from a first virtual environment to a second virtual environment) (e.g., as shown in FIGS. 5A25-5A27, from a landscape view to an interior view). In some embodiments, the different virtual environments for the same virtual user interface object are predefined virtual environments (e.g., landscape, interior, and day/night, as shown in FIGS. 5A25-5A27). For example, different virtual environment stories include a historical view, a construction view, a day-in-the-life view, a building exploration view, etc., where a construction view advances through time with a left to right swipe to show different stages of construction of the building, while a building exploration view displays detailed view of the architectural design of the building in response to an upward swipe input. Allowing the user to switch between different virtual environments (e.g., with a swipe input or a tap input on a button) provides an easy and intuitive way for the user to change the virtual environment setting, improves the feedback provided to the user (e.g., by making the computer system appear more responsive to user input), enhances the operability of the device, and makes the user-device interface more efficient (e.g., by reducing the number of steps that are needed to achieve an intended outcome when operating the device and reducing user mistakes when operating/interacting with the device) which, additionally, reduces power usage and improves battery life of the device by enabling the user to use the device more quickly and efficiently.

In some embodiments, in accordance with a determination that a first virtual environment setting is selected (e.g., a first virtual environment story, such as a construction view), the computer system displays (730) a first set of virtual objects in the augmented reality environment; and in accordance with a determination that a second virtual environment setting is selected (e.g., a second virtual environment story, such as a day-in-the-life view), the computer system displays a second set of virtual objects, distinct from the first set of virtual objects, in the augmented reality environment. In some embodiments, different sets of virtual objects are displayed based on the selection of the virtual environment setting. For example, in some embodiments, no trees or people are displayed in the construction view, and trees and people are displayed in the day-in-the-life view. As shown in FIGS. 5A25-5A27, for example, virtual trees, a virtual person, and a virtual car are displayed in the landscape view (e.g., in FIG. 5A25), and no trees or people or cars are displayed in the interior view (e.g., in FIG. 5A27). Displaying different sets of virtual objects based on the selection of the virtual environment setting improves the feedback provided to the user (e.g., by making the computer system appear more responsive to user input), enhances the operability of the device, and makes the user-device interface more efficient (e.g., by reducing the number of steps that are needed to achieve an intended outcome when operating the device and reducing user mistakes when operating/interacting with the device) which, additionally, reduces power usage and improves battery life of the device by enabling the user to use the device more quickly and efficiently.

It should be understood that the particular order in which the operations in FIGS. 7A-7C have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 800, 900, 1000, 1100, 1200, and 1300) are also applicable in an analogous manner to method 700 described above with respect to FIGS. 7A-7C. For example, the contacts, gestures, user interface objects, intensity thresholds, focus indicators, and/or animations described above with reference to method 700 optionally have one or more of the characteristics of the contacts, gestures, user interface objects, intensity thresholds, focus indicators, and/or animations described herein with reference to other methods described herein (e.g., methods 600, 800, 900, 1000, 1100, 1200, and 1300). For brevity, these details are not repeated here.

FIGS. 8A-8C are flow diagrams illustrating method 800 of transitioning between viewing a virtual model in the augmented reality environment and viewing simulated views of the virtual model from the perspectives of objects in the virtual model, in accordance with some embodiments. Method 800 is performed at a computer system (e.g., portable multifunction device 100, FIG. 1A, device 300, FIG. 3, or a multi-component computer system including headset 5008 and input device 5010, FIG. 5A2) having a display generation component (e.g., a display, a projector, a heads-up display, or the like), one or more cameras (e.g., video cameras that continuously provide a live preview of at least a portion of the contents that are within the field of view of the cameras and optionally generate video outputs including one or more streams of image frames capturing the contents within the field of view of the cameras), and an input device (e.g., a touch-sensitive surface, such as a touch-sensitive remote control, or a touch-screen display that also serves as the display generation component, a mouse, a joystick, a wand controller, and/or cameras tracking the position of one or more features of the user such as the user's hands). In some embodiments, the input device (e.g., with a touch-sensitive surface) and the display generation component are integrated into a touch-sensitive display. As described above with respect to FIGS. 3B-3D, in some embodiments, method 800 is performed at a computer system 301 in which respective components, such as a display generation component, one or more cameras, one or more input devices, and optionally one or more attitude sensors are each either included in or in communication with computer system 301.

In some embodiments, the display generation component is a touch-screen display and the input device (e.g., with a touch-sensitive surface) is on or integrated with the display generation component. In some embodiments, the display generation component is separate from the input device (e.g., as shown in FIG. 4B and FIG. 5A2). Some operations in method 800 are, optionally, combined and/or the order of some operations is, optionally, changed.

For convenience of explanation, some of the embodiments will be discussed with reference to operations performed on a computer system with a touch-sensitive display system 112 (e.g., on device 100 with touch screen 112). However, analogous operations are, optionally, performed on a computer system (e.g., as shown in FIG. 5A2) with a headset 5008 and a separate input device 5010 with a touch-sensitive surface in response to detecting the contacts on the touch-sensitive surface of the input device 5010 while displaying the user interfaces shown in the figures on the display of headset 5008.

As described below, method 800 relates to presenting (on a display of a computer system, such as device 100, FIG. 5A28) a virtual model (e.g., of a physical object) with virtual user interface objects in an augmented reality environment (e.g., in which reality is augmented with supplemental information that provides the user with additional information that is not available in the physical world) and presenting simulated views of the virtual model (e.g., in a virtual reality environment) from the perspectives of the virtual user interface objects, in response to movement of the computer system and/or detected inputs to the computer system (e.g., a contact on a touch-sensitive surface). In some embodiments, allowing the user to view the virtual model in the augmented reality environment provides the user with access to the supplemental information about the virtual model. In some embodiments, allowing the user to visualize the virtual model from different perspectives in the virtual reality environment provides the user with a more immersive and intuitive way to experience the virtual model. Allowing the user to access supplemental information about a physical object as well as providing an immersive and intuitive viewing experience enhances the operability of the device and makes the user-device interface more efficient (e.g., by reducing user distraction and mistakes when operating/interacting with the device), which, additionally, reduces power usage and improves battery life of the device by enabling the user to use the device more quickly and efficiently.

The computer system (e.g., device 100, FIG. 5A28) displays (802), via the display generation component, an augmented reality environment (e.g., the augmented reality environment shown in FIGS. 5A28-5A29). Displaying the augmented reality environment includes (804) concurrently displaying: a representation of at least a portion of a field of view of the one or more cameras that includes a respective physical object (e.g., a 3D model of a building, a sheet of paper with a printed pattern, a poster on a wall or other physical object, a statue sitting on a surface, etc.), wherein the representation is updated as contents of the field of view of the one or more cameras change (e.g., the representation is a live preview of at least a portion of the field of view of the one or more cameras, and the respective physical object is included and visible in the field of view of the cameras); and a first virtual user interface object in a virtual model (e.g., a rendered 3D model of the 3D building model, a virtual 3D model of a building that is placed on a surface represented by the sheet of paper with the printed pattern, a virtual camera affixed to a rendered virtual model of another wall or physical object opposite the wall or physical object with the poster, a virtual person standing near a virtual model (e.g., next to a virtual model of the building, or next to a virtual model of the statue sitting on the surface), etc.) that is displayed at a respective location in the representation of the field of view of the one or more cameras, wherein the first virtual user interface object has a location that is determined based on the respective physical object in the field of view of the one or more cameras. For example, in some embodiments, the first virtual user interface object is a graphical object or a 2D or 3D virtual object that appears to be attached to, or that appears to cover, the respective physical object in the field of view of the one or more cameras. The location and/or orientation of the respective virtual user interface object is determined based on the location, shape, and/or orientation of the physical object in the field of view of the one or more cameras. For example, as described above with reference to FIG. 5A28, displaying the augmented reality environment includes concurrently displaying: the representation of the portion of the field of view of the cameras, which includes wallpaper 5007 and the edge(s) of table 5004, as well as physical building model 5006 (as shown in FIG. 5A2), which is also in the field of view of the cameras; and the first virtual user interface object is virtual vehicle 5050. While displaying the augmented reality environment (e.g., with the first virtual user interface object overlaid on at least a portion of the field of view of the one or more cameras), the computer system detects (806) a first input that corresponds to selection of the first virtual user interface object (e.g., a tap on the first virtual user interface object or a selection of the first virtual user interface object with a cursor, or the like). For example, as described above with reference to FIG. 5A29, device 100 detects input 5052 that corresponds to selection of vehicle 5050. In response to detecting the first input (e.g., input 5052, FIG. 5A29) that corresponds to selection of the first virtual user interface object (e.g., vehicle 5050, FIG. 5A29), the computer system displays (808) a simulated field of view of the virtual model from a perspective of the first virtual user interface object in the virtual model (e.g., as shown in and described above with reference to FIG. 5A31) (and, optionally, ceases to display the representation of the field of view of the one or more cameras, as described herein with reference to operation 810). For example, when the user selects a virtual car (e.g., vehicle 5050, FIG. 5A29) in a rendered 3D model (e.g., the virtual model shown in FIG. 5A29) of the physical 3D building model (e.g., physical building model 5006, FIG. 5A1), the device displays a view of the rendered 3D building model from the perspective of the virtual car (e.g., as if the user were looking at the building model from the perspective of a person within the virtual car (e.g., the driver)). In some embodiments, the computer system also ceases to display the augmented reality environment, including ceasing to display the representation of the field of view of the cameras and the first virtual user interface object. In another example, when tapping on a virtual person standing next to a virtual model of the statue sitting on the surface, the device ceases to display the virtual person, and displays a virtual model of the statue from the perspective of the virtual person standing next to the virtual model of the statue.

In some embodiments, in response to detecting the first input that corresponds to selection of the first virtual user interface object, the computer system ceases (810) to display the representation of the field of view of the one or more cameras (e.g., content in the field of view of the one or more cameras that was displayed prior to detecting the first input as the computer system switches to displaying a view of the virtual model from a perspective of the first virtual object) (e.g., ceasing to display wallpaper 5007 and/or the edge of table 5004, as described above with reference to FIG. 5A30). Ceasing to display what is in the field of view of the camera(s) when transitioning to viewing the virtual model from the perspective of the selected virtual user interface object (e.g., in the virtual reality environment) indicates that the user is no longer in AR mode and provides the user with a more immersive viewing experience that allows the user to focus on the virtual model and the virtual environment. Providing the user with a more immersive and intuitive viewing experience of the virtual model enhances the operability of the device and makes the user-device interface more efficient (e.g., by reducing user distraction and mistakes when operating/interacting with the device), which, additional, reduces power usage and improves battery life of the device by enabling the user to use the device more quickly and efficiently, as well as reduces the energy and processing resources that would be required to capture and simulate the background user interface.

In some embodiments, in response to detecting movement of at least a portion of the computer system (e.g., movement of one or more components of the computer system, such as the one or more cameras or the input device) that changes the field of view of the one or more cameras while displaying the augmented reality environment, the computer system updates (812) the representation of the field of view of the one or more cameras. For example, as described above with reference to FIGS. 5A15-5A16, device 100 changes the field of view of the camera of device 100 in response to movement of device 100. Updating what is displayed in the augmented reality environment in response to movement that changes the field of view of the camera(s) provides consistency between what is displayed and what a user would expect to see based on the positioning of the computer system (or more specifically, the camera(s)) in the physical world, and thus improves the visual feedback provided to the user (e.g., by making the computer system appear more responsive to user input and camera position/direction). Providing the user with a more intuitive viewing experience enhances the operability of the device and makes the user-device interface more efficient (e.g., by reducing user distraction and mistakes when operating/interacting with the device), which, additionally, reduces power usage and improves battery life of the device by enabling the user to use the device more quickly and efficiently.

In some embodiments, while displaying the augmented reality environment, in response to detecting movement of at least a portion of the computer system (e.g., movement of a component of the computer system such as the one or more cameras or the input device) that changes a perspective of the contents of the field of view of the one or more cameras, the computer system updates (814) the representation of the field of view of the one or more cameras and the virtual model in accordance with the changes in the perspective of the contents of the field of view (e.g., the computer system, using image analysis, determines an updated orientation of the one or more cameras to the physical object, and uses the determined orientation to update the representation). For example, as described above with reference to FIGS. 5A3-5A6, device 100 displays different views of the augmented reality when user 5002 moves from a first position with a first perspective (e.g., from the front of table 5004, as shown in FIGS. 5A3-5A4) to a second position with a second perspective (e.g., from the side of table 5004, as shown in FIGS. 5A5-5A6). Updating what is displayed in the augmented reality environment in response to movement that changes the perspective of the camera(s) provides consistency between what is displayed and what a user would expect to see based on the positioning of the computer system (or more specifically, the camera(s)) in the physical world, and improves the visual feedback provided to the user (e.g., by making the computer system appear more responsive to user input and camera position/direction). Providing the user with a more intuitive viewing experience enhances the operability of the device and makes the user-device interface more efficient (e.g., by reducing user distraction and mistakes when operating/interacting with the device), which, additionally, reduces power usage and improves battery life of the device by enabling the user to use the device more quickly and efficiently.

In some embodiments, in response to detecting the first input that corresponds to selection of the first virtual user interface object, the computer system displays (816) an animated transition from the augmented reality environment to the simulated field of view of the virtual model from the perspective of the first virtual user interface object in the virtual model (e.g., an animation from the perspective of a viewer moving (e.g., flying) from an initial position with a view of the augmented reality environment as displayed to the position of the first user interface object in the virtual model with the simulated field of view). For example, as described above with reference to FIGS. 5A29-5A31, device 100 displays an animated transition from the augmented reality environment (FIG. 5A29) to the simulated field of view of the virtual model from the perspective of vehicle 505 (FIG. 5A31). Displaying an animated transition (e.g., an animation of flying) between the view of the augmented reality environment and the simulated view of the virtual model from the perspective of the virtual user interface object (e.g., in the virtual reality environment) provides the user with a smoother transition between the views and gives the user the impression of entering the virtual reality environment from the physical world (or the augmented reality environment corresponding to the physical world), while helping the user to maintain context. Providing the user with a more immersive viewing experience with smoother transitions into and out of that viewing experience, and helping the user to maintain context during the viewing experience, enhances the operability of the device and makes the user-device interface more efficient (e.g., by reducing user distraction and mistakes when operating/interacting with the device), which, additionally, reduces power usage and improves battery life of the device by enabling the user to use the device more quickly and efficiently.

In some embodiments, while displaying the simulated field of view of the virtual model from the perspective of the first virtual user interface object in the virtual model, the computer system detects (818) a second input that corresponds to a request to display the augmented reality environment (e.g., a request to exit the virtual reality environment, such as a selection of an affordance for returning to the augmented reality environment, or such as selection of a location in the virtual model that does not have an associated perspective view of the virtual model); and in response to the second input that corresponds to the request to display the augmented reality environment, the computer system: displays an animated transition from the simulated field of view of the virtual model to the augmented reality environment (e.g., an animation from the perspective of a viewer moving (e.g., flying) from the position of the first user interface object in the virtual model with the simulated field of view to a position with a view of the augmented reality environment); and displays the augmented reality environment. For example, as described above with reference to FIGS. 5A37-5A40, while displaying the simulated field of view from the perspective of person 5060 (FIG. 5A37), device 100 detects input 5066 that corresponds to a request to display the augmented reality environment (FIG. 5A38), and in response displays the animated transition to the augmented reality environment (FIGS. 5A39-5A40). Displaying an animated transition (e.g., an animation of flying) between the simulated view of the virtual model from the perspective of the virtual user interface object (e.g., in the virtual reality environment) and the view of the augmented reality environment provides the user with a smoother transition between the views and gives the user the impression of exiting the virtual reality environment and returning to the physical world (or the augmented reality environment corresponding to the physical world), while helping the user to maintain context. Providing the user with a more immersive and intuitive viewing experience with smoother transitions into and out of that viewing experience, and helping the user to maintain context during the viewing experience, enhances the operability of the device and makes the user-device interface more efficient (e.g., by reducing user distraction and mistakes when operating/interacting with the device), which, additionally, reduces power usage and improves battery life of the device by enabling the user to use the device more quickly and efficiently.

In some embodiments, displaying the augmented reality environment in response to the second input comprises (820) displaying the augmented reality environment in accordance with the field of view of the one or more cameras subsequent to detecting the second input (e.g., if the field of view of the one or more cameras has changed since detecting the first input, then the displayed augmented reality environment will be shown from a different view in response to the second input). For example, as described above with reference to FIGS. 5A39-5A40, the field of view of the cameras in FIG. 40 has changed from the field of view of the cameras in FIG. 28 when input 5050 (to switch to the simulated perspective view) was detected; accordingly, the augmented reality environment in FIG. 40 is shown from a different view in response to input 5066 (to return to the view of the augmented reality environment). Updating what is displayed in the augmented reality environment when returning to the augmented reality environment from the virtual reality environment provides consistency between what is displayed and what a user would expect to see based on the positioning of the computer system (or more specifically, the camera(s)) in the physical world at the time the user is returned to the augmented reality view, and thus improves the visual feedback provided to the user (e.g., by making the computer system appear more responsive to user input and camera position/direction). Providing the user with a more intuitive viewing experience enhances the operability of the device and makes the user-device interface more efficient (e.g., by reducing user distraction and mistakes when operating/interacting with the device), which, additionally, reduces power usage and improves battery life of the device by enabling the user to use the device more quickly and efficiently.

In some embodiments, the field of view of the one or more cameras subsequent to detecting the second input is (822) different from the field of view of the one or more cameras when the first input was detected (e.g., the field of view of the one or more cameras has changed from the field of view that was displayed (or of which a representation was displayed) immediately prior to switching to the virtual reality environment, as described herein with reference to FIGS. 5A28 and 5A40, and operation 820). Updating what is displayed in the augmented reality environment when returning to the augmented reality environment from the virtual reality environment provides consistency between what is displayed and what a user would expect to see based on the positioning of the computer system (or more specifically, the camera(s)) in the physical world at the time the user is returned to the augmented reality view. In particular, if the field of view of the camera(s) upon returning to the augmented reality environment is different from the previous field of view of the camera(s) just before the user left the augmented reality environment and entered the virtual reality environment, then the user might naturally expect to see a different field of view displayed upon returning to the augmented reality environment. As such, presenting a different view of the augmented reality environment upon returning improves the visual feedback provided to the user (e.g., by making the computer system appear more responsive to user input and camera position/direction). Providing the user with a more intuitive viewing experience enhances the operability of the device and makes the user-device interface more efficient (e.g., by reducing user distraction and mistakes when operating/interacting with the device), which, additionally, reduces power usage and improves battery life of the device by enabling the user to use the device more quickly and efficiently.

In some embodiments, the first virtual user interface object moves (824) in the virtual model independently of inputs from a user of the computer system. In some embodiments, the first virtual user interface object moves independently in the augmented reality environment. For example, when a virtual person walks around in the virtual model autonomously (e.g., in the augmented reality environment); the user of the computer system has no control over the movement of the virtual person in the virtual model (e.g., as described herein with reference to FIG. 5A31). Displaying movement of the virtual user interface object in the virtual model independent of user inputs (e.g., in the augmented reality environment) presents the user with a more intuitive viewing experience in which virtual user interface objects appear to move autonomously within the augmented reality environment. Providing the user with a more intuitive viewing experience enhances the operability of the device and makes the user-device interface more efficient (e.g., by reducing user distraction and mistakes when operating/interacting with the device), which, additionally, reduces power usage and improves battery life of the device by enabling the user to use the device more quickly and efficiently.

In some embodiments, while displaying the simulated field of view of the virtual model from the perspective of the first virtual user interface object in the virtual model, the first virtual user interface object moves (826) in the virtual model in response to one or more inputs from a user of the computer system. In some embodiments, while viewing the virtual model from the perspective of a virtual person or virtual vehicle in the virtual model, the user controls the movement of the virtual person or vehicle (e.g., a direction and/or speed of movement) in the virtual model. For example, a user may control where the virtual person walks (e.g., as described herein with reference to FIG. 5A35-5A37), or where the virtual vehicle drives (e.g., as described herein with reference to FIG. 5A31-5A33), within the environment of the virtual model. Allowing the user to move the virtual user interface object in the virtual model (e.g., in the virtual reality environment) provides the user with a more immersive viewing experience that allows the user to access additional information about the virtual model as if the user were present in the virtual model, and improves the visual feedback provided to the user (e.g., by making the computer system appear more responsive to user input). Providing the user with a more immersive viewing experience and improved visual feedback enhances the operability of the device and makes the user-device interface more efficient (e.g., by reducing user distraction and mistakes when operating/interacting with the device), which, additionally, reduces power usage and improves battery life of the device by enabling the user to use the device more quickly and efficiently.

In some embodiments, while displaying the simulated field of view, the computer system detects (828) movement of at least a portion of the computer system (e.g., movement of one or more components of the computer system, such as the one or more cameras or the input device), and, in response to detecting the movement of the computer system, changes the simulated field of view of the virtual model from the perspective of the first virtual user interface object in accordance with the movement of the computer system. In some embodiments, the simulated field of view in the virtual reality environment is updated in accordance with changes in attitude (e.g., orientation and/or position) of the computer system, or of one or more components of the computer system. For example, if a user raises the computer system upward, the simulated field of view is updated as if the virtual person in the virtual model lifted their head to look upward. Changes in attitude of the computer system are, optionally, determined based on a gyroscope, magnetometer, inertial measurement unit, and/or one or more cameras of the device that detect movement of the device based on objects in the field of view of the one or more cameras. For example, as described above with reference to FIGS. 5A35-5A37, in response to movement of device 100 toward the left and rotation of device 100, the displayed simulated perspective view of the virtual model, from the perspective of person 5060, is updated. Changing what is displayed in the virtual reality environment from the perspective of the virtual user interface object in response to movement of the computer system provides the user with a more immersive viewing experience that allows the user to access additional information about the virtual model as if the user were present in the virtual model, and improves the visual feedback provided to the user (e.g., by making the computer system appear more responsive to user input). Providing the user with a more immersive viewing experience and improved visual feedback enhances the operability of the device and makes the user-device interface more efficient (e.g., by reducing user distraction and mistakes when operating/interacting with the device), which, additionally, reduces power usage and improves battery life of the device by enabling the user to use the device more quickly and efficiently.

In some embodiments, while displaying the simulated field of view of the virtual model from the perspective of the first virtual user interface object in the virtual model (e.g., the simulated view from the perspective of vehicle 5050 as shown in FIG. 5A33), the computer system detects (830) a third input (e.g., input 5062, FIG. 5A34) that corresponds to selection of a second virtual user interface object in the virtual model (e.g., a virtual person or virtual vehicle in the virtual model) (e.g., person 5060, FIG. 5A34); and in response to detecting the third input that corresponds to selection of the second virtual user interface object, displays a second simulated field of view of the virtual model from a perspective of the second virtual user interface object in the virtual model (e.g., the simulated view from the perspective of person 5060 as shown in FIG. 5A35) (e.g., and ceases to display the simulated field of view of the virtual model from the perspective of the first virtual user interface object in the virtual model). Allowing the user to view the virtual model from the perspective of multiple virtual user interface objects in the virtual model, and allowing the user to switch between the various perspective views by selecting the corresponding virtual user interface object for that view, provides the user with a more immersive viewing experience that allows the user to access additional information about the virtual model from multiple perspectives as if the user were present in the virtual model, and improves the visual feedback provided to the user (e.g., by making the computer system appear more responsive to user input). Providing the user with a more immersive viewing experience and improved visual feedback enhances the operability of the device and makes the user-device interface more efficient (e.g., by reducing user distraction and mistakes when operating/interacting with the device), which, additionally, reduces power usage and improves battery life of the device by enabling the user to use the device more quickly and efficiently.

In some embodiments, while displaying the simulated field of view of the virtual model from the perspective of the first virtual user interface object in the virtual model (e.g., the simulated view from the perspective of person 5060 as shown in FIG. 5A37), the computer system detects (832) a fourth input that corresponds to a selection of a location in the virtual model other than a virtual user interface object for which an associated simulated field of view can be displayed (e.g., as described herein with reference to input 5066, FIG. 5A38); and, in response to detecting the fourth input, redisplays the augmented reality environment (e.g., the view of the augmented reality environment as shown in FIG. 5A40) (e.g., and ceases to display the simulated field of view of the virtual model from the perspective of the first virtual user interface object in the virtual model). In some embodiments, some virtual user interface objects in the virtual model are ones for which simulated fields of view can be displayed from the perspective of those objects. In some embodiments, other locations in the virtual model, including some virtual user interface objects, do not have associated simulated fields of view, or do not allow display of a simulated field of view from their perspectives, and, in some embodiments, a user can select such locations or objects to exit the virtual reality environment and redisplay the augmented reality environment. For example, while selection of a virtual person results in display of a simulated field of view from the perspective of the virtual person, selection of a patch of grass results in exit of the virtual reality environment and redisplay of the augmented reality environment. In some embodiments, the device redisplays the augmented reality environment and ceases to display the simulated field of view of the virtual model from the perspective of the first virtual user interface object in the virtual model in response to selection of an "exit" button or affordance or in response to a gesture such as an edge swipe gesture that starts from an edge of the touch-sensitive surface or a pinch gesture that includes movement of two or more contacts toward each other by at least a predetermined amount. Allowing the user to return from the virtual reality environment to the augmented reality environment by selecting a location in the virtual model for which a corresponding perspective view is not displayed provides the user with an intuitive and straightforward way to transition back to the augmented reality environment without requiring more inputs or additional displayed controls. Reducing the number of inputs needed to perform an operation and providing additional control options without cluttering the user interface with additional displayed controls enhances the operability of the device and makes the user-device interface more efficient (e.g., by reducing user distraction and mistakes when operating/interacting with the device), which, additionally, reduces power usage and improves battery life of the device by enabling the user to use the device more quickly and efficiently.

It should be understood that the particular order in which the operations in FIGS. 8A-8C have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, 900, 1000, 1100, 1200, and 1300) are also applicable in an analogous manner to method 800 described above with respect to FIGS. 8A-8C. For example, the contacts, gestures, user interface objects, intensity thresholds, focus indicators, and/or animations described above with reference to method 800 optionally have one or more of the characteristics of the contacts, gestures, user interface objects, intensity thresholds, focus indicators, and/or animations described herein with reference to other methods described herein (e.g., methods 600, 700, 900, 1000, 1100, 1200, and 1300). For brevity, these details are not repeated here.

FIGS. 9A-9E are flow diagrams illustrating method 900 of three-dimensional manipulation of virtual user interface objects, in accordance with some embodiments. Method 900 is performed at a computer system (e.g., portable multifunction device 100, FIG. 1A, device 300, FIG. 3A, or a multi-component computer system including headset 5008 and input device 5010, FIG. 5A2) that includes (and/or is in communication with) a display generation component (e.g., a display, a projector, a heads-up display, or the like) and an input device (e.g., a touch-sensitive surface, such as a touch-sensitive remote control, or a touch-screen display that also serves as the display generation component, a mouse, a joystick, a wand controller, and/or cameras tracking the position of one or more features of the user such as the user's hands), optionally one or more cameras (e.g., video cameras that continuously provide a live preview of at least a portion of the contents that are within the field of view of the cameras and optionally generate video outputs including one or more streams of image frames capturing the contents within the field of view of the cameras), optionally one or more attitude sensors, optionally one or more sensors to detect intensities of contacts with the touch-sensitive surface, and optionally one or more tactile output generators. In some embodiments, the input device (e.g., with a touch-sensitive surface) and the display generation component are integrated into a touch-sensitive display. As described above with respect to FIGS. 3B-3D, in some embodiments, method 900 is performed at a computer system 301 (e.g., computer system 301-*a*, 301-*b*, or 301-*c*) in which respective components, such as a display generation component, one or more cameras, one or more input devices, and optionally one or more attitude sensors are each either included in or in communication with computer system 301.

In some embodiments, the display generation component is a touch-screen display and the input device (e.g., with a touch-sensitive surface) is on or integrated with the display generation component. In some embodiments, the display generation component is separate from the input device (e.g., as shown in FIG. 4B and FIG. 5A2). Some operations in method 900 are, optionally, combined and/or the order of some operations is, optionally, changed.

For convenience of explanation, some of the embodiments will be discussed with reference to operations performed on a computer system with a touch-sensitive display system 112 (e.g., on device 100 with touch screen 112) and one or more integrated cameras. However, analogous operations are, optionally, performed on a computer system (e.g., as shown in FIG. 5A2) with a headset 5008 and a separate input device 5010 with a touch-sensitive surface in response to detecting the contacts on the touch-sensitive surface of the input device 5010 while displaying the user interfaces shown in the figures on the display of headset 5008. Similarly, analogous operations are, optionally, performed on a computer system having one or more cameras that are implemented separately (e.g., in a headset) from one or more other components (e.g., an input device) of the computer system; and in some such embodiments, "movement of the computer system" corresponds to movement of one or more cameras of the computer system, or movement of one or more cameras in communication with the computer system.

As described below, method 900 relates to adjusting (on a display of a computer system) an appearance of a virtual user interface object, also referred to herein as a virtual object, in an augmented reality environment (e.g., in which reality is augmented with supplemental information that provides additional information to the user that is not available in the physical world), based on selection of a portion of the virtual user interface object and movement of an input in two dimensions. Adjusting an appearance of a virtual user interface object (e.g., moving the virtual user interface object or adjusting the size of the virtual user interface object) based on selection of a portion of the virtual user interface object and movement of an input in two dimensions provides an intuitive way for the user to adjust the appearance of the virtual user interface object (e.g., via movement of a contact on the input device or movement of a remote control), thereby enhancing the operability of the device and making the user-device interface more efficient (e.g., by allowing the user to interact with the virtual user interface object directly rather than cluttering the displayed user interface with additional controls), which, additionally, reduces power usage and improves battery life of the device by enabling the user to use the device more quickly and efficiently.

The computer system (e.g., device 100, FIG. 5B2) displays (902), via the display generation component (e.g., display 112, FIG. 5B2), a first virtual user interface object (e.g., user interface object 5210, FIG. 5B2) in a virtual three-dimensional space. For example, in some embodiments, the first virtual user interface object is a 2D or 3D virtual object that appears to be attached to, or cover, a physical object (e.g., reference mat 5208*a*, FIG. 5B2) in the field of view of one or more cameras that are coupled to the computer system. The location and/or orientation of the first virtual user interface object 5210 is optionally determined based on the location, shape, and/or orientation of the physical object 5208*a* in the field of view of the one or more cameras.

While displaying the first virtual user interface object 5210 in the virtual three-dimensional space (904), the computer system detects, via the input device, a first input that includes selection of a respective portion of the first virtual user interface object 5210 and movement of the first input in two dimensions (e.g., movement of a contact across a planar touch-sensitive surface, or movement of a remote control that include movement components in two orthogonal dimensions of the three dimensional physical space around the remote control).

For example, as illustrated in FIG. 5B6, an input by contact 5222 selects the top surface of virtual user interface object 5210 (as indicated by movement projections 5226 that indicate the plane of movement of virtual box 5210) and the contact 5222 moves in two dimensions across touch-sensitive surface 112, as indicated by arrow 5228.

In another example, illustrated in FIG. 5B10, an input by contact 5232 selects the front surface of virtual user interface object 5210 (as indicated by movement projections 5236) and the contact 5232 moves in two dimensions across touch-sensitive surface 112, as indicated by arrow 5238.

In another example, illustrated in FIGS. 5B18-5B20, an input by contact 5244 selects the top surface of virtual user interface object 5210 (as indicated by resizing projections 5246 that indicate an axis along which virtual box 5210 will be resized in response to subsequent movement of the contact) and the contact 5244 moves in two dimensions across touch-sensitive surface 112, as indicated by arrow 5248.

In another example, illustrated in FIGS. 5B28-5B30, an input by contact 5262 selects the front surface of virtual user interface object 5260 (as indicated by resizing projections 5266 that indicate an axis along which virtual box 5260 will be resized) and the device 100 moves in two dimensions, as indicated by arrow 5268.

In response to detecting the first input that includes movement of the first input in two dimensions (906): in accordance with a determination that the respective portion of the first virtual user interface object is a first portion of the first virtual user interface object (e.g., a first side of a cubical object, such as the top side of virtual user interface object 5210 as indicated in FIG. 5B6), the computer system adjusts an appearance of the first virtual user interface object (e.g., by resizing, translating, and/or skewing) in a first direction determined based on the movement of the first input in two dimensions (e.g., as indicated by arrow 5228, FIG. 5B6) and the first portion of the first virtual user interface object that was selected. The adjustment of the first virtual user interface object in the first direction is constrained to movement in a first set of two dimensions of the virtual three-dimensional space (e.g., as indicated by movement projections 5226). In accordance with a determination that the respective portion of the first virtual user interface object 5210 is a second portion of the first virtual user interface object that is distinct from the first portion of the first virtual user interface object (e.g., a second side of the cubical object that is next to or opposite to the first side of the cubical object, such as the front side of virtual user interface object 5210 as indicated in FIG. 5B10), the computer system adjusts the appearance of the first virtual user interface object (e.g., by resizing, translating, and/or skewing) in a second direction that is different from the first direction. The second direction is determined based on the movement of the first input in two dimensions (e.g., as indicated by arrow 5238, FIG. 5B10) and the second portion of the first virtual user interface object that was selected. The adjustment of the first virtual user interface object 5210 in the second direction is constrained to movement in a second set of two dimensions of the virtual three-dimensional space (e.g., as indicated by movement projections 5236) that is different from the first set of two dimensions of the virtual three-dimensional space. For example, an amount of adjustment that is made to the appearance of the first virtual user interface object 5210 in a respective direction of the first direction and the second direction is constrained in at least one dimension of virtual three-dimensional space (e.g., as indicated by movement projections) that is selected in accordance with the respective portion of the first virtual user interface object that was selected. In some embodiments, the movement of the cubical object in the virtual three-dimensional space is constrained to the plane of the selected side of the cubical object (e.g., as illustrated by FIGS. 5B6-5B8 and 5B10-5B11). In some embodiments, the extrusion of the cubical object is constrained within the direction that is perpendicular to the plane of the selected side of the cubical object (e.g., as illustrated in FIGS. 5B19-5B20 and FIGS. 5B29-5B30). In some embodiments, while the first virtual user interface object is selected, a visual indication of selection of the first virtual user interface object is displayed. For example, one or more lines along edges of first virtual user interface object are highlighted (e.g., as illustrated by movement projections 5226 and 5236) and/or the first virtual user interface object is highlighted. In some embodiments, the computer system detects a plurality of inputs that include selection of a respective portion of the first virtual user interface object and movement of the first input in two dimensions, wherein the plurality of inputs includes at least one input for which the respective portion of the first virtual user interface object is the first portion of the first virtual user interface object, and at least one input for which the respective portion of the first virtual user interface object is the second portion of the first virtual user interface object.

In some embodiments, the first portion is (908) a first side (e.g., top side 5224, FIG. 5B6) of the first virtual user interface object, the second portion is a second side (e.g., front side 5234, FIG. 5B10) of the first virtual user interface object, and the first side is not parallel to the second side (e.g., the first side is perpendicular to the second side). Adjusting the appearance of the virtual user interface differently depending on whether the selected portion of the virtual user interface object is a first side of the object or a second side of the object (that is not parallel to the first side of the object) provides an intuitive way for the user to adjust the appearance of the first virtual user interface object (e.g., by allowing the user to adjust the appearance of the first virtual user interface object in a particular plane or along a particular axis). Allowing the user to adjust the first virtual user interface object (e.g., via direct interaction with a selected portion of the first virtual user interface object) avoids cluttering the user interface with additional displayed controls, thereby enhancing the operability of the device and making the user-device interface more efficient, which, additionally, reduces power usage and improves battery life of the device by enabling the user to use the device more quickly and efficiently.

In some embodiments, adjusting the appearance of the first virtual user interface object includes (910) adjusting the appearance of the first virtual user interface object (e.g., moving or resizing the first virtual user interface object) such that a position of the first virtual user interface object is locked to a plane that is parallel to the selected respective portion of the virtual user interface object (e.g., by locking a position of the first virtual user interface object is to a plane that is parallel to the selected respective portion of the virtual user interface object). For example, in FIGS. 5B6-5B8, the position of virtual user interface object 5210 is locked to a plane, indicated by movement projections 5226, that is parallel to selected top side 5224 of virtual user interface object 5210. In some embodiments, the parallel plane is perpendicular to a line that is normal to the surface of the selected respective portion and is in contact with that surface. The two-dimensional movement of the first input corresponds to two-dimensional movement of the first virtual user interface object on the plane that is parallel to the selected respective portion of the virtual user interface object (e.g., by mapping the two-dimensional movement of the first input to two-dimensional movement of the first virtual user interface object on the plane that is parallel to the selected respective portion of the virtual user interface object). For example, movement of input by contact 5222, as indicated by arrows 5228 and 5230, causes virtual object 5210 to move on the plane indicated by movement projections 5226. In some embodiments, adjusting the appearance of the first virtual interface object in the first direction includes adjusting the appearance of the first virtual interface object along a first plane (e.g., and adjusting in the second direction includes adjusting along a second plane that is not parallel (e.g., perpendicular to) the first plane). For example, in FIGS. 5B6-5B8, virtual user interface object 5210 is moved along a first plane, as illustrated by movement projections 5226, and in FIGS. 5B10-5B11, virtual user interface object 5210 is moved along a second plane, as illustrated by movement projections 5236. Adjusting the appearance of the first virtual user interface object such that the position of the first virtual user interface object is locked to a plane that is parallel to the selected respective portion of the virtual user interface, and such that movement of the first virtual user interface object is on the plane, enable an object to be manipulated in a three-dimensional space using inputs on a two-dimensional surface (e.g., touch-sensitive surface 112). Enabling an object to be manipulated in three-dimensional space using inputs on a two-dimensional surface provides an intuitive way for a user to adjust the appearance of the first virtual user interface object (e.g., by confining movement of the first virtual user interface object to a plane, such that the user can predict and understand how the appearance of the first virtual user interface object will be adjusted in response to input in two dimensions), thereby enhancing the operability of the device and making the user-device interface more efficient, which, additionally, reduces power usage and improves battery life of the device by enabling the user to use the device more quickly and efficiently.

In some embodiments, adjusting the appearance of the first virtual user interface object includes (912) displaying (e.g., while the first input is detected) a plane-of-movement indicator (e.g., one or more lines that extend from edges of the object (such as movement projections 5226), a shape outline displayed in the plane, and/or a grid displayed in the plane) that includes a visual indication of the plane that is parallel to the selected respective portion of the virtual user interface object. Displaying a visual indication of the plane that is parallel to the selected respective portion of the virtual user interface object improves the visual feedback provided to the user (e.g., by providing an indication of how the appearance of the first virtual user interface object will be adjusted in response to input in two dimensions), enhances the operability of the device, and makes the user-device interface more efficient (e.g., by helping the user to achieve an intended outcome with the required inputs and reducing user mistakes when operating/interacting with the device), which, additionally, reduces power usage and improves battery life of the device by enabling the user to use the device more quickly and efficiently.

In some embodiments, the plane-of-movement indicator includes (914) one or more projections (e.g., lines) that extend from the first virtual user interface object (e.g., from a surface and/or side of the first virtual user interface object) along the plane that is parallel to the selected respective portion of the virtual user interface object (such as movement projections 5226). Displaying projections that extend from the first virtual user interface object (e.g., to indicate the plane along which the first virtual user interface object will move in response to input in two dimensions) enhances the operability of the device and makes the user-device interface more efficient (e.g., by helping the user to achieve an intended outcome with the required inputs and reducing user mistakes when operating/interacting with the device), which, additionally, reduces power usage and improves battery life of the device by enabling the user to use the device more quickly and efficiently.

In some embodiments, in response to detecting the first input that includes movement of the first input, the computer system determines (916) whether the first input meets size adjustment criteria. In some embodiments, determining whether the first input meets size adjustment criteria includes determining whether the first input has a duration that increases above a duration threshold (e.g., the first input is a long press input). In some embodiments, the computer system includes one or more sensors configured to detect intensities of contacts with a touch-sensitive surface and determining whether the first input meets size adjustment criteria includes determining whether the first input has a characteristic intensity (e.g., as described with regard to FIGS. 4D-4E) that increases above an intensity threshold (e.g., light press intensity threshold $IT_L$ and/or deep press intensity threshold $IT_D$). In accordance with a determination that the first input meets the size adjustment criteria, the computer system adjusts the appearance of the first virtual user interface object such that a position of the first virtual user interface object is locked to an anchor point in the virtual three-dimensional space (e.g., a position of the first virtual user interface object is locked to an anchor point in the virtual three-dimensional space) and a size of the first virtual user interface object is adjusted along an axis that is perpendicular to the selected respective portion (e.g., the axis is normal to the surface of the selected respective portion (or a centroid of the selected respective portion) of the first virtual user interface object. For example, in FIGS. 5B18-5B19, in accordance with a determination that an input by contact 5244 meets duration criteria, it is determined that the input meets size adjustment criteria (e.g., as indicated by display of resizing projections 5246 that are perpendicular to the top side 5224 of virtual user interface object 5210 that is selected by contact 5244) and, in FIGS. 5B19-5B20, the size of virtual user interface object 5210 is adjusted along the axis indicated by resizing projections 5246. Allowing the user to adjust the size of the virtual user interface object in response to an input that includes movement of the input in two dimensions provides an intuitive way for the user to adjust the size of the virtual user interface object, improves the feedback provided to the user (e.g., by making the computer system appear more responsive to user input), enhances the operability of the device, and makes the user-device interface more efficient (e.g., by helping the user to achieve an intended outcome with the required inputs and reducing user mistakes when operating/interacting with the device), which, additionally, reduces power usage and improves battery life of the device by enabling the user to use the device more quickly and efficiently.

In some embodiments, the anchor point is (918) located on a portion of the first virtual user interface object that is opposite to the selected respective portion of the first virtual user interface object (e.g., the anchor point is located on a side of the first virtual user interface object that is opposite to a selected side of the virtual user interface object). For example, in FIG. 5B19, the selected side of virtual user interface object 5210 is top side 5224 (e.g., as indicated by display of resizing projections 5246 that are perpendicular to the top side 5224) and the anchor point is located on the side of virtual user interface object 5210 that is opposite top side 5224 (e.g., the side of virtual user interface object 5210 that is adjacent to displayed version 5208*b* of reference mat 5208). In some embodiments, the anchor point is located on the selected respective portion of the virtual user interface object. Anchoring the portion of the first virtual user interface object to a point on a portion of the first virtual user interface object that is opposite to the selected portion provides an intuitive way for the user to adjust the appearance of the virtual user interface object (e.g., by giving the user a sense of extending the object by pulling outward from the selected surface, particularly when the first virtual user interface object is shown relative to a plane), enhances the operability of the device, and makes the user-device interface more efficient (e.g., by helping the user to achieve an intended outcome with the required inputs and reducing user mistakes when operating/interacting with the device), which, additionally, reduces power usage and improves battery life of the device by enabling the user to use the device more quickly and efficiently.

In some embodiments, the anchor point is (920) a centroid of the first virtual user interface object (e.g., a centroid of the first virtual user interface object at the time that the position of the first virtual user interface object becomes locked). For example, the anchor point is a centroid of virtual user interface object 5210. Anchoring the portion of the first virtual user interface object to a point at a centroid of the first virtual user interface object that is opposite to the selected portion provides an intuitive way for the user to adjust the appearance of the virtual user interface object (e.g., by giving the user a sense of extending the object by pulling outward from the selected surface, particularly when the first virtual user interface object is suspended in space), enhances the operability of the device, and makes the user-device interface more efficient (e.g., by helping the user to achieve an intended outcome with the required inputs and reducing user mistakes when operating/interacting with the device), which, additionally, reduces power usage and improves battery life of the device by enabling the user to use the device more quickly and efficiently.

In some embodiments, adjusting the appearance of the first virtual user interface object includes (922) displaying (e.g., while the first input is detected) an axis-of-movement indicator, wherein the axis-of-movement indicator includes a visual indication (e.g., one or more lines that extend from edges of the object, a shape outline displayed in the plane, and/or a grid displayed in the plane) of an axis that is perpendicular to the selected respective portion of the first virtual user interface object. For example, an axis-of movement indicator includes resizing projections 5246 that are perpendicular to the top side 5224 of virtual user interface object selected by contact 5244 in FIG. 5B19. Displaying an axis-of-movement indicator of an axis that is perpendicular to the selected respective portion of the first virtual user interface object improves the visual feedback provided to the user (e.g., by providing an indication of how the appearance of the first virtual user interface object will be adjusted in response to input in two dimensions), enhances the operability of the device, and makes the user-device interface more efficient (e.g., by helping the user to achieve an intended outcome with the required inputs and reducing user mistakes when operating/interacting with the device), which, additionally, reduces power usage and improves battery life of the device by enabling the user to use the device more quickly and efficiently.

In some embodiments, the axis-of-movement indicator includes (924) one or more projections (e.g., resizing projections 5246, FIG. 5B19) parallel to the axis that is perpendicular to the respective portion of the first virtual user interface object (e.g., top side 5224 of virtual user interface object 5210), wherein the one or more projections extend from (a surface and/or side of) the first virtual user interface object. Displaying projections that extend from the first virtual user interface object improves the visual feedback provided to the user (e.g., by showing, using indicators placed relative to the first virtual user interface object, how input will change the appearance of the first virtual user interface object), enhances the operability of the device, and makes the user-device interface more efficient (e.g., by helping the user to achieve an intended outcome with the required inputs and reducing user mistakes when operating/interacting with the device), which, additionally, reduces power usage and improves battery life of the device by enabling the user to use the device more quickly and efficiently.

In some embodiments, the computer system includes (926) one or more tactile output generators 163 for generating tactile outputs. While adjusting an appearance of the first virtual user interface object in a respective direction, the computer system determines that the movement of the first input causes a respective portion of the first virtual user interface object to collide with a virtual element that exists in the virtual three-dimensional space (e.g., a virtual element that is displayed or not displayed in the virtual three-dimensional space, such as another virtual user interface object and/or a virtual grid line, such as a grid line of displayed version 5208*b* of reference mat 5208). In accordance with the determination that the movement of the first input causes the respective portion of the first virtual user interface object to collide with the virtual element, the computer system generates, with the one or more tactile output generators 163, a tactile output. Generating a tactile output in accordance with a determination that a portion of the first virtual user interface object has been caused to collide with a virtual element improves the feedback provided to the user (e.g., by indicating a distance and direction that the first virtual user interface object has moved (as the first virtual user interface object moves across virtual grid lines) and/or by giving the user an intuitive understanding of the relative positions of the virtual user interface object and the virtual elements in its environment). This enhances the operability of the device, and makes the user-device interface more efficient (e.g., by helping the user to move the object to a desired location), which, additionally, reduces power usage and improves battery life of the device by enabling the user to use the device more quickly and efficiently.

In some embodiments, while displaying the virtual three-dimensional space (928) (e.g., prior to creation and/or display of the first virtual user interface object in the virtual three-dimensional space), the computer system detects, via the input device, a second input that is directed to a first location in the virtual three-dimensional space (e.g., a location that corresponds to a respective portion of the first virtual user interface object or a location that does not correspond to the first virtual user interface object). For example, an input by contact 5254 is detected, as indicated in FIG. 5B24. In response to detecting the second input, in accordance with a determination that the second input has a first input type (e.g., the second input is a tap input), the computer system displays, at the first location in the virtual three-dimensional space, an insertion cursor (e.g., insertion cursor 5256, FIG. 5B25). While the insertion cursor is displayed at the first location, the computer system detects, via the input device, a third input (e.g., as indicated by contact 5258, FIG. 5B26). In response to detecting the third input, the computer system, in accordance with a determination that the third input has the first input type (e.g., the third input is a tap input) and is directed to the first location that corresponds to the displayed insertion cursor, inserts a second virtual user interface object (e.g., virtual user interface object 5260, FIG. 5B26) at the first location. In accordance with a determination that the third input has the first input type and is directed to a second location that does not correspond to the displayed insertion cursor (e.g., as shown in FIG. 5B22-5B25), the computer system displays the insertion cursor at the second location. For example, in FIG. 5B22, an input by contact 5250 causes an insertion cursor 5252 to be placed at a location that corresponds to the location of contact 5250, as indicated in FIG. 5B23. A subsequent input by contact 5254 is detected at a location that does not correspond to the location of insertion cursor 5252. Because the location of contact 5254 does not correspond to the location of insertion cursor 5252, in FIG. 5B25, an insertion cursor 5256 is displayed at a location that corresponds to the location of contact 5254 (and no new virtual user interface object is generated in response to the input by contact 5254). In some embodiments, the computer system detects a plurality of inputs, wherein the plurality of inputs includes at least one input that has the first input type and that is directed to a first location that corresponds to a displayed insertion cursor, and at least one input that has the first input type and that is directed to a second location that does not correspond to a displayed insertion cursor. Determining whether to insert a new virtual user interface object or move the insertion cursor, depending on whether the location of an input of the first type corresponds to a location of a displayed insertion cursor or to a location that does not include the displayed insertion cursor, enables the performance of multiple different types of operations with the first type of input. Enabling the performance of multiple different types of operations with the first type of input increases the efficiency with which the user is able to perform these operations, thereby enhancing the operability of the device, which, additionally, reduces power usage and improves battery life of the device by enabling the user to use the device more quickly and efficiently.

In some embodiments, while displaying the virtual three-dimensional space (930), the computer system detects, via the input device, a fourth input that is directed to a third location in the virtual three-dimensional space (e.g., an input by contact 5270, as shown in FIG. 5B32). In response to detecting the fourth input that is directed to the third location in the virtual three-dimensional space, in accordance with a determination that the fourth input has the first input type (e.g., the fourth input is a tap input), the computer system displays an insertion cursor (e.g., insertion cursor 5272, FIG. 5B33) at the third location (e.g., moves an existing insertion cursor from a second location to the respective location, or displays a new insertion cursor at the respective location if no insertion cursor was displayed in the simulated environment prior to the first input). While the insertion cursor is displayed at the third location, the computer system detects, via the input device, a fifth input (e.g., an input by contact 5276, FIG. 5B34) at a location that corresponds to a new object control (e.g., new object control 5216) that, when activated, causes insertion of a new virtual user interface object at the third location. In response to detecting the fifth input, the computer system inserts the new virtual user interface object (e.g., virtual user interface object 5276, FIG. 5B36) at the third location. Providing a new object control that, when activated, causes insertion of a new virtual user interface object at a location of an insertion cursor increases the efficiency with which a user is able to create new virtual user interface objects (e.g., by allowing the user to insert a series of new virtual user interface objects by providing repeated inputs at the location of the new object control). Increasing the efficiency with which a user is able to create new virtual user interface objects enhances the operability of the device and makes the user-device interface more efficient, which, additionally, reduces power usage and improves battery life of the device by enabling the user to use the device more quickly and efficiently.

In some embodiments, the computer system detects (932), via the input device, a gesture that corresponds to an interaction with the virtual three-dimensional space (e.g., a pinch or swipe gesture on the touch-sensitive surface). For example, FIGS. 5B36-5B37 illustrate a pinch gesture by contacts 5278 and 5280. In response to detecting the gesture that corresponds to the interaction with the virtual three-dimensional space, the computer system performs an operation in the virtual three-dimensional space that corresponds to the gesture (e.g., zooming, rotating, moving an object, etc.). For example, in response to the pinch gesture illustrated in FIGS. 5B36-5B37, a zoom operation is performed (e.g., virtual user interface object 5210, 5260, and 5276 are reduced in size as the zoom out operation occurs). Performing an operation in virtual three-dimensional space in response to a gesture, such as a pinch or a swipe, that interacts with the virtual three-dimensional space provides an efficient and intuitive way for the user to control the virtual three-dimensional space (e.g., by allowing the user to adjust a view of the virtual three-dimensional space using a single input with motion, such as a pinch or swipe, that corresponds to adjustment of the virtual three-dimensional space). Providing the user with gesture-based control of the virtual three-dimensional space avoids cluttering the user interface with additional displayed controls, thereby enhancing the operability of the device and making the user-device interface more efficient, which, additionally, reduces power usage and improves battery life of the device by enabling the user to use the device more quickly and efficiently.

In some embodiments, the computer system includes (934) one or more cameras, and the displayed virtual three-dimensional space includes one or more physical objects (e.g., reference mat 5208*a*, FIG. 5B2) that are in a field of view of the one or more cameras and one or more virtual three-dimensional models of the one or more physical objects that are in the field of view of the one or more cameras (e.g., displayed version 5208*b* of reference mat 5208*a*). Displaying a virtual three-dimensional model of a physical object provides a frame of reference in the physical world for the displayed virtual three-dimensional space. Providing this frame of reference allows the user to change a view of virtual objects in the virtual three-dimensional space by manipulating a physical object (such as a reference mat, e.g., by rotating the reference mat), thereby providing an intuitive way for the user to adjust a view of the first virtual user interface object, enhancing the operability of the device and making the user-device interface more efficient, which, additionally, reduces power usage and improves battery life of the device by enabling the user to use the device more quickly and efficiently.

In some embodiments, the appearance of the first virtual user interface object is (936) adjusted in response to detecting the movement of the first input relative to a respective physical object in the field of view of the one or more cameras without regard to whether the movement of the first input is due to: movement of the first input on the input device (e.g., movement of a contact across the touch-screen display or across the touch-sensitive surface of the input device while the input device is held substantially stationary in physical space), movement of the one or more cameras relative to the respective physical object (e.g., movement of the computer system including the cameras in the physical space while the contact is maintained and kept stationary on the touch-screen display or touch-sensitive surface of the input device), or a combination of the movement of the first input on the input device and the movement of the one or more cameras relative to the respective physical object (e.g., concurrent movement of the contact across the touch-screen display or touch-sensitive surface of the input device and movement of the computer system including the cameras in the physical space). For example, as shown in FIGS. 5B29-5B30, device 100 (e.g., a computing device that includes one or more cameras) is moved relative to the reference mat 5208*a* while contact 5262 is maintained and kept stationary on the touch-screen display 112. In response to the movement of device 100, the size of virtual object 5260 is adjusted. Adjusting the appearance of the virtual user interface object without regard to the manner of movement of the input (e.g., by allowing the user to adjust the appearance of the virtual user interface object with only movement of the input on the input device, with only movement of the cameras relative to the physical object, or with a combination of movement of the input and the cameras) provides an intuitive way for the user to adjust the appearance of the virtual user interface object, improves the visual feedback provided to the user (e.g., by making the computer system appear more responsive to user input), enhances the operability of the device, and makes the user-device interface more efficient (e.g., by helping the user to achieve an intended outcome with the required inputs and reducing user mistakes when operating/interacting with the device), which, additionally, reduces power usage and improves battery life of the device by enabling the user to use the device more quickly and efficiently.

It should be understood that the particular order in which the operations in FIGS. 9A-9E have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, 800, 1000, 1100, 1200, and 1300) are also applicable in an analogous manner to method 900 described above with respect to FIGS.

9A-9E. For example, the contacts, gestures, user interface objects, intensity thresholds, focus indicators, and/or animations described above with reference to method 900 optionally have one or more of the characteristics of the contacts, gestures, user interface objects, intensity thresholds, focus indicators, and/or animations described herein with reference to other methods described herein (e.g., methods 600, 700, 800, 1000, 1100, 1200, and 1300). For brevity, these details are not repeated here.

FIGS. 10A-10E are flow diagrams illustrating method 1000 of transitioning between viewing modes of a displayed simulated environment, in accordance with some embodiments. Method 1000 is performed at a computer system (e.g., portable multifunction device 100, FIG. 1A, device 300, FIG. 3A, or a multi-component computer system including headset 5008 and input device 5010, FIG. 5A2) that includes (and/or is in communication with) a display generation component (e.g., a display, a projector, a heads-up display, or the like) and an input device (e.g., a touch-sensitive surface, such as a touch-sensitive remote control, or a touch-screen display that also serves as the display generation component, a mouse, a joystick, a wand controller, and/or cameras tracking the position of one or more features of the user such as the user's hands), optionally one or more cameras (e.g., video cameras that continuously provide a live preview of at least a portion of the contents that are within the field of view of the cameras and optionally generate video outputs including one or more streams of image frames capturing the contents within the field of view of the cameras), optionally one or more attitude sensors, optionally one or more sensors to detect intensities of contacts with the touch-sensitive surface, and optionally one or more tactile output generators. In some embodiments, the input device (e.g., with a touch-sensitive surface) and the display generation component are integrated into a touch-sensitive display. As described above with respect to FIGS. 3B-3D, in some embodiments, method 1000 is performed at a computer system 301 (e.g., computer system 301-*a*, 301-*b*, or 301-*c*) in which respective components, such as a display generation component, one or more cameras, one or more input devices, and optionally one or more attitude sensors are each either included in or in communication with computer system 301.

In some embodiments, the display generation component is a touch-screen display and the input device (e.g., with a touch-sensitive surface) is on or integrated with the display generation component. In some embodiments, the display generation component is separate from the input device (e.g., as shown in FIG. 4B and FIG. 5A2). Some operations in method 1000 are, optionally, combined and/or the order of some operations is, optionally, changed.

For convenience of explanation, some of the embodiments will be discussed with reference to operations performed on a computer system with a touch-sensitive display system 112 (e.g., on device 100 with touch screen 112) and one or more integrated cameras. However, analogous operations are, optionally, performed on a computer system (e.g., as shown in FIG. 5A2) with a headset 5008 and a separate input device 5010 with a touch-sensitive surface in response to detecting the contacts on the touch-sensitive surface of the input device 5010 while displaying the user interfaces shown in the figures on the display of headset 5008. Similarly, analogous operations are, optionally, performed on a computer system having one or more cameras that are implemented separately (e.g., in a headset) from one or more other components (e.g., an input device) of the computer system; and in some such embodiments, "movement of the computer system" corresponds to movement of one or more cameras of the computer system, or movement of one or more cameras in communication with the computer system.

As described below, method 1000 relates to detecting a gesture at an input device of a computer system. Depending on whether the gesture meets mode change criteria, a subsequent change in attitude (e.g., orientation and/or position) of at least a portion of the computer system relative to a physical environment either causes a transition from displaying the simulated environment in a first viewing mode (in which a fixed spatial relationship is maintained between a virtual user interface object and the physical environment) to a second viewing mode (in which the fixed spatial relationship between the virtual user interface object and the physical environment is not maintained) or changing an appearance of the first virtual user interface object in response to the change in attitude. Determining whether to transition from the first viewing mode to the second viewing mode or to change the appearance of the first virtual user interface object in the first viewing mode enables the performance of multiple different types of operations in response to a change in attitude of at least a portion of the computer system. Enabling the performance of multiple different types of operations in response to a change in attitude increases the efficiency with which the user is able to perform these operations, thereby enhancing the operability of the device, which, additionally, reduces power usage and improves battery life of the device by enabling the user to use the device more quickly and efficiently.

In a first viewing mode, the computer system (e.g., device 100, FIG. 5C1) displays (1002) via a display generation component of the computer system (e.g., touch screen display 112), a simulated environment (e.g., a virtual reality (VR) environment or an augmented reality (AR) environment) that is oriented relative to a physical environment of the computer system. Displaying the simulated environment in the first viewing mode includes displaying a first virtual user interface object (e.g., virtual box 5302) in a virtual model (e.g., a rendered 3D model) that is displayed at a first respective location in the simulated environment that is associated with the physical environment of the computer system. For example, the visual appearance (e.g., as reflected in the size, location, and orientation) of the rendered 3D model changes depending on how the computer system is located and oriented relative to the tabletop or other surface in the physical environment.

While displaying the simulated environment (1004), the computer system detects, via the one or more attitude sensors, a first change in attitude (e.g., orientation and/or position) of at least a portion of the computer system (e.g., a change in attitude of a component of the computer system such as a component of the computer system that includes one or more cameras used to generate the representation of the physical environment) relative to the physical environment (e.g., a change caused by a first movement of the touch-screen display, the virtual reality headset, or the touch-sensitive remote control). For example, FIGS. 5C1-5C2 illustrate a first change in attitude of device 100.

In response to detecting the first change in the attitude of the portion of the computer system (1006), the computer system changes an appearance of the first virtual user interface object in the virtual model so as to maintain a fixed spatial relationship (e.g., orientation, size and/or position) between the first virtual user interface object and the physical environment (e.g., the rendered 3D model is placed directly at the location of the tabletop or other surface that is in the field of view of the camera of the computer system and remains coplanar and stuck to the tabletop or other surface as the location of the tabletop or other surface changes in the field of view of the camera with the movement of the computer system). For example, from FIG. 5C1 to 5C2, the size and position of virtual box 5302 on display 112 changes to maintain a fixed spatial relationship between virtual box 5302 and physical reference mat 5208*a*.

After changing the appearance of the first virtual user interface object based on the first change in attitude of the portion of the computer system (1008), the computer system detects, via the input device, a first gesture that corresponds to an interaction with the simulated environment (e.g., a pinch or swipe gesture on the touch-sensitive surface). FIGS. 5C4-5C6 provide an example of input that includes an upward swipe and a downward swipe (for moving virtual box 5302 in the simulated environment displayed by device 100). FIGS. 5C9-5C11 provide an example of a pinch gesture (for zooming the simulated environment displayed by device 100).

In response to detecting the first gesture that corresponds to the interaction with the simulated environment (1010), the computer system performs an operation in the simulated environment that corresponds to the first gesture (e.g., zooming, rotating, moving an object, etc.). FIGS. 5C4-5C6 illustrate movement of a virtual box 5302 in response to a detected swipe gesture. FIGS. 5C9-5C11 illustrate zooming the simulated environment in response to a detected pinch gesture.

After performing the operation that corresponds to the first gesture (1012), the computer system detects, via the one or more attitude sensors, a second change in attitude (e.g., orientation and/or position) of the portion of the computer system relative to the physical environment. For example, FIGS. 5C12-5C13 illustrate an attitude change that includes movement of device 100 relative to physical reference mat 5208*a* in physical environment 5200.

In response to detecting the second change in the attitude of the portion of the computer system (1014), in accordance with a determination that the first gesture met mode change criteria, the computer system transitions from displaying the simulated environment, including the virtual model, in the first viewing mode to displaying the simulated environment, including the virtual model, in a second viewing mode. The mode change criteria include a requirement that the first gesture corresponds to an input that changes a spatial parameter (e.g., orientation, size and/or position) of the simulated environment relative to the physical environment (e.g., a pinch-to-zoom gesture to zoom out of the simulated environment, a depinch-to-zoom-out gesture to magnify the simulated environment, a swipe gesture to rotate or translate the simulated environment, and/or an input to display a point of view (POV) of another device viewing the simulated environment or a POV of a virtual object in the environment). For example, in response to the pinch-to-zoom input illustrated in FIGS. 5C9-5C11, device 100 transitions from displaying the simulated environment in a first viewing mode (an augmented reality viewing mode) to displaying the simulated environment in a second viewing mode (a virtual reality viewing mode). For example, physical objects in the field of view of the camera of device 100, such as physical reference mat 5208*a* and table 5204, that are displayed by display 112 of device 100 in an augmented reality mode (e.g., in FIG. 5C9), cease to be displayed in the virtual reality viewing mode (e.g., as shown in FIG. 5C12). In the virtual reality viewing mode, a virtual grid 5328 is displayed (e.g., as shown in FIG. 5C12). Displaying the virtual model in the simulated environment in the second viewing mode includes forgoing changing the appearance of the first virtual user interface object to maintain the fixed spatial relationship (e.g., orientation, size and/or position) between the first virtual user interface object and the physical environment (e.g., maintaining the first virtual user interface object at the same orientation, size and/or position as it was displayed prior to detecting the second change in attitude of the portion of the computer system). For example, as shown in FIGS. 5C12-5C13, the position of virtual box 5302 relative to display 112 is unchanged in response to movement of device 100 while the device is displaying the simulated environment in a virtual reality viewing mode. In accordance with a determination that the first gesture did not meet the mode change criteria, the computer system continues to display the first virtual model in the simulated environment in the first viewing mode. For example, in FIGS. 5C4-5C6, the swipe gesture for moving virtual box 5302 does not meet mode change criteria, and device 100 continues to display the simulated environment in an augmented reality viewing mode. Displaying the virtual model in the first viewing mode includes changing an appearance of the first virtual user interface object in the virtual model in response to the second change in attitude of the portion of the computer system (e.g., a change in attitude of a component of the computer system such as a component of the computer system that includes one or more cameras used to generate the representation of the physical environment) relative to the physical environment, so as to maintain the fixed spatial relationship (e.g., orientation, size and/or position) between the first virtual user interface object and the physical environment. For example, as shown in FIGS. 5C7-5C8, the position of virtual box 5302 relative to display 112 changes in response to movement of device 100 while the device is displaying the simulated environment in an augmented reality viewing mode. In some embodiments, the fixed spatial relationship may have remained the same, or become different in response to other inputs, during the time between the first change in attitude and the second change in attitude, in some embodiments due to movement of the computer system or changes in the physical environment such as movement of the tabletop or other surface). In some embodiments, the computer system detects a plurality of gestures that correspond to respective interactions with the simulated environment, each gesture followed by a change in attitude of the portion of the computer system relative to the physical environment. In some such embodiments, the plurality of gestures and attitude changes include at least one gesture that met the mode change criteria, for which the computer system transitions from displaying the simulated environment in the first mode to displaying the simulated environment in the second mode, in response to detecting the subsequent change in attitude. In addition, the plurality of gestures and attitude changes include at least one gesture that did not meet the mode change criteria, for which the computer system continues to display the first virtual model in the simulated environment in the first viewing mode.

In some embodiments, the computer system includes (1016) one or more cameras (e.g., one or more video cameras that continuously provide a live preview of at least a portion of the contents that are within the field of view of the cameras and optionally generate video outputs including one or more streams of image frames capturing the contents within the field of view of the cameras) and displaying the simulated environment in the first viewing mode includes displaying a representation of at least a portion of a field of view of the one or more cameras. The field of view of the one or more cameras includes a representation of a physical object in the physical environment (e.g., the representation is a live view of at least a portion of the field of view of the one or more cameras). For example, one or more cameras of device 100 capture a live image of reference mat 5208*a*, which is displayed on display 112 as indicated at 5208*b*, as shown in FIG. 5C1. In some embodiments, the view of the physical object is updated as the one or more cameras are moved and/or in response to changes to the virtual model. For example, from FIG. 5C1 to 5C2, movement of device 100 causes the view 5208*b* of reference mat 5208*a* to change (e.g., as device 100 moves closer to reference mat 5208*a*, the simulated environment displayed on device 112 is updated from displaying a view 5208*b* of the entire reference mat 5208*a*, as shown in FIG. 5C1, to a view 5208*b* of a portion of reference mat 5208*a*, as shown in FIG. 5C2). Displaying a representation of a physical object in the simulated environment provides a user with simultaneous information about a physical environment and a simulated environment. Providing simultaneous information about a physical environment and a simulated environment enhances the operability of the device and makes the user-device interface more efficient (e.g., by helping the user to understand the relationship between input provided at the device, the virtual user interface object, and the physical environment and to avoid input mistakes), which, additionally, reduces power usage and improves battery life of the device by enabling the user to use the device more quickly and efficiently.

In some embodiments, detecting the first gesture that corresponds to the interaction with the simulated environment includes (1018) detecting a plurality of contacts (e.g., contacts 5324 and 5320 with a touch-sensitive surface of the input device (e.g., touch sensitive display 112 of device 100), as indicated in FIG. 5C9). While the plurality of contacts with the touch-sensitive surface are detected, the computer system detects movement of a first contact of the plurality of contacts relative to movement of a second contact of the plurality of contacts (e.g., movement of contacts 5324 and 5320 along paths indicated by arrows 5326 and 5322, as indicated in FIGS. 5C9-5C11). For example, the movement of a first contact of the plurality of contacts relative to movement of a second contact of the plurality of contacts is a pinch gesture that includes movement of the plurality of contacts that decreases the distance between at least the first contact and the second contact (e.g., as shown in FIGS. 5C9-5C11), or a depinch gesture that includes movement of the plurality of contacts that increases the distance between at least the first contact and the second contact. In addition, in some embodiments, performing the operation in the simulated environment that corresponds to the first gesture includes altering a size of the first virtual user interface object (e.g., virtual box 5302, FIG. 5C9) by an amount that corresponds to the movement of the first contact relative to the movement of the second contact (e.g., in accordance with a determination that the gesture is a depinch gesture that includes movement of the contacts away from each other, increasing the size of the first virtual user interface object, and in accordance with a determination that the gesture is a pinch gesture that includes movement of the contacts toward each other, decreasing the size of the first virtual user interface object). For example, in FIGS. 5C9-5C11, as contacts 5324 and 5320 move such that the distance between the contacts decreases, the size of virtual box 5302 decreases. Performing an operation in the simulated environment in response to a gesture, such as a depinch gesture, that interacts with the simulated environment provides an efficient and intuitive way for the user to alter the size of the first virtual user interface object (e.g., by allowing the user to zoom the virtual user interface object in the simulated environment using a single input gesture). Providing the user with gesture-based control of the simulated environment avoids cluttering the user interface with additional displayed controls, thereby enhancing the operability of the device and making the user-device interface more efficient, which, additionally, reduces power usage and improves battery life of the device by enabling the user to use the device more quickly and efficiently.

In some embodiments, while displaying the first virtual user interface object in the simulated environment in the second viewing mode (e.g., a VR mode) (1020), the computer system detects, via the input device, a second gesture that corresponds to an interaction with the simulated environment. The second gesture includes input for altering a perspective of the simulated environment. For example, the computer system detects a gesture such as a swipe or rotational gesture (e.g., the input device includes a touch-screen display and the gesture includes movement of a contact across the touch-screen display). In addition, in response to detecting the second gesture that corresponds to the interaction with the simulated environment, the computer system updates a displayed perspective of the simulated environment in accordance with the input for altering the perspective of the simulated environment. For example, the computer system changes the displayed perspective of the simulated environment in a direction and by an amount that corresponds to a direction and amount of movement of the second gesture, such as a swipe or rotational gesture. FIGS. 5C22-5C23 illustrate an input that includes a rotational gesture by a contact 5350 that moves along a path indicated by arrow 5352. As the input by contact 5350 is received, the simulated environment displayed by display 112 of device 100 is rotated in accordance with the input (e.g., virtual boxes 5302, 5304, and 5340 and virtual grid 5328 are rotated clockwise). Updating a displayed perspective of the simulated environment in response to detecting a gesture that corresponds to an interaction with the simulated environment provides an efficient and intuitive way for the user to alter the perspective of the simulated environment (e.g., by allowing the user to change the perspective of the simulated environment using a single input gesture). Providing the user with gesture-based control of the perspective of the simulated environment avoids cluttering the user interface with additional displayed controls, thereby enhancing the operability of the device and making the user-device interface more efficient, which, additionally, reduces power usage and improves battery life of the device by enabling the user to use the device more quickly and efficiently.

In some embodiments, while displaying the simulated environment in the second viewing mode (e.g., a VR mode) (1022), the computer system detects, via an input device, an insertion input for inserting a second virtual user interface object at a second respective location in the simulated environment (e.g., an input, such as a tap input, directed to a location in the simulated environment that corresponds to an insertion cursor (created by a prior input) and/or an input directed to a control that, when activated, causes insertion of a new virtual user interface object at the location of a previously placed insertion cursor in the simulated environment). In response to detecting the insertion input for inserting the second virtual user interface object, the computer system displays, at the second respective location in the simulated environment, the second virtual user interface object while maintaining the fixed spatial relationship (e.g., orientation, size and/or position) between the first virtual user interface object and the physical environment. For example, an input (e.g., a tap input) by contact 5334 places an insertion cursor 5536, as shown in FIGS. 5C15-5C16. After the insertion cursor 5536 is placed, an input (e.g., a tap input) by contact 5338 at a location that corresponds to new object control 5216 is detected, as shown in FIG. 5C17. In response to the input at the location that corresponds to new object control 5216 after placement of insertion cursor 5536, virtual box 5340 is displayed at a position that corresponds to insertion cursor 5536. Input for inserting a virtual user interface object is described further with regard to method 900. In some embodiments, a respective viewing mode is not altered in response to insertion of the second virtual user interface object into the simulated environment (e.g., if the virtual user interface object is viewed in VR mode, no transition to AR mode occurs in response to insertion of the second virtual user interface object). Inserting a new virtual user interface object in response to an insertion input improves the feedback provided to the user (e.g., by making the computer system appear more responsive to user input), enhances the operability of the device, and makes the user-device interface more efficient (e.g., by helping the user to achieve an intended outcome with the required inputs and reducing user mistakes when operating/interacting with the device), which, additionally, reduces power usage and improves battery life of the device by enabling the user to use the device more quickly and efficiently.

In some embodiments, while displaying the simulated environment in the second viewing mode (e.g., a VR mode) (1024), the computer system detects, via the input device, a movement input (e.g., a movement input by contact 5342, FIG. 5C19) that includes selection of a respective side of a respective virtual user interface object (e.g., side 5344 of virtual object 5340) of the virtual model and movement of the input in two dimensions (e.g., as indicated by arrow 5346). In response to detecting the movement, the computer system moves the respective virtual user interface object 5340 within a plane (e.g., as indicated by movement projections 5348) that is parallel to the selected respective side of the respective virtual user interface object in a first direction determined based on the movement of the second input while maintaining the fixed spatial relationship (e.g., orientation, size and/or position) between the first virtual user interface object and the physical environment. In some embodiments, a direction of the movement of the respective virtual user interface object is determined based on a direction of the movement input (e.g., for movement input in a first direction, the virtual user interface object moves in a corresponding direction, and for movement input a second direction that is different from the first direction, the virtual user interface object moves in a different corresponding direction). In some embodiments, a magnitude of the movement of the respective virtual user interface object is determined based on a magnitude of the movement input (e.g., for a greater magnitude of movement input the respective virtual user interface object moves farther). Input for moving a virtual user interface object is described further with regard to method 900. In some embodiments, a respective viewing mode is not altered in response to insertion of the second virtual user interface object into the simulated environment (e.g., if the virtual user interface object is viewed in VR mode, no transition to AR mode occurs in response to movement of the respective virtual user interface object). Moving a virtual user interface object in response to a movement input improves the feedback provided to the user (e.g., by making the computer system appear more responsive to user input), enhances the operability of the device, and makes the user-device interface more efficient (e.g., by helping the user to achieve an intended outcome with the required inputs and reducing user mistakes when operating/interacting with the device), which, additionally, reduces power usage and improves battery life of the device by enabling the user to use the device more quickly and efficiently.

In some embodiments, while transitioning from displaying the simulated environment in the first viewing mode to displaying the simulated environment in the second viewing mode (1026), the computer system displays a transition animation to provide a visual indication of the transition (e.g., as illustrated at FIGS. 5C9-5C12). Displaying a transition animation while transitioning from displaying the simulated environment in the first viewing mode (e.g., the AR mode) to displaying the simulated environment in the second viewing mode (e.g., the VR mode) improves the feedback provided to the user (e.g., by providing an indication to the user that a transition from an AR mode to a VR mode is taking place), enhances the operability of the device, and makes the user-device interface more efficient (e.g., by helping the user to understand the input that causes a viewing mode transition and to achieve a viewing mode transition when desired), which, additionally, reduces power usage and improves battery life of the device by enabling the user to use the device more quickly and efficiently.

In some embodiments, displaying the transition animation includes (1028) gradually ceasing to display at least one visual element (e.g., a live background view and/or one or more physical reference objects (or any other aspect of the physical environment) as captured by one or more cameras of the computer system) that is displayed in the first viewing mode and is not displayed in the second viewing mode. For example, in FIGS. 5C9-5C11, table 5204 and displayed view 5208*b* of physical reference mat 5208*a* gradually cease to be displayed on display 112. Gradually ceasing to display at least one visual element that is displayed in the first viewing mode and is not displayed in the second viewing mode while transitioning from displaying the simulated environment in the first viewing mode to displaying the simulated environment in the second viewing mode improves the feedback provided to the user (e.g., by removing aspects of the physical environment to provide a visual cue to the user that a fixed spatial relationship between the first virtual user interface object and the physical environment is not being maintained), enhances the operability of the device, and makes the user-device interface more efficient (e.g., by helping the user to understand the effect of the transition), which, additionally, reduces power usage and improves battery life of the device by enabling the user to use the device more quickly and efficiently.

In some embodiments, displaying the transition animation includes (1030) gradually displaying at least one visual element (e.g., a rendered background) of the second viewing mode that is not displayed in the first viewing mode. For example, in FIGS. 5C11-5C12, virtual reference grid 5328 is gradually displayed on display 112.

Gradually displaying at least one visual element of the second viewing mode that is not displayed in the first viewing mode while transitioning from displaying the simulated environment in the first viewing mode to displaying the simulated environment in the second viewing mode improves the feedback provided to the user (e.g., by adding aspects of a virtual reality environment to provide a visual cue to the user that a transition from an augmented reality viewing mode to a virtual reality viewing mode is occurring), enhances the operability of the device, and makes the user-device interface more efficient (e.g., by helping the user to understand the effect of the transition), which, additionally, reduces power usage and improves battery life of the device by enabling the user to use the device more quickly and efficiently.

In some embodiments, while transitioning from displaying the simulated environment in the second viewing mode to displaying the simulated environment in the first viewing mode (e.g., in response to a mode change input gesture), a transition animation is displayed to provide a visual indication of the transition (e.g., as illustrated at FIGS. 5C26-5C30). In some embodiments, the transition includes gradually ceasing to display at least one visual element of the second viewing mode (e.g., the rendered background) and gradually displaying at least one visual element that is displayed in the first viewing mode (e.g., a live background view and/or one or more physical reference objects (or any other aspect of the physical environment) as captured by one or more cameras of the computer system). For example, in FIGS. 5C26-5C27, virtual reference grid 5328 gradually ceases to be displayed, and in FIGS. 5C28-5C30, table 5204 and displayed view 5208*b* of physical reference grid 5208*a* are gradually redisplayed.

In some embodiments, in response to detecting the first gesture that corresponds to the interaction with the simulated environment (1032), the computer system alters a perspective with which the virtual model in the simulated environment is displayed in accordance with the change to the spatial parameter by the input that corresponds to the first gesture. For example, in response to the pinch-to-zoom gesture illustrated at FIGS. 5C9-5C11, the displayed sizes of virtual boxes 5302 and 5304 decrease. In some embodiments, if the first gesture is a gesture to zoom in on the virtual model (e.g., a depinch gesture), the displayed perspective of the virtual model in the simulated environment is changed such that the displayed size of the virtual model increases. In some embodiments, if the first gesture is a gesture to pan or otherwise move the displayed virtual model (e.g., a swipe gesture), the displayed perspective of the virtual model in the simulated environment is changed such that the virtual model is panned or otherwise moved in accordance with the input gesture. Altering a perspective of the simulated environment in response to detecting the first gesture improves the feedback provided to the user (e.g., by making the computer system appear more responsive to user input), enhances the operability of the device, and makes the user-device interface more efficient (e.g., by helping the user to achieve an intended outcome with the required inputs and reducing user mistakes when operating/interacting with the device), which, additionally, reduces power usage and improves battery life of the device by enabling the user to use the device more quickly and efficiently.

In some embodiments, after detecting an end of the first gesture (1034), the computer system continues to alter a perspective with which the virtual model in the simulated environment is displayed to indicate the transitioning from displaying the simulated environment in the first viewing mode to displaying the simulated environment in the second viewing mode. For example, in FIGS. 5C12-5C13, after liftoff of the contacts 5320 and 5324 that provided the pinch-to-zoom input that caused the size of virtual boxes 5302 and 5304 to decrease in FIGS. 5C9-5C11, the displayed size of virtual boxes 5302 and 5304 continues to decrease. In some embodiments, the perspective with which the virtual model in the simulated environment is displayed continues to be altered in response to the second change in the attitude of the portion of the computer system. In some embodiments, the perspective continues to be altered without a change in attitude of the portion of the computer system (or other input), for example to alter the perspective by a predetermined amount and/or to display a predetermined view of the simulated environment in the second viewing mode. Continuing to alter a perspective of the simulated environment after a first gesture has ended enhances the operability of the device, and makes the user-device interface more efficient (e.g., by increasing the amount of alteration to the perspective that corresponds to movement of the focus selector(s) (e.g., one or more contacts)), which, additionally, reduces power usage and improves battery life of the device by enabling the user to use the device more quickly and efficiently.

In some embodiments, while displaying the simulated environment in the second viewing mode (1036), the computer system detects, via the input device, a third gesture that corresponds to an input for transitioning from the second viewing mode to the first viewing mode. For example, the third gesture is an input that includes a depinch gesture by contacts 5360 and 5356, as shown in FIGS. 5C26-5C27. In response to detecting the third gesture, the computer system transitions from displaying the simulated environment in the second viewing mode to displaying the simulated environment in the first viewing mode (e.g., in response to a subsequent change in attitude of a portion of the computer system, the appearance of the first virtual user interface object will change relative to the physical environment so as to maintain the fixed spatial relationship between the first user interface object and the physical environment). In some embodiments, displaying the first virtual user interface object in the first viewing mode of the simulated environment includes displaying a live feed from one or more cameras of the computer system in the background of the virtual model in the simulated environment. Transitioning from the second viewing mode (e.g., the VR mode) to the first viewing mode (e.g., the AR mode) in response to a gesture input provides the user with the ability to control toggling between the VR mode and the AR mode. Providing the user with gesture-based control of the viewing mode enhances the operability of the device, makes the user-device interface more efficient (e.g., by allowing the user to select the viewing mode that is most efficient for the type of input the user wishes to provide, and by providing additional control options without cluttering the user interface with additional displayed controls), which, additionally, reduces power usage and improves battery life of the device by enabling the user to use the device more quickly and efficiently.

In some embodiments, the input device includes (1038) a touch-sensitive surface (e.g., touch sensitive display 112 of device 100), and detecting the third gesture that corresponds to the input for transitioning from the second viewing mode to the first viewing mode includes detecting the plurality of contacts (e.g., contacts 5356 and 5360) with the touch-sensitive surface of the input device. While the plurality of contacts with the touch-sensitive surface are detected, the input device detects movement of the first contact of the plurality of contacts relative to movement of the second contact of the plurality of contacts (e.g., movement by contact 5356 along a path indicated by arrow 5358 and movement by contact 5360 along a path indicated by arrow 5362). In some embodiments, the third gesture is a pinch gesture that includes movement of the plurality of contacts that reduces the distance between the first contact and the second contact. In some embodiments, transitioning from displaying the simulated environment in the second viewing mode to displaying the simulated environment in the first viewing mode includes altering a size of the virtual model in the simulated environment to return to a size of the virtual model prior to the transition from the first viewing mode to the second viewing mode. For example, as shown in FIGS. 5C26-5C30, in response to the gesture by contact 5356 and 5360, virtual boxes 5302 and 5304 are changed back to their original positions and sizes relative to physical reference mat 5208*a*. Transitioning from displaying the simulated environment in the second viewing mode (e.g., the VR mode) to displaying the simulated environment in the first viewing mode (e.g., the AR mode) in response to an input gesture (e.g., a pinch gesture) provides an efficient and intuitive way for the user to select a desired viewing mode. Providing the user with gesture-based control of the viewing mode enhances the operability of the device and makes the user-device interface more efficient (e.g., by providing additional control options without cluttering the user interface with additional displayed controls), which, additionally, reduces power usage and improves battery life of the device by enabling the user to use the device more quickly and efficiently.

In some embodiments, the third gesture includes (1040) an input (e.g., a tap input) at a position on the input device that corresponds to a control (e.g., a position in the simulated environment that does not correspond to the virtual model and/or a control with an image and/or text associated with the AR mode) that, when activated, causes the transition from the second viewing mode to the first viewing mode. For example, the third gesture includes input at a location that corresponds to toggle 5214, FIG. 5C28 (e.g., for toggling between a virtual reality display mode and an augmented reality display mode). Transitioning from displaying the simulated environment in the second viewing mode (e.g., the VR mode) to displaying the simulated environment in the first viewing mode (e.g., the AR mode) in response to an input at a control provides an efficient and intuitive way for the user to select a desired viewing mode. Providing the user with a control for causing transition of the viewing mode enhances the operability of the device and makes the user-device interface more efficient, which, additionally, reduces power usage and improves battery life of the device by enabling the user to use the device more quickly and efficiently.

In some embodiments, in response to detecting the third gesture (1042), the computer system transitions (e.g., by rotating, resizing, and/or moving the first virtual user interface object and the virtual model) the position of the first virtual user interface object from a current position relative to the physical environment to a prior position relative to the physical environment so as to return to the fixed spatial relationship between the first virtual user interface object and the physical environment. For example, as shown in FIGS. 5C26-5C30, in response to the gesture by contact 5356 and 5360, virtual boxes 5302 and 5304 are rotated, resized, and moved, such that in FIG. 5C30, virtual objects 5302 and 5304 are returned to the positions that virtual boxes 5302 and 5304 had relative to physical reference mat 5208*a* in FIG. 5C3 (in which device 100 displayed virtual objects 5302 and 5304 in an augmented reality mode). In some circumstances (e.g., where the device has been moved in the physical environment since transitioning from the first viewing mode to the second viewing mode), the position of the first virtual user interface object on the display after transitioning back from the second viewing mode to the first viewing mode is different from the position of the first virtual user interface object on the display prior to transitioning from the first viewing mode to the second viewing mode (e.g., because the device has moved so that a destination location for the first virtual user interface object is in a different position on the display than it was prior to transitioning from the first viewing mode to the second viewing mode). For example, because the orientation of device 110 in FIG. 5C30 is different from the orientation of device 100 in FIG. 5C3, the positions of virtual boxes 5302 and 5304 on display 112 in FIG. 5C30 are different from the positions of virtual boxes 5302 and 5304 on display 112 in FIG. 5C3 (although positions of virtual boxes 5302 and 5304 relative to physical reference mat 5208*a* is the same in FIG. 5C3 and FIG. 5C30). Transitioning a position of a virtual user interface object to return the object to a fixed spatial relationship with the physical environment improves the feedback provided to the user (e.g., by making the computer system appear more responsive to user input), enhances the operability of the device, and makes the user-device interface more efficient (e.g., by providing a visual cue to help the user understand that a transition to a viewing mode in which the virtual user interface object has a fixed spatial relationship with the physical environment is occurring, thereby helping a user achieve an intended outcome with the required inputs), which, additionally, reduces power usage and improves battery life of the device by enabling the user to use the device more quickly and efficiently.

In some embodiments, after detecting an end of the third gesture (1044), the computer system continues to alter a perspective with which the virtual model in the simulated environment is displayed to indicate the transitioning from displaying the simulated environment in the second viewing mode to displaying the simulated environment in the first viewing mode. For example, in FIGS. 5C28-5C30, after liftoff of the contacts 5356 and 5360 that provided the depinch-to-zoom-out input that caused the size of virtual boxes 5302 and 5304 to increase in FIGS. 5C26-5C27, the displayed size of virtual boxes 5302 and 5304 continues to increase. In some embodiments, the perspective continues to be altered without a change in attitude of the portion of the computer system (or other input), for example, to alter the perspective by a predetermined amount and/or to display a predetermined view of the simulated environment in the second viewing mode. Continuing to alter a perspective of the simulated environment after a first gesture has ended enhances the operability of the device, and makes the user-device interface more efficient (e.g., by increasing the amount of alteration to the perspective that corresponds to movement of the focus selector(s) (e.g., one or more contacts)), which, additionally, reduces power usage and improves battery life of the device by enabling the user to use the device more quickly and efficiently.

It should be understood that the particular order in which the operations in FIGS. 10A-10E have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, 800, 900, 1100, 1200, and 1300) are also applicable in an analogous manner to method 1000 described above with respect to FIGS. 10A-10E. For example, the contacts, gestures, user interface objects, focus indicators, and/or animations described above with reference to method 1000 optionally have one or more of the characteristics of the contacts, gestures, user interface objects, intensity thresholds, focus indicators, and/or animations described herein with reference to other methods described herein (e.g., methods 600, 700, 800, 900, 1100, 1200, and 1300). For brevity, these details are not repeated here.

FIGS. 11A-11C are flow diagrams illustrating method 1100 for updating an indication of a viewing perspective of a second computer system in a simulated environment displayed by a first computer system, in accordance with some embodiments, in accordance with some embodiments. Method 1100 is performed at a computer system (e.g., portable multifunction device 100, FIG. 1A, device 300, FIG. 3A, or a multi-component computer system including headset 5008 and input device 5010, FIG. 5A2) that includes (and/or is in communication with) a display generation component (e.g., a display, a projector, a heads-up display, or the like) and an input device (e.g., a touch-sensitive surface, such as a touch-sensitive remote control, or a touch-screen display that also serves as the display generation component, a mouse, a joystick, a wand controller, and/or cameras tracking the position of one or more features of the user such as the user's hands), optionally one or more cameras (e.g., video cameras that continuously provide a live preview of at least a portion of the contents that are within the field of view of the cameras and optionally generate video outputs including one or more streams of image frames capturing the contents within the field of view of the cameras), optionally one or more attitude sensors, optionally one or more sensors to detect intensities of contacts with the touch-sensitive surface, and optionally one or more tactile output generators. In some embodiments, the input device (e.g., with a touch-sensitive surface) and the display generation component are integrated into a touch-sensitive display. As described above with respect to FIGS. 3B-3D, in some embodiments, method 1100 is performed at a computer system 301 (e.g., computer system 301-*a*, 301-*b*, or 301-*c*) in which respective components, such as a display generation component, one or more cameras, one or more input devices, and optionally one or more attitude sensors are each either included in or in communication with computer system 301.

In some embodiments, the display generation component is a touch-screen display and the input device (e.g., with a touch-sensitive surface) is on or integrated with the display generation component. In some embodiments, the display generation component is separate from the input device (e.g., as shown in FIG. 4B and FIG. 5A2). Some operations in method 1100 are, optionally, combined and/or the order of some operations is, optionally, changed.

For convenience of explanation, some of the embodiments will be discussed with reference to operations performed on a computer system with a touch-sensitive display system 112 (e.g., on device 100 with touch screen 112) and one or more integrated cameras. However, analogous operations are, optionally, performed on a computer system (e.g., as shown in FIG. 5A2) with a headset 5008 and a separate input device 5010 with a touch-sensitive surface in response to detecting the contacts on the touch-sensitive surface of the input device 5010 while displaying the user interfaces shown in the figures on the display of headset 5008. Similarly, analogous operations are, optionally, performed on a computer system having one or more cameras that are implemented separately (e.g., in a headset) from one or more other components (e.g., an input device) of the computer system; and in some such embodiments, "movement of the computer system" corresponds to movement of one or more cameras of the computer system, or movement of one or more cameras in communication with the computer system.

As described below, method 1100 relates to a first computer system of a first user that displays a visual indication of a viewing perspective of a second computer system of a second user. The visual indication is displayed in a simulated environment that is oriented relative to the physical environment of the first user. When the viewing perspective of the second computer system changes, the visual indication of the viewing perspective is updated. Updating a visual indication of the viewing perspective of a second computer system in a simulated environment displayed by a first computer system enables collaboration between users of multiple computer systems. Enabling collaboration between users of multiple devices increases the efficiency with which the first user is able to perform operations in the simulated environment (e.g., by allowing a second user of the second computer system to contribute to a task, reducing the amount of contribution to the task required by the first user of the first computer system), thereby enhancing the operability of the computer system, which, additionally, reduces power usage and improves battery life of the device by enabling the user to use the computer system more quickly and efficiently.

The first computer system (e.g., device 5406, FIG. 5D1) displays (1102), via the first display generation component of the first computer system, a simulated environment (e.g., a virtual reality environment or an augmented reality environment) that is oriented relative to a first physical environment of the first computer system (e.g., as shown at display 5418 of device 5406 in FIG. 5D2). Displaying the simulated environment includes (1104) concurrently displaying: a first virtual user interface object (e.g., virtual box 5420, FIG. 5D3*b*) in a virtual model (e.g., a rendered 3D model) that is displayed at a respective location in the simulated environment that is associated with the first physical environment of the first computer system 5406 (e.g., the visual appearance (e.g., as reflected in the size, location, and orientation) of the rendered 3D model changes depending on how the computer system is located and oriented relative to the tabletop or other surface in the physical environment) and a visual indication (e.g., viewing perspective indicator 5432, FIG. 5D3*b*) of a viewing perspective of a second computer system 5412 of the simulated environment. The second computer system 5412 is a computer system having a second display generation component (e.g., a display, a projector, a heads-up display, or the like), one or more second attitude sensors (e.g., one or more cameras, gyroscopes, inertial measurement units, or other sensors that enable the computer system to detect changes in an orientation and/or position of the computer system relative to a physical environment of the computer system), and a second input device (e.g., a touch-sensitive surface), that is displaying, via the second display generation component of the second computer system (e.g., as shown in FIG. 5D3*c*), a view of the simulated environment that is oriented relative to a second physical environment of the second computer system 5412 (e.g., an augmented reality view including the first virtual user interface object 5402 overlaid on at least a portion of a live image output from the camera of the second computer system).

While displaying the simulated environment via the first display generation component of the first computer system (1106), the first computer system 5406 detects a change in the viewing perspective of the second computer system 5412 of the simulated environment (e.g., as illustrated at FIGS. 5D3-5D4) based on a change in the attitude of a portion of the second computer system relative to the second physical environment of the second computer system (e.g., a change in the attitude of the portion of the second computer system and/or a change in the attitude of at least a portion of the physical environment such as a change in the attitude of a physical object used as a marker by the second computer system).

In response to detecting the change in the viewing perspective of the second computer system of the simulated environment based on the change in the attitude of the portion of the second computer system 5412 relative to the physical environment of the second computer system (1108), the first computer system 5406 updates the visual indication of the viewing perspective of the second computer system 5412 of the simulated environment displayed via the first display generation component of the first computer system 5406 in accordance with the change in the viewing perspective of the second computer system 5412 of the simulated environment. For example, as shown in FIG. 5D3*b*, the display of first computer system 5406 displays the viewing perspective indicator 5432 that corresponds to second computer system 5412. The viewing perspective indicator 5432 is updated from FIG. 5D3*b* to FIG. 5D4*b* based on the change in position of second computer system 5412 (as shown in FIGS. 5D3*a* to FIG. 5D4*a*).

In some embodiments, the visual indication of the viewing perspective of the second computer system includes (1110) a representation of the second computer system (e.g., a view of the second computer system as detected by the one or more cameras of the first computer system and/or a virtual representation of the second computer system) that is displayed at a position in the simulated environment that corresponds to the second computer system. For example, as shown in FIG. 5D3*b*, the display of first computer system 5406 displays avatar 5428 that corresponds to second computer system 5412. Displaying a representation of the second computer system at a position that corresponds to the second computer system improves the information available to the first user about the second computer system (e.g., to help the user understand that that the visual indication of the viewing perspective corresponds to a remote computer system). Improving the information available to the first user about the second computer system enhances the operability of the device (e.g., by allowing the user to collaborate more effectively with other users), and makes the user-device interface more efficient, which, additionally, reduces power usage and improves battery life of the device by enabling the user to use the device more quickly and efficiently.

In some embodiments, the representation of the second computer system includes (1112) an identification indicator (e.g., text, a 2D image (such as an emoji, or a photograph), and/or a 3D model) that corresponds to the second computer system. For example, avatar 5428 as shown in FIG. 5D3*b* is an identification indicator that corresponds to second computer system 5412. Displaying an identification indicator for the second computer system at a position that corresponds to the second computer system improves the information available to the first user about the second computer system. Improving the information available to the first user about the second computer system makes the user-device interface more efficient (e.g., by helping the first user to distinguish between the visual indicator of the viewing perspective of the second user and visual indicators of the viewing perspectives of other users of remote computing systems), which, additionally, reduces power usage and improves battery life of the device by enabling the user to use the device more quickly and efficiently.

In some embodiments, the visual indication of the viewing perspective of the second computer system 5412 includes (1114) an indicator 5432 that emanates (e.g., as a cone, such as a cone of particles, or one or more rays) from a position in the simulated environment that corresponds to the second computer system 5412 to indicate a line of sight of the second computer system. In some embodiments, the one or more rays include at least one ray that does not extend to (any) user interface objects in the virtual model. For example, the one or more rays do not connect to the first virtual user interface object 5420. In some embodiments, the visual indicator 5432 gets wider as it extends further from the representation of the second computer system 5412 to more accurately represent the field of view of the second computer system 5412. Displaying an indicator to indicate a line of sight of the second computer system improves the information available to the first user about the second computer system (e.g., by providing a cue to help the first user understand what the second user is viewing on the display of the second computer system and objects in that view with which the second user will potentially interact). Improving the information available to the first user about the second computer system makes the user-device interface more efficient (e.g., by allowing the user to collaborate more effectively with other users), which, additionally, reduces power usage and improves battery life of the device by enabling the first user to use the device more quickly and efficiently.

In some embodiments, displaying the simulated environment includes (1116), in accordance with a determination that the second computer system 5412 in the simulated environment is interacting with the first virtual user interface object 5420 (e.g., the second computer system has selected the first user interface object 5420, is moving the first user interface object 5420, and/or is changing a size and/or shape of the first user interface object 5420), displaying, via the first display generation component of the first computer system 5406, an interaction indicator (e.g., interaction indicator 5452, as shown in FIG. 5D5*b*) that is visually associated with the first virtual user interface object 5420. In some embodiments, in accordance with a determination that the second computer system 5412 in the simulated environment is interacting with a second virtual user interface object (e.g., the second computer system 5412 has selected the second user interface object, is moving the second user interface object, and/or is changing a size and/or shape of the second user interface object), the first computer system 5406 displays, via the first display generation component of the first computer system, an interaction indicator that is visually associated with the second virtual user interface object. Displaying an interaction indicator 5452 that indicates a virtual user interface object with which the second computer system 5412 is interacting improves collaboration between users of multiple computer systems. Improving the collaboration between users of multiple computer systems increases the efficiency with which the users perform operations in the simulated environment (e.g., by allowing a second user of the second computer system to contribute to tasks that involve the virtual user interface object, reducing the amount of contribution to the task required by the first user of the first computer system), thereby enhancing the operability of the computer system, which, additionally, reduces power usage and improves battery life of the device by enabling the user to use the computer system more quickly and efficiently.

In some embodiments, displaying the simulated environment includes (1118), in accordance with a determination that the interaction of the second computer system 5412 with the first virtual user interface object 5420 includes an object manipulation input, changing an appearance of the first virtual user interface object (e.g., by moving, expanding, contracting, and/or otherwise changing the size, shape, and/or position of the first virtual user interface object 5420) in accordance with the object manipulation input. For example, in FIGS. 5D5*b*-5D6*b*, virtual user interface object 5420 is moved in response to a movement input illustrated at FIGS. 5D5*c*-5D6*c*. In FIGS. 5D9*b*-5D10*b*, the size of virtual user interface object 5420 is changed in response to a resizing input illustrated at FIGS. 5D9*c*-5D10*c*. Changing an appearance of a virtual user interface object in accordance with an input by the second computer system that manipulates the virtual user interface object improves collaboration between users of multiple computer systems. Improving the collaboration between users of multiple computer systems increases the efficiency with which the users perform operations in the simulated environment (e.g., by revealing to the first user contributions by a second user to a task involving the virtual user interface object, reducing the amount of contribution to the task required by the first user of the first computer system), thereby enhancing the operability of the computer system, which, additionally, reduces power usage and improves battery life of the device by enabling the user to use the computer system more quickly and efficiently.

In some embodiments, changing the appearance of the first virtual user interface object 5420 in accordance with the object manipulation input includes (1120) displaying movement of the interaction indicator 5452 that is visually associated with the first virtual user interface object 5420, and the movement of the interaction indicator corresponds to the object manipulation input (e.g., as shown in FIGS. 5D5*b*-5D6*b*). For example, a portion of the interaction indicator 5452 (e.g., an endpoint of the interaction indicator 5452) is displayed at a location that corresponds to a point on the first virtual user interface object 5420 such that the portion moves as the point on the first virtual user interface object changes due to a change in position and/or size of the first virtual user interface object. Moving an interaction indicator in accordance with input of the second computer system that manipulates the virtual user interface object improves information available to the first user about the second computer system (e.g., by providing a visual cue to the first user about the connection between the change to the virtual user interface object and the second computer system, helping the user to understand that the virtual user interface object is changed as a result of input received at the second computer system). Improving the information available to the first user makes the user-device interface more efficient (e.g., by allowing the first user to collaborate more effectively with other users), which, additionally, reduces power usage and improves battery life of the device by enabling the user to use the device more quickly and efficiently.

In some embodiments, the interaction indicator 5452 includes (1122) a visual indication of a connection (e.g., a line) between a position that corresponds to the second computer system in the simulated environment and the first virtual user interface object. For example, in FIG. 5D5*b*, interaction indicator 5452 is shown as a line between avatar 5428 (that identifies second computer system 5412) and virtual box 5420. Displaying an interaction indicator that includes a visual indication of a connection between the displayed position of the second computer system and the virtual user interface object improves information available to the first user about the second computer system (e.g., by providing a visual cue to the first user about the connection between the virtual user interface object and the second computer system that is interacting with the virtual user interface object, helping the user to understand that the second computer system is interacting with the virtual user interface object). Improving the information available to the first user makes the user-device interface more efficient (e.g., by allowing the first user to collaborate more effectively with other users), which, additionally, reduces power usage and improves battery life of the device by enabling the user to use the device more quickly and efficiently.

In some embodiments, the interaction indicator 5452 includes (1124) a visual indication of a point of interaction (e.g., control handle 5454, FIG. 5D5*b*) with the first user interface object 5420. For example, a point of connection (e.g., a dot) is displayed at a point where the visual indication of the connection meets the first user interface object 5420. In some embodiments, the point of connection indicates a point, side, control handle, or other portion of the object with which the user is interacting. In some embodiments, when the second computer system starts interacting with a different portion of the first user interface object, the interaction indicator changes to indicate the point of interaction between the first user interface object and the second computer system. Displaying an interaction indicator that includes a visual indication of a point of interaction with the virtual user interface object improves information available to the first user about the second computer system (e.g., by providing a visual cue to the first user about the way in which the second computer system is interacting with the virtual user interface object, helping the user to understand how the second computer system is interacting with the virtual user interface object and predict the changes that will be made by the second computer system). Improving the information available to the first user makes the user-device interface more efficient (e.g., by allowing the first user to collaborate more effectively with other users), which, additionally, reduces power usage and improves battery life of the device by enabling the user to use the device more quickly and efficiently.

In some embodiments, displaying the simulated environment includes (1126) detecting, via the first computer system 5406 (e.g., using one or more sensors of the first computer system, such as one or more cameras (e.g., video cameras that continuously provide a live preview of at least a portion of the contents that are within the field of view of the cameras and optionally generate video outputs including one or more streams of image frames capturing the contents within the field of view of the cameras)), a first physical reference object (e.g., a first reference mat 5416*a*, FIG. 5D4*a*) in the first physical environment. In some embodiments, the physical reference object is a device that includes one or more sensors for detecting position and one or more communication components configured to transmit the position information. In some embodiments, a position of a physical reference object is detected by a device that is remote from the first physical reference object and the first computer system. In some embodiments, displaying the simulated environment also includes displaying, in the simulated environment displayed via the first display generation component of the first computer system, the first virtual user interface object 5420 at a position relative to the first physical reference object (e.g., a visual representation of the first physical reference object, such as a live camera view of the first physical reference object and/or a virtual model that corresponds to the first physical reference object). In response to detecting the change in the viewing perspective of the second computer system 5412, the first computer system updates the position of the interaction indicator 5462 relative to the first physical reference object 5416*a* (e.g., as shown in FIGS. 5D9*a*-5D10*a* and 5D9*b*-5D10*b*, the position interaction indicator 5462 changes as the position of device 5412 changes. In some embodiments, the visual indication 5432 of the viewing perspective of the second computer system 5412 is also updated to indicate the change in the viewing perspective of the second computer system. Updating the position of the interaction indicator relative to a physical reference object as the viewing perspective of the second computer system changes improves information available to the first user about the second computer system (e.g., by providing a visual cue to the first user about the relative positioning of the second computer system and the physical environment, helping the first user to understand how the second user of the second computer system views the simulated environment). Improving the information available to the first user makes the user-device interface more efficient (e.g., by allowing the first user to collaborate more effectively with other users), which, additionally, reduces power usage and improves battery life of the device by enabling the user to use the device more quickly and efficiently.

In some embodiments, the second physical environment of the second computer system is (1128) distinct from the first physical environment of the first computer system. For example, FIG. 5D12*b* illustrates a second physical environment 5470 that is distinct from first physical environment 5400. The second computer system (e.g., device 5478, FIG. 5D12*b*) detects (e.g., using one or more sensors of the second computer system, such as one or more cameras) a second physical reference object (e.g., a second reference mat 5476*a*) in the second physical environment 5470. In some embodiments, the first physical reference object (e.g., physical reference mat 5416*a*, FIG. 5D12*a*) and the second physical reference object (e.g., physical reference mat 5476*a*, FIG. 5D12*b*) have one or more shared characteristics (e.g., the same area, shape, and/or reference pattern). In some embodiments, in the simulated environment displayed via the second display generation component of the second computer system (e.g., as shown in FIG. 5D14*c*), the first virtual user interface object 5420 is displayed at a location relative to the second physical reference object (e.g., a visual representation 5476*b* of the second physical reference object 5476*a*, such as a live camera view 5476*b* of the second physical reference object 5476*a* and/or a virtual model that corresponds to (e.g., is anchored to a live camera view of) the second physical reference object) the location of the first virtual user interface object 5420 relative to the first physical reference object 5416*a*. For example, a second anchoring position is at a same position relative to the boundary of the second physical reference object 5476*a* as the position of the first anchoring position relative to the boundary of first reference object 5146*a* (e.g., if the first anchoring position is at the center of the first physical reference object 5146*a*, the second anchoring position is at the center of the second physical reference object 5476*a*, and/or vice versa). If a movement input causes the position of the first virtual user interface object to move along a first path relative to the first physical reference object, the position of the first virtual user interface object in the simulated environment displayed via the second display generation component moves along a second path, relative to the second physical reference object, that has the same trajectory as the first path relative to the first physical reference object. Displaying a virtual user interface object at a location relative to a first physical reference object in a simulated environment displayed by a first computer system and displaying the same virtual user interface object at a location relative to a second physical reference object in a simulated environment displayed by a second computer system enables a first user and a second user to collaborate in a shared simulated environment while the first user and the second user are not at the same physical location. Enabling a first user and a second user to collaborate in a shared simulated environment while the first user and the second user are not at the same physical location improves the collaboration between users of multiple computer systems, which increases the efficiency with which the users perform operations in the simulated environment (e.g., by revealing to the first user contributions by a second user to a task involving the virtual user interface object, reducing the amount of contribution to the task required by the first user of the first computer system), thereby enhancing the operability of the computer system, which, additionally, reduces power usage and improves battery life of the device by enabling the user to use the computer system more quickly and efficiently.

In some embodiments, the first physical environment 5400 of the first computer system includes (1130) at least a portion of the second physical environment of the second computer system (e.g., the first computer system 5406 and the second computer system 5412 are in the same (local) physical space, as shown in FIG. 5D1) and the second computer system (e.g., a live image of the second computer system and/or a virtual version of second computer system (e.g., overlaid over the live image of the second computer system)) is visible in the simulated environment displayed via the first display generation component. For example, in FIG. 5D4*b*, a representation 5430 of device 5412 (e.g., a view of device 5412 as captured by a camera of device 5406 and/or a rendered version of device 5412) is shown. Displaying the second computer system in a simulated environment displayed by a first computer system when the first computer system and the second computer system are at least partly in the same physical environment improves collaboration between the first user of the first computer system and the second user of the second computer system (e.g., by helping the first user understand the location of the second computer system relative to the first computer system). Improving collaboration between the first user of the first computer system and the second user of the second computer system increases the efficiency with which the first user performs operations in the simulated environment, thereby enhancing the operability of the computer system, which, additionally, reduces power usage and improves battery life of the device by enabling the user to use the computer system more quickly and efficiently.

In some embodiments, the first computer system detects (1132), by the first input device 5406, a remote device perspective input (e.g., an input detected at a user interface control, such as a button and/or menu item, or a gesture input such as a swipe gesture) and, in response to detecting the remote device perspective input, the first computer system replaces display of the simulated environment that is oriented relative to the first physical environment of the first computer system with display of the simulated environment that is oriented relative to the second physical environment of the second computer system. For example, in response to the input, device 5406 displays a view of device 5412, such as the view illustrated in FIG. 5D4*c*. Replacing display of the simulated environment of the first computer system with display of the simulated environment of the second computer system in response to input at the first input device of the first computer system improves collaboration between the first user of the first computer system and the second user of the second computer system (e.g., by allowing the first user to accurately visualize the perspective of another user). Improving collaboration between the first user of the first computer system and the second user of the second computer system increases the efficiency with which the first user performs operations in the simulated environment (e.g., by allowing the first user to use information about the second user's perspective to communicate accurately about the viewed user interface object), thereby enhancing the operability of the computer system, which, additionally, reduces power usage and improves battery life of the device by enabling the user to use the computer system more quickly and efficiently.

It should be understood that the particular order in which the operations in FIGS. 11A-11C have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, 800, 900, 1000, 1200, and 1300) are also applicable in an analogous manner to method 1100 described above with respect to FIGS. 11A-11C. For example, the contacts, gestures, user interface objects, focus indicators, and/or animations described above with reference to method 1100 optionally have one or more of the characteristics of the contacts, gestures, user interface objects, intensity thresholds, focus indicators, and/or animations described herein with reference to other methods described herein (e.g., methods 600, 700, 800, 900, 1000, 1200, and 1300). For brevity, these details are not repeated here.

FIGS. 12A-12D are flow diagrams illustrating method 1200 for placement of an insertion cursor, in accordance with some embodiments. Method 1200 is performed at a computer system (e.g., portable multifunction device 100, FIG. 1A, device 300, FIG. 3A, or a multi-component computer system including headset 5008 and input device 5010, FIG. 5A2) that includes (and/or is in communication with) a display generation component (e.g., a display, a projector, a heads-up display, or the like) and an input device (e.g., a touch-sensitive surface, such as a touch-sensitive remote control, or a touch-screen display that also serves as the display generation component, a mouse, a joystick, a wand controller, and/or cameras tracking the position of one or more features of the user such as the user's hands), optionally one or more cameras (e.g., video cameras that continuously provide a live preview of at least a portion of the contents that are within the field of view of the cameras and optionally generate video outputs including one or more streams of image frames capturing the contents within the field of view of the cameras), optionally one or more attitude sensors, optionally one or more sensors to detect intensities of contacts with the touch-sensitive surface, and optionally one or more tactile output generators. In some embodiments, the input device (e.g., with a touch-sensitive surface) and the display generation component are integrated into a touch-sensitive display. As described above with respect to FIGS. 3B-3D, in some embodiments, method 1200 is performed at a computer system 301 (e.g., computer system 301-*a*, 301-*b*, or 301-*c*) in which respective components, such as a display generation component, one or more cameras, one or more input devices, and optionally one or more attitude sensors are each either included in or in communication with computer system 301.

In some embodiments, the display generation component is a touch-screen display and the input device (e.g., with a touch-sensitive surface) is on or integrated with the display generation component. In some embodiments, the display generation component is separate from the input device (e.g., as shown in FIG. 4B and FIG. 5A2). Some operations in method 1200 are, optionally, combined and/or the order of some operations is, optionally, changed.

For convenience of explanation, some of the embodiments will be discussed with reference to operations performed on a computer system with a touch-sensitive display system 112 (e.g., on device 100 with touch screen 112) and one or more integrated cameras. However, analogous operations are, optionally, performed on a computer system (e.g., as shown in FIG. 5A2) with a headset 5008 and a separate input device 5010 with a touch-sensitive surface in response to detecting the contacts on the touch-sensitive surface of the input device 5010 while displaying the user interfaces shown in the figures on the display of headset 5008. Similarly, analogous operations are, optionally, performed on a computer system having one or more cameras that are implemented separately (e.g., in a headset) from one or more other components (e.g., an input device) of the computer system; and in some such embodiments, "movement of the computer system" corresponds to movement of one or more cameras of the computer system, or movement of one or more cameras in communication with the computer system.

As described below, method 1200 relates to input for placement of an insertion cursor (e.g., for indicating a location in a simulated environment for placement of an object). The same type of input can be used to insert the object in the simulated environment (e.g., when the input is received at a location that corresponds to a location of a displayed insertion cursor). Determining whether to display an insertion cursor at a location of a focus selector or to insert a first object at a location of a focus selector in response to detecting input of a first type, depending on whether the location of the focus selector corresponds a location of a displayed insertion cursor, enables the performance of multiple different types of operations with the first type of input. Enabling the performance of multiple different types of operations with the first type of input increases the efficiency with which the user is able to perform these operations, thereby enhancing the operability of the device, which, additionally, reduces power usage and improves battery life of the device by enabling the user to use the device more quickly and efficiently.

The computer system (e.g., device 100, FIG. 5E1) displays (1202) via the display generation component of the first computer system, a simulated environment (e.g., a virtual reality environment or an augmented reality environment). For example, an augmented reality environment is displayed on display 112 of device 100, as shown in FIG. 5E2.

While displaying the simulated environment, the computer system detects (1204), via an input device (e.g., touch screen display 112 of device 100), a first input that is directed to a respective location in the simulated environment. For example, in FIG. 5E7, an input by a contact 5506 with touch screen display 112 is detected at a location that does not correspond to a location of an insertion cursor (e.g., insertion cursor 5504). In FIG. 5E9, an input by a contact 5510 with touch screen display 112 is detected at a location that corresponds to a location of an insertion cursor (e.g., insertion cursor 5508).

In response to detecting the first input that is directed to the respective location in the simulated environment (1206), in accordance with a determination that the first input was of a first input type (e.g., a tap input detected at a location in the simulated environment) and that the first input was detected at a first location in the simulated environment other than a current location of an insertion cursor in the simulated environment (e.g., an input by a contact 5506 at a location that does not correspond to a current location of an insertion cursor 5504, as shown in FIG. 5E7), the computer system displays the insertion cursor at the first location (e.g., moving an existing insertion cursor from a prior location to the first location, or displaying a new insertion cursor at the first location if no insertion cursor was displayed in the simulated environment prior to the first input). For example, in response to the input by contact 5506 as shown in FIG. 5E7, insertion cursor 5504 is moved from the location shown in FIG. 5E7 to the location where contact 5506 was received, as indicated by insertion cursor 5508 in FIG. 5E8. In accordance with a determination that the first input was of the first input type and that the first input was detected at a second location in the simulated environment that corresponds to the current location of the insertion cursor (e.g., an input by a contact 5510 at a location that corresponds to a current location of an insertion cursor 5508, as shown in FIG. 5E9), the computer system inserts a first object (e.g., virtual box 5512) at the second location and moves the insertion cursor to a third location that is on the first object (e.g., insertion cursor 5508 is moved to surface 5514 of virtual box 5512).

In some embodiments, the device repeatedly performs (1208) the method 1200 over a plurality of successive iterations, wherein, in a first iteration of the successive iterations, the first input is of the first type and is detected at the first location in the simulated environment, and in response the insertion cursor is displayed at the first location; and, in a second iteration of the successive iterations, the first input is of the first type and is detected at the second location in the simulated environment that corresponds to the current location of the insertion points, and in response the first object is inserted at the second location and the insertion cursor is moved to the third location that is on the first object. Determining whether to display an insertion cursor at a location of a focus selector or to insert a first object at a location of a focus selector in response to detecting input of a first type, depending on whether the location of the focus selector corresponds a location of a displayed insertion cursor, enables the performance of multiple different types of operations with the first type of input. Enabling the performance of multiple different types of operations with the first type of input increases the efficiency with which the user is able to perform these operations, thereby enhancing the operability of the device, which, additionally, reduces power usage and improves battery life of the device by enabling the user to use the device more quickly and efficiently.

In some embodiments, the first object has (1210) a plurality of non-adjacent sides, which are not adjacent to the second location (e.g., each respective non-adjacent side of the plurality of non-adjacent sides is not adjacent to the second location) that corresponds to the current location of the insertion cursor (e.g., the location of insertion cursor 5508 in FIG. 5E9) and the third location on the first object is on a respective non-adjacent side of the plurality of non-adjacent sides that are not adjacent to the second location (e.g., the third location is side 5514 of virtual object 5512 (as shown in FIG. 5E10), and side 5514 of virtual object 5512 is not adjacent to the position of insertion cursor 5508). Moving the insertion cursor to a side of the first object that is not adjacent to the location where the first object was inserted improves the feedback provided to the user (e.g., by changing the location of the input cursor to make it visible to the user on a side of the first object), and reduces the number of inputs needed (e.g., to insert a new object at the third location). Reducing the number of inputs needed to insert a new object enhances the operability of the device, and makes the user-device interface more efficient which, additionally, reduces power usage and improves battery life of the device by enabling the user to use the device more quickly and efficiently.

In some embodiments, in accordance with a determination that the current location of an insertion cursor is located on a respective side of a preexisting object (1212), the third location is on a first respective side of the first object that is parallel to the respective side of the preexisting object (e.g., if the cursor is on the top of the preexisting object, then the cursor is moved to a top of the first object, and if the cursor is on a front side of the preexisting object, then the cursor is moved to the front side of the first object). For example, in FIG. 5E11, an input by contact 5516 is detected at a location that corresponds to insertion cursor 5508 while insertion cursor 5508 is located on top side 5514 of preexisting virtual box 5512. In FIG. 5E12, in response to the input by contact 5516, new virtual box 5518 is displayed and insertion cursor 5508 is moved to the top side 5520 of new virtual box 5518. Top side 5520 of new virtual box 5518 is parallel to top side 5514 of preexisting virtual box 5512. Moving the insertion cursor to a side of the first object that is parallel to a side of a preexisting object where the insertion cursor was located improves the feedback provided to the user (e.g., by placing the input cursor at a location that will enable continued expansion of the preexisting object along the same axis) and reduces the number of inputs needed (e.g., to insert a new object at the third location). Reducing the number of inputs needed to insert a new object enhances the operability of the device and makes the user-device interface more efficient which, additionally, reduces power usage and improves battery life of the device by enabling the user to use the device more quickly and efficiently.

In some embodiments, (1214) the first location (that is not the current location of an insertion cursor) is on a first side of the preexisting object and the second location (that corresponds to the current location of the insertion cursor) is on a second side of the preexisting object that is different from the first side of the preexisting object. For example, while the insertion cursor 5508 is on a top side of the preexisting object (e.g., virtual box 5518 in FIG. 5E17), a selection input (e.g., by contact 5524) is detected on the front side 5528 of the preexisting object 5518, in which case a displayed focus indicator such as an insertion cursor 5508 is moved to the front side 5528 of the preexisting object without adding a new object to the front side 5528 of the preexisting object 5518 (as shown in FIG. 5E18). Alternatively, the selection input (e.g., by contact 5516) is detected while an insertion cursor 5508 is on the top side of the preexisting object (e.g., top side 5514 of virtual box 5512 in FIG. 5E11), in which case the first object (e.g., virtual box 5518) is added to the top of the preexisting object (e.g., virtual box 5512) and a displayed focus indicator such as an insertion cursor 5508 is moved to the top of the preexisting object that now includes the first object (e.g., as shown in FIG. 5E12). Displaying an insertion cursor at a first side of a preexisting object (e.g., moving the insertion cursor from a current location to the first side of the preexisting object) or inserting a first object at a second side of the preexisting object (e.g., when input is received while a focus selector is at a location that corresponds to an insertion cursor that is at the second side of the preexisting object) enables the performance of multiple different types of operations with the first type of input. Enabling the performance of multiple different types of operations with the first type of input increases the efficiency with which the user is able to perform these operations, thereby enhancing the operability of the device, which, additionally, reduces power usage and improves battery life of the device by enabling the user to use the device more quickly and efficiently.

In some embodiments, the simulated environment (e.g., as displayed by device 100 in FIG. 5E3) is oriented (1216) relative to a physical environment 5200 of the computer system (e.g., the orientation of the simulated environment relative to the physical environment is independent of the orientation of the one or more attitude sensors of the computer system) and inserting the first object (e.g., virtual box 5512) at the second location includes inserting the first object in the simulated environment (e.g., a rendered 3D model) at a location (and, optionally, in an orientation) in the simulated environment that is associated with a respective location (and, optionally, an orientation) of a respective physical reference object (e.g., physical reference mat 5208*a*) in the physical environment 5200 of the computer system (e.g., the first object is anchored to a physical reference object, such as a mat, and/or is associated with a virtual object that is anchored to the physical reference object). In some embodiments, the simulated environment includes images (e.g., in the background, such as beyond the first virtual user interface object) detected by one or more cameras (e.g., video cameras that continuously provides a live preview of at least a portion of the contents that are within the field of view of the cameras and optionally generates video outputs including one or more streams of images frames capturing the contents within the field of view of the cameras) of the computer system. In some embodiments, the simulated environment includes a simulated light source. In some embodiments, the simulated light source causes a shadow (e.g., 5522, FIG. 5E10) to be cast by the first object 5512 (and any other objects a displayed virtual model). In some embodiments, the shadow moves in response to a movement input detected by the input device that moves the first object and/or changes a viewing perspective of the first object (e.g., as shown in FIGS. 5E12-5E14). Inserting a first object in a simulated environment at a location that is associated with a physical reference improves the feedback provided to the user (e.g., by making the computer system appear more responsive to user input), enhances the operability of the device, and makes the user-device interface more efficient (e.g., by helping the user to achieve an intended outcome with the required inputs and reducing user mistakes when operating/interacting with the device) which, additionally, reduces power usage and improves battery life of the device by enabling the user to use the device more quickly and efficiently.

In some embodiments, in response to detecting the first input that is directed to the respective location in the simulated environment (1218), in accordance with a determination that the first input was of a second input type (e.g., the input includes an insertion command or selects a button or menu item that adds an object) and the insertion cursor is displayed at the second location in the simulated environment, the computer system inserts the first object at the second location in the simulated environment and moves the insertion cursor to the third location on the first object. For example, as shown in FIGS. 5E23-5E24, an input by contact 5542 at a location that corresponds to new object control 5216 causes virtual box 5546 to be displayed at a location that corresponds to insertion cursor 5526. The insertion cursor 5526 is moved to top side 5548 of virtual box 5546. In some embodiments, in response to detecting the first input that is directed to the respective location in the simulated environment, in accordance with a determination that the first input was of the first input type (e.g., a tap input) and that the first input was detected at the second location in the simulated environment that corresponds to the current location of the insertion cursor, a first object is inserted at the second location. In accordance with a determination that the first input was of a third input type (e.g., the input includes selection of a respective surface of an object and movement of the input), the object is adjusted in accordance with the movement of the input (e.g., a size of the object is adjusted, based on the movement of the input, along an axis that is perpendicular to the selected side of the object and/or the object is moved in a direction based on the movement of the input). Inserting a first object in a simulated environment at a second location where an insertion cursor is displayed improves the feedback provided to the user (e.g., by making the computer system appear more responsive to user input), enhances the operability of the device, and makes the user-device interface more efficient (e.g., by helping the user to achieve an intended outcome with the required inputs and reducing user mistakes when operating/interacting with the device) which, additionally, reduces power usage and improves battery life of the device by enabling the user to use the device more quickly and efficiently.

In some embodiments, the computer system detects (1220) a second input that includes selection of a second respective side of the first object and movement of the second input in two dimensions (e.g., movement of a contact across a planar touch-sensitive surface, or movement of a remote control that includes movement components in two orthogonal dimensions of the three-dimensional physical space around the remote control). For example, as indicated in FIGS. 5E25-5E26, an input by contact 5550 selects side 5556 of virtual box 5546 and moves along a path indicated by arrow 5554. In response to detecting the second input that includes movement of the second input in two dimensions (1222), in accordance with a determination that the second input meets movement criteria, (e.g., has a duration that is shorter than a long press duration and/or has a characteristic intensity of a contact with a touch-sensitive surface that does not increase above a resizing intensity threshold (e.g., a light press threshold $IT_L$, discussed above with regard to FIGS. 4D-4E), the computer system moves the first object within a first plane that is parallel to the selected second respective side of the first object in a first direction determined based on the movement of the second input. For example, in FIGS. 5E25-5E26, the second input meets movement criteria, and virtual box 5546 is moved within a plane indicated by movement projections 5552. In accordance with a determination that the second input does not meet movement criteria, the computer system forgoes moving the first object. In some embodiments, the computer system detects a plurality of inputs that include selection of a second respective side of the first object and movement of the second input in two dimensions, wherein the plurality of inputs includes at least one input for which the second input meets movement criteria, and at least one input for which the second input does not meet movement criteria. In some embodiments, an amount of movement of the first object is dependent upon the magnitude of the movement of the second input. In some embodiments, a direction of movement of the first object is dependent upon the direction of the movement of the second input (e.g., as described in greater detail herein with reference to method 900). Moving the object in response to input that includes movement in two dimensions improves the feedback provided to the user (e.g., by making the computer system appear more responsive to user input), enhances the operability of the device, and makes the user-device interface more efficient (e.g., by helping the user to achieve an intended outcome with the required inputs and reducing user mistakes when operating/interacting with the device) which, additionally, reduces power usage and improves battery life of the device by enabling the user to use the device more quickly and efficiently.

In some embodiments, the computer system detects (1224) a third input that includes selection of a third respective side of the first object and movement of the third input in two dimensions. For example, in FIGS. 5E28-5E31, an input by contact 5558 selects side 5556 of virtual box 5546 and moves along a path indicated by arrow 5562. In response to detecting the third input that includes movement of the third input in two dimensions (1226), in accordance with a determination that the third input meets resize criteria, (e.g., has a duration that increases above a long press duration value and/or has a characteristic intensity of a contact with a touch-sensitive surface that increases above a resizing threshold (e.g., a light press threshold $IT_L$) the computer system adjusts, based on the movement of the third input, a size of the first object along an axis that is perpendicular to the selected third respective side of the first object (e.g., the axis is normal to the surface of the selected respective portion and is in contact with that surface). For example, in FIGS. 5E28-5E31, the second input meets resize criteria, and a size of virtual box 5546 is increased along an axis indicated by resizing projections 5560. In accordance with a determination that the third input does not meet resize criteria, the computer system forgoes adjusting the size of the first object. In some embodiments, the computer system detects a plurality of inputs that include selection of a third respective side of the first object and movement of the third input in two dimensions, wherein the plurality of inputs includes at least one input for which the third input meets resize criteria, and at least one input for which the second input does not meet resize criteria. In some embodiments, in response to detecting the third input that includes movement of the third input in two dimensions, in accordance with a determination that the third input meets resize criteria, a position of the first object is locked to an anchor point in the simulated environment. In some embodiments, an amount of adjustment of the size of the first object is dependent upon the magnitude of the movement of the third input. In some embodiments, a direction of adjustment of the size of the first object is dependent upon the direction of the movement of the third input (e.g., as described in greater detail herein with reference to method 900). Adjusting a size of an object in response to input that meets resize criteria and includes movement in two dimensions improves the feedback provided to the user (e.g., by making the computer system appear more responsive to user input), enhances the operability of the device, and makes the user-device interface more efficient (e.g., by helping the user to achieve an intended outcome with the required inputs and reducing user mistakes when operating/interacting with the device) which, additionally, reduces power usage and improves battery life of the device by enabling the user to use the device more quickly and efficiently.

In some embodiments, the computer system detects (1228) a fourth input that includes selection of a fourth respective side of the first object and movement of the fourth input in two dimensions. In response to detecting the fourth input that includes movement of the second input in two dimensions (1230), in accordance with a determination that the contact meets resizing criteria (e.g., has a duration that increases above a long press duration value and/or has a characteristic intensity of a contact with a touch-sensitive surface that increases above a resizing threshold (e.g., a light press threshold $IT_L$)) the computer system adjusts a size of the first object based on the movement of the fourth input. For example, in FIGS. 5E28-5E31, an input by contact 5558 that selects side 5556 of virtual box 5546 and moves along a path indicated by arrow 5562 meets resize criteria, and a size of virtual box 5546 is increased along an axis indicated by resizing projections 5560. In accordance with a determination that the contact does not meet resizing criteria, the computer system moves the first object based on the movement of the fourth input. For example, in FIGS. 5E25-5E26, an input by contact 5550 that selects side 5556 of virtual box 5546 and moves along a path indicated by arrow 5554 meets movement criteria, and virtual box 5546 is moved within a plane indicated by movement projections 5552. In some embodiments, the computer system detects a plurality of inputs that include selection of a fourth respective side of the first object and movement of the fourth input in two dimensions, wherein the plurality of inputs includes at least one input for which the contact meets movement criteria, and at least one input for which the contact does not meet movement criteria. Determining whether to adjust a size of an object or move the object in response to detecting an input by a contact on a touch sensitive surface, depending on whether, prior to movement of the contact across the touch sensitive surface, a characteristic intensity of the contact increased above an intensity threshold before a predefined delay time has elapsed, enables the performance of multiple different types of operations with the first type of input. Enabling the performance of multiple different types of operations with input by a contact on a touch sensitive surface increases the efficiency with which the user is able to perform these operations, thereby enhancing the operability of the device, which, additionally, reduces power usage and improves battery life of the device by enabling the user to use the device more quickly and efficiently.

In some embodiments, adjusting the size of the first object based on the movement of the fourth input includes (1232) adjusting the size of the first object along an axis that is perpendicular to the selected third respective side of the first object. For example, in FIGS. 5E30-5E31, a size of virtual box 5546 is adjusted along an axis, indicated by resizing projections 5560, that is perpendicular to selected side 5556 of virtual box 5546.

In some embodiments, moving the first object based on the movement of the fourth input includes (1234) moving the first object within a first plane that is parallel to the selected second respective side of the first object in a first direction determined based on the movement of the second input. For example, as indicated in FIGS. 5E25-5E26, an input virtual box 5546 is moved in a plane, indicated by movement projections 5552, that is parallel to selected side 5556 of virtual box 5546.

In some embodiments, while the first object is displayed, the computer system detects (1236) a fifth input on a respective portion of the first object that does not correspond to the third location that is on the first object. For example, in FIGS. 5E11-5E12, a first object is displayed in response to input (e.g., virtual box 5518 displayed in response to input by contact 5516) and insertion cursor 5508 is moved to a third location (e.g., surface 5520 of virtual box 5518). In FIG. 5E17, an input by contact 5224 is detected at a location that does not correspond to the third location (e.g., contact 5224 is detected at surface 5528 of virtual box 5518). In response to detecting the fifth input, the computer system moves (1238) the insertion cursor from the third location to a location that corresponds to the respective portion of the first object. For example in FIG. 5E18, in response to the input by contact 5224, the insertion cursor is moved from surface 5520 of virtual box 5518 to surface 5528 of virtual box 5518). Moving an insertion cursor from a current location on an object to a different location on the object in response to an input improves the feedback provided to the user (e.g., by making the computer system appear more responsive to user input), enhances the operability of the device, and makes the user-device interface more efficient (e.g., by helping the user to achieve an intended outcome with the required inputs and reducing user mistakes when operating/interacting with the device) which, additionally, reduces power usage and improves battery life of the device by enabling the user to use the device more quickly and efficiently.

It should be understood that the particular order in which the operations in FIGS. 12A-12D have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, 800, 900, 1000, 1100, and 1300) are also applicable in an analogous manner to method 1100 described above with respect to FIGS. 12A-12D. For example, the contacts, gestures, user interface objects, intensity thresholds, focus indicators, and/or animations described above with reference to method 1200 optionally have one or more of the characteristics of the contacts, gestures, user interface objects, intensity thresholds, focus indicators, and/or animations described herein with reference to other methods described herein (e.g., methods 600, 700, 800, 900, 1000, 1100, and 1300). For brevity, these details are not repeated here.

FIGS. 13A-13E are flow diagrams illustrating method 1300 for displaying an augmented reality environment in a stabilized mode of operation, in accordance with some embodiments. Method 1300 is performed at a computer system (e.g., portable multifunction device 100, FIG. 1A, device 300, FIG. 3A, or a multi-component computer system including headset 5008 and input device 5010, FIG. 5A2) that includes (and/or is in communication with) a display generation component (e.g., a display, a projector, a heads-up display, or the like) and an input device (e.g., a touch-sensitive surface, such as a touch-sensitive remote control, or a touch-screen display that also serves as the display generation component, a mouse, a joystick, a wand controller, and/or cameras tracking the position of one or more features of the user such as the user's hands), optionally one or more cameras (e.g., video cameras that continuously provide a live preview of at least a portion of the contents that are within the field of view of the cameras and optionally generate video outputs including one or more streams of image frames capturing the contents within the field of view of the cameras), optionally one or more attitude sensors, optionally one or more sensors to detect intensities of contacts with the touch-sensitive surface, and optionally one or more tactile output generators. In some embodiments, the input device (e.g., with a touch-sensitive surface) and the display generation component are integrated into a touch-sensitive display. As described above with respect to FIGS. 3B-3D, in some embodiments, method 1300 is performed at a computer system 301 (e.g., computer system 301-*a*, 301-*b*, or 301-*c*) in which respective components, such as a display generation component, one or more cameras, one or more input devices, and optionally one or more attitude sensors are each either included in or in communication with computer system 301.

In some embodiments, the display generation component is a touch-screen display and the input device (e.g., with a touch-sensitive surface) is on or integrated with the display generation component. In some embodiments, the display generation component is separate from the input device (e.g., as shown in FIG. 4B and FIG. 5A2). Some operations in method 1300 are, optionally, combined and/or the order of some operations is, optionally, changed.

For convenience of explanation, some of the embodiments will be discussed with reference to operations performed on a computer system with a touch-sensitive display system 112 (e.g., on device 100 with touch screen 112) and one or more integrated cameras. However, analogous operations are, optionally, performed on a computer system (e.g., as shown in FIG. 5A2) with a headset 5008 and a separate input device 5010 with a touch-sensitive surface in response to detecting the contacts on the touch-sensitive surface of the input device 5010 while displaying the user interfaces shown in the figures on the display of headset 5008. Similarly, analogous operations are, optionally, performed on a computer system having one or more cameras that are implemented separately (e.g., in a headset) from one or more other components (e.g., an input device) of the computer system; and in some such embodiments, "movement of the computer system" corresponds to movement of one or more cameras of the computer system, or movement of one or more cameras in communication with the computer system.

As described below, method 1300 relates to displaying an augmented reality environment that includes a virtual user interface object displayed concurrently with a field of view of one or more cameras. Depending on whether the augmented reality environment is displayed in a stabilized mode or a non-stabilized mode, updating the displayed augmented reality environment in response to detected movement (due to a change in attitude of at least a portion of a computer system relative to its physical environment) causes the displayed field of view of the one or more cameras to change by different amounts. Displaying the augmented reality environment in a stabilized mode or a non-stabilized mode enables the performance of multiple different types of operations (e.g., updating the displayed field of view by different amounts depending on whether the displayed view is locked to a portion of the field of view that is centered around the virtual user interface object) with the same detected movement. Enabling the performance of multiple different types of operations in response to the detected movement increases the efficiency with which the user is able to perform these operations, thereby enhancing the operability of the device, which, additionally, reduces power usage and improves battery life of the device by enabling the user to use the device more quickly and efficiently.

The computer system (e.g., device 100, FIG. 5F2) displays (1302) via the display generation component 112 of the first computer system, an augmented reality environment. Displaying the augmented reality environment includes concurrently displaying a representation of at least a portion of a field of view of one or more cameras of the computer system and a virtual user interface object 5604. The representation of the field of view of the one or more cameras includes a physical object 5602. The representation of the field of view of the one or more cameras is updated as contents of the field of view of the one or more cameras change (e.g., the representation is a live preview of at least a portion of the field of view of the one or more cameras) The virtual user interface object 5604 is displayed at a respective location in the representation of the field of view of the one or more cameras, wherein the respective location of the virtual user interface object 5604 in the representation of the field of view of the one or more cameras is determined based on a fixed spatial relationship (e.g., size, orientation, and/or position) between the virtual user interface object 5604 and the physical object 5602 included in the representation of the field of view of the one or more cameras (e.g., a virtual user interface object that appears to be attached to, or cover, the physical object in the field of view of the one or more cameras).

While displaying the augmented reality environment, the computer system detects (1304), via one or more attitude sensors of the computer system, a first change in attitude (e.g., orientation and/or position) of at least a portion of the computer system (e.g., a change in attitude of a component of the computer system such as a component of the computer system that includes one or more cameras used to generate the representation of the physical environment) relative to a physical environment of the computer system. For example, FIGS. 5F3*a*-5F4*a* illustrate movement of device 100 in a non-stabilized mode of operation and FIGS. 5F8*a*-510*a*, 5F12*a*-5F13*a*, and 5F16*a*-5F17*a* illustrate movement of device 100 in a stabilized mode of operation.

In response to detecting the first change in attitude of the portion of the computer system relative to the physical environment of the computer system, the computer system updates (1306) the augmented reality environment in accordance with the first change in attitude of the portion of the computer system. In accordance with a determination that the augmented reality environment is displayed in a non-stabilized mode of operation, updating the augmented reality environment in accordance with the first change in attitude of the portion of the computer system includes updating the representation of the portion of the field of view of the one or more cameras by a first amount of adjustment that is based on the first change in attitude of the portion of the computer system relative to the physical environment of the computer system (e.g., as shown in FIGS. 5F3*b*-5F4*b*) and updating the respective location of the virtual user interface object 5604 to a location that is selected so as to maintain the fixed spatial relationship (e.g., size, orientation, and/or position) between the virtual user interface object 5604 and the physical object 5602 included in the representation of the field of view of the one or more cameras. In accordance with a determination that the augmented reality environment is displayed in a stabilized mode of operation, updating the augmented reality environment in accordance with the first change in attitude of the portion of the computer system includes: updating the representation of the portion of the field of view of the one or more cameras by a second amount of adjustment that is based on the first change in attitude of the portion of the computer system relative to the physical environment of the computer system and that is less than the first amount of adjustment (e.g., the displayed view is locked to the sub-portion of the field of view that is centered around the first virtual user interface object) and updating the respective location of the virtual user interface object 5604 to a location that is selected so as to maintain the fixed spatial relationship (e.g., size, orientation, and/or position) between the virtual user interface object 5604 and the physical object 5602 included in the representation of the field of view of the one or more cameras. For example, in FIGS. 5F16*b*-5F17*b* the representation of the portion of the field of view of the one or more cameras is updated by an amount that is less than the amount of adjustment that is less than the amount of adjustment that occurs in FIGS. 5F3*b*-5F4*b*. In some embodiments, the computer system repeatedly performs the method 1300 over a plurality of successive iterations, wherein, in a first iteration of the successive iterations, the augmented reality environment is displayed in a non-stabilized mode of operation, and, in a second iteration of the successive iterations, the augmented reality environment is displayed in a stabilized mode of operation.

In some embodiments, when the augmented reality environment was displayed in the non-stabilized mode of operation when the first change in attitude of the portion of the computer system (e.g., a change in attitude of a component of the computer system such as a component of the computer system that includes one or more cameras used to generate the representation of the physical environment) was detected (1308), after updating the augmented reality environment in accordance with the first change in attitude of the portion of the computer system, the computer system receives (1308-*a*) a request to stabilize the virtual user interface object on the display (e.g., an input at a stabilization control 5616). In response to the request to stabilize the virtual user interface object on the display, the computer system enters (1308-*b*) a stabilized mode of operation for the augmented reality environment. While in the stabilized mode of operation for the augmented reality environment, the computer system (1308-*c*) detects, via the one or more orientation sensors, a second change in attitude (e.g., orientation and/or position) of the portion of the computer system relative to the physical environment (e.g., as illustrated at FIGS. 5F16*a*-5F17*a*) and, in response to detecting the second change in attitude of the portion of the computer system (e.g., a change in attitude of a component of the computer system such as a component of the computer system that includes one or more cameras used to generate the representation of the physical environment) relative to the physical environment, the computer system updates the augmented reality environment in accordance with the second change in attitude of the portion of the computer system, including: updating the representation of the portion of the field of view of the one or more cameras by less than an amount of the second change in attitude of the portion of the computer system (or a component of the computer system such as a component of the computer system that includes one or more cameras used to generate the representation of the physical environment) relative to the physical environment and updating the virtual user interface object 5604 to a location selected so as to maintain the fixed spatial relationship (e.g., size, orientation, and/or position) between the virtual user interface object 5604 and the representation of the physical object 5602 included in the field of view of the one or more cameras. For example, in FIGS. 5F16*b*-5F17*b* the representation of the portion of the field of view of the one or more cameras is updated by an amount that is less than the amount of adjustment that is less than the amount of adjustment that occurs in FIGS. 5F3*b*-5F4*b*. Entering a stabilized mode of operation for the augmented reality environment in response to a request to stabilize the virtual user interface object on the display improves the displayed augmented reality environment (e.g., by allowing the user to view the virtual user interface object regardless of data available from the one or more cameras), enhances the operability of the device, and makes the user-device interface more efficient (e.g., by helping the user to achieve an intended outcome with the required inputs and reducing user mistakes when operating/interacting with the device) which, additionally, reduces power usage and improves battery life of the device by enabling the user to use the device more quickly and efficiently.

In some embodiments, the computer system includes an input device and the request to stabilize the virtual user interface object on the display includes (1310) an input, received via the input device, for zooming at least a portion of the augmented reality environment (e.g., a depinch-to-zoom input by contacts 5606 and 5608 as illustrated at FIG. 5F6*b*-5F7*b*). In some embodiments, input for zooming is, e.g., a pinch, double tap, or selection/manipulation of a zoom affordance. In some embodiments, in response to receiving the input for zooming at least a portion of the augmented reality environment, the device zooms the augmented reality environment (e.g. as shown in FIGS. 5F6*b*-5F7*b*, the size of virtual user interface object 5604 in the augmented reality environment is increased in response to the depinch-to-zoom input). In some embodiments, the zooming is a predetermined amount of zooming or zooming to a predetermined zoom level. In some embodiments, a magnitude of the zooming is based on a magnitude of the input (e.g., an amount of movement of two contacts apart from each other or an amount of movement of a contact on a zoom control). Entering a stabilized mode of operation for the augmented reality environment in response to a zoom input enables the stabilization mode without requiring further user input. Entering a stabilization mode without requiring further user input enhances the operability of the device, and makes the user-device interface more efficient, which, additionally, reduces power usage and improves battery life of the device by enabling the user to use the device more quickly and efficiently.

In some embodiments, in response to the request to stabilize the virtual user interface object on the display, wherein the request to stabilize the virtual user interface object on the display includes the input for zooming the portion of the displayed augmented reality environment, the computer system re-renders (1312) the virtual user interface object (e.g., from a lower resolution to a higher resolution) in accordance with the magnitude of the input for zooming the portion of the displayed augmented reality environment (e.g., without re-rendering the representation of the portion of the field of view of the one or more cameras.) For example, in FIG. 5F7*b*, virtual object 5604 is re-rendered in response to the depinch-to-zoom input received in 5F6*b*-5F7*b*. In some embodiments, in response to the request to stabilize the virtual user interface object on the display, wherein the request to stabilize the virtual user interface object on the display includes the input for zooming the displayed augmented reality environment, the field of view of the one or more cameras remains the same. In some embodiments, camera zoom of the one or more cameras is activated and the field of view of the one or more cameras is zoomed while the virtual user interface object is zoomed. Re-rendering the virtual user interface object in accordance with the magnitude of the zoom input improves the feedback provided to the user (e.g., by making the computer system appear more responsive to user input), enhances the operability of the device, and makes the user-device interface more efficient (e.g., by helping the user to achieve an intended outcome with the required inputs and reducing user mistakes when operating/interacting with the device) which, additionally, reduces power usage and improves battery life of the device by enabling the user to use the device more quickly and efficiently.

In some embodiments, the physical object 5602 is replaced by (1314) the virtual user interface object 5604 in the displayed augmented reality environment (e.g., the displayed view is locked to the sub-portion of the field of view that is centered around the first virtual user interface object). Replacing the physical object with a virtual user interface object in the displayed augmented reality environment increases the range of options for providing visual information to the user about the physical object (e.g., by providing additional or enhanced visual information in the virtual user interface object not available from the physical object) and makes the user-device interface more efficient (e.g., by providing additional information in connection with the physical object without needing to separately display the additional information and a camera view of the physical object) which, additionally, reduces power usage and improves battery life of the device by enabling the user to use the device more quickly and efficiently.

In some embodiments, the computer system detects (1316) a first respective change in attitude of the portion of the computer system relative to the physical environment of the computer system while the augmented reality environment is displayed in the stabilized mode of operation (e.g., device 100 is moved as illustrated at FIG. 5F8*a*-5F10*a*). In response to detecting the first respective change in attitude of the portion of the computer system relative to the physical environment of the computer system while the augmented reality environment is displayed in the stabilized mode of operation, the computer system updates (1318) the augmented reality environment in accordance with the respective change in attitude of the portion of the computer system, including, in accordance with a determination that the updated respective location of the virtual user interface object 5604 extends beyond the field of view of the one or more cameras, (continuing to display the virtual user interface object locked to the sub-portion of the field of view that is centered around the virtual user interface object, and) updating the representation of the portion of the field of view of the one or more cameras includes displaying a placeholder image 5614 (e.g., a blank space or a rendered image) at a respective location in the augmented reality environment that corresponds to the portion of the virtual user interface object that extends beyond the field of view of the one or more cameras (e.g., to fill in the background beyond the virtual user interface object where the live camera image is no longer available). For example, when virtual user interface object 5604 would extend beyond the field of view of the one or more cameras, the augmented reality environment including virtual user interface object 5604 is zoomed out such that virtual user interface object 5604 is fully displayed. When the augmented reality environment is zoomed out, a live camera image is no longer available for a portion of the background beyond the virtual user interface object. In some embodiments, updating the augmented reality environment in accordance with the first respective change in attitude of the portion of the computer system in response to detecting the first respective change in attitude of the portion of the computer system relative to the physical environment of the computer system includes determining whether the updated respective location of the virtual user interface object 5604 extends beyond the field of view of the one or more cameras. Displaying a placeholder image in the augmented reality environment at a location that corresponds to a portion of the virtual user interface object that extends beyond a camera view improves the feedback provided to the user (e.g., by providing a visual cue to the user to help the user understand that the portion of the virtual user interface object extends beyond the camera view), enhances the operability of the device, and makes the user-device interface more efficient (e.g., by helping the user to achieve an intended outcome with the required inputs and reducing user mistakes when operating/interacting with the device) which, additionally, reduces power usage and improves battery life of the device by enabling the user to use the device more quickly and efficiently.

In some embodiments, the computer system detects (1320) a second respective change in attitude of the portion of the computer system relative to the physical environment of the computer system while the augmented reality environment is displayed in the stabilized mode of operation (e.g., device 100 is moved as illustrated at FIGS. 5F8*a*-5F9*a* or as illustrated at FIGS. 5F16*a*-5F17*a*). In response to detecting the second respective change in attitude of the portion of the computer system relative to the physical environment of the computer system while the augmented reality environment is displayed in the stabilized mode of operation, the computer system updates (1322) the augmented reality environment in accordance with the respective change in attitude of the portion of the computer system, including, in accordance with a determination that the updated respective location of the virtual user interface object 5604 extends beyond the field of view of the one or more cameras, ceasing to display at least a portion of the virtual user interface object 5604 (e.g., while continuing to display the virtual user interface object 5604 locked to the sub-portion of the field of view that is centered around the virtual user interface object). For example, in FIG. 5F9*b* and in FIG. 5F17*b*, the virtual user interface object 5604 extends beyond the field of view of the one or more cameras and a portion of the virtual user interface object 5604 is not displayed. In some embodiments, updating the augmented reality environment in accordance with the second respective change in attitude of the portion of the computer system in response to detecting the second respective change in attitude of the portion of the computer system relative to the physical environment of the computer system includes determining whether the updated respective location of the virtual user interface object extends beyond the field of view of the one or more cameras. In some embodiments, in accordance with a determination that the respective change in attitude of the portion of the computer system relative to the physical environment would cause the virtual user interface object to move to a location that is beyond the field of view of the one or more cameras, a constrained stabilization mode is activated in which the virtual user interface object is constrained to a location that corresponds to the field of view of the one or more cameras. In some embodiments, a third change in attitude of at least a portion of the computer system relative to the physical environment is detected while the virtual user interface object is constrained to the location that corresponds to the field of view of the one or more cameras. In response to the third change in attitude of the portion of the computer system relative to the physical environment, in accordance with a determination that the third change in attitude of the portion of the computer system relative to the physical environment would cause the virtual user interface object to move to a location that is not beyond the field of view of the one or more cameras, the constrained stabilization mode ends. Ceasing to display at least a portion of the virtual user interface object (e.g., a portion of the virtual user interface object that extends beyond a camera view) improves the feedback provided to the user (e.g., by providing a visual cue to the user to help the user understand that the portion of the virtual user interface object extends beyond the camera view), enhances the operability of the device, and makes the user-device interface more efficient (e.g., by helping the user to achieve an intended outcome with the required inputs and reducing user mistakes when operating/interacting with the device) which, additionally, reduces power usage and improves battery life of the device by enabling the user to use the device more quickly and efficiently.

In some embodiments, in response to detecting the respective change in attitude of the portion of the computer system relative to the physical environment of the computer system while the augmented reality environment is displayed in the stabilized mode of operation (e.g., detecting movement of device 100 as illustrated at FIGS. 5F8*a*-5F9*a*), updating the augmented reality environment in accordance with the respective change in attitude of the portion of the computer system includes (1324), in accordance with a determination that the updated respective location of the virtual user interface object 5604 extends beyond the field of view of the one or more cameras, zooming the displayed augmented reality environment to increase a portion of the displayed virtual user interface object (e.g., as illustrated at FIGS. 5F9*b*-5F10*b*), and in accordance with a determination that the updated respective location of the virtual user interface object does not extend beyond the field of view of the one or more cameras, moving the virtual user interface object without zooming the displayed augmented reality environment. In some embodiments, the computer system detects a plurality of changes in attitude of the portion of the computer system relative to the physical environment of the computer system while the augmented reality environment is displayed in the stabilized mode of operation, wherein the plurality of changes in attitude includes at least one change in attitude in response to which the updated respective location of the virtual user interface object extends beyond the field of view of the one or more cameras, and at least one change in attitude in response to which the updated respective location of the virtual user interface object does not extend beyond the field of view of the one or more cameras. Zooming the displayed augmented reality environment to increase a portion of the displayed virtual user interface object in the stabilized mode when movement of the computer system would cause the virtual user interface object to extend beyond the camera view improves the feedback provided to the user (e.g., by allowing the user to continue to view the full virtual user interface object regardless of movement of the device), enhances the operability of the device, and makes the user-device interface more efficient (e.g., by helping the user to achieve an intended outcome with the required inputs and reducing user mistakes when operating/interacting with the device) which, additionally, reduces power usage and improves battery life of the device by enabling the user to use the device more quickly and efficiently.

It should be understood that the particular order in which the operations in FIGS. 13A-13E have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, 800, 900, 1000, 1100, and 1200) are also applicable in an analogous manner to method 1100 described above with respect to FIGS. 13A-13E. For example, the contacts, gestures, user interface objects, focus indicators, and/or animations described above with reference to method 1300 optionally have one or more of the characteristics of the contacts, gestures, user interface objects, intensity thresholds, focus indicators, and/or animations described herein with reference to other methods described herein (e.g., methods 600, 700, 800, 900, 1000, 1100, and 1200). For brevity, these details are not repeated here.

The operations described above with reference to FIGS. 6A-6D, 7A-7C, 8A-8C, 9A-9E, 10A-10E, 11A-11C, 12A-12D, and 13A-13E are, optionally, implemented by components depicted in FIGS. 1A-1B. For example, display operations 602, 702, 802, 808, 902, 1002, 1014, 1102, 1202, 1206, and 1302; detection operations 606, 706, 806, 904, 1004, 1008, 1012, 1106, 1204, and 1304; detection and adjusting operations 608, adjusting and applying operations 708; adjusting operations 906; changing operation 1006; performing operation 1010; transitioning operation 1014; updating operations 1108 and 1306; and display and inserting operation 1206; are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:

at a computer system having, or in communication with, a display generation component, one or more cameras, one or more attitude sensors, and an input device:

displaying, via the display generation component, a simulated environment in a first viewing mode oriented relative to a physical environment of the computer system, wherein displaying the simulated environment in the first viewing mode includes:

displaying a live view, from the one or more cameras, of the physical environment of the computer system, including a representation of one or more physical objects in the physical environment of the computer system captured by the one or more cameras and a first virtual user interface object in a virtual model that is displayed at a first respective location in the simulated environment that is associated with the physical environment of the computer system; and displaying the first virtual user interface object with a fixed spatial relationship between the first virtual user interface object and the physical environment of the computer system;

while displaying the simulated environment in the first viewing mode:

detecting, via the one or more attitude sensors, a first change in attitude of at least a portion of the computer system relative to the physical environment of the computer system; and in response to detecting the first change in the attitude of the portion of the computer system, changing an appearance of the first virtual user interface object in the virtual model while maintaining the fixed spatial relationship between the first virtual user interface object and the physical environment of the computer system;

after changing the appearance of the first virtual user interface object based on the first change in the attitude of the portion of the computer system, detecting, via the input device, a first gesture that corresponds to an interaction with the simulated environment in the first viewing mode;

in response to detecting the first gesture that corresponds to the interaction with the simulated environment, performing an operation in the simulated environment that corresponds to the first gesture, the operation including: in accordance with a determination that the first gesture met mode change criteria, wherein the mode change criteria include a requirement that the first gesture corresponds to an input that changes a spatial parameter of the simulated environment relative to the physical environment of the computer system, transitioning from displaying the simulated environment, including the virtual model, in the first viewing mode to displaying the simulated environment, including the virtual model, in a second viewing mode;

after performing the operation that corresponds to the first gesture, detecting, via the one or more attitude sensors, a second change in attitude of the portion of the computer system relative to the physical environment of the computer system; and in response to detecting the second change in the attitude of the portion of the computer system:

in accordance with a determination that the first gesture met the mode change criteria, maintaining display of the virtual model in the simulated environment in the second viewing mode without displaying a live view, from the one or more cameras, of the physical environment of the computer system; and in accordance with a determination that the first gesture did not meet the mode change criteria, continuing to display the virtual model in the simulated environment in the first viewing mode, wherein displaying the virtual model in the first viewing mode includes changing an appearance of the first virtual user interface object in the virtual model in response to the second change in attitude of the portion of the computer system relative to the physical environment of the computer system, so as to maintain the fixed spatial relationship between the first virtual user interface object and the physical environment of the computer system.

2. The method of claim 1, further comprising, in response to detecting the second change in the attitude of the portion of the computer system, in accordance with a determination that the first gesture met the mode change criteria, maintaining display of the virtual model in the simulated environment in the second viewing mode without maintaining the fixed spatial relationship between the first virtual user interface object and the physical environment of the computer system.

3. The method of claim 1, wherein:

detecting the first gesture that corresponds to the interaction with the simulated environment includes:

detecting a plurality of contacts with a touch-sensitive surface of the input device; and while the plurality of contacts with the touch-sensitive surface are detected, detecting movement of a first contact of the plurality of contacts relative to movement of a second contact of the plurality of contacts; and performing the operation in the simulated environment that corresponds to the first gesture includes altering a size of the first virtual user interface object by an amount that corresponds to the movement of the first contact relative to the movement of the second contact.

4. The method of claim 1, further comprising:

while displaying the first virtual user interface object in the simulated environment in the second viewing mode:

detecting, via the input device, a second gesture that corresponds to an interaction with the simulated environment, wherein the second gesture includes input for altering a perspective of the simulated environment; and in response to detecting the second gesture that corresponds to the interaction with the simulated environment, updating a displayed perspective of the simulated environment in accordance with the input for altering the perspective of the simulated environment.

5. The method of claim 1, further comprising:

while displaying the simulated environment in the second viewing mode without displaying a live view, from the one or more cameras, of the physical environment of the computer system:

detecting, via the input device, an insertion input for inserting a second virtual user interface object at a second respective location in the simulated environment; and in response to detecting the insertion input for inserting the second virtual user interface object, displaying, at the second respective location in the simulated environment, the second virtual user interface object while maintaining the fixed spatial relationship between the first virtual user interface object and the physical environment.

6. The method of claim 1, further comprising, while transitioning from displaying the simulated environment in the first viewing mode to displaying the simulated environment in the second viewing mode, displaying a transition animation to provide a visual indication of the transition.

7. The method of claim 6, wherein displaying the transition animation includes gradually ceasing to display at least one visual element that is displayed in the first viewing mode and is not displayed in the second viewing mode.

8. The method of claim 6, wherein displaying the transition animation includes gradually displaying at least one visual element of the second viewing mode that is not displayed in the first viewing mode.

9. The method of claim 1, further comprising, in response to detecting the first gesture that corresponds to the interaction with the simulated environment, altering a perspective with which the virtual model in the simulated environment is displayed in accordance with the change to the spatial parameter by the input that corresponds to the first gesture.

10. The method of claim 9, further comprising, after detecting an end of the first gesture, continuing to alter a perspective with which the virtual model in the simulated environment is displayed to indicate the transitioning from displaying the simulated environment in the first viewing mode to displaying the simulated environment in the second viewing mode.

11. The method of claim 1, further comprising:

while displaying the simulated environment in the second viewing mode, detecting, via the input device, a third gesture that corresponds to an input for transitioning from the second viewing mode to the first viewing mode; and in response to detecting the third gesture, transitioning from displaying the simulated environment in the second viewing mode to displaying the simulated environment in the first viewing mode.

12. The method of claim 11, wherein:

the input device includes a touch-sensitive surface;

detecting the third gesture that corresponds to the input for transitioning from the second viewing mode to the first viewing mode includes:

detecting a plurality of contacts with the touch-sensitive surface of the input device; and while the plurality of contacts with the touch-sensitive surface are detected, detecting movement of a first contact of the plurality of contacts relative to movement of a second contact of the plurality of contacts; and transitioning from displaying the simulated environment in the second viewing mode to displaying the simulated environment in the first viewing mode includes altering a size of the virtual model in the simulated environment to return to a size of the virtual model prior to the transition from the first viewing mode to the second viewing mode.

13. The method of claim 11, wherein the third gesture includes an input at a position on the input device that corresponds to a control that, when activated, causes the transition from the second viewing mode to the first viewing mode.

14. The method of claim 13, further comprising:

in response to detecting the third gesture, transitioning the position of the first virtual user interface object from a current position relative to the physical environment to a prior position relative to the physical environment so as to return to the fixed spatial relationship between the first virtual user interface object and the physical environment.

15. The method of claim 11, further comprising, after detecting an end of the third gesture, continuing to alter a perspective with which the virtual model in the simulated environment is displayed to indicate the transitioning from displaying the simulated environment in the second viewing mode to displaying the simulated environment in the first viewing mode.

16. A computer system, comprising:
a display generation component;
one or more cameras;
one or more attitude sensors;
an input device;
one or more processors; and
memory storing one or more programs, wherein the one or more programs are configured to be executed by the one or more processors, the one or more programs including instructions for:
displaying, via the display generation component, a simulated environment in a first viewing mode oriented relative to a physical environment of the computer system, wherein displaying the simulated environment in the first viewing mode includes:
displaying a live view, from the one or more cameras, of the physical environment of the computer system, including a representation of one or more physical objects in the physical environment of the computer system captured by the one or more cameras and a first virtual user interface object in a virtual model that is displayed at a first respective location in the simulated environment that is associated with the physical environment of the computer system; and
displaying the first virtual user interface object with a fixed spatial relationship between the first virtual user interface object and the physical environment of the computer system;
while displaying the simulated environment in the first viewing mode:
detecting, via the one or more attitude sensors, a first change in attitude of at least a portion of the computer system relative to the physical environment of the computer system; and
in response to detecting the first change in the attitude of the portion of the computer system, changing an appearance of the first virtual user interface object in the virtual model while maintaining the fixed spatial relationship between the first virtual user interface object and the physical environment of the computer system;
after changing the appearance of the first virtual user interface object based on the first change in the attitude of the portion of the computer system, detecting, via the input device, a first gesture that corresponds to an interaction with the simulated environment in the first viewing mode;
in response to detecting the first gesture that corresponds to the interaction with the simulated environment, performing an operation in the simulated environment that corresponds to the first gesture, the operation including: in accordance with a determination that the first gesture met mode change criteria, wherein the mode change criteria include a requirement that the first gesture corresponds to an input that changes a spatial parameter of the simulated environment relative to the physical environment of the computer system, transitioning from displaying the simulated environment, including the virtual model, in the first viewing mode to displaying the simulated environment, including the virtual model, in a second viewing mode;
after performing the operation that corresponds to the first gesture, detecting, via the one or more attitude sensors, a second change in attitude of the portion of the computer system relative to the physical environment of the computer system; and
in response to detecting the second change in the attitude of the portion of the computer system:
in accordance with a determination that the first gesture met the mode change criteria, maintaining display of the virtual model in the simulated environment in the second viewing mode without displaying a live view, from the one or more cameras, of the physical environment of the computer system; and
in accordance with a determination that the first gesture did not meet the mode change criteria, continuing to display the virtual model in the simulated environment in the first viewing mode, wherein displaying the virtual model in the first viewing mode includes changing an appearance of the first virtual user interface object in the virtual model in response to the second change in attitude of the portion of the computer system relative to the physical environment of the computer system, so as to maintain the fixed spatial relationship between the first virtual user interface object and the physical environment of the computer system.

17. The computer system of claim 16, wherein the one or more programs include instructions for, in response to detecting the second change in the attitude of the portion of the computer system, in accordance with a determination that the first gesture met the mode change criteria, maintaining display of the virtual model in the simulated environment in the second viewing mode without maintaining the fixed spatial relationship between the first virtual user interface object and the physical environment of the computer system.

18. The computer system of claim 16, wherein:
detecting the first gesture that corresponds to the interaction with the simulated environment includes:
detecting a plurality of contacts with a touch-sensitive surface of the input device; and
while the plurality of contacts with the touch-sensitive surface are detected, detecting movement of a first contact of the plurality of contacts relative to movement of a second contact of the plurality of contacts; and
performing the operation in the simulated environment that corresponds to the first gesture includes altering a size of the first virtual user interface object by an amount that corresponds to the movement of the first contact relative to the movement of the second contact.

19. The computer system of claim 16, wherein the one or more programs include instructions for:
while displaying the first virtual user interface object in the simulated environment in the second viewing mode:
detecting, via the input device, a second gesture that corresponds to an interaction with the simulated environment, wherein the second gesture includes input for altering a perspective of the simulated environment; and
in response to detecting the second gesture that corresponds to the interaction with the simulated environment, updating a displayed perspective of the simulated environment in accordance with the input for altering the perspective of the simulated environment.

20. The computer system of claim 16, wherein the one or more programs include instructions for:

while displaying the simulated environment in the second viewing mode without displaying a live view, from the one or more cameras, of the physical environment of the computer system:

detecting, via the input device, an insertion input for inserting a second virtual user interface object at a second respective location in the simulated environment; and in response to detecting the insertion input for inserting the second virtual user interface object, displaying, at the second respective location in the simulated environment, the second virtual user interface object while maintaining the fixed spatial relationship between the first virtual user interface object and the physical environment.

21. The computer system of claim 16, wherein the one or more programs include instructions for, while transitioning from displaying the simulated environment in the first viewing mode to displaying the simulated environment in the second viewing mode, displaying a transition animation to provide a visual indication of the transition.

22. The computer system of claim 16, wherein the one or more programs include instructions for, in response to detecting the first gesture that corresponds to the interaction with the simulated environment, altering a perspective with which the virtual model in the simulated environment is displayed in accordance with the change to the spatial parameter by the input that corresponds to the first gesture.

23. The computer system of claim 16, wherein the one or more programs include instructions for:

while displaying the simulated environment in the second viewing mode, detecting, via the input device, a third gesture that corresponds to an input for transitioning from the second viewing mode to the first viewing mode; and in response to detecting the third gesture, transitioning from displaying the simulated environment in the second viewing mode to displaying the simulated environment in the first viewing mode.

24. A non-transitory computer readable storage medium storing one or more programs, the one or more programs comprising instructions that, when executed by a computer system having, or in communication with, a display generation component, one or more cameras, one or more attitude sensors, and an input device, cause the computer system to:

display, via the display generation component, a simulated environment in a first viewing mode oriented relative to a physical environment of the computer system, wherein displaying the simulated environment in the first viewing mode includes:

displaying a live view, from the one or more cameras, of the physical environment of the computer system, including a representation of one or more physical objects in the physical environment of the computer system captured by the one or more cameras and a first virtual user interface object in a virtual model that is displayed at a first respective location in the simulated environment that is associated with the physical environment of the computer system; and displaying the first virtual user interface object with a fixed spatial relationship between the first virtual user interface object and the physical environment of the computer system;

while displaying the simulated environment in the first viewing mode:

detect, via the one or more attitude sensors, a first change in attitude of at least a portion of the computer system relative to the physical environment of the computer system; and in response to detecting the first change in the attitude of the portion of the computer system, change an appearance of the first virtual user interface object in the virtual model while maintaining the fixed spatial relationship between the first virtual user interface object and the physical environment of the computer system;

after changing the appearance of the first virtual user interface object based on the first change in the attitude of the portion of the computer system, detect, via the input device, a first gesture that corresponds to an interaction with the simulated environment in the first viewing mode;

in response to detecting the first gesture that corresponds to the interaction with the simulated environment, perform an operation in the simulated environment that corresponds to the first gesture, the operation including: in accordance with a determination that the first gesture met mode change criteria, wherein the mode change criteria include a requirement that the first gesture corresponds to an input that changes a spatial parameter of the simulated environment relative to the physical environment of the computer system, transitioning from displaying the simulated environment, including the virtual model, in the first viewing mode to displaying the simulated environment, including the virtual model, in a second viewing mode;

after performing the operation that corresponds to the first gesture, detect, via the one or more attitude sensors, a second change in attitude of the portion of the computer system relative to the physical environment of the computer system; and in response to detecting the second change in the attitude of the portion of the computer system:

in accordance with a determination that the first gesture met the mode change criteria, maintain display of the virtual model in the simulated environment in the second viewing mode without displaying a live view, from the one or more cameras, of the physical environment of the computer system; and in accordance with a determination that the first gesture did not meet the mode change criteria, continue to display the virtual model in the simulated environment in the first viewing mode, wherein displaying the virtual model in the first viewing mode includes changing an appearance of the first virtual user interface object in the virtual model in response to the second change in attitude of the portion of the computer system relative to the physical environment of the computer system, so as to maintain the fixed spatial relationship between the first virtual user interface object and the physical environment of the computer system.

25. The non-transitory computer readable storage medium of claim 24, wherein the one or more programs includes instructions that, when executed by the computer system, cause the computer system to: in response to detecting the second change in the attitude of the portion of the computer system, in accordance with a determination that the first gesture met the mode change criteria, maintain display of the virtual model in the simulated environment in the second viewing mode without maintaining the fixed spatial relationship between the first virtual user interface object and the physical environment of the computer system.

26. The non-transitory computer readable storage medium of claim 24, wherein the one or more programs includes instructions that, when executed by the computer system, cause the computer system to:

while displaying the first virtual user interface object in the simulated environment in the second viewing mode:

detect, via the input device, a second gesture that corresponds to an interaction with the simulated environment, wherein the second gesture includes input for altering a perspective of the simulated environment; and in response to detecting the second gesture that corresponds to the interaction with the simulated environment, update a displayed perspective of the simulated environment in accordance with the input for altering the perspective of the simulated environment.

27. The non-transitory computer readable storage medium of claim 24, wherein the one or more programs includes instructions that, when executed by the computer system, cause the computer system to:

while displaying the simulated environment in the second viewing mode without displaying a live view, from the one or more cameras, of the physical environment of the computer system:

detect, via the input device, an insertion input for inserting a second virtual user interface object at a second respective location in the simulated environment; and in response to detecting the insertion input for inserting the second virtual user interface object, display, at the second respective location in the simulated environment, the second virtual user interface object while maintaining the fixed spatial relationship between the first virtual user interface object and the physical environment.

28. The non-transitory computer readable storage medium of claim 24, wherein:

detecting the first gesture that corresponds to the interaction with the simulated environment includes:

detecting a plurality of contacts with a touch-sensitive surface of the input device; and while the plurality of contacts with the touch-sensitive surface are detected, detecting movement of a first contact of the plurality of contacts relative to movement of a second contact of the plurality of contacts; and performing the operation in the simulated environment that corresponds to the first gesture includes altering a size of the first virtual user interface object by an amount that corresponds to the movement of the first contact relative to the movement of the second contact.

29. The non-transitory computer readable storage medium of claim 24, wherein the one or more programs includes instructions that, when executed by the computer system, cause the computer system to, while transitioning from displaying the simulated environment in the first viewing mode to displaying the simulated environment in the second viewing mode, display a transition animation to provide a visual indication of the transition.

30. The non-transitory computer readable storage medium of claim 24, wherein the one or more programs includes instructions that, when executed by the computer system, cause the computer system to, in response to detecting the first gesture that corresponds to the interaction with the simulated environment, alter a perspective with which the virtual model in the simulated environment is displayed in accordance with the change to the spatial parameter by the input that corresponds to the first gesture.

31. The non-transitory computer readable storage medium of claim 24, wherein the one or more programs includes instructions that, when executed by the computer system, cause the computer system to:

while displaying the simulated environment in the second viewing mode, detect, via the input device, a third gesture that corresponds to an input for transitioning from the second viewing mode to the first viewing mode; and in response to detecting the third gesture, transition from displaying the simulated environment in the second viewing mode to displaying the simulated environment in the first viewing mode.

* * * * *